US012731224B1

(12) United States Patent
Liu et al.

(10) Patent No.: US 12,731,224 B1
(45) Date of Patent: Sep. 8, 2026

(54) NEURAL NETWORKS TO ADJUST BRIGHTNESS OF PIXELS

(71) Applicant: NVIDIA Corporation, Santa Clara, CA (US)

(72) Inventors: Shiqiu Liu, Cupertino, CA (US); Pietari Armas Kaskela, Helsinki (FI); Jussi Rasanen, Uusimaa (FI); James Matthew Norton, Durham, NC (US); Juho Marttila, Uusimaa (FI); David Tarjan, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 72 days.

(21) Appl. No.: 18/604,175

(22) Filed: Mar. 13, 2024

Related U.S. Application Data

(60) Provisional application No. 63/534,779, filed on Aug. 25, 2023, provisional application No. 63/534,807, filed on Aug. 25, 2023, provisional application No. 63/534,775, filed on Aug. 25, 2023, provisional application No. 63/534,793, filed on Aug. 25, 2023.

(51) Int. Cl.

| | |
|---|---|
| ***G06T 5/60*** | (2024.01) |
| ***A63F 13/67*** | (2014.01) |
| ***G06T 5/20*** | (2006.01) |
| ***G06T 5/50*** | (2006.01) |
| ***G06T 5/70*** | (2024.01) |
| ***G06T 7/20*** | (2017.01) |

(52) U.S. Cl.
CPC .................. *G06T 5/60* (2024.01); *G06T 5/20* (2013.01); *G06T 5/50* (2013.01); *G06T 5/70* (2024.01); *G06T 7/20* (2013.01); *A63F 13/67* (2014.09); *G06T 2207/10016* (2013.01); *G06T 2207/20016* (2013.01); *G06T 2207/20221* (2013.01)

(58) Field of Classification Search
CPC .... G06T 5/60; G06T 5/20; G06T 5/50; G06T 5/70; G06T 7/20; G06T 2207/10016; G06T 2207/20016; G06T 2207/20221; A63F 13/67
See application file for complete search history.

(56) References Cited

U.S. PATENT DOCUMENTS

| | | | |
|---|---|---|---|
| 9,602,763 | B1 | 3/2017 | Cheng et al. |
| 10,832,375 | B2 | 11/2020 | Zimmer et al. |
| 12,266,118 | B2 | 4/2025 | Ustiuzhanin et al. |

(Continued)

FOREIGN PATENT DOCUMENTS

| | | | |
|---|---|---|---|
| CA | 2941729 | A1 * | 3/2017 |
| CN | 115223192 | A | 10/2022 |

OTHER PUBLICATIONS

Balint, Martin, et al. "Neural partitioning pyramids for denoising monte carlo renderings." ACM SIGGRAPH 2023 conference proceedings. 2023. (Year: 2023).*

(Continued)

*Primary Examiner* — Daniel F Hajnik
*Assistant Examiner* — Thomas John Foster
(74) *Attorney, Agent, or Firm* — Davis Wright Tremaine LLP

(57) ABSTRACT

Apparatuses, systems, and techniques to perform neural networks. In at least one embodiment, a processor comprising one or more circuits uses one or more neural networks to adjust brightness of pixels of images prior to denoising the images.

20 Claims, 96 Drawing Sheets

(56) References Cited

U.S. PATENT DOCUMENTS

| | | | | |
|---|---|---|---|---|
| 2014/0192166 | A1* | 7/2014 | Cogswell | H04N 13/271 348/49 |
| 2018/0293711 | A1* | 10/2018 | Vogels | G06V 10/764 |
| 2022/0101504 | A1 | 3/2022 | Cheng et al. | |
| 2022/0148236 | A1 | 5/2022 | Bharkhada et al. | |
| 2022/0148256 | A1 | 5/2022 | Liu et al. | |
| 2022/0366532 | A1* | 11/2022 | Shanmuga Vadivel | G06T 3/4046 |
| 2023/0080693 | A1* | 3/2023 | Hu | G06T 5/70 382/275 |
| 2024/0037713 | A1 | 2/2024 | O'Neil et al. | |
| 2024/0095097 | A1 | 3/2024 | Pottorff et al. | |
| 2024/0119558 | A1 | 4/2024 | Kozlov et al. | |

OTHER PUBLICATIONS

Balint et al., "Neural Partitioning Pyramids for Denoising Monte Carlo Renderings," SIGGRAPH '23, Conference Proceedings, Aug. 6, 2023, 11 Pages.

IEEE, "IEEE Standard 754-2008 (Revision of IEEE Standard 754-1985): IEEE Standard for Floating-Point Arithmetic," Aug. 29, 2008, 70 pages.

Thomas et al., "Temporally Stable Real-Time Joint Neural Denoising and Supersampling," Proceedings of the ACM Computer Graphics and Interact Techniques, vol. 5, No. 3, Article 21, Jul. 2022, 22 Pages.

Wikipedia, "IEEE 802.11," Wikipedia the Free Encyclopedia, https://en.wikipedia.org/wiki/IEEE_802.11, most recent edit Sep. 20, 2020 [retrieved Sep. 22, 2020], 15 pages.

* cited by examiner

GAME ENGINE 102

IMAGE DATA 104

NOISY IMAGE FRAMES 106

OTHER IMAGE DATA 108

PROCESSOR 110

NEURAL NETWORK 112

OUTPUT DATA 114

DENOISED IMAGE FRAMES 116

IMAGE RENDERER 118

INPUT
2402

NEURAL NETWORK
2404

SUBTRACT RESIDUAL
IMAGE 2408 − RESIDUAL 2410
2412

FILTER
2414

GENERATE FILTER VALUES
2422

ADD RESIDUAL
FILTER OUTPUT 2416 + RESIDUAL 2418
2420

OUTPUT
2406

3200

PROCESSOR 3202

SEPARATOR MODULE 3204

COMBINER MODULE 3206

NEURAL NETWORK INFERENCING MODULE 3212

DENOISER MODULE 3208

FILTER MODULE 3210

NEURAL NETWORK TRAINING MODULE 3214

DEMODULATE MODULE 3216

REMODULATE MODULE 3218

RENDERING MODULE 3220

SYNTHETIC MOTION MODULE 3222

SPECULAR MOTION MODULE 3224

MULTI-CORE PROCESSOR 4205
3415
MMU 4239A
BIAS/ COHERENCE 4294A

GPU 4210(1)
3415
MMU 4239B
BIAS/ COHERENCE 4294B

GPU 4210(2)
3415
MMU 4239C
BIAS/ COHERENCE 4294C

GPU 4210(N-1)
3415
MMU 4239D
BIAS/ COHERENCE 4294D

GPU 4210(N)
3415
MMU 4239E
BIAS/ COHERENCE 4294E

PROCESSOR MEMORY 4201(1)
PROCESSOR MEMORY 4201(2)
GPU MEMORY 4220(1)
GPU MEMORY 4220(2)
GPU MEMORY 4220(3)
GPU MEMORY 4220(4)
UNIFIED MEMORY

VERTEX PROCESSOR
4405

3415

FRAGMENT PROCESSOR
4415A

3415

FRAGMENT PROCESSOR
4415C

3415

FRAGMENT PROCESSOR
4415N-1

3415

FRAGMENT PROCESSOR
4415B

3415

FRAGMENT PROCESSOR
4415D

3415

FRAGMENT PROCESSOR
4415N

3415

MMU
4420A

MMU
4420B

CACHE
4425A

CACHE
4425B

INTERCONNECT
4430A

INTERCONNECT
4430B

NEURAL NETWORKS TO ADJUST BRIGHTNESS OF PIXELS

CROSS-REFERENCE TO RELATED APPLICATIONS

This application claims the benefit of U.S. Provisional Application No. 63/534,775 titled "NEURAL NETWORK IMAGE DENOISING USING SYNTHETIC MOTION," filed Aug. 25, 2023, U.S. Provisional Application No. 63/534,793 titled "NEURAL NETWORK IMAGE DENOISING," filed Aug. 25, 2023, U.S. Provisional Application No. 63/534,779 titled "NEURAL NETWORK IMAGE DENOISING USING SPECULAR MOTION," filed Aug. 25, 2023, and U.S. Provisional Application No. 63/534,807 titled "IMAGE ARTIFACT REMOVAL USING A NEURAL NETWORK," filed Aug. 25, 2023, the entire contents of which are incorporated herein by reference. This application also incorporates for all purposes the full disclosure of co-pending U.S. patent application Ser. No. 18/604,164, filed concurrently herewith, entitled "NEURAL NETWORKS TO IDENTIFY AND BLEND PIXELS", co-pending U.S. patent application Ser. No. 18/442,651, filed Feb. 15, 2024, entitled "NEURAL NETWORKS TO DENOISE IMAGES USING MOTION", co-pending U.S. patent application Ser. No. 18/587,059, filed Feb. 26, 2024, entitled "NEURAL NETWORK TO BLEND IMAGES", and co-pending U.S. patent application Ser. No. 18/421,306, filed Jan. 24, 2024, entitled "NEURAL NETWORKS TO BLEND IMAGES USING DEPTH".

TECHNICAL FIELD

At least one embodiment pertains to using neural networks to generate a denoised or other version of one or more images. For example, at least one embodiment pertains to processors or computing systems that receive image data including one or more images and use neural networks to generate blending weights to blend depth values of said images.

BACKGROUND

Generating high-quality video can use significant memory, time, or resources. The amount of memory, time, or resources (e.g., computing resources) can be improved. For example, high-quality video contains a large amount of information, and processing and storage of such information can use significant memory, time, or other computing resources. In some contexts, enhancement or other processing of video can be done to process a video to be useful for a particular purpose, but large amounts of information contained in said video and limitations of computing resources make effective processing of said video challenging.

DETAILED DESCRIPTION

Figure 1:
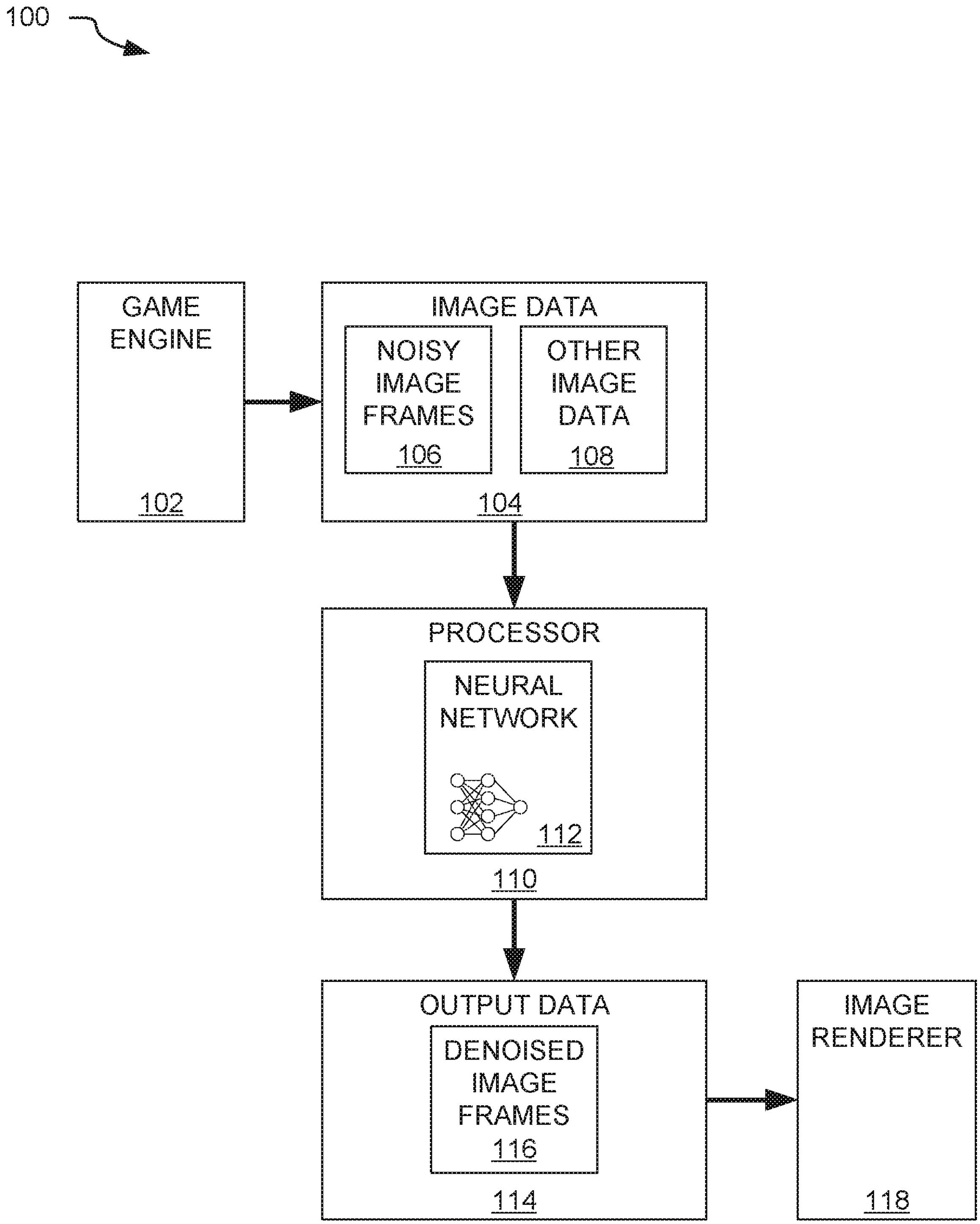
FIG. 1 is a block diagram illustrating a computing environment to denoise an image using a neural network, in accordance with at least one embodiment.

In the following description, numerous specific details are set forth to provide a more thorough understanding of at least one embodiment. However, it will be apparent to one skilled in the art that the inventive concepts may be practiced without one or more of these specific details.

In at least one embodiment, apparatuses, systems, and/or processors comprising one or more circuits use a neural network to denoise images to, for example, generate high-quality images. In at least one embodiment, apparatuses, systems, and/or processors comprising one or more circuits use noisy images and other input data when generating a high-quality (e.g., denoised) image. In at least one embodiment, based on said input data, a neural network infers how to generate pixels in a high-quality image. In at least one embodiment, a neural network denoises a noisy image to generate a denoised image and uses said denoised image to generate an upsampled (e.g., higher resolution) image based, at least in part, on said noisy image. In at least one embodiment, images include pixel data and images can also be referred to as "frames," e.g., frames of a video game. In at least one embodiment, apparatuses, systems, and/or processors comprising one or more circuits use one or more neural networks to generate blending weights to blend one or more depth values of images. In at least one embodiment, said blending weights are used to perform image reconstruction by using one or more noisy images and other input data to generate high-quality (e.g., denoised) images.

In at least one embodiment, denoised images are generated by blending pixels of images (e.g., noisy images) using blending weights, as described herein. In at least one embodiment, a neural network comprises a hierarchical kernel prediction network (HKPN) that identifies non-noise pixels and blends said pixels with other pixels, in parallel. In at least one embodiment, brightness of pixels of images (e.g., noisy images) is adjusted prior to denoising noisy images. In at least one embodiment, brightness of pixels of images is adjusted prior to denoising so that brighter areas of images are preserved through filtering (e.g., using an HKPN, applied in parallel). In at least one embodiment, brightness of pixels of images is adjusted after denoising so that brighter areas of images are preserved (e.g., by restoring said brighter areas).

In at least one embodiment, brightness of pixels of images are adjusted prior to denoising by demodulating pixels of an image. In at least one embodiment, demodulating an image comprises dividing pixels of an image by one or more values (e.g., a per-pixel albedo) so that bright areas (e.g., areas with high albedo) of an image become dimmer before denoising. In at least one embodiment, brightness of pixels of images are adjusted after denoising by modulating (or remodulating) pixels of an image. In at least one embodiment, remodulating an image comprises multiplying pixels of an image by one or more values (e.g., a per-pixel albedo) so that formerly bright areas of an image become brighter after denoising (e.g., brightness is restored). In at least one embodiment, a per-pixel value used to demodulate a pixel before denoising is identical to a per-pixel value used to remodulate a pixel after denoising.

In at least one embodiment, brightness of pixels of images are adjusted prior to denoising by subtracting an image residual value from pixels of an image. In at least one embodiment, subtracting an image residual value from pixels of an image comprises subtracting one or more values (e.g., a per-pixel emissive value) from pixels of an image so that bright areas (e.g., areas with high emission) of an image become dimmer before denoising. In at least one embodiment, brightness of pixels of images are adjusted after denoising by adding an image residual value to pixels of an image. In at least one embodiment, adding an image residual value to comprises adding one or more values (e.g., a per-pixel emissive value) to pixels of an image so that formerly bright areas of an image become brighter after denoising (e.g., brightness is restored). In at least one embodiment, a per-pixel residual value subtracted from a pixel before denoising is identical to a per-pixel value added to a pixel after denoising.

In at least one embodiment, low-quality and noisy are relative terms that refer to an image with one or more incomplete, erroneous, or unspecified pixels. In at least one embodiment, a noisy image includes one or more pixels that are generated by a ray-tracing algorithm and one or more pixels that are not generated by a ray-tracing algorithm (e.g., unspecified pixels). In at least one embodiment, a noisy image is generated by applying noise (e.g., stochastic noise) to an image. In at least one embodiment, a noisy image is generated by a game engine such as those described herein. In at least one embodiment, high-quality and denoised refer to an image that replaces one or more incomplete, erroneous, or unspecified pixels of a noisy image with other pixel data (e.g., color). In at least one embodiment, high-quality is a relative term as compared to low-quality. In at least one embodiment, denoising refers to using one or more operations, methods, techniques such as those described herein to remove noise from a noisy image. In at least one embodiment, a low-quality image has more incomplete, erroneous, or unspecified pixels than a high-quality image. In at least one embodiment, a noisy image has more incomplete, erroneous, or unspecified pixels than a denoised image. In at least one embodiment, incomplete, erroneous, or unspecified pixels of a noisy or low-quality image are intentionally generated by a game engine, a neural network, or image processing.

In at least one embodiment, low and high resolution are relative terms and refer to a number of pixels included in an image. For example, a low-resolution image can be a 720p, 1080p, or another resolution image that has fewer pixels than a higher-resolution image such as a 4K, 8K, or higher-resolution image. In at least one embodiment, a high-resolution image can be an upscaled or upsampled version of a low-resolution image. In at least one embodiment, a version of an image refers to an image that has similar or identical content to another image. For example, a first version of an image can be an image of a glass of water on a table in a 1080p resolution, and a second version of an image can be said same glass of water on said same table in a 4K resolution, where said second version has more pixels than said first version.

FIG. 1 is a block diagram 100 illustrating a computing environment to denoise an image using a neural network, performed by one or more processors, in accordance with at least one embodiment. In at least one embodiment, a computing environment illustrated in FIG. 1 includes a game engine 102, a processor 110 that implements a neural network 112, and an image renderer 118. In at least one embodiment, processor 110 includes one or more circuits to use one or more neural networks to generate a denoised version of one or more noisy image frames 106 based, at least in part, on said noisy image frames 106 and other image data 108 as described herein at least in connection with FIGS. 2-6. In at least one embodiment, an image frame of noisy image frames 106 comprises one or more non-noise pixels (e.g., pixels of noiseless regions of said image frame) and/or one or more noisy pixels (e.g., pixels of noisy regions of said image frame).

In at least one embodiment, not shown in FIG. 1, processor 110 includes one or more circuits to use one or more neural networks to generate upsampled (e.g., higher resolution) images. In at least one embodiment, not shown in FIG. 1, processor 110 includes one or more circuits to use one or more neural networks to generate downsampled (e.g., lower resolution) images. In at least one embodiment, not shown in FIG. 1, processor 110 includes one or more circuits to use one or more neural networks to generate interpolated frames (e.g., to render frames between rendered image frames). In at least one embodiment, not shown in FIG. 1, processor 110 includes one or more circuits to use one or more neural networks to perform one or more operations including, but not limited to, operations to denoise, upsample, downsample, and/or interpolate images.

Figure 6:
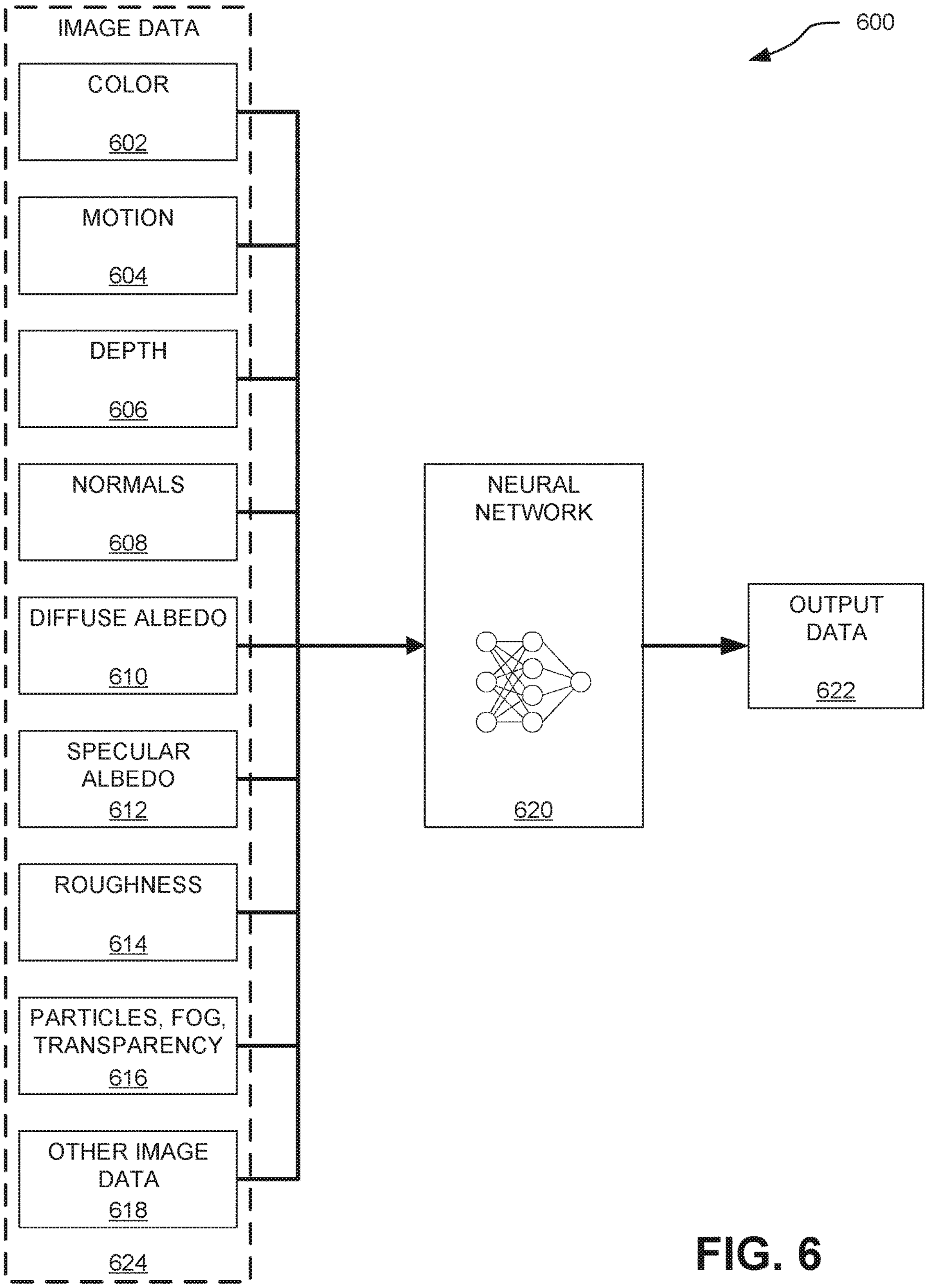
FIG. 6 is a block diagram illustrating components of an image to be denoised using a neural network, in accordance with at least one embodiment.

In at least one embodiment, game engine 102 generates image data 104 comprising one or more noisy image frames 106 and a set of other image data 108 (e.g., as described herein at least in connection with FIG. 6). In at least one embodiment, processor 110 uses neural network 112 to denoise said one or more noisy image frames 106 to generate output data 114 comprising one or more denoised image frames 116 (also referred to herein as antialiased image frames). In at least one embodiment, not shown in FIG. 1, neural network 112 generates an upsampled image based on denoised image frames 116 (e.g., a high-resolution image in 4K) before generating output data 114. In at least one embodiment, image renderer 118 uses one or more post-processing techniques to prepare output data 114 to be rendered in a game or movie. In at least one embodiment, advanced computing pipelines such as those described herein use block diagram 100 to generate high-quality or denoised images in an image generation process.

In at least one embodiment, neural network 112 performs one or more operations to generate a denoised version of one or more noisy image frames 106 using one or more filters (not shown in FIG. 1) such as those described herein. In at least one embodiment, filtering is spatial filtering (e.g., within a frame). In at least one embodiment, filtering is spatial reuse (e.g., reusing elements of an image to generate and/or regenerate pixel information of noisy images). In at least one embodiment, spatial filtering is used in connection with temporal filtering (e.g., over multiple frames). In at least one embodiment, a filter includes one or more filters including, but not limited to, those described herein.

In at least one embodiment, not shown in FIG. 1, game engine 102 is or otherwise includes software that is performed by a processor such as processor 110. In at least one embodiment, game engine 102 is or otherwise includes software that is performed by a processor to generate graphics, images, frames, motion vectors, depth information, light information, reflection information, frame information, sound, scripting, animation, memory management, threading, and/or networking that are used to render a video game. In at least one embodiment, game engine 102 is or otherwise includes software that is performed by a processor to generate image data such as image data 624, described herein at least in connection with FIG. 6. In at least one embodiment, game engine 102 generates scenes of a video game. In at least one embodiment, game engine 102 includes settings to enable or disable denoising of images that are rendered in a video game. In at least one embodiment, game engine 102 is software performed by a CPU and GPU to generate video game information to be consumed by a mobile computing device or server hosting said video game. In at least one embodiment, game engine 102 generates low-resolution images that are to be used in a video game (e.g., rendered). In at least one embodiment, game engine 102 generates low-quality images that are to be used in a video game (e.g., rendered). In at least one embodiment, game engine 102 generates noisy images (e.g., as described herein) that are to be used in a video game (e.g., rendered). In at least one embodiment, game engine 102 is performed by one or more processors in real-time. In at least one embodiment, game engine 102 performed by one or more processors provides raster, anti-aliasing, post effects, tonemaps, a user interface (UI), or other effects and components of a video game.

In at least one embodiment, while a game engine 102 is shown in FIG. 1, another software module performed by one or more processors can generate content of block diagram 100 such as a video generator that generates videos (e.g., movies) or an image generator that generates images in multiple dimensions, e.g., virtual reality and augmented reality.

In at least one embodiment, denoising is performed by a processor 110 implementing a neural network 112 to denoise frames or images. In at least one embodiment, denoising by a neural network 112 includes image processing software to filter or reduce noise (e.g., remove noise) from one or more noisy image frames 106. In at least one embodiment, neural network 112 is a trained neural network such as trained neural network 214, described herein at least in connection with FIG. 2. In at least one embodiment, denoising by a neural network 112 uses one or more techniques including, autoencoders, hierarchical kernel prediction networks (HKPN) filters, spatio-temporal variance guided filter (SVGF), real-time denoisers (e.g., ReBLUR, which is based on recurrent blurring), and/or ReLAX (e.g., spatiotemporal variance guided filtering) as a series of heuristic-based denoisers that can denoise images. In at least one embodiment, denoising by a neural network 112 is implemented as a hard-wired circuit (e.g., logic circuitry or an ASIC) that performs operations to denoise information (e.g., images, versions of images, and/or components of images).

In at least one embodiment, denoising by a processor or processes using neural network 112 is performed using Monte-Carlo ray tracing techniques that include accumulating random samples to generate an approximation of a video game scene. In at least one embodiment, denoising by a neural network 112 is performed using guided blurring kernels. In at least one embodiment, denoising by a neural network 112 can denoise an image or frame using blue noise filtering or other specific frequencies of filtering. In at least one embodiment, denoising by a neural network 112 is includes software to perform approximation techniques including probes, irradiance caches, neural radiance fields (NeRFs). In at least one embodiment, denoising by a neural network 112 uses sampling techniques such as Adaptive Spatio-Temporal Variance Guided Filtering (A-SVGF), and Spatiotemporal Importance Resampling for Many-Light Ray Tracing (ReSTIR).

In at least one embodiment, denoising by a processor or processes using neural network 112 denoises images, components of images, or other inputs in real-time. In at least one embodiment, in-real time processing includes denoising inputs withing a short amount of time (e.g., milliseconds or less) so that said inputs, intermediates, outputs, or other variables are available immediately (e.g., an image is immediately available to be rendered in a video game). In at least one embodiment, denoising by a neural network 112 is performed by one or more processors while rendering a video game such that outputs of imagine render are denoised in real-time (e.g., as video game is being played and/or displayed on a screen). In at least one embodiment, denoising by a neural network 112 is part of a deep-learning super-sampling (DLSS) process where previous frames or images of a game may be warped with new frames or images of a game and where said new frames or image are denoised in real-time. In at least one embodiment, a computing environment illustrated in FIG. 1 is used to provide real-time ray-tracing, where said ray-tracing images are denoised in real-time. In at least one embodiment, denoising by a neural network 112 includes a spatio-temporal ray tracing denoising library (e.g., functions, code, pointers, instructions) that assists in denoising low ray-per-pixel signals with real-time performance. In at least one embodiment, denoising by a neural network 112 performed by one or more processors is used with path tracing. In at least one embodiment, denoising by a neural network 112 includes an API-agnostic denoising library uses low ray-per-pixel signals. In at least one embodiment, denoising by a neural network 112 includes denoising to reduce a number of rays that need to be cast per pixel in an image, which can smooth a results of path tracing.

In at least one embodiment, neural network 112 is a neural network performed by processor 110 to generate denoised image frames 116, as described herein. In at least one embodiment, not shown in FIG. 1, neural network 112 is a neural network performed by processor 110 to upsample or upscale an image (e.g., convert a low-resolution or lower-resolution image to a high-resolution or higher-resolution image). In at least one embodiment, neural network 112 comprises collections of weights (e.g., organized in matrices or other tensors or otherwise) and graph code that indicates how weights are to be applied to input data (e.g., image, frames, video frame data). In at least one embodiment, neural network 112 includes a super sampling neural network as herein at least in connection with FIGS. 76 and 77. In at least one embodiment, neural network 112 comprises a neural network 7606 that is referred to as a super sampling neural network, a deep learning super sampling (DLSS) network, a super sampling network, and/or variations thereof. In at least one embodiment, neural network 112 comprises a convolution neural network (CNN), a recurrent neural network (RNN), a generative adversarial network (GAN), and/or variations thereof.

In at least one embodiment, image renderer 118 is software to render, generate, or otherwise process an image, frame, or video (e.g., of a video game or movie). In at least one embodiment, not shown in FIG. 1, image renderer 118 is performed by a processor such as processor 110. In at least one embodiment, image renderer 118 is software performed by a processor to render images, perform blending operations, perform mixing operations, warp frames, mix frames, combine frames, and/or otherwise processes an image, frame, or video to be rendered. In at least one embodiment, image renderer 118 is a combination of software and circuitry (e.g., an ASIC designed to perform a particular video game rendering process). In at least one embodiment, image renderer 118 is logic circuitry to render, present, display, and/or otherwise post process an image such that it is provided on a screen.

In at least one embodiment, processor 110 is a host processor. In at least one embodiment, host code is code that is performed by a host processor, where host refers to a CPU and its memory, and device code is code that is performed by a second processor (not shown in FIG. 1), where device refers to said GPU and its memory. In at least one embodiment, processor 110 is a central processing unit (CPU). In at least one embodiment, a second processor (not shown in FIG. 1) is a device processor. In at least one embodiment, said second processor is a GPU, a parallel processing unit, a FPGA, an ASIC, and/or other processor that can accelerate performance of computations or operations. In at least one embodiment, said second processor includes a plurality of GPUs such as GPUs 4210(1)-4210(N) and is communicatively coupled to a plurality of multi-core processors 4205(1)-4205(M) over high-speed links 4240(1)-4240(N) all as described herein at least in connection with FIGS. 42A-42F. In at least one embodiment, processor 110 and one or more additional processors form a system on chip (SoC) comprising one or more circuits to use a neural network (e.g., neural network 112) to denoise images by performing software disclosed in a computing environment illustrated in FIG. 1.

In at least one embodiment, a computing environment illustrated in FIG. includes elements not shown in FIG. 1. In at least one embodiment, a computing environment illustrated in FIG. 1 includes or is connected with one or more application programming interfaces (APIs) to render graphics of a video, video game, or other visual application such as those described herein (e.g., DIRECTTX 11 or 12, VULKAN, PYTORCH, and/or combinations thereof).

In at least one embodiment, one or more processors (e.g., processor 110 and/or other processors and/or accelerators such as those described herein) comprise one or more circuits to perform operations and/or instructions described herein in connection with FIG. 1, such as one or more circuits to cause one or more neural networks to cause one or more non-noise pixels to be identified and blended in parallel and/or otherwise perform operations described herein. In at least one embodiment, operations and/or instructions described herein in connection with FIG. 1 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 1 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 1, one or more components described herein in connection with FIG. 1 include one or more components described herein in connection with FIGS. 34A-80 to cause one or more neural networks to cause one or more non-noise pixels to be identified and blended in parallel and/or otherwise perform operations described herein.

In at least one embodiment, not illustrated in FIG. 1, a non-transitory machine-readable medium has stored thereon a set of instructions which, if performed by one or more processors, are to perform operations described herein at least in connection with FIGS. 1-33, such as operations to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 1, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 1 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 1 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 1, one or more components described herein in connection with FIG. 1 include one or more components described herein in connection with FIGS. 34A-80 to use one or more neural networks to adjust brightness of one or more pixels of one or more images prior to denoising the one or more images and/or otherwise perform operations described herein.

In at least one embodiment, not illustrated in FIG. 1, a non-transitory machine-readable medium has stored thereon a set of instructions which, if performed by one or more processors, are to perform operations described herein at least in connection with FIGS. 1-33, such as operations to use one or more neural networks to adjust brightness of one or more pixels of one or more images prior to denoising the one or more images and/or otherwise perform operations described herein.

Figure 2:
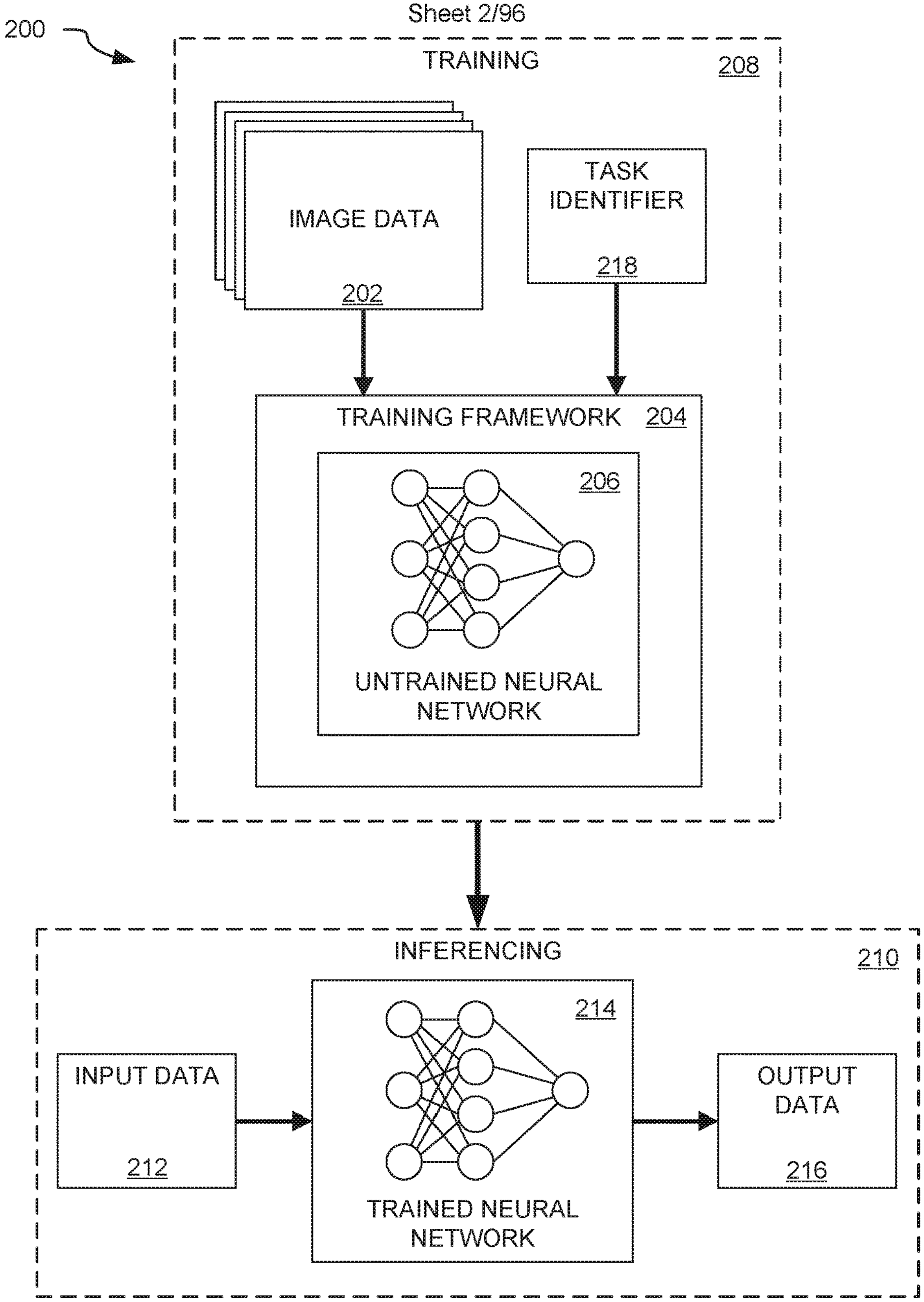
FIG. 2 is a block diagram illustrating training a neural network to denoise an image, in accordance with at least one embodiment.

FIG. 2 is a block diagram 200 training a neural network to denoise an image, in accordance with at least one embodiment. In at least one embodiment, FIG. 2 illustrates a neural network training 208 and inferencing 210 architecture that are used to generate trained neural network 214 according to at least one embodiment.

In at least one embodiment, a training framework 204, during training 208, trains an untrained neural network 206 using image data 202 as training data to synthesize, categorize, identify, or otherwise use in inferencing 210 output data 216 from input data 212. In at least one embodiment, untrained neural network 206 is a partially trained neural network (e.g., a neural network that has been trained using one or more iterations of training) that is not fully trained (e.g., has not completed training iterations, as described herein). In at least one embodiment, training 208 uses an architecture (e.g., of a neural network) that can learn one or more components of one or more filters (e.g., such as those described herein) wherein said filters are used to denoise an image using said neural network (e.g., after training 208). In at least one embodiment, one or more processors (e.g., processor 110 described herein at least in connection with FIG. 1) are used to generate a trained neural network, as described herein. In at least one embodiment, one or more circuits train an untrained neural network 206 to denoise images to produce denoised images based on noisy images and other image data as training data. In at least one embodiment, a neural network such as neural network 112 infers denoised images from noisy images. In at least one embodiment, one or more processors using neural network training 208 and inferencing 210 can train one or more neural networks to generate denoised images based, at least in part, on one or more noisy images and other image data.

In at least one embodiment, not shown in FIG. 2, training framework 204 trains untrained neural network 206 to generate upsampled (e.g., higher resolution) images. In at least one embodiment, not shown in FIG. 2, training framework 204 trains untrained neural network 206 to generate downsampled (e.g., lower resolution) images. In at least one embodiment, not shown in FIG. 2, training framework 204 trains untrained neural network 206 to generate interpolated frames (e.g., to render frames that are temporally between rendered image frames). In at least one embodiment, not shown in FIG. 2, training framework 204 trains untrained neural network 206 to perform one or more operations including, but not limited to, operations to denoise, upsample, downsample, and/or interpolate images.

In at least one embodiment, image data 202 as training data is input into training framework 204 to train an untrained neural network 206 to synthesize or otherwise generate output data 216 from input data 212. In at least one embodiment, image data 202 as training data includes marked, labeled, or otherwise categorized versions of images, where some versions are denoised and other versions are noisy. In at least one embodiment, image data 202 as training data is data comprising information usable to train an untrained neural network 206 using training framework 204. In at least one embodiment, image data 202 as training data includes supervision or other information used to facilitate training by training framework 204. In at least one embodiment, supervision or other information to facilitate training includes data that identifies features of image data 202 as training data to improve training of an untrained neural network 206 by training framework 204.

In at least one embodiment, a task identifier 218 is input into training framework 204 to facilitate training untrained neural network 206 to synthesize or otherwise generate output data 216 from input data 212 using a subset of a set of neurons of untrained neural network 206. In at least one embodiment, task identifier 218 comprises one or more vectors. In at least one embodiment, task identifier 218 comprises a set of data values usable to determine a subset of a set of neurons of an untrained neural network 206 to be used in training 208 using training framework 204. In at least one embodiment, task identifier 218 comprises one or more vectors identifying or indicating a task and/or an identifier usable to indicate a task. In at least one embodiment, task identifier 218 includes any data used by training framework 204 to determine one or more portions of untrained neural network 206 to be used in training 208.

In at least one embodiment, training framework 204 is data and software instructions that, when executed, update weight and other values of untrained neural network 206 in order to perform inferencing 210. In at least one embodiment, training framework 204 uses a generative adversarial network (GAN) to train untrained neural network 206. In at least one embodiment, training framework 204 uses one or more other training architectures or techniques to facilitate training untrained neural network 206 such as those described in connection with FIG. 34A (e.g., inference and/or training logic 3415 used to perform inferencing and/or training operations associated with one or more embodiments), described herein at least in connection with FIGS. 34A and/or 34B. In at least one embodiment, training framework 204 determines loss values that are backpropagated in untrained neural network 206 in order to train untrained neural network 206.

In at least one embodiment, an untrained neural network 206 comprises data values and/or software instructions that, when executed, perform, compute, or otherwise determine one or more data values usable to perform neural network operations, such as inferencing including classification, object identification, or any other neural network operation further described herein. In at least one embodiment, training framework 204 trains untrained neural network 206, to perform a function $h_\theta(\bullet)$ that takes M inputs X, $$\{x_i\}_{i=1}^{M}$$

and infers or otherwise computes N outputs Y, $$\{y_i\}_{i=1}^{N}.$$

In at least one embodiment, training framework 204 trains untrained neural network 206 to make a decision or inference about items of input data 212. In at least one embodiment, a decision or inference comprises inferencing 210 (e.g., determining one or more probabilities that input data 212 items have characteristics or features). In at least one embodiment, untrained neural network 206 comprises one or more layers to facilitate training 208 or inferencing 210 using image data 202 as training data and/or input data 212. In at least one embodiment, untrained neural network 206 comprises one or more upsampling layers to generate output data during training 208 with greater dimensions than image data 202 and/or input data 212. In at least one embodiment, training framework 204 trains one or more layers of untrained neural network 206 to perform a function $h_\theta(\bullet)$. In at least one embodiment, untrained neural network 206, trained neural network 214, and/or neural network 112 comprise nodes, neurons, layers, pooling layers, and/or other components of a neural network such as weights.

In at least one embodiment, untrained neural network 206 is a neural coding network comprising various untrained layers, such as convolutional layers, as described herein. In at least one embodiment, untrained neural network 206 comprises one or more individual neural networks to perform different operations, such as various neural network operations, as described herein. In at least one embodiment, untrained neural network 206 is any type of neural network that is trained by training framework 204 to determine output data 216 based, at least in part, on an input data 212.

In at least one embodiment, trained neural network 214 (e.g., neural network 112) comprises data values and/or software instructions that, when executed, infer output data 216 from input data 212 using one or more data values computed during training 208. In at least one embodiment, trained neural network 214 performs a function $h_\theta(\bullet)$, as described above, to generate output data 216 from input data 212. In at least one embodiment, trained neural network 214 and/or neural network 112 comprise one or more neural network layers to perform denoising of input data 212 to produce output data 216. In at least one embodiment, trained neural network 214 and/or neural network 112 comprise one or more neural network layers to perform upsampling to increase data size, such as dimensions, of output data 216 in comparison to input data 212. In at least one embodiment, trained neural network 214 and/or neural network 112 are neural coding networks. In at least one embodiment, trained neural network 214 and/or neural network 112 are neural coding networks comprising convolutional layers. In at least one embodiment, trained neural network 214 and/or neural network 112 are convolutional neural networks. In at least one embodiment, trained neural network 214 and/or neural network 112 are any types of neural network further described herein.

In at least one embodiment, input data 212 is data comprising one or more dimensions of data. In at least one embodiment, input data 212 comprises a two-dimensional image comprising a width and a height. In at least one embodiment, input data 212 comprises a three-dimensional image comprising a width, a height, and a depth. In at least one embodiment, input data 212 comprises a four-dimensional image comprising a width, a height, a depth, and one or more layers. In at least one embodiment, input data 212 comprises audio or any other type of data usable to inferenced using neural network 112. In at least one embodiment, input data 212 comprises image data such as image data 624, described herein at least in connection with FIG. 6. In at least one embodiment, input data 212 comprises pixel data values. In at least one embodiment, pixels are locations within image data, and image data of a pixel comprises color information associated with said pixel. In at least one embodiment, input data 212 comprises image data comprising one or more layers, where each layer includes at least two-dimensional image data.

In at least one embodiment, output data 216 is data comprising one or more dimensions of data. In at least one embodiment, output data 216 comprises a two-dimensional image comprising a width and a height. In at least one embodiment, output data 216 comprises a three-dimensional image comprising a width, a height, and a depth. In at least one embodiment, output data 216 comprises a four-dimensional image comprising a width, a height, a depth, and one or more layers. In at least one embodiment, output data 216 comprises image data of width (N*Z) and height (M*Z), where Z is an integer scaling factor or numerical value that indicates a size increase or decrease as a product of an original width dimension N and original height dimension M (e.g., of input data 212). In at least one embodiment, output data 216 is generated based, at least in part, on input data 212 by trained neural network 214 using techniques such as those described herein. In at least one embodiment, output data 216 has greater dimensions than input data 212. In at least one embodiment, output data 216 comprises pixel data values. In at least one embodiment, pixels are locations within image data, and image data of a pixel comprises color information associated with said pixel. In at least one embodiment, output data 216 comprises one or more two-dimensional layers comprising image data.

In at least one embodiment, output data 216 comprises a single dimension. In at least one embodiment, output data 216 comprises a single data value. In at least one embodiment, output data 216 comprises one or more types of information about input data 212. In at least one embodiment, one or more types of information about input data 212 are data values indicating one or more features of input data 212. In at least one embodiment, one or more types of information about input data 212 are data values indicating one or more classifications of input data 212. In at least one embodiment, one or more types of information about input data 212 are image information such as classification and/or features of input data 212, such as input images. In at least one embodiment, image information and/or other information generated as output data 216 by trained neural network 214 comprises data having multiple dimensions as described above. In at least one embodiment, image information and/or other information generated as output data 216 by trained neural network 214 and/or neural network 112 is single-dimension data. In at least one embodiment, not shown in FIG. 2, output data 216 can be sent, indicated, or otherwise provided to an image renderer such as image renderer 118, described herein at least in connection with FIG. 1.

In at least one embodiment, one or more processors (e.g., processor 110 and/or other processors and/or accelerators such as those described herein) comprise one or more circuits to perform operations and/or instructions described herein in connection with FIG. 2, such as one or more circuits to cause one or more neural networks to cause one or more non-noise pixels to be identified and blended in parallel and/or otherwise perform operations described herein. In at least one embodiment, operations and/or instructions described herein in connection with FIG. 2 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 2 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 2, one or more components described herein in connection with FIG. 2 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 2, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 2 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 2 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 2, one or more components described herein in connection with FIG. 2 include one or more components described herein in connection with FIGS. 34A-80 to use one or more neural networks to adjust brightness of one or more pixels of one or more images prior to denoising the one or more images and/or otherwise perform operations described herein.

Figure 3:
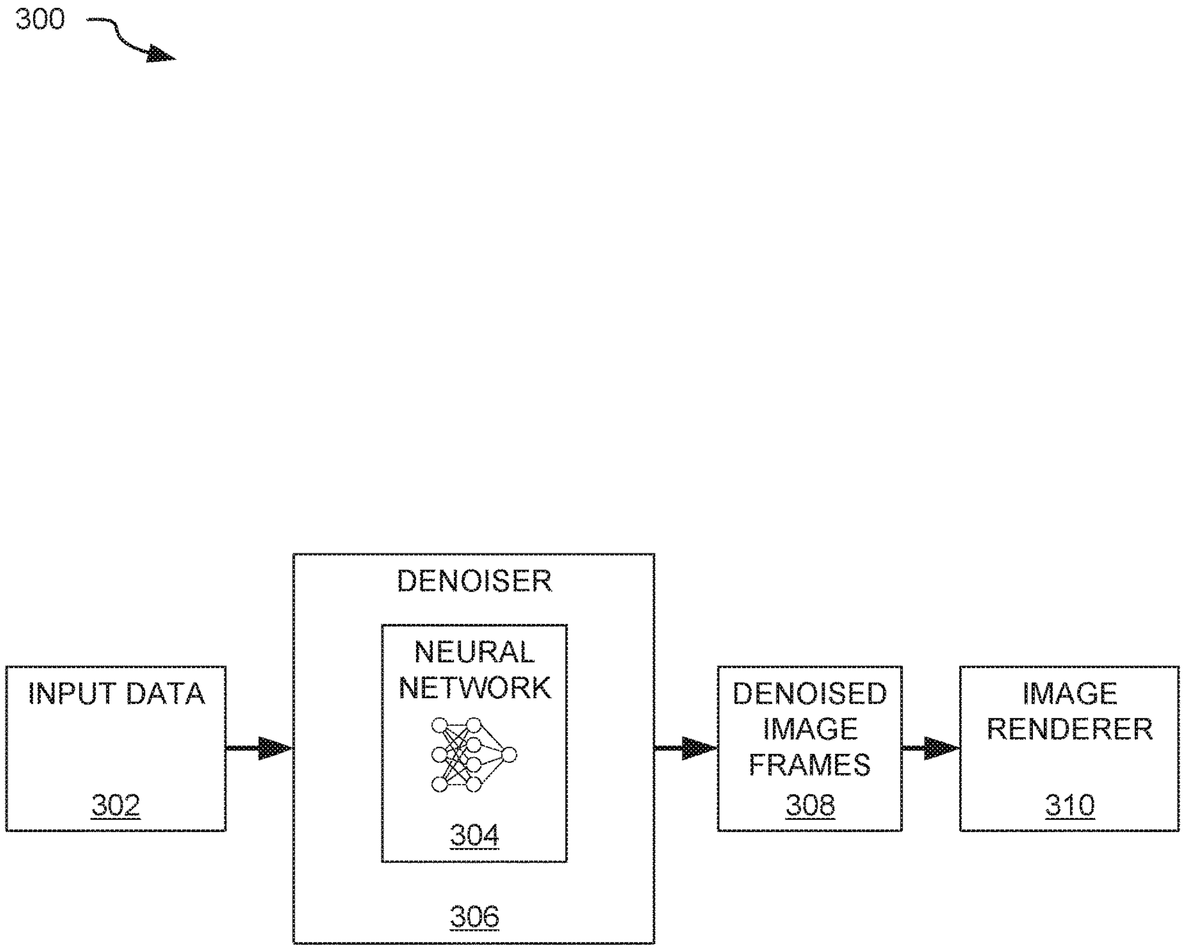
FIG. 3 is a block diagram illustrating using a neural network to denoise an image, in accordance with at least one embodiment.

FIG. 3 is a block diagram 300 illustrating using a neural network to denoise an image, in accordance with at least one embodiment. In at least one embodiment, block diagram 300 includes input data 302, a denoiser 306 comprising a neural network 304, denoised image frames 308, and an image renderer 310. In at least one embodiment, input data 302 is input data such as input data 212, described herein at least in connection with FIG. 2. In at least one embodiment, input data 302 includes one or more images of a video game scene. In at least one embodiment, input data 302 comprises one or more non-noise pixels (e.g., pixels of a noiseless region of input data 302) and/or one or more noisy pixels (e.g., pixels of a noisy region of input data 302). In at least one embodiment, one or more processors comprising one or more circuits (e.g., processors such as processor 110, described herein at least in connection with FIG. 1) provide input data 302 to denoiser 306. In at least one embodiment, denoiser 306 comprises a neural network 304. In at least one embodiment, neural network 304 is a neural network such as neural network 112, described herein at least in connection with FIG. 1. In at least one embodiment, one or more processors comprising one or more circuits (e.g., processors such as processor 110, described herein at least in connection with FIG. 1) provide a noisy version of said image to denoiser 306 and/or neural network 304, as described herein at least in connection with FIG. 1.

In at least one embodiment, as used in any implementation described herein, unless otherwise clear from context or stated explicitly to contrary, terms such as "module" and nominalized verbs (e.g., denoiser, separator, combiner, filter, image reconstructor, and/or other terms) each refers to any combination of software logic, firmware logic, hardware logic, and/or circuitry configured to provide functionality described herein. In at least one embodiment, software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. In at least one embodiment, modules may, collectively or individually, be embodied as circuitry that forms part of a larger system, for example, an integrated circuit (IC), system on-chip (SoC), and so forth.

In at least one embodiment, not shown in FIG. 3, an image upsampler (e.g., a component that generates upsampled images) performs one or more additional operations (e.g., before, after, and/or concurrently with) denoiser 306. In at least one embodiment, an image upsampler comprises one or more neural networks (e.g., neural network 304) to generate upsampled image frames to be sent, indicated, or otherwise provided to image renderer 310, described herein. In at least one embodiment, not shown in FIG. 3, an image downsampler (e.g., a component that generates downsampled images) performs one or more additional operations (e.g., before, after, and/or concurrently with) denoiser 306. In at least one embodiment, an image downsampler comprises one or more neural networks (e.g., neural network 304) to generate downsampled image frames to be sent, indicated, or otherwise provided to image renderer 310, described herein. In at least one embodiment, not shown in FIG. 3, an image interpolator (e.g., a component that generates interpolated frames) performs one or more additional operations (e.g., before, after, and/or concurrently with) denoiser 306. In at least one embodiment, an image interpolator comprises one or more neural networks (e.g., neural network 304) to generate interpolated image frames to be sent, indicated, or otherwise provided to image renderer 310, described herein.

In at least one embodiment, one or more processors comprising one or more circuits provide a version of an image to denoiser 306. In at least one embodiment, one or more processors performing denoiser 306 denoise said image. In at least one embodiment, one or more processors performing a game engine such as game engine 102 described herein at least in connection with FIG. 1, generate an image, and provide said image to denoiser 306 to denoised image frames 308. In at least one embodiment, denoised image frames 308 comprises denoised image frames such as denoised image frames 116, described herein at least in connection with FIG. 1. In at least one embodiment, not shown in FIG. 3, denoiser 306 and/or neural network 304 receive versions of said images (e.g., a denoised version and non-denoised version) and generates an upsampled image based on said inputs. In at least one embodiment, denoiser 306 and/or neural network 304 use a 1080p noisy image and a denoised 1080p version of said 1080p noisy image to generate a 4K image (e.g., by performing one or more upsampling operations). In at least one embodiment, denoised image frames 308 is sent, indicated, or otherwise provided to image renderer 310 to be used in further processing (e.g., blending, mixing, warping). In at least one embodiment, image renderer 310 renders said further processed image (e.g., in a video, video game).

In at least one embodiment, one or more processors (e.g., processor 110 and/or other processors and/or accelerators such as those described herein) comprise one or more circuits to perform operations and/or instructions described herein in connection with FIG. 3, such as one or more circuits to cause one or more neural networks to cause one or more non-noise pixels to be identified and blended in parallel and/or otherwise perform operations described herein. In at least one embodiment, operations and/or instructions described herein in connection with FIG. 3 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 3 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 3, one or more components described herein in connection with FIG. 3 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 3, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 3 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 3 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 3, one or more components described herein in connection with FIG. 3 include one or more components described herein in connection with FIGS. 34A-80 to use one or more neural networks to adjust brightness of one or more pixels of one or more images prior to denoising the one or more images and/or otherwise perform operations described herein.

Figure 4:
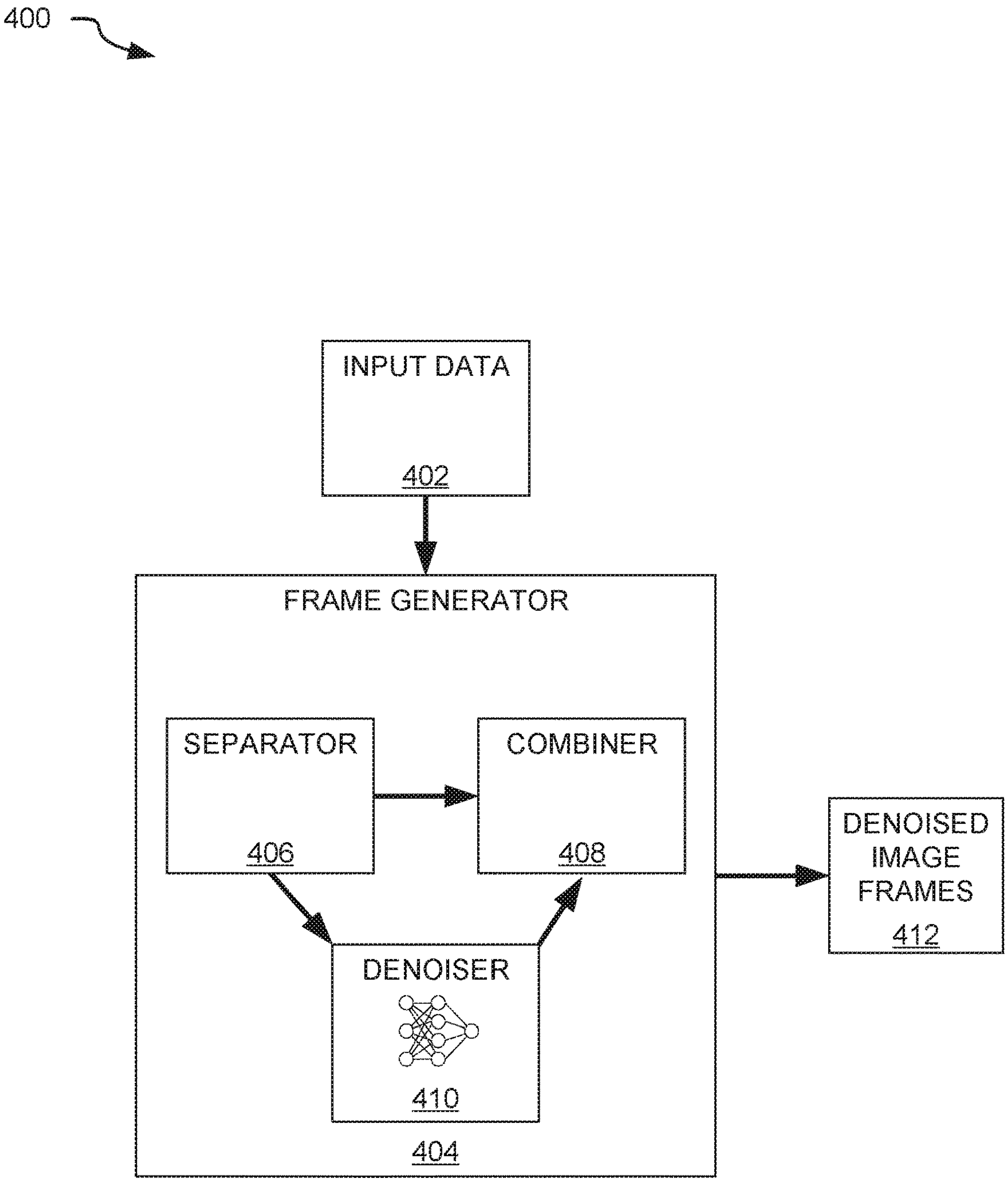
FIG. 4 is a block diagram illustrating using a neural network to denoise components of an image, in accordance with at least one embodiment.

FIG. 4 is a block diagram 400 illustrating using a neural network to denoise components of an image, in accordance with at least one embodiment. In at least one embodiment, block diagram 400 includes input data 402, a frame generator 404 with a denoiser 410, and denoised image frames 412. In at least one embodiment, denoiser 410 comprises one or more neural networks, as described above. In at least one embodiment, input data 402 is input data such as input data 302, described herein at least in connection with FIG. 3. In at least one embodiment, input data 402 comprises one or more non-noise pixels (e.g., pixels of a noiseless region of input data 402) and/or one or more noisy pixels (e.g., pixels of a noisy region of input data 402). In at least one embodiment, frame generator 404 uses one or more neural networks to denoise, upsample, downsample, reconstruct, and/or perform frame interpolation of images as described herein in connection with FIGS. 1-33 and in connection with FIGS. 76-80. In at least one embodiment, denoiser 410 is a denoiser such as denoiser 306, described herein at least in connection with FIG. 3. In at least one embodiment, a neural network of denoiser 410 is a neural network such as neural network 304, described herein at least in connection with FIG. 3. In at least one embodiment, denoised image frames 412 is output data such as denoised image frames 308, described herein at least in connection with FIG. 3. In at least one embodiment, not shown in FIG. 4, denoised image frames 412 comprises denoised image frames such as denoised image frames 116, described herein at least in connection with FIG. 1. In at least one embodiment, not shown in FIG. 4, block diagram 400 includes an image renderer such as image renderer 301, described herein at least in connection with FIG. 3. In at least one embodiment, not shown in FIG. 4, frame generator 404 comprises one or more additional components including, but not limited to, an image upsampler, an image downsampler, an image reconstructor, and/or an image interpolator.

In at least one embodiment, as used in any implementation described herein, unless otherwise clear from context or stated explicitly to contrary, terms such as "module" and nominalized verbs (e.g., frame generator, image upsampler, image downsampler, image reconstructor, image interpolator, demodulator, remodulator, and/or other terms) each refers to any combination of software logic, firmware logic, hardware logic, and/or circuitry configured to provide functionality described herein. In at least one embodiment, software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. In at least one embodiment, modules may, collectively or individually, be embodied as circuitry that forms part of a larger system, for example, an integrated circuit (IC), system on-chip (SoC), and so forth.

In at least one embodiment, block diagram 400 includes a separator 406 and a combiner 408. In at least one embodiment, separator 406 and combiner 408 are elements of frame generator 404. In at least one embodiment, not shown in FIG. 4, separator 406 and combiner 408 are not elements of frame generator 404 (e.g., separator 406 and/or combiner 408 are separate from frame generator 404. In at least one embodiment, separator 406 comprises software, logic, circuitry, or another combination of hardware and software that is performed or used by one or more processors to split, divide, or otherwise separate input data 402 into one or more components. In at least one embodiment, separator 406 is performed by a processor comprising one or more circuits to separate input data into one or more components such as those of image data 624, described herein at least in connection with FIG. 6. In at least one embodiment, not shown in FIG. 4, separator 406 includes a demodulator that preserves image components such as a textures and pixels of said image through filtering operations such as described herein. In at least one embodiment, a demodulator is any combination of software logic, firmware logic, hardware logic, and/or circuitry that performs one or more operations to remove or reduce components of images by, for example, dividing colors (e.g., RGB values) of pixels of an image by one or more values. In at least one embodiment, a demodulator divides RGB values of a pixel by an albedo value, described below, to preserve said values before image denoising and/or reconstruction. In at least one embodiment, one or more processors (e.g., processor 110) performing separator 406 divide input data 402 into texture and pixel components such that said texture data is separated from said pixel data (e.g., to be processed separately). In at least one embodiment, texture data is separated from a video game image (e.g., as generated by a game engine) before said video game image is denoised because there is no noise in a texture, and it saves computing resources to denoise pixels separately without said texture.

In at least one embodiment, separator 406, combiner 408, denoiser 410, demodulator (described above), remodulator (described below) and/or other components described herein in connection with FIG. 4 are circuits of a processor such as processor 110, described herein at least in connection with FIG. 1.

In at least one embodiment, combiner 408 is software, logic, circuitry, or a combination of hardware and software that is performed or used by one or more processors to combine separated components of input data 402. In at least one embodiment, if pixels of an image were denoised separately from a texture of an image that was not denoised (e.g., as described above), combiner 408 combines said separated components to generate a combined image to be used in further processing (e.g., in super-sampling). In at least one embodiment, not shown in FIG. 4, separator 406 includes a remodulator (also referred to herein as a modulator) that restores image components such as a textures and pixels of said image that were preserved by a demodulator, as described above. In at least one embodiment, a remodulator performs one or more operations to restore or emphasize components of images by, for example, multiplying colors (e.g., RGB values) of pixels of an image by one or more values. In at least one embodiment, a remodulator is any combination of software logic, firmware logic, hardware logic, and/or circuitry that multiplies or otherwise adjusts RGB values of a pixel by an albedo value, described below, to restore said values after image denoising and/or reconstruction. In at least one embodiment, frame generator 404 generates denoised image frames 412 to be used in further processing (e.g., blending, mixing, warping). In at least one embodiment, denoised image frames 412 is rendered by an image renderer such as image renderer 310, described herein at least in connection with FIG. 3.

In at least one embodiment, one or more processors (e.g., processor 110 and/or other processors and/or accelerators such as those described herein) comprise one or more circuits to perform operations and/or instructions described herein in connection with FIG. 4, such as one or more circuits to cause one or more neural networks to cause one or more non-noise pixels to be identified and blended in parallel and/or otherwise perform operations described herein. In at least one embodiment, operations and/or instructions described herein in connection with FIG. 4 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 4 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 4, one or more components described herein in connection with FIG. 4 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 4, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 4 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 4 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 4, one or more components described herein in connection with FIG. 4 include one or more components described herein in connection with FIGS. 34A-80 to use one or more neural networks to adjust brightness of one or more pixels of one or more images prior to denoising the one or more images and/or otherwise perform operations described herein.

Figure 5:
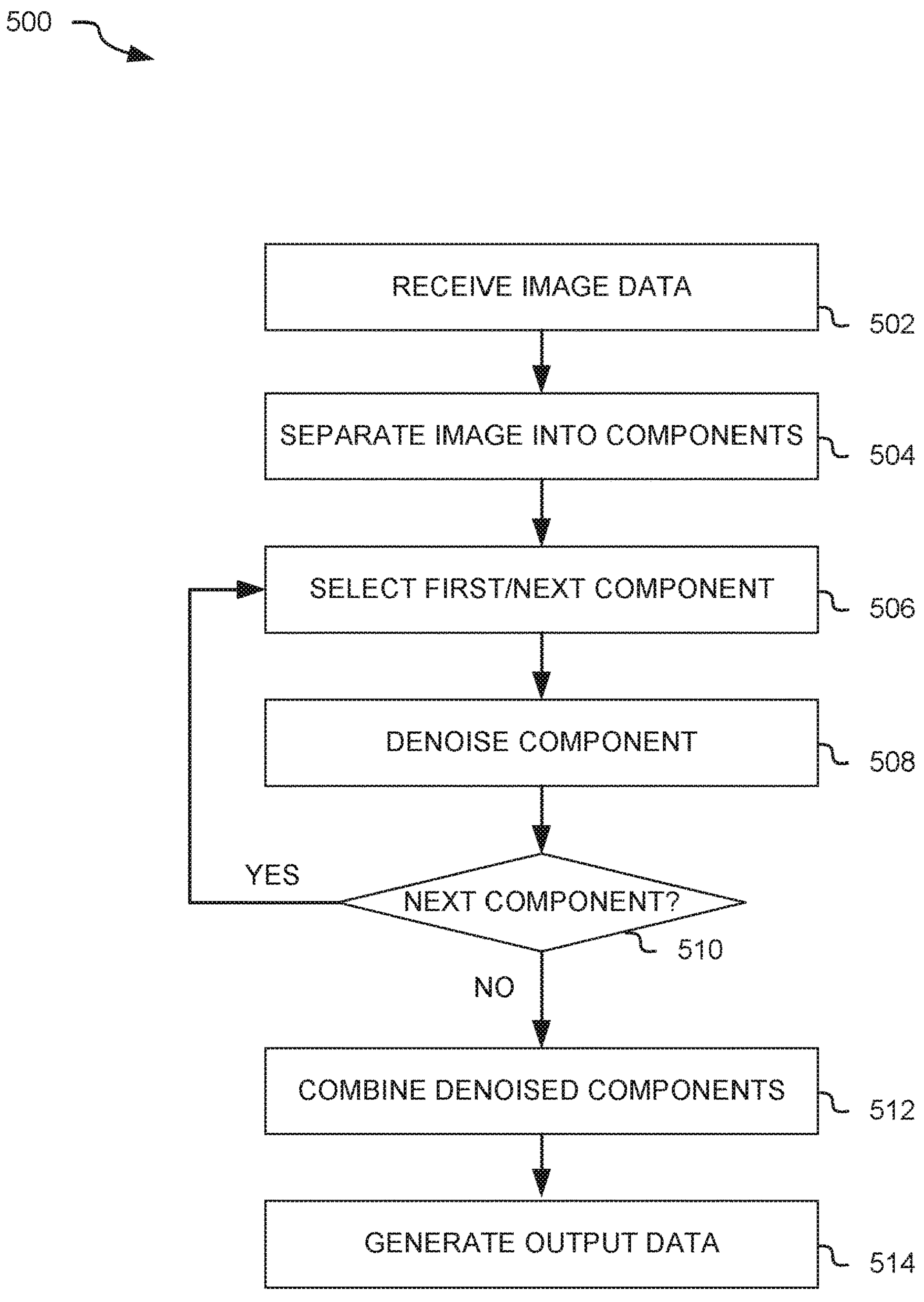
FIG. 5 is a block diagram illustrating a process to use a neural network to denoise components of an image, in accordance with at least one embodiment.

FIG. 5 is a block diagram 500 illustrating a process to use a neural network to denoise components of an image, in accordance with at least one embodiment. In at least one embodiment, some or all of said process to use a neural network to denoise components of an image illustrated in block diagram 500 (or any other processes described herein, or variations and/or combinations thereof) is performed under control of one or more computer systems, servers, processors, integrated circuits, and/or other such device as described in connection with FIGS. 34A-80, configured with computer-executable instructions and is implemented as code (e.g., computer-executable instructions, one or more computer programs, or one or more applications) executing collectively on one or more processors, by hardware, software, or combinations thereof. In at least one embodiment, said code is stored on a computer-readable storage medium in form of a computer program comprising a plurality of computer-readable instructions executable by one or more processors such as those described herein. In at least one embodiment, a computer-readable storage medium is a non-transitory computer-readable medium. In at least one embodiment, a processor such as processor 110, described herein at least in connection with FIG. 1, performs one or more steps of said process to use a neural network to denoise components of an image illustrated in block diagram 500. In at least one embodiment, one or more other processors such as those described herein perform one or more steps of a process to use a neural network to denoise components of an image illustrated in block diagram 500.

In at least one embodiment, at step 502 of said process to use a neural network to denoise components of an image illustrated in block diagram 500, a processor performing said process receives or is otherwise provided with image data. In at least one embodiment, at step 502, image data received comprises image data such as image data 624, described herein at least in connection with FIG. 6. In at least one embodiment, image data received at step 502 comprises one or more noisy images. In at least one embodiment, input data received at step 502 comprises one or more non-noise pixels (e.g., pixels of a noiseless region) and/or one or more noisy pixels (e.g., pixels of a noisy region). In at least one embodiment, image data received at step 502 comprises one or more additional items other image data such as those described herein. In at least one embodiment, after step 502, said process to use a neural network to denoise components of an image illustrated in block diagram 500 continues at step 504.

In at least one embodiment, at step 504 of said process to use a neural network to denoise components of an image illustrated in block diagram 500, a processor performing said process performs one or more operations to separate image data received at step 502 into one or more components. In at least one embodiment, at step 504, image data received at step 502 is separated into one or more components using a separator such as separator 406, described herein at least in connection with FIG. 4. In at least one embodiment, at step 504, image data received at step 502 is demodulated when separated into one or more components using a separator such as separator 406, as described herein at least in connection with FIG. 4. In at least one embodiment, at step 504, image data received at step 502 is separated into one or more components such as those described herein at least in connection with FIG. 6 (e.g., color data 602, motion data 604, depth data 606, etc.). In at least one embodiment, after step 504, said process to use a neural network to denoise components of an image illustrated in block diagram 500 continues at step 506.

In at least one embodiment, at step 506 of said process to use a neural network to denoise components of an image illustrated in block diagram 500, a processor performing said process performs one or more operations to select a first component of an image (e.g., received at step 502) separated at step 504. In at least one embodiment, at step 506, a first component selected (e.g., of components separated at step 504) is a noisy component such as those described herein. In at least one embodiment, at step 506, a first component selected (e.g., of components separated at step 504) is a component used to denoise a noisy component using systems, methods, techniques, and/or operations such as those described herein. In at least one embodiment, a component selected at step 506 is a component such as motion that is used to denoise a color component of image data. In at least one embodiment, after step 506, said process to use a neural network to denoise components of an image illustrated in block diagram 500 continues at step 508.

In at least one embodiment, at step 508 of said process to use a neural network to denoise components of an image illustrated in block diagram 500, a processor performing said process performs one or more operations to denoise a component selected at step 506 as described herein. In at least one embodiment, at step 508, a component selected at step 506 is denoised using a neural network such as neural network 112, described herein at least in connection with FIG. 1. In at least one embodiment, at step 508, a component selected at step 506 is a noisy component that is denoised. In at least one embodiment, at step 508, a component selected at step 506 is not a noisy component. In at least one embodiment, at step 508, a component selected at step 506 is used to denoise a component selected at a previous iteration of step 508 (e.g., a motion component used to denoise a noisy color component). In at least one embodiment, after step 508, said process to use a neural network to denoise components of an image illustrated in block diagram 500 continues at step 510.

In at least one embodiment, at step 510 of said process to use a neural network to denoise components of an image illustrated in block diagram 500, a processor performing said process performs one or more operations to determine whether a next component is to be selected to be denoised. In at least one embodiment, at step 510, it is determined whether a next component is to be selected to be denoised based, at least in part, on whether said component is a noisy component or a component used to denoise a noisy component. In at least one embodiment, at step 510, if it is determined that a next component is to be selected to be denoised ("YES" branch), process 500 continues at step 506 to select a next component. In at least one embodiment, at step 510, if it is determined that a next component is not to be selected to be denoised ("NO" branch), said process to use a neural network to denoise components of an image illustrated in block diagram 500 continues at step 512.

In at least one embodiment, at step 512 of said process to use a neural network to denoise components of an image illustrated in block diagram 500, a processor performing said process performs one or more operations to combine one or more components separated into components at step 504. In at least one embodiment, at step 512, one or more components separated into components at step 504 are combined using a combiner such as combiner 408, described herein at least in connection with FIG. 4. In at least one embodiment, at step 512, one or more components separated into components at step 504 are combined using one or more blending weights, as described herein. In at least one embodiment, at step 512, one or more components separated into components at step 504 are remodulated when combined using a combiner such as combiner 408, as described herein at least in connection with FIG. 4. In at least one embodiment, at step 512, one or more components separated into components at step 504 are combined using a combiner such as combiner 408, described herein at least in connection with FIG. 4. In at least one embodiment, after step 512, said process to use a neural network to denoise components of an image illustrated in block diagram 500 continues at step 514.

In at least one embodiment, at step 514 of said process to use a neural network to denoise components of an image illustrated in block diagram 500, a processor performing said process performs one or more operations to generate output data (e.g., by combining denoised components combined at step 512). In at least one embodiment, not shown in FIG. 5, at step 514, output data generated is provided to an image rendered such as image renderer 118, described herein at least in connection with FIG. 1. In at least one embodiment, after step 514, said process to use a neural network to denoise components of an image illustrated in block diagram 500 terminates. In at least one embodiment, not shown in FIG. 5, after step 514, said process to use a neural network to denoise components of an image illustrated in block diagram 500 continues at step 502 to receive more image data.

In at least one embodiment, operations of said process to use a neural network to denoise components of an image illustrated in block diagram 500 are performed in a different order than is illustrated in FIG. 5. In at least one embodiment, operations of said process to use a neural network to denoise components of an image illustrated in block diagram 500 are performed simultaneously or in parallel. In at least one embodiment, operations of said process to use a neural network to denoise components of an image illustrated in block diagram 500 that do not depend on each other (e.g., are order independent) are performed simultaneously or in parallel. In at least one embodiment, operations of said process to use a neural network to denoise components of an image illustrated in block diagram 500 are performed by a plurality of threads executing on a processor such as those described herein.

In at least one embodiment, one or more processors (e.g., processor 110 and/or other processors and/or accelerators such as those described herein) comprise one or more circuits to perform operations and/or instructions described herein in connection with FIG. 5, such as one or more circuits to cause one or more neural networks to cause one or more non-noise pixels to be identified and blended in parallel and/or otherwise perform operations described herein. In at least one embodiment, operations and/or instructions described herein in connection with FIG. 5 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 5 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 5, one or more operations described herein in connection with FIG. 5 are performed by one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 5, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 5 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 5 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 5, one or more operations described herein in connection with FIG. 5 are performed by one or more components described herein in connection with FIGS. 34A-80 to use one or more neural networks to adjust brightness of one or more pixels of one or more images prior to denoising the one or more images and/or otherwise perform operations described herein.

FIG. 6 is a block diagram 600 illustrating an image, including components to be denoised using a neural network performed by one or more processors, in accordance with at least one embodiment. In at least one embodiment, image data 624 comprises one or more components. In at least one embodiment, image data 624 is image data such as image data 104, described herein at least in connection with FIG. 1. In at least one embodiment, not shown in FIG. 6, image data 624 comprises noisy image frames such as noisy image frames 106, described herein at least in connection with FIG. 1. In at least one embodiment, not shown in FIG. 6, image data 624 comprises noisy image frames such as noisy image frames 106, described herein at least in connection with FIG. 1. In at least one embodiment, image data 624 is sent, indicated, or otherwise provided to a neural network 620 to be processed using systems, methods, techniques, and/or operations such as those described herein. In at least one embodiment, neural network 620 is a neural network such as neural network 112, described herein at least in connection with FIG. 1. In at least one embodiment, neural network 620 processes image data 624 to generate output data 622. In at least one embodiment, output data 622 is output data such as output data 114, described herein at least in connection with FIG. 1. In at least one embodiment, not shown in FIG. 6, output data 622 comprises one or more denoised image frames such as denoised image frames 116, described herein at least in connection with FIG. 1.

In at least one embodiment, image data 624 comprises color data 602. In at least one embodiment, color data 602 includes pixel color information of one or more pixels of an input image. In at least one embodiment, color data 602 is noisy (e.g., contains pixel color information of only a portion of pixels of an input image). In at least one embodiment, color data 602 is generated by a game engine such as game engine 102, described herein at least in connection with FIG. 1. In at least one embodiment, color data 602 is represented by an input image such as those described herein. In at least one embodiment, color data that is pixel color information of one or more pixels of an input image includes one or more color components (e.g., a red value, a green value, and a blue value) that encode pixel color information of one or more pixels of an input image.

In at least one embodiment, image data 624 comprises motion data 604. In at least one embodiment, motion data 604 includes one or more motion vectors of objects displayed in an input image. In at least one embodiment, motion data 604 includes one or more motion vectors of virtual cameras used to generate an input image. In at least one embodiment, motion data 604 is generated by a game engine such as game engine 102, described herein at least in connection with FIG. 1. In at least one embodiment, motion data 604 comprises synthetic motion (e.g., motion artificially generated). In at least one embodiment, motion data 604 comprises specular motion (e.g., motion of light effects and/or light sources).

In at least one embodiment, image data 624 comprises depth data 606. In at least one embodiment, depth data 606 is one or more values indicating depth (e.g., distance from a set location) of objects displayed in an input image. In at least one embodiment, depth data 606 is generated by a game engine such as game engine 102, described herein at least in connection with FIG. 1.

In at least one embodiment, image data 624 comprises normals 608. In at least one embodiment, normals 608 includes one or more vectors representing surface normals of objects displayed in an input image. In at least one embodiment, a surface normal is a 3-dimensional vector that is perpendicular to an object that is displayed in an input image. In at least one embodiment, normals 608 is used to calculate one or more lighting effects of lighting used in generating an input image. In at least one embodiment, normals 608 is generated by a game engine such as game engine 102, described herein at least in connection with FIG. 1.

In at least one embodiment, image data 624 comprises diffuse albedo data 610. In at least one embodiment, diffuse albedo data 610 is an albedo (e.g., a brightness) of a diffusion color (e.g., pixel color information) of one or more pixels of an input image. In at least one embodiment, diffuse albedo data 610 of a pixel is an average of red, green, and blue ("RGB") color values of a pixel. In at least one embodiment, if a pixel has a diffusion color value of (100, 200, 0), diffuse albedo data 610 of said pixel is 100 (e.g., an average value of RGB values of said pixel). In at least one embodiment, diffuse albedo data 610 of a pixel is a maximum value of RGB color values of a pixel. In at least one embodiment, if a pixel has a diffusion color value of (100, 200, 0), diffuse albedo data 610 of said pixel is 200 (e.g., a maximum value of RGB values of said pixel). In at least one embodiment, diffuse albedo data 610 of a pixel is based on one or more other calculations, computations, etc.

In at least one embodiment, image data 624 comprises specular albedo data 612. In at least one embodiment, specular albedo data 612 is an albedo (e.g., a brightness) of a specular color (e.g., pixel color information) of one or more pixels of an input image. In at least one embodiment, specular albedo data 612 of a pixel is an average of RGB color values of a pixel. In at least one embodiment, if a pixel has a specular color value of (100, 200, 0), specular albedo data 612 of said pixel is 100 (e.g., an average value of RGB values of said pixel). In at least one embodiment, specular albedo data 612 of a pixel is a maximum value of RGB color values of a pixel. In at least one embodiment, if a pixel has a specular color value of (100, 200, 0), specular albedo data 612 of said pixel is 200 (e.g., a maximum value of RGB values of said pixel). In at least one embodiment, specular albedo data 612 of a pixel is based on one or more other calculations, computations, etc.

In at least one embodiment, image data 624 comprises roughness data 614. In at least one embodiment, roughness data 614 includes one or more values or vectors representing perturbations or alterations of surface normals of objects displayed in an input image (e.g., as described above). In at least one embodiment, roughness data 614 is used to calculate one or more lighting effects of lighting used in generating an input image. In at least one embodiment, roughness data 614 is generated by a game engine such as game engine 102, described herein at least in connection with FIG. 1.

In at least one embodiment, image data 624 comprises particles, fog, and/or transparency 616. In at least one embodiment, particles, fog, and/or transparency 616 are objects within a scene (e.g., used to generate an input image) that are small and/or partially transparent. In at least one embodiment, particles, fog, and/or transparency 616 includes flames represented by particle systems (e.g., small moving objects with one or more color components), smoke effects from said flames (e.g., fog), and one or more transparent or partially transparent objects (e.g., windows, etc.). In at least one embodiment, particles, fog, and/or transparency 616 is generated by a game engine such as game engine 102, described herein at least in connection with FIG. 1.

In at least one embodiment, image data 624 comprises other image data 618. In at least one embodiment, other image data 618 includes one or more additional image data types including combinations of those described above. In at least one embodiment, other image data 618 includes emissive data, which includes color and/or brightness of one or more light sources used to illuminate one or more objects that are displayed in an input image. In at least one embodiment, a fire described above in connection with particles, fog, and/or transparency 616 includes emissive data that provides emissive lighting from said fire that illuminates objects in a scene that are displayed in an input image. In at least one embodiment, other image data 618 is generated by a game engine such as game engine 102, described herein at least in connection with FIG. 1.

In at least one embodiment, one or more processors (e.g., processor 110 and/or other processors and/or accelerators such as those described herein) comprise one or more circuits to perform operations and/or instructions described herein in connection with FIG. 6, such as one or more circuits to cause one or more neural networks to cause one or more non-noise pixels to be identified and blended in parallel and/or otherwise perform operations described herein. In at least one embodiment, operations and/or instructions described herein in connection with FIG. 6 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 6 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 6, one or more components described herein in connection with FIG. 6 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 6, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 6 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 6 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 6, one or more components described herein in connection with FIG. 6 include one or more components described herein in connection with FIGS. 34A-80 to use one or more neural networks to adjust brightness of one or more pixels of one or more images prior to denoising the one or more images and/or otherwise perform operations described herein.

Figure 7:
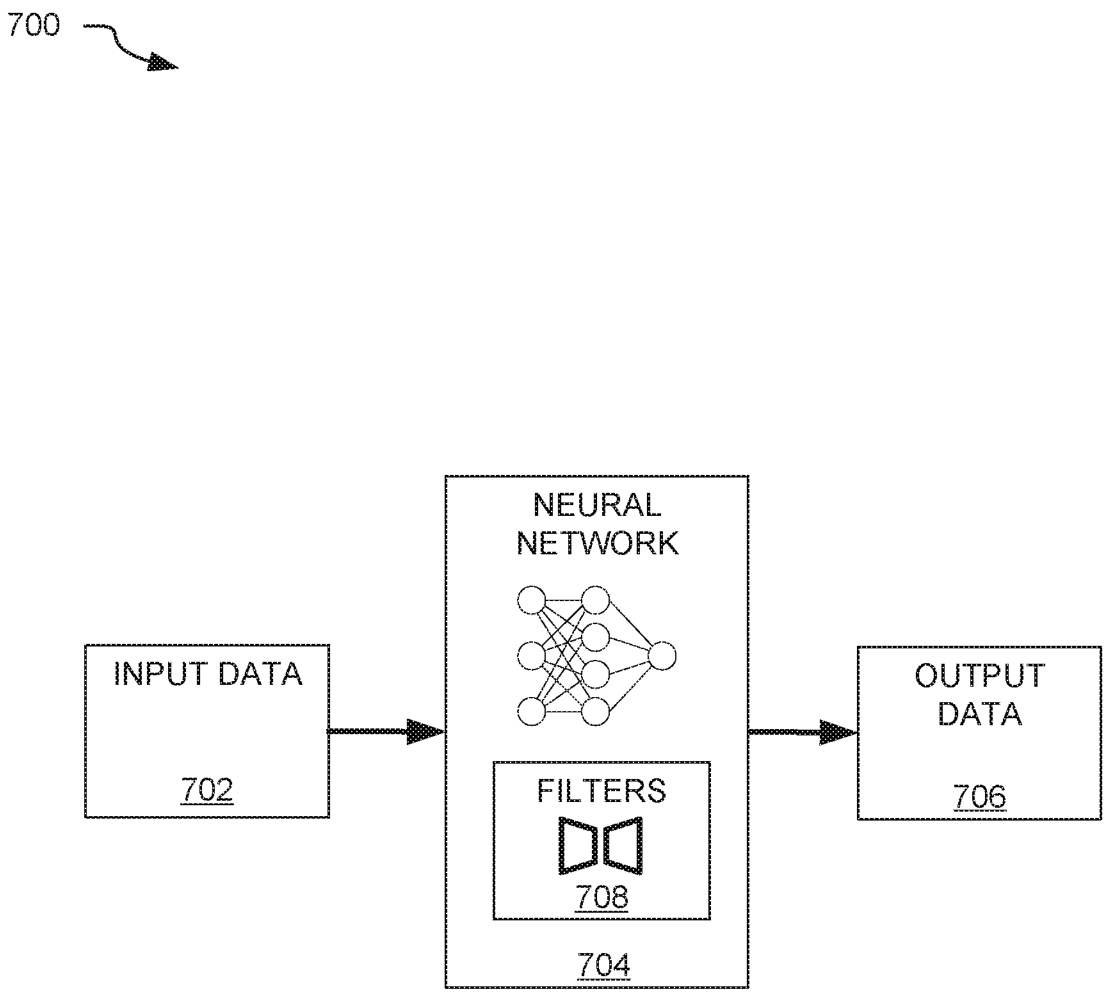
FIG. 7 is a block diagram illustrating a neural network to denoise an image using one or more filters, in accordance with at least one embodiment.

FIG. 7 is a block diagram 700 illustrating a neural network to denoise an image using one or more filters, in accordance with at least one embodiment. In at least one embodiment, input data 702 is sent, indicated, or otherwise provided to a neural network 704. In at least one embodiment, input data 702 is input data such as image data 104, described herein at least in connection with FIG. 1. In at least one embodiment, neural network 704 is a neural network such as neural network 112, described herein at least in connection with FIG. 1. In at least one embodiment, neural network 704 performs one or more operations such as those described herein to generate output data 706. In at least one embodiment, output data 706 is output data such as output data 114, as described herein at least in connection with FIG. 1. In at least one embodiment, not shown in FIG. 7, input data 702 includes one or more noisy image frames. In at least one embodiment, not shown in FIG. 7, output data 706 includes one or more denoised image frames.

In at least one embodiment, not shown in FIG. 7, a denoiser such as those described herein comprises neural network 704 and uses said neural network to denoise an image using one or more filters. In at least one embodiment, not shown in FIG. 7, an image reconstructor such as those described herein comprises neural network 704 and uses said neural network to reconstruct an image using one or more filters. In at least one embodiment, not shown in FIG. 7, an image upsampler such as those described herein comprises neural network 704 and uses said neural network to upsample an image using one or more filters. In at least one embodiment, not shown in FIG. 7, an image downsampler such as those described herein comprises neural network 704 and uses said neural network to downsample an image using one or more filters. In at least one embodiment, not shown in FIG. 7, frame interpolator such as those described herein comprises neural network 704 and uses said neural network to interpolate frames using one or more filters.

In at least one embodiment, neural network 704 includes or otherwise implements one or more filters 708 to denoise one or more noisy images. In at least one embodiment, filters 708 includes one or more hierarchical kernel prediction networks (HKPN) filters, spatio-temporal variance guided filters (SVGF), real-time denoisers (e.g., ReBLUR, which is based on recurrent blurring), and/or ReLAX (e.g., spatiotemporal variance guided filtering) as a series of heuristic-based denoisers that can denoise images. In at least one embodiment, filters 708 includes one or more guided blurring kernels, blue noise filters (and/or other specific frequency filters), irradiance caches, neural radiance fields (NeRFs), Adaptive Spatio-Temporal Variance Guided Filtering (A-SVGF), and/or Spatiotemporal Importance Resampling for Many-Light Ray Tracing (ReSTIR). In at least one embodiment, filters 708 include one or more filters such as those described herein at least in connection with FIGS. 15-20.

In at least one embodiment, one or more processors (e.g., processor 110 and/or other processors and/or accelerators such as those described herein) comprise one or more circuits to perform operations and/or instructions described herein in connection with FIG. 7, such as one or more circuits to cause one or more neural networks to cause one or more non-noise pixels to be identified and blended in parallel and/or otherwise perform operations described herein. In at least one embodiment, operations and/or instructions described herein in connection with FIG. 7 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 7 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 7, one or more components described herein in connection with FIG. 7 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 7, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 7 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 7 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 7, one or more components described herein in connection with FIG. 7 include one or more components described herein in connection with FIGS. 34A-80 to use one or more neural networks to adjust brightness of one or more pixels of one or more images prior to denoising the one or more images and/or otherwise perform operations described herein.

Figure 8:
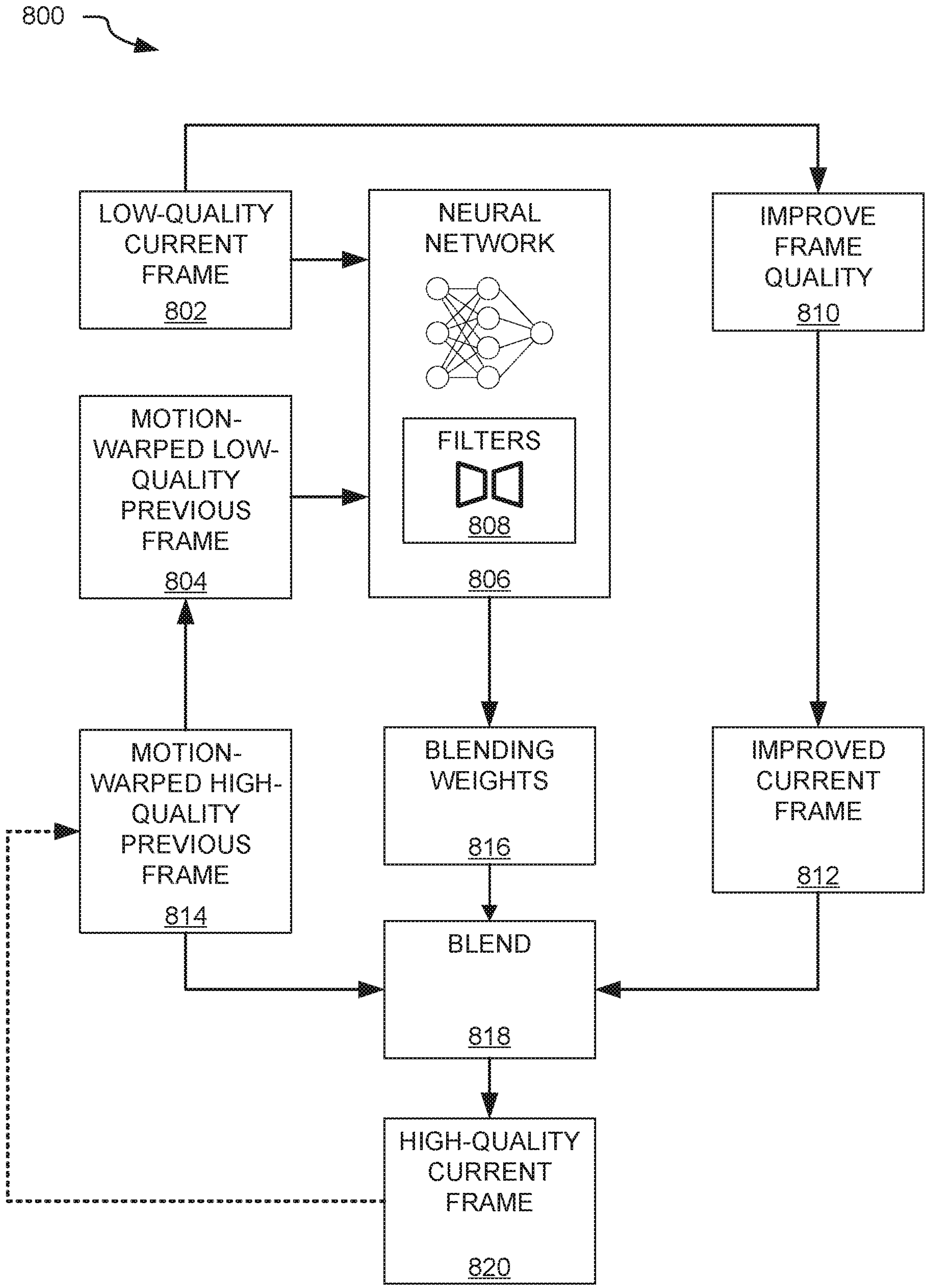
FIG. 8 is a block diagram illustrating using a neural network to generate blending weights, in accordance with at least one embodiment.

FIG. 8 is a block diagram 800 illustrating using a neural network to generate blending weights, in accordance with at least one embodiment. In at least one embodiment, a low-quality current frame 802 is sent or otherwise provided to a neural network 806 with one or more filters 808. In at least one embodiment, low-quality current frame 802 is a low-quality frame such as those described herein. In at least one embodiment, neural network 806 with filters 808 is a neural network such as neural network 704 with filters 708, described herein at least in connection with FIG. 7. In at least one embodiment, filters 808 are filters such as those described herein at least in connection with FIGS. 15-20. In at least one embodiment, a motion-warped low-quality previous frame is sent or otherwise provided to neural network 806 with filters 808. In at least one embodiment, motion-warped low-quality previous frame 804 is a low-quality version (e.g., a downsampled, jittered, and/or noised version) of a motion-warped high-quality previous frame 814, described below.

In at least one embodiment, neural network 806 with filters 808 generates blending weights 816 using systems, methods, operations, and/or instructions described herein. In at least one embodiment, blending weights 816 are used to blend 818 a motion-warped high-quality previous frame 814 with an improved current frame 812 to generate a high-quality current frame 820 (e.g., an output frame), as described herein. In at least one embodiment, improved current frame 812 is generated from low-quality current frame 802 using one or more operations to improve frame quality 810. In at least one embodiment, one or more operations to improve frame quality 810 comprise one or more operations to upsample, unjitter, and/or denoise low-quality current frame 802 to generate improved current frame 812. In at least one embodiment, motion-warped high-quality previous frame 814 is a motion-warped version of a high-quality current frame from a previous iteration of using a neural network to generate blending weights illustrated in block diagram 800.

In at least one embodiment, one or more processors (e.g., processor 110 and/or other processors and/or accelerators such as those described herein) comprise one or more circuits to perform operations and/or instructions described herein in connection with FIG. 8, such as one or more circuits to cause one or more neural networks to cause one or more non-noise pixels to be identified and blended in parallel and/or otherwise perform operations described herein. In at least one embodiment, operations and/or instructions described herein in connection with FIG. 8 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 8 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 8, one or more components described herein in connection with FIG. 8 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 8, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 8 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 8 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 8, one or more components described herein in connection with FIG. 8 include one or more components described herein in connection with FIGS. 34A-80 to use one or more neural networks to adjust brightness of one or more pixels of one or more images prior to denoising the one or more images and/or otherwise perform operations described herein.

Figure 9:
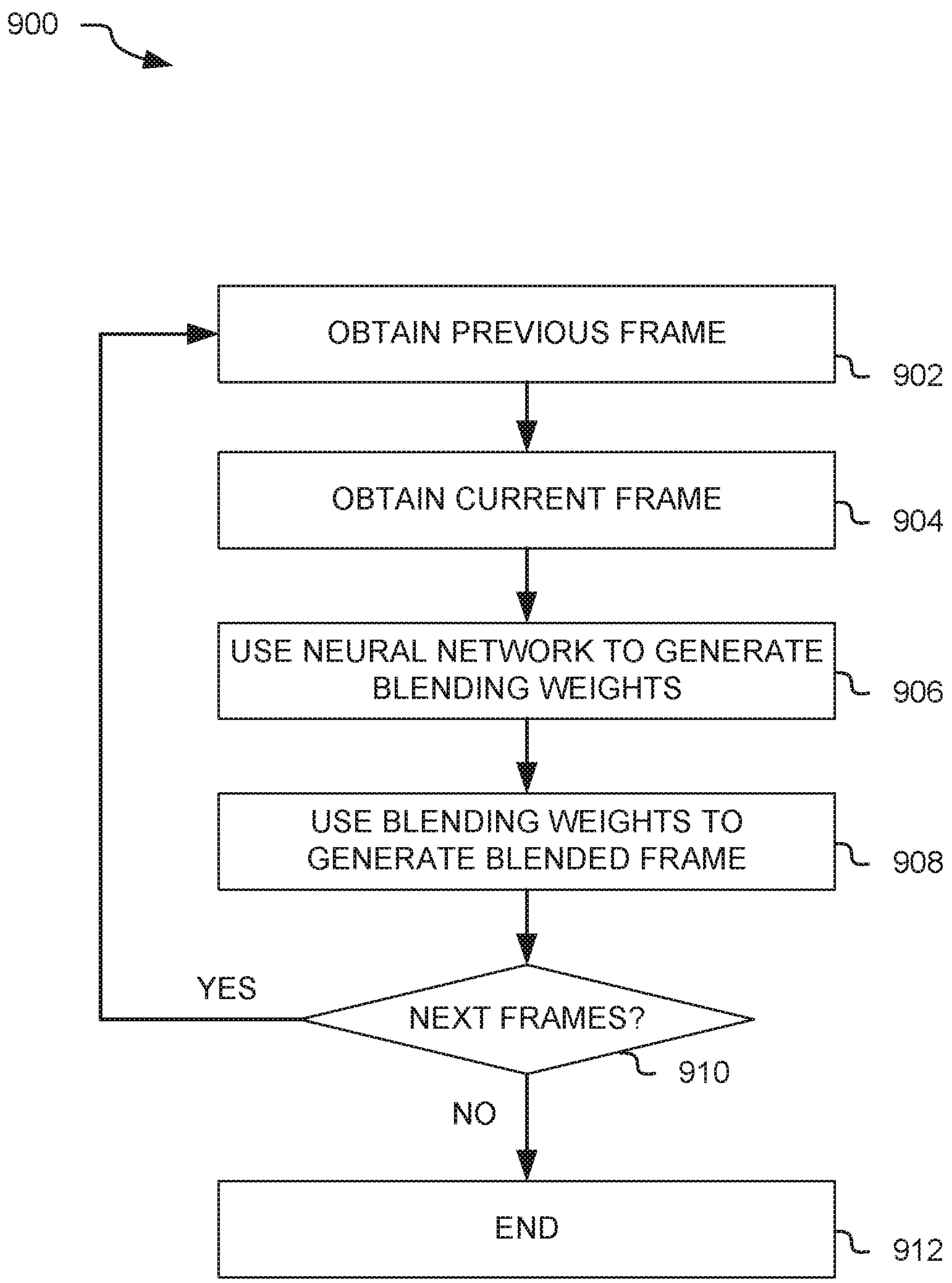
FIG. 9 is a block diagram illustrating a process to use a neural network to generate blending weights, in accordance with at least one embodiment.

FIG. 9 is a block diagram 900 illustrating a process to use a neural network to generate blending weights, in accordance with at least one embodiment. In at least one embodiment, some or all of said process to use a neural network to generate blending weights illustrated in block diagram 900 (or any other processes described herein, or variations and/or combinations thereof) is performed under control of one or more computer systems, servers, processors, integrated circuits, and/or other such device as described in connection with FIGS. 34A-80, configured with computer-executable instructions and is implemented as code (e.g., computer-executable instructions, one or more computer programs, or one or more applications) executing collectively on one or more processors, by hardware, software, or combinations thereof. In at least one embodiment, said code is stored on a computer-readable storage medium in form of a computer program comprising a plurality of computer-readable instructions executable by one or more processors such as those described herein. In at least one embodiment, a computer-readable storage medium is a non-transitory computer-readable medium. In at least one embodiment, a processor such as processor 110, described herein at least in connection with FIG. 1, performs one or more steps of said process to use a neural network to generate blending weights illustrated in block diagram 900. In at least one embodiment, one or more other processors such as those described herein perform one or more steps of said process to use a neural network to generate blending weights illustrated in block diagram 900.

In at least one embodiment, at step 902 of said process to use a neural network to generate blending weights illustrated in block diagram 900, a processor performing said process obtains or otherwise is provided with a previous frame. In at least one embodiment, at step 902, a previous frame obtained is a motion warped previous frame (e.g., as described herein at least in connection with FIG. 8). In at least one embodiment, at step 902, a previous frame obtained is a high-quality previous frame (e.g., generated by a previous iteration of said process to use a neural network to generate blending weights illustrated in block diagram 900, as described herein). In at least one embodiment, at step 902, a previous frame obtained is a low-quality previous frame (e.g., is a downsampled version of a high-quality previous frame). In at least one embodiment, after step 902, said process to use a neural network to generate blending weights illustrated in block diagram 900 continues at step 904.

In at least one embodiment, at step 904 of said process to use a neural network to generate blending weights illustrated in block diagram 900, a processor performing said process obtains or otherwise is provided with a current frame. In at least one embodiment, at step 904, a current frame obtained is a low-quality current frame (e.g., as described herein at least in connection with FIG. 8). In at least one embodiment, after step 904, said process to use a neural network to generate blending weights illustrated in block diagram 900 continues at step 906.

In at least one embodiment, at step 906 of said process to use a neural network to generate blending weights illustrated in block diagram 900, a processor performing said process performs one or more operations to use a neural network (e.g., as described herein) to use a previous frame (e.g., obtained at step 902) and a current frame (e.g., obtained at step 904) to generate blending weights, using systems, methods, operations, and/or instructions described herein. In at least one embodiment, at step 906, a processor uses a neural network to use a previous frame and a current frame to generate blending weights as described herein at least in connection with FIG. 8. In at least one embodiment, a previous frame and a current frame are used by a neural network to generate blending weights using one or more filters such as those described herein at least in connection with FIGS. 15-20. In at least one embodiment, after step 906, said process to use a neural network to generate blending weights illustrated in block diagram 900 continues at step 908.

In at least one embodiment, at step 908 of said process to use a neural network to generate blending weights illustrated in block diagram 900, a processor performing said process performs one or more operations to use blending weights (e.g., generated at step 906) to generate one or more blended frames, as described herein at least in connection with FIG. 8. In at least one embodiment, at step 908, blending weights are used to generate a blended frame are used by a neural network using one or more filters such as those described herein at least in connection with FIGS. 15-20. In at least one embodiment, after step 908, said process to use a neural network to generate blending weights illustrated in block diagram 900 continues at step 910.

In at least one embodiment, at step 910 of said process to use a neural network to generate blending weights illustrated in block diagram 900, a processor performing said process performs one or more operations to determine whether to process a next set of frames. In at least one embodiment, at step 910, a next set of frames includes a new current frame and a previous frame that is generated using a result of uses blending weights to blend images (e.g., using a blended frame generated at step 908. In at least one embodiment, at step 910, if it is determined that a new set of frames is to be processed ("YES" branch), said process to use a neural network to generate blending weights illustrated in block diagram 900 continues at step 902 to obtain a next previous frame. In at least one embodiment, not shown in FIG. 9, at step 910, if it is determined that a new set of frames is to be processed ("YES" branch), said process to use a neural network to generate blending weights illustrated in block diagram 900 continues at step 904 to obtain a next current frame, using blended image generated at step 908 as a next previous frame, as described herein. In at least one embodiment, at step 910, if it is determined that a new set of frames is not to be processed ("NO" branch), said process to use a neural network to generate blending weights illustrated in block diagram 900 continues at step 912.

In at least one embodiment, at step 912, said process to use a neural network to generate blending weights illustrated in block diagram 900 terminates. In at least one embodiment, not shown in FIG. 9, after step 912, said process to use a neural network to generate blending weights illustrated in block diagram 900 continues at step 902 to obtain a new previous frame.

In at least one embodiment, operations of said process to use a neural network to generate blending weights illustrated in block diagram 900 (e.g., steps 902 and 904) are performed in a different order than is illustrated in FIG. 9. In at least one embodiment, operations of said process to use a neural network to generate blending weights illustrated in block diagram 900 (e.g., steps 902 and 904) are performed simultaneously or in parallel. In at least one embodiment, operations of said process to use a neural network to generate blending weights illustrated in block diagram 900 that do not depend on each other (e.g., are order independent) are performed simultaneously or in parallel. In at least one embodiment, operations of said process to use a neural network to generate blending weights illustrated in block diagram 900 are performed by a plurality of threads executing on a processor such as those described herein.

In at least one embodiment, one or more processors (e.g., processor 110 and/or other processors and/or accelerators such as those described herein) comprise one or more circuits to perform operations and/or instructions described herein in connection with FIG. 9, such as one or more circuits to cause one or more neural networks to cause one or more non-noise pixels to be identified and blended in parallel and/or otherwise perform operations described herein. In at least one embodiment, operations and/or instructions described herein in connection with FIG. 9 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 9 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 9, one or more components described herein in connection with FIG. 9 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 9, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 9 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 9 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 9, one or more components described herein in connection with FIG. 9 include one or more components described herein in connection with FIGS. 34A-80 to use one or more neural networks to adjust brightness of one or more pixels of one or more images prior to denoising the one or more images and/or otherwise perform operations described herein.

Figure 10:
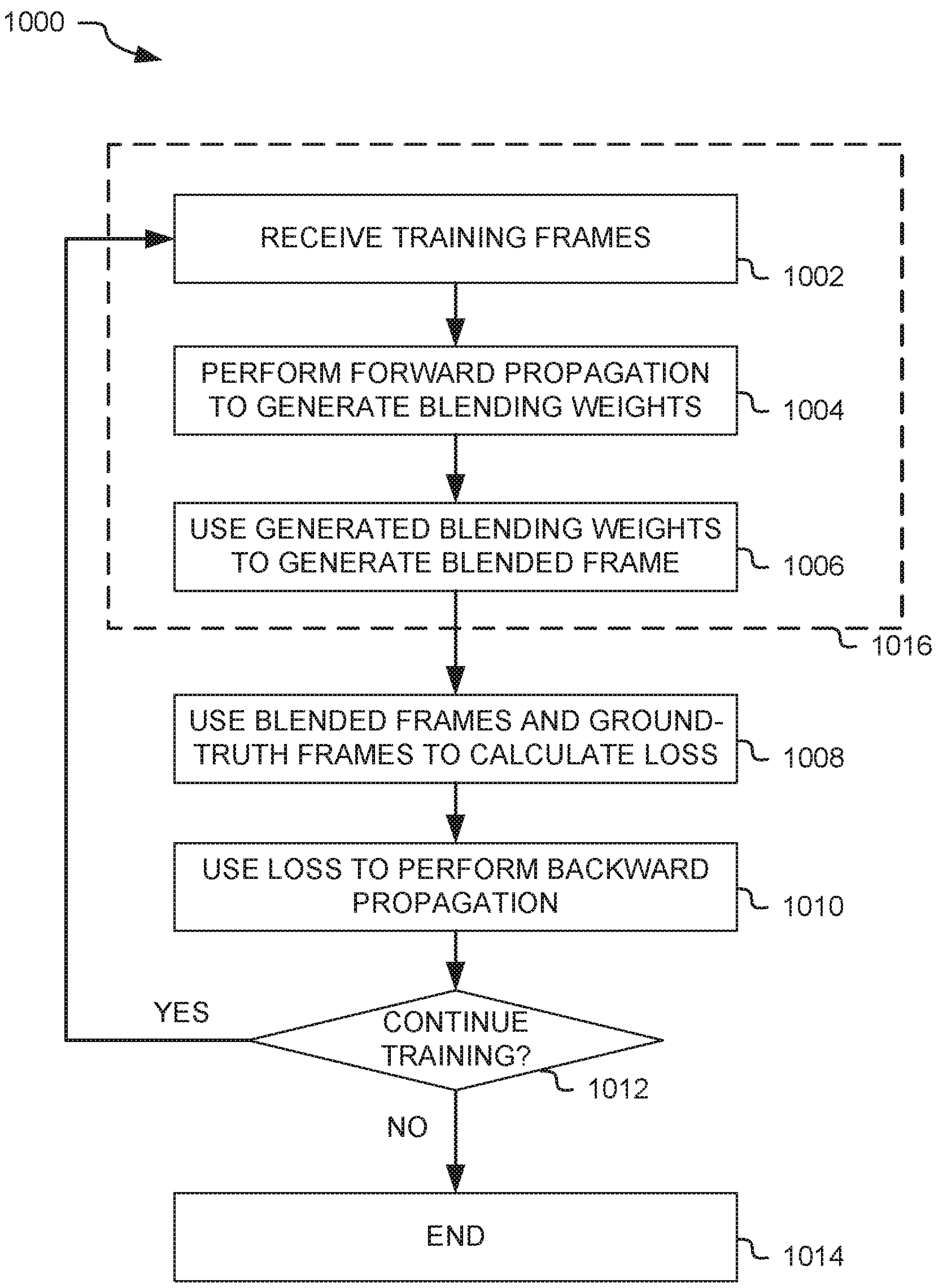
FIG. 10 is a block diagram illustrating a process to train a neural network to generate blending weights, in accordance with at least one embodiment.

FIG. 10 is a block diagram 1000 illustrating a process to train a neural network to generate blending weights, in accordance with at least one embodiment. In at least one embodiment, some or all of said process to train a neural network to generate blending weights illustrated in block diagram 1000 (or any other processes described herein, or variations and/or combinations thereof) is performed under control of one or more computer systems, servers, processors, integrated circuits, and/or other such device as described in connection with FIGS. 34A-80, configured with computer-executable instructions and is implemented as code (e.g., computer-executable instructions, one or more computer programs, or one or more applications) executing collectively on one or more processors, by hardware, software, or combinations thereof. In at least one embodiment, said code is stored on a computer-readable storage medium in form of a computer program comprising a plurality of computer-readable instructions executable by one or more processors such as those described herein. In at least one embodiment, a computer-readable storage medium is a non-transitory computer-readable medium. In at least one embodiment, a processor such as processor 110, described herein at least in connection with FIG. 1, performs one or more steps of said process to train a neural network to generate blending weights illustrated in block diagram 1000. In at least one embodiment, one or more other processors such as those described herein perform one or more steps of said process to train a neural network to generate blending weights illustrated in block diagram 1000.

In at least one embodiment, at step 1002 of said process to train a neural network to generate blending weights illustrated in block diagram 1000, a processor performing said process receives or is otherwise provided with one or more training frames. In at least one embodiment, at step 1002, received training frames comprise a low-quality current frame (e.g., as described herein at least in connection with FIG. 8). In at least one embodiment, at step 1002, received training frames comprise a low-quality motion warped previous frame (e.g., also as described herein at least in connection with FIG. 8). In at least one embodiment, at step 1002, received training frames comprise a low-quality motion warped previous frame that is a jittered and/or downsampled version of a high-quality motion warped previous frame. In at least one embodiment, at step 1002, received training frames comprise a low-quality motion warped previous frame that is a motion warped version of a previous frame. In at least one embodiment, at step 1002, received training frames comprise a ground truth frame (e.g., an unmodified, high-quality version of a current frame) used at step 1008, described below. In at least one embodiment, at step 1002, received training frames comprise one or more other frames including, but not limited to, frames generated by synthetic motion, frames generated based on specular motion, frames obtained from a game engine such as game engine 102, described herein at least in connection with FIG. 1, frames generated using image data such as image data 624, described herein at least in connection with FIG. 6, or other such other frames. In at least one embodiment, after step 1002, said process to train a neural network to generate blending weights illustrated in block diagram 1000 continues at step 1004.

In at least one embodiment, at step 1004 of said process to train a neural network to generate blending weights illustrated in block diagram 1000, a processor performing said process performs one or more forward propagation steps of a neural network to generate blending weights. In at least one embodiment, at step 1004, said processor performs one or more forward propagation steps of a neural network to generate blending weights using systems, methods, operations, and/or instructions such as those described herein. In at least one embodiment, at step 1004, said processor performs one or more forward propagation steps to generate blending weights using one or more filters such as those described herein at least in connection with FIGS. 15-20. In at least one embodiment, after step 1004, said process to train a neural network to generate blending weights illustrated in block diagram 1000 continues at step 1006.

In at least one embodiment, at step 1006 of said process to train a neural network to generate blending weights illustrated in block diagram 1000, a processor performing said process performs one or more operations to use blending weights (e.g., generated at step 1004) to generate one or more blended frames, as described herein. In at least one embodiment, at step 1006, blending weights used to generate one or more blended frames are used to blend one or more of training frames received at step 1002. In at least one embodiment, after step 1006, said process to train a neural network to generate blending weights illustrated in block diagram 1000 continues at step 1008.

In at least one embodiment, step 1002, step 1004, and/or step 1006 of process to train a neural network to generate blending weights illustrated in block diagram 1000, are performed by a processor performing said process in a batch 1016. In at least one embodiment, one or more items of training data in a batch (e.g., training frames received at step 1002 including one or more of a current frame, a previous frame, and/or a ground-truth blended frame) are used to perform step 1002, step 1004, and/or step 1006 of process to train a neural network to generate blending weights illustrated in block diagram 1000.

In at least one embodiment, at step 1008 of said process to train a neural network to generate blending weights illustrated in block diagram 1000, a processor performing said process performs one or more operations to use a blended frame (e.g., generated at step 1006) and a ground truth frame (e.g., received at step 1002) to calculate loss (also referred to herein as frame loss). In at least one embodiment, a blended frame is upsampled (e.g., as described herein) to a higher resolution before being used to calculate loss. In at least one embodiment, a blended frame is unjittered (e.g., as described herein) before being used to calculate loss. In at least one embodiment, a blended frame is denoised (e.g., as described herein) before being used to calculate loss. In at least one embodiment, a blended frame is otherwise processed before being used to calculate loss.

In at least one embodiment, at step 1008, loss is calculated based, at least in part, on comparing a blended frame (e.g., generated at step 1006) to a ground truth frame (e.g., received at step 1002). In at least one embodiment, at step 1008, loss is calculated based, at least in part, on a pixel-by-pixel comparison of a blended frame with a ground truth frame. In at least one embodiment, at step 1008, loss is calculated based, at least in part, on one or more similarity metrics between a blended frame and a ground truth frame. In at least one embodiment, at step 1008, loss calculated based, at least in part, on a loss function (also referred to herein as a cost function or error function) that is a measure of loss associated with a prediction (e.g., a blended frame) and a ground truth frame. In at least one embodiment, training a neural network performs one or more operations to minimize said loss function. In at least one embodiment, a loss function (or cost function or error function) comprises one or more of mean squared error ("MSE"), mean absolute error ("MAE"), cross-entropy loss ("CEL") (e.g., log loss), binary cross entropy loss (e.g., a type of CEL), category cross entropy loss (e.g., another type of CEL), hinge loss, Huber loss, or one or more custom loss functions that are based, at least in part, on inputs and outputs of a neural network. In at least one embodiment, at step 1008, a plurality of blended frames (e.g., generated at step 1006) are compared to a single ground truth frame (e.g., received at step 1002), to calculate loss. In at least one embodiment, at step 1008, a blended frame (e.g., generated at step 1006) is compared to a plurality of ground truth frames (e.g., received at step 1002), to calculate loss. In at least one embodiment, after step 1008, said process to train a neural network to generate blending weights illustrated in block diagram 1000 continues at step 1010.

In at least one embodiment, at step 1010 of said process to train a neural network to generate blending weights illustrated in block diagram 1000, a processor performing said process performs one or more operations to use loss (e.g., calculated at step 1008) to perform one or more backward propagation steps to adjust weights of said neural network so as to minimize said loss, as described herein. In at least one embodiment, after step 1010, said process to train a neural network to generate blending weights illustrated in block diagram 1000 continues at step 1012.

In at least one embodiment, at step 1012 of said process to train a neural network to generate blending weights illustrated in block diagram 1000, a processor performing said process performs one or more operations to determine whether to continue training said neural network. In at least one embodiment, at step 1012, said processor determines whether to continue training said neural network (e.g., to continue performing steps 1002-1010) based on one or more parameters and/or hyperparameters of said neural network. For example, at step 1012, it may be determined to continue training said neural network until loss (e.g., calculated at step 1008) falls below a determined threshold (e.g., when said neural network produces sufficiently accurate blended frames (e.g., generated at step 1006) as compared to a ground truth frame (e.g., received at step 1002). In at least one embodiment, at step 1012, if it is determined to continue neural network training ("YES" branch), said process to train a neural network to generate blending weights illustrated in block diagram 1000 continues at step 1002 to receive additional training frames. In at least one embodiment, not shown in FIG. 10, at step 1012, if it is determined to continue neural network training ("YES" branch), said process to train a neural network to generate blending weights illustrated in block diagram 1000 continues at step 1004, using previously received training frames to perform additional iterations of steps 1004-1010. In at least one embodiment, at step 1012, if it is determined to not continue neural network training ("NO" branch), said process to train a neural network to generate blending weights illustrated in block diagram 1000 continues at step 1014.

In at least one embodiment, at step 1014, said process to train a neural network to generate blending weights illustrated in block diagram 1000 terminates. In at least one embodiment, not shown in FIG. 10, after step 1014, said process to train a neural network to generate blending weights illustrated in block diagram 1000 continues at step 1002 to receive additional training frames.

In at least one embodiment, operations of said process to train a neural network to generate blending weights illustrated in block diagram 1000 are performed in a different order than is illustrated in FIG. 10. In at least one embodiment, operations of said process to train a neural network to generate blending weights illustrated in block diagram 1000 are performed simultaneously or in parallel. In at least one embodiment, operations of said process to train a neural network to generate blending weights illustrated in block diagram 1000 that do not depend on each other (e.g., are order independent) are performed simultaneously or in parallel. In at least one embodiment, operations of said process to train a neural network to generate blending weights illustrated in block diagram 1000 are performed by a plurality of threads executing on a processor such as those described herein.

In at least one embodiment, one or more processors (e.g., processor 110 and/or other processors and/or accelerators such as those described herein) comprise one or more circuits to perform operations and/or instructions described herein in connection with FIG. 10, such as one or more circuits to cause one or more neural networks to cause one or more non-noise pixels to be identified and blended in parallel and/or otherwise perform operations described herein. In at least one embodiment, operations and/or instructions described herein in connection with FIG. 10 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 10 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 10, one or more components described herein in connection with FIG. 10 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 10, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 10 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 10 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 10, one or more components described herein in connection with FIG. 10 include one or more components described herein in connection with FIGS. 34A-80 to use one or more neural networks to adjust brightness of one or more pixels of one or more images prior to denoising the one or more images and/or otherwise perform operations described herein.

Figure 11:
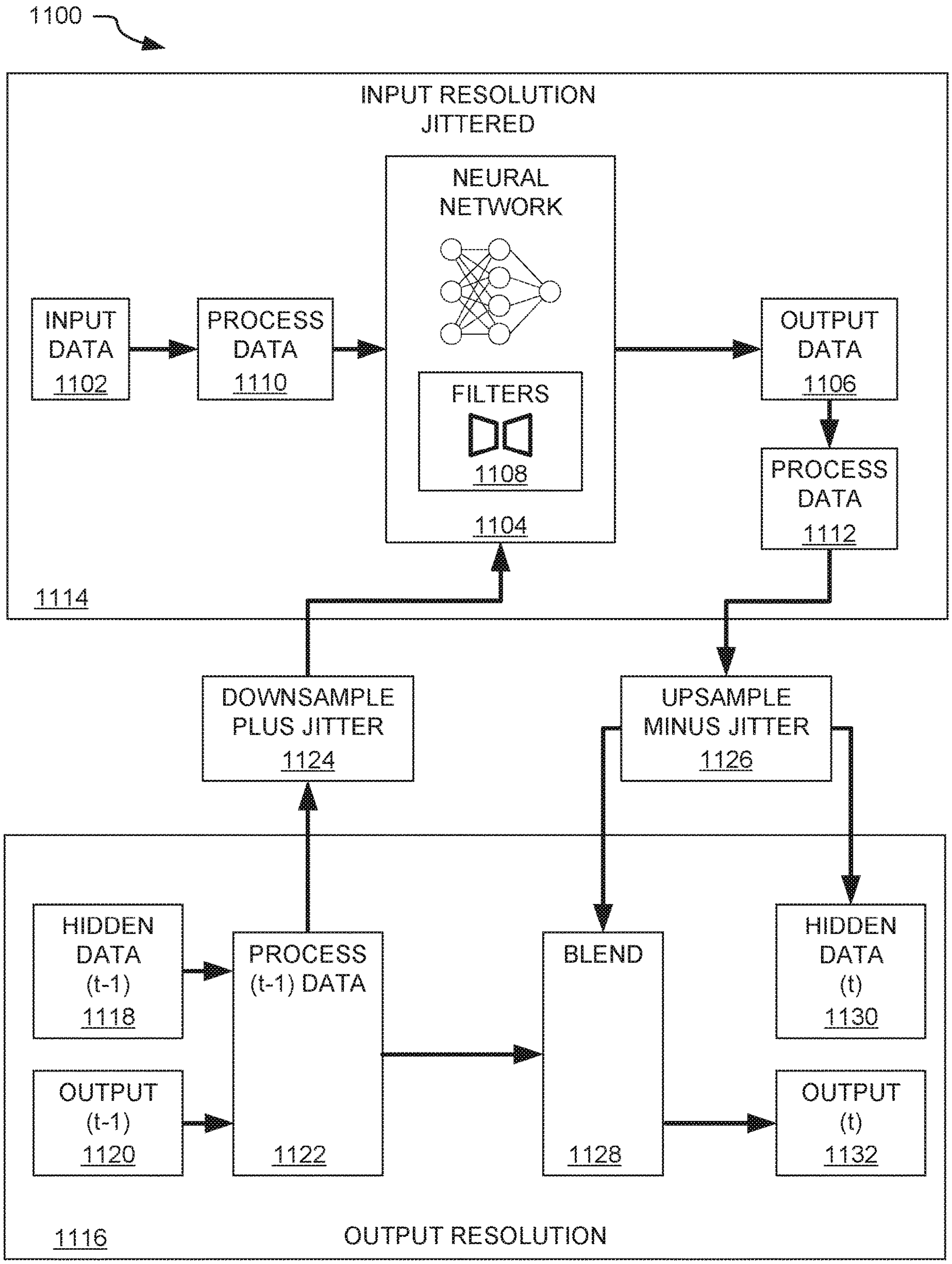
FIG. 11 is a block diagram illustrating denoising an image using a neural network, in accordance with at least one embodiment.

FIG. 11 is a block diagram 1100 illustrating denoising an image using a neural network, in accordance with at least one embodiment. In at least one embodiment, input data 1102 (which is input data such as input data 302, described herein at least in connection with FIG. 3, is processed (e.g., using process data 1110) before being sent or otherwise provided to neural network 1104. In at least one embodiment, process data 1110 performs one or more image processing techniques including, but not limited to, those described herein before said processed images are sent or otherwise provided to neural network 1104. In at least one embodiment, neural network 1104 is a neural network such as neural network 704, described herein at least in connection with FIG. 7. In at least one embodiment, neural network 1104 performs one or more operations to denoise images, reconstruct images, upsample images, downsample images, interpolate frames, and/or other such operations including, but not limited to, those described herein. In at least one embodiment, neural network 1104 includes one or more filters 1108. In at least one embodiment, filters 1108 includes one or more filters such as filters 708, described herein at least in connection with FIG. 7. In at least one embodiment, filters 1108 includes one or more filters such as those described herein at least in connection with FIGS. 7-20. In at least one embodiment, neural network 1104 uses filters 1108 to perform one or more operations to denoise images, reconstruct images, upsample images, downsample images, interpolate frames, and/or other such operations including, but not limited to, those described herein.

In at least one embodiment, input data 1102 comprises one or more images such as those described herein. In at least one embodiment, input data 1102 comprises one or more images at an input resolution (e.g., a low-resolution) as described herein. In at least one embodiment, input data 1102 comprises one or more images that are jittered. In at least one embodiment, as used herein, an image that is jittered has one or more transformations applied (e.g., translation, rotation, scale, skew, etc.). In at least one embodiment, as used herein, an image that is jittered has noise applied (e.g., is a noisy image), as described herein. In at least one embodiment, comprises one or more images that are at input resolution and/or are jittered 1114.

In at least one embodiment, output (t−1) 1120 is received from or otherwise provided by a previous iteration of one or more processes to denoise an image using a neural network such as those described herein. In at least one embodiment, output (t−1) 1120 is received from or otherwise provided by a previous iteration of one or more operations to denoise an image using a neural network such as operations described herein. In at least one embodiment, output (t−1) 1120 is output (t) 1132 from a previous iteration of one or more operations to denoise an image using a neural network such as that described herein in connection with FIG. 11. In at least one embodiment, output (t−1) 1120 and/or output (t) 1132 comprise data such as image data that is provided to an image renderer such as image renderer 118, described herein at least in connection with FIG. 1.

In at least one embodiment, hidden data (t−1) 1118 is received from or otherwise provided by a previous iteration of one or more processes to denoise an image using a neural network such as those described herein. In at least one embodiment, hidden data (t−1) 1118 is received from or otherwise provided by a previous iteration of one or more operations to denoise an image using a neural network such as that described herein in connection with FIG. 11. In at least one embodiment, hidden data (t−1) 1118 is hidden data (t) 1130 from a previous iteration of one or more operations to denoise an image using a neural network such as those described herein. In at least one embodiment, hidden data (t−1) 1118 and/or hidden data (t) 1130 comprise data such as image data that is not provided to an image renderer such as image renderer 118, described herein at least in connection with FIG. 1. In at least one embodiment, hidden data (t−1) 1118 and/or hidden data (t) 1130 comprise additional data that is used to perform one or more operations to denoise an image using a neural network and/or one or more filters such as those described herein. In at least one embodiment, hidden data (t−1) 1118 and/or hidden data (t) 1130 are internal data (e.g., data that is used to perform one or more operations to denoise an image using a neural network and/or one or more filters such as those described herein). In at least one embodiment, some data is both hidden (or internal) data and output data. In at least one embodiment, hidden data (t−1) 1118 and/or hidden data (t) 1130 comprise image data. In at least one embodiment, hidden data (t−1) 1118 and/or hidden data (t) 1130 comprise additional data that is not image data including, but not limited to, metadata and/or one more data components such as those described herein at least in connection with FIG. 6.

In at least one embodiment, output (t−1) 1120 and/or hidden data (t−1) 1118 is processed (e.g., using process (t−1) data 1122). In at least one embodiment, process (t−1) data 1122 performs one or more processing techniques including, but not limited to, image processing techniques such as those described herein. In at least one embodiment, output (t−1) 1120 and/or hidden data (t−1) comprises one or more images at an output resolution 1116 (e.g., a high-resolution) as described herein. In at least one embodiment, processed output (t−1) 1120 and/or hidden data (t−1) (e.g., processed using process (t−1) data 1122) is downsampled (e.g., a pixel resolution of output (t−1) 1120 and/or hidden data (t−1) is reduced from, for example, 4K to 1180*p*) as described herein. In at least one embodiment, output (t−1) 1120 and/or hidden data (t−1) is downsampled to an input resolution. In at least one embodiment, processed output (t−1) 1120 and/or hidden data (t−1) (e.g., processed using process (t−1) data 1122) is jittered, as described herein. In at least one embodiment, processed output (t−1) 1120 and/or hidden data (t−1) (e.g., processed using process (t−1) data 1122) is downsampled and/or jittered 1124 before being sent or otherwise provided to neural network 1104. In at least one embodiment, processed output (t−1) 1120 and/or hidden data (t−1) (e.g., processed using process (t−1) data 1122) is sent or otherwise provided to a blend 1128, described below.

In at least one embodiment, output data 1106 is generated by neural network 1104, as described herein. In at least one embodiment, output data 1106 is preliminary image data (e.g., is data at input resolution, as described herein) that has been denoised using neural network 1104. In at least one embodiment, output data 1106 is processed (e.g., using process data 1112). In at least one embodiment, process data 1112 performs one or more image processing techniques including, but not limited to, those described herein before said processed images are upsampled and/or unjittered (e.g., using upsample minus jitter 1126). In at least one embodiment, upsample minus jitter 1126 performs one or more operations to upsample processed output data (e.g., from process data 1112) from input resolution and/or jittered 1114 to output resolution 1116, as described herein. In at least one embodiment, upsample minus jitter 1126 performs one or more operations to remove jitter (e.g., to undo jitter added in downsample plus jitter 1124).

In at least one embodiment, an upsampled and unjittered image (e.g., generated using upsample minus jitter 1126) is sent or otherwise provided to a blend 1128 that performs one or more weighted blending operations on image data including, but not limited to, processed output (t−1) 1120 and/or hidden data (t−1) (e.g., processed using process (t−1) data 1122), upsampled and unjittered image (e.g., generated using upsample minus jitter 1126), and/or other such image data. In at least one embodiment, blend 1128 is an element-wise weighted sum where one or more blending weights are used as weights of the blend, although other ways of blending (e.g., using neighborhoods of pixels) are within the scope of the present disclosure. In at least one embodiment, not shown in FIG. 11, a plurality of blend operations such as blend 1128 are performed. In at least one embodiment, a result of blend 1128 is used to generate output (t) 1132. In at least one embodiment, output (t) 1132 is an image at output resolution 1116, as described herein. In at least one embodiment, an upsampled and unjittered image (e.g., generated using upsample minus jitter 1126) is used to generate one or more elements of hidden data (t) 1130. In at least one embodiment, not shown in FIG. 11, output (t) 1132 is used to generate one or more elements of hidden data (t) 1130.

In at least one embodiment, one or more processors (e.g., processor 110 and/or other processors and/or accelerators such as those described herein) comprise one or more circuits to perform operations and/or instructions described herein in connection with FIG. 11, such as one or more circuits to cause one or more neural networks to cause one or more non-noise pixels to be identified and blended in parallel and/or otherwise perform operations described herein. In at least one embodiment, operations and/or instructions described herein in connection with FIG. 11 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 11 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 11, one or more components described herein in connection with FIG. 11 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 11, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 11 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 11 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 11, one or more components described herein in connection with FIG. 11 include one or more components described herein in connection with FIGS. 34A-80 to use one or more neural networks to adjust brightness of one or more pixels of one or more images prior to denoising the one or more images and/or otherwise perform operations described herein.

Figure 12:
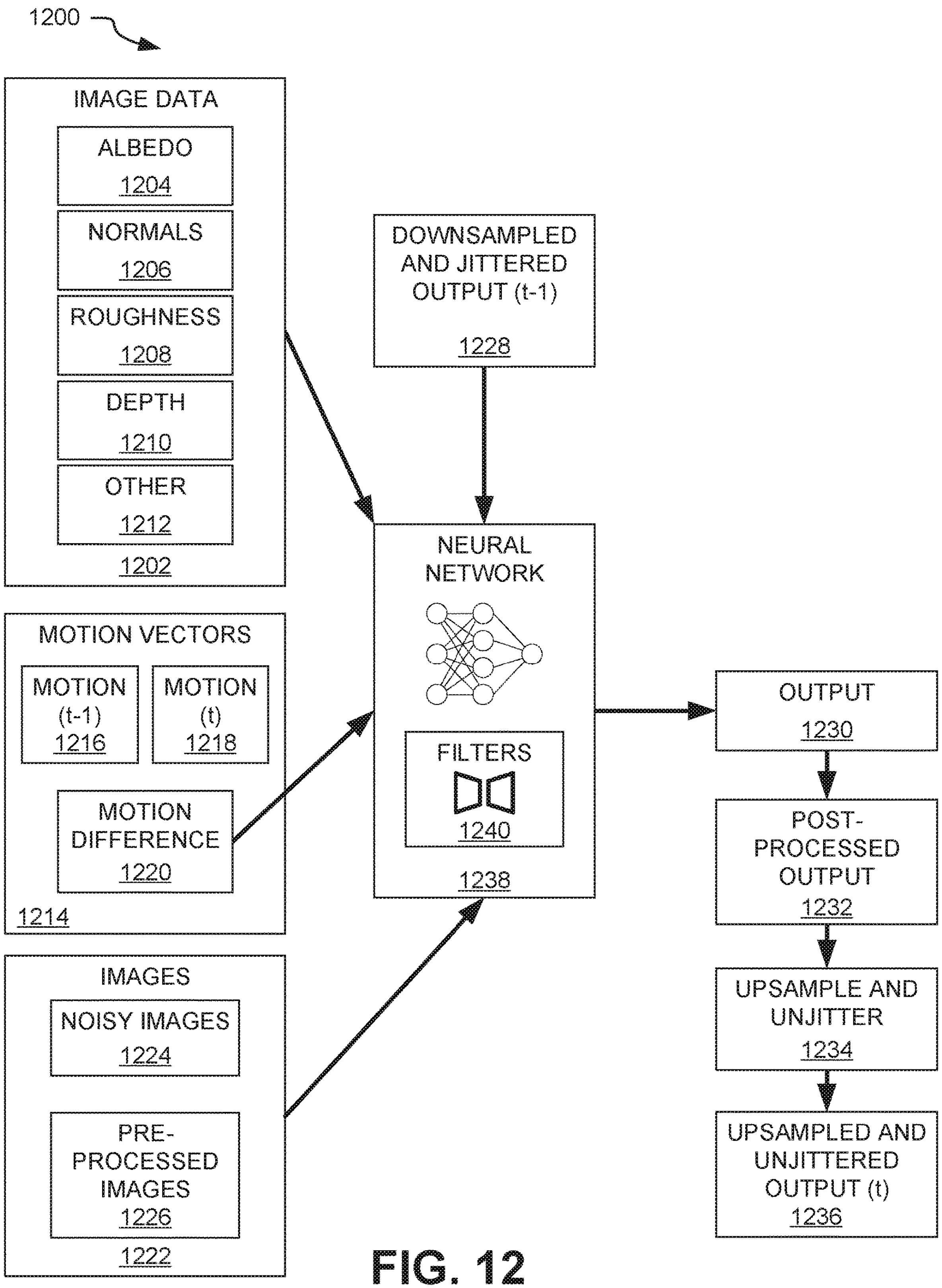
FIG. 12 is a block diagram illustrating using a neural network with filters to denoise an image, in accordance with at least one embodiment.

FIG. 12 is a block diagram 1200 illustrating using a neural network with filters to denoise an image, in accordance with at least one embodiment. In at least one embodiment, image data 1202 comprising one or more of albedo 1204, normals 1206, roughness 1208, depth 1210, and other data 1212 is received by or otherwise provided to a neural network 1238 with one or more filters 1240. In at least one embodiment, image data 1202 is image data such as image data 624, described herein at least in connection with FIG. 6. In at least one embodiment, albedo 1204 is one or more of diffuse albedo 610 and specular albedo 612, described herein at least in connection with FIG. 6. In at least one embodiment, normals 1206 are normals such as normals 608, described herein at least in connection with FIG. 6. In at least one embodiment, roughness 1208 is roughness such as roughness 614, described herein at least in connection with FIG. 6. In at least one embodiment, depth 1210 is depth such as depth 606, described herein at least in connection with FIG. 6. In at least one embodiment, other data 1212 is other data such as one or more of color 602, motion 604, particles, fog, and/or transparency 616, and/or other image data 618, all as described herein at least in connection with FIG. 6. In at least one embodiment, neural network 1238 is a neural network such as neural network 704, described herein at least in connection with FIG. 7. In at least one embodiment, filters 1240 include one or more filters such as filters 708, described herein at least in connection with FIG. 7. In at least one embodiment, filters 1240 comprise one or more filters of a HKPN, as described herein in connection with FIGS. 17-20.

In at least one embodiment, downsampled and jittered output (t−1) 1228 is received by or otherwise provided to neural network 1238. In at least one embodiment, downsampled and jittered output (t−1) 1228 comprises downsample plus jitter 1124, generated by process (t−1) data 1122, described herein at least in connection with FIG. 11.

In at least one embodiment, motion vectors 1214 are received by or otherwise provided to neural network 1238. In at least one embodiment, motion vectors 1214 comprise one or more motion vectors of a previous frame (e.g., motion (t−1) 1216). In at least one embodiment, motion vectors 1214 comprise one or more motion vectors of a current frame (e.g., motion (t) 1218). In at least one embodiment, one or more of motion (t−1) 1216 and/or motion (t) 1218 is used to calculate a motion difference 1220. In at least one embodiment, motion difference 1220 is generated by subtracting motion (t−1) 1216 from motion (t) 1218. In at least one embodiment, motion difference 1220 is generated by subtracting motion (t) 1218 from motion (t−1) 1216. In at least one embodiment, motion difference 1220 is generated using some other calculation using one or more of motion (t−1) 1216 and/or motion (t) 1218.

In at least one embodiment, not shown in FIG. 12, motion difference 1220 is generated using specular motion, as described herein. In at least one embodiment, not shown in FIG. 12, motion difference 1220 is calculated using one or more of other motion including, but not limited to, specular motion, synthetic motion, normal motion (e.g., motion of normal data), depth-based motion, and/or other such motions. In at least one embodiment, data used to generate motion difference 1220 is generated by or otherwise provided by a game engine such as game engine 102, described herein at least in connection with FIG. 1. In at least one embodiment, motion difference 1220 is sent to or otherwise provided to neural network 1238. In at least one embodiment, not shown in FIG. 12, one or more data elements such as those described herein (e.g., motion (t−1) 1216, motion (t) 1218, specular motion frames, and/or other such motion) are sent to or otherwise provided to neural network 1238.

In at least one embodiment, one or more images 1222 are sent to otherwise provided to neural network 1238. In at least one embodiment, images 1222 comprises one or more noisy images 1224. In at least one embodiment, noisy images 1224 includes one or more noisy images such as noisy image frames 106, described herein at least in connection with FIG. 1. In at least one embodiment, images 1222 includes one or more pre-processed images 1226. In at least one embodiment, pre-processed images 1226 include one or more images (e.g., such as noisy images 1224) that have been pre-processed using systems, methods, operations, and instructions described herein in connection with FIGS. 1-33. In at least one embodiment, pre-processed images 1226 are images processed using process data 1110 and/or process (t−1) data 1122, described herein at least in connection with FIG. 11. In at least one embodiment, pre-processed images 1226 are images processed using specular motion augmentation 2202, described herein at least in connection with FIG. 22.

In at least one embodiment, neural network 1238 generates output 1230. In at least one embodiment, output 1230 is output such as output data 114, described herein at least in connection with FIG. 1. In at least one embodiment, output 1230 is generated using systems, methods, operations, and instructions such as those described herein at least in connection with FIGS. 1-33. In at least one embodiment, output 1230 is output such as output data 1106, described herein at least in connection with FIG. 11. In at least one embodiment, post-processed output 1232 is generated based, at least in part, on output 1230. In at least one embodiment, post-processed output 1232 is generated using process data 1112, described herein at least in connection with FIG. 11. In at least one embodiment, not shown in FIG. 12, post-processed output 1232 is generated by neural network 1238 using one or more elements of an HKPN such as that described herein at least in connection with FIGS. 17-20. In at least one embodiment, post-processed output 1232 is generated using one or more systems, methods, operations, or instructions described herein. In at least one embodiment, post-processed output 1232 is upsampled and unjittered 1234 to generate upsampled and unjittered output (t) 1236 (e.g., as described herein at least in connection with FIG. 11.

In at least one embodiment, one or more processors (e.g., processor 110 and/or other processors and/or accelerators such as those described herein) comprise one or more circuits to perform operations and/or instructions described herein in connection with FIG. 12, such as one or more circuits to cause one or more neural networks to cause one or more non-noise pixels to be identified and blended in parallel and/or otherwise perform operations described herein. In at least one embodiment, operations and/or instructions described herein in connection with FIG. 12 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 12 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 12, one or more components described herein in connection with FIG. 12 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 12, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 12 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 12 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 12, one or more components described herein in connection with FIG. 12 include one or more components described herein in connection with FIGS. 34A-80 to use one or more neural networks to adjust brightness of one or more pixels of one or more images prior to denoising the one or more images and/or otherwise perform operations described herein.

Figure 13:
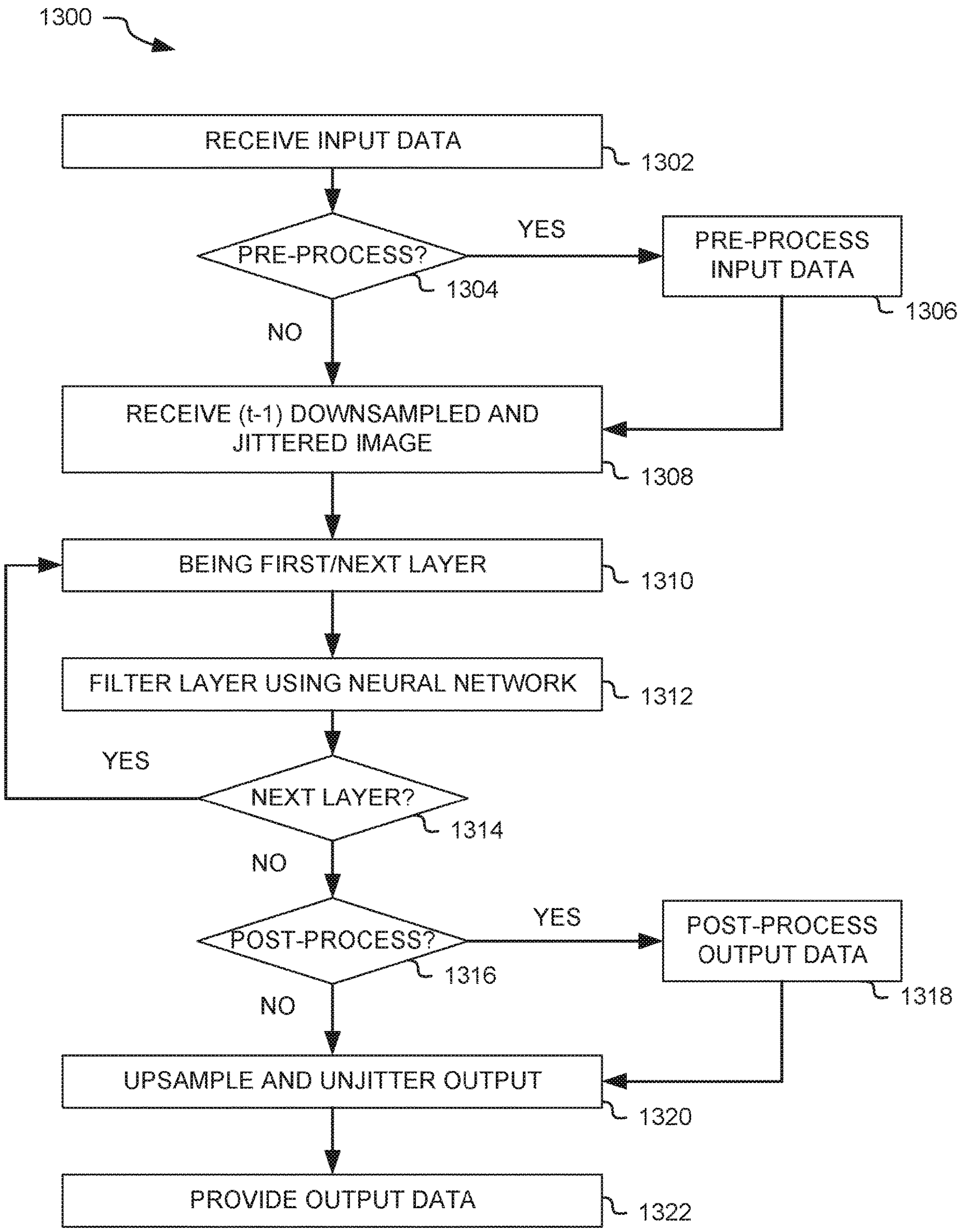
FIG. 13 is a block diagram illustrating a process to use a filter to denoise an image using a neural network, in accordance with at least one embodiment.

FIG. 13 is a block diagram 1300 illustrating a process to use a filter to denoise an image using a neural network, in accordance with at least one embodiment. In at least one embodiment, some or all of said process to use a filter to denoise an image using a neural network illustrated in block diagram 1300 (or any other processes described herein, or variations and/or combinations thereof) is performed under control of one or more computer systems, servers, processors, integrated circuits, and/or other such device as described in connection with FIGS. 34A-80, configured with computer-executable instructions and is implemented as code (e.g., computer-executable instructions, one or more computer programs, or one or more applications) executing collectively on one or more processors, by hardware, software, or combinations thereof. In at least one embodiment, said code is stored on a computer-readable storage medium in form of a computer program comprising a plurality of computer-readable instructions executable by one or more processors such as those described herein. In at least one embodiment, a computer-readable storage medium is a non-transitory computer-readable medium. In at least one embodiment, a processor such as processor 110, described herein at least in connection with FIG. 1, performs one or more steps of said process to use a filter to denoise an image using a neural network illustrated in block diagram 1300. In at least one embodiment, one or more other processors such as those described herein perform one or more steps of said process to use a filter to denoise an image using a neural network illustrated in block diagram 1300.

In at least one embodiment, at step 1302 of said process to use a filter to denoise an image using a neural network illustrated in block diagram 1300, a processor performing said process receives or otherwise obtains input data. In at least one embodiment, at step 1302, input data received comprises one or more of previous frames, current frames, image data, and/or other frames (e.g., synthetic motion frames, specular motion frames, etc.). In at least one embodiment, after step 1302, said process to use a filter to denoise an image using a neural network illustrated in block diagram 1300 continues at step 1304.

In at least one embodiment, at step 1304 of said process to use a filter to denoise an image using a neural network illustrated in block diagram 1300, a processor performing said process performs one or more operations to determine whether to pre-process input data (e.g., input data received at step 1302). In at least one embodiment, at step 1304, a processor performing said process performs one or more operations to determine whether to pre-process input data as described herein at least in connection with FIGS. 11 and 12. In at least one embodiment, at step 1304, if it is determined to pre-process input data ("YES" branch), said process to use a filter to denoise an image using a neural network illustrated in block diagram 1300 continues at step 1306. In at least one embodiment, at step 1304, if it is determined to not pre-process input data ("NO" branch), said process to use a filter to denoise an image using a neural network illustrated in block diagram 1300 continues at step 1308.

In at least one embodiment, at step 1306 of said process to use a filter to denoise an image using a neural network illustrated in block diagram 1300, a processor performing said process performs one or more operations to pre-process input data (e.g., input data received at step 1302) using systems, methods, operations, and/or instructions described herein at least in connection with FIGS. 11 and 12 (e.g., downsampling, upsampling, jittering, unjittering, applying noise, removing noise, etc.). In at least one embodiment, after step 1306, said process to use a filter to denoise an image using a neural network illustrated in block diagram 1300 continues at step 1308.

In at least one embodiment, at step 1308 of said process to use a filter to denoise an image using a neural network illustrated in block diagram 1300, a processor performing said process receives or otherwise is provided with a (t−1) downsampled and jittered image or frame (e.g., a previous frame), as described herein. In at least one embodiment, at step 1308, said (t−1) downsampled and jittered image or frame is received without pre-processing (e.g., without performing step 1306). In at least one embodiment, at step 1308, said (t−1) downsampled and jittered image or frame is received as an output from pre-processing (e.g., as a result of performing step 1306). In at least one embodiment, after step 1308, said process to use a filter to denoise an image using a neural network illustrated in block diagram 1300 continues at step 1310.

In at least one embodiment, at step 1310 of said process to use a filter to denoise an image using a neural network illustrated in block diagram 1300, a processor performing said process performs one or more operations to begin a first layer of filtering (e.g., using a neural network with one or more filters such as those described herein at least in connection with FIGS. 15-20). In at least one embodiment, not shown in FIG. 13, at step 1310, before a first layer of filtering is performed, one or more image processing operations are performed on input data such as, for example, demodulation (e.g., dividing said input data by one or more values), modulation (e.g., multiplying said input data by one or more values), adding or removing residual values (e.g., subtracting one or more values from said input data or adding one or more values to said input data), filtering, jittering, unjittering, adding noise, removing noise, and/or other such operations). In at least one embodiment, after step 1310, said process to use a filter to denoise an image using a neural network illustrated in block diagram 1300 continues at step 1312.

In at least one embodiment, at step 1312 of said process to use a filter to denoise an image using a neural network illustrated in block diagram 1300, a processor performing said process performs one or more operations to filter a layer (e.g., a layer being processed starting at step 1310) using a neural network with one or more filters such as those described herein. In at least one embodiment, after step 1312, said process to use a filter to denoise an image using a neural network illustrated in block diagram 1300 continues at step 1314. In at least one embodiment, not shown in FIG. 13, one or more operations to pre-process input data (e.g., as described herein at least in connection with FIGS. 11 and 12) are performed before step 1312. In at least one embodiment, also not shown in FIG. 13, one or more operations to post-process output data (e.g., as described herein at least in connection with FIGS. 11 and 12) are performed after step 1312.

In at least one embodiment, at step 1314 of said process to use a filter to denoise an image using a neural network illustrated in block diagram 1300, a processor performing said process performs one or more operations to determine whether to process a next layer. In at least one embodiment, at step 1314, said process performs one or more operations to determine whether to process a next layer based, at least in part, on an architecture of said neural network, an image size of input data (e.g., received at step 1302), and/or other such factors. In at least one embodiment, at step 1314, if it is determined to process a next layer ("YES" branch), said process to use a filter to denoise an image using a neural network illustrated in block diagram 1300 continues at step 1310 begin a next layer. In at least one embodiment, at step 1314, if it is determined to not process a next layer ("NO" branch), said process to use a filter to denoise an image using a neural network illustrated in block diagram 1300 continues at step 1316.

In at least one embodiment, at step 1316 of said process to use a filter to denoise an image using a neural network illustrated in block diagram 1300, a processor performing said process performs one or more operations to determine whether to post-process filtered input data (e.g., input data filtered using iterations of step 1312), as described herein. In at least one embodiment, at step 1316, if it is determined to post-process filtered input data ("YES" branch), said process to use a filter to denoise an image using a neural network illustrated in block diagram 1300 continues at step 1318. In at least one embodiment, at step 1316, if it is determined to not post-process filtered input data ("NO" branch), said process to use a filter to denoise an image using a neural network illustrated in block diagram 1300 continues at step 1320.

In at least one embodiment, at step 1318 of said process to use a filter to denoise an image using a neural network illustrated in block diagram 1300, a processor performing said process performs one or more operations to post-process output data (e.g., data filtered at step 1312) as described herein. In at least one embodiment, one or more operations to post-process output data include one or more operations to undo one or more operations to pre-process input data (e.g., performed at step 1306). In at least one embodiment, not shown in FIG. 13, one or more operations to pre-process input data are performed before step 1312. In at least one embodiment, not shown in FIG. 13, one or more operations to post-process output data are performed after step 1312. In at least one embodiment, after step 1318, said process to use a filter to denoise an image using a neural network illustrated in block diagram 1300 continues at step 1320.

In at least one embodiment, at step 1320 of said process to use a filter to denoise an image using a neural network illustrated in block diagram 1300, a processor performing said process performs one or more operations to upsample and/or unjitter output data (e.g., as described herein at least in connection with FIGS. 11 and 12. In at least one embodiment, after step 1320, said process to use a filter to denoise an image using a neural network illustrated in block diagram 1300 continues at step 1322.

In at least one embodiment, at step 1322 of said process to use a filter to denoise an image using a neural network illustrated in block diagram 1300, a processor performing said process provides output data as described herein. In at least one embodiment, after step 1322, said process to use a filter to denoise an image using a neural network illustrated in block diagram 1300 terminates. In at least one embodiment, not shown in FIG. 13, after step 1322, said process to use a filter to denoise an image using a neural network illustrated in block diagram 1300 continues at step 1302 to receive additional input data.

In at least one embodiment, operations of said process to use a filter to denoise an image using a neural network illustrated in block diagram 1300 are performed in a different order than is illustrated in FIG. 13. In at least one embodiment, operations of said process to use a filter to denoise an image using a neural network illustrated in block diagram 1300 are performed simultaneously or in parallel.

In at least one embodiment, operations of said process to use a filter to denoise an image using a neural network illustrated in block diagram 1300 that do not depend on each other (e.g., are order independent) are performed simultaneously or in parallel. In at least one embodiment, operations of said process to use a filter to denoise an image using a neural network illustrated in block diagram 1300 are performed by a plurality of threads executing on a processor such as those described herein.

In at least one embodiment, one or more processors (e.g., processor 110 and/or other processors and/or accelerators such as those described herein) comprise one or more circuits to perform operations and/or instructions described herein in connection with FIG. 13, such as one or more circuits to cause one or more neural networks to cause one or more non-noise pixels to be identified and blended in parallel and/or otherwise perform operations described herein. In at least one embodiment, operations and/or instructions described herein in connection with FIG. 13 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 13 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 13, one or more operations described herein in connection with FIG. 13 are performed by one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 13, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 13 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 13 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 13, one or more operations described herein in connection with FIG. 13 are performed by one or more components described herein in connection with FIGS. 34A-80 to use one or more neural networks to adjust brightness of one or more pixels of one or more images prior to denoising the one or more images and/or otherwise perform operations described herein.

Figure 14:
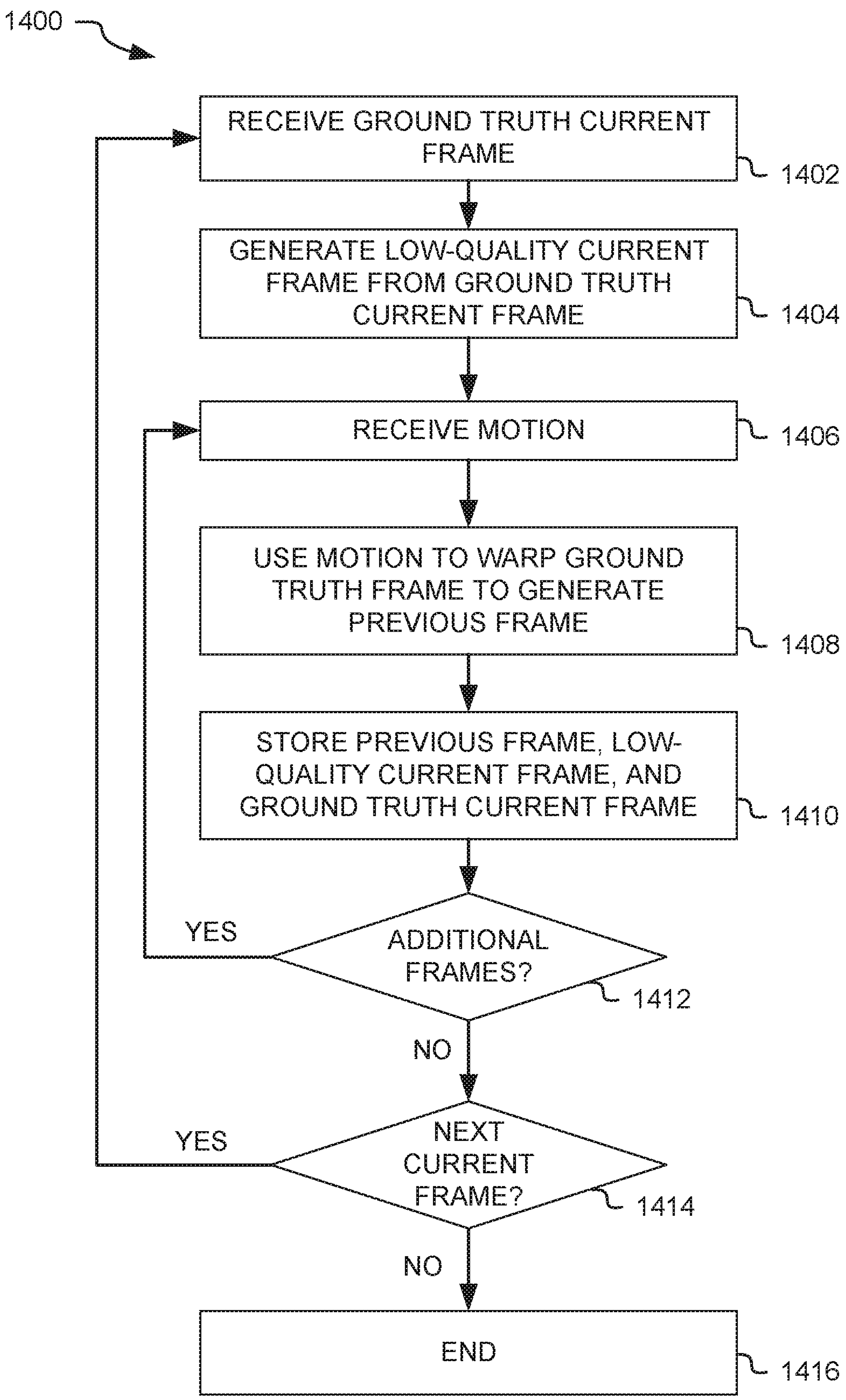
FIG. 14 is a block diagram illustrating a process to generate frames used by a neural network to generate blending weights, in accordance with at least one embodiment.

FIG. 14 is a block diagram 1400 illustrating a process to generate frames used by a neural network to generate blending weights, in accordance with at least one embodiment. In at least one embodiment, said process to generate frames used by a neural network to generate blending weights is performed in conjunction with training said neural network, as described herein. In at least one embodiment, said process to generate frames used by a neural network to generate blending weights is performed in conjunction with performing said neural network (e.g., to generate blending weights). In at least one embodiment, some or all of said process to generate frames used by a neural network to generate blending weights illustrated in block diagram 1400 (or any other processes described herein, or variations and/or combinations thereof) is performed under control of one or more computer systems, servers, processors, integrated circuits, and/or other such device as described in connection with FIGS. 34A-80, configured with computer-executable instructions and is implemented as code (e.g., computer-executable instructions, one or more computer programs, or one or more applications) executing collectively on one or more processors, by hardware, software, or combinations thereof. In at least one embodiment, said code is stored on a computer-readable storage medium in form of a computer program comprising a plurality of computer-readable instructions executable by one or more processors such as those described herein. In at least one embodiment, a computer-readable storage medium is a non-transitory computer-readable medium. In at least one embodiment, a processor such as processor 110, described herein at least in connection with FIG. 1, performs one or more steps of said process to generate frames used by a neural network to generate blending weights illustrated in block diagram 1400. In at least one embodiment, one or more other processors such as those described herein perform one or more steps of said process to generate frames used by a neural network to generate blending weights illustrated in block diagram 1400.

In at least one embodiment, at step 1402 of said process to generate frames used by a neural network to generate blending weights illustrated in block diagram 1400, a processor performing said process receives or otherwise obtains a ground truth current frame. In at least one embodiment, at step 1402, a ground truth current frame received is an unjittered current frame at output resolution. In at least one embodiment, at step 1402, a ground truth current frame received is generated by a game engine such as game engine 102, described herein at least in connection with FIG. 1. In at least one embodiment, at step 1402, a ground truth current frame received is generated using a high-resolution ray-tracing (or ray-casting) algorithm. In at least one embodiment, after step 1402, said process to generate frames used by a neural network to generate blending weights illustrated in block diagram 1400 continues at step 1404.

In at least one embodiment, at step 1404 of said process to generate frames used by a neural network to generate blending weights illustrated in block diagram 1400, a processor performing said process performs one or more operations to generate a low-quality current frame from a ground truth current frame (e.g., received at step 1402). In at least one embodiment, one or more operations to generate a low-quality current frame from a ground truth current frame comprise one or more operations to downsample said ground truth current frame (e.g., to a lower resolution) to generate a low-quality current frame, as described herein. In at least one embodiment, one or more operations to generate a low-quality current frame from a ground truth current frame comprise one or more operations to jitter said ground truth current frame to generate a low-quality current frame, as described herein. In at least one embodiment, one or more operations to generate a low-quality current frame from a ground truth current frame comprise one or more operations to add noise to said ground truth current frame to generate a low-quality current frame, as described herein. In at least one embodiment, one or more operations to generate a low-quality current frame from a ground truth current frame comprise one or more operations to apply one or more other image processing operations to said ground truth current frame to generate a low-quality current frame, as described herein. In at least one embodiment, after step 1404, said process to generate frames used by a neural network to generate blending weights illustrated in block diagram 1400 continues at step 1406.

In at least one embodiment, at step 1406 of said process to generate frames used by a neural network to generate blending weights illustrated in block diagram 1400, a processor performing said process performs one or more operations to receive motion. In at least one embodiment, one or more operations to receive motion comprise one or more operations described herein (e.g., to receive motion from a game engine such as game engine 102, described herein at least in connection with FIG. 1, to receive specular motion data, to receive other motion data, to generate synthetic motion, and/or other such operations). In at least one embodiment, one or more operations to receive motion comprise one or more operations to generate random motion vectors. In at least one embodiment, one or more operations to generate random motion vectors comprise one or more operations to generate random motion vectors stochastically (e.g., using random variance of parameters of a stochastic model over time), one or more operations to generate motion vectors using a probability distribution (e.g., using a normal (Gaussian) distribution, exponential distribution, Rayleigh distribution, Chi-squared distribution, etc.), or one or more other such operations. In at least one embodiment, after step 1406, said process to generate frames used by a neural network to generate blending weights illustrated in block diagram 1400 continues at step 1408.

In at least one embodiment, at step 1408 of said process to generate frames used by a neural network to generate blending weights illustrated in block diagram 1400, a processor performing said process performs one or more operations to use motion (e.g., received at step 1406) to warp a ground truth frame (e.g., received at step 1402) to generate a previous frame. In at least one embodiment, at step 1408, a previous frame generated is a high-quality frame (e.g., a motion-warped version of a ground truth current frame received at step 1402). In at least one embodiment, at step 1408, a previous frame generated is a low-quality frame (e.g., a motion-warped version of a low-quality current frame generated at step 1404). In at least one embodiment, at step 1408, previous frames used to warp a ground truth frame are used to reverse said warp so that said ground truth frame and said warped ground truth frame match (e.g., in order to blend said frames using a neural network, as described herein). In at least one embodiment, after step 1408, said process to generate frames used by a neural network to generate blending weights illustrated in block diagram 1400 continues at step 1410.

In at least one embodiment, at step 1410 of said process to generate frames used by a neural network to generate blending weights illustrated in block diagram 1400, a processor performing said process performs one or more operations to store one or more of a previous frame (e.g., generated at step 1408), a low-quality current frame (e.g., generated at step 1404), and/or a ground truth current frame (e.g., received at step 1402). In at least one embodiment, at step 1410, stored frames are stored in a data store such as those described herein. In at least one embodiment, after step 1410, said process to generate frames used by a neural network to generate blending weights illustrated in block diagram 1400 continues at step 1412.

In at least one embodiment, at step 1412 of said process to generate frames used by a neural network to generate blending weights illustrated in block diagram 1400, a processor performing said process performs one or more operations to determine whether to generate additional frames (e.g., based on a low-quality current frame generated at step 1404 and a ground truth current frame received at step 1402). In at least one embodiment, at step 1412, one or more operations to determine whether to generate additional frames are based on one or more neural network parameters and/or hyperparameters. In at least one embodiment, at step 1412, one or more operations to determine whether to generate additional frames are based on generating a sufficient number of frames (e.g., at step 1406) as determined by one or more neural network parameters and/or hyperparameters. In at least one embodiment, at step 1412, if it is determined to generate additional frames ("YES" branch), said process to generate frames used by a neural network to generate blending weights illustrated in block diagram 1400 continues at step 1406 generate additional frames. In at least one embodiment, at step 1412, if it is determined to not generate additional frames ("NO" branch), said process to generate frames used by a neural network to generate blending weights illustrated in block diagram 1400 continues at step 1414.

In at least one embodiment, at step 1414 of said process to generate frames used by a neural network to generate blending weights illustrated in block diagram 1400, a processor performing said process performs one or more operations to determine whether to generate more frames based on a different current frame (e.g., a different ground truth current frame received at step 1402). In at least one embodiment, at step 1414, if it is determined to generate more frames based on a different current frame ("YES" branch), said process to generate frames used by a neural network to generate blending weights illustrated in block diagram 1400 continues at step 1402 to receive an additional ground truth current frame. In at least one embodiment, at step 1414, if it is determined to not generate more frames based on a different current frame ("NO" branch), said process to generate frames used by a neural network to generate blending weights illustrated in block diagram 1400 continues at step 1416.

In at least one embodiment, at step 1416, said process to generate frames used by a neural network to generate blending weights illustrated in block diagram 1400 terminates. In at least one embodiment, not shown in FIG. 14, after step 1416, said process to generate frames used by a neural network to generate blending weights illustrated in block diagram 1400 continues at step 1402 to receive an additional ground truth current frame. In at least one embodiment, not shown in FIG. 14, stored frames (e.g., stored at step 1410) are provided to a neural network to be used to train a neural network to generate blending weights using motion, as described herein.

In at least one embodiment, operations of said process to generate frames used by a neural network to generate blending weights illustrated in block diagram 1400 are performed in a different order than is illustrated in FIG. 14.

In at least one embodiment, operations of said process to generate frames used by a neural network to generate blending weights illustrated in block diagram 1400 are performed simultaneously or in parallel. In at least one embodiment, operations of said process to generate frames used by a neural network to generate blending weights illustrated in block diagram 1400 that do not depend on each other (e.g., are order independent) are performed simultaneously or in parallel. In at least one embodiment, operations of said process to generate frames used by a neural network to generate blending weights illustrated in block diagram 1400 are performed by a plurality of threads executing on a processor such as those described herein.

In at least one embodiment, one or more processors (e.g., processor 110 and/or other processors and/or accelerators such as those described herein) comprise one or more circuits to perform operations and/or instructions described herein in connection with FIG. 14, such as one or more circuits to cause one or more neural networks to cause one or more non-noise pixels to be identified and blended in parallel and/or otherwise perform operations described herein. In at least one embodiment, operations and/or instructions described herein in connection with FIG. 14 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 14 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 14, one or more components described herein in connection with FIG. 14 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 14, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 14 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 14 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 14, one or more components described herein in connection with FIG. 14 include one or more components described herein in connection with FIGS. 34A-80 to use one or more neural networks to adjust brightness of one or more pixels of one or more images prior to denoising the one or more images and/or otherwise perform operations described herein.

Figure 15:
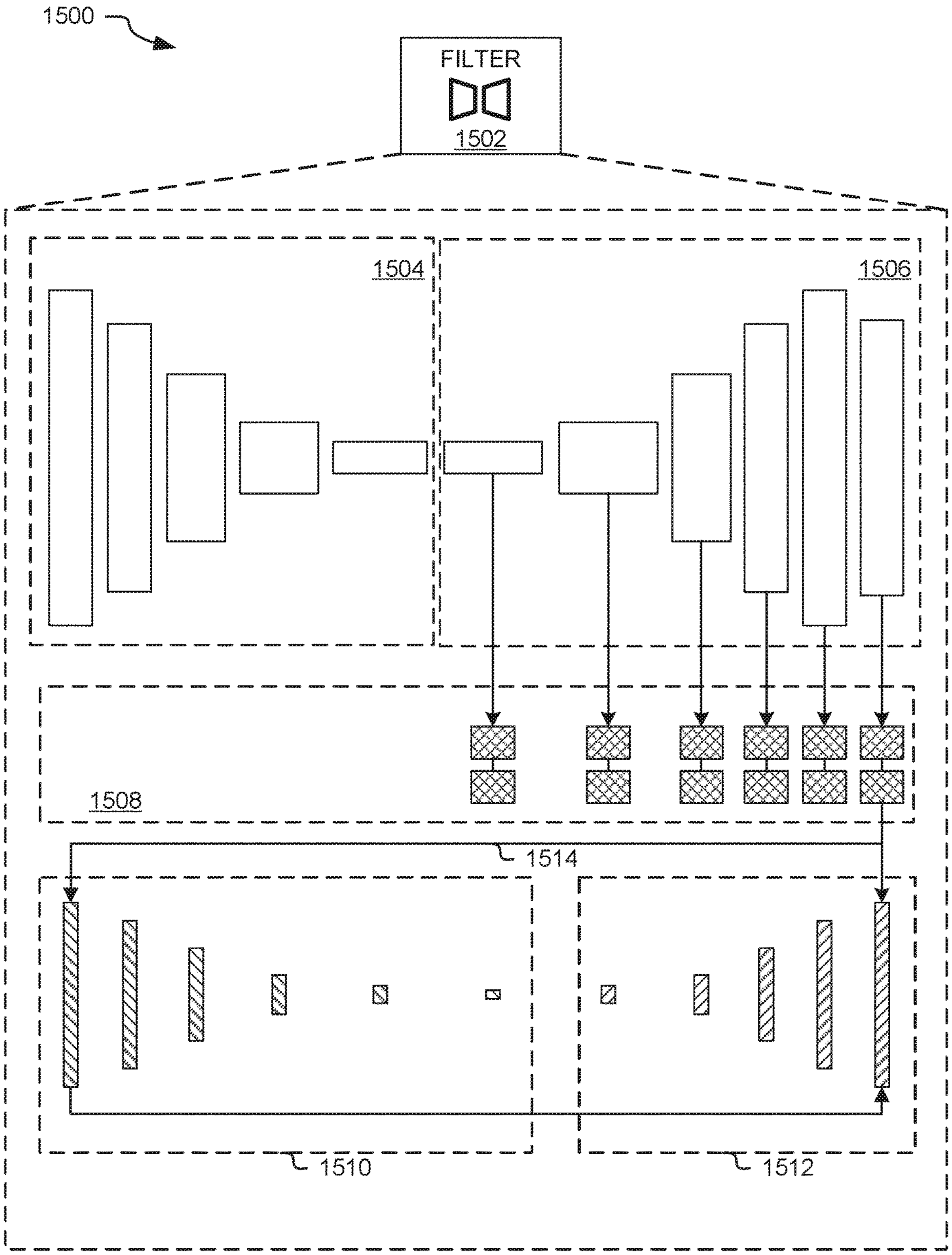
FIG. 15 is a block diagram illustrating a filter used to denoise an image, in accordance with at least one embodiment.

FIG. 15 is a block diagram 1500 illustrating a filter used to denoise an image, in accordance with at least one embodiment. In at least one embodiment, a filter 1502 includes one or more decoding layers 1504, one or more encoding layers 1506, one or more convolutions 1508, one or more filter parameters with downsampling 1510, and one or more filter parameters with bilinear upsampling 1512. In at least one embodiment, filter 1502 is a hierarchical knowledge predication network (HKPN). In at least one embodiment, decoding layers 1504 are layers of filter 1502 that downsample an input image (not shown in FIG. 15) into smaller components. In at least one embodiment, an input image is received at a first decoding layer of filter 1502 and said image is downsampled by repeatedly applying a 3×3 filter to said image. In at least one embodiment, a first decoding layer downsamples said image to half of its original size (e.g., from $1024\times10^{24}$ to 512×512). In at least one embodiment, a 3×3 filter includes nine parameters that are learned by a neural network (e.g., neural network 704, described herein at least in connection with FIG. 7) as described herein. In at least one embodiment, convolutions 1508 include one or more 1×1 convolutions such as those described herein. In at least one embodiment, convolutions 1508 are performed only in connection with encoding layers 1506.

In at least one embodiment, filter parameters with downsampling 1510 are learned by a neural network as described herein. In at least one embodiment, a first set of filter parameters of filter parameters with downsampling 1510 can only be learned after all encoding layers 1506 have completed, as denoted by data path 1514, because said first set of filter parameters of filter parameters with downsampling 1510 needs said one or more encoding layers 1506 to complete before filter parameters can be learned by a neural network (other data paths between other encoding layers and other filters are omitted for clarity).

In at least one embodiment, one or more processors (e.g., processor 110 and/or other processors and/or accelerators such as those described herein) comprise one or more circuits to perform operations and/or instructions described herein in connection with FIG. 15, such as one or more circuits to cause one or more neural networks to cause one or more non-noise pixels to be identified and blended in parallel and/or otherwise perform operations described herein. In at least one embodiment, operations and/or instructions described herein in connection with FIG. 15 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 15 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 15, one or more components described herein in connection with FIG. 15 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 15, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 15 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 15 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 15, one or more components described herein in connection with FIG. 15 include one or more components described herein in connection with FIGS. 34A-80 to use one or more neural networks to adjust brightness of one or more pixels of one or more images prior to denoising the one or more images and/or otherwise perform operations described herein.

Figure 16:
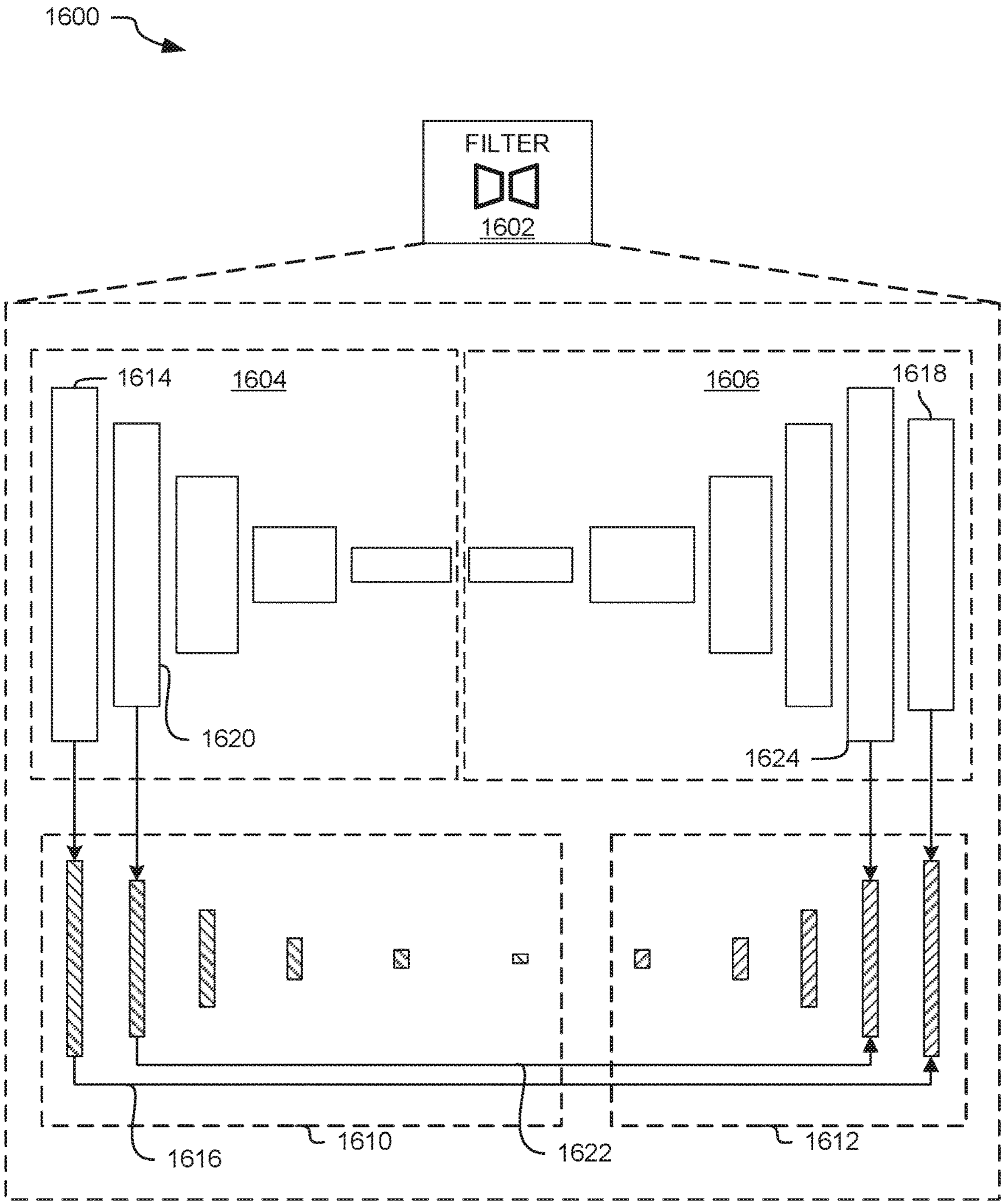
FIG. 16 is a block diagram illustrating parallel implementation of a filter used to denoise an image, in accordance with at least one embodiment.

FIG. 16 is a block diagram 1600 illustrating parallel implementation of a filter used to denoise an image, in accordance with at least one embodiment. In at least one embodiment, a filter 1602 is a filter such as filter 1502, described herein at least in connection with FIG. 15 that is implemented in parallel so that a first set of filter parameters of filter parameters with downsampling can be learned earlier (e.g., before all encoding layers have completed, as denoted by data path 1514, as described herein at least in connection with FIG. 15). In block diagram 1600, elements of filter 1602 illustrated in FIG. 16 are omitted for clarity (e.g., convolutions such as convolutions 1508, as described herein at least in connection with FIG. 15).

In at least one embodiment, a first layer 1614 of decoding layer 1604 (e.g., decoding layers such as decoding layers 1504, described herein at least in connection with FIG. 15) is to be performed using filtering parameters predicted by a neural network, as described herein. In at least one embodiment, filtering parameters of first layer 1614 are represented as a 3×3 matrix (e.g., as nine values). In at least one embodiment, a neural network (not shown in FIG. 16) predicts said filtering parameters and uses said filtering parameters to perform filtering using one or more filter parameters with downsampling 1610 (e.g., filtering parameters with downsampling such as filtering parameters with downsampling 1510, as described herein at least in connection with FIG. 15). In at least one embodiment, filtering parameters of first layer 1614 are also provided 1616 to a last layer 1618 of encoding layers 1606 (e.g., encoding layers such as encoding layers 1506, described herein at least in connection with FIG. 15) so that last layer 1618 of encoding layers 1606 can use said parameters to perform encoding.

In at least one embodiment, a second layer 1620 of decoding layers is to be performed using filtering parameters predicted by a neural network, as described herein. In at least one embodiment, filtering parameters of second layer 1620 are represented as a 3×3 matrix (e.g., as nine values). In at least one embodiment, a neural network (not shown in FIG. 16) predicts said filtering parameters and uses said filtering parameters to perform filtering using one or more filter parameters with downsampling 1610. In at least one embodiment, filtering parameters of second layer 1620 are also provided 1622 to a second-to-last layer 1624 of encoding layers 1606 so that second-to-last layer 1624 of encoding layers 1606 can use said parameters to perform encoding. In at least one embodiment, a neural network (not shown in FIG. 16) predicts filtering parameters of second-to-last layer 1624 concurrently (e.g., in parallel or simultaneously) with using filtering parameters of first layer 1614 to perform filtering using one or more filter parameters with downsampling 1610, as described herein. In at least one embodiment, filter 1602 comprises one or more filters of a hierarchical kernel prediction network (HKPN) such that described herein in connection with FIGS. 17-20. In at least one embodiment, one or more layers of filter 1602 comprise one or more layers of a filter of a hierarchical kernel prediction network (HKPN) such those described herein in connection with FIGS. 17-20.

In at least one embodiment, one or more processors (e.g., processor 110 and/or other processors and/or accelerators such as those described herein) comprise one or more circuits to perform operations and/or instructions described herein in connection with FIG. 16, such as one or more circuits to cause one or more neural networks to cause one or more non-noise pixels to be identified and blended in parallel and/or otherwise perform operations described herein. In at least one embodiment, operations and/or instructions described herein in connection with FIG. 16 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 16 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 16, one or more components described herein in connection with FIG. 16 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 16, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 16 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 16 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 16, one or more components described herein in connection with FIG. 16 include one or more components described herein in connection with FIGS. 34A-80 to use one or more neural networks to adjust brightness of one or more pixels of one or more images prior to denoising the one or more images and/or otherwise perform operations described herein.

Figure 17:
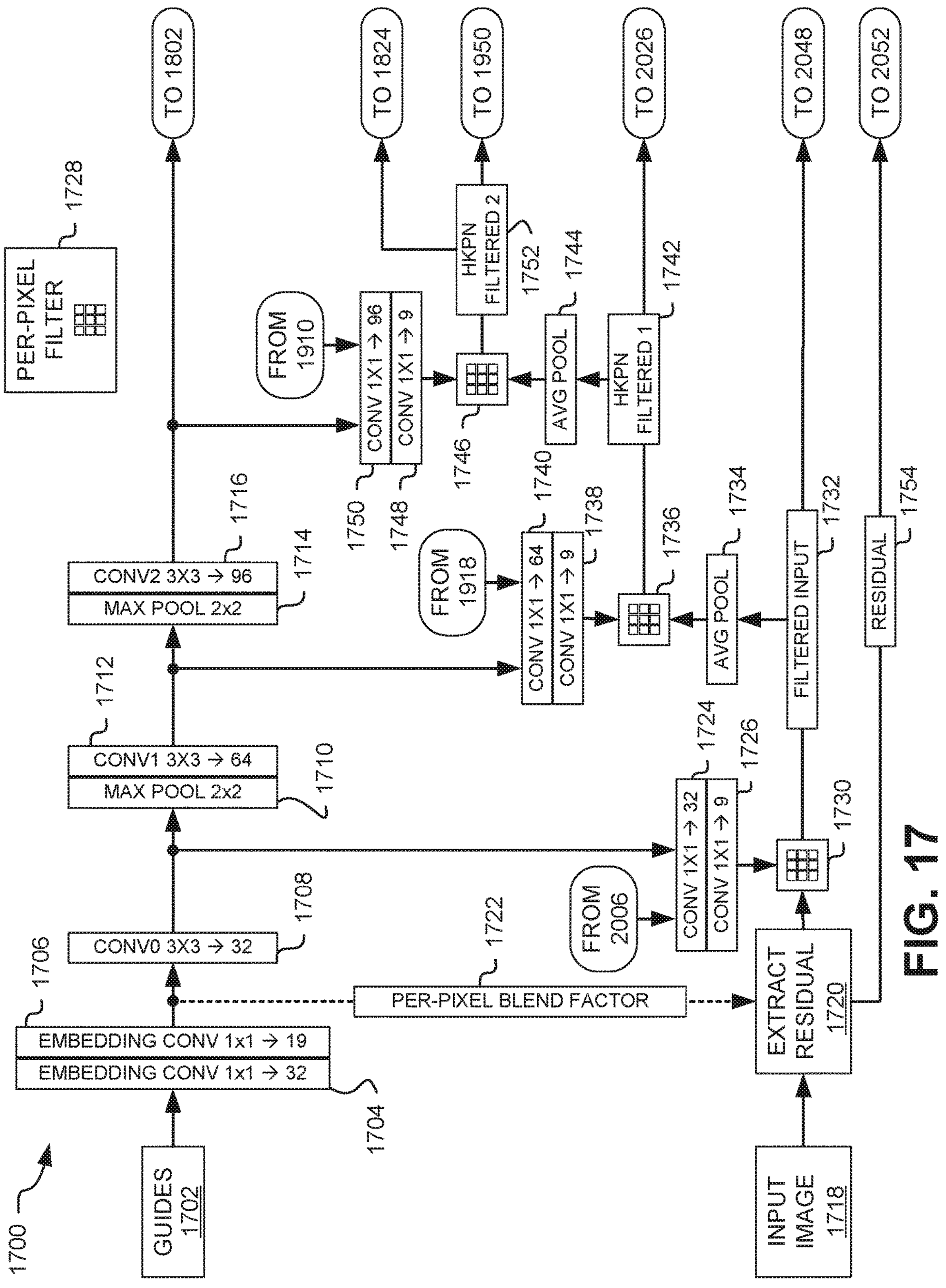
FIG. 17 is a block diagram illustrating a first part of a filter used to denoise an image using a neural network, in accordance with at least one embodiment.

FIG. 17 is a block diagram 1700 illustrating a first part of a filter used to denoise an image using a neural network, in accordance with at least one embodiment. In at least one embodiment, a filter illustrated in FIGS. 17-20 is a filter such as one or more of filters 708, described herein at least in connection with FIG. 7. In at least one embodiment, a filter illustrated in FIGS. 17-20 comprises one or more layers of an HKPN, as described herein. In at least one embodiment, guides 1702 are received by or otherwise provided to a filter (e.g., a filter illustrated in FIGS. 17-20). In at least one embodiment, guides 1702 are data and/or metadata used by a filter used to denoise an image using a neural network described in FIGS. 17-20).

In at least one embodiment, guides 1702 are used by an embedding conv 1×1 à 32 operation 1704 and an embedding conv 1×1 à 19 operation 1706. In at least one embodiment, embedding conv 1×1 à 32 operation 1704 is a 1×1 embedding convolution that receives guides 1701 and generates 32 channels of output. In at least one embodiment, embedding conv 1×1 à 19 operation 1706 is a 1×1 embedding convolution that receives output of embedding conv 1×1 à 32 operation 1704 and generates 19 channels of output. In at least one embodiment, unless stated otherwise or made clear by context, output of operations and/or data of a filter used to denoise an image using a neural network illustrated in FIGS. 17-20 (e.g., embedding conv 1×1 à 32 operation 1704) are considered within the present disclosure as to be used as input to following operations and/or data (e.g., embedding conv 1×1 à 19 operation 1706). In at least one embodiment, if a path between a first operation or data illustrated in FIGS. 17-20 and one or more other operations or data illustrated in FIGS. 17-20 (including in a different FIG.), unless stated otherwise or made clear by context, indicates that output of said first operation or data is used as input of said one or more other operations or that output of said one or more other operations or data is used as input of said first operation.

In at least one embodiment, output of embedding conv 1×1 à 32 operation 1704 and embedding conv 1×1 à 19 operation 1706 is used as input to a conv0 3×3 à 32 operation 1708. In at least one embodiment, conv0 3×3 à 32 operation 1708 is a 3×3 convolution that generates 32 channels of output. In at least one embodiment, output of embedding conv 1×1 à 32 operation 1704 and embedding conv 1×1 à 19 operation 1706 is used to generate a per-pixel blend factor 1722, described below.

In at least one embodiment, output of conv0 3×3 à 32 operation 1708 is used as input to a max pool 2×2 operation 1710 and a conv1 3×3 à 64 operation 1712. In at least one embodiment, max pool 2×2 operation 1710 is an operation that selects a maximum value of each 2×2 pixels (e.g., the brightest pixel of four) and generates a new image from said selected pixel. In at least one embodiment, conv1 3×3 à 64 operation 1712 is a 3×3 convolution that generates 64 channels of output.

In at least one embodiment, output of max pool 2×2 operation 1710 and conv1 3×3 à 64 operation 1712 is used by a max pool 2×2 operation 1714 and a conv2 3×3 à 96 operation 1716. In at least one embodiment, max pool 2×2 operation 1714 is a max pool operation as described above. In at least one embodiment, conv2 3×3 à 96 operation 1716 is a 3×3 convolution that generates 96 channels of output. In at least one embodiment, output of max pool 2×2 operation 1714 and conv2 3×3 à 96 operation 1716 is used by a max pool 2×2 operation 1802 and a conv3 3×3 à 128 operation 1804, described below in connection with FIG. 18.

In at least one embodiment, an input image 1718 is received by or otherwise provided to a filter used to denoise an image using a neural network illustrated in FIGS. 17-20. In at least one embodiment, input image 1718 is an image such as one or more of images 1222, described herein at least in connection with FIG. 12. In at least one embodiment, input image 1718 is an image with one sample per pixel (e.g., each pixel of input image 1718 has a single color value (e.g., an RGB value). In at least one embodiment, each pixel of input image 1718 has multiple color values. In at least one embodiment, input image 1718 and per-pixel blend factor 1722 are used to perform an extract residual operation 1720.

In at least one embodiment, performing extract residual operation 1720 comprises providing one or more channels from an embedding convolution (e.g., embedding conv 1×1 à 32 operation 1704 and/or embedding conv 1×1 à 19 operation 1706) to a sigmoid activation. In at least one embodiment, three channels from an embedding convolution (e.g., embedding conv 1×1 à 32 operation 1704 and/or embedding conv 1×1 à 19 operation 1706) are provided to a sigmoid activation, denoted "r" herein. In at least one embodiment, a sigmoid activation is an activation function (e.g., of a neural network) that uses a sigmoid function to determine activation. In at least one embodiment, performing extract residual operation 1720 comprises multiplying input image 1718 by 1−r (e.g., one minus a sigmoid activation "r") and using a result of multiplying input image 1718 by 1−r as an input to a 3×3 filter 1730. In at least one embodiment, 3×3 filter 1730 is a 3×3 per-pixel filter 1728 that multiplies a pixel and its eight neighbors by elements of a 3×3 matrix. For example, if a pixel is at (a, b), said pixel's eight neighbors are at (a−1, b−1), (a−1, b), (a−1, b+1), (a, b−1), (a, b+1), (a+1, b−1), (a+1, b), and (a+1, b+1). As used herein, a 3×3 filter such as 3×3 filter 1730 is illustrated as nine squares in a grid (e.g., 3×3 filter 1730, 3×3 filter 1736, 3×3 filter 1746, etc.). In at least one embodiment, extract residual operation 1720 generates a residual 1754 which bypasses filter layers illustrated in FIGS. 17-20 and which is added to a final output after all filter layers are performed. In at least one embodiment, residual 1754 is added 2050 to a final output as described at residual 2052, both described below in connection with FIG. 20. In at least one embodiment, not shown in FIGS. 17-20, one or more other unfiltered inputs (e.g., an output of an average pool operation 1734, an output of an average pool operation 1744, etc.) also bypass filter layers illustrated in FIGS. 17-20 and are added to a final output after all filter layers are performed (e.g., at 2050, described below in connection with FIG. 20).

In at least one embodiment, output of CONVO 3×3 à 32 operation 1708 (described above) and output of a bilinear upsampling operation 2006 (described below in connection with FIG. 20 and denoted by an oval labeled "FROM 2006" in FIG. 17) is received at a conv 1×1 à 32 operation 1724 and a conv 1×1 à 9 operation 1726 to generate 3×3 filter 1730. In at least one embodiment, conv 1×1 à 32 operation 1724 is a 1×1 convolution that generates 32 channels of output. In at least one embodiment, conv 1×1 à 9 operation 1726 is a 1×1 convolution that generates nine channels of output. In at least one embodiment, 3×3 filter 1730 comprises nine values that are generated by conv 1×1 à 9 operation 1726. In at least one embodiment, a result of extract residual operation 1720, described above (e.g., a residual) is filtered using 3×3 filter 1730 to generate filtered input 1732 (e.g., each pixel of a residual is filtered using 3×3 filter 1730). In at least one embodiment, filtered input 1732 is filtered input 2048 (described below in connection with FIG. 20 and denoted by an oval labeled "TO 2048" in FIG. 17).

In at least one embodiment, filtered input 1732 is provided to an average pool operation avg pool 1734 which is an operation that selects an average value of each 2×2 pixels (e.g., the average value of each four pixels) and generates a new image from said selected pixel. In at least one embodiment, output of CONVO 3×3 à 64 operation 1712 (described above) and output of a bilinear upsampling operation 1918 (described below in connection with FIG. 19 and denoted by an oval labeled "FROM 1918" in FIG. 17) is received at a conv 1×1 à 64 operation 1740 and a conv 1×1 à 9 operation 1738 to generate 3×3 filter 1736. In at least one embodiment, conv 1×1 à 64 operation 1740 is a 1×1 convolution that generates 64 channels of output. In at least one embodiment, conv 1×1 à 9 operation 1738 is a 1×1 convolution that generates nine channels of output. In at least one embodiment, 3×3 filter 1736 is used to filter an output from average pool operation avg pool 1734 (e.g., as described herein) to generate HKPN filtered 1 data 1742. In at least one embodiment, HKPN filtered 1 data 1742 is data filtered by 3×3 filter 1736. In at least one embodiment, HKPN filtered 1 data 1742 is HKPN filtered 1 data 2026 (described below in connection with FIG. 20 and denoted by an oval labeled "TO 2026" in FIG. 17).

In at least one embodiment, HKPN filtered 1 data 1742 is provided to an average pool operation avg pool 1744, as described above. In at least one embodiment, output of CONVO 3×3 à 96 operation 1716 (described above) and output of a bilinear upsampling operation 1910 (described below in connection with FIG. 19 and denoted by an oval labeled "FROM 1910" in FIG. 17) is received at a conv 1×1 à 96 operation 1750 and a conv 1×1 à 9 operation 1748 to generate 3×3 filter 1746. In at least one embodiment, conv 1×1 à 96 operation 1750 is a 1×1 convolution that generates 96 channels of output. In at least one embodiment, conv 1×1 à 9 operation 1748 is a 1×1 convolution that generates 9 channels of output. In at least one embodiment, 3×3 filter 1746 is used to filter an output from average pool operation avg pool 1744 (e.g., as described herein) to generate HKPN filtered 2 data 1752. In at least one embodiment, HKPN filtered 2 data 1752 is data filtered by 3×3 filter 1746. In at least one embodiment, HKPN filtered 2 data 1752 is HKPN filtered 2 data 1950 (described below in connection with FIG. 19 and denoted by an oval labeled "TO 1950" in FIG. 17). In at least one embodiment, HKPN filtered 2 data 1752 is HKPN filtered 2 data 1824, described below in connection with FIG. 18 and denoted by an oval labeled "TO 1824" in FIG. 17. In at least one embodiment, a second part of a filter used to denoise an image using a neural network that follows a first part of a filter used to denoise an image using a neural network is illustrated in FIG. 18, below.

In at least one embodiment, one or more processors (e.g., processor 110 and/or other processors and/or accelerators such as those described herein) comprise one or more circuits to perform operations and/or instructions described herein in connection with FIG. 17, such as one or more circuits to cause one or more neural networks to cause one or more non-noise pixels to be identified and blended in parallel and/or otherwise perform operations described herein. In at least one embodiment, operations and/or instructions described herein in connection with FIG. 17 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 17 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 17, one or more components described herein in connection with FIG. 17 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 17, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 17 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 17 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 17, one or more components described herein in connection with FIG. 17 include one or more components described herein in connection with FIGS. 34A-80 to use one or more neural networks to adjust brightness of one or more pixels of one or more images prior to denoising the one or more images and/or otherwise perform operations described herein.

Figure 18:
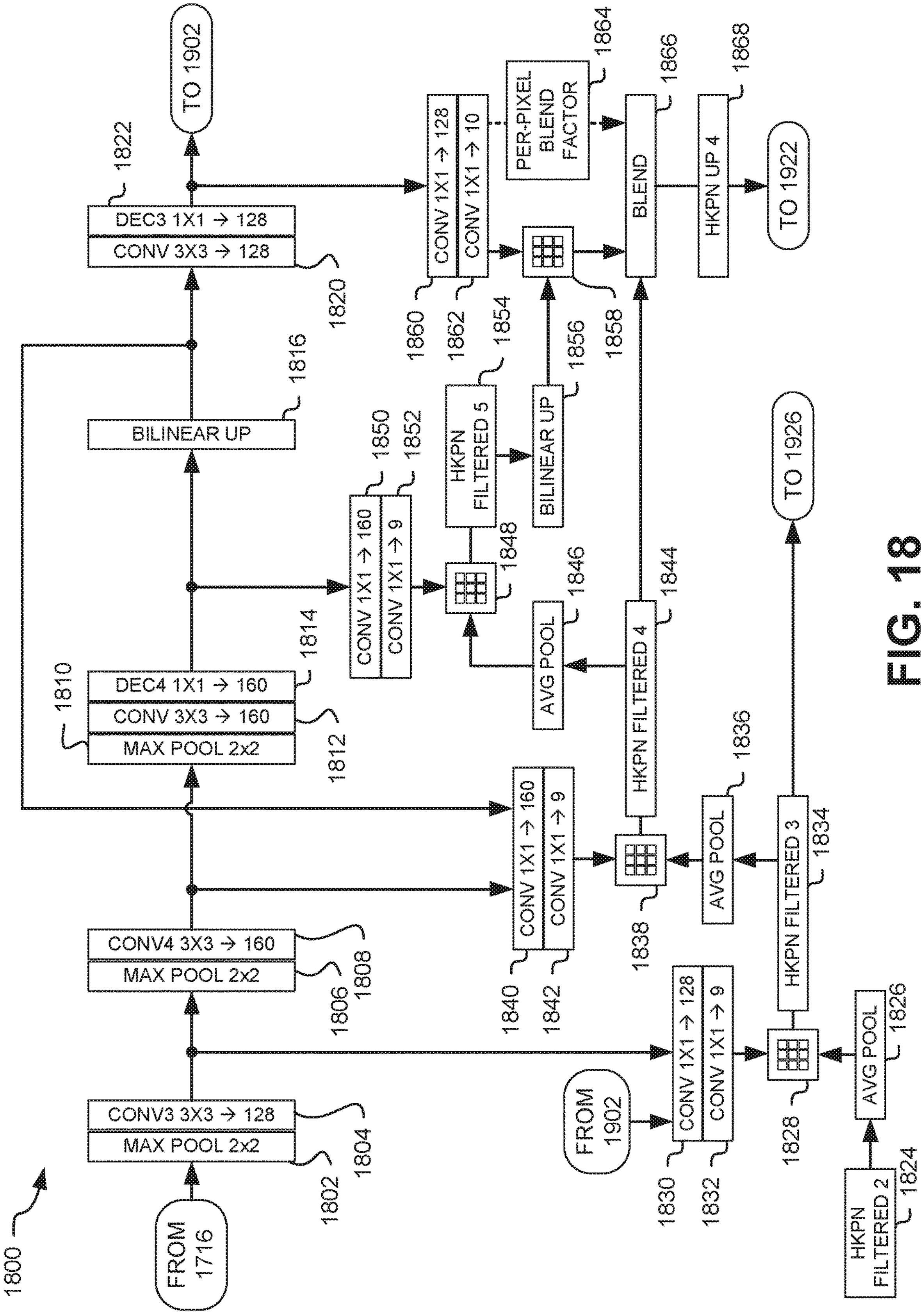
FIG. 18 is a block diagram illustrating a second part of a filter used to denoise an image using a neural network, in accordance with at least one embodiment.

FIG. 18 is a block diagram 1800 illustrating a second part of a filter used to denoise an image using a neural network, in accordance with at least one embodiment. In at least one embodiment, a second part of a filter used to denoise an image using a neural network illustrated in FIG. 18 continues from a first part of a filter used to denoise an image using a neural network, illustrated in FIG. 17, above.

In at least one embodiment, output from conv 2 3×3 à 96 operation 1716 (denoted by an oval labeled "FROM 1716" in FIG. 18) is used as input to a max pool 2×2 operation 1802 and a conv3 3×3 à 128 operation 1804. In at least one embodiment, max pool 2×2 operation 1802 is a max pool operation, as described above in connection with FIG. 17. In at least one embodiment, conv3 3×3 à 128 operation 1804 is a 3×3 convolution that generates 128 channels of output. In at least one embodiment, output of max pool 2×2 operation 1802 is used as input to conv3 3×3 à 128 operation 1804.

In at least one embodiment, output from max pool 2×2 operation 1802 and conv3 3×3 à 128 operation 1804 is used as input to a max pool 2×2 operation 1806 and a conv4 3×3 à 160 operation 1808. In at least one embodiment, max pool 2×2 operation 1806 is a max pool operation, as described above. In at least one embodiment, conv4 3×3 à 160 operation 1808 is a 3×3 convolution that generates 160 channels of output. In at least one embodiment, output of max pool 2×2 operation 1806 is used as input to conv4 3×3 à 160 operation 1808.

In at least one embodiment, output from max pool 2×2 operation 1806 and conv4 3×3 à 160 operation 1808 is used as input to a max pool 2×2 operation 1810, a conv 3×3 à 160 operation 1812, and a dec4 1×1 à 160 operation 1814. In at least one embodiment, max pool 2×2 operation 1810 is a max pool operation, as described above. In at least one embodiment, conv 3×3 à 160 operation 1812 is a 3×3 convolution that generates 160 channels of output. In at least one embodiment, dec4 1×1 à 160 operation 1814 is a 1×1 deconvolution operation that generates 160 channels of output. In at least one embodiment, a deconvolution operation is a mathematical inverse of a convolution. In at least one embodiment, dec4 1×1 à 160 operation 1814 is an initial step to process encoding layers of a filter, as described below. In at least one embodiment, output of max pool 2×2 operation 1810 is used as input to conv 3×3 à 160 operation 1812. In at least one embodiment, output of conv 3×3 à 160 operation 1812 is used as input to dec4 1×1 à 160 operation 1814.

In at least one embodiment, output from max pool 2×2 operation 1810, conv 3×3 à 160 operation 1812, and dec4 1×1 à 160 operation 1814 is used by a bilinear upsampling operation 1816. In at least one embodiment, bilinear upsampling operation 1816 is an operation to increase a size of an image (e.g., a number of pixels) in one or more dimensions, thereby making said upsampled image larger. In at least one embodiment, bilinear upsampling uses all neighbors of a pixel to calculate values (e.g., of color) of new pixels. In at least one embodiment, bilinear upsampling doubles a size of an image so that, for example, an image that is 64×64 pixels is upsampled to an image that is 128×128 pixels and all neighbors of a pixel (e.g., a pixel at (x,y) in an image) are used to calculate new values of new pixels. In at least one embodiment, not shown in FIG. 18, a nearest-neighbor upsampling operation, a bicubic upsampling operation, and/or other upsampling/resampling techniques are used in addition to or instead of bilinear upsampling operation 1816. In at least one embodiment, after bilinear upsampling operation 1816 a filter described in connection with FIGS. 17-20 begins encoding, as described herein.

In at least one embodiment, output of bilinear upsampling operation 1816 is provided to a conv 3×3 à 128 operation 1820 and a dec3 1×1 à 128 operation 1822. In at least one embodiment, conv 3×3 à 128 operation 1820 is a 3×3 convolution operation that generates 128 channels of output. In at least one embodiment, dec3 1×1 à 128 operation 1822 is a is a 1×1 deconvolution operation that generates 128 channels of output. In at least one embodiment, output of bilinear upsampling operation 1816 is also provided to a conv 1×1 à 160 operation 1840 and a conv 1×1 à 9 operation 1842. In at least one embodiment, conv 1×1 à 160 operation 1840 is a 1×1 convolution (e.g., as described herein) that generates 160 channels of output. In at least one embodiment, conv 1×1 à 9 operation 1842 is a 1×1 convolution that generates 9 channels of output. In at least one embodiment, output of 3×3 à 128 operation 1820 is used as input to dec3 1×1 à 128 operation 1822.

In at least one embodiment, output of conv 3×3 à 128 operation 1820 and dec3 1×1 à 128 operation 1822 is used by a bilinear up operation 1902 (described below in connection with FIG. 19 and denoted by an oval labeled "TO 1902" in FIG. 18). In at least one embodiment, output of conv 3×3 à 128 operation 1820 and dec3 1×1 à 128 operation 1822 is also used by 1×1 à 128 operation 1860 and 1×1 à 10 operation 1862, described below.

In at least one embodiment, HKPN filtered 2 data 1824 (e.g., HKPN filtered 2 data 1852, described above in connection with FIG. 18), is provided as input to an average pool operation 1826. In at least one embodiment, output of CONV3 3×3 à 128 operation 1804 and output of a bilinear upsampling operation 1902 (described below in connection with FIG. 19 and denoted by an oval labeled "FROM 1902" in FIG. 18) are used as input to a conv 1×1 à 128 operation 1830 and a conv 1×1 à 9 operation 1832 to generate 3×3 filter 1828. In at least one embodiment, CONV 1×1 à 128 operation 1830 is a 1×1 convolution that generates 128 channels of output. In at least one embodiment, conv 1×1 à 9 operation 1832 is a 1×1 convolution that generates nine channels of output. In at least one embodiment, 3×3 filter 1828 is used to filter an output from average pool operation avg pool 1828 to generate HKPN filtered 3 data 1834. In at least one embodiment, HKPN filtered 3 data 1834 is data filtered by 3×3 filter 1828. In at least one embodiment, HKPN filtered 3 data 1834 is HKPN filtered 3 data 1926 (described below in connection with FIG. 19 and denoted by an oval labeled "TO 1926" in FIG. 18). In at least one embodiment, output of conv 1×1 à 128 operation 1830 is used as input to conv 1×1 à 9 operation 1832.

In at least one embodiment, HKPN filtered 3 data 1834 is used as input to an average pool operation 1836. In at least one embodiment, output of CONV4 3×3 à 160 operation 1808 and output of a bilinear upsampling operation 1816 are used as input to a conv 1×1 à 160 operation 1840 and a conv 1×1 à 9 operation 1842 to generate 3×3 filter 1838. In at least one embodiment, CONV 1×1 à 160 operation 1840 is a 1×1 convolution that generates 160 channels of output. In at least one embodiment, conv 1×1 à 9 operation 1842 is a 1×1 convolution that generates nine channels of output. In at least one embodiment, 3×3 filter 1838 is used to filter an output from average pool operation avg pool 1836 to generate HKPN filtered 4 data 1844. In at least one embodiment, HKPN filtered 4 data 1834 is data filtered by 3×3 filter 1838. In at least one embodiment, HKPN filtered 4 data 1844 is provided to a blend operation 1866, described below. In at least one embodiment, output of conv 1×1 à 160 operation 1840 is used as input to conv 1×1 à 9 operation 1842.

In at least one embodiment, HKPN filtered 4 data 1844 is used as input to an average pool operation 1846. In at least one embodiment, output of DEC4 3×3 à 160 operation 1814 is received at a conv 1×1 à 160 operation 1850 and a conv 1×1 à 9 operation 1852 to generate 3×3 filter 1848. In at least one embodiment, CONV 1×1 à 160 operation 1850 is a 1×1 convolution that generates 160 channels of output. In at least one embodiment, conv 1×1 à 9 operation 1852 is a 1×1 convolution that generates nine channels of output. In at least one embodiment, 3×3 filter 1848 is used to filter an output from average pool operation avg pool 1846 to generate HKPN filtered 5 data 1854. In at least one embodiment, HKPN filtered 5 data 1854 is data filtered by 3×3 filter 1848.

In at least one embodiment, HKPN filtered 5 data 1854 is used as input to bilinear upsampling operation 1856. In at least one embodiment, bilinear upsampling operation 1856 is a bilinear upsampling operation as described above. In at least one embodiment, output of DEC3 3×3 à 128 operation 1822 is used as input to a conv 1×1 à 128 operation 1860 and a conv 1×1 à 10 operation 1862 to generate 3×3 filter 1858 (e.g., using nine values of conv 1×1 à 10 operation 1862) and a per-pixel blend factor 1864 (e.g., using a tenth value of conv 1×1 à 10 operation 1862). In at least one embodiment, conv 1×1 à 128 operation 1860 is a 1×1 convolution that generates 128 channels of output. In at least one embodiment, conv 1×1 à 10 operation 1862 is a 1×1 convolution that generates ten channels of output, as described above. In at least one embodiment, 3×3 filter 1858 is used to filter output of bilinear up 1856. In at least one embodiment, output of conv 1×1 à 128 operation 1860 is used as input to conv 1×1 à 10 operation 1862.

In at least one embodiment, per-pixel blend factor 1864 is used to blend 1866 output of 3×3 filter 1858 with HKPN filtered 4 data 1844 to generate HKPN up 4 data 1868. In at least one embodiment, a pixel of HKPN up 4 data 1868 is generated by blending a corresponding pixel of HKPN filtered 4 data 1844 with a corresponding pixel of output of 3×3 filter 1858 according to per-pixel blend factor 1864 (e.g., a pixel of HKPN up 4 data 1868 is per-pixel blend factor 1864 times a pixel of HKPN filtered 4 data 1844 plus one minus per-pixel blend factor 1864 times a pixel of output of 3×3 filter 1858 or a pixel of HKPN up 4 data 1868 is one minus per-pixel blend factor 1864 times a pixel of HKPN filtered 4 data 1844 plus per-pixel blend factor 1864 times a pixel of output of 3×3 filter 1858). To illustrate the foregoing, in at least one embodiment, if HF4i,j is a pixel of HKPN filtered 4 data 1844, Fi,j is a pixel of an output of 3×3 filter 1858, HU4i,j is a pixel of HKPN up 4 data 1868, and b is per-pixel blend factor 1864, then HU4i,j=b (HU4i,j)+(1−b) (Fi,j) or HU4i,j=(1−b) (HF4i,j)+(b) (Fi,j). In at least one embodiment, i and j of HU4i,j, HU4i,j, and Fi,j are each identical values (e.g., a pixel of HKPN up 4 data 1868 is blended from a corresponding pixel of HKPN filtered 4 data 1844 and a corresponding pixel of output of 3×3 filter 1858). In at least one embodiment, one or more of i and j are different values in one or more of HU4i,j, HU4i,j, and Fi,j (e.g., a pixel of HKPN up 4 data 1868 is blended from a noncorresponding pixel of HKPN filtered 4 data 1844 and/or a noncorresponding pixel of output of 3×3 filter 1858). In at least one embodiment, HKPN up 4 data 1868 is HKPN up 4 data 1922 (described below in connection with FIG. 19 and denoted by an oval labeled "TO 1922" in FIG. 18). In at least one embodiment, a third part of a filter used to denoise an image using a neural network that follows a second part of a filter used to denoise an image using a neural network is illustrated in FIG. 19, below.

In at least one embodiment, one or more processors (e.g., processor 110 and/or other processors and/or accelerators such as those described herein) comprise one or more circuits to perform operations and/or instructions described herein in connection with FIG. 18, such as one or more circuits to cause one or more neural networks to cause one or more non-noise pixels to be identified and blended in parallel and/or otherwise perform operations described herein. In at least one embodiment, operations and/or instructions described herein in connection with FIG. 18 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 18 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 18, one or more components described herein in connection with FIG. 18 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 18, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 18 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 18 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 18, one or more components described herein in connection with FIG. 18 include one or more components described herein in connection with FIGS. 34A-80 to use one or more neural networks to adjust brightness of one or more pixels of one or more images prior to denoising the one or more images and/or otherwise perform operations described herein.

Figure 19:
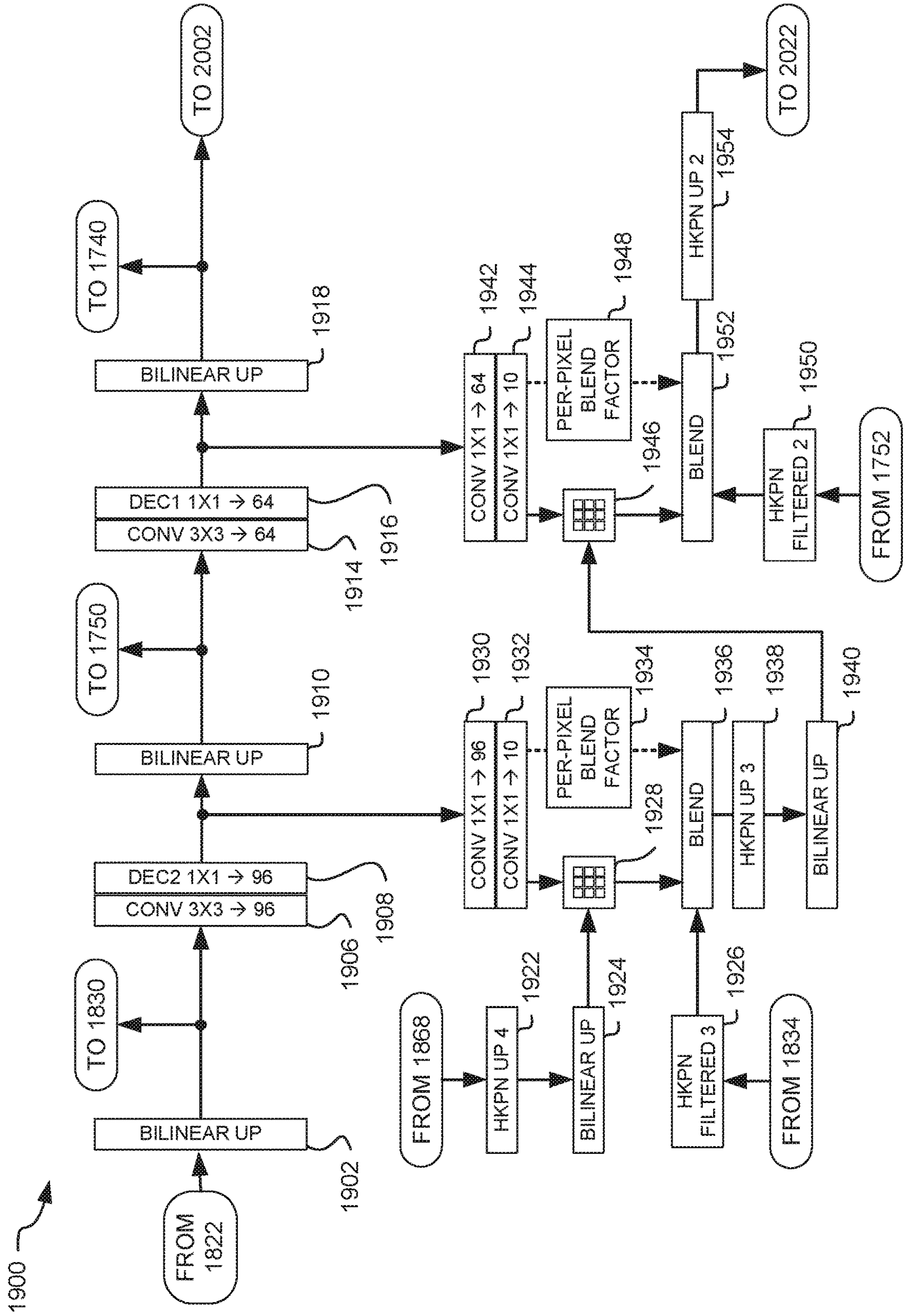
FIG. 19 is a block diagram illustrating a third part of a filter used to denoise an image using a neural network, in accordance with at least one embodiment.

FIG. 19 is a block diagram 1900 illustrating a third part of a filter used to denoise an image using a neural network, in accordance with at least one embodiment. In at least one embodiment, a third part of a filter used to denoise an image using a neural network illustrated in FIG. 19 continues from a second part of a filter used to denoise an image using a neural network, illustrated in FIG. 18, above.

In at least one embodiment, output from December 3 1×1 à 128 operation 1822 (denoted by an oval labeled "FROM 1822" in FIG. 19) is used as input to a bilinear upsampling operation 1902. In at least one embodiment, output of bilinear upsampling operation 1902 is used as input to a conv 3×3 à 96 operation 1906 and a dec2 1×1 à 96 operation 1908. In at least one embodiment, conv 3×3 à 96 operation 1906 is a 3×3 convolution that generates 96 channels of output. In at least one embodiment, dec2 1×1 à 96 operation 1908 is a 1×1 deconvolution operation that generates 96 channels of output. In at least one embodiment, output of conv 3×3 à 96 operation 1906 is used as input to dec2 1×1 à 96 operation 1908. In at least one embodiment, output of bilinear upsampling operation 1902 is also used as input to conv 1×1 à 128 operation 1830 (described above in connection with FIG. 18 and denoted by an oval labeled "TO 1830" in FIG. 19).

In at least one embodiment, output from conv 3×3 à 96 operation 1906 and dec2 1×1 à 96 operation 1908 is used as input to a bilinear upsampling operation 1910. In at least one embodiment, output of bilinear upsampling operation 1910 is used as input to a conv 3×3 à 64 operation and a dec1 1×1 à 64 operation 1916. In at least one embodiment, conv 3×3 à 64 operation 1914 is a 3×3 convolution that generates 64 channels of output. In at least one embodiment, dec1 1×1 à 64 operation 1916 is a 1×1 deconvolution operation that generates 64 channels of output. In at least one embodiment, output of conv 3×3 à 64 operation 1914 is used as input to dec1 1×1 à 64 operation 1916. In at least one embodiment, output of bilinear upsampling operation 1910 is also used as input to conv 1×1 à 96 operation 1750 (described above in connection with FIG. 17 and denoted by an oval labeled "TO 1750" in FIG. 19).

In at least one embodiment, output from conv 3×3 à 64 operation 1914 and dec1 1×1 à 64 operation 1916 is used as input to a bilinear upsampling operation 1918. In at least one embodiment, output of bilinear upsampling operation 1918 is used as input to a conv 3×3 à 32 operation 2002 and a dec0 1×1 à 32 operation 2004 (described below in connection with FIG. 20 and denoted by an oval labeled "TO 2002" in FIG. 19). In at least one embodiment, output of bilinear upsampling operation 1918 is also used as input to conv 1×1 à 64 operation 1740 (described above in connection with FIG. 17 and denoted by an oval labeled "TO 1740" in FIG. 19).

In at least one embodiment, HKPN up 4 data 1922 (which is HKPN up 4 data 1868 described above in connection with FIG. 18 and denoted by an oval labeled "FROM 1868" in FIG. 19) is used as input to a bilinear upsampling operation 1924. In at least one embodiment, output of bilinear upsampling operation 1924 is used as input to a 3×3 filter 1928. In at least one embodiment, output of DEC2 1×1 à 96 operation 1908 is used as input to a conv 1×1 à 96 operation 1930 and a conv 1×1 à 10 operation 1932 to generate 3×3 filter 1928 and per-pixel blend factor 1934. In at least one embodiment, conv 1×1 à 96 operation 1930 is a 1×1 convolution that generates 96 channels of output. In at least one embodiment, conv 1×1 à 10 operation 1932 is a 1×1 convolution that generates ten channels of output. In at least one embodiment, 3×3 filter 1928 is used to filter output of bilinear up 1924. In at least one embodiment, output of conv 1×1 à 96 operation 1930 is used as input to conv 1×1 à 10 operation 1932.

In at least one embodiment, per-pixel blend factor 1934 is used to blend 1936 output of 3×3 filter 1928 with HKPN filtered 3 data 1926 (which is HKPN filtered 3 data 1834, described above in connection with FIG. 18 and denoted by an oval labeled "FROM 1834 in FIG. 19) to generate HKPN up 3 data 1938. In at least one embodiment, per-pixel blend factor 1934 is used to blend 1936 output of 3×3 filter 1928 with HKPN filtered 3 data 1926 as described above in connection with FIG. 18.

In at least one embodiment, HKPN up 3 data 1938 is used as input to a bilinear upsampling operation 1940. In at least one embodiment, output of bilinear upsampling operation 1924 is used as input to a 3×3 filter 1946. In at least one embodiment, output of DEC1 1×1 à 64 operation 1916 is used as input to a conv 1×1 à 64 operation 1942 and a conv 1×1 à 10 operation 1944 to generate 3×3 filter 1946 and per-pixel blend factor 1948. In at least one embodiment, conv 1×1 à 64 operation 1942 is a 1×1 convolution that generates 64 channels of output. In at least one embodiment, conv 1×1 à 10 operation 1944 is a 1×1 convolution that generates ten channels of output. In at least one embodiment, 3×3 filter 1946 is used to filter output of bilinear up 1940. In at least one embodiment, output of conv 1×1 à 64 operation 1942 is used as input to conv 1×1 à 10 operation 1944.

In at least one embodiment, per-pixel blend factor 1948 is used to blend 1952 output of 3×3 filter 1946 with HKPN filtered 2 data 1950 (which is HKPN filtered 2 data 1752, described above in connection with FIG. 17 and denoted by an oval labeled "FROM 1752 in FIG. 19) to generate HKPN up 2 data 1954. In at least one embodiment, per-pixel blend factor 1948 is used to blend 1952 output of 3×3 filter 1946 with HKPN filtered 2 data 1950 as described above in connection with FIG. 18. In at least one embodiment, HKPN up 2 data 1954 is HKPN up 2 data 2022 (described below in connection with FIG. 20 and denoted by an oval labeled "TO 2022" in FIG. 19). In at least one embodiment, a fourth part of a filter used to denoise an image using a neural network that follows a third part of a filter used to denoise an image using a neural network is illustrated in FIG. 20, below.

In at least one embodiment, one or more processors (e.g., processor 110 and/or other processors and/or accelerators such as those described herein) comprise one or more circuits to perform operations and/or instructions described herein in connection with FIG. 19, such as one or more circuits to cause one or more neural networks to cause one or more non-noise pixels to be identified and blended in parallel and/or otherwise perform operations described herein. In at least one embodiment, operations and/or instructions described herein in connection with FIG. 19 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 19 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 19, one or more components described herein in connection with FIG. 19 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 19, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 19 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 19 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 19, one or more components described herein in connection with FIG. 19 include one or more components described herein in connection with FIGS. 34A-80 to use one or more neural networks to adjust brightness of one or more pixels of one or more images prior to denoising the one or more images and/or otherwise perform operations described herein.

Figure 20:
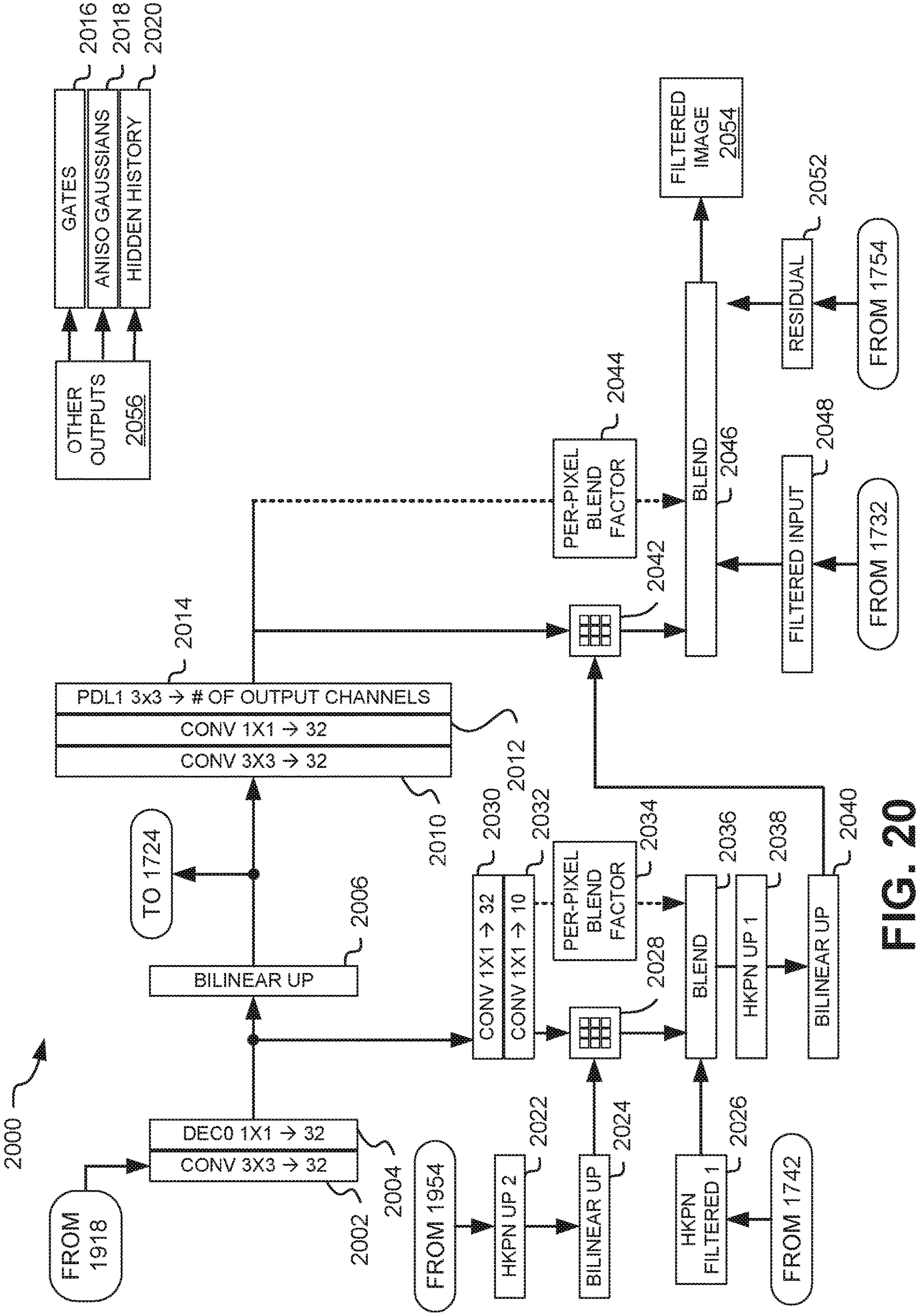
FIG. 20 is a block diagram illustrating a fourth part of a filter used to denoise an image using a neural network, in accordance with at least one embodiment.

FIG. 20 is a block diagram 2000 illustrating a fourth part of a filter used to denoise an image using a neural network, in accordance with at least one embodiment. In at least one embodiment, a fourth part of a filter used to denoise an image using a neural network illustrated in FIG. 20 continues from a third part of a filter used to denoise an image using a neural network, illustrated in FIG. 19, above.

In at least one embodiment, output from bilinear upsampling operation 1918 (denoted by an oval labeled "FROM 1918" in FIG. 20) is used as input to a conv 3×3 à 32 operation 2002 and a dec0 1×1 à 32 operation 2004. In at least one embodiment, conv 3×3 à 32 operation 2002 is a 3×3 convolution that generates 32 channels of output. In at least one embodiment, dec0 1×1 à 32 operation 2004 is a 1×1 deconvolution operation that generates 32 channels of output. In at least one embodiment, output of conv 3×3 à 32 operation 2002 is used as input to dec0 1×1 à 32 operation 2004.

In at least one embodiment, output from dec0 1×1 à 32 operation 2004 is used as input to a bilinear upsampling operation 2006. In at least one embodiment, output of bilinear upsampling operation 2006 is used as input to a conv 3×3 à 32 operation 2010, a conv 1×1 à 32 operation 2012, and a PDL1 3×3 à number of output channels operation 2014. In at least one embodiment, conv 3×3 à 32 operation 2010 is a 3×3 convolution that generates 32 channels of output. In at least one embodiment, conv 1×1 à 32 operation 2012 is a 1×1 convolution that generates 32 channels of output. In at least one embodiment, PDL1 3×3 à number of output channels operation 2014 is an operation that generates a number of output channels needed to generate an output image using systems, methods, operations, and/or instructions described herein. In at least one embodiment, PDL1 3×3 à number of output channels operation 2014 generates ten channels of output (e.g., nine channels of 3×3 filter 2042, described below and one channel used as a per-pixel blend factor 2044, also described below). In at least one embodiment, output of conv 3×3 à 32 operation 2010 is used as input to conv 1×1 à 32 operation 2012. In at least one embodiment, output of conv 1×1 à 32 operation 2012 is used as input to PDL1 3×3 à number of output channels operation 2014. In at least one embodiment, output of bilinear upsampling operation 2006 is also used as input to conv 1×1 à 32 operation 1724 (described above in connection with FIG. 17 and denoted by an oval labeled "TO 1724" in FIG. 20).

In at least one embodiment, HKPN up 1 data 2022 (which is HKPN up 2 data 1954 described above in connection with FIG. 19 and denoted by an oval labeled "FROM 1954" in FIG. 20) is used as input to a bilinear upsampling operation 2024. In at least one embodiment, output of bilinear upsampling operation 2024 is used as input to a 3×3 filter 2028. In at least one embodiment, output of DEC0 1×1 à 32 operation 2004 is used as input to a conv 1×1 à 32 operation 2030 and a conv 1×1 à 10 operation 2032 to generate 3×3 filter 2028 and per-pixel blend factor 2034. In at least one embodiment, conv 1×1 à 32 operation 2030 is a 1×1 convolution that generates 32 channels of output. In at least one embodiment, conv 1×1 à 10 operation 2032 is a 1×1 convolution that generates ten channels of output. In at least one embodiment, 3×3 filter 2028 is used to filter output of bilinear up 2024. In at least one embodiment, output of conv 1×1 à 32 operation 2030 is used as input to conv 1×1 à 10 operation 2032.

In at least one embodiment, per-pixel blend factor 2034 is used to blend 2036 output of 3×3 filter 2028 with HKPN filtered 1 data 2026 (which is HKPN filtered 1 data 1742, described above in connection with FIG. 17 and denoted by an oval labeled "FROM 1742 in FIG. 20) to generate HKPN up 1 data 2038. In at least one embodiment, per-pixel blend factor 2034 is used to blend 2036 output of 3×3 filter 2028 with HKPN filtered 1 data 2026 as described above in connection with FIG. 18.

In at least one embodiment, HKPN up 1 data 2038 is used as input to a bilinear upsampling operation 2040. In at least one embodiment, output of PDL1 3×3 à number of output channels operation 2014 is used to generate a 3×3 filter 2042 and a per-pixel blending factor 2044. In at least one embodiment, not shown in FIG. 20, output of PDL1 3×3 à number of output channels operation 2014 is used as input to a conv 1×1 à 10 operation (e.g., a 1×1 convolution that generates ten channels of output) that is used to generate 3×3 filter 2042 and per-pixel blending factor 2044, as described above. In at least one embodiment, 3×3 filter 2042 is used to filter output of bilinear up 2040.

In at least one embodiment, per-pixel blend factor 2044 is used to blend 2046 output of 3×3 filter 2042 with filtered input 2048 (which is filtered input 1732, described above in connection with FIG. 17 and denoted by an oval labeled "FROM 1732 in FIG. 20) to generate filtered image 2054. In at least one embodiment, per-pixel blend factor 2044 is also used to blend 2046 output of 3×3 filter 2042 with residual 2052 (which is residual 1754, described above in connection with FIG. 17 and denoted by an oval labeled "FROM 1754 in FIG. 20) to generate filtered image 2054. In at least one embodiment, per-pixel blend factor 2044 comprises a plurality of per-pixel blend factors so that, for example, blend 2046 performs a first blend of output of 3×3 filter 2042 with filtered input 2048 using a first per-pixel blend factor followed by a second blend of a result of said first blend with residual 2052 using a second per-pixel blend factor. In at least one embodiment, blend 2046 performs a plurality of blends (e.g., of output of 3×3 filter 1942, filtered input 2048, and residual 2052) using one or more per-pixel blend factors of per-pixel blend factor 2044. In at least one embodiment, blend 2046 performs a plurality of blends by, for example, first blending output of 3×3 filter 1942 with filtered input 2048 to generate a first result, then blending output of 3×3 filter 1942 with residual 2052 to generate a second result, then blending said first result with said second result to generate filtered image 2054. In at least one embodiment, a plurality of results of blend 2046 are included in filtered image 2054. In at least one embodiment, filtered image 2054 is a filtered and/or denoised image such as one of denoised image frames 116, described herein at least in connection with FIG. 1.

In at least one embodiment, a fourth part of a filter used to denoise an image using a neural network illustrated in FIG. 20 produces one or more outputs including, but not limited to, filtered image 2054. In at least one embodiment, a fourth part of a filter used to denoise an image using a neural network illustrated in FIG. 20 produces one or more other outputs 2056. In at least one embodiment, other outputs 2056 comprises one or more of gates 2016, anisotropic gaussians 2018, and/or hidden history 2020. In at least one embodiment, gates 2016 are filters used to blend images. In at least one embodiment, anisotropic gaussians 2018 are filters used to filter an output image. In at least one embodiment, hidden history 2020 is image metadata used to inform subsequent iterations of neural network training and/or inferencing.

In at least one embodiment, one or more processors (e.g., processor 110 and/or other processors and/or accelerators such as those described herein) comprise one or more circuits to perform operations and/or instructions described herein in connection with FIG. 20, such as one or more circuits to cause one or more neural networks to cause one or more non-noise pixels to be identified and blended in parallel and/or otherwise perform operations described herein. In at least one embodiment, operations and/or instructions described herein in connection with FIG. 20 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 20 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 20, one or more components described herein in connection with FIG. 20 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 20, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 20 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 20 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 20, one or more components described herein in connection with FIG. 20 include one or more components described herein in connection with FIGS. 34A-80 to use one or more neural networks to adjust brightness of one or more pixels of one or more images prior to denoising the one or more images and/or otherwise perform operations described herein.

Figure 21:
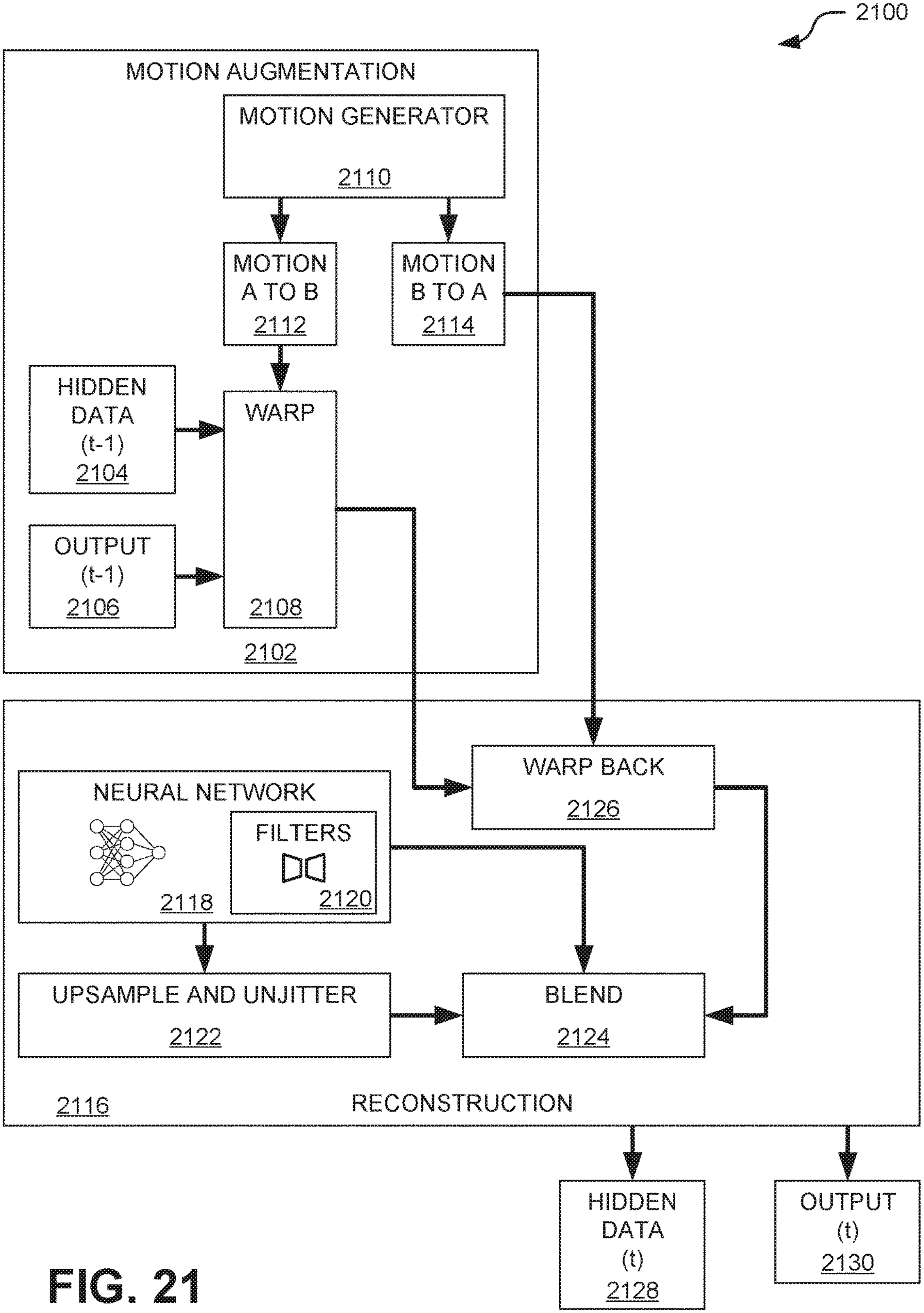
FIG. 21 is a block diagram illustrating motion augmentation and reconstruction using a neural network, in accordance with at least one embodiment.

FIG. 21 is a block diagram 2100 illustrating motion augmentation and reconstruction using a neural network, in accordance with at least one embodiment. In at least one embodiment, motion augmentation 2102 is performed using one or more of output (t−1) 2106 and hidden data (t−1) 2104. In at least one embodiment, output (t−1) 2106 is output (t−1) such as output (t−1) 1120, described herein at least in connection with FIG. 11. In at least one embodiment, hidden data (t−1) 2104 is hidden data (t−1) such as hidden data (t−1) 1118, described herein at least in connection with FIG. 11.

In at least one embodiment, a motion generator 2110 is used to generate motion frames as described herein. In at least one embodiment, motion generator 2110 generates a first motion frame (e.g., motion from A to B 2112) that warps 2108 (e.g., transforms) one or more of output (t−1) 2106 and/or hidden data (t−1) 2104 using systems, methods, operations, and instructions such as those described herein. In at least one embodiment, motion generator 2110 generates a second motion frame (e.g., motion from B to A 2114) that is the opposite of said first motion frame (e.g., motion from A to B 2112) as described herein. In at least one embodiment, for example, if motion generator 2110 generates a first motion frame (e.g., motion from A to B 2112) that translates an object in output (t−1) 2106 to the left one pixel and down two pixels, motion generator 2110 generates a second motion (e.g., motion from B to A 2114) that translates said object in an image (e.g., output (t−1) 2106) to the right one pixel and up two pixels (e.g., used to resample an image from a location that is to the right and up), as described herein.

In at least one embodiment, a warped (e.g., resampled) image generated by warp 2108 is sent or otherwise provided to reconstruction 2116. In at least one embodiment, a neural network 2118 with one or more filters 2120 receives an image (not shown in FIG. 21) that is denoised using systems, methods, operations, and instructions such as those described herein. In at least one embodiment, neural network 2118 is a neural network such as neural network 704, described herein at least in connection with FIG. 7 and filters 2120 are filters such as filters 708, also described herein at least in connection with FIG. 7. In at least one embodiment, filters 2120 comprises one or more filters of a HKPN, as described herein in connection with FIGS. 17-20.

In at least one embodiment, motion from B to A 2114 is used to warp a warped image (e.g., an image produced by warp 2108) back (e.g., using warp back 2126). In at least one embodiment, an image that results from warp back 2126 (e.g., from warping, resampling, warping, and resampling output (t−1) 2106) is similar to but not identical to output (t−1) 2106, as described herein. In at least one embodiment, an image that is produced by neural network 2118 is upsampled and unjittered as described herein (e.g., as described herein at least in connection with FIG. 11) using upsample and unjitter 2122. In at least one embodiment, an image generated by upsample and unjitter 2122 is used in one or more blend operations (e.g., blend 2124), as described herein. In at least one embodiment, an image produced by warp back 2126 is used in one or more blend operations (e.g., blend 2124) in addition to one or more of an upsampled and unjittered image (e.g., using upsample and unjitter 2122) and/or an image generated by neural network 2118, using systems, methods, operations, and instructions such as those described herein.

In at least one embodiment, reconstruction 2116 generates output (t) 2130 and/or hidden data (t) 2128. In at least one embodiment, output (t) is output (t) such as output (t) 1132, described herein at least in connection with FIG. 11. In at least one embodiment, hidden data (t) is hidden data (t) such as hidden data (t) 1130, described herein at least in connection with FIG. 11.

In at least one embodiment, one or more processors (e.g., processor 110 and/or other processors and/or accelerators such as those described herein) comprise one or more circuits to perform operations and/or instructions described herein in connection with FIG. 21, such as one or more circuits to cause one or more neural networks to cause one or more non-noise pixels to be identified and blended in parallel and/or otherwise perform operations described herein. In at least one embodiment, operations and/or instructions described herein in connection with FIG. 21 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 21 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 21, one or more components described herein in connection with FIG. 21 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 21, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 21 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 21 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 21, one or more components described herein in connection with FIG. 21 include one or more components described herein in connection with FIGS. 34A-80 to use one or more neural networks to adjust brightness of one or more pixels of one or more images prior to denoising the one or more images and/or otherwise perform operations described herein.

Figure 22:
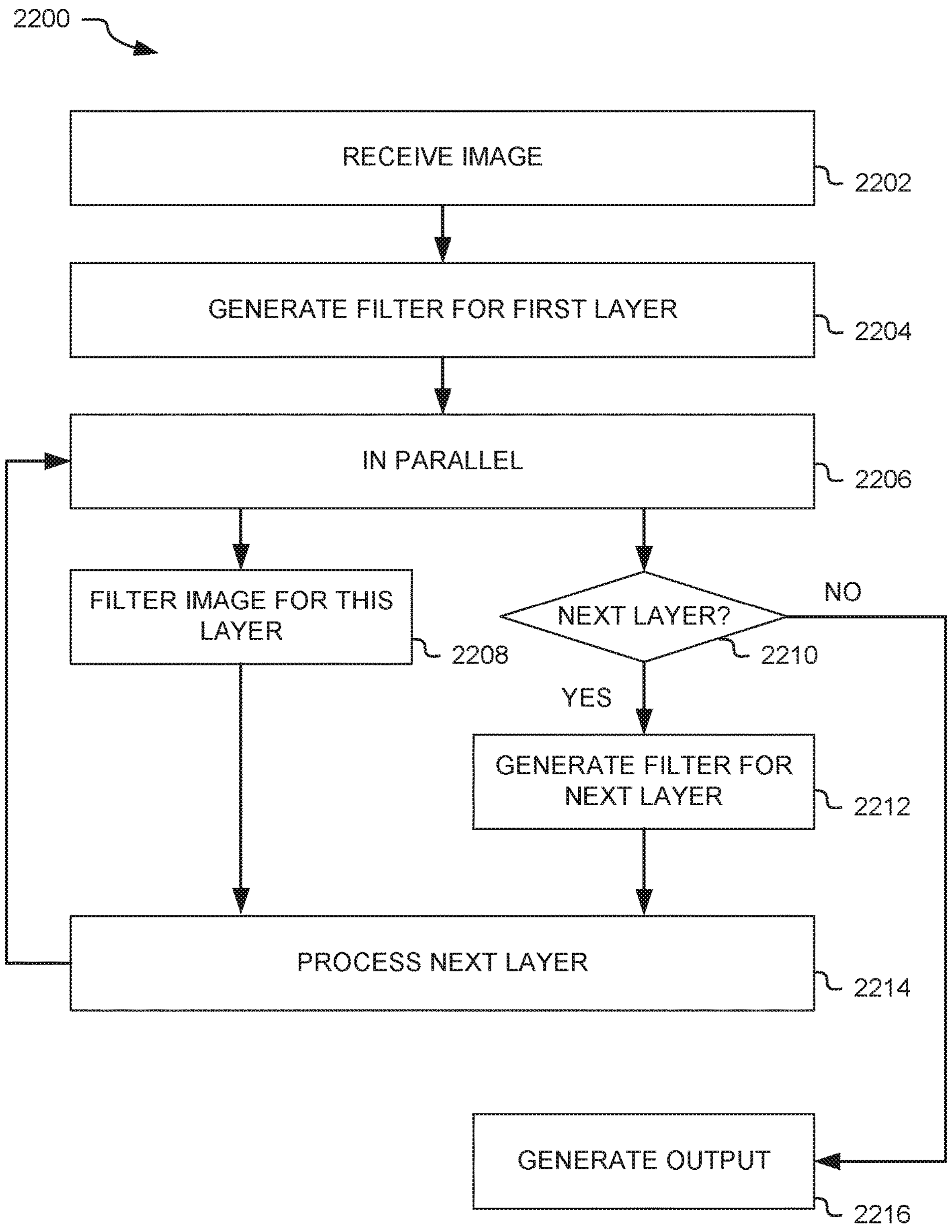
FIG. 22 is a block diagram illustrating a process to use a parallel implementation of a filter to denoise an image, in accordance with at least one embodiment.

FIG. 22 is a block diagram 2200 illustrating a process to use a parallel implementation of a filter to denoise an image, in accordance with at least one embodiment. In at least one embodiment, some or all of said process to use a parallel implementation of a filter to denoise an image illustrated in block diagram 2200 (or any other processes described herein, or variations and/or combinations thereof) is performed under control of one or more computer systems, such as those described in FIGS. 34A-80, configured with computer-executable instructions and is implemented as code (e.g., computer-executable instructions, one or more computer programs, or one or more applications) executing collectively on one or more processors, by hardware, software, or combinations thereof. In at least one embodiment, said code is stored on a computer-readable storage medium in form of a computer program comprising a plurality of computer-readable instructions executable by one or more processors such as those described herein. In at least one embodiment, a computer-readable storage medium is a non-transitory computer-readable medium. In at least one embodiment, a processor such as processor 110, described herein at least in connection with FIG. 1, performs one or more steps of said process to use a parallel implementation of a filter to denoise an image illustrated in block diagram 2200. In at least one embodiment, one or more other processors such as those described herein perform one or more steps of said process to use a parallel implementation of a filter to denoise an image illustrated in block diagram 2200.

In at least one embodiment, at step 2202 of said process to use a parallel implementation of a filter to denoise an image illustrated in block diagram 2200, a processor performs one or more operations to receive an image. In at least one embodiment, at step 2202, a received image received is sent, indicated, or otherwise provided to a neural network such as neural network 112, described herein at least in connection with FIG. 1. In at least one embodiment, after step 2202, said process to use a parallel implementation of a filter to denoise an image illustrated in block diagram 2200 continues at step 2204.

In at least one embodiment, at step 2204 of said process to use a parallel implementation of a filter to denoise an image illustrated in block diagram 2200, a processor performs one or more operations to generate filter data (e.g., a 3×3 matrix) to perform a first layer of downsampling an image received at step 2202 (e.g., as described herein at least in connection with FIGS. 15-20). In at least one embodiment, at step 2204, filter data is provided to said first layer of downsampling an image received at step 2202 and is also provided to a last layer of upsampling of an image received at step 2202 (e.g., also as described herein at least in connection with FIGS. 15-20). In at least one embodiment, after step 2204, said process to use a parallel implementation of a filter to denoise an image illustrated in block diagram 2200 continues at step 2206.

In at least one embodiment, at step 2206 of said process to use a parallel implementation of a filter to denoise an image illustrated in block diagram 2200, a processor performs one or more of step 2208, step 2210, and step 2212 in parallel. In at least one embodiment, after step 2206, said process to use a parallel implementation of a filter to denoise an image illustrated in block diagram 2200 continues at step 2208 and, in parallel, continues at step 2210.

In at least one embodiment, at step 2208 of said process to use a parallel implementation of a filter to denoise an image illustrated in block diagram 2200, a processor performs one or more operations to generate filter data to perform a first layer of downsampling of an image (e.g., received at step 2202) that is used to downsample said image, as described herein. In at least one embodiment, at step 2208, filter data generated is used to perform a next layer (e.g., generated at a previous iteration of step 2212, described below) and is used to downsample (or upsample)

a result of performing a previous iteration of step 2208 (e.g., to downsample a downsampled image, to upsample a downsampled image, or to upsample an upsampled image). In at least one embodiment, after step 2208, said process to use a parallel implementation of a filter to denoise an image illustrated in block diagram 2200 continues at step 2214. In at least one embodiment, in parallel with step 2208, said process to use a parallel implementation of a filter to denoise an image illustrated in block diagram 2200 performs step 2210 and step 2212.

In at least one embodiment, at step 2210 of said process to use a parallel implementation of a filter to denoise an image illustrated in block diagram 2200, a processor performs one or more operations to determine whether to process a next layer. In at least one embodiment, at step 2210, it is determined whether to process a next layer based on whether all layers of a parallel implementation of a filter to denoise an image have been completed (e.g., all downsampling layers and all upsampling layers). In at least one embodiment, at step 2210, if it is determined to process a next layer ("YES" branch), said process to use a parallel implementation of a filter to denoise an image illustrated in block diagram 2200 continues at step 2212. In at least one embodiment, at step 2210, if it is determined not to process a next layer ("NO" branch), said process to use a parallel implementation of a filter to denoise an image illustrated in block diagram 2200 continues at step 2216. In at least one embodiment, step 2210 and step 2212, described below, are performed in parallel with step 2208, described above.

In at least one embodiment, at step 2212 of said process to use a parallel implementation of a filter to denoise an image illustrated in block diagram 2200, a processor performs one or more operations to generate a filter to process a next layer. In at least one embodiment, at step 2212, a filter of a next layer to be processed is generated so that said filter can be used to filter an image at a next iteration of step 2208, as described above. In at least one embodiment, after step 2212, said process to use a parallel implementation of a filter to denoise an image illustrated in block diagram 2200 continues at step 2214. In at least one embodiment, step 2210, described above, and step 2212 are performed in parallel with step 2208, described above.

In at least one embodiment, at step 2214 of said process to use a parallel implementation of a filter to denoise an image illustrated in block diagram 2200, after step 2208 and step 2212 complete, said process to use a parallel implementation of a filter to denoise an image illustrated in block diagram 2200 processes a next layer, continuing at step 2206, described above.

In at least one embodiment, at step 2216 of said process to use a parallel implementation of a filter to denoise an image illustrated in block diagram 2200, a processor performs one or more operations to generate output (e.g., to generate denoised image frames such as denoised image frames 116, described herein at least in connection with FIG. 1). In at least one embodiment, after step 2216, said process to use a parallel implementation of a filter to denoise an image illustrated in block diagram 2200 terminates. In at least one embodiment, not shown in FIG. 22, after step 2216, said process to use a parallel implementation of a filter to denoise an image illustrated in block diagram 2200 continues at step 2202 to receive another image.

In at least one embodiment, operations of said process to use a parallel implementation of a filter to denoise an image illustrated in block diagram 2200 are performed in a different order than is illustrated in FIG. 22. In at least one embodiment, operations of said process to use a parallel implementation of a filter to denoise an image illustrated in block diagram 2200 are performed simultaneously or in parallel. In at least one embodiment, operations of said process to use a parallel implementation of a filter to denoise an image illustrated in block diagram 2200 that do not depend on each other (e.g., are order independent) are performed simultaneously or in parallel. In at least one embodiment, operations of said process to use a parallel implementation of a filter to denoise an image illustrated in block diagram 2200 are performed by a plurality of threads executing on a processor such as those described herein.

In at least one embodiment, one or more processors (e.g., processor 110 and/or other processors and/or accelerators such as those described herein) comprise one or more circuits to perform operations and/or instructions described herein in connection with FIG. 22, such as one or more circuits to cause one or more neural networks to cause one or more non-noise pixels to be identified and blended in parallel and/or otherwise perform operations described herein. In at least one embodiment, operations and/or instructions described herein in connection with FIG. 22 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 22 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 22, one or more components described herein in connection with FIG. 22 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 22, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 22 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 22 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 22, one or more components described herein in connection with FIG. 22 include one or more components described herein in connection with FIGS. 34A-80 to use one or more neural networks to adjust brightness of one or more pixels of one or more images prior to denoising the one or more images and/or otherwise perform operations described herein.

Figure 23:
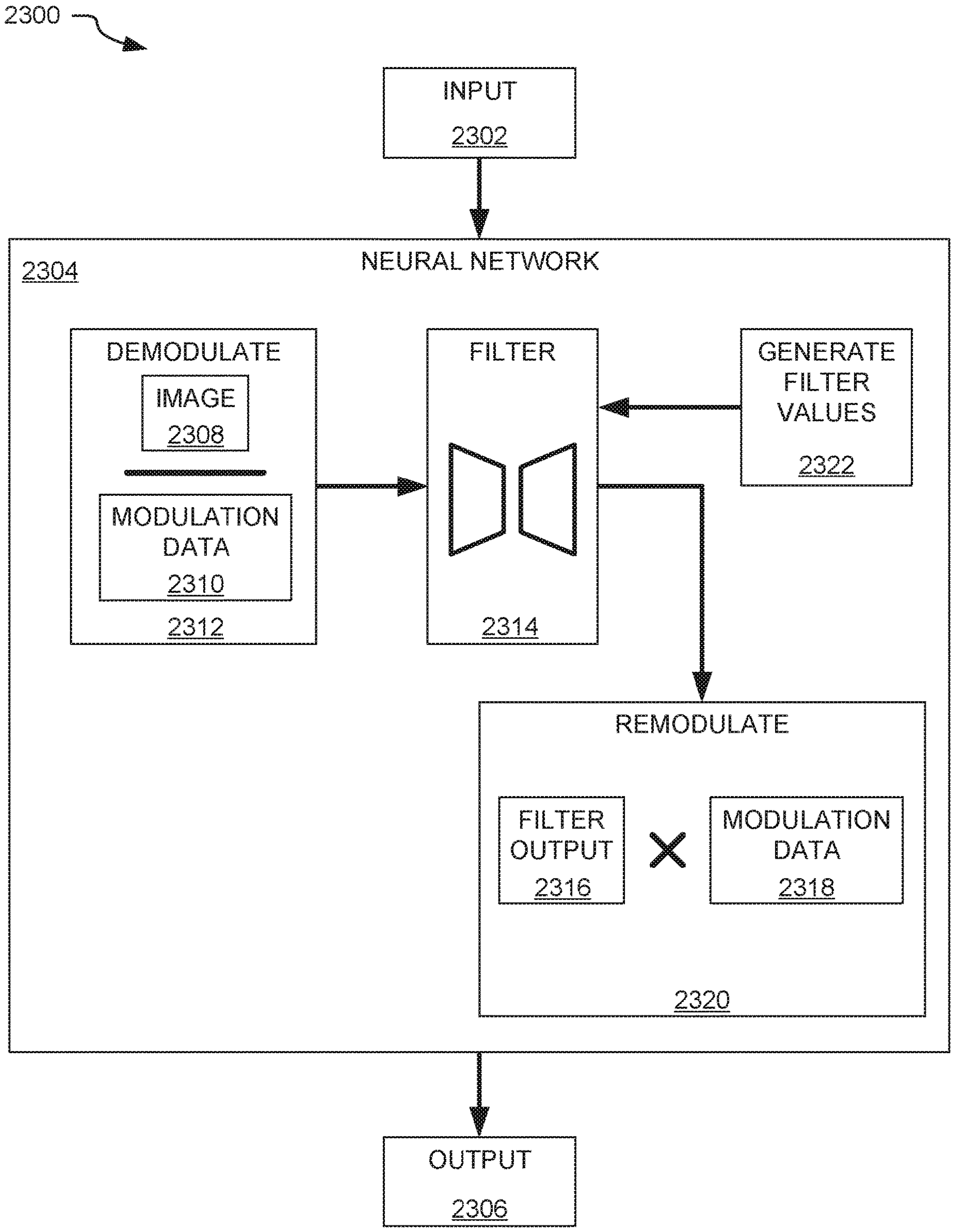
FIG. 23 is a block diagram illustrating using neural networks with image demodulation and modulation and filters to denoise an image, in accordance with at least one embodiment.

FIG. 23 is a block diagram 2300 illustrating using neural networks with image demodulation and modulation and filters to denoise an image, in accordance with at least one embodiment. In at least one embodiment, not shown in FIG. 23, a processor such as processor 110, described herein at least in connection with FIG. 1, performs a neural network 2304, as described herein. In at least one embodiment, input 2302 is sent, indicated, or otherwise provided to neural network 2304. In at least one embodiment, input 2302 is input such as image data 104, described herein at least in connection with FIG. 1. In at least one embodiment, neural network 2304 is a neural network such as neural network 112, described herein at least in connection with FIG. 1.

In at least one embodiment, as processor performing neural network 2304 performs one or more operations to generate filter values 2322, as described herein at least in connection with FIGS. 15-20. In at least one embodiment, filter values generated comprise nine values (e.g., as a 3×3 matrix). In at least one embodiment, filter values generated comprise a plurality of 3×3 matrices usable by neural network 2304 to filter a plurality of layers using filter 2314. In at least one embodiment, filter 2314 is a filter such as those described herein at least in connection with FIGS. 15-20.

In at least one embodiment, before applying filter 2314 to input 2302, a processor performing neural network 2304 performs one or more image modulation operations to demodulate 2312 an image 2308 of input 2302. In at least one embodiment, one or more image modulation operations to demodulate 2312 an image 2308 include one or more operations to divide image by modulation data 2310. In at least one embodiment, one or more image modulation operations to demodulate 2312 an image 2308 comprise one or more operations to adjust brightness of pixels of image prior to denoising (e.g., prior to applying filter 2314, described below). In at least one embodiment, modulation data 2310 is comprised of three numbers (e.g., an RGB value) corresponding to each pixel of image 2308. In at least one embodiment, modulation data 2310 is comprised of one number (e.g., an intensity) corresponding to each pixel of image 2308. In at least one embodiment, modulation data 2310 represents an albedo (e.g., a diffuse albedo such as diffuse albedo data 610 or a specular albedo such as specular albedo data 612, both as described herein at least in connection with FIG. 6). In at least one embodiment, demodulation using albedo preserves edges and/or other details of image 2308 so that said edges and/or other details of image 2308 are not removed by applying filter 2314.

In at least one embodiment, after applying filter 2314 to input 2302, a processor performing neural network 2304 performs one or more image modulation operations to remodulate 2320 an image that is generated by filter 2314 (e.g., filter output 2316), as described herein. In at least one embodiment, one or more image modulation operations to remodulate 2320 filter output 2316 include one or more operations to multiply filter output 2316 by modulation data 2318. In at least one embodiment, one or more image modulation operations to remodulate 2320 an image an image that is generated by filter 2314 comprise one or more operations to adjust brightness of pixels of an image after denoising. In at least one embodiment, one or more operations to adjust brightness of pixels of an image after denoising comprise one or more instructions to reverse the one or more instructions to adjust brightness of the one or more pixels of the one or more images prior to denoising (e.g., to divide before denoising and to multiply after denoising). In at least one embodiment, modulation data 2318 is identical to modulation data 2310. In at least one embodiment, modulation data 2318 is comprised of three numbers (e.g., an RGB value) corresponding to each pixel of filter output 2316 and/or corresponding to each pixel of image 2308. In at least one embodiment, modulation data 2318 is comprised of one number (e.g., an intensity) corresponding to each pixel of filter output 2316 and/or corresponding to each pixel of image 2308. In at least one embodiment, modulation data 2318 represents an albedo (e.g., a diffuse albedo such as diffuse albedo data 610 or a specular albedo such as specular albedo data 612, both as described herein at least in connection with FIG. 6). In at least one embodiment, remodulation using albedo restores edges and/or other details from image 2308 to filter output 2316 so that said edges and/or other details of image 2308 are not removed by applying filter 2314.

In at least one embodiment, a processor performing neural network 2304 performs one or more operations to generate output 2306 based, at least in part, on applying demodulate 2312, filter 2314, and remodulate 2320, as described herein. In at least one embodiment, output 2306 is output such as output data 114, described herein at least in connection with FIG. 1.

In at least one embodiment, one or more processors (e.g., processor 110 and/or other processors and/or accelerators such as those described herein) comprise one or more circuits to perform operations and/or instructions described herein in connection with FIG. 23, such as one or more circuits to cause one or more neural networks to cause one or more non-noise pixels to be identified and blended in parallel and/or otherwise perform operations described herein. In at least one embodiment, operations and/or instructions described herein in connection with FIG. 23 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 23 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 23, one or more components described herein in connection with FIG. 23 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 23, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 23 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 23 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 23, one or more components described herein in connection with FIG. 23 include one or more components described herein in connection with FIGS. 34A-80 to use one or more neural networks to adjust brightness of one or more pixels of one or more images prior to denoising the one or more images and/or otherwise perform operations described herein.

Figure 24:
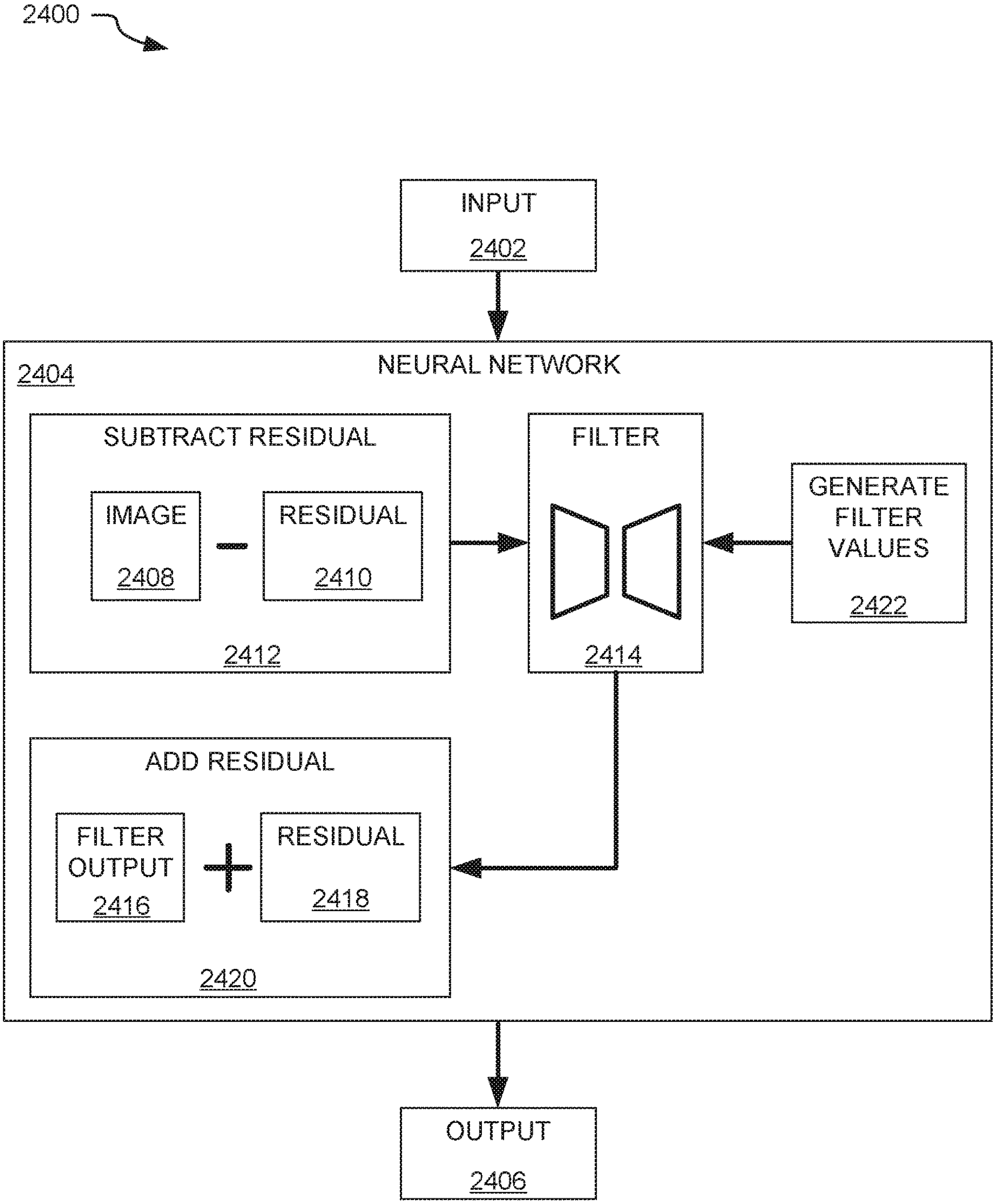
FIG. 24 is a block diagram illustrating using neural networks with image residuals and filters to denoise an image, in accordance with at least one embodiment.

FIG. 24 is a block diagram 2400 illustrating using neural networks with image residuals and filters to denoise an image, in accordance with at least one embodiment. In at least one embodiment, not shown in FIG. 24, a processor such as processor 110, described herein at least in connection with FIG. 1, performs a neural network 2404, as described herein. In at least one embodiment, input 2402 is sent, indicated, or otherwise provided to a neural network 2404. In at least one embodiment, input 2402 is input such as image data 104, described herein at least in connection with FIG. 1. In at least one embodiment, neural network 2404 is a neural network such as neural network 112, described herein at least in connection with FIG. 1.

In at least one embodiment, a processor performing neural network 2404 performs one or more operations to generate filter values 2422, as described herein at least in connection with FIGS. 15-20. In at least one embodiment, filter values generated by generated filter values 2422 comprise nine values (e.g., as a 3×3 matrix). In at least one embodiment, filter values generated by generated filter values 2422 comprise a plurality of 3×3 matrices usable by neural network 2404 to filter a plurality of layers using filter 2414. In at least one embodiment, filter 2414 is a filter such as those described herein at least in connection with FIGS. 15-20.

In at least one embodiment, before applying filter 2414 to input 2402, a processor performing neural network 2404 performs one or more image reduction operations to subtract a residual 2412 from an image 2408 of input 2402. In at least one embodiment, one or more image reduction operations to subtract a residual 2412 from image 2408 include one or more operations to subtract a residual 2410 from image 2408. In at least one embodiment, one or more image reduction operations to subtract a residual 2412 from an image 2408 comprise one or more operations to adjust brightness of pixels of image prior to denoising (e.g., prior to applying filter 2414, described below). In at least one embodiment, residual 2410 is comprised of three numbers (e.g., an RGB value) corresponding to each pixel of image 2408. In at least one embodiment, residual 2410 is comprised of one number (e.g., an intensity) corresponding to each pixel of image 2408. In at least one embodiment, residual 2410 represents an emissive value (e.g., a emission element of color data 602 as described herein at least in connection with FIG. 6). In at least one embodiment, reduction using emissive values preserves light sources (e.g., of lights and/or fires) from image 2408 so that said light sources are not removed by applying filter 2414.

In at least one embodiment, after applying filter 2414 to input 2402, a processor performing neural network 2404 performs one or more image reduction operations to add a residual 2420 to an image that is generated by filter 2414 (e.g., filter output 2416), as described herein. In at least one embodiment, one or more image reduction operations to add a residual 2420 to filter output 2416 include one or more operations to add residual 2418 to filter output 2416. In at least one embodiment, one or more image modulation operations to add a residual 2420 to an image that is generated by filter 2414 comprise one or more operations to adjust brightness of pixels of an image after denoising. In at least one embodiment, one or more operations to adjust brightness of pixels of an image after denoising comprise one or more instructions to reverse the one or more instructions to adjust brightness of the one or more pixels of the one or more images prior to denoising (e.g., to subtract before denoising and to add after denoising). In at least one embodiment, residual 2418 is identical to residual 2410. In at least one embodiment, residual 2418 is comprised of three numbers (e.g., an RGB value) corresponding to each pixel of filter output 2416 and/or corresponding to each pixel of image 2408. In at least one embodiment, residual 2418 is comprised of one number (e.g., an intensity) corresponding to each pixel of filter output 2416 and/or corresponding to each pixel of image 2408. In at least one embodiment, residual 2418 represents an emissive value (e.g., a emission element of color data 602 as described herein at least in connection with FIG. 6). In at least one embodiment, remodulation using an emissive value restores light sources from image 2408 to filter output 2416 so that said light sources of image 2408 are not removed by applying filter 2414.

In at least one embodiment, a processor performing neural network 2404 performs one or more operations to generate output 2406 based, at least in part, on subtract residual 2412, applying filter 2414, and adding residual 2420, as described herein. In at least one embodiment, output 2406 is output such as output data 114, described herein at least in connection with FIG. 1.

In at least one embodiment, one or more processors (e.g., processor 110 and/or other processors and/or accelerators such as those described herein) comprise one or more circuits to perform operations and/or instructions described herein in connection with FIG. 24, such as one or more circuits to cause one or more neural networks to cause one or more non-noise pixels to be identified and blended in parallel and/or otherwise perform operations described herein. In at least one embodiment, operations and/or instructions described herein in connection with FIG. 24 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 24 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 24, one or more components described herein in connection with FIG. 24 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 24, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 24 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 24 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 24, one or more components described herein in connection with FIG. 24 include one or more components described herein in connection with FIGS. 34A-80 to use one or more neural networks to adjust brightness of one or more pixels of one or more images prior to denoising the one or more images and/or otherwise perform operations described herein.

Figure 25:
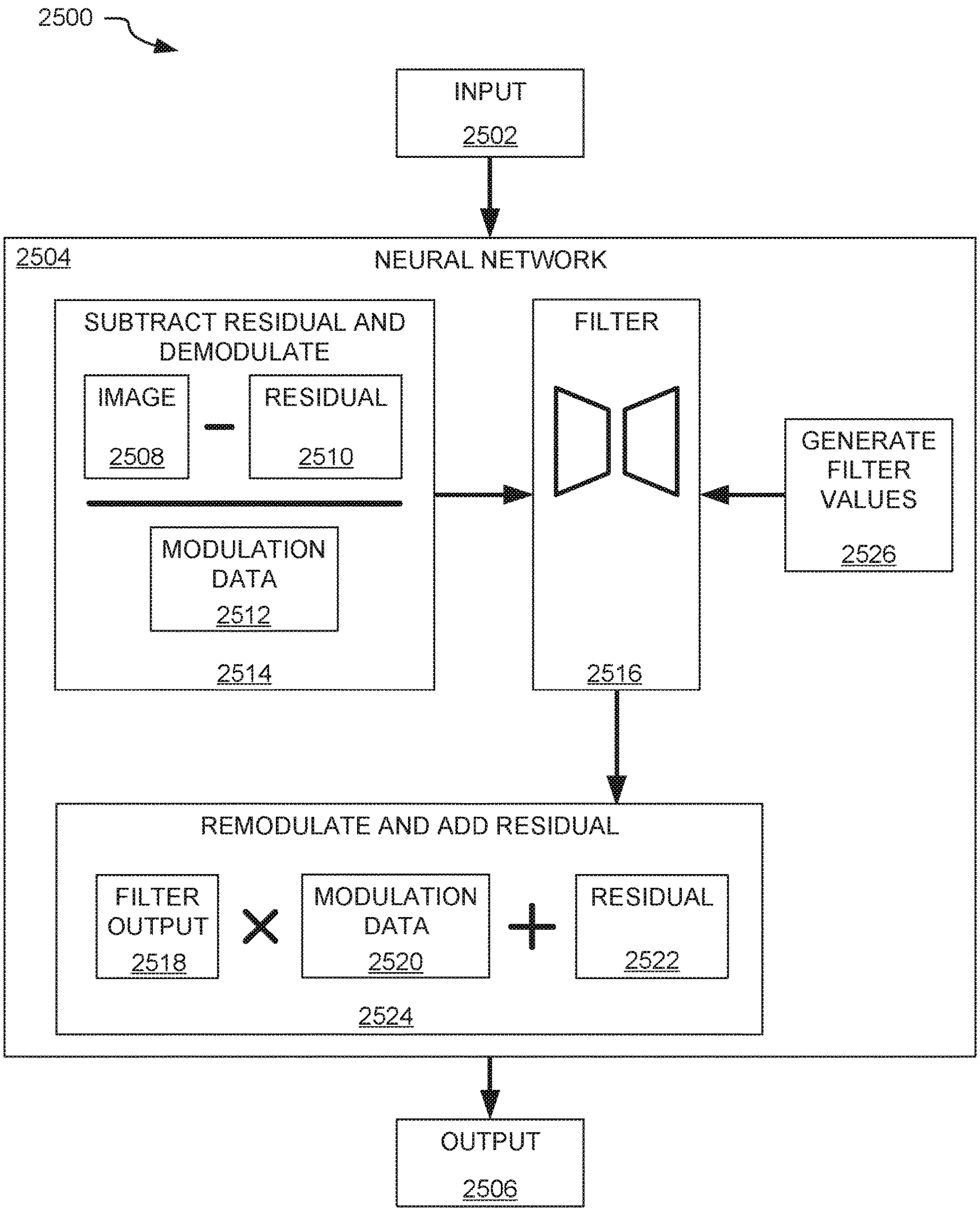
FIG. 25 is a block diagram illustrating using neural networks with image demodulation and modulation, image residuals, and filters to denoise an image, in accordance with at least one embodiment.

FIG. 25 is a block diagram 2500 illustrating using neural networks with image demodulation and modulation, image residuals, and filters to denoise an image, in accordance with at least one embodiment. In at least one embodiment, not shown in FIG. 25, a processor such as processor 110, described herein at least in connection with FIG. 1, performs a neural network 2504, as described herein. In at least one embodiment, input 2502 is sent, indicated, or otherwise provided to neural network 2504. In at least one embodiment, input 2502 is input such as image data 104, described herein at least in connection with FIG. 1. In at least one embodiment, neural network 2504 is a neural network such as neural network 112, described herein at least in connection with FIG. 1.

In at least one embodiment, a processor performing neural network 2504 performs one or more operations to generate filter values 2526, as described herein at least in connection with FIGS. 15-20. In at least one embodiment, filter values generated by generated filter values 2526 comprise nine values (e.g., as a 3×3 matrix). In at least one embodiment, filter values generated by generated filter values 2526 comprise a plurality of 3×3 matrices usable by neural network 2504 to filter a plurality of layers using filter 2516. In at least one embodiment, filter 2516 is a filter such as those described herein at least in connection with FIGS. 15-20.

In at least one embodiment, before applying filter 2516 to input 2502, a processor performing neural network 2504 performs one or more image reduction and image modulation operations such as those described herein. In at least one embodiment, said one or more image reduction and image modulation operations include operations to subtract residual and demodulate 2514. In at least one embodiment, subtract residual and demodulate 2514 includes one or more image reduction operations to subtract a residual 2510 from an image 2508 of input 2502 (e.g., as described herein at least in connection with FIG. 24) and also one or more image modulation operations to divide a result of said one or more image reduction operations by modulation data 2512 (e.g., as described herein at least in connection with FIG. 23). In at least one embodiment, one or more operations to subtract residual and demodulate 2514 comprise one or more operations to adjust brightness of pixels of image prior to denoising (e.g., prior to applying filter 2516, described below).

In at least one embodiment, after applying filter 2516 to input 2502, a processor performing neural network 2504 performs one or more image reduction and image modulation operations such as those described herein. In at least one embodiment, said one or more image reduction and image modulation operations include one or more operations to remodulate and add residual 2524. In at least one embodiment, remodulate and add residual 2524 includes one or more image modulation operations to multiply filter output 2518 by modulation data 2520 (e.g., as described herein at least in connection with FIG. 23) and also one or more operations to add a residual 2522 to a result of said one more image modulation operations (as described herein at least in connection with FIG. 24). In at least one embodiment, residual 2510 is identical to residual 2522 (e.g., with each corresponding pixel). In at least one embodiment, modulation data 2520 is identical to modulation data 2512 (e.g., with each corresponding pixel). In at least one embodiment, one or more operations to remodulate and add residual 2524 comprise one or more operations to adjust brightness of pixels of image after denoising (e.g., after applying filter 2516. In at least one embodiment, one or more operations to adjust brightness of pixels of an image after denoising comprise one or more instructions to reverse the one or more instructions to adjust brightness of the one or more pixels of the one or more images prior to denoising (e.g., to subtract and divide before denoising and to multiply and add after denoising).

In at least one embodiment, a processor performing neural network 2504 performs one or more operations to generate output 2506 based, at least in part, on subtract residual and demodulate 2514, applying filter 2516, and remodulate and add residual 2524, as described herein. In at least one embodiment, output 2506 is output such as output data 114, described herein at least in connection with FIG. 1.

In at least one embodiment, one or more processors (e.g., processor 110 and/or other processors and/or accelerators such as those described herein) comprise one or more circuits to perform operations and/or instructions described herein in connection with FIG. 25, such as one or more circuits to cause one or more neural networks to cause one or more non-noise pixels to be identified and blended in parallel and/or otherwise perform operations described herein. In at least one embodiment, operations and/or instructions described herein in connection with FIG. 25 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 25 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 25, one or more components described herein in connection with FIG. 25 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 25, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 25 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 25 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 25, one or more components described herein in connection with FIG. 25 include one or more components described herein in connection with FIGS. 34A-80 to use one or more neural networks to adjust brightness of one or more pixels of one or more images prior to denoising the one or more images and/or otherwise perform operations described herein.

Figure 26:
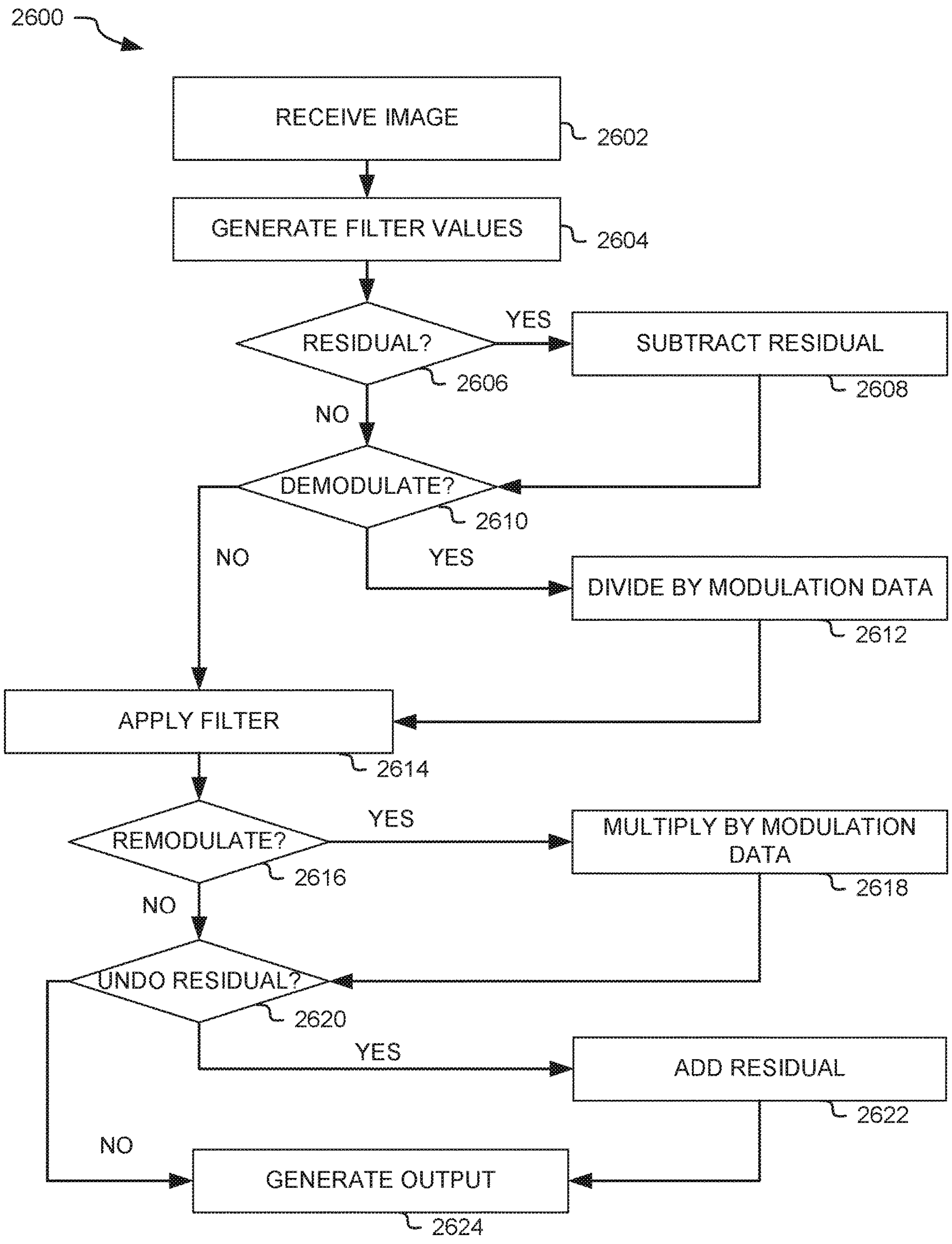
FIG. 26 is a block diagram illustrating a process to use neural networks with image demodulation and modulation, image residuals, and filters to denoise an image, in accordance with at least one embodiment.

FIG. 26 is a block diagram 2600 illustrating a process to use neural networks with image demodulation and modulation, image residuals, and filters to denoise an image, in accordance with at least one embodiment. In at least one embodiment, some or all of said process to use neural networks with image demodulation and modulation, image residuals, and filters to denoise an image illustrated in block diagram 2600 (or any other processes described herein, or variations and/or combinations thereof) is performed under control of one or more computer systems, such as those described in FIGS. 34A-80, configured with computer-executable instructions and is implemented as code (e.g., computer-executable instructions, one or more computer programs, or one or more applications) executing collectively on one or more processors, by hardware, software, or combinations thereof. In at least one embodiment, said code is stored on a computer-readable storage medium in form of a computer program comprising a plurality of computer-readable instructions executable by one or more processors such as those described herein. In at least one embodiment, a computer-readable storage medium is a non-transitory computer-readable medium. In at least one embodiment, a processor such as processor 110, described herein at least in connection with FIG. 1, performs one or more steps of said process to use neural networks with image demodulation and modulation, image residuals, and filters to denoise an image illustrated in block diagram 2600. In at least one embodiment, one or more other processors such as those described herein perform one or more steps of said process to use neural networks with image demodulation and modulation, image residuals, and filters to denoise an image illustrated in block diagram 2600.

In at least one embodiment, at step 2602 of said process to use neural networks with image demodulation and modulation, image residuals, and filters to denoise an image illustrated in block diagram 2600, a processor performs one or more operations to receive image data. In at least one embodiment, at step 2602, image data is sent, indicated, or otherwise provided to a neural network such as those described herein. In at least one embodiment, after step 2602, said process to use neural networks with image demodulation and modulation, image residuals, and filters to denoise an image illustrated in block diagram 2600 continues at step 2604.

In at least one embodiment, at step 2604 of said process to use neural networks with image demodulation and modulation, image residuals, and filters to denoise an image illustrated in block diagram 2600, a processor performs one or more operations to generated one or more filter values as described herein at least in connection with FIGS. 15-20. In at least one embodiment, not shown in FIG. 26, a processor performs one or more operations to generate one or more of modulation data (e.g., usable in image modulation operations) and/or residuals (e.g., usable in image reduction operations) at step 2604 of said process to use neural networks with image demodulation and modulation, image residuals, and filters to denoise an image illustrated in block diagram 2600. In at least one embodiment, after step 2604, said process to use neural networks with image demodulation and modulation, image residuals, and filters to denoise an image illustrated in block diagram 2600 continues at step 2606.

In at least one embodiment, at step 2606 of said process to use neural networks with image demodulation and modulation, image residuals, and filters to denoise an image illustrated in block diagram 2600, a processor performs one or more operations to determine whether to apply a residual (e.g., in an image reduction operation to subtract a residual from an image, as described herein). In at least one embodiment, at step 2606, if it is determined to apply a residual ("YES" branch), said process to use neural networks with image demodulation and modulation, image residuals, and filters to denoise an image illustrated in block diagram 2600 continues at step 2608. In at least one embodiment, at step 2606, if it is determined to not apply a residual ("NO" branch), said process to use neural networks with image demodulation and modulation, image residuals, and filters to denoise an image illustrated in block diagram 2600 continues at step 2614.

In at least one embodiment, at step 2608 of said process to use neural networks with image demodulation and modulation, image residuals, and filters to denoise an image illustrated in block diagram 2600, a processor performs one or more operations to perform an image reduction operation (e.g., to subtract a residual from an image). In at least one embodiment, after step 2608, said process to use neural networks with image demodulation and modulation, image residuals, and filters to denoise an image illustrated in block diagram 2600 continues at step 2610.

In at least one embodiment, at step 2610 of said process to use neural networks with image demodulation and modulation, image residuals, and filters to denoise an image illustrated in block diagram 2600, a processor performs one or more operations to determine whether to apply a demodulate operation to an image (e.g., to apply an image modulation operation to divide an image by modulation data, as described herein). In at least one embodiment, at step 2610, if it is determined to apply a demodulate operation ("YES" branch), said process to use neural networks with image demodulation and modulation, image residuals, and filters to denoise an image illustrated in block diagram 2600 continues at step 2612. In at least one embodiment, at step 2610, if it is determined to not apply a demodulate operation ("NO" branch), said process to use neural networks with image demodulation and modulation, image residuals, and filters to denoise an image illustrated in block diagram 2600 continues at step 2614.

In at least one embodiment, at step 2614 of said process to use neural networks with image demodulation and modulation, image residuals, and filters to denoise an image illustrated in block diagram 2600, a processor performs one or more operations to apply an image modulation operation (e.g., to divide pixels of an image by modulation data, as described herein). In at least one embodiment, after step 2614, said process to use neural networks with image demodulation and modulation, image residuals, and filters to denoise an image illustrated in block diagram 2600 continues at step 2616.

In at least one embodiment, at step 2616 of said process to use neural networks with image demodulation and modulation, image residuals, and filters to denoise an image illustrated in block diagram 2600, a processor performs one or more operations to determine whether to perform a remodulate operation (e.g., to undo a demodulate operation performed at step 2612). In at least one embodiment, at step 2616, if it is determined to perform a remodulate operation ("YES" branch), said process to use neural networks with image demodulation and modulation, image residuals, and filters to denoise an image illustrated in block diagram 2600 continues at step 2618. In at least one embodiment, at step 2616, if it is determined to not perform a remodulate operations ("NO" branch), said process to use neural networks with image demodulation and modulation, image residuals, and filters to denoise an image illustrated in block diagram 2600 continues at step 2620.

In at least one embodiment, at step 2618 of said process to use neural networks with image demodulation and modulation, image residuals, and filters to denoise an image illustrated in block diagram 2600, a processor performs one or more operations to perform an image modulation operation to remodulate an image (e.g., to multiply pixels of an image by modulation data), as described herein. In at least one embodiment, after step 2618, said process to use neural networks with image demodulation and modulation, image residuals, and filters to denoise an image illustrated in block diagram 2600 continues at step 2620.

In at least one embodiment, at step 2620 of said process to use neural networks with image demodulation and modulation, image residuals, and filters to denoise an image illustrated in block diagram 2600, a processor performs one or more operations to determine whether to undo a residual (e.g., to add a residual subtracted from an image at step 2608 back to said image). In at least one embodiment, at step 2620, if it is determined to undo a residual ("YES" branch), said process to use neural networks with image demodulation and modulation, image residuals, and filters to denoise an image illustrated in block diagram 2600 continues at step 2622. In at least one embodiment, at step 2620, if it is determined to not undo a residual ("NO" branch), said process to use neural networks with image demodulation and modulation, image residuals, and filters to denoise an image illustrated in block diagram 2600 continues at step 2624.

In at least one embodiment, at step 2622 of said process to use neural networks with image demodulation and modulation, image residuals, and filters to denoise an image illustrated in block diagram 2600, a processor performs one or more operations to undo an image reduction operation (e.g., to add a residual to an image, as described herein). In at least one embodiment, after step 2622, said process to use neural networks with image demodulation and modulation, image residuals, and filters to denoise an image illustrated in block diagram 2600 continues at step 2624.

In at least one embodiment, at step 2624 of said process to use neural networks with image demodulation and modulation, image residuals, and filters to denoise an image illustrated in block diagram 2600, a processor performs one or more operations to generate output, as described herein. In at least one embodiment, after step 2624, process 2600 terminates. In at least one embodiment, not shown in FIG. 26, after step 2624, said process to use neural networks with image demodulation and modulation, image residuals, and filters to denoise an image illustrated in block diagram 2600 continues at step 2602 to receive another image.

In at least one embodiment, operations of said process to use neural networks with image demodulation and modulation, image residuals, and filters to denoise an image illustrated in block diagram 2600 are performed in a different order than is illustrated in FIG. 26. In at least one embodiment, operations of said process to use neural networks with image demodulation and modulation, image residuals, and filters to denoise an image illustrated in block diagram 2600 are performed simultaneously or in parallel. In at least one embodiment, operations of said process to use neural networks with image demodulation and modulation, image residuals, and filters to denoise an image illustrated in block diagram 2600 that do not depend on each other (e.g., are order independent) are performed simultaneously or in parallel. In at least one embodiment, operations of said process to use neural networks with image demodulation and modulation, image residuals, and filters to denoise an image illustrated in block diagram 2600 are performed by a plurality of threads executing on a processor such as those described herein.

In at least one embodiment, one or more processors (e.g., processor 110 and/or other processors and/or accelerators such as those described herein) comprise one or more circuits to perform operations and/or instructions described herein in connection with FIG. 26, such as one or more circuits to cause one or more neural networks to cause one or more non-noise pixels to be identified and blended in parallel and/or otherwise perform operations described herein. In at least one embodiment, operations and/or instructions described herein in connection with FIG. 26 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 26 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 26, one or more components described herein in connection with FIG. 26 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 26, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 26 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 26 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 26, one or more components described herein in connection with FIG. 26 include one or more components described herein in connection with FIGS. 34A-80 to use one or more neural networks to adjust brightness of one or more pixels of one or more images prior to denoising the one or more images and/or otherwise perform operations described herein.

Figure 27:
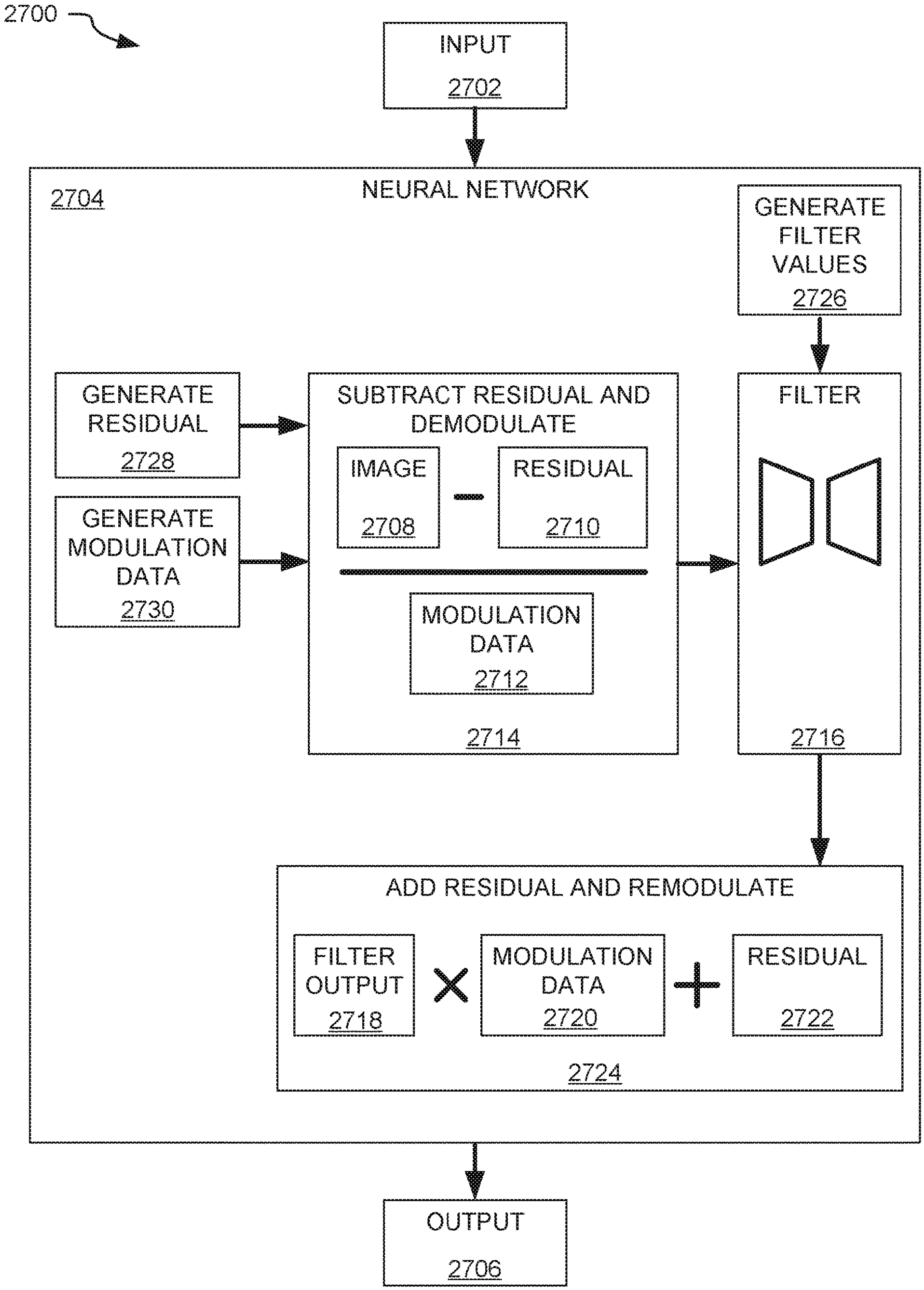
FIG. 27 is a block diagram illustrating using neural networks to generate image data that is used with image demodulation and modulation, image residuals, and filters to denoise an image, in accordance with at least one embodiment.

FIG. 27 is a block diagram 2700 illustrating using neural networks to generate image data that is used with image demodulation and modulation, image residuals, and filters to denoise an image, in accordance with at least one embodiment. In at least one embodiment, not shown in FIG. 27, a processor such as processor 110, described herein at least in connection with FIG. 1, performs a neural network 2704, as described herein. In at least one embodiment, input 2702 is sent, indicated, or otherwise provided to neural network 2704. In at least one embodiment, input 2702 is input such as image data 104, described herein at least in connection with FIG. 1. In at least one embodiment, neural network 2704 is a neural network such as neural network 112, described herein at least in connection with FIG. 1.

In at least one embodiment, a processor performing neural network 2704 performs one or more operations to generate filter values 2726, as described herein at least in connection with FIGS. 15-20. In at least one embodiment, filter values generated by generated filter values 2726 comprise nine values (e.g., as a 3×3 matrix). In at least one embodiment, filter values generated by generated filter values 2726 comprise a plurality of 3×3 matrices usable by neural network 2704 to filter a plurality of layers using filter 2716. In at least one embodiment, filter 2716 is a filter such as those described herein at least in connection with FIGS. 15-20.

In at least one embodiment, before applying filter 2716 to input 2702, a processor performing neural network 2704 performs one or more image reduction and image modulation operations such as those described herein. In at least one embodiment, said one or more image reduction and image modulation operations include one or more operations to subtract residual and demodulate 2714. In at least one embodiment, subtract residual and demodulate 2714 includes one or more image reduction operations to subtract a residual 2722 from an image 2708 of input 2702 (e.g., as described herein at least in connection with FIG. 24) and also one or more image modulation operations to divide a result of said one or more image reduction operations by modulation data 2712 (e.g., as described herein at least in connection with FIG. 23). In at least one embodiment, one or more operations to subtract residual and demodulate 2714 comprise one or more operations to adjust brightness of pixels of image prior to denoising (e.g., prior to applying filter 2716, described below).

In at least one embodiment, before a processor performing neural network 2704 performs one or more image reduction and image modulation operations include one or more operations to subtract residual and demodulate 2714, a processor performing neural network 2704 performs one or more operations to generate residual 2728 to generate or predict residual 2722 used to subtract residual and demodulate 2714, as described above. In at least one embodiment, operations to generate a residual 2728 are operations to generate or predict a residual (e.g., an RGB value or a single value) as described herein. In at least one embodiment, a processor performing neural network 2704 performs one or more operations to generate or predict a residual 2710 corresponding to each pixel of image 2708.

In at least one embodiment, before a processor performing neural network 2704 performs one or more image reduction and image modulation operations include operations to subtract residual and demodulate 2714, a processor performing neural network 2704 performs one or more operations to generate modulation data 2730 to generate or predict modulation data 2712 used to subtract residual and demodulate 2714, as described above. In at least one embodiment, operations to generate modulation data 2730 are operations to generate or predict modulation data (e.g., an RGB value or a single value) as described herein. In at least one embodiment, a processor performing neural network 2704 performs one or more operations to generate or predict modulation data 2712 corresponding to each pixel of image 2708.

In at least one embodiment, after applying filter 2716 to input 2702, a processor performing neural network 2704 performs one or more image reduction and image modulation operations such as those described herein. In at least one embodiment, said one or more image reduction and image modulation operations include one or more operations to remodulate and add residual 2724. In at least one embodiment, remodulate and add residual 2724 includes one or more image modulation operations to multiply filter output 2718 by modulation data 2720 (e.g., as described herein at least in connection with FIG. 23) and also one or more operations to add a residual 2722 to a result of said one more image modulation operations (as described herein at least in connection with FIG. 24). In at least one embodiment, one or more operations to remodulate and add residual 2724 comprise one or more operations to adjust brightness of pixels of image after denoising (e.g., after applying filter 2716). In at least one embodiment, one or more operations to adjust brightness of pixels of an image after denoising comprise one or more instructions to reverse the one or more instructions to adjust brightness of the one or more pixels of the one or more images prior to denoising (e.g., to subtract and divide before denoising and to multiply and add after denoising).

In at least one embodiment, modulation data 2720 and modulation data 2712 are identical and are generated or predicted by a processor performing neural network 2704 when said processor performing neural network 2704 performs one or more operations to generate modulation data 2730, as described herein. In at least one embodiment, residual 2722 and residual 2710 are identical and are generated or predicted by a processor performing neural network 2704 when said processor performing neural network 2704 performs one or more operations to generate residual 2728, as described herein. In at least one embodiment, a processor performing neural network 2704 performs one or more operations to generate residual 2728 concurrently with performing one or more operations to generate filter values 2726. In at least one embodiment, a processor performing neural network 2704 performs one or more operations to generate modulation data 2730 concurrently with performing one or more operations to generate filter values 2726. In at least one embodiment, a processor performing neural network 2704 performs one or more operations to generate modulation data 2730 concurrently with performing one or more operations to generate residual 2728.

In at least one embodiment, a processor performing neural network 2704 performs one or more operations to generate output 2706 based, at least in part, on subtract residual and demodulate 2714, applying filter 2716, and remodulate and add residual 2724, as described herein. In at least one embodiment, output 2706 is output such as output data 114, described herein at least in connection with FIG. 1.

In at least one embodiment, one or more processors (e.g., processor 110 and/or other processors and/or accelerators such as those described herein) comprise one or more circuits to perform operations and/or instructions described herein in connection with FIG. 27, such as one or more circuits to cause one or more neural networks to cause one or more non-noise pixels to be identified and blended in parallel and/or otherwise perform operations described herein. In at least one embodiment, operations and/or instructions described herein in connection with FIG. 27 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 27 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 27, one or more components described herein in connection with FIG. 27 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 27, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 27 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 27 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 27, one or more components described herein in connection with FIG. 27 include one or more components described herein in connection with FIGS. 34A-80 to use one or more neural networks to adjust brightness of one or more pixels of one or more images prior to denoising the one or more images and/or otherwise perform operations described herein.

Figure 28:
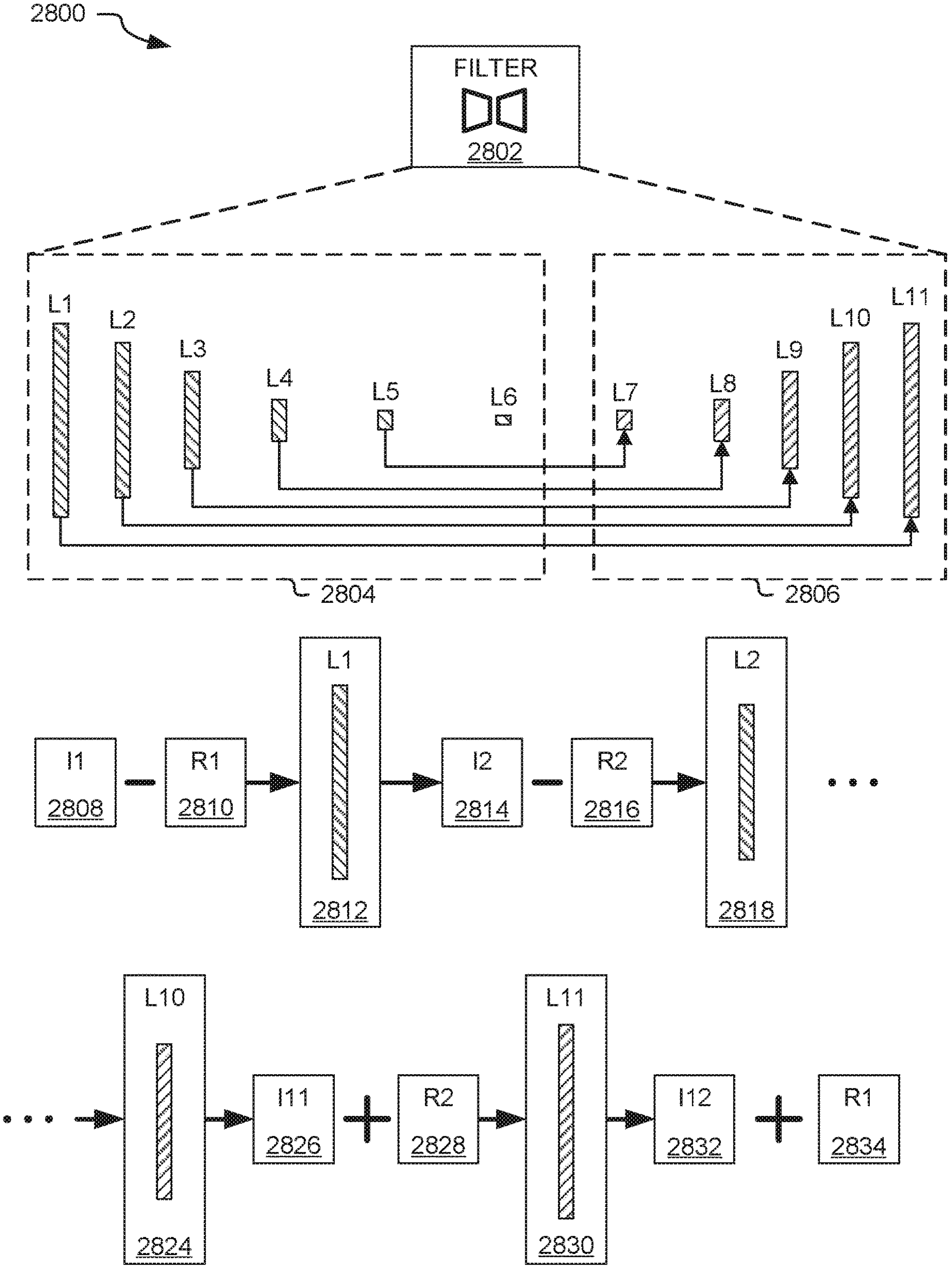
FIG. 28 is a block diagram illustrating per-layer application of image residuals in a filter used by neural networks to denoise an image, in accordance with at least one embodiment.

FIG. 28 is a block diagram 2800 illustrating per-layer application of image residuals in a filter used by neural networks to denoise an image, in accordance with at least one embodiment. In at least one embodiment, filter 2802 is a filter such those described herein at least in connection with FIGS. 15-20. In block diagram 2800, details of filter 2802 are omitted for clarity. In at least one embodiment, filter 2802 comprises one or more decoding layers 2804 (e.g., L1, L2, L3, L4, L5, and L6) and one or more encoding layers 2806 (e.g., L7, L8, L9, L10, and L11), as described herein. In at least one embodiment, not shown in FIG. 28, a neural network such as neural network 2704 (e.g., described herein at least in connection with FIG. 27) includes filter 2802. In at least one embodiment, not shown in FIG. 28, a neural network receives a first image I1 2808 (e.g., an image such as image 2708, described herein at least in connection with FIG. 27) and subtracts residual R1 2810 before applying layer L1 2812 of filter 2802. In at least one embodiment, residual R1 2810 is a residual such as those described herein at least in connection with FIG. 27. In at least one embodiment, residual R1 2810 is predicted by said neural network. In at least one embodiment, as a result of applying layer L1 2812 of filter 2802, image I2 2814 is generated. In at least one embodiment, said neural network then subtracts residual R2 2816 before applying layer L2 2818 of filter 2802 generating a third image (not shown in FIG. 28).

In at least one embodiment, not shown in FIG. 28, said neural network continues subtracting residuals from images generated by performing layers of filter 2802 (e.g., L3, L4, L5, L6) and then adding residuals to images generated by performing layers of filter 2802 (e.g., L7, L8, L9) until layer L10 2824 is performed to generate image I11 2826. In at least one embodiment, residual R2 2828 is then added to image I11 2826. In at least one embodiment, residual R2 2828 is identical to (e.g., has identical values) residual R2 2816. In at least one embodiment, after adding residual R2 2828 to image I11 2826, layer L11 2830 of filter 2802 is applied to generate image I12 2832. In at least one embodiment, residual R1 2834 is then applied to image 112 2832. In at least one embodiment, residual R1 2834 is identical to (e.g., has identical values) residual R1 2810.

In at least one embodiment, residuals (e.g., residual R1 2810, residual R2 2816, etc.) are subtracted from images and residuals (e.g., residual R2 2826, residual R1 2834) are added to images in a different order than that illustrated in FIG. 28. In at least one embodiment, for example, residual R1 2810 is subtracted from image I1 2808 before layer L1 2812 of filter 2802 is performed and then residual R1 2834 is added back to an image that results from performing layer L1 2812 of filter 2802 to generate image 12 2814. In another example, residual R2 2816 is then subtracted from image 12 2814 before layer L2 2818 of filter 2802 is performed and then residual R2 2828 is added back to an image that results from performing layer L2 2818 of filter 2802 to generate image 13 (not shown in FIG. 28).

In at least one embodiment, one or more processors (e.g., processor 110 and/or other processors and/or accelerators such as those described herein) comprise one or more circuits to perform operations and/or instructions described herein in connection with FIG. 28, such as one or more circuits to cause one or more neural networks to cause one or more non-noise pixels to be identified and blended in parallel and/or otherwise perform operations described herein. In at least one embodiment, operations and/or instructions described herein in connection with FIG. 28 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 28 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 28, one or more components described herein in connection with FIG. 28 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 28, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 28 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 28 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 28, one or more components described herein in connection with FIG. 28 include one or more components described herein in connection with FIGS. 34A-80 to use one or more neural networks to adjust brightness of one or more pixels of one or more images prior to denoising the one or more images and/or otherwise perform operations described herein.

Figure 29:
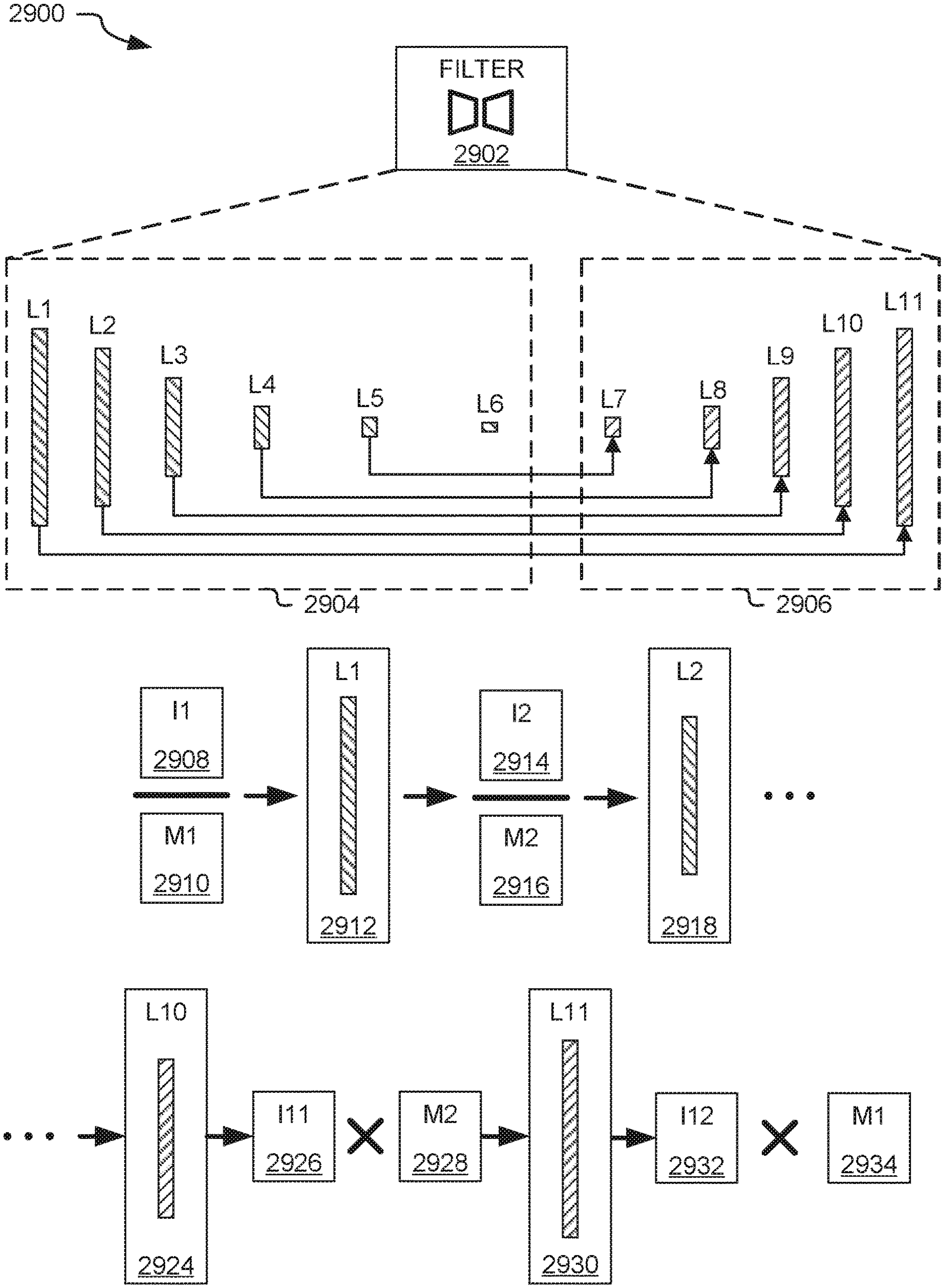
FIG. 29 is a block diagram illustrating per-layer application of image modulation and demodulation in a filter used by neural networks to denoise an image, in accordance with at least one embodiment.

FIG. 29 is a block diagram 2900 illustrating per-layer application of image modulation and demodulation in a filter used by neural networks to denoise an image, in accordance with at least one embodiment. In at least one embodiment, filter 2902 is a filter such those described herein at least in connection with FIGS. 15-20. In at least one embodiment, not shown in FIG. 29, a neural network such as neural network 2704 (e.g., described herein at least in connection with FIG. 27) includes filter 2902. In block diagram 2900, details of filter 2902 are omitted for clarity. In at least one embodiment, filter 2902 comprises one or more decoding layers 2904 (e.g., L1, L2, L3, L4, L5, and L6) and one or more encoding layers 2906 (e.g., L7, L8, L9, L10, and L11), as described herein. In at least one embodiment, not shown in FIG. 29, a neural network receives a first image I1 2908 (e.g., an image such as image 2708, described herein at least in connection with FIG. 27) and divides said image by modular data M1 2910 before applying layer L1 2912 of filter 2902. In at least one embodiment, modular data M1 2910 is modular data such as that described herein at least in connection with FIG. 27. In at least one embodiment, modular data M1 2910 is predicted by said neural network. In at least one embodiment, as a result of applying layer L1 2912 of filter 2902, image I2 2914 is generated. In at least one embodiment, said neural network then divides said image by modular data M2 2916 before applying layer L2 2918 of filter 2902, generating a third image (not shown in FIG. 29).

In at least one embodiment, not shown in FIG. 29, said neural network continues demodulating images generated by performing layers of filter 2902 (e.g., L3, L4, L5, L6) and remodulating images generated by performing layers of filter 2902 (e.g., L7, L8, L9) until layer L10 2924 is performed to generate image I11 2926. In at least one embodiment, image I11 2926 is then multiplied by modulation data M2 2928. In at least one embodiment, modulation data 2928 is identical to (e.g., has identical values) modulation data M2 2916. In at least one embodiment, after multiplying image I11 2926 by modulation data M2 2916, layer L11 2930 of filter 2902 is applied a result of said multiplication to generate image I12 2932. In at least one embodiment, image I12 2932 is then multiplied by modulation data M1 2934. In at least one embodiment, modulation data M1 2934 is identical to (e.g., has identical values) modulation data M1 2910.

In at least one embodiment, images are divided by modulation data (e.g., modulation data M1 2910, modulation data M2 2916, etc.) and images are multiplied by modulation data (e.g., modulation data M2 2926, modulation data M1 2934) in a different order than that illustrated in FIG. 29. In at least one embodiment, for example, image I1 2908 is divided by modulation data M1 2910 before layer L1 2912 of filter 2902 is performed and then an image that results from performing layer L1 2912 of filter 2902 is multiplied by modulation data M1 2934 to generate image I2 2914. In another example, image I2 2914 is divided by modulation data M2 2910 before layer L2 2918 of filter 2902 is performed and then an image that results from performing layer L2 2918 of filter 2902 is multiplied by modulation data M2 2928 to generate image I3 (not shown in FIG. 29).

In at least one embodiment, not shown herein, per-layer application of image residuals in a filter used by neural networks to denoise an image illustrated in FIG. 28 is performed in conjunction with per-layer application of image modulation and demodulation in a filter used by neural networks to denoise an image illustrated in FIG. 29 so that, for example, before performing a layer of a filter (e.g., layer L1 2912 of filter 2902) and before dividing an image by a modulation (e.g., demodulating M1 2910 image I1 2908), a residual is subtracted from said image (e.g., residual R1 2810, described herein at least in connection with FIG. 28). At least one example of performing application of image residuals in a filter used by neural networks to denoise an image (as illustrated in FIG. 28) in conjunction with application of image modulation and demodulation in a filter used by neural networks to denoise an image (as illustrated in FIG. 29), as illustrated in FIG. 27.

In at least one embodiment, one or more processors (e.g., processor 110 and/or other processors and/or accelerators such as those described herein) comprise one or more circuits to perform operations and/or instructions described herein in connection with FIG. 29, such as one or more circuits to cause one or more neural networks to cause one or more non-noise pixels to be identified and blended in parallel and/or otherwise perform operations described herein. In at least one embodiment, operations and/or instructions described herein in connection with FIG. 29 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 29 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 29, one or more components described herein in connection with FIG. 29 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 29, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 29 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 29 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 29, one or more components described herein in connection with FIG. 29 include one or more components described herein in connection with FIGS. 34A-80 to use one or more neural networks to adjust brightness of one or more pixels of one or more images prior to denoising the one or more images and/or otherwise perform operations described herein.

Figure 30:
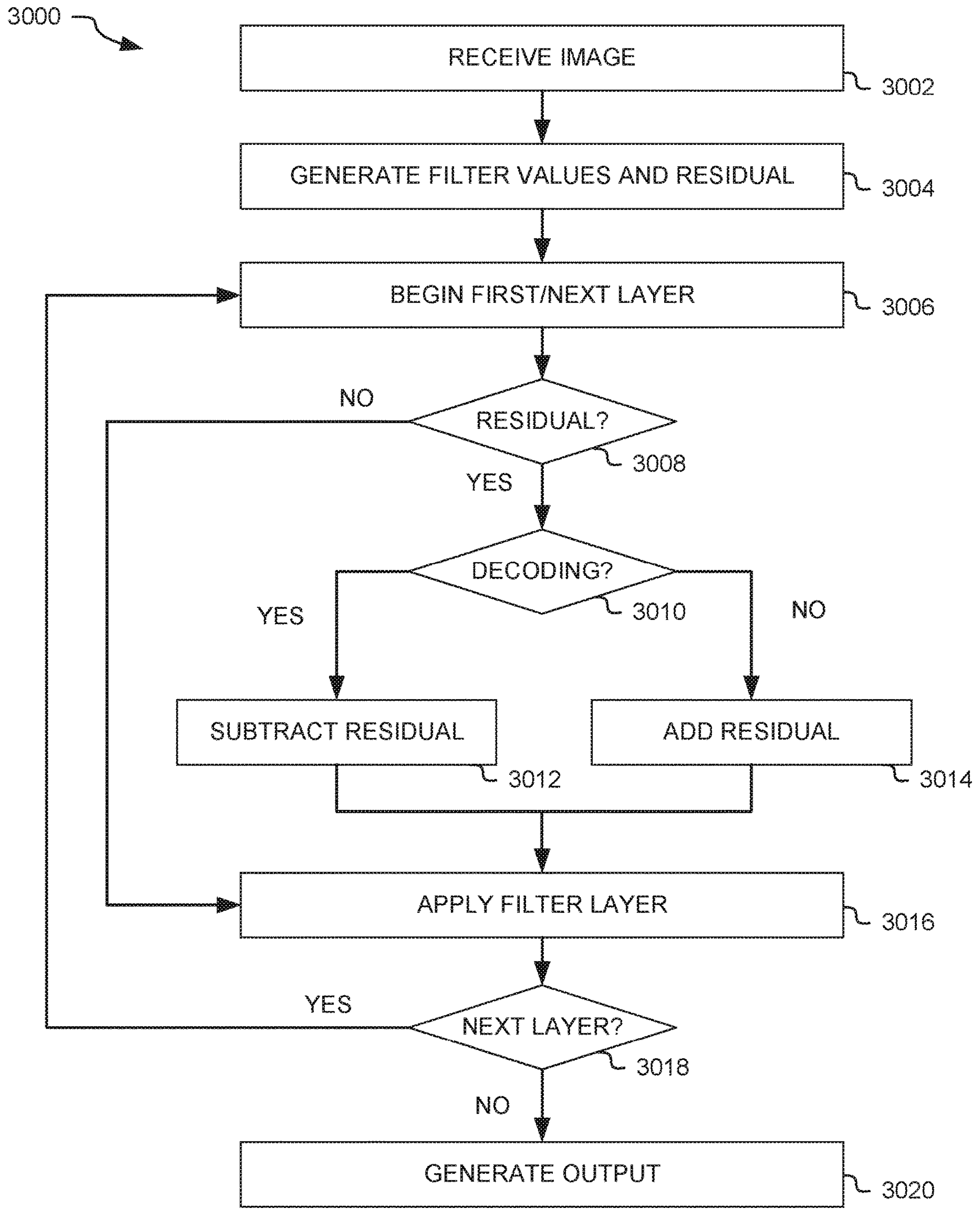
FIG. 30 is a block diagram illustrating a process to apply image residuals to layers of a filter used by neural networks to denoise an image, in accordance with at least one embodiment.

FIG. 30 is a block diagram 3000 illustrating a process to apply image residuals to layers of a filter used by neural networks to denoise an image, in accordance with at least one embodiment. In at least one embodiment, some or all of said process to apply image residuals to layers of a filter used by neural networks to denoise an image illustrated in block diagram 3000 (or any other processes described herein, or variations and/or combinations thereof) is performed under control of one or more computer systems, such as those described in FIGS. 34A-80, configured with computer-executable instructions and is implemented as code (e.g., computer-executable instructions, one or more computer programs, or one or more applications) executing collectively on one or more processors, by hardware, software, or combinations thereof. In at least one embodiment, said code is stored on a computer-readable storage medium in form of a computer program comprising a plurality of computer-readable instructions executable by one or more processors such as those described herein. In at least one embodiment, a computer-readable storage medium is a non-transitory computer-readable medium. In at least one embodiment, a processor such as processor 110, described herein at least in connection with FIG. 1, performs one or more steps of said process to apply image residuals to layers of a filter used by neural networks to denoise an image illustrated in block diagram 3000. In at least one embodiment, one or more other processors such as those described herein perform one or more steps of said process to apply image residuals to layers of a filter used by neural networks to denoise an image illustrated in block diagram 3000.

In at least one embodiment, at step 3002 of said process to apply image residuals to layers of a filter used by neural networks to denoise an image illustrated in block diagram 3000, a processor performs one or more operations to receive an image. In at least one embodiment, at step 3002, a received image is sent, indicated, or otherwise provided to a neural network such as neural network 112, described herein at least in connection with FIG. 1. In at least one embodiment, at step 3002, an image received is a noisy image, as described herein. In at least one embodiment, after step 3002, said process to apply image residuals to layers of a filter used by neural networks to denoise an image illustrated in block diagram 3000 continues at step 3004.

In at least one embodiment, at step 3004 of said process to apply image residuals to layers of a filter used by neural networks to denoise an image illustrated in block diagram 3000, a processor performs one or more operations to generate filter values and residuals, as described herein at least in connection with FIG. 27. In at least one embodiment, after step 3004, said process to apply image residuals to layers of a filter used by neural networks to denoise an image illustrated in block diagram 3000 continues at step 3006.

In at least one embodiment, at step 3006 of said process to apply image residuals to layers of a filter used by neural networks to denoise an image illustrated in block diagram 3000, a processor performs one or more operations to begin a first layer of a filter, as described herein. In at least one embodiment, after step 3006, said process to apply image residuals to layers of a filter used by neural networks to denoise an image illustrated in block diagram 3000 continues at step 3008.

In at least one embodiment, at step 3008 of said process to apply image residuals to layers of a filter used by neural networks to denoise an image illustrated in block diagram 3000, a processor performs one or more operations to determine whether to apply a residual before applying a layer of a filter (e.g., a layer indicated at step 3006). In at least one embodiment, at step 3010, if it is determined to apply a residual before applying a layer of a filter ("YES" branch), said process to apply image residuals to layers of a filter used by neural networks to denoise an image illustrated in block diagram 3000 continues at step 3010. In at least one embodiment, at step 3008, if it is determined to not apply a residual before applying a layer of a filter ("NO" branch), said process to apply image residuals to layers of a filter used by neural networks to denoise an image illustrated in block diagram 3000 continues at step 3016.

In at least one embodiment, at step 3010 of said process to apply image residuals to layers of a filter used by neural networks to denoise an image illustrated in block diagram 3000, a processor preforms one or more operations to determine whether a layer indicated at step 3006 is a decoding layer or an encoding layer. In at least one embodiment, at step 3010, if it is determined that a layer indicated at step 3006 is a decoding layer ("YES" branch), said process to apply image residuals to layers of a filter used by neural networks to denoise an image illustrated in block diagram 3000 continues at step 3012. In at least one embodiment, at step 3010, if it is determined that a layer indicated at step 3006 is an encoding layer ("NO" branch), said process to apply image residuals to layers of a filter used by neural networks to denoise an image illustrated in block diagram 3000 continues at step 3014.

In at least one embodiment, at step 3012 of said process to apply image residuals to layers of a filter used by neural networks to denoise an image illustrated in block diagram 3000, a processor performs one or more operations to subtract a residual is subtracted from an image, as described herein. In at least one embodiment, after step 3012, said process to apply image residuals to layers of a filter used by neural networks to denoise an image illustrated in block diagram 3000 continues at step 3016.

In at least one embodiment, at step 3014 of said process to apply image residuals to layers of a filter used by neural networks to denoise an image illustrated in block diagram 3000, a processor performs one or more operations to add a residual to an image. In at least one embodiment, after step 3014, said process to apply image residuals to layers of a filter used by neural networks to denoise an image illustrated in block diagram 3000 continues at step 3016.

In at least one embodiment, at step 3016 of said process to apply image residuals to layers of a filter used by neural networks to denoise an image illustrated in block diagram 3000, a processor performs one or more operations to apply a filter layer. In at least one embodiment, performing a decoding layer (e.g., "YES" branch at step 3010), a residual is subtracted from an image (e.g., step 3012) before applying a filter layer at step 3016. In at least one embodiment, performing an encoding layer (e.g., "NO" branch at step 3010), a residual is added to an image (e.g., step 3014) after applying a filter layer at step 3016. In at least one embodiment, after step 3016, said process to apply image residuals to layers of a filter used by neural networks to denoise an image illustrated in block diagram 3000 continues at step 3018.

In at least one embodiment, at step 3018 of said process to apply image residuals to layers of a filter used by neural networks to denoise an image illustrated in block diagram 3000, a processor performs one or more operations to determine whether to process a next layer. In at least one embodiment, at step 3018, if it is determined to process a next layer ("YES" branch), said process to apply image residuals to layers of a filter used by neural networks to denoise an image illustrated in block diagram 3000 continues at step 3006 to begin said next layer. In at least one embodiment, at step 3018, if it is determined to not process a next layer ("NO" branch), said process to apply image residuals to layers of a filter used by neural networks to denoise an image illustrated in block diagram 3000 continues at step 3020.

In at least one embodiment, at step 3020 of said process to apply image residuals to layers of a filter used by neural networks to denoise an image illustrated in block diagram 3000, a processor performs one or more operations to generate output as described herein. In at least one embodiment, after step 3020, said process to apply image residuals to layers of a filter used by neural networks to denoise an image illustrated in block diagram 3000 terminates. In at least one embodiment, not shown in FIG. 30, after step 3020, said process to apply image residuals to layers of a filter used by neural networks to denoise an image illustrated in block diagram 3000 continues at step 3002 to receive a next image.

In at least one embodiment, said process to apply image residuals to layers of a filter used by neural networks to denoise an image illustrated in block diagram 3000 is performed in conjunction with a process to apply image modulation and demodulation to layers of a filter used by neural networks to denoise an image illustrated in block diagram 3100. In at least one embodiment, said process to apply image residuals to layers of a filter used by neural networks to denoise an image illustrated in block diagram 3000 and said process to apply image modulation and demodulation to layers of a filter used by neural networks to denoise an image illustrated in block diagram 3100 are merged so that, for example, step 3006 to step 3018 of said process to apply image residuals to layers of a filter used by neural networks to denoise an image illustrated in block diagram 3000 are performed in conjunction with step 3106 to step 3118 of said process to apply image modulation and demodulation to layers of a filter used by neural networks to denoise an image illustrated in block diagram 3100, described below.

In at least one embodiment, operations of said process to apply image residuals to layers of a filter used by neural networks to denoise an image illustrated in block diagram 3000 are performed in a different order than is illustrated in FIG. 30. In at least one embodiment, operations of said process to apply image residuals to layers of a filter used by neural networks to denoise an image illustrated in block diagram 3000 are performed simultaneously or in parallel. In at least one embodiment, operations of said process to apply image residuals to layers of a filter used by neural networks to denoise an image illustrated in block diagram 3000 that do not depend on each other (e.g., are order independent) are performed simultaneously or in parallel. In at least one embodiment, operations of said process to apply image residuals to layers of a filter used by neural networks to denoise an image illustrated in block diagram 3000 are performed by a plurality of threads executing on a processor such as those described herein.

In at least one embodiment, one or more processors (e.g., processor 110 and/or other processors and/or accelerators such as those described herein) comprise one or more circuits to perform operations and/or instructions described herein in connection with FIG. 30, such as one or more circuits to cause one or more neural networks to cause one or more non-noise pixels to be identified and blended in parallel and/or otherwise perform operations described herein. In at least one embodiment, operations and/or instructions described herein in connection with FIG. 30 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 30 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 30, one or more components described herein in connection with FIG. 30 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 30, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 30 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 30 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 30, one or more components described herein in connection with FIG. 30 include one or more components described herein in connection with FIGS. 34A-80 to use one or more neural networks to adjust brightness of one or more pixels of one or more images prior to denoising the one or more images and/or otherwise perform operations described herein.

Figure 31:
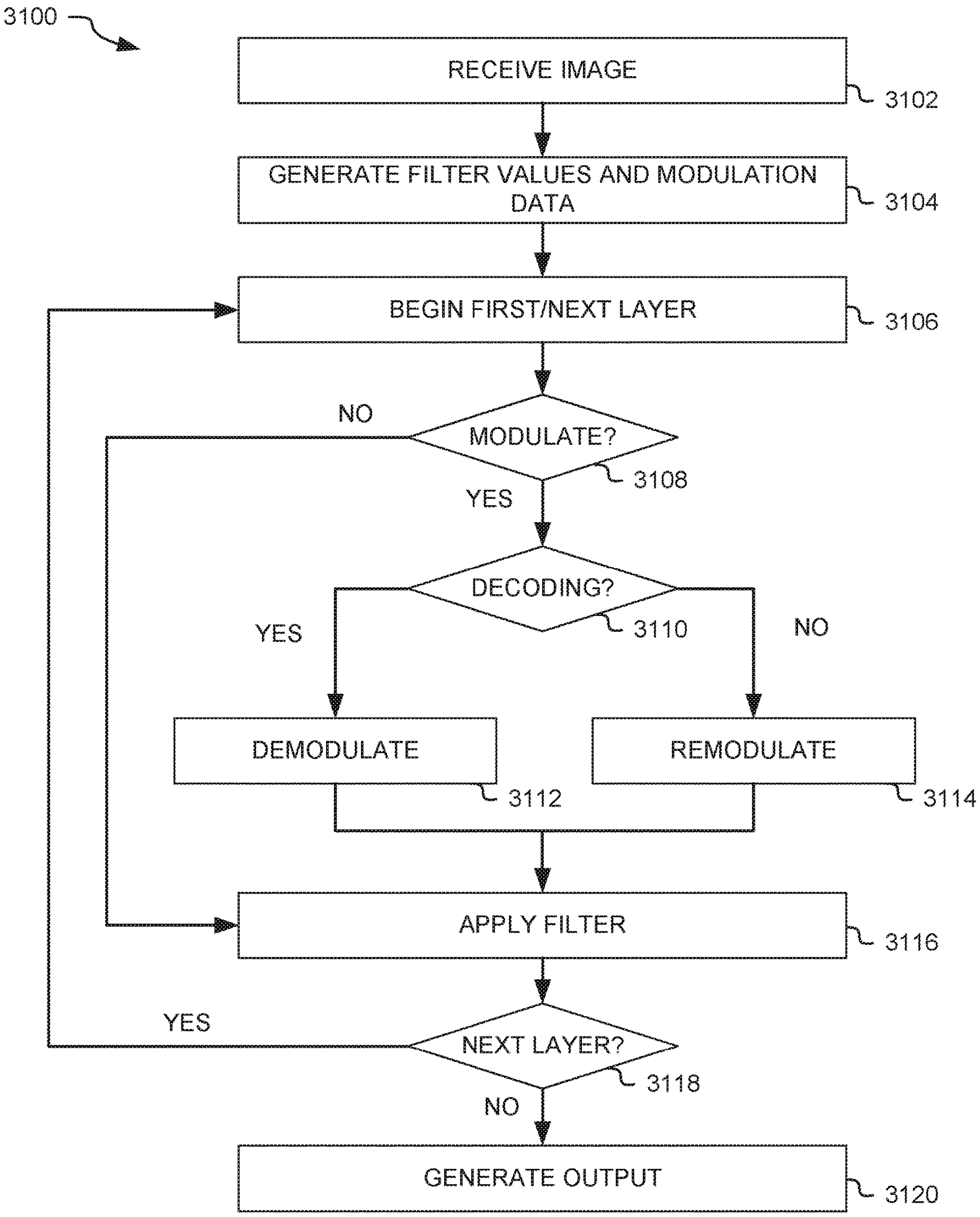
FIG. 31 is a block diagram illustrating a process to apply image modulation and demodulation to layers of a filter used by neural networks to denoise an image, in accordance with at least one embodiment.

FIG. 31 is a block diagram 3100 illustrating a process to apply image modulation and demodulation to layers of a filter used by neural networks to denoise an image, in accordance with at least one embodiment. In at least one embodiment, some or all of said process to apply image modulation and demodulation to layers of a filter used by neural networks to denoise an image illustrated in block diagram 3100 (or any other processes described herein, or variations and/or combinations thereof) is performed under control of one or more computer systems, such as those described in FIGS. 34A-80, configured with computer-executable instructions and is implemented as code (e.g., computer-executable instructions, one or more computer programs, or one or more applications) executing collectively on one or more processors, by hardware, software, or combinations thereof. In at least one embodiment, said code is stored on a computer-readable storage medium in form of a computer program comprising a plurality of computer-readable instructions executable by one or more processors such as those described herein. In at least one embodiment, a computer-readable storage medium is a non-transitory computer-readable medium. In at least one embodiment, a processor such as processor 110, described herein at least in connection with FIG. 1, performs one or more steps of said process to apply image modulation and demodulation to layers of a filter used by neural networks to denoise an image illustrated in block diagram 3100. In at least one embodiment, one or more other processors such as those described herein perform one or more steps of said process to apply image modulation and demodulation to layers of a filter used by neural networks to denoise an image illustrated in block diagram 3100.

In at least one embodiment, at step 3102 of said process to apply image modulation and demodulation to layers of a filter used by neural networks to denoise an image illustrated in block diagram 3100, a processor performs one or more operations to receive an image. In at least one embodiment, at step 3102, an image received is sent, indicated, or otherwise provided to a neural network such as neural network 112, described herein at least in connection with FIG. 1. In at least one embodiment, at step 3102, an image received is a noisy image, as described herein. In at least one embodiment, after step 3102, said process to apply image modulation and demodulation to layers of a filter used by neural networks to denoise an image illustrated in block diagram 3100 continues at step 3104.

In at least one embodiment, at step 3104 of said process to apply image modulation and demodulation to layers of a filter used by neural networks to denoise an image illustrated in block diagram 3100, a processor performs one or more operations to generate filter values and residuals, as described herein at least in connection with FIG. 27. In at least one embodiment, after step 3104, said process to apply image modulation and demodulation to layers of a filter used by neural networks to denoise an image illustrated in block diagram 3100 continues at step 3106.

In at least one embodiment, at step 3106 of said process to apply image modulation and demodulation to layers of a filter used by neural networks to denoise an image illustrated in block diagram 3100, a processor performs one or more operations to begin a first layer of a filter, as described herein. In at least one embodiment, after step 3106, said process to apply image modulation and demodulation to layers of a filter used by neural networks to denoise an image illustrated in block diagram 3100 continues at step 3108.

In at least one embodiment, at step 3108 of said process to apply image modulation and demodulation to layers of a filter used by neural networks to denoise an image illustrated in block diagram 3100, a processor performs one or more operations to determine whether to apply one or more modulation operations before applying a layer of a filter (e.g., a layer indicated at step 3106). In at least one embodiment, at step 3108, if it is determined to apply one or more modulation operations before applying a layer of a filter ("YES" branch), said process to apply image modulation and demodulation to layers of a filter used by neural networks to denoise an image illustrated in block diagram 3100 continues at step 3110. In at least one embodiment, at step 3108 if it is determined to not apply one or more modulation operations before applying a layer of a filter ("NO" branch), said process to apply image modulation and demodulation to layers of a filter used by neural networks to denoise an image illustrated in block diagram 3100 continues at step 3116.

In at least one embodiment, at step 3110 of said process to apply image modulation and demodulation to layers of a filter used by neural networks to denoise an image illustrated in block diagram 3100, a processor performs one or more operations to determine whether a layer indicated at step 3106 is a decoding layer or an encoding layer. In at least one embodiment, at step 3110, if it is determined that a layer indicated at step 3106 is a decoding layer ("YES" branch), said process to apply image modulation and demodulation to layers of a filter used by neural networks to denoise an image illustrated in block diagram 3100 continues at step 3112. In at least one embodiment, at step 3110, if it is determined that if it is determined that a layer indicated at step 3106 is an encoding layer ("NO" branch), said process to apply image modulation and demodulation to layers of a filter used by neural networks to denoise an image illustrated in block diagram 3100 continues at step 3114.

In at least one embodiment, at step 3112 of said process to apply image modulation and demodulation to layers of a filter used by neural networks to denoise an image illustrated in block diagram 3100, a processor performs one or more operations to divide an image by modulation data, as described herein. In at least one embodiment, after step 3112, said process to apply image modulation and demodulation to layers of a filter used by neural networks to denoise an image illustrated in block diagram 3100 continues at step 3116.

In at least one embodiment, at step 3114 of said process to apply image modulation and demodulation to layers of a filter used by neural networks to denoise an image illustrated in block diagram 3100, a processor performs one or more operations to multiply an image by modulation data, as described herein In at least one embodiment, after step 3114, said process to apply image modulation and demodulation to layers of a filter used by neural networks to denoise an image illustrated in block diagram 3100 continues at step 3116.

In at least one embodiment, at step 3116 of said process to apply image modulation and demodulation to layers of a filter used by neural networks to denoise an image illustrated in block diagram 3100, a processor performs one or more operations to apply a filter layer, as described herein. In at least one embodiment, performing a decoding layer (e.g., "YES" branch at step 3110), an image is divided by modulation data (e.g., step 3112) before applying a filter layer at step 3116. In at least one embodiment, performing an encoding layer (e.g., "NO" branch at step 3110), an image is multiplied by modulation data (e.g., step 3114) after applying a filter layer at step 3116. In at least one embodiment, after step 3116, said process to apply image modulation and demodulation to layers of a filter used by neural networks to denoise an image illustrated in block diagram 3100 continues at step 3118.

In at least one embodiment, at step 3118 of said process to apply image modulation and demodulation to layers of a filter used by neural networks to denoise an image illustrated in block diagram 3100, a processor performs one or more operations to determine whether to process a next layer. In at least one embodiment, at step 3118, if it is determined to process a next layer ("YES" branch), said process to apply image modulation and demodulation to layers of a filter used by neural networks to denoise an image illustrated in block diagram 3100 continues at step 3106 to begin said next layer. In at least one embodiment, at step 3118, if it is determined to not process a next layer ("NO" branch), said process to apply image modulation and demodulation to layers of a filter used by neural networks to denoise an image illustrated in block diagram 3100 continues at step 3120.

In at least one embodiment, at step 3120 of said process to apply image modulation and demodulation to layers of a filter used by neural networks to denoise an image illustrated in block diagram 3100, a processor performs one or more operations to generate output, as described herein. In at least one embodiment, after step 3120, said process to apply image modulation and demodulation to layers of a filter used by neural networks to denoise an image illustrated in block diagram 3100 terminates. In at least one embodiment, not shown in FIG. 31, after step 3120, said process to apply image modulation and demodulation to layers of a filter used by neural networks to denoise an image illustrated in block diagram 3100 continues at step 3102 receive a next image.

In at least one embodiment, said process to apply image modulation and demodulation to layers of a filter used by neural networks to denoise an image illustrated in block diagram 3100 is performed in conjunction with a process to apply image residuals to layers of a filter used by neural networks to denoise an image (e.g., illustrated in block diagram 3000). In at least one embodiment, said process to apply image residuals to layers of a filter used by neural networks to denoise an image illustrated in block diagram 3000 and said process to apply image modulation and demodulation to layers of a filter used by neural networks to denoise an image illustrated in block diagram 3100 are merged so that, for example, step 3006 to step 3018 of said process to apply image residuals to layers of a filter used by neural networks to denoise an image illustrated in block diagram 3000, described above, are performed in conjunction with step 3106 to step 3118 of said process to apply image modulation and demodulation to layers of a filter used by neural networks to denoise an image illustrated in block diagram 3100.

In at least one embodiment, operations of said process to apply image modulation and demodulation to layers of a filter used by neural networks to denoise an image illustrated in block diagram 3100 are performed in a different order than is illustrated in FIG. 31. In at least one embodiment, operations of said process to apply image modulation and demodulation to layers of a filter used by neural networks to denoise an image illustrated in block diagram 3100 are performed simultaneously or in parallel. In at least one embodiment, operations of said process to apply image modulation and demodulation to layers of a filter used by neural networks to denoise an image illustrated in block diagram 3100 that do not depend on each other (e.g., are order independent) are performed simultaneously or in parallel. In at least one embodiment, operations of said process to apply image modulation and demodulation to layers of a filter used by neural networks to denoise an image illustrated in block diagram 3100 are performed by a plurality of threads executing on a processor such as those described herein.

In at least one embodiment, one or more processors (e.g., processor 110 and/or other processors and/or accelerators such as those described herein) comprise one or more circuits to perform operations and/or instructions described herein in connection with FIG. 31, such as one or more circuits to cause one or more neural networks to cause one or more non-noise pixels to be identified and blended in parallel and/or otherwise perform operations described herein. In at least one embodiment, operations and/or instructions described herein in connection with FIG. 31 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 31 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 31, one or more components described herein in connection with FIG. 31 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 31, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 31 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 31 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 31, one or more components described herein in connection with FIG. 31 include one or more components described herein in connection with FIGS. 34A-80 to use one or more neural networks to adjust brightness of one or more pixels of one or more images prior to denoising the one or more images and/or otherwise perform operations described herein.

Figure 32:
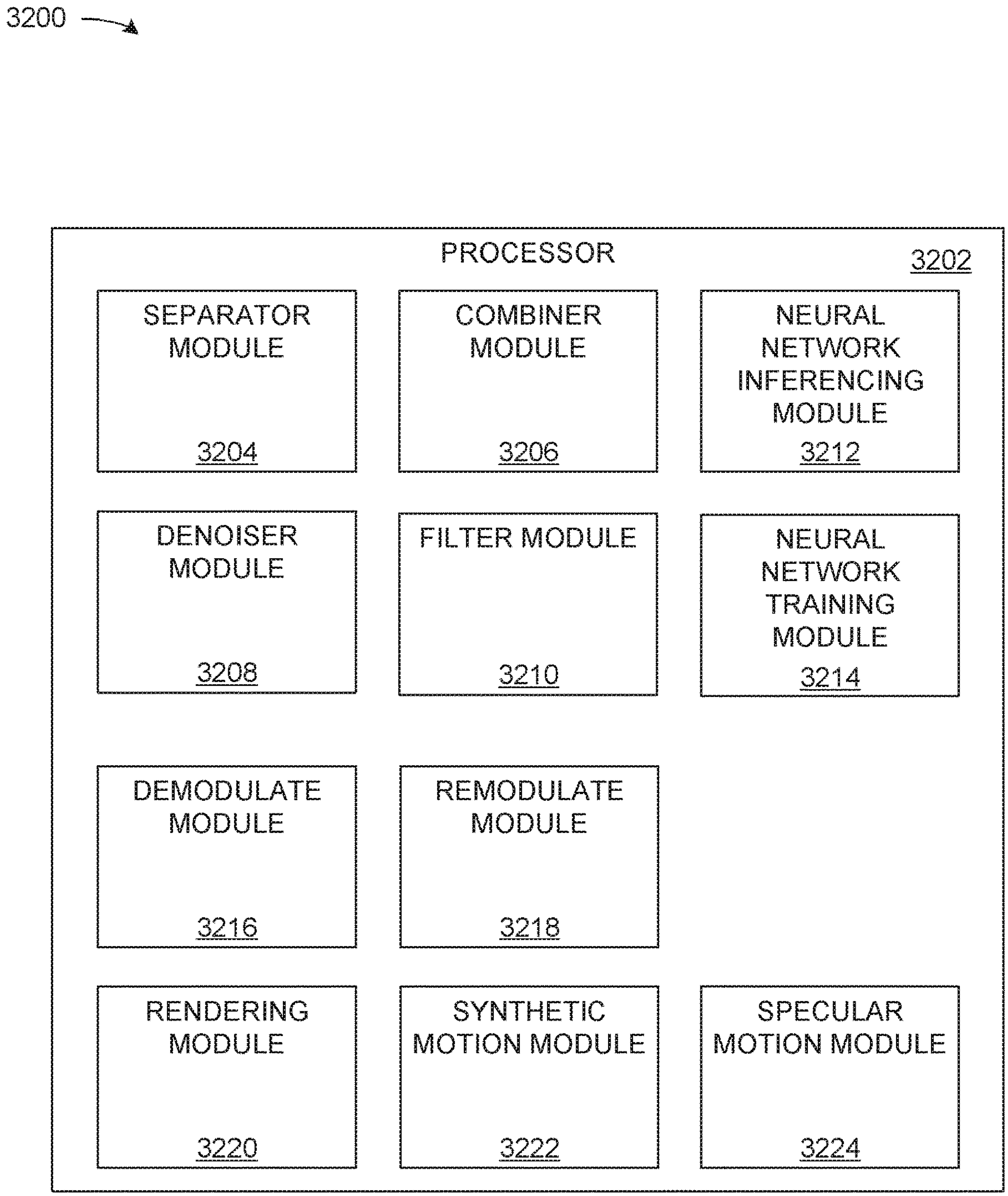
FIG. 32 is a block diagram illustrating a processor and modules, in accordance with at least one embodiment.

FIG. 32 is a block diagram 3200 illustrating a processor and modules, in accordance with at least one embodiment. In at least one embodiment, processor 3202 comprises one or more processors such as those described in connection with FIGS. 34A-80. In at least one embodiment, processor 3202 is a processor such as processor 110, described herein at least in connection with FIG. 1. In at least one embodiment, processor 3202 is any suitable processing unit and/or combination of processing units, such as one or more CPUs, GPUs, GPGPUs, PPUs, and/or variations thereof. In at least one embodiment, processor 3202 comprises or has access to one or more of a separator module 3204, a combiner module 3206, a denoiser module 3208, a filter module 3210, a neural network inferencing module 3212, a neural network training module 3214, a demodulate module 3216, a remodulate module 3218, a rendering module 3220, a synthetic motion module 3222, and a specular motion module 3224. In at least one embodiment, separator module 3204, combiner module 3206, denoiser module 3208, filter module 3210, neural network inferencing module 3212, neural network training module 3214, demodulate module 3216, remodulate module 3218, rendering module 3220, synthetic motion module 3222, and specular motion module 3224 are part of processor 3202 and/or one or more other processors such as those described herein. In at least one embodiment, separator module 3204, combiner module 3206, denoiser module 3208, filter module 3210, neural network inferencing module 3212, neural network training module 3214, demodulate module 3216, remodulate module 3218, rendering module 3220, synthetic motion module 3222, and specular motion module 3224 are distributed among multiple processors that communicate over a bus, network, by writing to shared memory, and/or any suitable communication process such as those described herein.

In at least one embodiment, a module as used in any implementation described herein, unless otherwise clear from context or stated explicitly to contrary, refers to any combination of software logic, firmware logic, hardware logic, and/or circuitry configured to provide functionality described herein. In at least one embodiment, software may be embodied as a software package, code and/or instruction set or instructions, and "hardware," as used, such as by a processor, in any implementation described herein, may include, for example, singly or in any combination, hardwired circuitry, programmable circuitry, state machine circuitry, fixed function circuitry, execution unit circuitry, and/or firmware that stores instructions executed by programmable circuitry. In at least one embodiment, modules may, collectively or individually, be embodied as circuitry that forms part of a larger system, for example, an integrated circuit (IC), system on-chip (SoC), and so forth. In at least one embodiment, a module performs one or more processes in connection with any suitable processing unit and/or combination of processing units, such as one or more CPUs, GPUs, GPGPUs, PPUs, and/or variations thereof.

In at least one embodiment, processor 3202 uses separator module 3204 to separate components of input data using a separator such as separator 406 as described herein at least in connection with FIG. 4. In at least one embodiment, processor 3202 performs separator module 3204 and processes such as those described herein by at least including or otherwise encoding instructions that cause performance of or otherwise can be utilized to perform said one or more processes (e.g., by processor 3202). In at least one embodiment, a processor using separator module 3204 obtains or is otherwise provided with one or more APIs such as those described herein. In at least one embodiment, processor 3202 separator module 3204 to separate components of input data using a separator using systems, methods, and/or operations described herein at least in connection with FIGS. 1-33. In at least one embodiment, processor 3202 uses separator module 3204 in connection with one or more of combiner module 3206, denoiser module 3208, filter module 3210, neural network inferencing module 3212, neural network training module 3214, demodulate module 3216, remodulate module 3218, rendering module 3220, synthetic motion module 3222, and specular motion module 3224 to cause one or more neural networks to cause one or more non-noise pixels to be identified and blended in parallel using systems, methods, and/or operations described herein at least in connection with FIGS. 1-33. In at least one embodiment, processor 3202 uses separator module 3204 in connection with one or more of combiner module 3206, denoiser module 3208, filter module 3210, neural network inferencing module 3212, neural network training module 3214, demodulate module 3216, remodulate module 3218, rendering module 3220, synthetic motion module 3222, and specular motion module 3224 to use one or more neural networks to adjust brightness of one or more pixels of one or more images prior to denoising the one or more images using systems, methods, and/or operations described herein at least in connection with FIGS. 1-33.

In at least one embodiment, processor 3202 uses combiner module 3206 to combine separated components of input data using a combiner such as combiner 408 as described herein at least in connection with FIG. 4. In at least one embodiment, processor 3202 performs combiner module 3206 and processes such as those described herein by at least including or otherwise encoding instructions that cause performance of or otherwise can be utilized to perform said one or more processes (e.g., by processor 3202). In at least one embodiment, a processor using combiner module 3206 obtains or is otherwise provided with one or more APIs such as those described herein. In at least one embodiment, processor 3202 uses combiner module 3206 to combine separated components of input data using a combiner using systems, methods, and/or operations described herein at least in connection with FIGS. 1-33. In at least one embodiment, processor 3202 uses combiner module 3206 in connection with one or more of separator module 3204, denoiser module 3208, filter module 3210, neural network inferencing module 3212, neural network training module 3214, demodulate module 3216, remodulate module 3218, rendering module 3220, synthetic motion module 3222, and specular motion module 3224 to cause one or more neural networks to cause one or more non-noise pixels to be identified and blended in parallel using systems, methods, and/or operations described herein at least in connection with FIGS. 1-33. In at least one embodiment, processor 3202 uses combiner module 3206 in connection with one or more of separator module 3204, denoiser module 3208, filter module 3210, neural network inferencing module 3212, neural network training module 3214, demodulate module 3216, remodulate module 3218, rendering module 3220, synthetic motion module 3222, and specular motion module 3224 to use one or more neural networks to adjust brightness of one or more pixels of one or more images prior to denoising the one or more images using systems, methods, and/or operations described herein at least in connection with FIGS. 1-33.

In at least one embodiment, processor 3202 uses denoiser module 3208 to denoise input data using a neural network such as neural network 112, as described herein at least in connection with FIG. 1. In at least one embodiment, processor 3202 performs denoiser module 3208 and processes such as those described herein by at least including or otherwise encoding instructions that cause performance of or otherwise can be utilized to perform said one or more processes (e.g., by processor 3202). In at least one embodiment, a processor using denoiser module 3208 obtains or is otherwise provided with one or more APIs such as those described herein. In at least one embodiment, processor 3202 uses denoiser module 3208 to denoise input data using a neural network using systems, methods, and/or operations described herein at least in connection with FIGS. 1-33. In at least one embodiment, processor 3202 uses denoiser module 3208 in connection with one or more of separator module 3204, combiner module 3206, filter module 3210, neural network inferencing module 3212, neural network training module 3214, demodulate module 3216, remodulate module 3218, rendering module 3220, synthetic motion module 3222, and specular motion module 3224 to cause one or more neural networks to cause one or more non-noise pixels to be identified and blended in parallel using systems, methods, and/or operations described herein at least in connection with FIGS. 1-33. In at least one embodiment, processor 3202 uses denoiser module 3208 in connection with one or more of separator module 3204, combiner module 3206, filter module 3210, neural network inferencing module 3212, neural network training module 3214, demodulate module 3216, remodulate module 3218, rendering module 3220, synthetic motion module 3222, and specular motion module 3224 to use one or more neural networks to adjust brightness of one or more pixels of one or more images prior to denoising the one or more images using systems, methods, and/or operations described herein at least in connection with FIGS. 1-33.

In at least one embodiment, processor 3202 uses filter module 3210 to denoise images using filtering (e.g., a filtering element of a neural network such as one or more of filters 708) as described herein. In at least one embodiment, processor 3202 performs filter module 3210 and processes such as those described herein by at least including or otherwise encoding instructions that cause performance of or otherwise can be utilized to perform said one or more processes (e.g., by processor 3202). In at least one embodiment, a processor using filter module 3210 obtains or is otherwise provided with one or more APIs such as those described herein. In at least one embodiment, processor 3202 uses filter module 3210 to denoise images using filtering using systems, methods, and/or operations described herein at least in connection with FIGS. 1-33. In at least one embodiment, processor 3202 uses filter module 3210 in connection with one or more of separator module 3204, combiner module 3206, denoiser module 3208, neural network inferencing module 3212, neural network training module 3214, demodulate module 3216, remodulate module 3218, rendering module 3220, synthetic motion module 3222, and specular motion module 3224 to cause one or more neural networks to cause one or more non-noise pixels to be identified and blended in parallel using systems, methods, and/or operations described herein at least in connection with FIGS. 1-33. In at least one embodiment, processor 3202 uses filter module 3210 in connection with one or more of separator module 3204, combiner module 3206, denoiser module 3208, neural network inferencing module 3212, neural network training module 3214, demodulate module 3216, remodulate module 3218, rendering module 3220, synthetic motion module 3222, and specular motion module 3224 to use one or more neural networks to adjust brightness of one or more pixels of one or more images prior to denoising the one or more images using systems, methods, and/or operations described herein at least in connection with FIGS. 1-33.

In at least one embodiment, processor 3202 uses neural network inferencing module 3212 to perform inferencing (e.g., inferencing 210 as described herein at least in connection with FIG. 2) using a neural network as described herein. In at least one embodiment, processor 3202 performs neural network inferencing module 3212 and processes such as those described herein by at least including or otherwise encoding instructions that cause performance of or otherwise can be utilized to perform said one or more processes (e.g., by processor 3202). In at least one embodiment, a processor using neural network inferencing module 3212 obtains or is otherwise provided with one or more APIs such as those described herein. In at least one embodiment, processor 3202 uses neural network inferencing module 3212 to perform inferencing using a neural network using systems, methods, and/or operations described herein at least in connection with FIGS. 1-33. In at least one embodiment, processor 3202 uses neural network inferencing module 3212 in connection with one or more of separator module 3204, combiner module 3206, denoiser module 3208, filter module 3210, neural network training module 3214, demodulate module 3216, remodulate module 3218, rendering module 3220, synthetic motion module 3222, and specular motion module 3224 to cause one or more neural networks to cause one or more non-noise pixels to be identified and blended in parallel using systems, methods, and/or operations described herein at least in connection with FIGS. 1-33. In at least one embodiment, processor 3202 uses neural network inferencing module 3212 in connection with one or more of separator module 3204, combiner module 3206, denoiser module 3208, filter module 3210, neural network training module 3214, demodulate module 3216, remodulate module 3218, rendering module 3220, synthetic motion module 3222, and specular motion module 3224 to use one or more neural networks to adjust brightness of one or more pixels of one or more images prior to denoising the one or more images using systems, methods, and/or operations described herein at least in connection with FIGS. 1-33.

In at least one embodiment, processor 3202 uses neural network training module 3214 to perform training (e.g., training 208 as described herein at least in connection with FIG. 2) of a neural network as described herein. In at least one embodiment, processor 3202 performs uses neural network training module 3214 and processes such as those described herein by at least including or otherwise encoding instructions that cause performance of or otherwise can be utilized to perform said one or more processes (e.g., by processor 3202). In at least one embodiment, a processor using uses neural network training module 3214 obtains or is otherwise provided with one or more APIs such as those described herein. In at least one embodiment, processor 3202 uses neural network training module 3214 to perform training of a neural network using systems, methods, and/or operations described herein at least in connection with FIGS. 1-33. In at least one embodiment, processor 3202 uses neural network training module 3214 in connection with one or more of separator module 3204, combiner module 3206, denoiser module 3208, filter module 3210, neural network inferencing module 3212, demodulate module 3216, remodulate module 3218, rendering module 3220, synthetic motion module 3222, and specular motion module 3224 to cause one or more neural networks to cause one or more non-noise pixels to be identified and blended in parallel using systems, methods, and/or operations described herein at least in connection with FIGS. 1-33. In at least one embodiment, processor 3202 uses neural network training module 3214 in connection with one or more of separator module 3204, combiner module 3206, denoiser module 3208, filter module 3210, neural network inferencing module 3212, demodulate module 3216, remodulate module 3218, rendering module 3220, synthetic motion module 3222, and specular motion module 3224 to use one or more neural networks to adjust brightness of one or more pixels of one or more images prior to denoising the one or more images using systems, methods, and/or operations described herein at least in connection with FIGS. 1-33.

In at least one embodiment, processor 3202 uses demodulate module 3216 to demodulate an input image (e.g., to divide an image by one or more components) as described herein. In at least one embodiment, processor 3202 performs demodulate module 3216 and processes such as those described herein by at least including or otherwise encoding instructions that cause performance of or otherwise can be utilized to perform said one or more processes (e.g., by processor 3202). In at least one embodiment, a processor using demodulate module 3216 obtains or is otherwise provided with one or more APIs such as those described herein. In at least one embodiment, processor 3202 uses demodulate module 3216 to demodulate an input image using systems, methods, and/or operations described herein at least in connection with FIGS. 1-33. In at least one embodiment, processor 3202 uses demodulate module 3216 in connection with one or more of separator module 3204, combiner module 3206, denoiser module 3208, filter module 3210, neural network inferencing module 3212, neural network training module 3214, remodulate module 3218, rendering module 3220, synthetic motion module 3222, and specular motion module 3224 to cause one or more neural networks to cause one or more non-noise pixels to be identified and blended in parallel using systems, methods, and/or operations described herein at least in connection with FIGS. 1-33. In at least one embodiment, processor 3202 uses demodulate module 3216 in connection with one or more of separator module 3204, combiner module 3206, denoiser module 3208, filter module 3210, neural network inferencing module 3212, neural network training module 3214, remodulate module 3218, rendering module 3220, synthetic motion module 3222, and specular motion module 3224 to use one or more neural networks to adjust brightness of one or more pixels of one or more images prior to denoising the one or more images using systems, methods, and/or operations described herein at least in connection with FIGS. 1-33.

In at least one embodiment, processor 3202 uses remodulate module 3218 to remodulate an input image (e.g., to multiply an image by one or more components) as described herein. In at least one embodiment, processor 3202 performs remodulate module 3218 and processes such as those described herein by at least including or otherwise encoding instructions that cause performance of or otherwise can be utilized to perform said one or more processes (e.g., by processor 3202). In at least one embodiment, a processor using remodulate module 3218 obtains or is otherwise provided with one or more APIs such as those described herein. In at least one embodiment, processor 3202 uses remodulate module 3218 to remodulate an image using systems, methods, and/or operations described herein at least in connection with FIGS. 1-33. In at least one embodiment, processor 3202 uses remodulate module 3218 in connection with one or more of separator module 3204, combiner module 3206, denoiser module 3208, filter module 3210, neural network inferencing module 3212, neural network training module 3214, demodulate module 3216, rendering module 3220, synthetic motion module 3222, and specular motion module 3224 to cause one or more neural networks to cause one or more non-noise pixels to be identified and blended in parallel using systems, methods, and/or operations described herein at least in connection with FIGS. 1-33. In at least one embodiment, processor 3202 uses remodulate module 3218 in connection with one or more of separator module 3204, combiner module 3206, denoiser module 3208, filter module 3210, neural network inferencing module 3212, neural network training module 3214, demodulate module 3216, rendering module 3220, synthetic motion module 3222, and specular motion module 3224 to use one or more neural networks to adjust brightness of one or more pixels of one or more images prior to denoising the one or more images using systems, methods, and/or operations described herein at least in connection with FIGS. 1-33.

In at least one embodiment, processor 3202 uses rendering module 3220 to render an image using an image renderer such as image renderer 118, as described herein at least in connection with FIG. 1. In at least one embodiment, processor 3202 performs rendering module 3220 and processes such as those described herein by at least including or otherwise encoding instructions that cause performance of or otherwise can be utilized to perform said one or more processes (e.g., by processor 3202). In at least one embodiment, a processor using rendering module 3220 obtains or is otherwise provided with one or more APIs such as those described herein. In at least one embodiment, processor 3202 uses rendering module 3220 to render an image using systems, methods, and/or operations described herein at least in connection with FIGS. 1-33. In at least one embodiment, processor 3202 uses rendering module 3220 in connection with one or more of separator module 3204, combiner module 3206, denoiser module 3208, filter module 3210, neural network inferencing module 3212, neural network training module 3214, demodulate module 3216, remodulate module 3218, synthetic motion module 3222, and specular motion module 3224 to cause one or more neural networks to cause one or more non-noise pixels to be identified and blended in parallel using systems, methods, and/or operations described herein at least in connection with FIGS. 1-33. In at least one embodiment, processor 3202 uses rendering module 3220 in connection with one or more of separator module 3204, combiner module 3206, denoiser module 3208, filter module 3210, neural network inferencing module 3212, neural network training module 3214, demodulate module 3216, remodulate module 3218, synthetic motion module 3222, and specular motion module 3224 to use one or more neural networks to adjust brightness of one or more pixels of one or more images prior to denoising the one or more images using systems, methods, and/or operations described herein at least in connection with FIGS. 1-33.

In at least one embodiment, processor 3202 uses synthetic motion module 3222 to generate synthetic motion of an image usable to denoise an image using a neural network as described herein. In at least one embodiment, processor 3202 performs synthetic motion module 3222 and processes such as those described herein by at least including or otherwise encoding instructions that cause performance of or otherwise can be utilized to perform said one or more processes (e.g., by processor 3202). In at least one embodiment, a processor using synthetic motion module 3222 obtains or is otherwise provided with one or more APIs such as those described herein. In at least one embodiment, processor 3202 uses synthetic motion module 3222 to generate synthetic motion of an image using systems, methods, and/or operations described herein at least in connection with FIGS. 1-33. In at least one embodiment, processor 3202 uses synthetic motion module 3222 in connection with one or more of separator module 3204, combiner module 3206, denoiser module 3208, filter module 3210, neural network inferencing module 3212, neural network training module 3214, demodulate module 3216, remodulate module 3218, rendering module 3220, and specular motion module 3224 to cause one or more neural networks to cause one or more non-noise pixels to be identified and blended in parallel using systems, methods, and/or operations described herein at least in connection with FIGS. 1-33. In at least one embodiment, processor 3202 uses synthetic motion module 3222 in connection with one or more of separator module 3204, combiner module 3206, denoiser module 3208, filter module 3210, neural network inferencing module 3212, neural network training module 3214, demodulate module 3216, remodulate module 3218, rendering module 3220, and specular motion module 3224 to use one or more neural networks to adjust brightness of one or more pixels of one or more images prior to denoising the one or more images using systems, methods, and/or operations described herein at least in connection with FIGS. 1-33.

In at least one embodiment, processor 3202 uses specular motion module 3224 to generate specular motion of an image usable to denoise an image using a neural network as described herein as those described herein. In at least one embodiment, processor 3202 performs specular motion module 3224 and processes such as those described herein by at least including or otherwise encoding instructions that cause performance of or otherwise can be utilized to perform said one or more processes (e.g., by processor 3202). In at least one embodiment, a processor using specular motion module 3224 obtains or is otherwise provided with one or more APIs such as those described herein. In at least one embodiment, processor 3202 uses specular motion module 3224 to generate specular motion of an image using systems, methods, and/or operations described herein at least in connection with FIGS. 1-33. In at least one embodiment, processor 3202 uses specular motion module 3224 in connection with one or more of separator module 3204, combiner module 3206, denoiser module 3208, filter module 3210, neural network inferencing module 3212, neural network training module 3214, demodulate module 3216, remodulate module 3218, rendering module 3220, and synthetic motion module 3222, to cause one or more neural networks to cause one or more non-noise pixels to be identified and blended in parallel using systems, methods, and/or operations described herein at least in connection with FIGS. 1-33. In at least one embodiment, processor 3202 uses specular motion module 3224 in connection with one or more of separator module 3204, combiner module 3206, denoiser module 3208, filter module 3210, neural network inferencing module 3212, neural network training module 3214, demodulate module 3216, remodulate module 3218, rendering module 3220, and synthetic motion module 3222, to use one or more neural networks to adjust brightness of one or more pixels of one or more images prior to denoising the one or more images using systems, methods, and/or operations described herein at least in connection with FIGS. 1-33.

In at least one embodiment, processor 3202 comprises circuitry to cause one or more circuits of processor 3202 to cause one or more neural networks to cause one or more non-noise pixels to be identified and blended in parallel using one or more of separator module 3204, combiner module 3206, denoiser module 3208, filter module 3210, neural network inferencing module 3212, neural network training module 3214, demodulate module 3216, remodulate module 3218, rendering module 3220, synthetic motion module 3222, and/or specular motion module 3224 using systems, methods, and/or operations described herein at least in connection with FIGS. 1-33. In at least one embodiment, processor 3202 comprises circuitry to cause one or more circuits of processor 3202 to use one or more neural networks to adjust brightness of one or more pixels of one or more images prior to denoising the one or more images using one or more of separator module 3204, combiner module 3206, denoiser module 3208, filter module 3210, neural network inferencing module 3212, neural network training module 3214, demodulate module 3216, remodulate module 3218, rendering module 3220, synthetic motion module 3222, and/or specular motion module 3224 using systems, methods, and/or operations described herein at least in connection with FIGS. 1-33.

In at least one embodiment, one or more processors (e.g., processor 110 and/or other processors and/or accelerators such as those described herein) comprise one or more circuits to perform operations and/or instructions described herein in connection with FIG. 32, such as one or more circuits to cause one or more neural networks to cause one or more non-noise pixels to be identified and blended in parallel and/or otherwise perform operations described herein. In at least one embodiment, operations and/or instructions described herein in connection with FIG. 32 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 32 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 32, one or more components described herein in connection with FIG. 32 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 32, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 32 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 32 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 32, one or more components described herein in connection with FIG. 32 include one or more components described herein in connection with FIGS. 34A-80 to use one or more neural networks to adjust brightness of one or more pixels of one or more images prior to denoising the one or more images and/or otherwise perform operations described herein.

Figure 33:
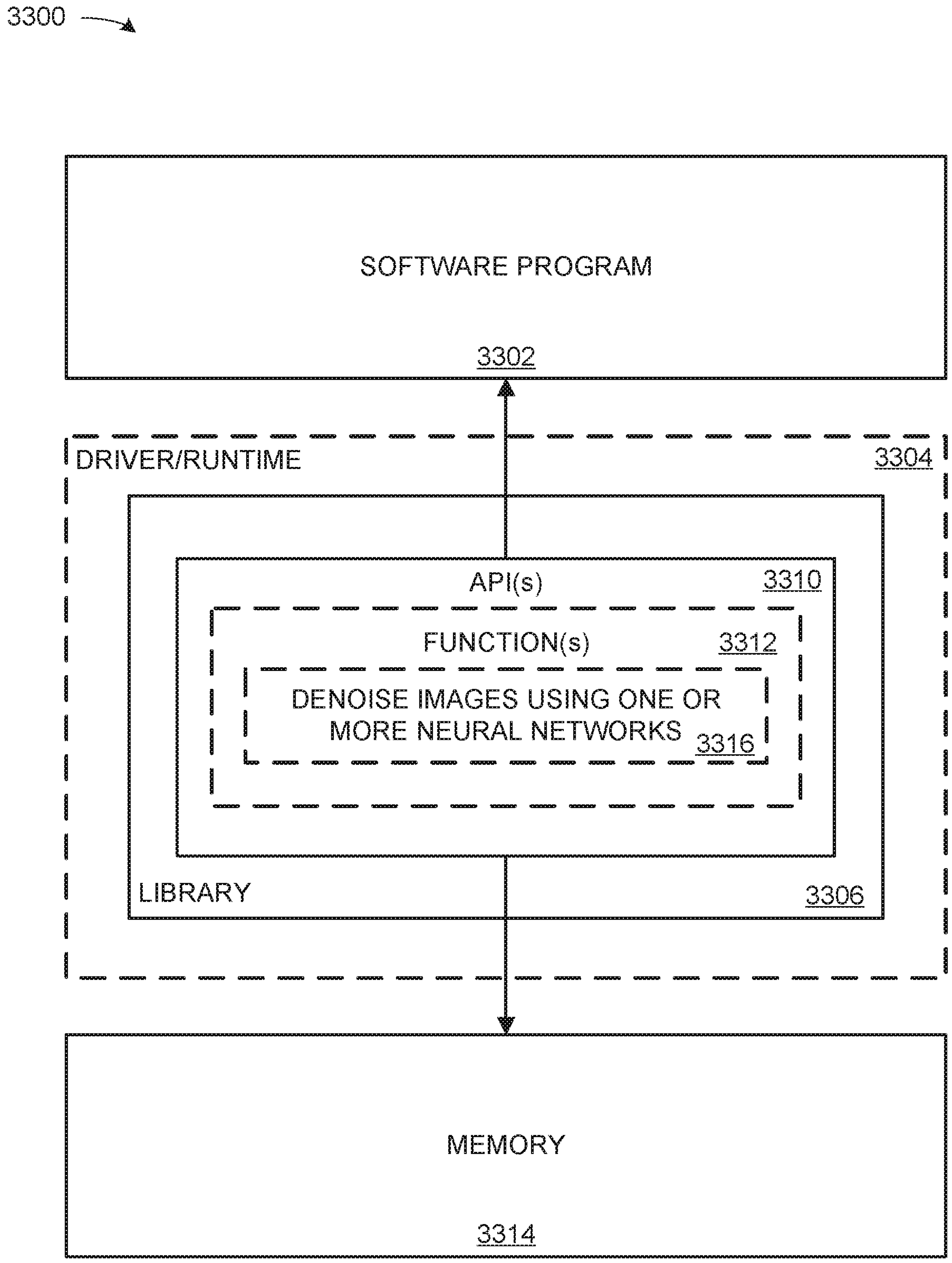
FIG. 33 is a block diagram illustrating a driver and/or runtime comprising one or more libraries to provide one or more application programming interfaces (APIs), in accordance with at least one embodiment.

FIG. 33 is a block diagram 3300 illustrating a driver and/or runtime comprising one or more libraries to provide one or more application programming interfaces (APIs), in accordance with at least one embodiment. In at least one embodiment, a software program 3302 is a software module. In at least one embodiment, a software program 3302 comprises one or more software modules including, but not limited to, those described herein at least in connection with FIG. 32. In at least one embodiment, a software module is as further described non-exclusively in FIG. 32. In at least one embodiment, one or more APIs 3310 are sets of software instructions that, if executed, cause one or more processors to perform one or more computational operations.

In at least one embodiment, one or more APIs 3310 are sets of software instructions that, if executed, cause one or more processors to perform one or more computational operations to use one or more neural networks to cause one or more neural networks to cause one or more non-noise pixels to be identified and blended in parallel. In at least one embodiment, one or more APIs 3310 are sets of software instructions that, if executed, cause one or more processors to perform one or more computational operations to use one or more neural networks to use one or more neural networks to adjust brightness of one or more pixels of one or more images prior to denoising the one or more images.

In at least one embodiment, one or more APIs 3310 are distributed or otherwise provided as a part of one or more libraries 3306, drivers and/or runtimes 3304, and/or any other grouping of software and/or executable code further described herein. In at least one embodiment, one or more APIs 3310 perform one or more computational operations in response to invocation by software programs 3302. In at least one embodiment, a software program 3302 is a collection of software code, commands, instructions, or other sequences of text to instruct a computing device to perform one or more computational operations and/or invoke one or more other sets of instructions, such as APIs 3310 or API functions 3312, to be executed. In at least one embodiment, functionality provided by one or more APIs 3310 include software functions 3312, such as those usable to accelerate one or more portions of software programs 3302 using one or more parallel processing units (PPUs), such as graphics processing units (GPUs).

In at least one embodiment, APIs 3310 are hardware interfaces to one or more circuits to perform one or more computational operations. In at least one embodiment, one or more software APIs 3310 described herein are implemented as one or more circuits to perform one or more techniques described herein in conjunction with FIGS. 1-32. In at least one embodiment, one or more software programs 3302 comprise instructions that, if executed, cause one or more hardware devices and/or circuits to perform one or more techniques described herein in conjunction with FIGS. 1-32.

In at least one embodiment, software programs 3302, such as user-implemented software programs, utilize one or more application programming interfaces (APIs) 3310 to perform various computing operations, such as memory reservation, matrix multiplication, arithmetic operations, or any computing operation performed by parallel processing units (PPUs), such as graphics processing units (GPUs), as further described herein. In at least one embodiment, one or more APIs 3310 provide a set of callable functions 3312, referred to herein as APIs, API functions, and/or functions, that individually perform one or more computing operations, such as computing operations related to parallel computing. For example, in an embodiment, one or more APIs 3310 provide functions 3312 to launch workloads, monitor workloads, and/or terminate workloads, as described herein.

In at least one embodiment, one or more software programs 3302 interact or otherwise communicate with one or more APIs 3310 to perform one or more computing operations using one or more PPUs, such as GPUs. In at least one embodiment, one or more computing operations using one or more PPUs comprise at least one or more groups of computing operations to be accelerated by execution at least in part by said one or more PPUs. In at least one embodiment, one or more software programs 3302 interact with one or more APIs 3310 to facilitate parallel computing using a remote or local interface.

In at least one embodiment, an interface is software instructions that, if executed, provide access to one or more functions 3312 provided by one or more APIs 3310. In at least one embodiment, a software program 3302 uses a local interface when a software developer compiles one or more software programs 3302 in conjunction with one or more libraries 3306 comprising or otherwise providing access to one or more APIs 3310. In at least one embodiment, one or more software programs 3302 are compiled statically in conjunction with pre-compiled libraries 3306 or uncompiled source code comprising instructions to perform one or more APIs 3310. In at least one embodiment, one or more software programs 3302 are compiled dynamically and said one or more software programs utilize a linker to link to one or more pre-compiled libraries 3306 comprising one or more APIs 3310.

In at least one embodiment, a software program 3302 uses a remote interface when a software developer executes a software program that utilizes or otherwise communicates with a library 3306 comprising one or more APIs 3310 over a network or other remote communication medium. In at least one embodiment, one or more libraries 3306 comprising one or more APIs 3310 are to be performed by a remote computing service, such as a computing resource services provider. In another embodiment, one or more libraries 3306 comprising one or more APIs 3310 are to be performed by any other computing host providing said one or more APIs 3310 to one or more software programs 3302.

In at least one embodiment, a processor performing or using one or more software programs 3302 call, use, perform, or otherwise implement one or more APIs 3310 to allocate and otherwise manage memory to be used by said software programs 3302. In at least one embodiment, one or more software programs 3302 utilize one or more APIs 3310 to allocate and otherwise manage memory to be used by one or more portions of said software programs 3302 to be accelerated using one or more PPUs, such as GPUs or any other accelerator or processor further described herein. Those software programs 3302 request a processor to launch workloads, monitor workloads, and/or terminate workloads using functions 3312 provided, in an embodiment, by one or more APIs 3310.

In at least one embodiment, an API 3310 is an API to facilitate parallel computing. In at least one embodiment, an API 3310 is any other API further described herein. In at least one embodiment, an API 3310 is provided by a driver and/or runtime 3304. In at least one embodiment, an API 3310 is provided by a CUDA user-mode driver. In at least one embodiment, an API 3310 is provided by a CUDA runtime. In at least one embodiment, a driver and/or runtime 3304 is data values and software instructions that, if executed, perform or otherwise facilitate operation of one or more functions 3312 of an API 3310 during load and execution of one or more portions of a software program 3302. In at least one embodiment, drivers and/or runtimes 3304 is data values and software instructions that, if executed, perform or otherwise facilitate operation of one or more functions 3312 of an API 3310 during execution of a software program 3302. In at least one embodiment, one or more software programs 3302 utilize one or more APIs 3310 implemented or otherwise provided by a driver and/or runtime 3304 to perform combined arithmetic operations by said one or more software programs 3302 during execution by one or more PPUs, such as GPUs.

In at least one embodiment, one or more software programs 3302 utilize one or more APIs 3310 provided by a driver and/or runtime 3304 to perform combine arithmetic operations of one or more PPUs, such as GPUs. In at least one embodiment, one or more APIs 3310 provide combined arithmetic operations through a driver and/or runtime 3304, as described above. In at least one embodiment, one or more software programs 3302 utilize one or more APIs 3310 provided by a driver and/or runtime 3304 to allocate or otherwise reserve one or more blocks of memory 3314 of one or more PPUs, such as GPUs. In at least one embodiment, one or more software programs 3302 utilize one or more APIs 3310 provided by a driver and/or runtime 3304 to allocate or otherwise reserve blocks of memory. In at least one embodiment, one or more APIs 3310 are to perform combined arithmetic operations, as described herein in conjunction with FIGS. 1-32.

To improve software programs 3302 usability and/or optimization of one or more portions of said software programs 3302 to be accelerated by one or more PPUs, such as GPUs, in an embodiment, one or more APIs 3310 provide one or more API functions 3312 to launch workloads, monitor workloads, and/or terminate workloads where said workloads are usable or used by one or more computing devices as described above and further described herein in conjunction with FIGS. 1-32. In at least one embodiment, block diagram 3300 depicts a processor, comprising one or more circuits to perform one or more software programs to combine two or more application programming interfaces (APIs) into a single API. In at least one embodiment, block diagram 3300 depicts a system, comprising one or more processors to perform one or more software programs to combine two or more application programming interfaces (APIs) into a single API. In at least one embodiment, a processor uses an API to denoise images using one or more neural networks 3316 as described herein.

In at least one embodiment, a processor uses an API to denoise images using one or more neural networks 3316, where said processor is to denoise images using one or more neural networks 3316 by causing one or more circuits to cause one or more neural networks to cause one or more non-noise pixels to be identified and blended in parallel. In at least one embodiment, a processor uses an API to denoise images using one or more neural networks 3316, where said processor is to denoise images using one or more neural networks 3316 by causing one or more circuits to use one or more neural networks to adjust brightness of one or more pixels of one or more images prior to denoising the one or more images.

In at least one embodiment, one or more processors (e.g., processor 110 and/or other processors and/or accelerators such as those described herein) comprise one or more circuits to perform operations and/or instructions described herein in connection with FIG. 33, such as one or more circuits to cause one or more neural networks to cause one or more non-noise pixels to be identified and blended in parallel and/or otherwise perform operations described herein. In at least one embodiment, operations and/or instructions described herein in connection with FIG. 33 are included in and/or otherwise include systems, methods, operations, and/or instructions described herein in connection with FIGS. 1-33 to cause one or more neural networks to cause one or more non-noise pixels to be identified and blended in parallel and/or otherwise perform operations described herein. In at least one embodiment, components described herein in connection with FIG. 33 perform one or more processes described herein in connection with FIGS. 1-33 to cause one or more neural networks to cause one or more non-noise pixels to be identified and blended in parallel and/or otherwise perform operations described herein. In at least one embodiment, not shown in FIG. 33, one or more components described herein in connection with FIG. 33 include one or more components described herein in connection with FIGS. 34A-80 to cause one or more neural networks to cause one or more non-noise pixels to be identified and blended in parallel and/or otherwise perform operations described herein.

In at least one embodiment, one or more processors (e.g., processor 110 and/or other processors and/or accelerators such as those described herein) comprise one or more circuits to perform operations and/or instructions described herein in connection with FIG. 33, such as one or more circuits to use one or more neural networks to adjust brightness of one or more pixels of one or more images prior to denoising the one or more images and/or otherwise perform operations described herein. In at least one embodiment, operations and/or instructions described herein in connection with FIG. 33 are included in and/or otherwise include systems, methods, operations, and/or instructions described herein in connection with FIGS. 1-33 to use one or more neural networks to adjust brightness of one or more pixels of one or more images prior to denoising the one or more images and/or otherwise perform operations described herein. In at least one embodiment, components described herein in connection with FIG. 33 perform one or more processes described herein in connection with FIGS. 1-33 to use one or more neural networks to adjust brightness of one or more pixels of one or more images prior to denoising the one or more images and/or otherwise perform operations described herein. In at least one embodiment, not shown in FIG. 33, one or more components described herein in connection with FIG. 33 include one or more components described herein in connection with FIGS. 34A-80 to use one or more neural networks to adjust brightness of one or more pixels of one or more images prior to denoising the one or more images and/or otherwise perform operations described herein.

Inference and Training Logic

Figure 34A:
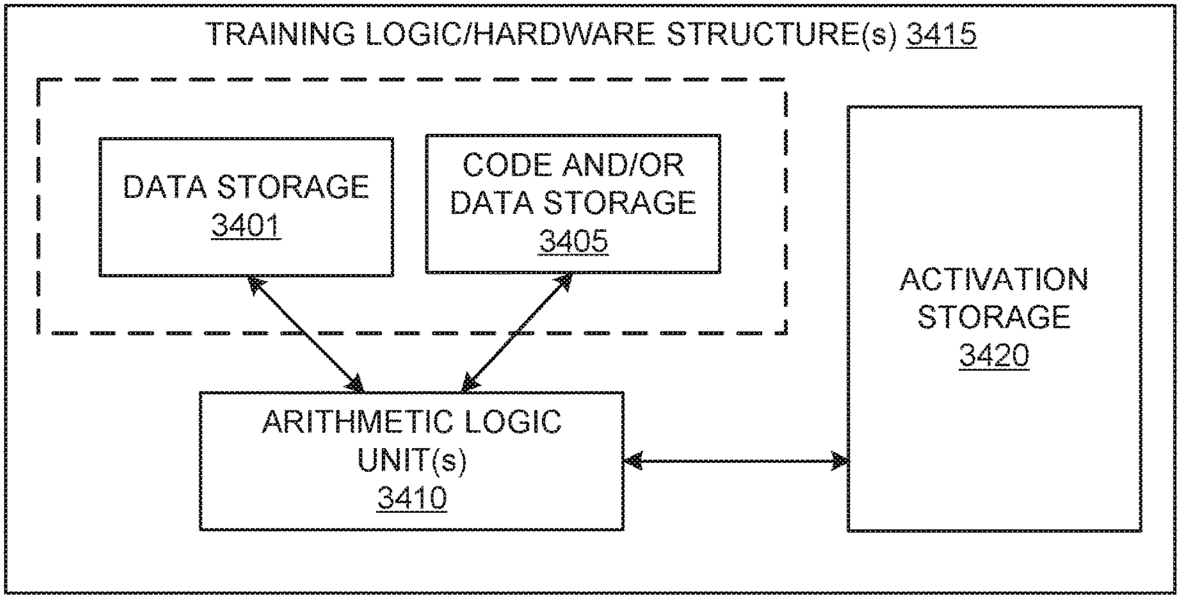
FIG. 34A illustrates inference and/or training logic, in accordance with at least one embodiment.

FIG. 34A illustrates inference and/or training logic 3415, in accordance with at least one embodiment. In at least one embodiment, inference and/or training logic 3415 is used to perform inferencing and/or training operations associated with one or more embodiments described herein. Details regarding inference and/or training logic 3415 are provided below in conjunction with FIGS. 34A and/or 34B.

In at least one embodiment, inference and/or training logic 3415 may include, without limitation, code and/or data storage 3401 to store forward and/or output weight and/or input/output data, and/or other parameters to configure neurons or layers of a neural network trained and/or used for inferencing in aspects of one or more embodiments. In at least one embodiment, training logic 3415 may include, or be coupled to code and/or data storage 3401 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which such code corresponds. In at least one embodiment, code and/or data storage 3401 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 3401 may be included with other on-chip or off-chip data storage, including a processor's L1, L2, or L3 cache or system memory.

In at least one embodiment, any portion of code and/or data storage 3401 may be internal or external to one or more processors or other hardware logic devices or circuits. In at least one embodiment, code and/or code and/or data storage 3401 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 3401 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 3415 may include, without limitation, a code and/or data storage 3405 to store backward and/or output weight and/or input/output data corresponding to neurons or layers of a neural network trained and/or used for inferencing in aspects of one or more embodiments. In at least one embodiment, code and/or data storage 3405 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 3415 may include, or be coupled to code and/or data storage 3405 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 3405 may be included with other on-chip or off-chip data storage, including a processor's L1, L2, or L3 cache or system memory. In at least one embodiment, any portion of code and/or data storage 3405 may be internal or external to one or more processors or other hardware logic devices or circuits. In at least one embodiment, code and/or data storage 3405 may be cache memory, DRAM, SRAM, non-volatile memory (e.g., flash memory), or other storage. In at least one embodiment, a choice of whether code and/or data storage 3405 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 3401 and code and/or data storage 3405 may be separate storage structures. In at least one embodiment, code and/or data storage 3401 and code and/or data storage 3405 may be a combined storage structure. In at least one embodiment, code and/or data storage 3401 and code and/or data storage 3405 may be partially combined and partially separate. In at least one embodiment, any portion of code and/or data storage 3401 and code and/or data storage 3405 may be included with other on-chip or off-chip data storage, including a processor's L1, L2, or L3 cache or system memory.

In at least one embodiment, inference and/or training logic 3415 may include, without limitation, one or more arithmetic logic unit(s) ("ALU(s)") 3410, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 3420 that are functions of input/output and/or weight parameter data stored in code and/or data storage 3401 and/or code and/or data storage 3405. In at least one embodiment, activations stored in activation storage 3420 are generated according to linear algebraic and or matrix-based mathematics performed by ALU(s) 3410 in response to performing instructions or other code, wherein weight values stored in code and/or data storage 3405 and/or data storage 3401 are used as operands along with other values, such as bias values, gradient information, momentum values, or other parameters or hyperparameters, any or all of which may be stored in code and/or data storage 3405 or code and/or data storage 3401 or another storage on or off-chip.

In at least one embodiment, ALU(s) 3410 are included within one or more processors or other hardware logic devices or circuits, whereas in another embodiment, ALU(s) 3410 may be external to a processor or other hardware logic device or circuit that uses them (e.g., a co-processor). In at least one embodiment, ALUs 3410 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 3401, code and/or data storage 3405, and activation storage 3420 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 3420 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 3420 may be cache memory, DRAM, SRAM, non-volatile memory (e.g., flash memory), or other storage. In at least one embodiment, activation storage 3420 may be completely or partially within or external to one or more processors or other logical circuits. In at least one embodiment, a choice of whether activation storage 3420 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 3415 illustrated in FIG. 34A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 3415 illustrated in FIG. 34A may be used in conjunction with central processing unit ("CPU") hardware, graphics processing unit ("GPU") hardware or other hardware, such as field programmable gate arrays ("FPGAs").

In at least one embodiment, at least one component shown or described with respect to FIG. 34A is used to perform techniques and/or functions described in connection with FIGS. 1-33. In at least one embodiment, at least one component shown or described with respect to FIG. 34A is used to cause one or more neural networks to cause one or more non-noise pixels to be identified and blended in parallel. In at least one embodiment, at least one component shown or described with respect to FIG. 34A is used to use one or more neural networks to adjust brightness of one or more pixels of one or more images prior to denoising the one or more images. In at least one embodiment, at least one component shown or described with respect to FIG. 34A is used to perform at least one aspect described with respect to FIGS. 1-33, and/or other systems, methods, or operations described herein. In at least one embodiment, inference and/or training logic 3415 is used to perform at least one aspect described with respect to FIGS. 1-33, and/or other systems, methods, or operations described herein.

Figure 34B:
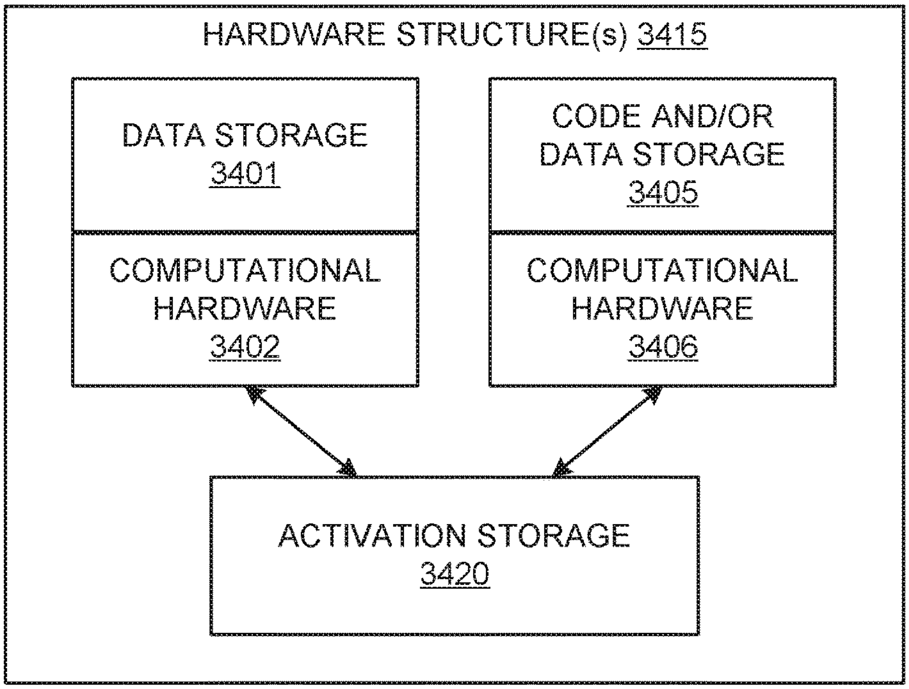
FIG. 34B illustrates inference and/or training logic, in accordance with at least one embodiment.

FIG. 34B illustrates inference and/or training logic 3415, in accordance with at least one embodiment. In at least one embodiment, inference and/or training logic 3415 may include, without limitation, hardware logic in which computational resources are dedicated or otherwise exclusively used in conjunction with weight values or other information corresponding to one or more layers of neurons within a neural network. In at least one embodiment, inference and/or training logic 3415 illustrated in FIG. 34B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 3415 illustrated in FIG. 34B may be used in conjunction with central processing unit (CPU) hardware, graphics processing unit (GPU) hardware or other hardware, such as field programmable gate arrays (FPGAs). In at least one embodiment, inference and/or training logic 3415 includes, without limitation, code and/or data storage 3401 and code and/or data storage 3405, which may be used to store code (e.g., graph code), weight values and/or other information, including bias values, gradient information, momentum values, and/or other parameter or hyperparameter information. In at least one embodiment illustrated in FIG. 34B, each of code and/or data storage 3401 and code and/or data storage 3405 is associated with a dedicated computational resource, such as computational hardware 3402 and computational hardware 3406, respectively. In at least one embodiment, each of computational hardware 3402 and computational hardware 3406 comprises one or more ALUs that perform mathematical functions, such as linear algebraic functions, only on information stored in code and/or data storage 3401 and code and/or data storage 3405, respectively, result of which is stored in activation storage 3420.

In at least one embodiment, each of code and/or data storage 3401 and 3405 and corresponding computational hardware 3402 and 3406, respectively, correspond to different layers of a neural network, such that resulting activation from one storage/computational pair 3401/3402 of code and/or data storage 3401 and computational hardware 3402 is provided as an input to a next storage/computational pair 3405/3406 of code and/or data storage 3405 and computational hardware 3406, in order to mirror a conceptual organization of a neural network. In at least one embodiment, each of storage/computational pairs 3401/3402 and 3405/3406 may correspond to more than one neural network layer. In at least one embodiment, additional storage/computation pairs (not shown) subsequent to or in parallel with storage/computation pairs 3401/3402 and 3405/3406 may be included in inference and/or training logic 3415.

In at least one embodiment, at least one component shown or described with respect to FIG. 34B is used to perform techniques and/or functions described in connection with FIGS. 1-33. In at least one embodiment, at least one component shown or described with respect to FIG. 34B is used to cause one or more neural networks to cause one or more non-noise pixels to be identified and blended in parallel. In at least one embodiment, at least one component shown or described with respect to FIG. 34B is used to use one or more neural networks to adjust brightness of one or more pixels of one or more images prior to denoising the one or more images. In at least one embodiment, at least one component shown or described with respect to FIG. 34B is used to perform at least one aspect described with respect to FIGS. 1-33, and/or other systems, methods, or operations described herein.

Neural Network Training and Deployment

Figure 35:
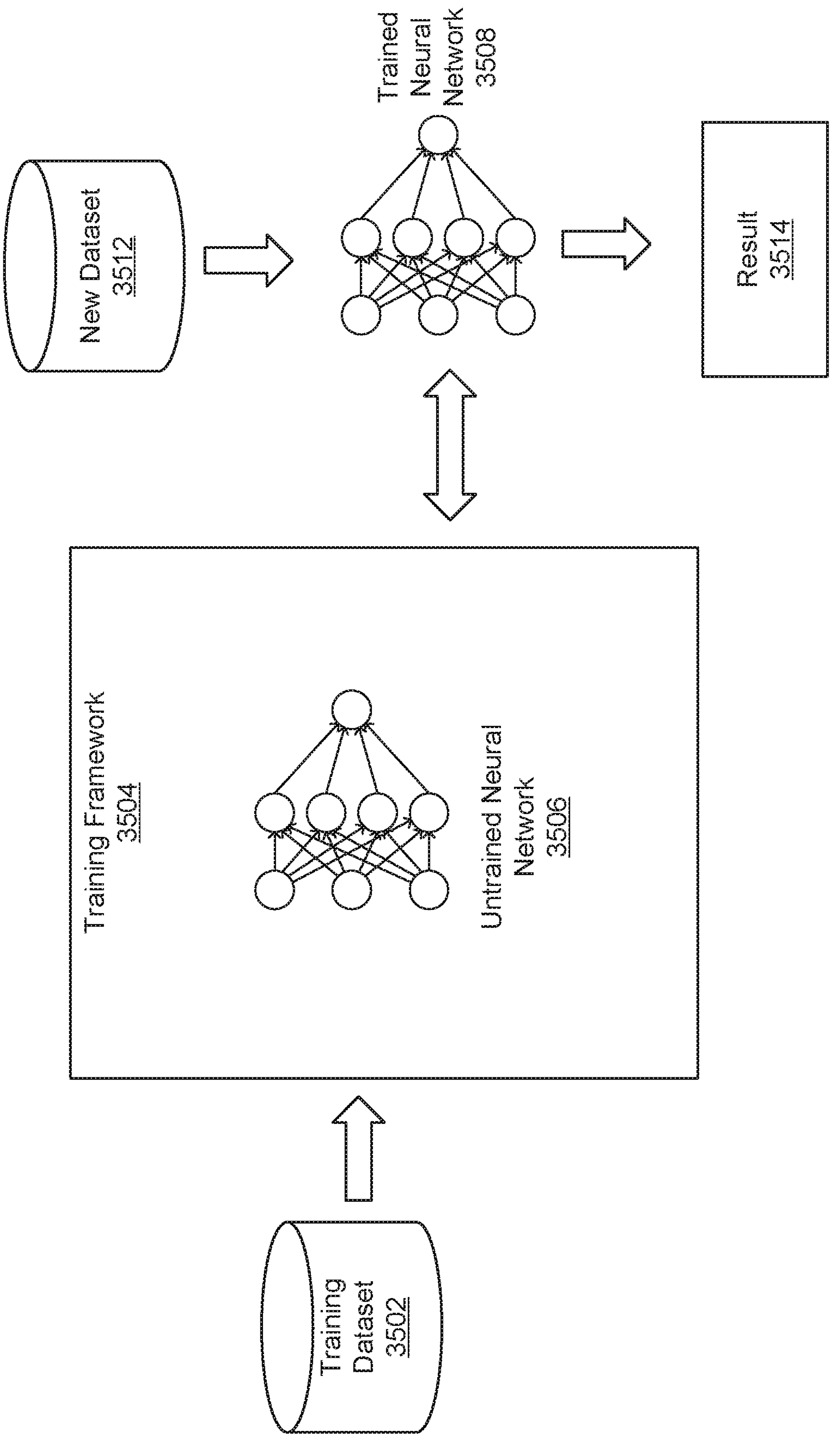
FIG. 35 illustrates training and deployment of a neural network, in accordance with at least one embodiment.

FIG. 35 illustrates training and deployment of a neural network, in accordance with at least one embodiment. In at least one embodiment, untrained neural network 3506 is trained using a training dataset 3502. In at least one embodiment, training framework 3504 is a PyTorch framework, whereas in other embodiments, training framework 3504 is a TensorFlow, Boost, Caffe, Microsoft Cognitive Toolkit/CNTK, MXNet, Chainer, Keras, Deeplearning4j, or other training framework. In at least one embodiment, training framework 3504 trains an untrained neural network 3506 and enables it to be trained using processing resources described herein to generate a trained neural network 3508. In at least one embodiment, weights may be chosen randomly or by pre-training using a deep belief network. In at least one embodiment, training may be performed in either a supervised, partially supervised, or unsupervised manner.

In at least one embodiment, untrained neural network 3506 is trained using supervised learning, wherein training dataset 3502 includes an input paired with a desired output for an input, or where training dataset 3502 includes input having a known output and an output of neural network 3506 is manually graded. In at least one embodiment, untrained neural network 3506 is trained in a supervised manner and processes inputs from training dataset 3502 and compares resulting outputs against a set of expected or desired outputs. In at least one embodiment, errors are then propagated back through untrained neural network 3506. In at least one embodiment, training framework 3504 adjusts weights that control untrained neural network 3506. In at least one embodiment, training framework 3504 includes tools to monitor how well untrained neural network 3506 is converging towards a model, such as trained neural network 3508, suitable to generating correct answers, such as in result 3514, based on input data such as a new dataset 3512. In at least one embodiment, training framework 3504 trains untrained neural network 3506 repeatedly while adjust weights to refine an output of untrained neural network 3506 using a loss function and adjustment algorithm, such as stochastic gradient descent. In at least one embodiment, training framework 3504 trains untrained neural network 3506 until untrained neural network 3506 achieves a desired accuracy. In at least one embodiment, trained neural network 3508 can then be deployed to implement any number of machine learning operations.

In at least one embodiment, untrained neural network 3506 is trained using unsupervised learning, wherein untrained neural network 3506 attempts to train itself using unlabeled data. In at least one embodiment, unsupervised learning training dataset 3502 will include input data without any associated output data or "ground truth" data. In at least one embodiment, untrained neural network 3506 can learn groupings within training dataset 3502 and can determine how individual inputs are related to untrained dataset 3502. In at least one embodiment, unsupervised training can be used to generate a self-organizing map in trained neural network 3508 capable of performing operations useful in reducing dimensionality of new dataset 3512. In at least one embodiment, unsupervised training can also be used to perform anomaly detection, which allows identification of data points in new dataset 3512 that deviate from normal patterns of new dataset 3512.

In at least one embodiment, semi-supervised learning may be used, which is a technique in which in training dataset 3502 includes a mix of labeled and unlabeled data. In at least one embodiment, training framework 3504 may be used to perform incremental learning, such as through transferred learning techniques. In at least one embodiment, incremental learning enables trained neural network 3508 to adapt to new dataset 3512 without forgetting knowledge instilled within trained neural network 3508 during initial training.

In at least one embodiment, at least one component shown or described with respect to FIG. 35 is used to perform techniques and/or functions described in connection with FIGS. 1-33. In at least one embodiment, at least one component shown or described with respect to FIG. 35 is used to cause one or more neural networks to cause one or more non-noise pixels to be identified and blended in parallel. In at least one embodiment, at least one component shown or described with respect to FIG. 35 is used to use one or more neural networks to adjust brightness of one or more pixels of one or more images prior to denoising the one or more images. In at least one embodiment, at least one component shown or described with respect to FIG. 35 is used to perform at least one aspect described with respect to FIGS. 1-33, and/or other systems, methods, or operations described herein.

Data Center

Figure 36:
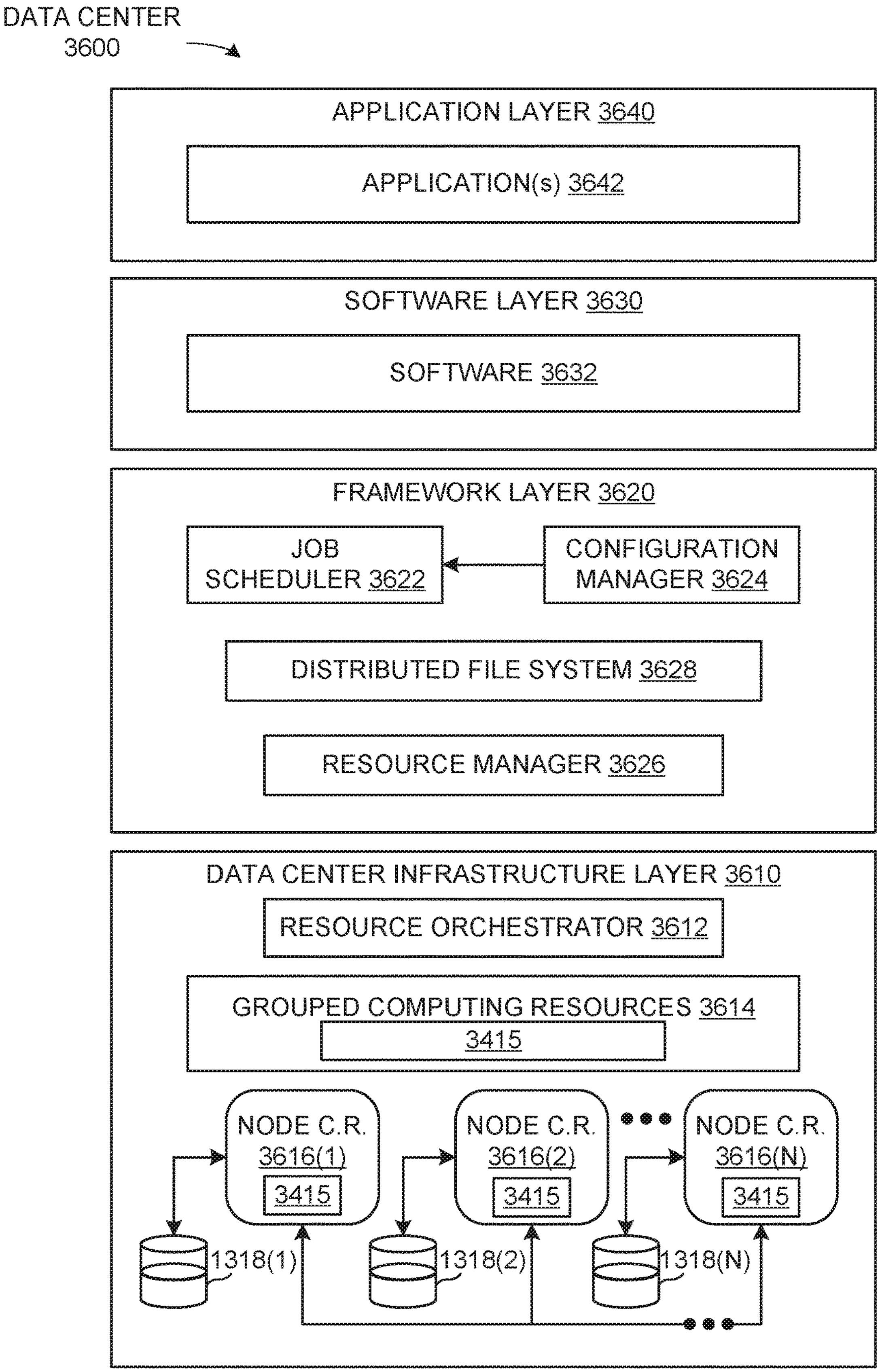
FIG. 36 illustrates an example data center system, in accordance with at least one embodiment.

FIG. 36 illustrates an example data center 3600, in accordance with at least one embodiment. In at least one embodiment, data center 3600 includes a data center infrastructure layer 3610, a framework layer 3620, a software layer 3630 and an application layer 3640.

In at least one embodiment, as shown in FIG. 36, data center infrastructure layer 3610 may include a resource orchestrator 3612, grouped computing resources 3614, and node computing resources ("node C.R.s") 3616(1)-3616(N), where "N" represents a positive integer (which may be a different integer "N" than used in other figures). In at least one embodiment, node C.R.s 3616(1)-3616(N) may include, but are not limited to, any number of central processing units ("CPUs") or other processors (including accelerators, field programmable gate arrays (FPGAs), graphics processors, etc.), memory storage devices 3618(1)-3618(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 3616(1)-3616(N) may be a server having one or more of above-mentioned computing resources.

In at least one embodiment, grouped computing resources 3614 may include separate groupings of node C.R.s housed within one or more racks (not shown), or many racks housed in data centers at various geographical locations (also not shown). In at least one embodiment, separate groupings of node C.R.s within grouped computing resources 3614 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 3612 may configure or otherwise control one or more node C.R.s 3616(1)-3616(N) and/or grouped computing resources 3614. In at least one embodiment, resource orchestrator 3612 may include a software design infrastructure ("SDI") management entity for data center 3600. In at least one embodiment, resource orchestrator 3412 may include hardware, software or some combination thereof.

In at least one embodiment, as shown in FIG. 36, framework layer 3620 includes a job scheduler 3622, a configuration manager 3624, a resource manager 3626 and a distributed file system 3628. In at least one embodiment, framework layer 3620 may include a framework to support software 3632 of software layer 3630 and/or one or more application(s) 3642 of application layer 3640. In at least one embodiment, software 3632 or application(s) 3642 may respectively include web-based service software or applications, such as those provided by Amazon Web Services, Google Cloud and Microsoft Azure. In at least one embodiment, framework layer 3620 may be, but is not limited to, a type of free and open-source software web application framework such as Apache Spark™ (hereinafter "Spark") that may utilize distributed file system 3628 for large-scale data processing (e.g., "big data"). In at least one embodiment, job scheduler 3622 may include a Spark driver to facilitate scheduling of workloads supported by various layers of data center 3600. In at least one embodiment, configuration manager 3624 may be capable of configuring different layers such as software layer 3630 and framework layer 3620 including Spark and distributed file system 3628 for supporting large-scale data processing. In at least one embodiment, resource manager 3626 may be capable of managing clustered or grouped computing resources mapped to or allocated for support of distributed file system 3628 and job scheduler 3622. In at least one embodiment, clustered or grouped computing resources may include grouped computing resources 3614 at data center infrastructure layer 3610. In at least one embodiment, resource manager 3626 may coordinate with resource orchestrator 3612 to manage these mapped or allocated computing resources.

In at least one embodiment, software 3632 included in software layer 3630 may include software used by at least portions of node C.R.s 3616(1)-3616(N), grouped computing resources 3614, and/or distributed file system 3628 of framework layer 3620. In at least one embodiment, one or more types of software may include, but are not limited to, Internet web page search software, e-mail virus scan software, database software, and streaming video content software.

In at least one embodiment, application(s) 3642 included in application layer 3640 may include one or more types of applications used by at least portions of node C.R.s 3616 (1)-3616(N), grouped computing resources 3614, and/or distributed file system 3628 of framework layer 3620. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 3624, resource manager 3626, and resource orchestrator 3612 may implement any number and type of self-modifying actions based on any amount and type of data acquired in any technically feasible fashion. In at least one embodiment, self-modifying actions may relieve a data center operator of data center 3600 from making possibly bad configuration decisions and possibly avoiding underutilized and/or poor performing portions of a data center.

In at least one embodiment, data center 3600 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 3600. In at least one embodiment, trained machine learning models corresponding to one or more neural networks may be used to infer or predict information using resources described above with respect to data center 3600 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 3415 are used to perform inferencing and/or training operations associated with one or more embodiments. Details regarding inference and/or training logic 3415 are provided herein in conjunction with FIGS. 34B and/or 34B. In at least one embodiment, inference and/or training logic 3415 may be used in system FIG. 36 for inferencing or predicting operations based, at least in part, on weight parameters calculated using neural network training operations, neural network functions and/or architectures, or neural network use cases described herein.

In at least one embodiment, at least one component shown or described with respect to FIG. 36 is used to perform techniques and/or functions described in connection with FIGS. 1-33. In at least one embodiment, at least one component shown or described with respect to FIG. 36 is used to cause one or more neural networks to cause one or more non-noise pixels to be identified and blended in parallel. In at least one embodiment, at least one component shown or described with respect to FIG. 36 is used to use one or more neural networks to adjust brightness of one or more pixels of one or more images prior to denoising the one or more images. In at least one embodiment, at least one component shown or described with respect to FIG. 36 is used to perform at least one aspect described with respect to FIGS. 1-33, and/or other systems, methods, or operations described herein.

Supercomputing

The following figures set forth, without limitation, exemplary supercomputer-based systems that can be used to implement at least one embodiment.

In at least one embodiment, a supercomputer may refer to a hardware system exhibiting substantial parallelism and comprising at least one chip, where chips in a system are interconnected by a network and are placed in hierarchically organized enclosures. In at least one embodiment, a large hardware system filling a machine room, with several racks, each containing several boards/rack modules, each containing several chips, all interconnected by a scalable network, is one particular example of a supercomputer. In at least one embodiment, a single rack of such a large hardware system is another example of a supercomputer. In at least one embodiment, a single chip exhibiting substantial parallelism and containing several hardware components can equally be considered to be a supercomputer, since as feature sizes may decrease, an amount of hardware that can be incorporated in a single chip may also increase.

Figure 37A:
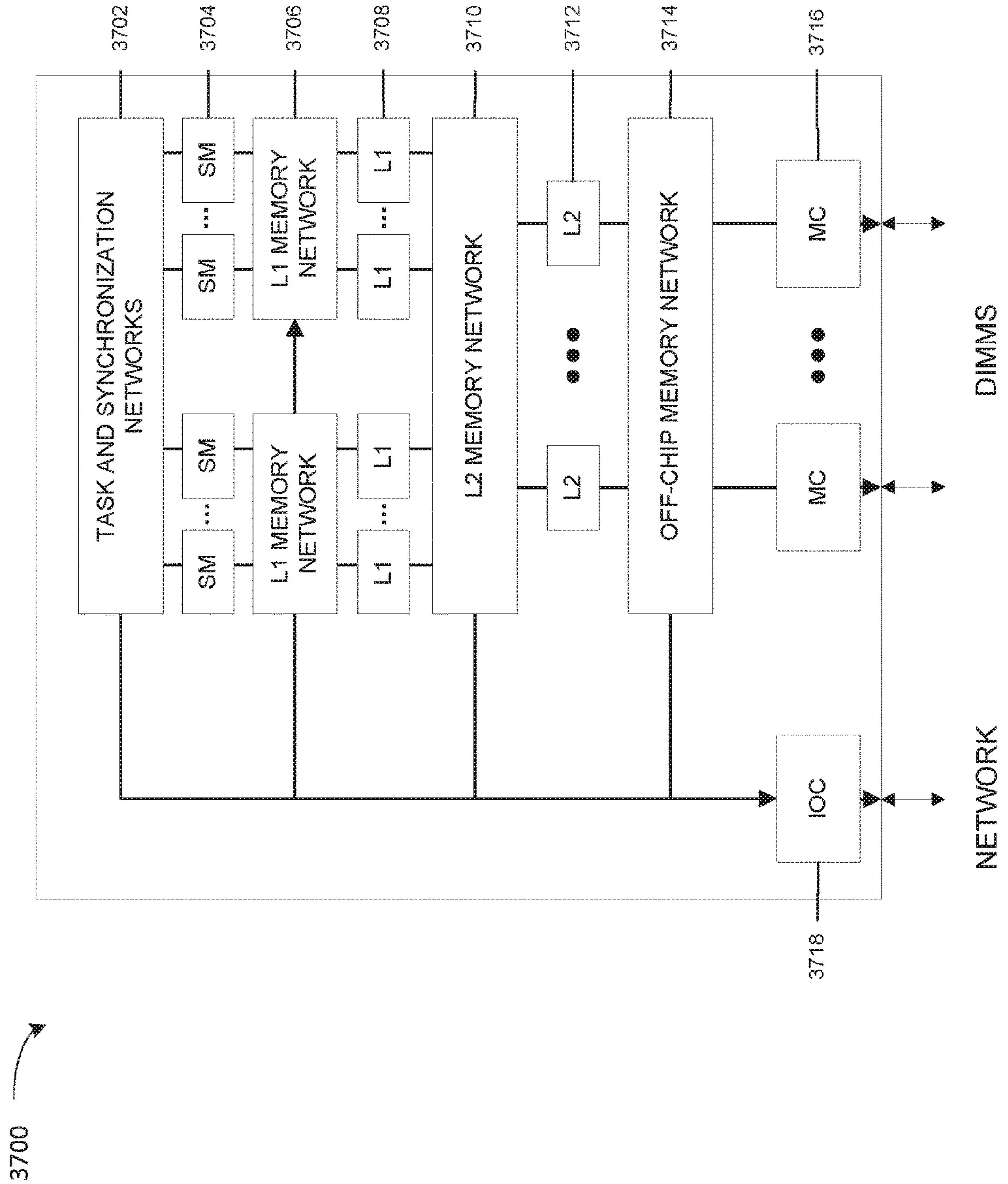
FIG. 37A illustrates a supercomputer at a chip level, in accordance with at least one embodiment.

FIG. 37A illustrates a supercomputer at a chip level, in accordance with at least one embodiment. In at least one embodiment, inside an FPGA or ASIC chip, main computation is performed within finite state machines (3704) called thread units. In at least one embodiment, task and synchronization networks (3702) connect finite state machines and are used to dispatch threads and execute operations in correct order. In at least one embodiment, a multi-level partitioned on-chip cache hierarchy (3708, 3712) is accessed using memory networks (3706, 3710). In at least one embodiment, off-chip memory is accessed using memory controllers (3716) and an off-chip memory network (3714). In at least one embodiment, I/O controller (3718) is used for cross-chip communication when a design does not fit in a single logic chip.

Figure 37B:
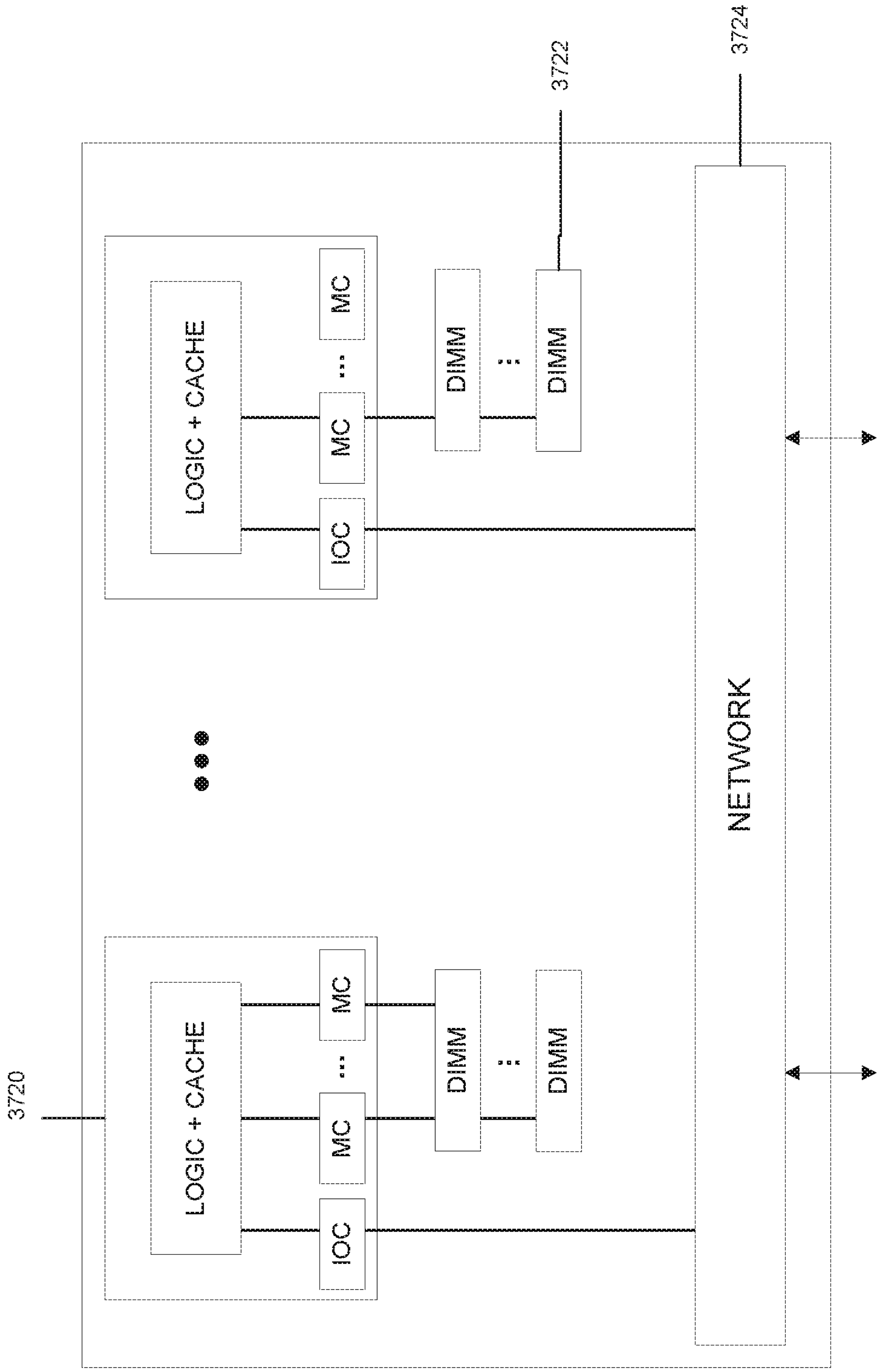
FIG. 37B illustrates a supercomputer at a rack module level, in accordance with at least one embodiment.

FIG. 37B illustrates a supercomputer at a rock module level, in accordance with at least one embodiment. In at least one embodiment, within a rack module, there are multiple FPGA or ASIC chips (3720) that are connected to one or more DRAM units (3722) which constitute main accelerator memory. In at least one embodiment, each FPGA/ASIC chip is connected to its neighbor FPGA/ASIC chip using wide busses on a board, with differential high speed signaling (3724). In at least one embodiment, each FPGA/ASIC chip is also connected to at least one high-speed serial communication cable.

Figure 37C:
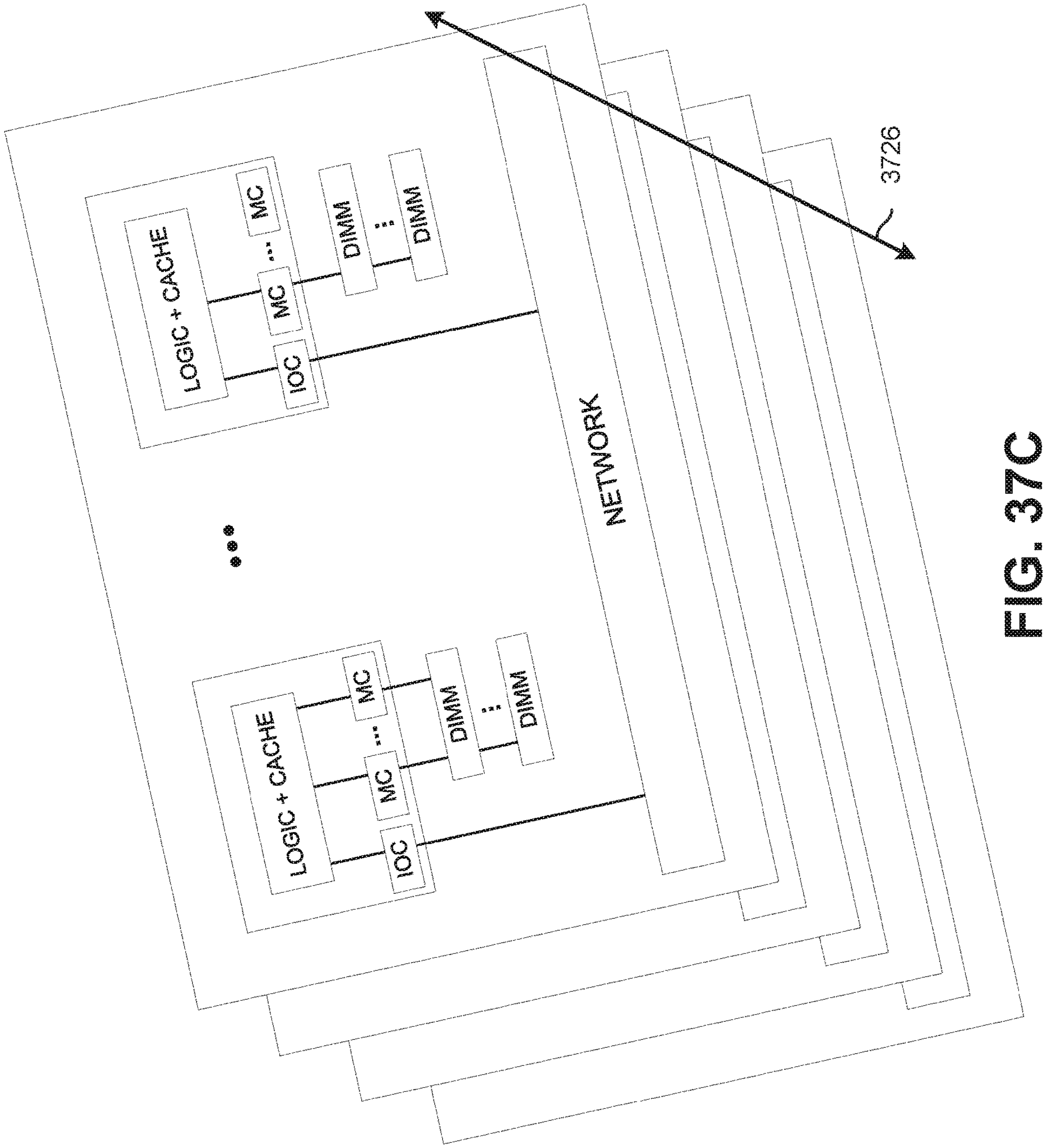
FIG. 37C illustrates a supercomputer at a rack level, in accordance with at least one embodiment.
Figure 37D:
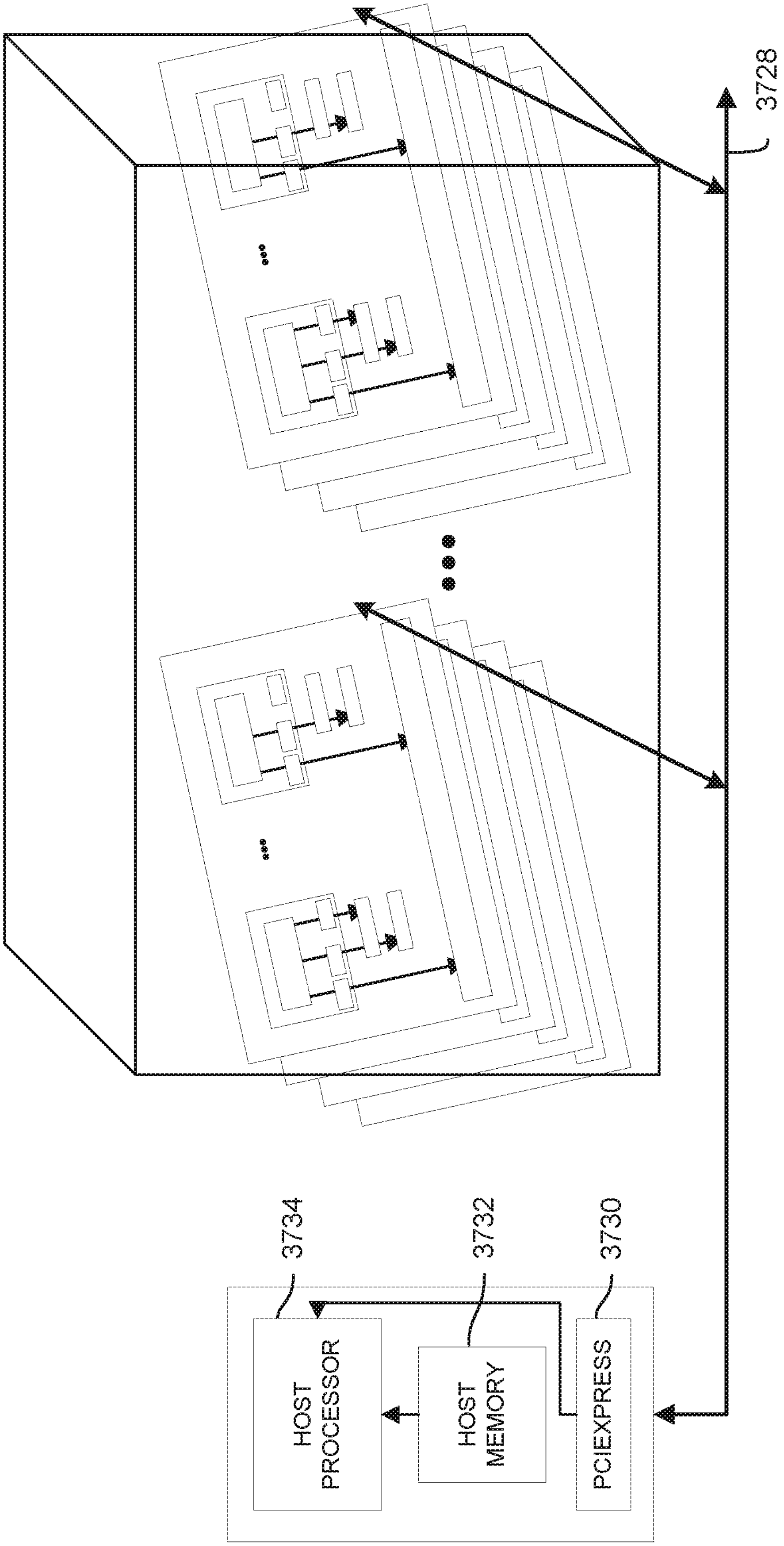
FIG. 37D illustrates a supercomputer at a whole system level, in accordance with at least one embodiment

FIG. 37C illustrates a supercomputer at a rack level, in accordance with at least one embodiment. FIG. 37D illustrates a supercomputer at a whole system level, in accordance with at least one embodiment. In at least one embodiment, referring to FIG. 37C and FIG. 37D, between rack modules in a rack and across racks throughout an entire system, high-speed serial optical or copper cables (3726, 3728) are used to realize a scalable, possibly incomplete hypercube network. In at least one embodiment, one of FPGA/ASIC chips of an accelerator is connected to a host system through a PCI-Express connection (3730). In at least one embodiment, host system comprises a host microprocessor (3734) that a software part of an application runs on and a memory consisting of one or more host memory DRAM units (3732) that is kept coherent with memory on an accelerator. In at least one embodiment, host system can be a separate module on one of racks, or can be integrated with one of a supercomputer's modules. In at least one embodiment, cube-connected cycles topology provide communication links to create a hypercube network for a large supercomputer. In at least one embodiment, a small group of FPGA/ASIC chips on a rack module can act as a single hypercube node, such that a total number of external links of each group is increased, compared to a single chip. In at least one embodiment, a group contains chips A, B, C and D on a rack module with internal wide differential busses connecting A, B, C and D in a torus organization. In at least one embodiment, there are 12 serial communication cables connecting a rack module to an outside world. In at least one embodiment, chip A on a rack module connects to serial communication cables 0, 1, 2. In at least one embodiment, chip B connects to cables 3, 4, 5. In at least one embodiment, chip C connects to 6, 7, 8. In at least one embodiment, chip D connects to 9, 10, 11. In at least one embodiment, an entire group {A, B, C, D} constituting a rack module can form a hypercube node within a supercomputer system, with up to 212=4096 rack modules (16384 FPGA/ASIC chips). In at least one embodiment, for chip A to send a message out on link 4 of group {A, B, C, D}, a message has to be routed first to chip B with an on-board differential wide bus connection. In at least one embodiment, a message arriving into a group {A, B, C, D} on link 4 (i.e., arriving at B) destined to chip A, also has to be routed first to a correct destination chip (A) internally within a group {A, B, C, D}. In at least one embodiment, parallel supercomputer systems of other sizes may also be implemented.

In at least one embodiment, at least one component shown or described with respect to FIGS. 37A-37D is used to perform techniques and/or functions described in connection with FIGS. 1-33. In at least one embodiment, at least one component shown or described with respect to FIGS. 37A-37D is used to cause one or more neural networks to cause one or more non-noise pixels to be identified and blended in parallel. In at least one embodiment, at least one component shown or described with respect to FIGS. 37A-37D is used to use one or more neural networks to adjust brightness of one or more pixels of one or more images prior to denoising the one or more images. In at least one embodiment, at least one component shown or described with respect to FIGS. 37A-37D is used to perform at least one aspect described with respect to FIGS. 1-33, and/or other systems, methods, or operations described herein.

Computer Systems

Figure 38:
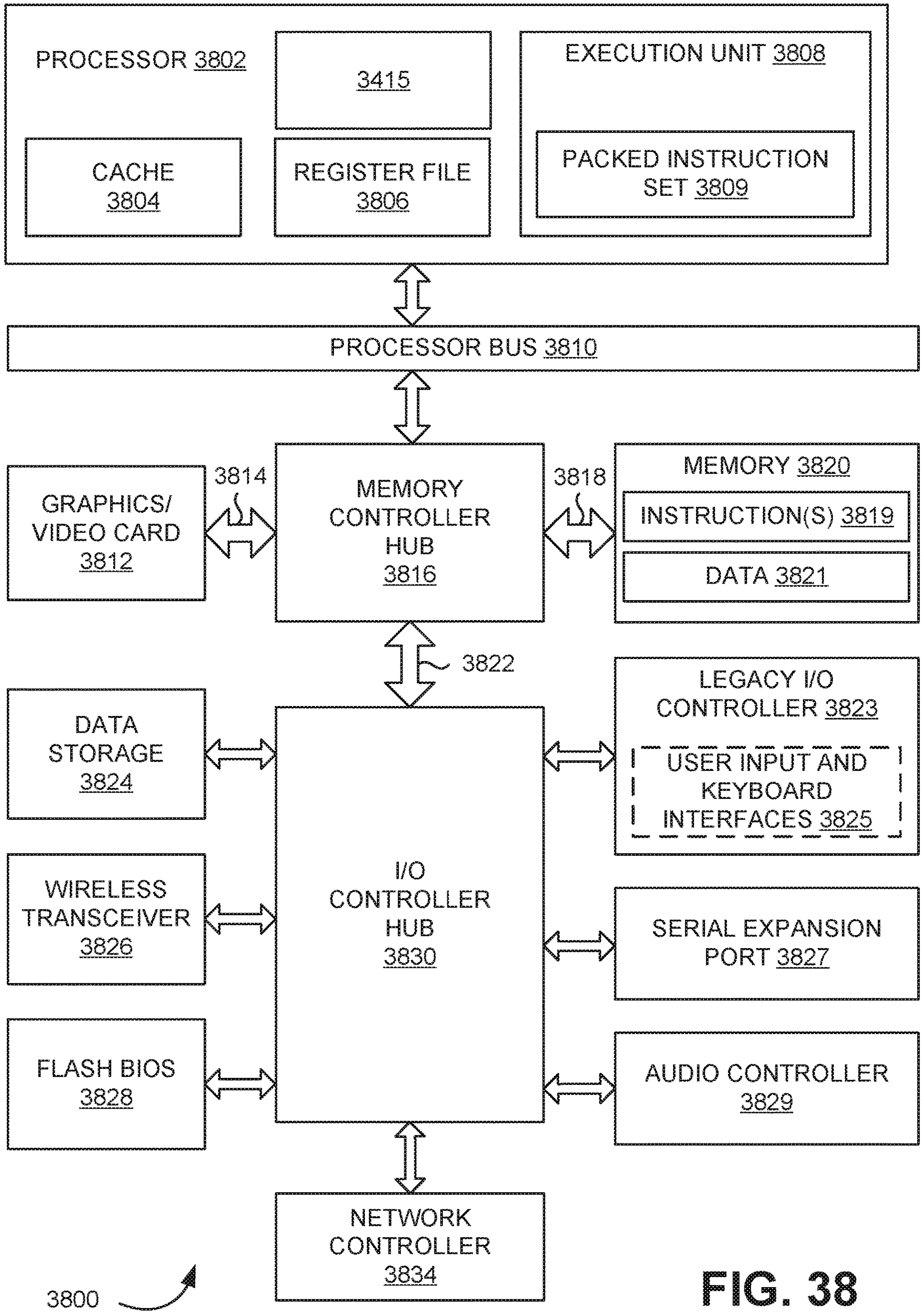
FIG. 38 is a block diagram illustrating a computer system, in accordance with at least one embodiment.

FIG. 38 is a block diagram illustrating an exemplary computer system 3800, in accordance with at least one embodiment. In at least one embodiment, an exemplary computer system illustrated in FIG. 38 may be a system with interconnected devices and components, a system-on-a-chip (SOC) or some combination thereof formed with a processor that may include execution units to execute an instruction. In at least one embodiment, a computer system 3800 may include, without limitation, a component, such as a processor 3802 to employ execution units including logic to perform algorithms for process data, in accordance with present disclosure, such as in embodiment described herein. In at least one embodiment, computer system 3800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 3800 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 3800 may include, without limitation, processor 3802 that may include, without limitation, one or more execution units 3808 to perform machine learning model training and/or inferencing according to techniques described herein. In at least one embodiment, computer system 3800 is a single processor desktop or server system, but in another embodiment, computer system 3800 may be a multiprocessor system. In at least one embodiment, processor 3802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 3802 may be coupled to a processor bus 3810 that may transmit data signals between processor 3802 and other components in computer system 3800.

In at least one embodiment, processor 3802 may include, without limitation, a Level 1 ("L1") internal cache memory ("cache") 3804. In at least one embodiment, processor 3802 may have a single internal cache or multiple levels of internal cache. In at least one embodiment, cache memory may reside external to processor 3802. Other embodiments may also include a combination of both internal and external caches depending on particular implementation and needs. In at least one embodiment, a register file 3806 may store different types of data in various registers including, without limitation, integer registers, floating point registers, status registers, and an instruction pointer register.

In at least one embodiment, execution unit 3808, including, without limitation, logic to perform integer and floating point operations, also resides in processor 3802. In at least one embodiment, processor 3802 may also include a microcode ("ucode") read only memory ("ROM") that stores microcode for certain macro instructions. In at least one embodiment, execution unit 3808 may include logic to handle a packed instruction set 3809. In at least one embodiment, by including packed instruction set 3809 in an instruction set of a general-purpose processor, along with associated circuitry to execute instructions, operations used by many multimedia applications may be performed using packed data in processor 3802. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 3808 may also be used in microcontrollers, embedded processors, graphics devices, DSPs, and other types of logic circuits. In at least one embodiment, computer system 3800 may include, without limitation, a memory 3820. In at least one embodiment, memory 3820 may be a Dynamic Random Access Memory ("DRAM") device, a Static Random Access Memory ("SRAM") device, a flash memory device, or another memory device. In at least one embodiment, memory 3820 may store instruction(s) 3819 and/or data 3821 represented by data signals that may be executed by processor 3802.

In at least one embodiment, a system logic chip may be coupled to processor bus 3810 and memory 3820. In at least one embodiment, a system logic chip may include, without limitation, a memory controller hub ("MCH") 3816, and processor 3802 may communicate with MCH 3816 via processor bus 3810. In at least one embodiment, MCH 3816 may provide a high bandwidth memory path 3818 to memory 3820 for instruction and data storage and for storage of graphics commands, data and textures. In at least one embodiment, MCH 3816 may direct data signals between processor 3802, memory 3820, and other components in computer system 3800 and to bridge data signals between processor bus 3810, memory 3820, and a system I/O interface 3822. In at least one embodiment, a system logic chip may provide a graphics port for coupling to a graphics controller. In at least one embodiment, MCH 3816 may be coupled to memory 3820 through high bandwidth memory path 3818 and a graphics/video card 3812 may be coupled to MCH 3816 through an Accelerated Graphics Port ("AGP") interconnect 3814.

In at least one embodiment, computer system 3800 may use system I/O interface 3822 as a proprietary hub interface bus to couple MCH 3816 to an I/O controller hub ("ICH") 3830. In at least one embodiment, ICH 3830 may provide direct connections to some I/O devices via a local I/O bus. In at least one embodiment, a local I/O bus may include, without limitation, a high-speed I/O bus for connecting peripherals to memory 3820, a chipset, and processor 3802. Examples may include, without limitation, an audio controller 3829, a firmware hub ("flash BIOS") 3828, a wireless transceiver 3826, a data storage 3824, a legacy I/O controller 3823 containing user input and keyboard interfaces 3825, a serial expansion port 3827, such as a Universal Serial Bus ("USB") port, and a network controller 3834. In at least one embodiment, data storage 3824 may comprise a hard disk drive, a floppy disk drive, a CD-ROM device, a flash memory device, or other mass storage device.

In at least one embodiment, FIG. 38 illustrates a system, which includes interconnected hardware devices or "chips", whereas in other embodiments, FIG. 38 may illustrate an exemplary SoC. In at least one embodiment, devices illustrated in FIG. 38 may be interconnected with proprietary interconnects, standardized interconnects (e.g., PCIe) or some combination thereof. In at least one embodiment, one or more components of computer system 3800 are interconnected using compute express link (CXL) interconnects.

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment, inference and/or training logic 3415 may be used in system FIG. 38 for inferencing or predicting operations based, at least in part, on weight parameters calculated using neural network training operations, neural network functions and/or architectures, or neural network use cases described herein.

In at least one embodiment, at least one component shown or described with respect to FIG. 38 is used to perform techniques and/or functions described in connection with FIGS. 1-33. In at least one embodiment, at least one component shown or described with respect to FIG. 38 is used to cause one or more neural networks to cause one or more non-noise pixels to be identified and blended in parallel. In at least one embodiment, at least one component shown or described with respect to FIG. 38 is used to use one or more neural networks to adjust brightness of one or more pixels of one or more images prior to denoising the one or more images. In at least one embodiment, at least one component shown or described with respect to FIG. 38 is used to perform at least one aspect described with respect to FIGS. 1-33, and/or other systems, methods, or operations described herein.

Figure 39:
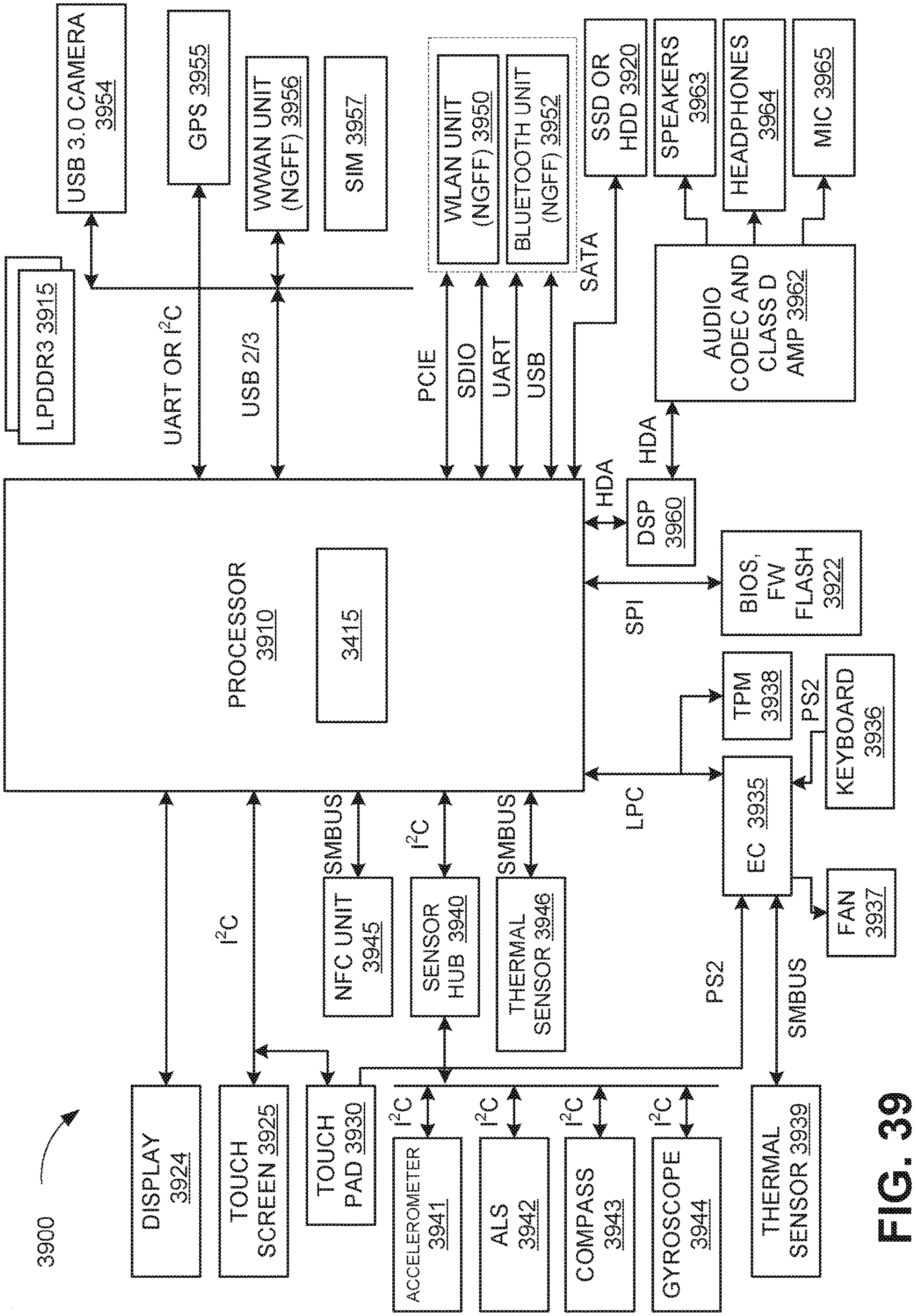
FIG. 39 is a block diagram illustrating an electronic device for utilizing a processor, in accordance with at least one embodiment.

FIG. 39 is a block diagram illustrating an electronic device 3900 for utilizing a processor 3910, in accordance with at least one embodiment. In at least one embodiment, electronic device 3900 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 3900 may include, without limitation, processor 3910 communicatively coupled to any suitable number or kind of components, peripherals, modules, or devices. In at least one embodiment, processor 3910 is coupled using a bus or interface, such as a I2C bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3, etc.), or a Universal Asynchronous Receiver/Transmitter ("UART") bus. In at least one embodiment, FIG. 39 illustrates a system, which includes interconnected hardware devices or "chips", whereas in other embodiments, FIG. 39 may illustrate an exemplary SoC. In at least one embodiment, devices illustrated in FIG. 39 may be interconnected with proprietary interconnects, standardized interconnects (e.g., PCIe) or some combination thereof. In at least one embodiment, one or more components of FIG. 39 are interconnected using compute express link (CXL) interconnects.

In at least one embodiment, FIG. 39 may include a display 3924, a touch screen 3925, a touch pad 3930, a Near Field Communications unit ("NFC") 3945, a sensor hub 3940, a thermal sensor 3946, an Express Chipset ("EC") 3935, a Trusted Platform Module ("TPM") 3938, BIOS/firmware/flash memory ("BIOS, FW Flash") 3922, a DSP 3960, a drive 3920 such as a Solid State Disk ("SSD") or a Hard Disk Drive ("HDD"), a wireless local area network unit ("WLAN") 3950, a Bluetooth unit 3952, a Wireless Wide Area Network unit ("WWAN") 3956, a Global Positioning System (GPS) unit 3955, a camera ("USB 3.0 camera") 3954 such as a USB 3.0 camera, and/or a Low Power Double Data Rate ("LPDDR") memory unit ("LPDDR3") 3915 implemented in, for example, an LPDDR3 standard. These components may each be implemented in any suitable manner.

In at least one embodiment, other components may be communicatively coupled to processor 3910 through components described herein. In at least one embodiment, an accelerometer 3941, an ambient light sensor ("ALS") 3942, a compass 3943, and a gyroscope 3944 may be communicatively coupled to sensor hub 3940. In at least one embodiment, a thermal sensor 3939, a fan 3937, a keyboard 3936, and touch pad 3930 may be communicatively coupled to EC 3935. In at least one embodiment, speakers 3963, headphones 3964, and a microphone ("mic") 3965 may be communicatively coupled to an audio unit ("audio codec and class D amp") 3962, which may in turn be communicatively coupled to DSP 3960. In at least one embodiment, audio unit 3962 may include, for example and without limitation, an audio coder/decoder ("codec") and a class D amplifier. In at least one embodiment, a SIM card ("SIM") 3957 may be communicatively coupled to WWAN unit 3956. In at least one embodiment, components such as WLAN unit 3950 and Bluetooth unit 3952, as well as WWAN unit 3956 may be implemented in a Next Generation Form Factor ("NGFF").

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment, inference and/or training logic 3415 may be used in system FIG. 39 for inferencing or predicting operations based, at least in part, on weight parameters calculated using neural network training operations, neural network functions and/or architectures, or neural network use cases described herein.

In at least one embodiment, at least one component shown or described with respect to FIG. 39 is used to perform techniques and/or functions described in connection with FIGS. 1-33. In at least one embodiment, at least one component shown or described with respect to FIG. 39 is used to cause one or more neural networks to cause one or more non-noise pixels to be identified and blended in parallel. In at least one embodiment, at least one component shown or described with respect to FIG. 39 is used to use one or more neural networks to adjust brightness of one or more pixels of one or more images prior to denoising the one or more images. In at least one embodiment, at least one component shown or described with respect to FIG. 39 is used to perform at least one aspect described with respect to FIGS. 1-33, and/or other systems, methods, or operations described herein.

Figure 40:
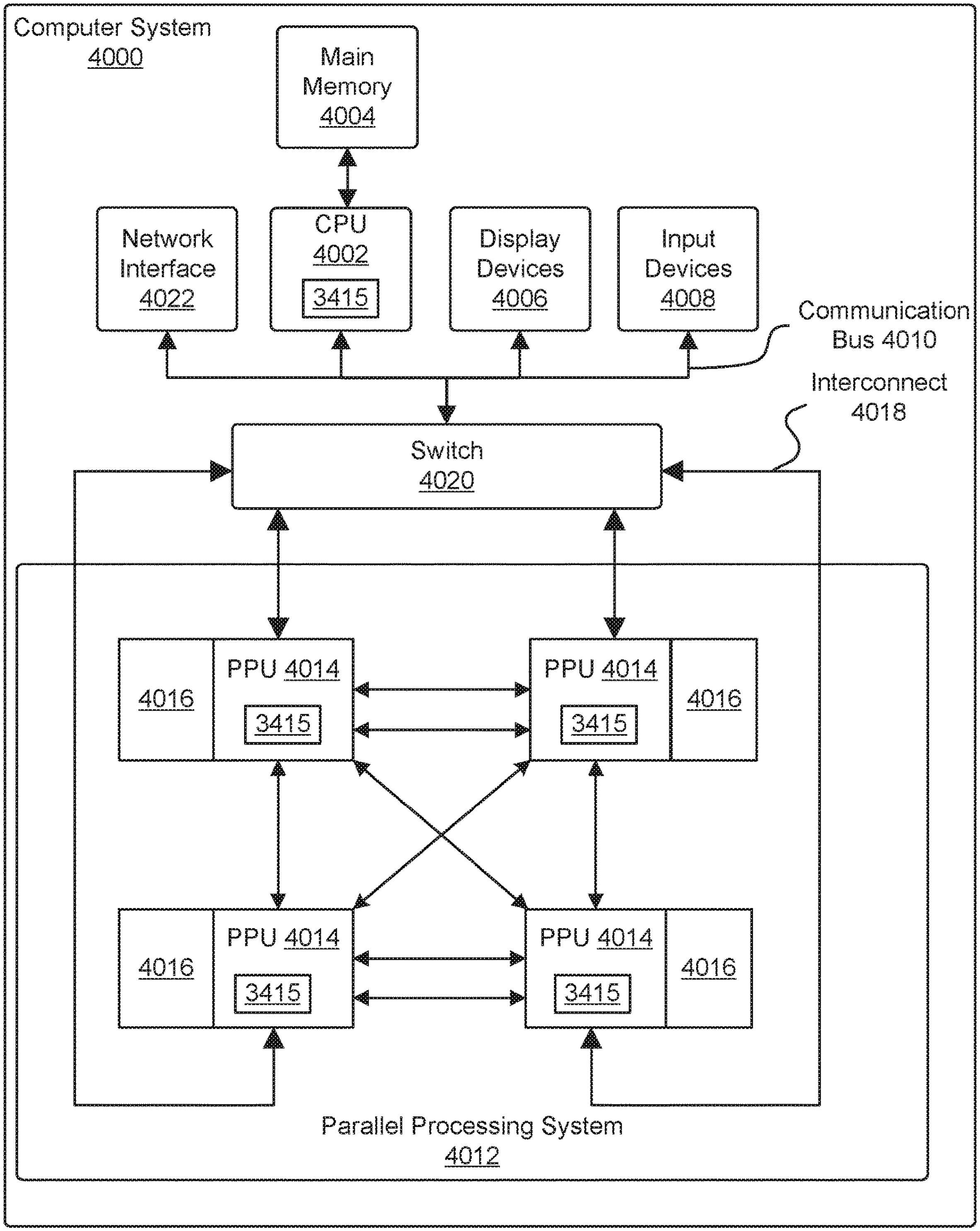
FIG. 40 illustrates a computer system, in accordance with at least one embodiment.

FIG. 40 illustrates a computer system 4000, in accordance with at least one embodiment. In at least one embodiment, computer system 4000 is configured to implement various processes and methods described throughout this disclosure.

In at least one embodiment, computer system 4000 comprises, without limitation, at least one central processing unit ("CPU") 4002 that is connected to a communication bus 4010 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 4000 includes, without limitation, a main memory 4004 and control logic (e.g., implemented as hardware, software, or a combination thereof) and data are stored in main memory 4004, which may take form of random access memory ("RAM"). In at least one embodiment, a network interface subsystem ("network interface") 4022 provides an interface to other computing devices and networks for receiving data from and transmitting data to other systems with computer system 4000.

In at least one embodiment, computer system 4000, in at least one embodiment, includes, without limitation, input devices 4008, a parallel processing system 4012, and display devices 4006 that can be implemented using a conventional cathode ray tube ("CRT"), a liquid crystal display ("LCD"), a light emitting diode ("LED") display, a plasma display, or other suitable display technologies. In at least one embodiment, user input is received from input devices 4008 such as keyboard, mouse, touchpad, microphone, etc. In at least one embodiment, each module described herein can be situated on a single semiconductor platform to form a processing system.

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment, inference and/or training logic 3415 may be used in system FIG. 40 for inferencing or predicting operations based, at least in part, on weight parameters calculated using neural network training operations, neural network functions and/or architectures, or neural network use cases described herein.

In at least one embodiment, at least one component shown or described with respect to FIG. 40 is used to perform techniques and/or functions described in connection with FIGS. 1-33. In at least one embodiment, at least one component shown or described with respect to FIG. 40 is used to cause one or more neural networks to cause one or more non-noise pixels to be identified and blended in parallel. In at least one embodiment, at least one component shown or described with respect to FIG. 40 is used to use one or more neural networks to adjust brightness of one or more pixels of one or more images prior to denoising the one or more images. In at least one embodiment, at least one component shown or described with respect to FIG. 40 is used to perform at least one aspect described with respect to FIGS. 1-33, and/or other systems, methods, or operations described herein.

Figure 41:
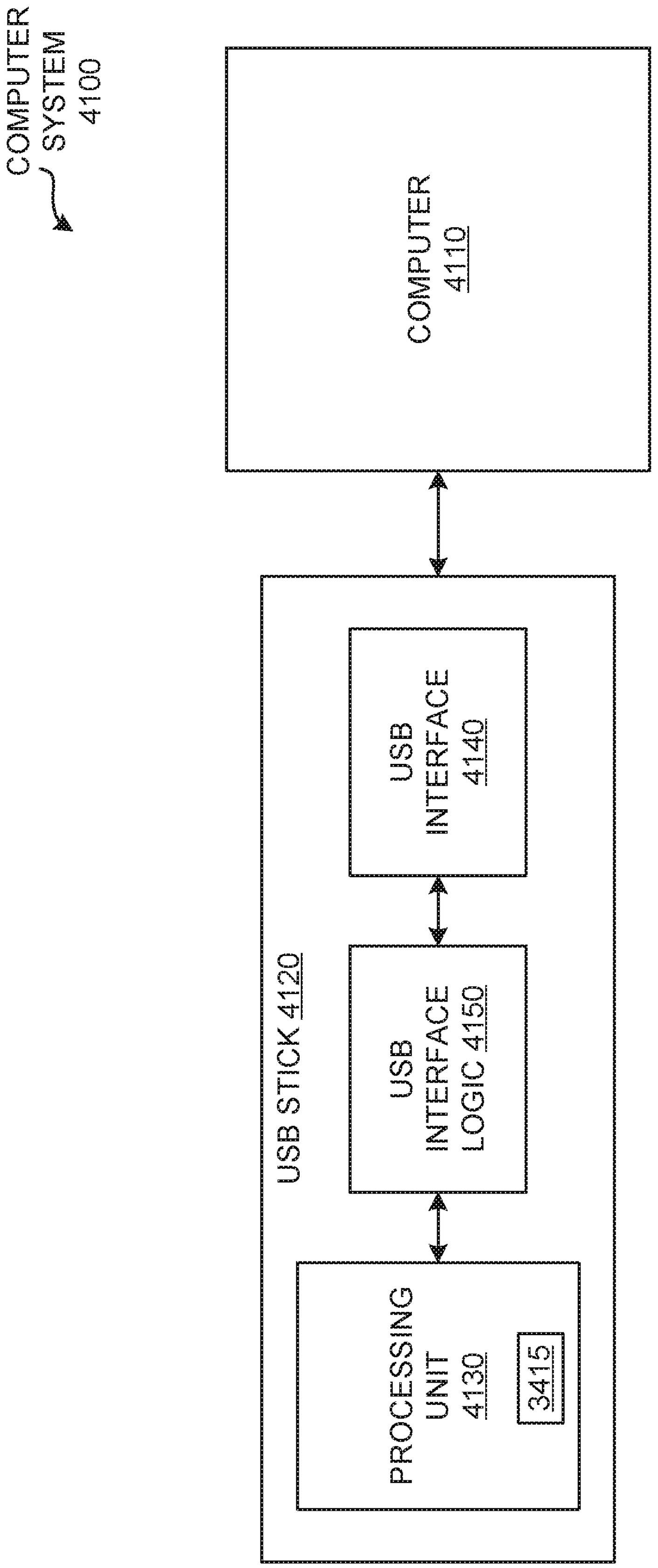
FIG. 41 illustrates a computer system, in accordance with at least one embodiment.

FIG. 41 illustrates a computer system 4100, in accordance with at least one embodiment. In at least one embodiment, computer system 4100 includes, without limitation, a computer 4110 and a USB stick 4120. In at least one embodiment, computer 4110 may include, without limitation, any number and type of processor(s) (not shown) and a memory (not shown). In at least one embodiment, computer 4110 includes, without limitation, a server, a cloud instance, a laptop, and a desktop computer.

In at least one embodiment, USB stick 4120 includes, without limitation, a processing unit 4130, a USB interface 4140, and USB interface logic 4150. In at least one embodiment, processing unit 4130 may be any instruction execution system, apparatus, or device capable of executing instructions. In at least one embodiment, processing unit 4130 may include, without limitation, any number and type of processing cores (not shown). In at least one embodiment, processing unit 4130 comprises an application specific integrated circuit ("ASIC") that is optimized to perform any amount and type of operations associated with machine learning. For instance, in at least one embodiment, processing unit 4130 is a tensor processing unit ("TPC") that is optimized to perform machine learning inference operations. In at least one embodiment, processing unit 4130 is a vision processing unit ("VPU") that is optimized to perform machine vision and machine learning inference operations.

In at least one embodiment, USB interface 4140 may be any type of USB connector or USB socket. For instance, in at least one embodiment, USB interface 4140 is a USB 3.0 Type-C socket for data and power. In at least one embodiment, USB interface 4140 is a USB 3.0 Type-A connector. In at least one embodiment, USB interface logic 4150 may include any amount and type of logic that enables processing unit 4130 to interface with devices (e.g., computer 4110) via USB connector 4140.

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment, inference and/or training logic 3415 may be used in system FIG. 41 for inferencing or predicting operations based, at least in part, on weight parameters calculated using neural network training operations, neural network functions and/or architectures, or neural network use cases described herein.

In at least one embodiment, at least one component shown or described with respect to FIG. 41 is used to perform techniques and/or functions described in connection with FIGS. 1-33. In at least one embodiment, at least one component shown or described with respect to FIG. 41 is used to cause one or more neural networks to cause one or more non-noise pixels to be identified and blended in parallel. In at least one embodiment, at least one component shown or described with respect to FIG. 41 is used to use one or more neural networks to adjust brightness of one or more pixels of one or more images prior to denoising the one or more images. In at least one embodiment, at least one component shown or described with respect to FIG. 41 is used to perform at least one aspect described with respect to FIGS. 1-33, and/or other systems, methods, or operations described herein.

Figure 42A:
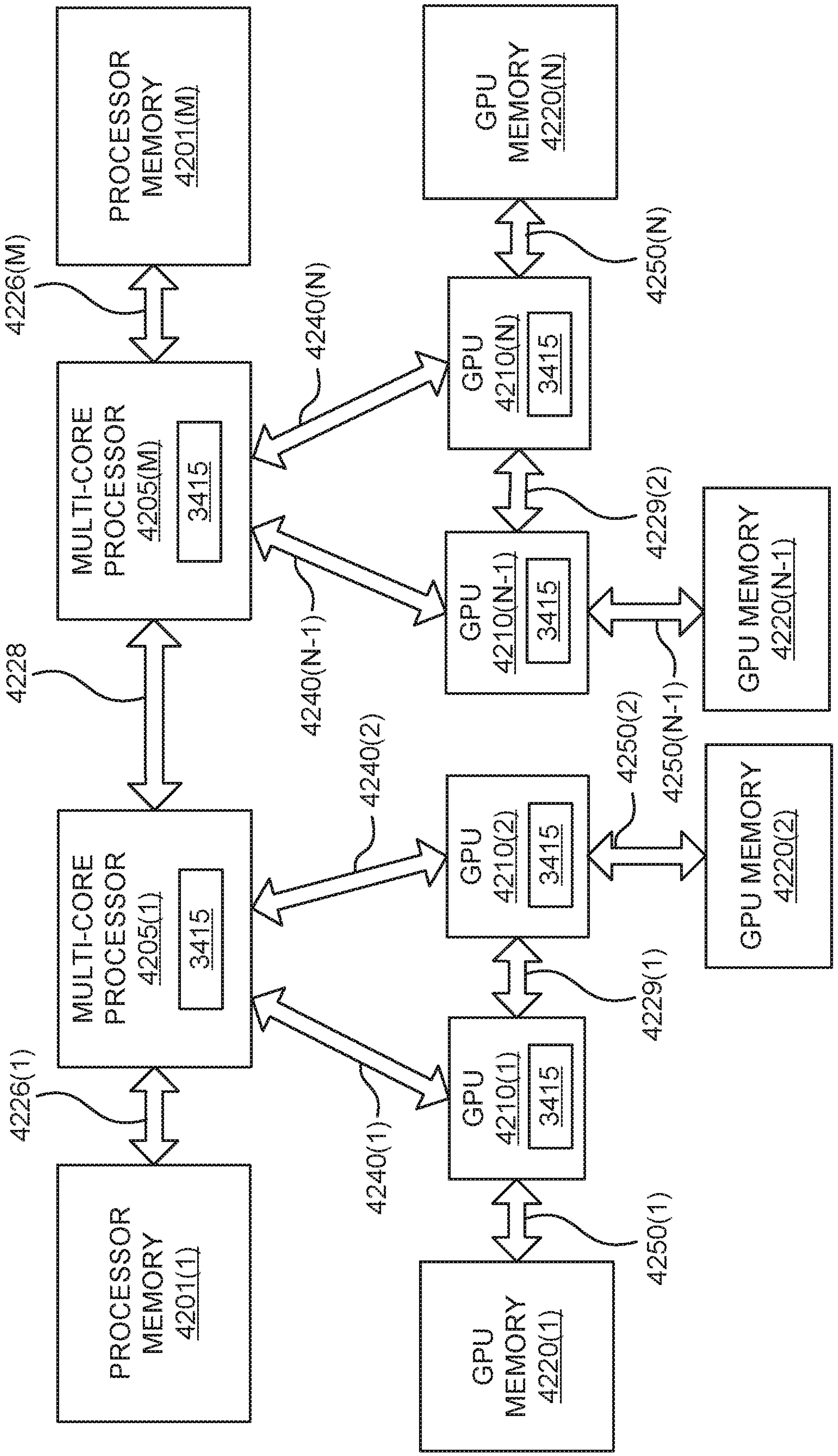
FIG. 42A illustrates a computer system, in accordance with at least one embodiment.

FIG. 42A illustrates a computer system, in accordance with at least one embodiment. In at least one embodiment, FIG. 42A illustrates an exemplary architecture in which a plurality of GPUs 4210(1)-4210(N) is communicatively coupled to a plurality of multi-core processors 4205(1)-4205(M) over high-speed links 4240(1)-4240(N) (e.g., buses, point-to-point interconnects, etc.). In at least one embodiment, high-speed links 4240(1)-4240(N) support a communication throughput of 4 GB/s, 30 GB/s, 80 GB/s or higher. In at least one embodiment, various interconnect protocols may be used including, but not limited to, PCIe 4.0 or 5.0 and NVLink 2.0. In various figures, "N" and "M" represent positive integers, values of which may be different from figure to figure.

In addition, and in at least one embodiment, two or more of GPUs 4210 are interconnected over high-speed links 4229(1)-4229(2), which may be implemented using similar or different protocols/links than those used for high-speed links 4240(1)-4240(N). Similarly, two or more of multi-core processors 4205 may be connected over a high-speed link 4228 which may be symmetric multi-processor (SMP) buses operating at 20 GB/s, 30 GB/s, 120 GB/s or higher. Alternatively, all communication between various system components shown in FIG. 42A may be accomplished using similar protocols/links (e.g., over a common interconnection fabric).

In at least one embodiment, each multi-core processor 4205 is communicatively coupled to a processor memory 4201(1)-4201(M), via memory interconnects 4226(1)-4226(M), respectively, and each GPU 4210(1)-4210(N) is communicatively coupled to GPU memory 4220(1)-4220(N) over GPU memory interconnects 4250(1)-4250(N), respectively. In at least one embodiment, memory interconnects 4226 and 4250 may utilize similar or different memory access technologies. By way of example, and not limitation, processor memories 4201(1)-4201(M) and GPU memories 4220 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In at least one embodiment, some portion of processor memories 4201 may be volatile memory and another portion may be non-volatile memory (e.g., using a two-level memory (2LM) hierarchy).

As described herein, although various multi-core processors 4205 and GPUs 4210 may be physically coupled to a particular memory 4201, 4220, respectively, and/or a unified memory architecture may be implemented in which a virtual system address space (also referred to as "effective address" space) is distributed among various physical memories. For example, processor memories 4201(1)-4201(M) may each comprise 64 GB of system memory address space and GPU memories 4220(1)-4220(N) may each comprise 32 GB of system memory address space resulting in a total of 256 GB addressable memory when M=2 and N=4. Other values for N and M are possible.

Figure 42B:
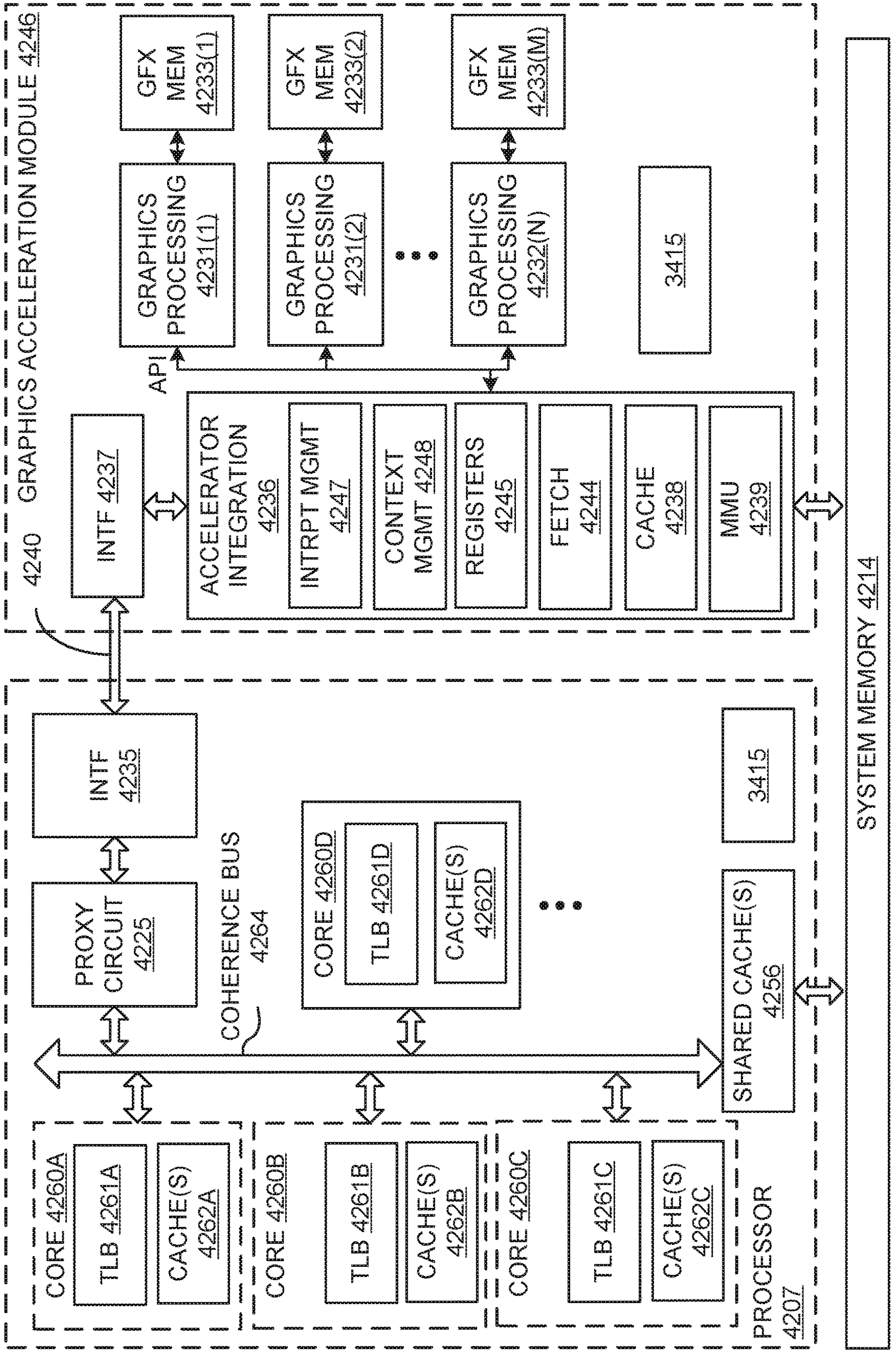
FIG. 42B illustrates a computer system, in accordance with at least one embodiment.

FIG. 42B illustrates a computer system, in accordance with at least one embodiment. In at least one embodiment, FIG. 42B illustrates additional details for an interconnection between a multi-core processor 4207 and a graphics acceleration module 4246 in accordance with one exemplary embodiment. In at least one embodiment, graphics acceleration module 4246 may include one or more GPU chips integrated on a line card which is coupled to processor 4207 via high-speed link 4240 (e.g., a PCIe bus, NVLink, etc.). In at least one embodiment, graphics acceleration module 4246 may alternatively be integrated on a package or chip with processor 4207.

In at least one embodiment, processor 4207 includes a plurality of cores 4260A-4260D, each with a translation lookaside buffer ("TLB") 4261A-4261D and one or more caches 4262A-4262D. In at least one embodiment, cores 4260A-4260D may include various other components for executing instructions and processing data that are not illustrated. In at least one embodiment, caches 4262A-4262D may comprise Level 1 (L1) and Level 2 (L2) caches. In addition, one or more shared caches 4256 may be included in caches 4262A-4262D and shared by sets of cores 4260A-4260D. For example, one embodiment of processor 4207 includes 24 cores, each with its own L1 cache, twelve shared L2 caches, and twelve shared L3 caches. In this embodiment, one or more L2 and L3 caches are shared by two adjacent cores. In at least one embodiment, processor 4207 and graphics acceleration module 4246 connect with system memory 4214, which may include processor memories 4201(1)-4201(M) of FIG. 42A.

In at least one embodiment, coherency is maintained for data and instructions stored in various caches 4262A-4262D, 4256 and system memory 4214 via inter-core communication over a coherence bus 4264. In at least one embodiment, for example, each cache may have cache coherency logic/circuitry associated therewith to communicate to over coherence bus 4264 in response to detected reads or writes to particular cache lines. In at least one embodiment, a cache snooping protocol is implemented over coherence bus 4264 to snoop cache accesses.

In at least one embodiment, a proxy circuit 4225 communicatively couples graphics acceleration module 4246 to coherence bus 4264, allowing graphics acceleration module 4246 to participate in a cache coherence protocol as a peer of cores 4260A-4260D. In particular, in at least one embodiment, an interface 4235 provides connectivity to proxy circuit 4225 over high-speed link 4240 and an interface 4237 connects graphics acceleration module 4246 to high-speed link 4240.

In at least one embodiment, an accelerator integration circuit 4236 provides cache management, memory access, context management, and interrupt management services on behalf of a plurality of graphics processing engines 4231(1)-4231(N) of graphics acceleration module 4246. In at least one embodiment, graphics processing engines 4231(1)-4231(N) may each comprise a separate graphics processing unit (GPU). In at least one embodiment, graphics processing engines 4231(1)-4231(N) alternatively may comprise different types of graphics processing engines within a GPU, such as graphics execution units, media processing engines (e.g., video encoders/decoders), samplers, and blit engines. In at least one embodiment, graphics acceleration module 4246 may be a GPU with a plurality of graphics processing engines 4231(1)-4231(N) or graphics processing engines 4231(1)-4231(N) may be individual GPUs integrated on a common package, line card, or chip.

In at least one embodiment, accelerator integration circuit 4236 includes a memory management unit (MMU) 4239 for performing various memory management functions such as virtual-to-physical memory translations (also referred to as effective-to-real memory translations) and memory access protocols for accessing system memory 4214. In at least one embodiment, MMU 4239 may also include a translation lookaside buffer (TLB) (not shown) for caching virtual/effective to physical/real address translations. In at least one embodiment, a cache 4238 can store commands and data for efficient access by graphics processing engines 4231(1)-4231(N). In at least one embodiment, data stored in cache 4238 and graphics memories 4233(1)-4233(M) is kept coherent with core caches 4262A-4262D, 4256 and system memory 4214, possibly using a fetch unit 4244. As mentioned, this may be accomplished via proxy circuit 4225 on behalf of cache 4238 and memories 4233(1)-4233(M) (e.g., sending updates to cache 4238 related to modifications/accesses of cache lines on processor caches 4262A-4262D, 4256 and receiving updates from cache 4238).

In at least one embodiment, a set of registers 4245 store context data for threads executed by graphics processing engines 4231(1)-4231(N) and a context management circuit 4248 manages thread contexts. For example, context management circuit 4248 may perform save and restore operations to save and restore contexts of various threads during contexts switches (e.g., where a first thread is saved and a second thread is stored so that a second thread can be execute by a graphics processing engine). For example, on a context switch, context management circuit 4248 may store current register values to a designated region in memory (e.g., identified by a context pointer). It may then restore register values when returning to a context. In at least one embodiment, an interrupt management circuit 4247 receives and processes interrupts received from system devices.

In at least one embodiment, virtual/effective addresses from a graphics processing engine 4231 are translated to real/physical addresses in system memory 4214 by MMU 4239. In at least one embodiment, accelerator integration circuit 4236 supports multiple (e.g., 4, 8, 16) graphics accelerator modules 4246 and/or other accelerator devices. In at least one embodiment, graphics accelerator module 4246 may be dedicated to a single application executed on processor 4207 or may be shared between multiple applications. In at least one embodiment, a virtualized graphics execution environment is presented in which resources of graphics processing engines 4231(1)-4231(N) are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 4236 performs as a bridge to a system for graphics acceleration module 4246 and provides address translation and system memory cache services. In addition, in at least one embodiment, accelerator integration circuit 4236 may provide virtualization facilities for a host processor to manage virtualization of graphics processing engines 4231(1)-4231(N), interrupts, and memory management.

In at least one embodiment, because hardware resources of graphics processing engines 4231(1)-4231(N) are mapped explicitly to a real address space seen by host processor 4207, any host processor can address these resources directly using an effective address value. In at least one embodiment, one function of accelerator integration circuit 4236 is physical separation of graphics processing engines 4231(1)-4231(N) so that they appear to a system as independent units.

In at least one embodiment, one or more graphics memories 4233(1)-4233(M) are coupled to each of graphics processing engines 4231(1)-4231(N), respectively and N=M. In at least one embodiment, graphics memories 4233(1)-4233(M) store instructions and data being processed by each of graphics processing engines 4231(1)-4231(N). In at least one embodiment, graphics memories 4233(1)-4233(M) may be volatile memories such as DRAMs (including stacked DRAMs), GDDR memory (e.g., GDDR5, GDDR6), or HBM, and/or may be non-volatile memories such as 3D XPoint or Nano-Ram.

In at least one embodiment, to reduce data traffic over high-speed link 4240, biasing techniques can be used to ensure that data stored in graphics memories 4233(1)-4233(M) is data that will be used most frequently by graphics processing engines 4231(1)-4231(N) and preferably not used by cores 4260A-4260D (at least not frequently). Similarly, in at least one embodiment, a biasing mechanism attempts to keep data needed by cores (and preferably not graphics processing engines 4231(1)-4231(N)) within caches 4262A-4262D, 4256 and system memory 4214.

Figure 42C:
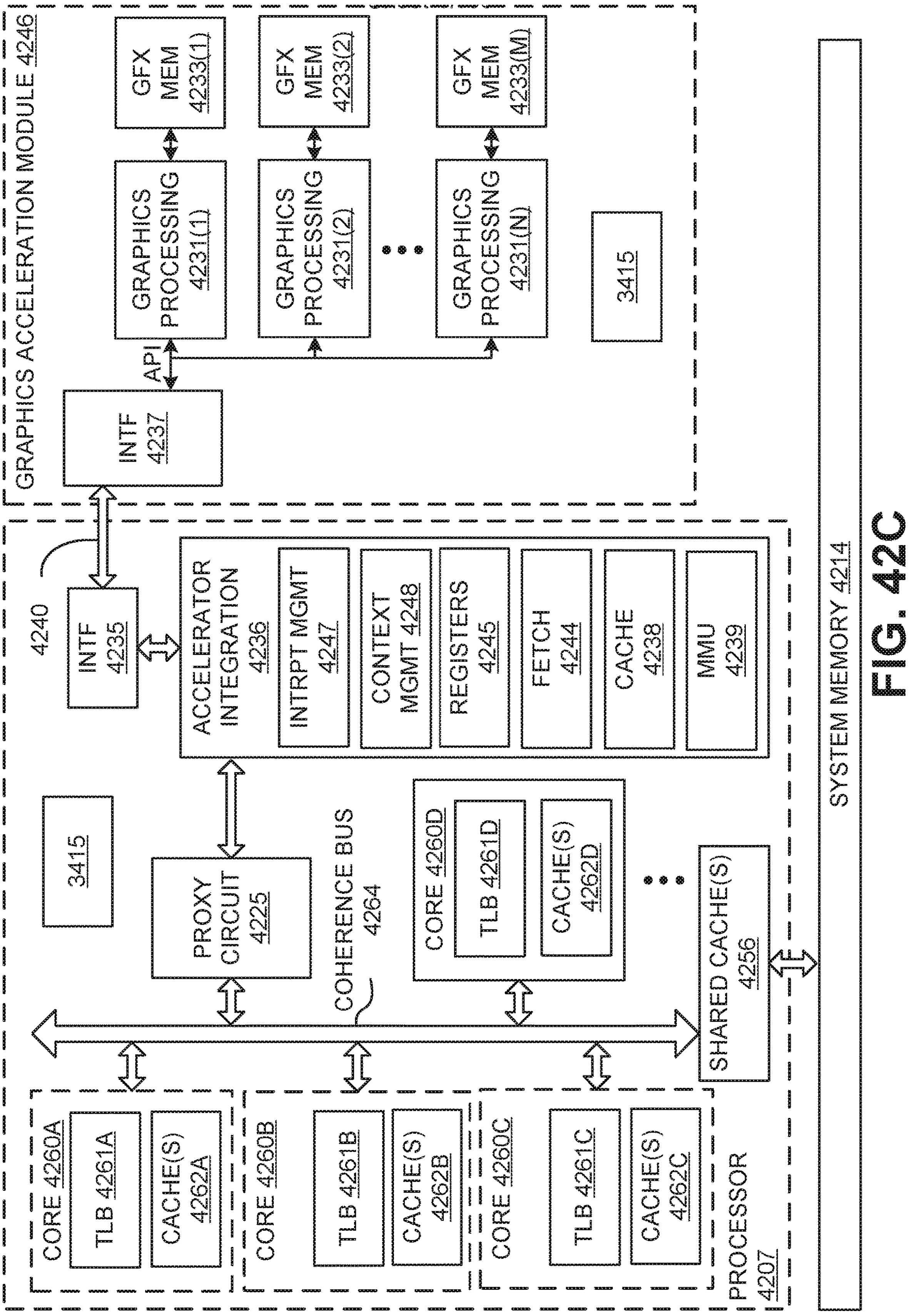
FIG. 42C illustrates a computer system, in accordance with at least one embodiment.

FIG. 42C illustrates a computer system, in accordance with at least one embodiment. In at least one embodiment, FIG. 42C illustrates another exemplary embodiment in which accelerator integration circuit 4236 is integrated within processor 4207. In this embodiment, graphics processing engines 4231(1)-4231(N) communicate directly over high-speed link 4240 to accelerator integration circuit 4236 via interface 4237 and interface 4235 (which, again, may be any form of bus or interface protocol). In at least one embodiment, accelerator integration circuit 4236 may perform similar operations as those described with respect to FIG. 42B, but potentially at a higher throughput given its close proximity to coherence bus 4264 and caches 4262A-4262D, 4256. In at least one embodiment, an accelerator integration circuit supports different programming models including a dedicated-process programming model (no graphics acceleration module virtualization) and shared programming models (with virtualization), which may include programming models which are controlled by accelerator integration circuit 4236 and programming models which are controlled by graphics acceleration module 4246.

In at least one embodiment, graphics processing engines 4231(1)-4231(N) are dedicated to a single application or process under a single operating system. In at least one embodiment, a single application can funnel other application requests to graphics processing engines 4231(1)-4231(N), providing virtualization within a VM/partition.

In at least one embodiment, graphics processing engines 4231(1)-4231(N), may be shared by multiple VM/application partitions. In at least one embodiment, shared models may use a system hypervisor to virtualize graphics processing engines 4231(1)-4231(N) to allow access by each operating system. In at least one embodiment, for single-partition systems without a hypervisor, graphics processing engines 4231(1)-4231(N) are owned by an operating system. In at least one embodiment, an operating system can virtualize graphics processing engines 4231(1)-4231(N) to provide access to each process or application.

In at least one embodiment, graphics acceleration module 4246 or an individual graphics processing engine 4231(1)-4231(N) selects a process element using a process handle. In at least one embodiment, process elements are stored in system memory 4214 and are addressable using an effective address to real address translation technique described herein. In at least one embodiment, a process handle may be an implementation-specific value provided to a host process when registering its context with graphics processing engine 4231(1)-4231(N) (that is, calling system software to add a process element to a process element linked list). In at least one embodiment, a lower 16-bits of a process handle may be an offset of a process element within a process element linked list.

Figure 42D:
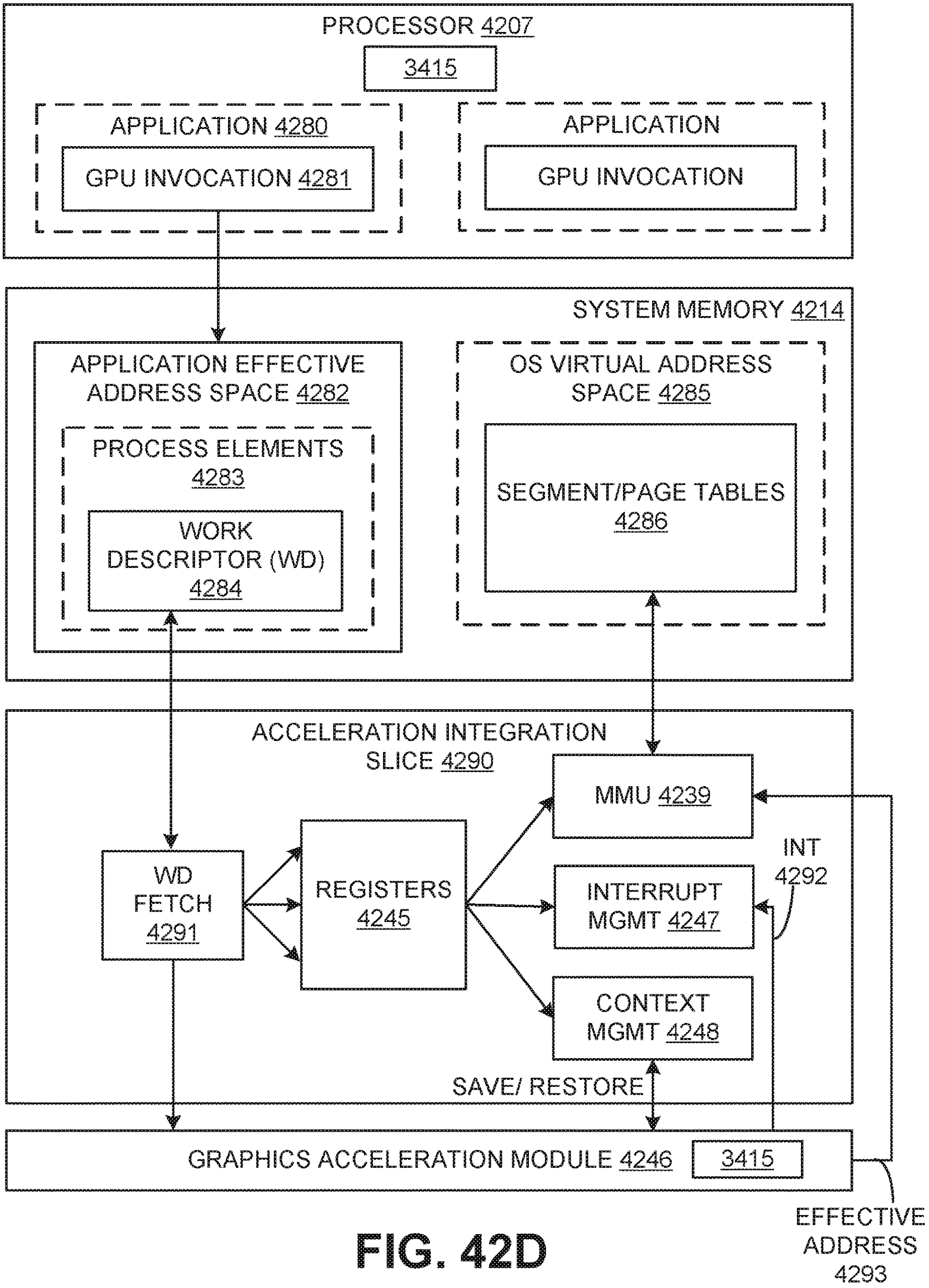
FIG. 42D illustrates a computer system, in accordance with at least one embodiment.

FIG. 42D illustrates a computer system, in accordance with at least one embodiment. In at least one embodiment, FIG. 42D illustrates an exemplary accelerator integration slice 4290. In at least one embodiment, a "slice" comprises a specified portion of processing resources of accelerator integration circuit 4236. In at least one embodiment, an application is effective address space 4282 within system memory 4214 stores process elements 4283. In at least one embodiment, process elements 4283 are stored in response to GPU invocations 4281 from applications 4280 executed on processor 4207. In at least one embodiment, a process element 4283 contains process state for corresponding application 4280. In at least one embodiment, a work descriptor (WD) 4284 contained in process element 4283 can be a single job requested by an application or may contain a pointer to a queue of jobs. In at least one embodiment, WD 4284 is a pointer to a job request queue in an application's effective address space 4282.

In at least one embodiment, graphics acceleration module 4246 and/or individual graphics processing engines 4231(1)-4231(N) can be shared by all or a subset of processes in a system. In at least one embodiment, an infrastructure for setting up process states and sending a WD 4284 to a graphics acceleration module 4246 to start a job in a virtualized environment may be included.

In at least one embodiment, a dedicated-process programming model is implementation-specific. In at least one embodiment, in this model, a single process owns graphics acceleration module 4246 or an individual graphics processing engine 4231. In at least one embodiment, when graphics acceleration module 4246 is owned by a single process, a hypervisor initializes accelerator integration circuit 4236 for an owning partition and an operating system initializes accelerator integration circuit 4236 for an owning process when graphics acceleration module 4246 is assigned.

In at least one embodiment, in operation, a WD fetch unit 4291 in accelerator integration slice 4290 fetches next WD 4284, which includes an indication of work to be done by one or more graphics processing engines of graphics acceleration module 4246. In at least one embodiment, data from WD 4284 may be stored in registers 4245 and used by MMU 4239, interrupt management circuit 4247 and/or context management circuit 4248 as illustrated. For example, one embodiment of MMU 4239 includes segment/page walk circuitry for accessing segment/page tables 4286 within an OS virtual address space 4285. In at least one embodiment, interrupt management circuit 4247 may process interrupt events 4292 received from graphics acceleration module 4246. In at least one embodiment, when performing graphics operations, an effective address 4293 generated by a graphics processing engine 4231(1)-4231(N) is translated to a real address by MMU 4239.

In at least one embodiment, registers 4245 are duplicated for each graphics processing engine 4231(1)-4231(N) and/or graphics acceleration module 4246 and may be initialized by a hypervisor or an operating system. In at least one embodiment, each of these duplicated registers may be included in an accelerator integration slice 4290. Exemplary registers that may be initialized by a hypervisor are shown in Table 1.

TABLE 1

| Hypervisor Initialized Registers | |
|---|---|
| Register # | Description |
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

| Operating System Initialized Registers | |
|---|---|
| Register # | Description |
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In at least one embodiment, each WD 4284 is specific to a particular graphics acceleration module 4246 and/or graphics processing engines 4231(1)-4231(N). In at least one embodiment, it contains all information required by a graphics processing engine 4231(1)-4231(N) to do work, or it can be a pointer to a memory location where an application has set up a command queue of work to be completed.

Figure 42E:
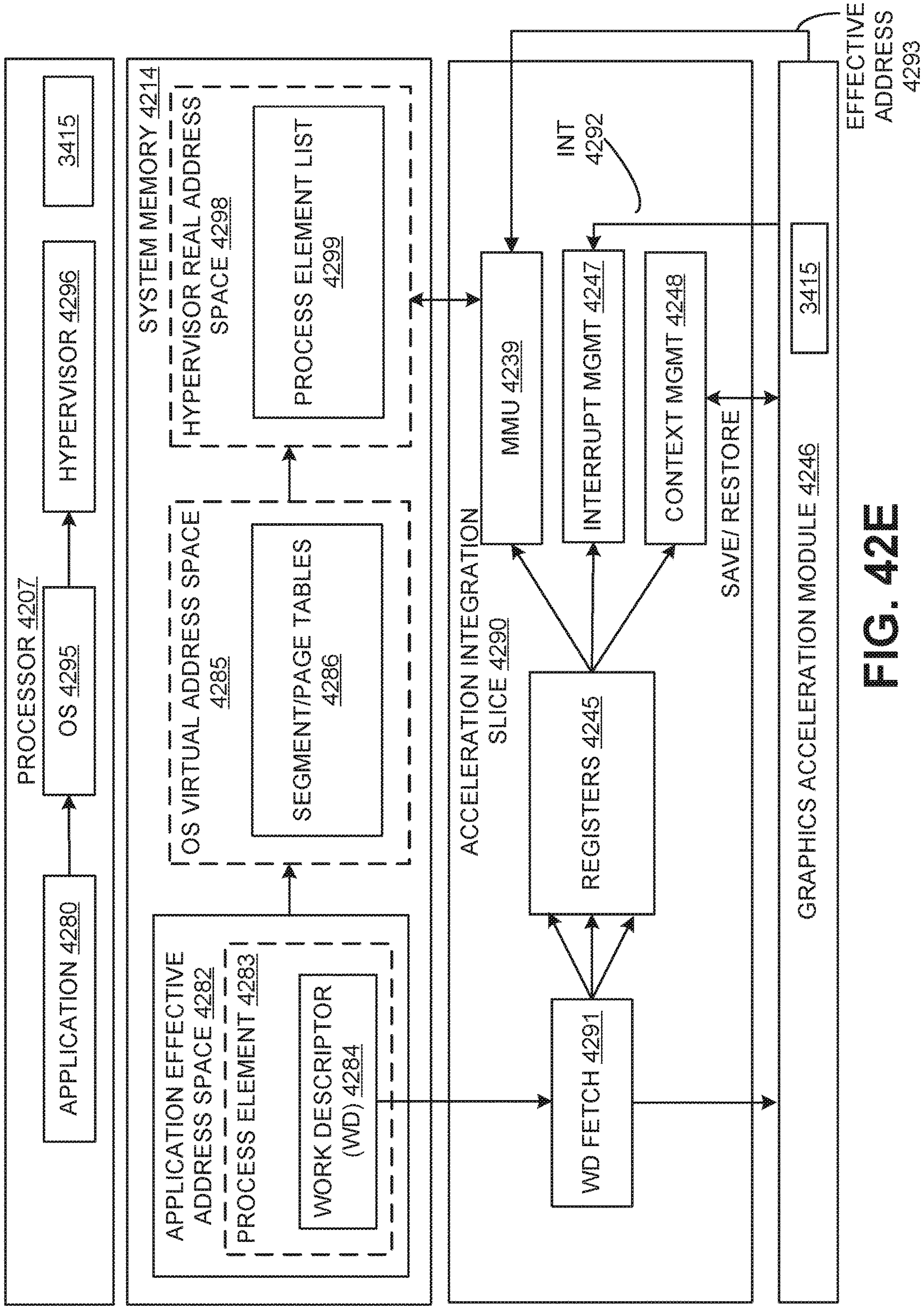
FIGS. 42E and 42F illustrate a shared programming model, in accordance with at least one embodiment.

FIG. 42E illustrates a shared programming model, in accordance with at least one embodiment. In at least one embodiment, FIG. 42E illustrates additional details for one exemplary embodiment of a shared model. This embodiment includes a hypervisor real address space 4298 in which a process element list 4299 is stored. In at least one embodiment, hypervisor real address space 4298 is accessible via a hypervisor 4296 which virtualizes graphics acceleration module engines for operating system 4295.

In at least one embodiment, shared programming models allow for all or a subset of processes from all or a subset of partitions in a system to use a graphics acceleration module 4246. In at least one embodiment, there are two programming models where graphics acceleration module 4246 is shared by multiple processes and partitions, namely time-sliced shared and graphics directed shared.

In at least one embodiment, in this model, system hypervisor 4296 owns graphics acceleration module 4246 and makes its function available to all operating systems 4295. In at least one embodiment, for a graphics acceleration module 4246 to support virtualization by system hypervisor 4296, graphics acceleration module 4246 may adhere to certain requirements, such as (1) an application's job request must be autonomous (that is, state does not need to be maintained between jobs), or graphics acceleration module 4246 must provide a context save and restore mechanism, (2) an application's job request is guaranteed by graphics acceleration module 4246 to complete in a specified amount of time, including any translation faults, or graphics acceleration module 4246 provides an ability to preempt processing of a job, and (3) graphics acceleration module 4246 must be guaranteed fairness between processes when operating in a directed shared programming model.

In at least one embodiment, application 4280 is required to make an operating system 4295 system call with a graphics acceleration module type, a work descriptor (WD), an authority mask register (AMR) value, and a context save/restore area pointer (CSRP). In at least one embodiment, graphics acceleration module type describes a targeted acceleration function for a system call. In at least one embodiment, graphics acceleration module type may be a system-specific value. In at least one embodiment, WD is formatted specifically for graphics acceleration module 4246 and can be in a form of a graphics acceleration module 4246 command, an effective address pointer to a user-defined structure, an effective address pointer to a queue of commands, or any other data structure to describe work to be done by graphics acceleration module 4246.

In at least one embodiment, an AMR value is an AMR state to use for a current process. In at least one embodiment, a value passed to an operating system is similar to an application setting an AMR. In at least one embodiment, if accelerator integration circuit 4236 (not shown) and graphics acceleration module 4246 implementations do not support a User Authority Mask Override Register (UAMOR), an operating system may apply a current UAMOR value to an AMR value before passing an AMR in a hypervisor call. In at least one embodiment, hypervisor 4296 may optionally apply a current Authority Mask Override Register (AMOR) value before placing an AMR into process element 4283. In at least one embodiment, CSRP is one of registers 4245 containing an effective address of an area in an application's effective address space 4282 for graphics acceleration module 4246 to save and restore context state. In at least one embodiment, this pointer is optional if no state is required to be saved between jobs or when a job is preempted. In at least one embodiment, context save/restore area may be pinned system memory.

Upon receiving a system call, operating system 4295 may verify that application 4280 has registered and been given authority to use graphics acceleration module 4246. In at least one embodiment, operating system 4295 then calls hypervisor 4296 with information shown in Table 3.

TABLE 3

| OS to Hypervisor Call Parameters | |
|---|---|
| Parameter # | Description |
| 1 | A work descriptor (WD) |
| 2 | An Authority Mask Register (AMR) value (potentially masked) |

TABLE 3-continued

| OS to Hypervisor Call Parameters | |
|---|---|
| Parameter # | Description |
| 3 | An effective address (EA) Context Save/ Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |

In at least one embodiment, upon receiving a hypervisor call, hypervisor 4296 verifies that operating system 4295 has registered and been given authority to use graphics acceleration module 4246. In at least one embodiment, hypervisor 4296 then puts process element 4283 into a process element linked list for a corresponding graphics acceleration module 4246 type. In at least one embodiment, a process element may include information shown in Table 4.

TABLE 4

| Process Element Information | |
|---|---|
| Element # | Description |
| 1 | A work descriptor (WD) |
| 2 | An Authority Mask Register (AMR) value (potentially masked). |
| 3 | An effective address (EA) Context Save/ Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |
| 8 | Interrupt vector table, derived from hypervisor call parameters |
| 9 | A state register (SR) value |
| 10 | A logical partition ID (LPID) |
| 11 | A real address (RA) hypervisor accelerator utilization record pointer |
| 12 | Storage Descriptor Register (SDR) |

In at least one embodiment, hypervisor initializes a plurality of accelerator integration slice 4290 registers 4245.

Figure 42F:
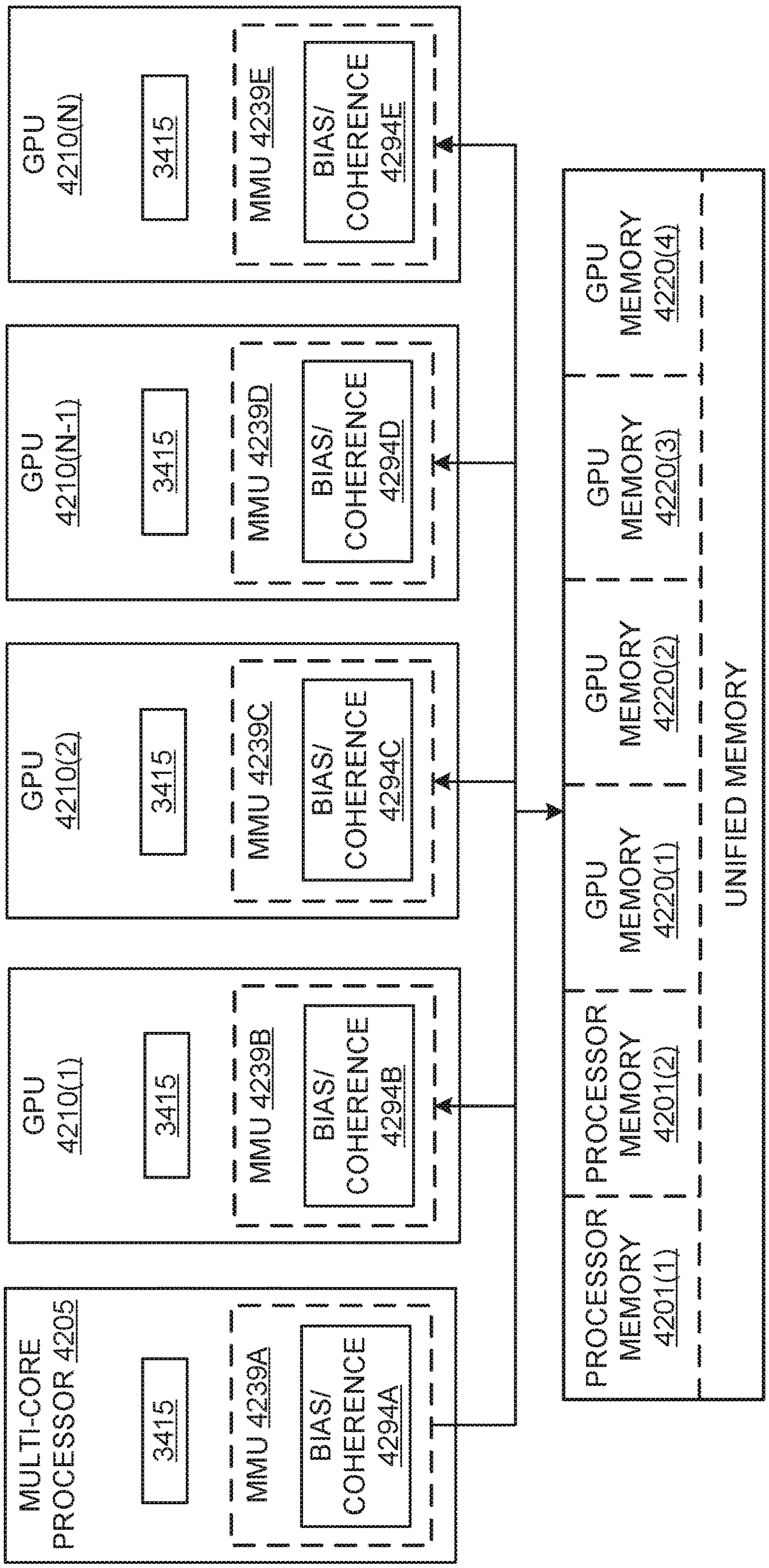

FIG. 42F illustrates a shared programming model, in accordance with at least one embodiment. In at least one embodiment, as illustrated in FIG. 42F, a unified memory is used, addressable via a common virtual memory address space used to access physical processor memories 4201(1)-4201(N) and GPU memories 4220(1)-4220(N). In this implementation, operations executed on GPUs 4210(1)-4210(N) utilize a same virtual/effective memory address space to access processor memories 4201(1)-4201(M) and vice versa, thereby simplifying programmability. In at least one embodiment, a first portion of a virtual/effective address space is allocated to processor memory 4201(1), a second portion to second processor memory 4201(N), a third portion to GPU memory 4220(1), and so on. In at least one embodiment, an entire virtual/effective memory space (sometimes referred to as an effective address space) is thereby distributed across each of processor memories 4201 and GPU memories 4220, allowing any processor or GPU to access any physical memory with a virtual address mapped to that memory.

In at least one embodiment, bias/coherence management circuitry 4294A-4294E within one or more of MMUs 4239A-4239E ensures cache coherence between caches of one or more host processors (e.g., 4205) and GPUs 4210 and implements biasing techniques indicating physical memories in which certain types of data should be stored. In at least one embodiment, while multiple instances of bias/coherence management circuitry 4294A-4294E are illustrated in FIG. 42F, bias/coherence circuitry may be implemented within an MMU of one or more host processors 4205 and/or within accelerator integration circuit 4236.

One embodiment allows GPU memories 4220 to be mapped as part of system memory, and accessed using shared virtual memory (SVM) technology, but without suffering performance drawbacks associated with full system cache coherence. In at least one embodiment, an ability for GPU memories 4220 to be accessed as system memory without onerous cache coherence overhead provides a beneficial operating environment for GPU offload. In at least one embodiment, this arrangement allows software of host processor 4205 to setup operands and access computation results, without overhead of tradition I/O DMA data copies. In at least one embodiment, such traditional copies involve driver calls, interrupts and memory mapped I/O (MMIO) accesses that are all inefficient relative to simple memory accesses. In at least one embodiment, an ability to access GPU memories 4220 without cache coherence overheads can be critical to execution time of an offloaded computation. In at least one embodiment, in cases with substantial streaming write memory traffic, for example, cache coherence overhead can significantly reduce an effective write bandwidth seen by a GPU 4210. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. In at least one embodiment, a bias table may be used, for example, which may be a page-granular structure (e.g., controlled at a granularity of a memory page) that includes 1 or 2 bits per GPU-attached memory page. In at least one embodiment, a bias table may be implemented in a stolen memory range of one or more GPU memories 4220, with or without a bias cache in a GPU 4210 (e.g., to cache frequently/recently used entries of a bias table). Alternatively, in at least one embodiment, an entire bias table may be maintained within a GPU.

In at least one embodiment, a bias table entry associated with each access to a GPU attached memory 4220 is accessed prior to actual access to a GPU memory, causing following operations. In at least one embodiment, local requests from a GPU 4210 that find their page in GPU bias are forwarded directly to a corresponding GPU memory 4220. In at least one embodiment, local requests from a GPU that find their page in host bias are forwarded to processor 4205 (e.g., over a high-speed link as described herein). In at least one embodiment, requests from processor 4205 that find a requested page in host processor bias complete a request like a normal memory read. Alternatively, requests directed to a GPU-biased page may be forwarded to a GPU 4210. In at least one embodiment, a GPU may then transition a page to a host processor bias if it is not currently using a page. In at least one embodiment, a bias state of a page can be changed either by a software-based mechanism, a hardware-assisted software-based mechanism, or, for a limited set of cases, a purely hardware-based mechanism.

In at least one embodiment, one mechanism for changing bias state employs an API call (e.g., OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, a cache flushing operation is used for a transition from host processor 4205 bias to GPU bias, but is not for an opposite transition.

In at least one embodiment, cache coherency is maintained by temporarily rendering GPU-biased pages uncacheable by host processor 4205. In at least one embodiment, to access these pages, processor 4205 may request access from GPU 4210, which may or may not grant access right away. In at least one embodiment, thus, to reduce communication between processor 4205 and GPU 4210 it is beneficial to ensure that GPU-biased pages are those which are required by a GPU but not host processor 4205 and vice versa.

In at least one embodiment, at least one component shown or described with respect to FIGS. 42A-42F is used to perform techniques and/or functions described in connection with FIGS. 1-33. In at least one embodiment, at least one component shown or described with respect to FIGS. 42A-42F is used to cause one or more neural networks to cause one or more non-noise pixels to be identified and blended in parallel. In at least one embodiment, at least one component shown or described with respect to FIGS. 42A-42F is used to use one or more neural networks to adjust brightness of one or more pixels of one or more images prior to denoising the one or more images. In at least one embodiment, at least one component shown or described with respect to FIGS. 42A-42F is used to perform at least one aspect described with respect to FIGS. 1-33, and/or other systems, methods, or operations described herein.

Figure 43:
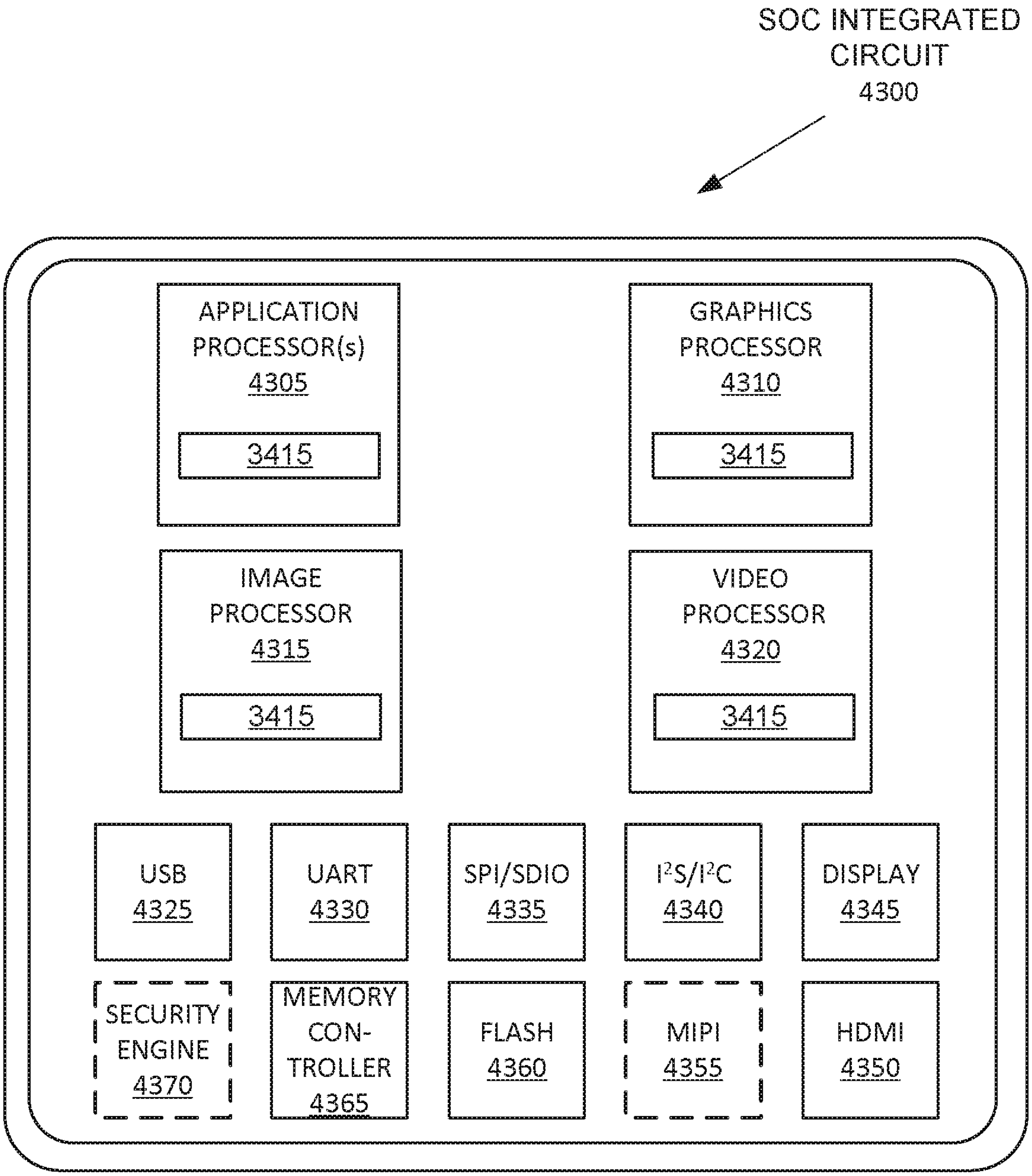
FIG. 43 illustrates exemplary integrated circuits and associated graphics processors, in accordance with at least one embodiment.

FIG. 43 illustrates exemplary integrated circuits and associated graphics processors, in accordance with at least one embodiment. In at least one embodiment, exemplary integrated circuits and associated graphics processors illustrated in FIG. 43 may be fabricated using one or more IP cores. In at least one embodiment, in addition to those illustrated in FIG. 43, other logic and circuits may be included in at least one embodiment, including additional graphics processors/cores, peripheral interface controllers, or general-purpose processor cores.

In at least one embodiment, exemplary integrated circuits and associated graphics processors illustrated in FIG. 43 include an exemplary system on a chip integrated circuit 4300 that may be fabricated using one or more IP cores. In at least one embodiment, integrated circuit 4300 includes one or more application processor(s) 4305 (e.g., CPUs), at least one graphics processor 4310, and may additionally include an image processor 4315 and/or a video processor 4320, any of which may be a modular IP core. In at least one embodiment, integrated circuit 4300 includes peripheral or bus logic including a USB controller 4325, a UART controller 4330, an SPI/SDIO controller 4335, and an I22S/I22C controller 4340. In at least one embodiment, integrated circuit 4300 can include a display device 4345 coupled to one or more of a high-definition multimedia interface (HDMI) controller 4350 and a mobile industry processor interface (MIPI) display interface 4355. In at least one embodiment, storage may be provided by a flash memory subsystem 4360 including flash memory and a flash memory controller. In at least one embodiment, a memory interface may be provided via a memory controller 4365 for access to SDRAM or SRAM memory devices. In at least one embodiment, some integrated circuits additionally include an embedded security engine 4370.

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment, inference and/or training logic 3415 may be used in integrated circuit 4300 for inferencing or predicting operations based, at least in part, on weight parameters calculated using neural network training operations, neural network functions and/or architectures, or neural network use cases described herein.

In at least one embodiment, at least one component shown or described with respect to FIG. 43 is used to perform techniques and/or functions described in connection with FIGS. 1-33. In at least one embodiment, at least one component shown or described with respect to FIG. 43 is used to cause one or more neural networks to cause one or more non-noise pixels to be identified and blended in parallel. In at least one embodiment, at least one component shown or described with respect to FIG. 43 is used to use one or more neural networks to adjust brightness of one or more pixels of one or more images prior to denoising the one or more images. In at least one embodiment, at least one component shown or described with respect to FIG. 43 is used to perform at least one aspect described with respect to FIGS. 1-33, and/or other systems, methods, or operations described herein.

Figure 44A:
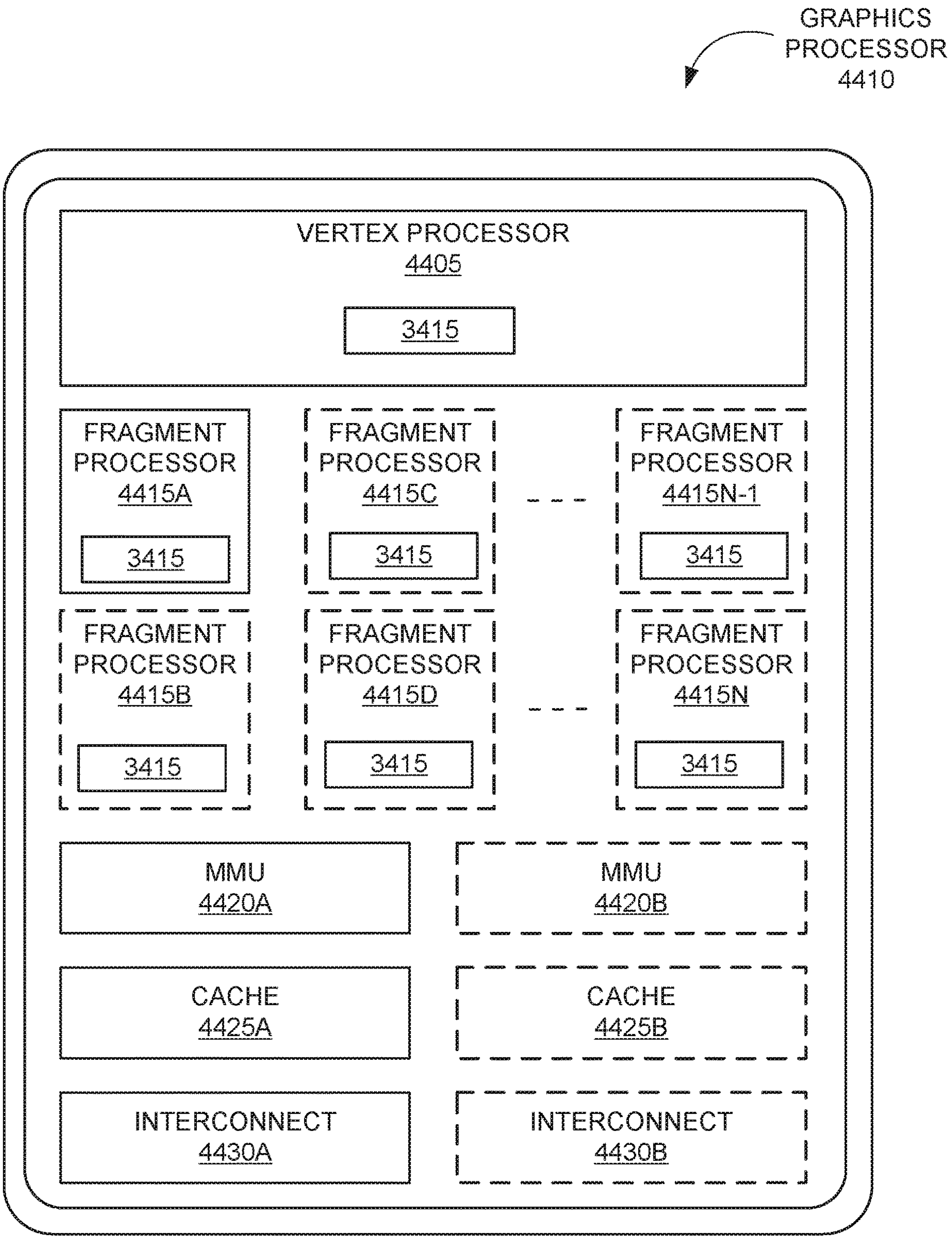
FIGS. 44A and 44B illustrate exemplary integrated circuits and associated graphics processors, in accordance with at least one embodiment.
Figure 44B:
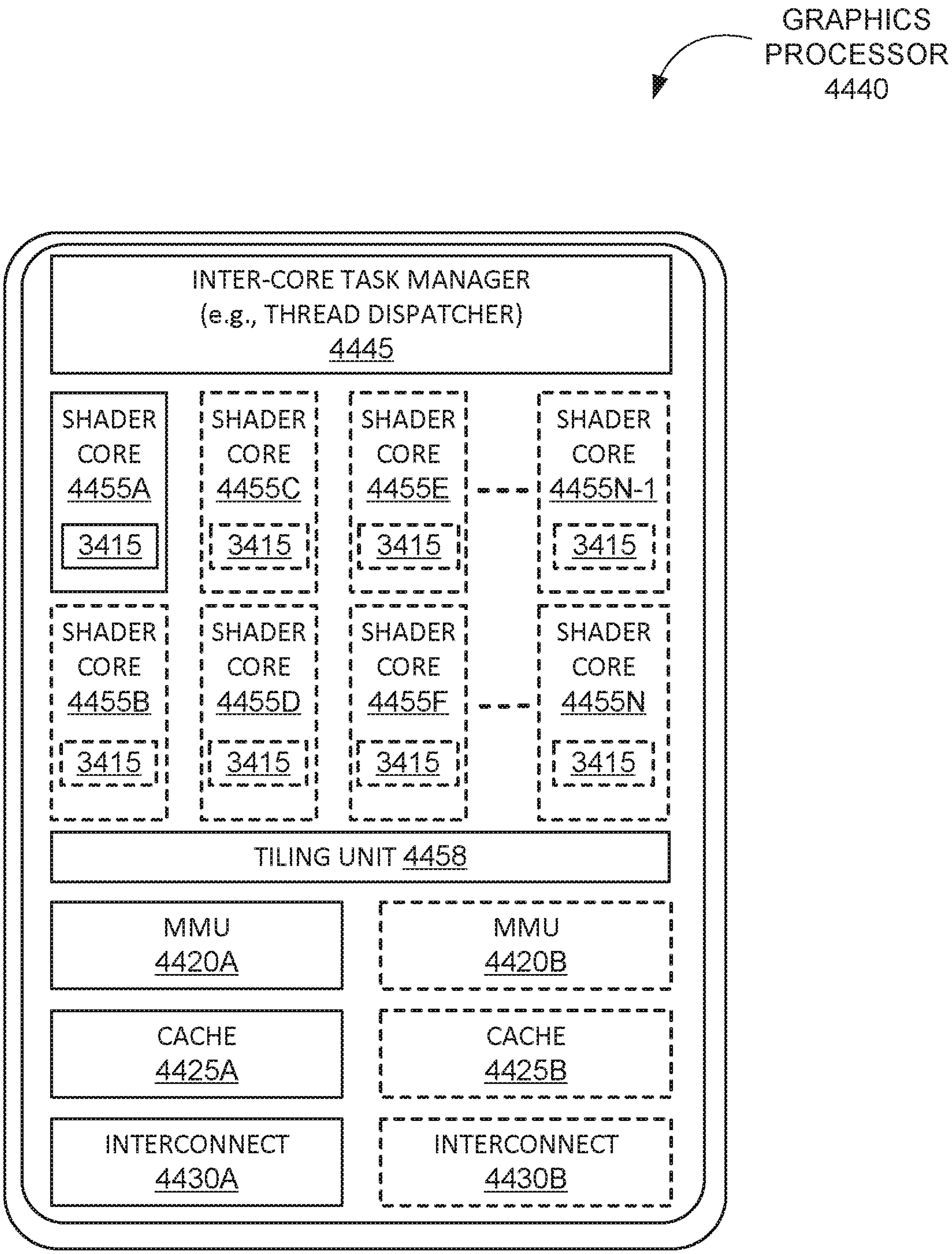

FIGS. 44A and 44B illustrate exemplary integrated circuits and associated graphics processors, in accordance with at least one embodiment. In at least one embodiment, exemplary integrated circuits and associated graphics processors illustrated in FIGS. 44A and 44B include integrated circuits and associated graphics processors that may be fabricated using one or more IP cores, according to various embodiments described herein. In at least one embodiment, in addition to those illustrated in FIGS. 44A and 44B, other logic and circuits may be included in at least one embodiment, including additional graphics processors/cores, peripheral interface controllers, or general-purpose processor cores.

In at least one embodiment, exemplary integrated circuits and associated graphics processors illustrated in FIGS. 44A and 44B include one or more graphics processors for use within an SoC, according to embodiments described herein. In at least one embodiment, exemplary integrated circuits and associated graphics processors illustrated in FIGS. 44A and 44B include exemplary graphics processor 4410 of a system on a chip integrated circuit that may be fabricated using one or more IP cores. In at least one embodiment, exemplary integrated circuits and associated graphics processors illustrated in FIGS. 44A and 44B include an additional exemplary graphics processor 4440 of a system on a chip integrated circuit that may be fabricated using one or more IP cores. In at least one embodiment, graphics processor 4410 is a low power graphics processor core. In at least one embodiment, graphics processor 4440 is a higher performance graphics processor core. In at least one embodiment, each of graphics processors 4410, 4440 can be variants of graphics processor 4310 of FIG. 43.

In at least one embodiment, graphics processor 4410 includes a vertex processor 4405 and one or more fragment processor(s) 4415A-4415N (e.g., 4415A, 4415B, 4415C, 4415D, through 4415N-1, and 4415N). In at least one embodiment, graphics processor 4410 can execute different shader programs via separate logic, such that vertex processor 4405 is optimized to execute operations for vertex shader programs, while one or more fragment processor(s) 4415A-4415N execute fragment (e.g., pixel) shading operations for fragment or pixel shader programs. In at least one embodiment, vertex processor 4405 performs a vertex processing stage of a 3D graphics pipeline and generates primitives and vertex data. In at least one embodiment, fragment processor(s) 4415A-4415N use primitive and vertex data generated by vertex processor 4405 to produce a framebuffer that is displayed on a display device. In at least one embodiment, fragment processor(s) 4415A-4415N are optimized to execute fragment shader programs as provided for in an OpenGL API, which may be used to perform similar operations as a pixel shader program as provided for in a Direct 3D API.

In at least one embodiment, graphics processor 4410 additionally includes one or more memory management units (MMUs) 4420A-4420B, cache(s) 4425A-4425B, and circuit interconnect(s) 4430A-4430B. In at least one embodiment, one or more MMU(s) 4420A-4420B provide for virtual to physical address mapping for graphics processor 4410, including for vertex processor 4405 and/or fragment processor(s) 4415A-4415N, which may reference vertex or image/texture data stored in memory, in addition to vertex or image/texture data stored in one or more cache(s) 4425A-4425B. In at least one embodiment, one or more MMU(s) 4420A-4420B may be synchronized with other MMUs within a system, including one or more MMUs associated with one or more application processor(s) 4305, image processors 4315, and/or video processors 4320 of FIG. 43, such that each processor 4305-4320 can participate in a shared or unified virtual memory system. In at least one embodiment, one or more circuit interconnect(s) 4430A-4430B enable graphics processor 4410 to interface with other IP cores within SoC, either via an internal bus of SoC or via a direct connection.

In at least one embodiment, graphics processor 4440 includes one or more shader core(s) 4455A-4455N (e.g., 4455A, 4455B, 4455C, 4455D, 4455E, 4455F, through 4455N-1, and 4455N) as shown in FIG. 44B, which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 4440 includes an inter-core task manager 4445, which acts as a thread dispatcher to dispatch execution threads to one or more shader cores 4455A-4455N and a tiling unit 4458 to accelerate tiling operations for tile-based rendering, in which rendering operations for a scene are subdivided in image space, for example to exploit local spatial coherence within a scene or to optimize use of internal caches.

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment, inference and/or training logic 3415 may be used in integrated circuit 44A and/or 44B for inferencing or predicting operations based, at least in part, on weight parameters calculated using neural network training operations, neural network functions and/or architectures, or neural network use cases described herein.

In at least one embodiment, at least one component shown or described with respect to FIGS. 44A and 44B is used to perform techniques and/or functions described in connection with FIGS. 1-33. In at least one embodiment, at least one component shown or described with respect to FIGS. 44A and 44B is used to cause one or more neural networks to cause one or more non-noise pixels to be identified and blended in parallel. In at least one embodiment, at least one component shown or described with respect to FIGS. 44A and 44B is used to use one or more neural networks to adjust brightness of one or more pixels of one or more images prior to denoising the one or more images. In at least one embodiment, at least one component shown or described with respect to FIGS. 44A and 44B is used to perform at least one aspect described with respect to FIGS. 1-33, and/or other systems, methods, or operations described herein.

Figure 45A:
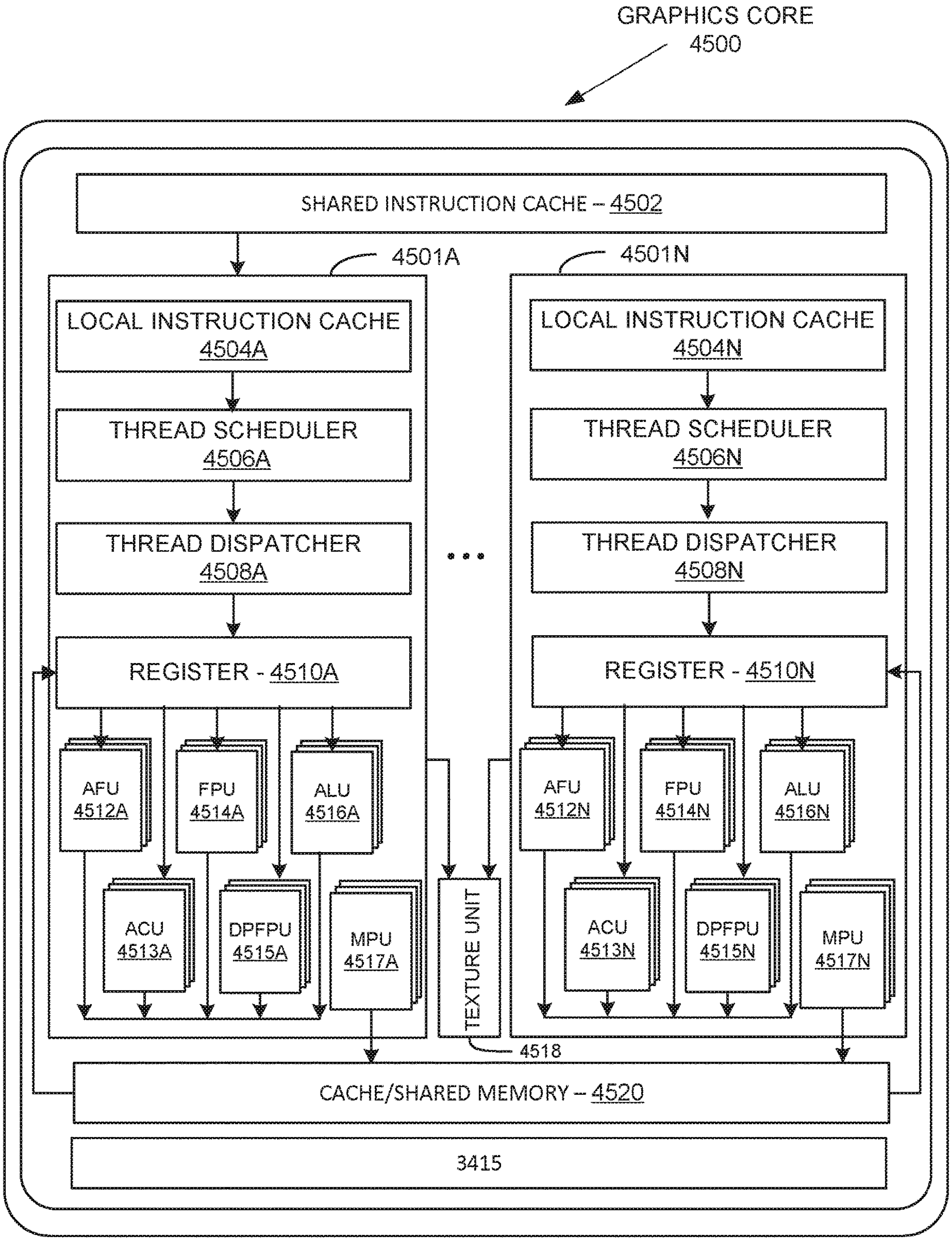
FIGS. 45A and 45B illustrate additional exemplary graphics processor logic in accordance with at least one embodiment.
Figure 45B:
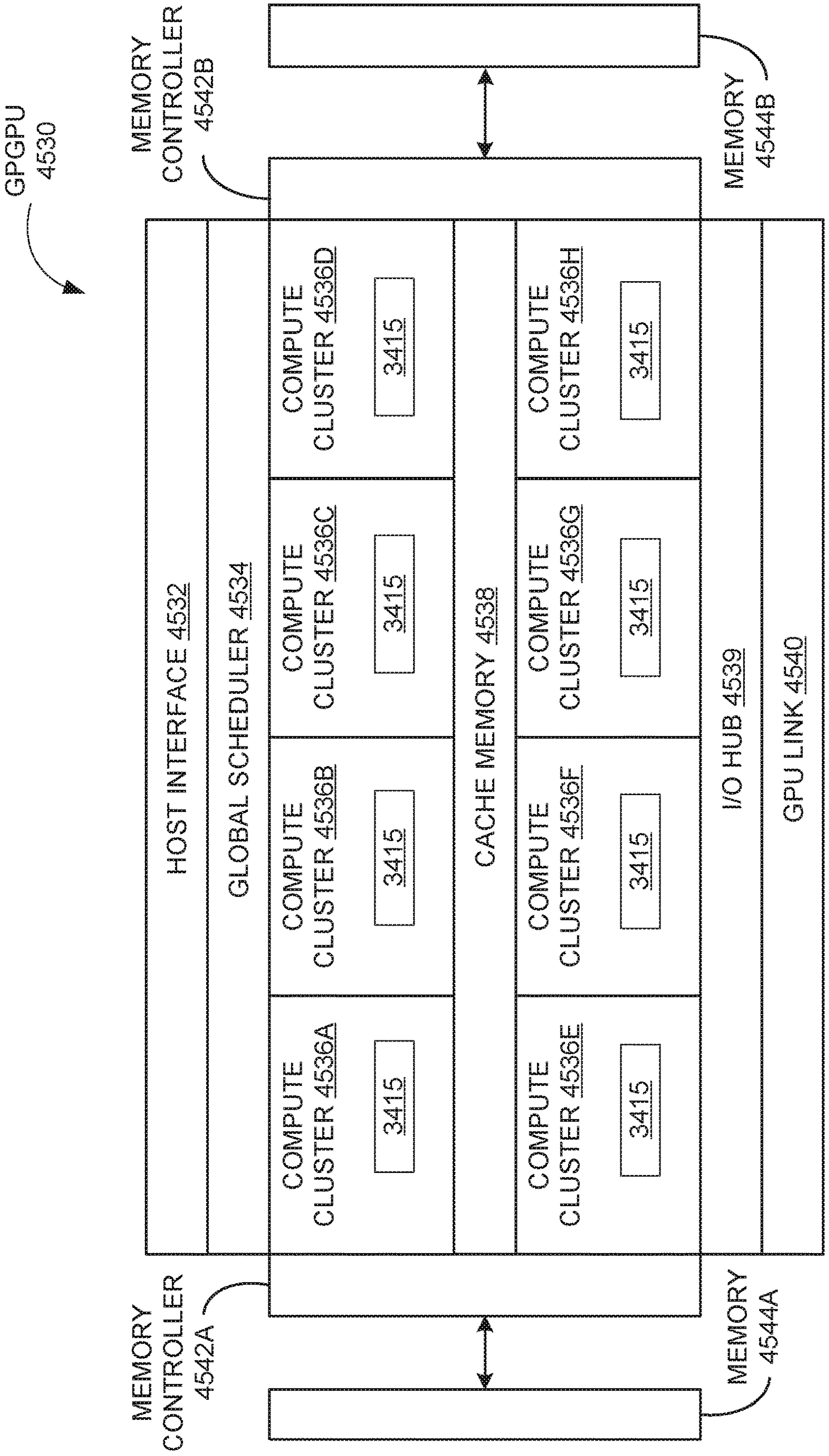

FIGS. 45A and 45B illustrate additional exemplary graphics processor logic, in accordance with at least one embodiment. FIG. 45A illustrates a graphics core 4500 that may be included within graphics processor 4310 of FIG. 43, in accordance with at least one embodiment, and may be a unified shader core 4455A-4455N as in FIG. 44B, in accordance with at least one embodiment. FIG. 45B illustrates a highly-parallel general-purpose graphics processing unit ("GPGPU") 4530 suitable for deployment on a multi-chip module, in accordance with at least one embodiment.

In at least one embodiment, graphics core 4500 includes a shared instruction cache 4502, a texture unit 4518, and a cache/shared memory 4520 that are common to execution resources within graphics core 4500. In at least one embodiment, graphics core 4500 can include multiple slices 4501A-4501N or a partition for each core, and a graphics processor can include multiple instances of graphics core 4500. In at least one embodiment, slices 4501A-4501N can include support logic including a local instruction cache 4504A-4504N, a thread scheduler 4506A-4506N, a thread dispatcher 4508A-4508N, and a set of registers 4510A-4510N. In at least one embodiment, slices 4501A-4501N can include a set of additional function units (AFUs 4512A-4512N), floating-point units (FPUs 4514A-4514N), integer arithmetic logic units (ALUs 4516A-4516N), address computational units (ACUs 4513A-4513N), double-precision floating-point units (DPFPUs 4515A-4515N), and matrix processing units (MPUs 4517A-4517N).

In at least one embodiment, FPUs 4514A-4514N can perform single-precision (32-bit) and half-precision (16-bit) floating point operations, while DPFPUs 4515A-4515N perform double precision (64-bit) floating point operations. In at least one embodiment, ALUs 4516A-4516N can perform variable precision integer operations at 8-bit, 16-bit, and 32-bit precision, and can be configured for mixed precision operations. In at least one embodiment, MPUs 4517A-4517N can also be configured for mixed precision matrix operations, including half-precision floating point and 8-bit integer operations. In at least one embodiment, MPUs 4517-4517N can perform a variety of matrix operations to accelerate machine learning application frameworks, including enabling support for accelerated general matrix to matrix multiplication (GEMM). In at least one embodiment, AFUs 4512A-4512N can perform additional logic operations not supported by floating-point or integer units, including trigonometric operations (e.g., sine, cosine, etc.).

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment, inference and/or training logic 3415 may be used in graphics core 4500 for inferencing or predicting operations based, at least in part, on weight parameters calculated using neural network training operations, neural network functions and/or architectures, or neural network use cases described herein.

FIG. 45B illustrates a general-purpose processing unit (GPGPU) 4530 that can be configured to enable highly-parallel compute operations to be performed by an array of graphics processing units, in accordance with at least one embodiment. In at least one embodiment, GPGPU 4530 can be linked directly to other instances of GPGPU 4530 to create a multi-GPU cluster to improve training speed for deep neural networks. In at least one embodiment, GPGPU 4530 includes a host interface 4532 to enable a connection with a host processor. In at least one embodiment, host interface 4532 is a PCI Express interface. In at least one embodiment, host interface 4532 can be a vendor-specific communications interface or communications fabric. In at least one embodiment, GPGPU 4530 receives commands from a host processor and uses a global scheduler 4534 to distribute execution threads associated with those commands to a set of compute clusters 4536A-4536H. In at least one embodiment, compute clusters 4536A-4536H share a cache memory 4538. In at least one embodiment, cache memory 4538 can serve as a higher-level cache for cache memories within compute clusters 4536A-4536H.

In at least one embodiment, GPGPU 4530 includes memory 4544A-4544B coupled with compute clusters 4536A-4536H via a set of memory controllers 4542A-4542B. In at least one embodiment, memory 4544A-4544B can include various types of memory devices including dynamic random access memory (DRAM) or graphics random access memory, such as synchronous graphics random access memory (SGRAM), including graphics double data rate (GDDR) memory.

In at least one embodiment, compute clusters 4536A-4536H each include a set of graphics cores, such as graphics core 4500 of FIG. 45A, which can include multiple types of integer and floating point logic units that can perform computational operations at a range of precisions including suited for machine learning computations. For example, in at least one embodiment, at least a subset of floating point units in each of compute clusters 4536A-4536H can be configured to perform 16-bit or 32-bit floating point operations, while a different subset of floating point units can be configured to perform 64-bit floating point operations.

In at least one embodiment, multiple instances of GPGPU 4530 can be configured to operate as a compute cluster. In at least one embodiment, communication used by compute clusters 4536A-4536H for synchronization and data exchange varies across embodiments. In at least one embodiment, multiple instances of GPGPU 4530 communicate over host interface 4532. In at least one embodiment, GPGPU 4530 includes an I/O hub 4539 that couples GPGPU 4530 with a GPU link 4540 that enables a direct connection to other instances of GPGPU 4530. In at least one embodiment, GPU link 4540 is coupled to a dedicated GPU-to-GPU bridge that enables communication and synchronization between multiple instances of GPGPU 4530. In at least one embodiment, GPU link 4540 couples with a high-speed interconnect to transmit and receive data to other GPGPUs or parallel processors. In at least one embodiment, multiple instances of GPGPU 4530 are located in separate data processing systems and communicate via a network device that is accessible via host interface 4532. In at least one embodiment GPU link 4540 can be configured to enable a connection to a host processor in addition to or as an alternative to host interface 4532.

In at least one embodiment, GPGPU 4530 can be configured to train neural networks. In at least one embodiment, GPGPU 4530 can be used within an inferencing platform. In at least one embodiment, in which GPGPU 4530 is used for inferencing, GPGPU 4530 may include fewer compute clusters 4536A-4536H relative to when GPGPU 4530 is used for training a neural network. In at least one embodiment, memory technology associated with memory 4544A-4544B may differ between inferencing and training configurations, with higher bandwidth memory technologies devoted to training configurations. In at least one embodiment, an inferencing configuration of GPGPU 4530 can support inferencing specific instructions. For example, in at least one embodiment, an inferencing configuration can provide support for one or more 8-bit integer dot product instructions, which may be used during inferencing operations for deployed neural networks.

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment, inference and/or training logic 3415 may be used in GPGPU 4530 for inferencing or predicting operations based, at least in part, on weight parameters calculated using neural network training operations, neural network functions and/or architectures, or neural network use cases described herein.

In at least one embodiment, at least one component shown or described with respect to FIGS. 45A and 45B is used to perform techniques and/or functions described in connection with FIGS. 1-33. In at least one embodiment, at least one component shown or described with respect to FIGS. 45A and 45B is used to cause one or more neural networks to cause one or more non-noise pixels to be identified and blended in parallel. In at least one embodiment, at least one component shown or described with respect to FIGS. 45A and 45B is used to use one or more neural networks to adjust brightness of one or more pixels of one or more images prior to denoising the one or more images. In at least one embodiment, at least one component shown or described with respect to FIGS. 45A and 45B is used to perform at least one aspect described with respect to FIGS. 1-33, and/or other systems, methods, or operations described herein.

Figure 46:
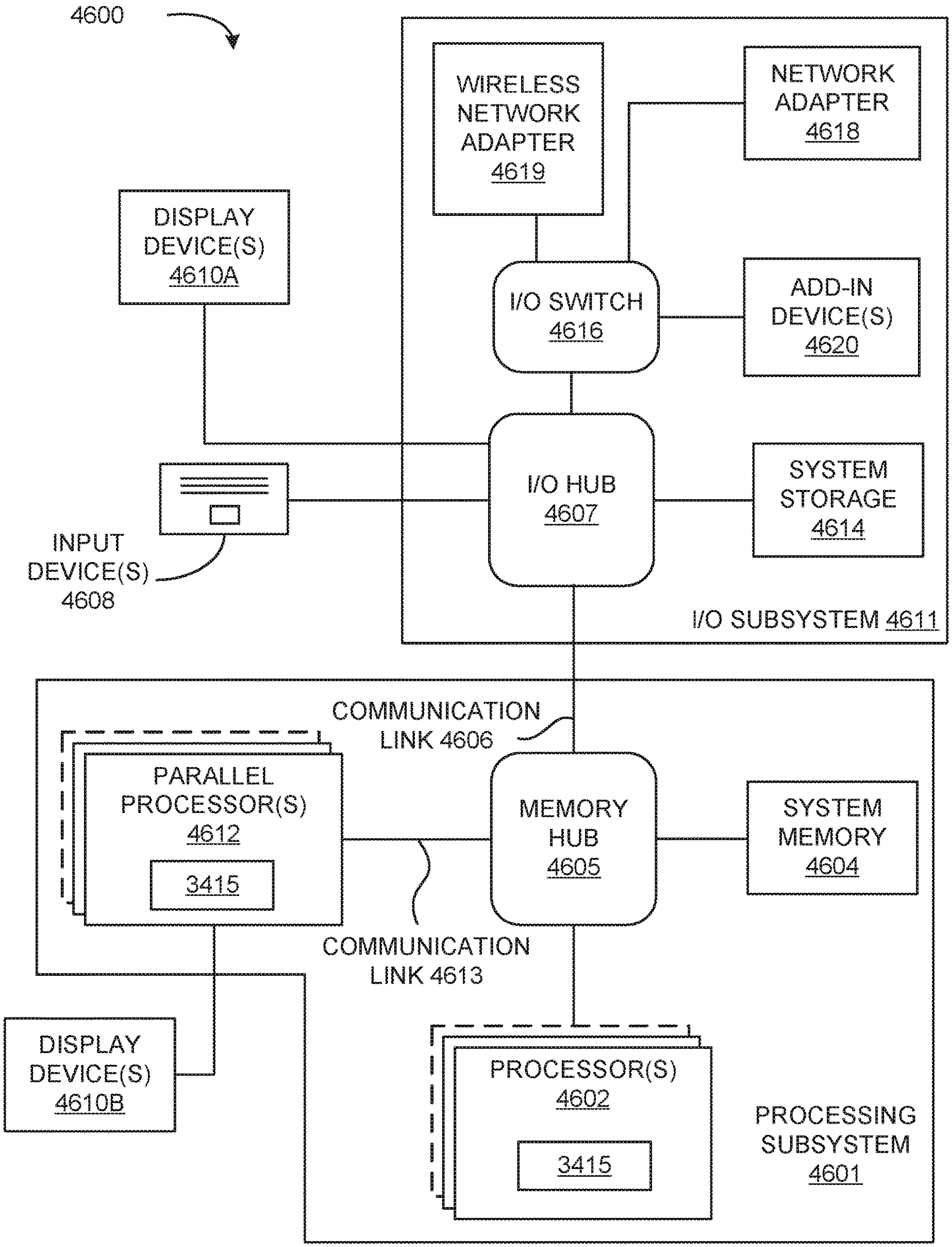
FIG. 46 illustrates a computer system, in accordance with at least one embodiment.

FIG. 46 is a block diagram illustrating a computing system 4600, in accordance with at least one embodiment. In at least one embodiment, computing system 4600 includes a processing subsystem 4601 having one or more processor(s) 4602 and a system memory 4604 communicating via an interconnection path that may include a memory hub 4605. In at least one embodiment, memory hub 4605 may be a separate component within a chipset component or may be integrated within one or more processor(s) 4602. In at least one embodiment, memory hub 4605 couples with an I/O subsystem 4611 via a communication link 4606. In at least one embodiment, I/O subsystem 4611 includes an I/O hub 4607 that can enable computing system 4600 to receive input from one or more input device(s) 4608. In at least one embodiment, I/O hub 4607 can enable a display controller, which may be included in one or more processor(s) 4602, to provide outputs to one or more display device(s) 4610A. In at least one embodiment, one or more display device(s) 4610A coupled with I/O hub 4607 can include a local, internal, or embedded display device.

In at least one embodiment, processing subsystem 4601 includes one or more parallel processor(s) 4612 coupled to memory hub 4605 via a bus or other communication link 4613. In at least one embodiment, communication link 4613 may use one of any number of standards based communication link technologies or protocols, such as, but not limited to PCI Express, or may be a vendor-specific communications interface or communications fabric. In at least one embodiment, one or more parallel processor(s) 4612 form a computationally focused parallel or vector processing system that can include a large number of processing cores and/or processing clusters, such as a many-integrated core (MIC) processor. In at least one embodiment, some or all of parallel processor(s) 4612 form a graphics processing subsystem that can output pixels to one of one or more display device(s) 4610A coupled via I/O Hub 4607. In at least one embodiment, parallel processor(s) 4612 can also include a display controller and display interface (not shown) to enable a direct connection to one or more display device(s) 4610B.

In at least one embodiment, a system storage unit 4614 can connect to I/O hub 4607 to provide a storage mechanism for computing system 4600. In at least one embodiment, an I/O switch 4616 can be used to provide an interface mechanism to enable connections between I/O hub 4607 and other components, such as a network adapter 4618 and/or a wireless network adapter 4619 that may be integrated into platform, and various other devices that can be added via one or more add-in device(s) 4620. In at least one embodiment, network adapter 4618 can be an Ethernet adapter or another wired network adapter. In at least one embodiment, wireless network adapter 4619 can include one or more of a Wi-Fi, Bluetooth, near field communication (NFC), or other network device that includes one or more wireless radios.

In at least one embodiment, computing system 4600 can include other components not explicitly shown, including USB or other port connections, optical storage drives, video capture devices, and like, may also be connected to I/O hub 4607. In at least one embodiment, communication paths interconnecting various components in FIG. 46 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, parallel processor(s) 4612 incorporate circuitry optimized for graphics and video processing, including, for example, video output circuitry, and constitutes a graphics processing unit (GPU). In at least one embodiment, parallel processor(s) 4612 incorporate circuitry optimized for general purpose processing. In at least embodiment, components of computing system 4600 may be integrated with one or more other system elements on a single integrated circuit. For example, in at least one embodiment, parallel processor(s) 4612, memory hub 4605, processor(s) 4602, and I/O hub 4607 can be integrated into a system on chip (SoC) integrated circuit. In at least one embodiment, components of computing system 4600 can be integrated into a single package to form a system in package (SIP) configuration. In at least one embodiment, at least a portion of components of computing system 4600 can be integrated into a multi-chip module (MCM), which can be interconnected with other multi-chip modules into a modular computing system.

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment, inference and/or training logic 3415 may be used in system FIG. 4600 for inferencing or predicting operations based, at least in part, on weight parameters calculated using neural network training operations, neural network functions and/or architectures, or neural network use cases described herein.

In at least one embodiment, at least one component shown or described with respect to FIG. 46 is used to perform techniques and/or functions described in connection with FIGS. 1-33. In at least one embodiment, at least one component shown or described with respect to FIG. 46 is used to cause one or more neural networks to cause one or more non-noise pixels to be identified and blended in parallel. In at least one embodiment, at least one component shown or described with respect to FIG. 46 is used to use one or more neural networks to adjust brightness of one or more pixels of one or more images prior to denoising the one or more images. In at least one embodiment, at least one component shown or described with respect to FIG. 46 is used to perform at least one aspect described with respect to FIGS. 1-33, and/or other systems, methods, or operations described herein.

Processors

FIG. 47A illustrates a parallel processor 4700, in accordance with at least one embodiment. In at least one embodiment, various components of parallel processor 4700 may be implemented using one or more integrated circuit devices, such as programmable processors, application specific integrated circuits (ASICs), or field programmable gate arrays (FPGA). In at least one embodiment, illustrated parallel processor 4700 is a variant of one or more parallel processor(s) 4612 shown in FIG. 46 according to an exemplary embodiment.

In at least one embodiment, parallel processor 4700 includes a parallel processing unit 4702. In at least one embodiment, parallel processing unit 4702 includes an I/O unit 4704 that enables communication with other devices, including other instances of parallel processing unit 4702. In at least one embodiment, I/O unit 4704 may be directly connected to other devices. In at least one embodiment, I/O unit 4704 connects with other devices via use of a hub or switch interface, such as a memory hub 4705. In at least one embodiment, connections between memory hub 4705 and I/O unit 4704 form a communication link 4713. In at least one embodiment, I/O unit 4704 connects with a host interface 4706 and a memory crossbar 4716, where host interface 4706 receives commands directed to performing processing operations and memory crossbar 4716 receives commands directed to performing memory operations.

In at least one embodiment, when host interface 4706 receives a command buffer via I/O unit 4704, host interface 4706 can direct work operations to perform those commands to a front end 4708. In at least one embodiment, front end 4708 couples with a scheduler 4710, which is configured to distribute commands or other work items to a processing cluster array 4712. In at least one embodiment, scheduler 4710 ensures that processing cluster array 4712 is properly configured and in a valid state before tasks are distributed to a cluster of processing cluster array 4712. In at least one embodiment, scheduler 4710 is implemented via firmware logic executing on a microcontroller. In at least one embodiment, microcontroller implemented scheduler 4710 is configurable to perform complex scheduling and work distribution operations at coarse and fine granularity, enabling rapid preemption and context switching of threads executing on processing array 4712. In at least one embodiment, host software can prove workloads for scheduling on processing cluster array 4712 via one of multiple graphics processing paths. In at least one embodiment, workloads can then be automatically distributed across processing array cluster 4712 by scheduler 4710 logic within a microcontroller including scheduler 4710.

In at least one embodiment, processing cluster array 4712 can include up to "N" processing clusters (e.g., cluster 4714A, cluster 4714B, through cluster 4714N), where "N" represents a positive integer (which may be a different integer "N" than used in other figures). In at least one embodiment, each cluster 4714A-4714N of processing cluster array 4712 can execute a large number of concurrent threads. In at least one embodiment, scheduler 4710 can allocate work to clusters 4714A-4714N of processing cluster array 4712 using various scheduling and/or work distribution algorithms, which may vary depending on workload arising for each type of program or computation. In at least one embodiment, scheduling can be handled dynamically by scheduler 4710, or can be assisted in part by compiler logic during compilation of program logic configured for execution by processing cluster array 4712. In at least one embodiment, different clusters 4714A-4714N of processing cluster array 4712 can be allocated for processing different types of programs or for performing different types of computations.

In at least one embodiment, processing cluster array 4712 can be configured to perform various types of parallel processing operations. In at least one embodiment, processing cluster array 4712 is configured to perform general-purpose parallel compute operations. For example, in at least one embodiment, processing cluster array 4712 can include logic to execute processing tasks including filtering of video and/or audio data, performing modeling operations, including physics operations, and performing data transformations.

In at least one embodiment, processing cluster array 4712 is configured to perform parallel graphics processing operations. In at least one embodiment, processing cluster array 4712 can include additional logic to support execution of such graphics processing operations, including but not limited to, texture sampling logic to perform texture operations, as well as tessellation logic and other vertex processing logic. In at least one embodiment, processing cluster array 4712 can be configured to execute graphics processing related shader programs such as, but not limited to, vertex shaders, tessellation shaders, geometry shaders, and pixel shaders. In at least one embodiment, parallel processing unit 4702 can transfer data from system memory via I/O unit 4704 for processing. In at least one embodiment, during processing, transferred data can be stored to on-chip memory (e.g., parallel processor memory 4722) during processing, then written back to system memory.

In at least one embodiment, when parallel processing unit 4702 is used to perform graphics processing, scheduler 4710 can be configured to divide a processing workload into approximately equal sized tasks, to better enable distribution of graphics processing operations to multiple clusters 4714A-4714N of processing cluster array 4712. In at least one embodiment, portions of processing cluster array 4712 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 4714A-4714N may be stored in buffers to allow intermediate data to be transmitted between clusters 4714A-4714N for further processing.

In at least one embodiment, processing cluster array 4712 can receive processing tasks to be executed via scheduler 4710, which receives commands defining processing tasks from front end 4708. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 4710 may be configured to fetch indices corresponding to tasks or may receive indices from front end 4708. In at least one embodiment, front end 4708 can be configured to ensure processing cluster array 4712 is configured to a valid state before a workload specified by incoming command buffers (e.g., batch-buffers, push buffers, etc.) is initiated.

In at least one embodiment, each of one or more instances of parallel processing unit 4702 can couple with a parallel processor memory 4722. In at least one embodiment, parallel processor memory 4722 can be accessed via memory crossbar 4716, which can receive memory requests from processing cluster array 4712 as well as I/O unit 4704. In at least one embodiment, memory crossbar 4716 can access parallel processor memory 4722 via a memory interface 4718. In at least one embodiment, memory interface 4718 can include multiple partition units (e.g., partition unit 4720A, partition unit 4720B, through partition unit 4720N) that can each couple to a portion (e.g., memory unit) of parallel processor memory 4722. In at least one embodiment, a number of partition units 4720A-4720N is configured to be equal to a number of memory units, such that a first partition unit 4720A has a corresponding first memory unit 4724A, a second partition unit 4720B has a corresponding memory unit 4724B, and an N-th partition unit 4720N has a corresponding N-th memory unit 4724N. In at least one embodiment, a number of partition units 4720A-4720N may not be equal to a number of memory units.

In at least one embodiment, memory units 4724A-4724N can include various types of memory devices, including dynamic random access memory (DRAM) or graphics random access memory, such as synchronous graphics random access memory (SGRAM), including graphics double data rate (GDDR) memory. In at least one embodiment, memory units 4724A-4724N may also include 3D stacked memory, including but not limited to high bandwidth memory (HBM). In at least one embodiment, render targets, such as frame buffers or texture maps may be stored across memory units 4724A-4724N, allowing partition units 4720A-4720N to write portions of each render target in parallel to efficiently use available bandwidth of parallel processor memory 4722. In at least one embodiment, a local instance of parallel processor memory 4722 may be excluded in favor of a unified memory design that utilizes system memory in conjunction with local cache memory.

In at least one embodiment, any one of clusters 4714A-4714N of processing cluster array 4712 can process data that will be written to any of memory units 4724A-4724N within parallel processor memory 4722. In at least one embodiment, memory crossbar 4716 can be configured to transfer an output of each cluster 4714A-4714N to any partition unit 4720A-4720N or to another cluster 4714A-4714N, which can perform additional processing operations on an output. In at least one embodiment, each cluster 4714A-4714N can communicate with memory interface 4718 through memory crossbar 4716 to read from or write to various external memory devices. In at least one embodiment, memory crossbar 4716 has a connection to memory interface 4718 to communicate with I/O unit 4704, as well as a connection to a local instance of parallel processor memory 4722, enabling processing units within different processing clusters 4714A-4714N to communicate with system memory or other memory that is not local to parallel processing unit 4702. In at least one embodiment, memory crossbar 4716 can use virtual channels to separate traffic streams between clusters 4714A-4714N and partition units 4720A-4720N.

In at least one embodiment, multiple instances of parallel processing unit 4702 can be provided on a single add-in card, or multiple add-in cards can be interconnected. In at least one embodiment, different instances of parallel processing unit 4702 can be configured to interoperate even if different instances have different numbers of processing cores, different amounts of local parallel processor memory, and/or other configuration differences. For example, in at least one embodiment, some instances of parallel processing unit 4702 can include higher precision floating point units relative to other instances. In at least one embodiment, systems incorporating one or more instances of parallel processing unit 4702 or parallel processor 4700 can be implemented in a variety of configurations and form factors, including but not limited to desktop, laptop, or handheld personal computers, servers, workstations, game consoles, and/or embedded systems.

Figure 47:
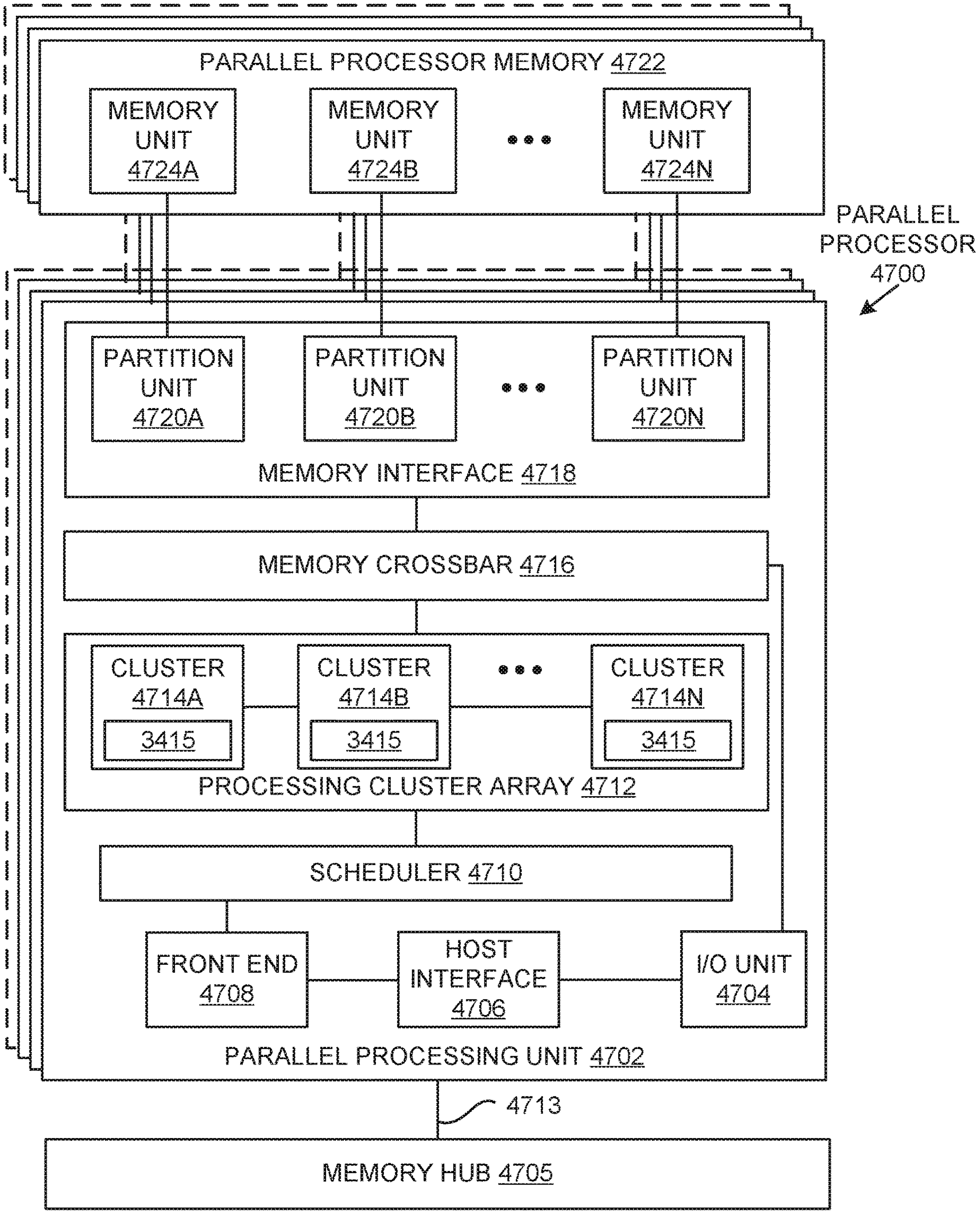
FIG. 47A illustrates a parallel processor, in accordance with at least one embodiment.
FIG. 47B illustrates a partition unit, in accordance with at least one embodiment.
FIG. 47C illustrates a processing cluster, in accordance with at least one embodiment.
FIG. 47D illustrates a graphics multiprocessor, in accordance with at least one embodiment.
Figure 47:
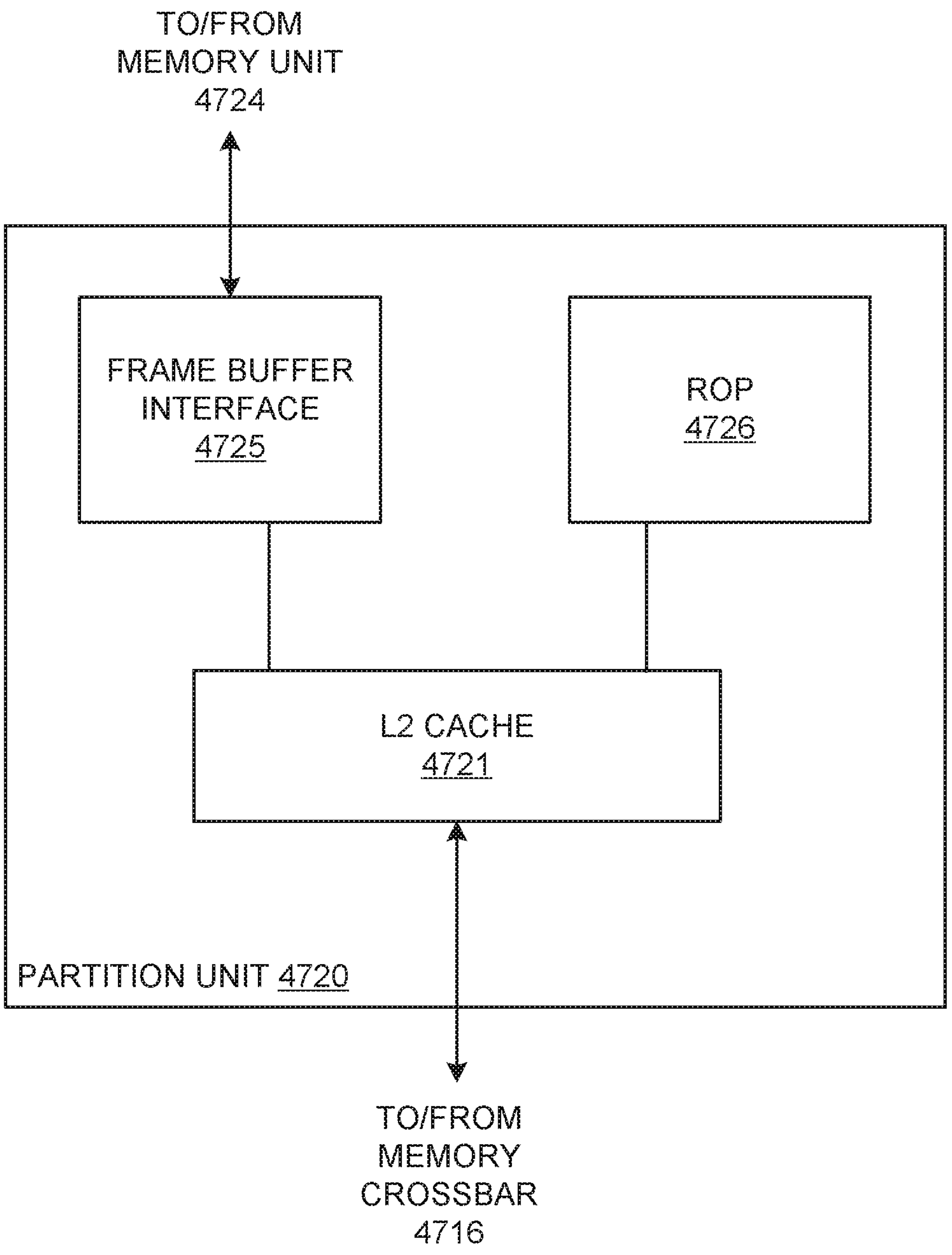
Figure 47:
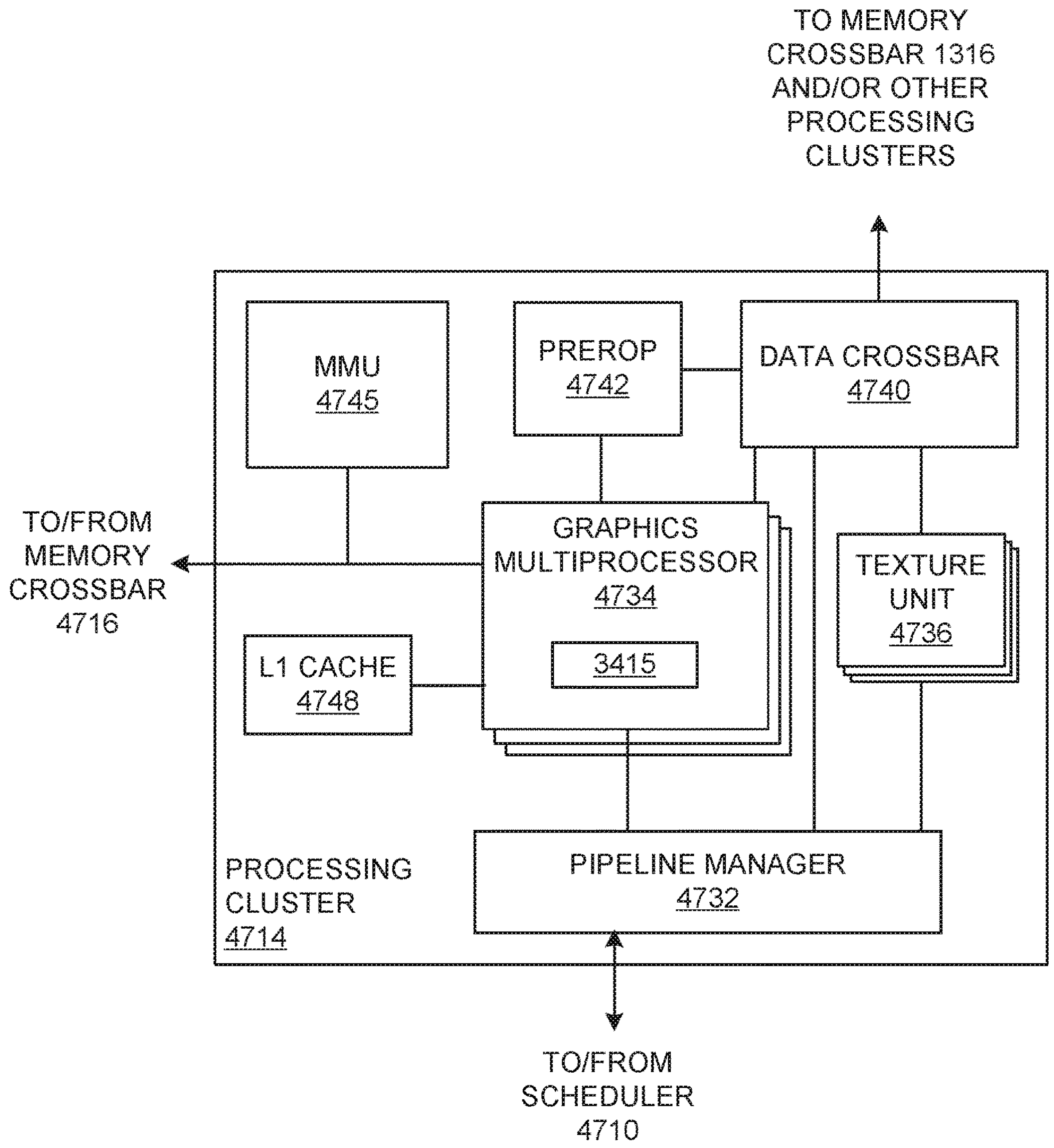
Figure 47:
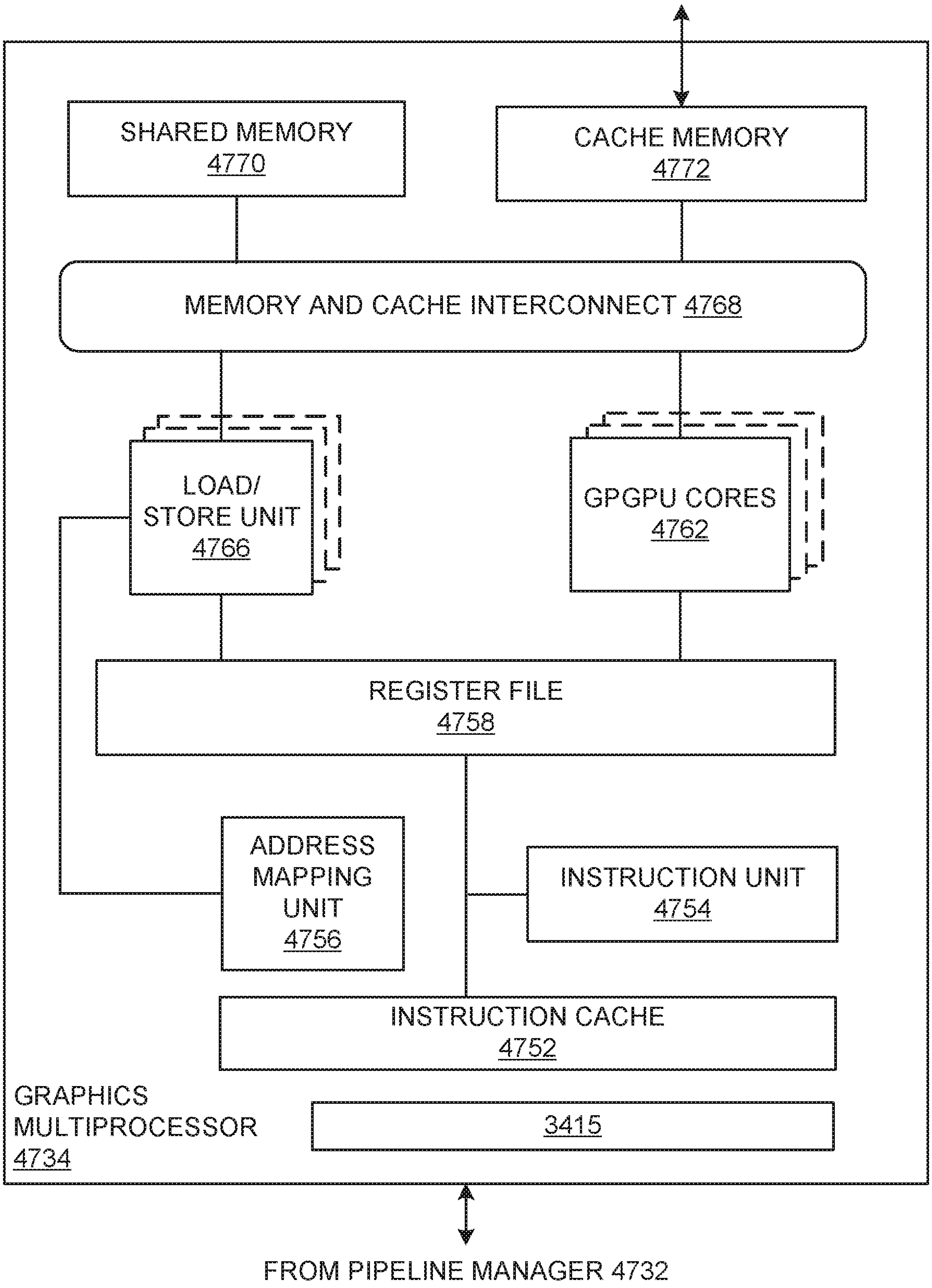

FIG. 47B is a block diagram of a partition unit 4720, in accordance with at least one embodiment. In at least one embodiment, partition unit 4720 is an instance of one of partition units 4720A-4720N of FIG. 47A. In at least one embodiment, partition unit 4720 includes an L2 cache 4721, a frame buffer interface 4725, and a ROP 4726 (raster operations unit). In at least one embodiment, L2 cache 4721 is a read/write cache that is configured to perform load and store operations received from memory crossbar 4716 and ROP 4726. In at least one embodiment, read misses and urgent write-back requests are output by L2 cache 4721 to frame buffer interface 4725 for processing. In at least one embodiment, updates can also be sent to a frame buffer via frame buffer interface 4725 for processing. In at least one embodiment, frame buffer interface 4725 interfaces with one of memory units in parallel processor memory, such as memory units 4724A-4724N of FIG. 47 (e.g., within parallel processor memory 4722).

In at least one embodiment, ROP 4726 is a processing unit that performs raster operations such as stencil, z test, blending, etc. In at least one embodiment, ROP 4726 then outputs processed graphics data that is stored in graphics memory. In at least one embodiment, ROP 4726 includes compression logic to compress depth or color data that is written to memory and decompress depth or color data that is read from memory. In at least one embodiment, compression logic can be lossless compression logic that makes use of one or more of multiple compression algorithms. In at least one embodiment, a type of compression that is performed by ROP 4726 can vary based on statistical characteristics of data to be compressed. For example, in at least one embodiment, delta color compression is performed on depth and color data on a per-tile basis.

In at least one embodiment, ROP 4726 is included within each processing cluster (e.g., cluster 4714A-4714N of FIG. 47A) instead of within partition unit 4720. In at least one embodiment, read and write requests for pixel data are transmitted over memory crossbar 4716 instead of pixel fragment data. In at least one embodiment, processed graphics data may be displayed on a display device, such as one of one or more display device(s) 4610 of FIG. 46, routed for further processing by processor(s) 4602, or routed for further processing by one of processing entities within parallel processor 4700 of FIG. 47A.

FIG. 47C illustrates a processing cluster 4714, in accordance with at least one embodiment. In at least one embodiment, processing cluster 4714 is a processing cluster within a parallel processing unit. In at least one embodiment, a processing cluster is an instance of one of processing clusters 4714A-4714N of FIG. 47A. In at least one embodiment, processing cluster 4714 can be configured to execute many threads in parallel, where "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 4714 can be controlled via a pipeline manager 4732 that distributes processing tasks to SIMT parallel processors. In at least one embodiment, pipeline manager 4732 receives instructions from scheduler 4710 of FIG. 47A and manages execution of those instructions via a graphics multiprocessor 4734 and/or a texture unit 4736. In at least one embodiment, graphics multiprocessor 4734 is an exemplary instance of a SIMT parallel processor. However, in at least one embodiment, various types of SIMT parallel processors of differing architectures may be included within processing cluster 4714. In at least one embodiment, one or more instances of graphics multiprocessor 4734 can be included within a processing cluster 4714. In at least one embodiment, graphics multiprocessor 4734 can process data and a data crossbar 4740 can be used to distribute processed data to one of multiple possible destinations, including other shader units. In at least one embodiment, pipeline manager 4732 can facilitate distribution of processed data by specifying destinations for processed data to be distributed via data crossbar 4740.

In at least one embodiment, each graphics multiprocessor 4734 within processing cluster 4714 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 4714 constitute a thread. In at least one embodiment, a set of threads executing across a set of parallel processing engines is a thread group. In at least one embodiment, a thread group executes a common program on different input data. In at least one embodiment, each thread within a thread group can be assigned to a different processing engine within a graphics multiprocessor 4734. In at least one embodiment, a thread group may include fewer threads than a number of processing engines within graphics multiprocessor 4734. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 4734. In at least one embodiment, when a thread group includes more threads than number of processing engines within graphics multiprocessor 4734, processing can be performed over consecutive clock cycles. In at least one embodiment, multiple thread groups can be executed concurrently on a graphics multiprocessor 4734.

In at least one embodiment, graphics multiprocessor 4734 includes an internal cache memory to perform load and store operations. In at least one embodiment, graphics multiprocessor 4734 can forego an internal cache and use a cache memory (e.g., L1 cache 4748) within processing cluster 4714. In at least one embodiment, each graphics multiprocessor 4734 also has access to L2 caches within partition units (e.g., partition units 4720A-4720N of FIG. 47A) that are shared among all processing clusters 4714 and may be used to transfer data between threads. In at least one embodiment, graphics multiprocessor 4734 may also access off-chip global memory, which can include one or more of local parallel processor memory and/or system memory. In at least one embodiment, any memory external to parallel processing unit 4702 may be used as global memory. In at least one embodiment, processing cluster 4714 includes multiple instances of graphics multiprocessor 4734 and can share common instructions and data, which may be stored in L1 cache 4748.

In at least one embodiment, each processing cluster 4714 may include an MMU 4745 (memory management unit) that is configured to map virtual addresses into physical addresses. In at least one embodiment, one or more instances of MMU 4745 may reside within memory interface 4718 of FIG. 47A. In at least one embodiment, MMU 4745 includes a set of page table entries (PTEs) used to map a virtual address to a physical address of a tile and optionally a cache line index. In at least one embodiment, MMU 4745 may include address translation lookaside buffers (TLB) or caches that may reside within graphics multiprocessor 4734 or L1 4748 cache or processing cluster 4714. In at least one embodiment, a physical address is processed to distribute surface data access locally to allow for efficient request interleaving among partition units. In at least one embodiment, a cache line index may be used to determine whether a request for a cache line is a hit or miss.

In at least one embodiment, a processing cluster 4714 may be configured such that each graphics multiprocessor 4734 is coupled to a texture unit 4736 for performing texture mapping operations, e.g., determining texture sample positions, reading texture data, and filtering texture data. In at least one embodiment, texture data is read from an internal texture L1 cache (not shown) or from an L1 cache within graphics multiprocessor 4734 and is fetched from an L2 cache, local parallel processor memory, or system memory, as needed. In at least one embodiment, each graphics multiprocessor 4734 outputs processed tasks to data crossbar 4740 to provide processed task to another processing cluster 4714 for further processing or to store processed task in an L2 cache, local parallel processor memory, or system memory via memory crossbar 4716. In at least one embodiment, a preROP 4742 (pre-raster operations unit) is configured to receive data from graphics multiprocessor 4734, and direct data to ROP units, which may be located with partition units as described herein (e.g., partition units 4720A-4720N of FIG. 47A). In at least one embodiment, preROP 4742 unit can perform optimizations for color blending, organizing pixel color data, and performing address translations.

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment, inference and/or training logic 3415 may be used in graphics processing cluster 4714 for inferencing or predicting operations based, at least in part, on weight parameters calculated using neural network training operations, neural network functions and/or architectures, or neural network use cases described herein.

FIG. 47D illustrates a graphics multiprocessor 4734, in accordance with at least one embodiment. In at least one embodiment, graphics multiprocessor 4734 couples with pipeline manager 4732 of processing cluster 4714. In at least one embodiment, graphics multiprocessor 4734 has an execution pipeline including but not limited to an instruction cache 4752, an instruction unit 4754, an address mapping unit 4756, a register file 4758, one or more general purpose graphics processing unit (GPGPU) cores 4762, and one or more load/store units 4766. In at least one embodiment, GPGPU cores 4762 and load/store units 4766 are coupled with cache memory 4772 and shared memory 4770 via a memory and cache interconnect 4768.

In at least one embodiment, instruction cache 4752 receives a stream of instructions to execute from pipeline manager 4732. In at least one embodiment, instructions are cached in instruction cache 4752 and dispatched for execution by an instruction unit 4754. In at least one embodiment, instruction unit 4754 can dispatch instructions as thread groups (e.g., warps), with each thread of thread group assigned to a different execution unit within GPGPU cores 4762. In at least one embodiment, an instruction can access any of a local, shared, or global address space by specifying an address within a unified address space. In at least one embodiment, address mapping unit 4756 can be used to translate addresses in a unified address space into a distinct memory address that can be accessed by load/store units 4766.

In at least one embodiment, register file 4758 provides a set of registers for functional units of graphics multiprocessor 4734. In at least one embodiment, register file 4758 provides temporary storage for operands connected to data paths of functional units (e.g., GPGPU cores 4762, load/store units 4766) of graphics multiprocessor 4734. In at least one embodiment, register file 4758 is divided between each of functional units such that each functional unit is allocated a dedicated portion of register file 4758. In at least one embodiment, register file 4758 is divided between different warps being executed by graphics multiprocessor 4734.

In at least one embodiment, GPGPU cores 4762 can each include floating point units (FPUs) and/or integer arithmetic logic units (ALUs) that are used to execute instructions of graphics multiprocessor 4734. In at least one embodiment, GPGPU cores 4762 can be similar in architecture or can differ in architecture. In at least one embodiment, a first portion of GPGPU cores 4762 include a single precision FPU and an integer ALU while a second portion of GPGPU cores include a double precision FPU. In at least one embodiment, FPUs can implement IEEE 754-2008 standard floating point arithmetic or enable variable precision floating point arithmetic. In at least one embodiment, graphics multiprocessor 4734 can additionally include one or more fixed function or special function units to perform specific functions such as copy rectangle or pixel blending operations. In at least one embodiment, one or more of GPGPU cores 4762 can also include fixed or special function logic.

In at least one embodiment, GPGPU cores 4762 include SIMD logic capable of performing a single instruction on multiple sets of data. In at least one embodiment, GPGPU cores 4762 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 4768 is an interconnect network that connects each functional unit of graphics multiprocessor 4734 to register file 4758 and to shared memory 4770. In at least one embodiment, memory and cache interconnect 4768 is a crossbar interconnect that allows load/store unit 4766 to implement load and store operations between shared memory 4770 and register file 4758. In at least one embodiment, register file 4758 can operate at a same frequency as GPGPU cores 4762, thus data transfer between GPGPU cores 4762 and register file 4758 can have very low latency. In at least one embodiment, shared memory 4770 can be used to enable communication between threads that execute on functional units within graphics multiprocessor 4734. In at least one embodiment, cache memory 4772 can be used as a data cache for example, to cache texture data communicated between functional units and texture unit 4736. In at least one embodiment, shared memory 4770 can also be used as a program managed cache. In at least one embodiment, threads executing on GPGPU cores 4762 can programmatically store data within shared memory in addition to automatically cached data that is stored within cache memory 4772.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high-speed interconnect such as PCIe or NVLink). In at least one embodiment, a GPU may be integrated on a package or chip as cores and communicatively coupled to cores over an internal processor bus/interconnect internal to a package or chip. In at least one embodiment, regardless a manner in which a GPU is connected, processor cores may allocate work to such GPU in a form of sequences of commands/instructions contained in a work descriptor. In at least one embodiment, that GPU then uses dedicated circuitry/logic for efficiently processing these commands/instructions.

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment, inference and/or training logic 3415 may be used in graphics multiprocessor 4734 for inferencing or predicting operations based, at least in part, on weight parameters calculated using neural network training operations, neural network functions and/or architectures, or neural network use cases described herein.

In at least one embodiment, at least one component shown or described with respect to FIGS. 47A-47D is used to perform techniques and/or functions described in connection with FIGS. 1-33. In at least one embodiment, at least one component shown or described with respect to FIGS. 47A-47D is used to cause one or more neural networks to cause one or more non-noise pixels to be identified and blended in parallel. In at least one embodiment, at least one component shown or described with respect to FIGS. 47A-47D is used to use one or more neural networks to adjust brightness of one or more pixels of one or more images prior to denoising the one or more images. In at least one embodiment, at least one component shown or described with respect to FIGS. 47A-47D is used to perform at least one aspect described with respect to FIGS. 1-33, and/or other systems, methods, or operations described herein.

Figure 48:
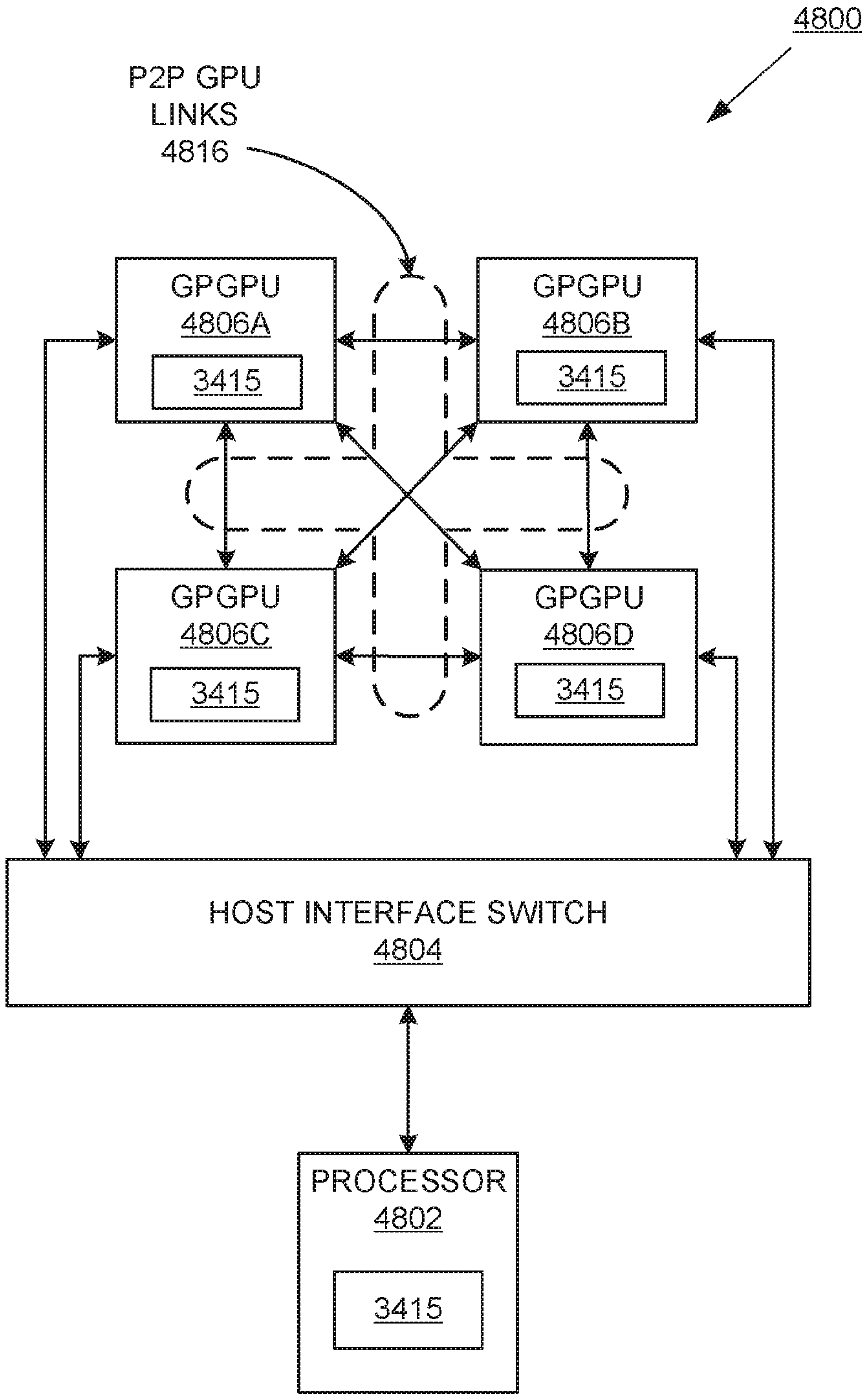
FIG. 48 illustrates a multi-graphics processing unit (GPU) system, in accordance with at least one embodiment.

FIG. 48 illustrates a multi-GPU computing system 4800, in accordance with at least one embodiment. In at least one embodiment, multi-GPU computing system 4800 can include a processor 4802 coupled to multiple general purpose graphics processing units (GPGPUs) 4806A-D via a host interface switch 4804. In at least one embodiment, host interface switch 4804 is a PCI express switch device that couples processor 4802 to a PCI express bus over which processor 4802 can communicate with GPGPUs 4806A-D. In at least one embodiment, GPGPUs 4806A-D can interconnect via a set of high-speed point-to-point GPU-to-GPU links 4816. In at least one embodiment, GPU-to-GPU links 4816 connect to each of GPGPUs 4806A-D via a dedicated GPU link. In at least one embodiment, P2P GPU links 4816 enable direct communication between each of GPGPUs 4806A-D without requiring communication over host interface switch 4804 to which processor 4802 is connected. In at least one embodiment, with GPU-to-GPU traffic directed to P2P GPU links 4816, host interface switch 4804 remains available for system memory access or to communicate with other instances of multi-GPU computing system 4800, for example, via one or more network devices. While in at least one embodiment GPGPUs 4806A-D connect to processor 4802 via host interface switch 4804, in at least one embodiment processor 4802 includes direct support for P2P GPU links 4816 and can connect directly to GPGPUs 4806A-D.

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment, inference and/or training logic 3415 may be used in multi-GPU computing system 4800 for inferencing or predicting operations based, at least in part, on weight parameters calculated using neural network training operations, neural network functions and/or architectures, or neural network use cases described herein.

In at least one embodiment, at least one component shown or described with respect to FIG. 48 is used to perform techniques and/or functions described in connection with FIGS. 1-33. In at least one embodiment, at least one component shown or described with respect to FIG. 48 is used to cause one or more neural networks to cause one or more non-noise pixels to be identified and blended in parallel. In at least one embodiment, at least one component shown or described with respect to FIG. 48 is used to use one or more neural networks to adjust brightness of one or more pixels of one or more images prior to denoising the one or more images. In at least one embodiment, at least one component shown or described with respect to FIG. 48 is used to perform at least one aspect described with respect to FIGS. 1-33, and/or other systems, methods, or operations described herein.

Figure 49:
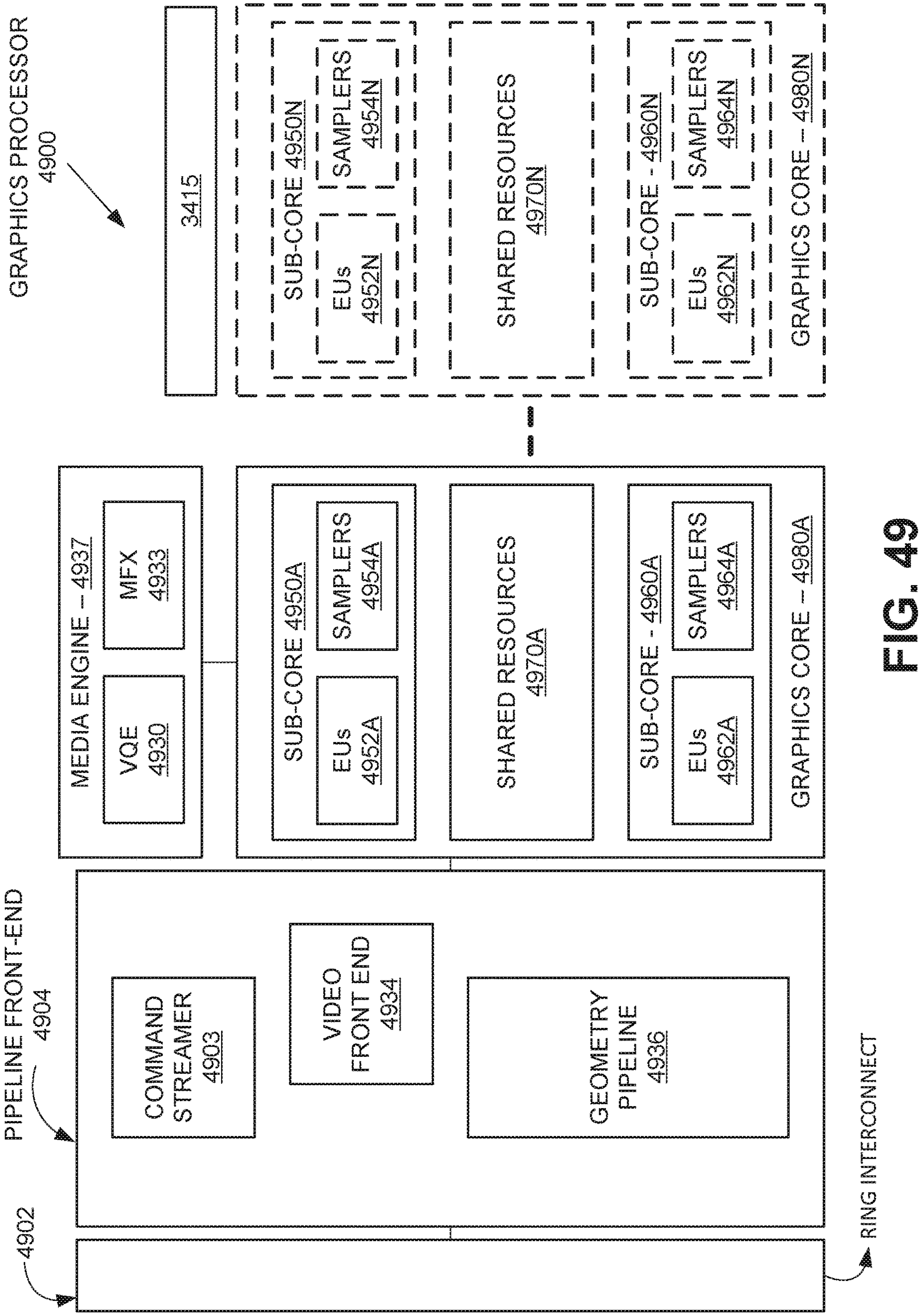
FIG. 49 illustrates a graphics processor, in accordance with at least one embodiment.

FIG. 49 is a block diagram of a graphics processor 4900, in accordance with at least one embodiment. In at least one embodiment, graphics processor 4900 includes a ring interconnect 4902, a pipeline front-end 4904, a media engine 4937, and graphics cores 4980A-4980N. In at least one embodiment, ring interconnect 4902 couples graphics processor 4900 to other processing units, including other graphics processors or one or more general-purpose processor cores. In at least one embodiment, graphics processor 4900 is one of many processors integrated within a multi-core processing system.

In at least one embodiment, graphics processor 4900 receives batches of commands via ring interconnect 4902. In at least one embodiment, incoming commands are interpreted by a command streamer 4903 in pipeline front-end 4904. In at least one embodiment, graphics processor 4900 includes scalable execution logic to perform 3D geometry processing and media processing via graphics core(s) 4980A-4980N. In at least one embodiment, for 3D geometry processing commands, command streamer 4903 supplies commands to geometry pipeline 4936. In at least one embodiment, for at least some media processing commands, command streamer 4903 supplies commands to a video front end 4934, which couples with media engine 4937. In at least one embodiment, media engine 4937 includes a Video Quality Engine (VQE) 4930 for video and image post-processing and a multi-format encode/decode (MFX) 4933 engine to provide hardware-accelerated media data encoding and decoding. In at least one embodiment, geometry pipeline 4936 and media engine 4937 each generate execution threads for thread execution resources provided by at least one graphics core 4980.

In at least one embodiment, graphics processor 4900 includes scalable thread execution resources featuring graphics cores 4980A-4980N (which can be modular and are sometimes referred to as core slices), each having multiple sub-cores 4950A-50N, 4960A-4960N (sometimes referred to as core sub-slices). In at least one embodiment, graphics processor 4900 can have any number of graphics cores 4980A. In at least one embodiment, graphics processor 4900 includes a graphics core 4980A having at least a first sub-core 4950A and a second sub-core 4960A. In at least one embodiment, graphics processor 4900 is a low power processor with a single sub-core (e.g., 4950A). In at least one embodiment, graphics processor 4900 includes multiple graphics cores 4980A-4980N, each including a set of first sub-cores 4950A-4950N and a set of second sub-cores 4960A-4960N. In at least one embodiment, each sub-core in first sub-cores 4950A-4950N includes at least a first set of execution units 4952A-4952N and media/texture samplers 4954A-4954N. In at least one embodiment, each sub-core in second sub-cores 4960A-4960N includes at least a second set of execution units 4962A-4962N and samplers 4964A-4964N. In at least one embodiment, each sub-core 4950A-4950N, 4960A-4960N shares a set of shared resources 4970A-4970N. In at least one embodiment, shared resources include shared cache memory and pixel operation logic.

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment, inference and/or training logic 3415 may be used in graphics processor 4900 for inferencing or predicting operations based, at least in part, on weight parameters calculated using neural network training operations, neural network functions and/or architectures, or neural network use cases described herein.

In at least one embodiment, at least one component shown or described with respect to FIG. 49 is used to perform techniques and/or functions described in connection with FIGS. 1-33. In at least one embodiment, at least one component shown or described with respect to FIG. 49 is used to cause one or more neural networks to cause one or more non-noise pixels to be identified and blended in parallel. In at least one embodiment, at least one component shown or described with respect to FIG. 49 is used to use one or more neural networks to adjust brightness of one or more pixels of one or more images prior to denoising the one or more images. In at least one embodiment, at least one component shown or described with respect to FIG. 49 is used to perform at least one aspect described with respect to FIGS. 1-33, and/or other systems, methods, or operations described herein.

Figure 50:
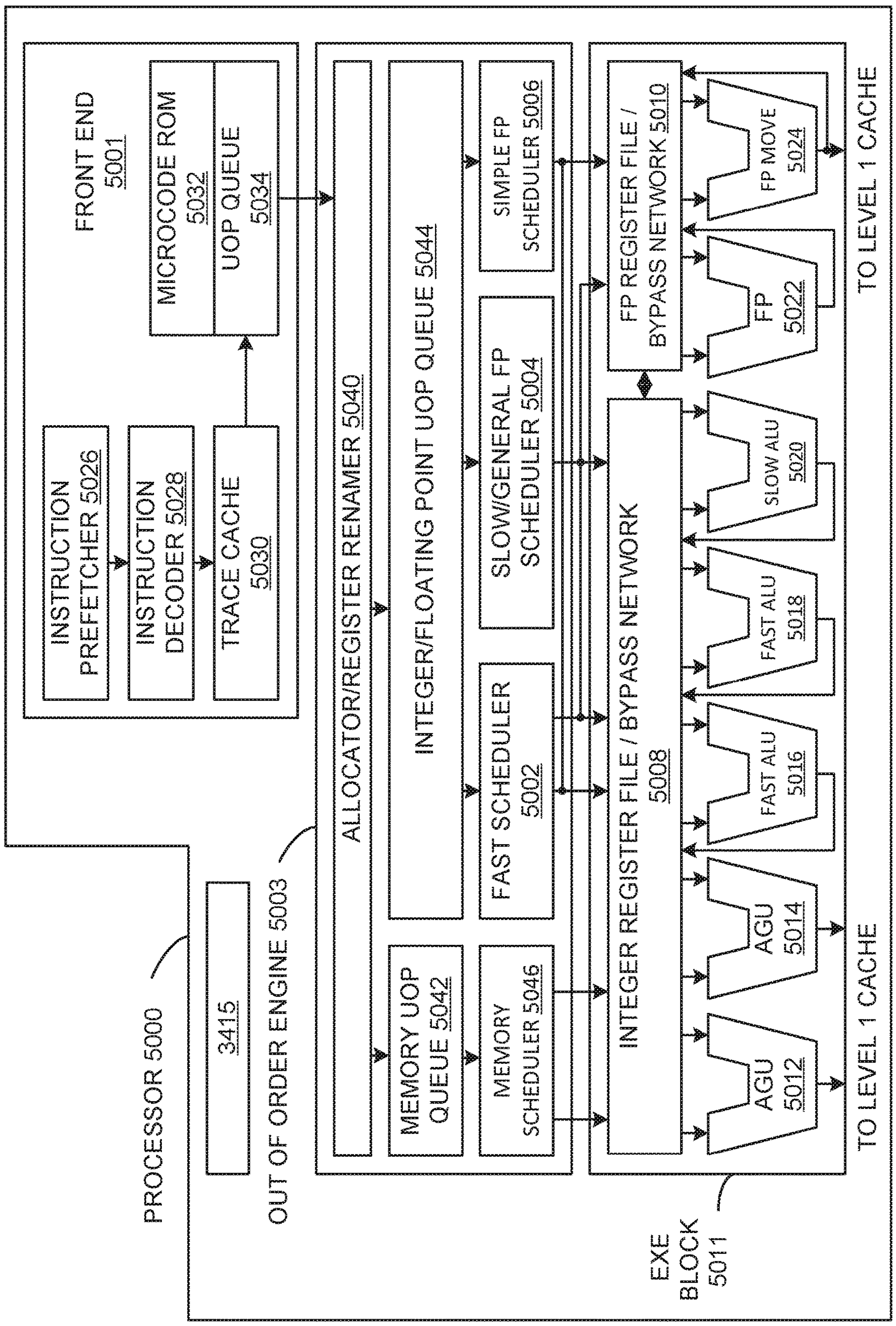
FIG. 50 is a block diagram illustrating a processor micro-architecture for a processor, in accordance with at least one embodiment.

FIG. 50 is a block diagram illustrating micro-architecture for a processor 5000 that may include logic circuits to perform instructions, in accordance with at least one embodiment. In at least one embodiment, processor 5000 may perform instructions, including x86 instructions, ARM instructions, specialized instructions for application-specific integrated circuits (ASICs), etc. In at least one embodiment, processor 5000 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processor 5000 may perform instructions to accelerate machine learning or deep learning algorithms, training, or inferencing.

In at least one embodiment, processor 5000 includes an in-order front end ("front end") 5001 to fetch instructions to be executed and prepare instructions to be used later in a processor pipeline. In at least one embodiment, front end 5001 may include several units. In at least one embodiment, an instruction prefetcher 5026 fetches instructions from memory and feeds instructions to an instruction decoder 5028 which in turn decodes or interprets instructions. For example, in at least one embodiment, instruction decoder 5028 decodes a received instruction into one or more operations called "micro-instructions" or "micro-operations" (also called "micro ops" or "uops") that a machine may execute. In at least one embodiment, instruction decoder 5028 parses an instruction into an opcode and corresponding data and control fields that may be used by micro-architecture to perform operations in accordance with at least one embodiment. In at least one embodiment, a trace cache 5030 may assemble decoded uops into program ordered sequences or traces in a uop queue 5034 for execution. In at least one embodiment, when trace cache 5030 encounters a complex instruction, a microcode ROM 5032 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 5028 may access microcode ROM 5032 to perform that instruction. In at least one embodiment, an instruction may be decoded into a small number of micro-ops for processing at instruction decoder 5028. In at least one embodiment, an instruction may be stored within microcode ROM 5032 should a number of micro-ops be needed to accomplish such operation. In at least one embodiment, trace cache 5030 refers to an entry point programmable logic array ("PLA") to determine a correct micro-instruction pointer for reading microcode sequences to complete one or more instructions from microcode ROM 5032 in accordance with at least one embodiment. In at least one embodiment, after microcode ROM 5032 finishes sequencing micro-ops for an instruction, front end 5001 of a machine may resume fetching micro-ops from trace cache 5030.

In at least one embodiment, out-of-order execution engine ("out of order engine") 5003 may prepare instructions for execution. In at least one embodiment, out-of-order execution logic has a number of buffers to smooth out and re-order flow of instructions to optimize performance as they go down a pipeline and get scheduled for execution. In at least one embodiment, out-of-order execution engine 5003 includes, without limitation, an allocator/register renamer 5040, a memory uop queue 5042, an integer/floating point uop queue 5044, a memory scheduler 5046, a fast scheduler 5002, a slow/general floating point scheduler ("slow/general FP scheduler") 5004, and a simple floating point scheduler ("simple FP scheduler") 5006. In at least one embodiment, fast schedule 5002, slow/general floating point scheduler 5004, and simple floating point scheduler 5006 are also collectively referred to herein as "uop schedulers 5002, 5004, 5006." In at least one embodiment, allocator/register renamer 5040 allocates machine buffers and resources that each uop needs in order to execute. In at least one embodiment, allocator/register renamer 5040 renames logic registers onto entries in a register file. In at least one embodiment, allocator/register renamer 5040 also allocates an entry for each uop in one of two uop queues, memory uop queue 5042 for memory operations and integer/floating point uop queue 5044 for non-memory operations, in front of memory scheduler 5046 and uop schedulers 5002, 5004, 5006. In at least one embodiment, uop schedulers 5002, 5004, 5006, determine when a uop is ready to execute based on readiness of their dependent input register operand sources and availability of execution resources uops need to complete their operation. In at least one embodiment, fast scheduler 5002 may schedule on each half of a main clock cycle while slow/general floating point scheduler 5004 and simple floating point scheduler 5006 may schedule once per main processor clock cycle. In at least one embodiment, uop schedulers 5002, 5004, 5006 arbitrate for dispatch ports to schedule uops for execution.

In at least one embodiment, execution block 5011 includes, without limitation, an integer register file/bypass network 5008, a floating point register file/bypass network ("FP register file/bypass network") 5010, address generation units ("AGUs") 5012 and 5014, fast Arithmetic Logic Units (ALUs) ("fast ALUs") 5016 and 5018, a slow Arithmetic Logic Unit ("slow ALU") 5020, a floating point ALU ("FP") 5022, and a floating point move unit ("FP move") 5024. In at least one embodiment, integer register file/bypass network 5008 and floating point register file/bypass network 5010 are also referred to herein as "register files 5008, 5010." In at least one embodiment, AGUSs 5012 and 5014, fast ALUs 5016 and 5018, slow ALU 5020, floating point ALU 5022, and floating point move unit 5024 are also referred to herein as "execution units 5012, 5014, 5016, 5018, 5020, 5022, and 5024." In at least one embodiment, execution block 5011 may include, without limitation, any number (including zero) and type of register files, bypass networks, address generation units, and execution units, in any combination.

In at least one embodiment, register networks 5008, 5010 may be arranged between uop schedulers 5002, 5004, 5006, and execution units 5012, 5014, 5016, 5018, 5020, 5022, and 5024. In at least one embodiment, integer register file/bypass network 5008 performs integer operations. In at least one embodiment, floating point register file/bypass network 5010 performs floating point operations. In at least one embodiment, each of register networks 5008, 5010 may include, without limitation, a bypass network that may bypass or forward just completed results that have not yet been written into a register file to new dependent uops. In at least one embodiment, register networks 5008, 5010 may communicate data with each other. In at least one embodiment, integer register file/bypass network 5008 may include, without limitation, two separate register files, one register file for a low-order thirty-two bits of data and a second register file for a high order thirty-two bits of data. In at least one embodiment, floating point register file/bypass network 5010 may include, without limitation, 128-bit wide entries because floating point instructions typically have operands from 64 to 128 bits in width.

In at least one embodiment, execution units 5012, 5014, 5016, 5018, 5020, 5022, 5024 may execute instructions. In at least one embodiment, register networks 5008, 5010 store integer and floating point data operand values that micro-instructions need to execute. In at least one embodiment, processor 5000 may include, without limitation, any number and combination of execution units 5012, 5014, 5016, 5018, 5020, 5022, 5024. In at least one embodiment, floating point ALU 5022 and floating point move unit 5024, may execute floating point, MMX, SIMD, AVX and SSE, or other operations, including specialized machine learning instructions. In at least one embodiment, floating point ALU 5022 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 5016, 5018. In at least one embodiment, fast ALUS 5016, 5018 may execute fast operations with an effective latency of half a clock cycle. In at least one embodiment, most complex integer operations go to slow ALU 5020 as slow ALU 5020 may include, without limitation, integer execution hardware for long-latency type of operations, such as a multiplier, shifts, flag logic, and branch processing. In at least one embodiment, memory load/store operations may be executed by AGUs 5012, 5014. In at least one embodiment, fast ALU 5016, fast ALU 5018, and slow ALU 5020 may perform integer operations on 64-bit data operands. In at least one embodiment, fast ALU 5016, fast ALU 5018, and slow ALU 5020 may be implemented to support a variety of data bit sizes including sixteen, thirty-two, 128, 256, etc. In at least one embodiment, floating point ALU 5022 and floating point move unit 5024 may be implemented to support a range of operands having bits of various widths, such as 128-bit wide packed data operands in conjunction with SIMD and multimedia instructions.

In at least one embodiment, uop schedulers 5002, 5004, 5006 dispatch dependent operations before a parent load has finished executing. In at least one embodiment, as uops may be speculatively scheduled and executed in processor 5000, processor 5000 may also include logic to handle memory misses. In at least one embodiment, if a data load misses in a data cache, there may be dependent operations in flight in a pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and a replay mechanism of at least one embodiment of a processor may also be designed to catch instruction sequences for text string comparison operations.

In at least one embodiment, "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment portions or all of inference and/or training logic 3415 may be incorporated into execution block 5011 and other memory or registers shown or not shown. For example, in at least one embodiment, training and/or inferencing techniques described herein may use one or more of ALUs illustrated in execution block 5011. Moreover, weight parameters may be stored in on-chip or off-chip memory and/or registers (shown or not shown) that configure ALUs of execution block 5011 to perform one or more machine learning algorithms, neural network architectures, use cases, or training techniques described herein.

In at least one embodiment, at least one component shown or described with respect to FIG. 50 is used to perform techniques and/or functions described in connection with FIGS. 1-33. In at least one embodiment, at least one component shown or described with respect to FIG. 50 is used to cause one or more neural networks to cause one or more non-noise pixels to be identified and blended in parallel. In at least one embodiment, at least one component shown or described with respect to FIG. 50 is used to use one or more neural networks to adjust brightness of one or more pixels of one or more images prior to denoising the one or more images. In at least one embodiment, at least one component shown or described with respect to FIG. 50 is used to perform at least one aspect described with respect to FIGS. 1-33, and/or other systems, methods, or operations described herein.

Figure 51:
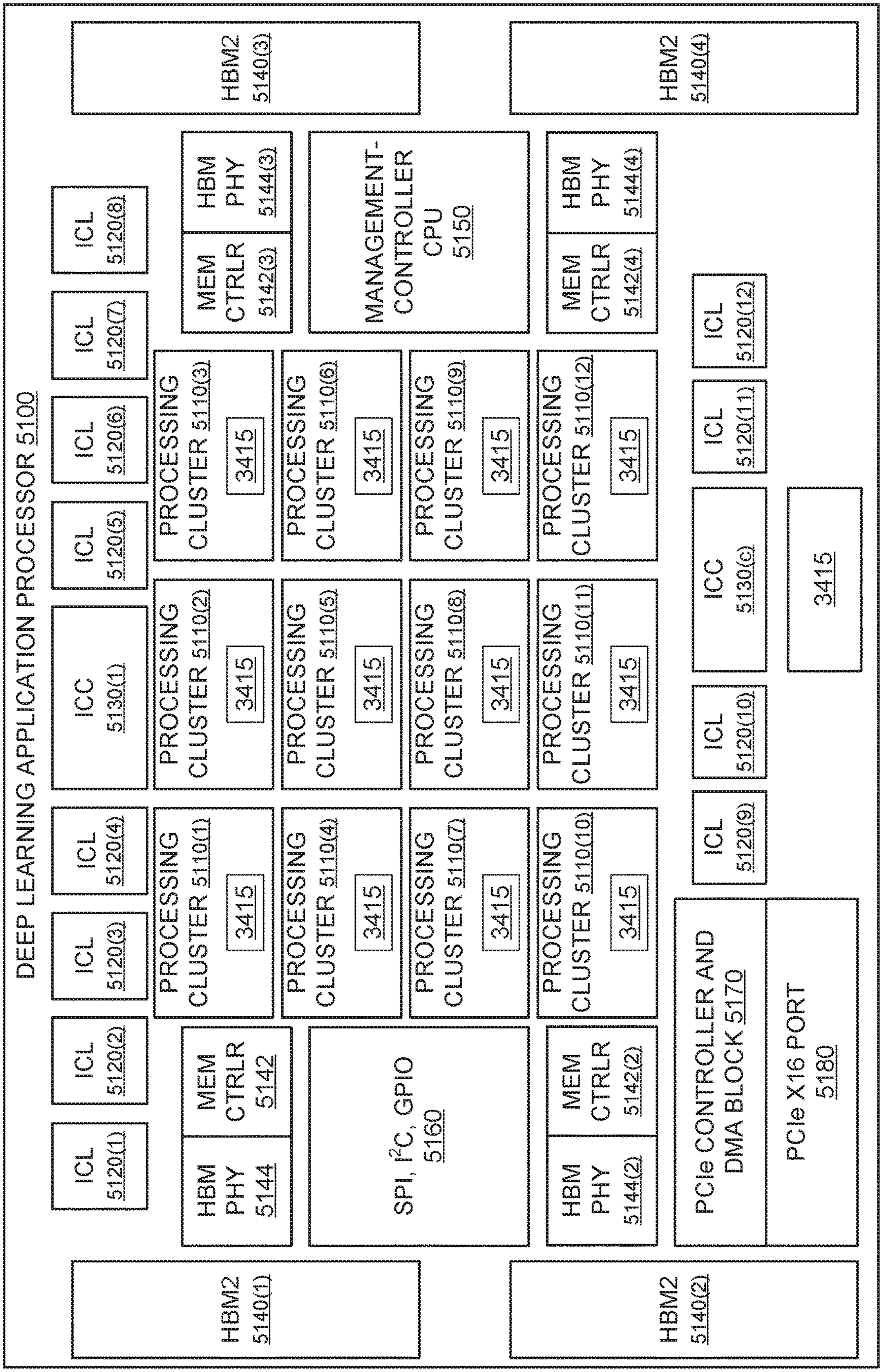
FIG. 51 illustrates a deep learning application processor, in accordance with at least one embodiment.

FIG. 51 illustrates a deep learning application processor 5100, in accordance with at least one embodiment. In at least one embodiment, deep learning application processor 5100 uses instructions that, if executed by deep learning application processor 5100, cause deep learning application processor 5100 to perform some or all of processes and techniques described throughout this disclosure. In at least one embodiment, deep learning application processor 5100 is an application-specific integrated circuit (ASIC). In at least one embodiment, application processor 5100 performs matrix multiply operations either "hard-wired" into hardware as a result of performing one or more instructions or both. In at least one embodiment, deep learning application processor 5100 includes, without limitation, processing clusters 5110(1)-5110(12), Inter-Chip Links ("ICLs") 5120(1)-5120(12), Inter-Chip Controllers ("ICCs") 5130(1)-5130(2), high-bandwidth memory second generation ("HBM2") 5140(1)-5140(4), memory controllers ("Mem Ctrlrs") 5142(1)-5142(4), high bandwidth memory physical layer ("HBM PHY") 5144(1)-5144(4), a management-controller central processing unit ("management-controller CPU") 5150, a Serial Peripheral Interface, Inter-Integrated Circuit, and General Purpose Input/Output block ("SPI, I2C, GPIO") 5160, a peripheral component interconnect express controller and direct memory access block ("PCIe Controller and DMA") 5170, and a sixteen-lane peripheral component interconnect express port ("PCI Express x 16") 5180.

In at least one embodiment, processing clusters 5110 may perform deep learning operations, including inference or prediction operations based on weight parameters calculated one or more training techniques, including those described herein. In at least one embodiment, each processing cluster 5110 may include, without limitation, any number and type of processors. In at least one embodiment, deep learning application processor 5100 may include any number and type of processing clusters 5110. In at least one embodiment, Inter-Chip Links 5120 are bi-directional. In at least one embodiment, Inter-Chip Links 5120 and Inter-Chip Controllers 5130 enable multiple deep learning application processors 5100 to exchange information, including activation information resulting from performing one or more machine learning algorithms embodied in one or more neural networks. In at least one embodiment, deep learning application processor 5100 may include any number (including zero) and type of ICLs 5120 and ICCs 5130.

In at least one embodiment, HBM2s 5140 provide a total of 32 Gigabytes (GB) of memory. In at least one embodiment, HBM2 5140(*i*) is associated with both memory controller 5142(*i*) and HBM PHY 5144(*i*) where "i" is an arbitrary integer. In at least one embodiment, any number of HBM2s 5140 may provide any type and total amount of high bandwidth memory and may be associated with any number (including zero) and type of memory controllers 5142 and HBM PHYs 5144. In at least one embodiment, SPI, I2C, GPIO 5160, PCIe Controller and DMA 5170, and/or PCIe 5180 may be replaced with any number and type of blocks that enable any number and type of communication standards in any technically feasible fashion.

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment, deep learning application processor is used to train a machine learning model, such as a neural network, to predict or infer information provided to deep learning application processor 5100. In at least one embodiment, deep learning application processor 5100 is used to infer or predict information based on a trained machine learning model (e.g., neural network)

that has been trained by another processor or system or by deep learning application processor 5100. In at least one embodiment, processor 5100 may be used to perform one or more neural network use cases described herein.

In at least one embodiment, at least one component shown or described with respect to FIG. 51 is used to perform techniques and/or functions described in connection with FIGS. 1-33. In at least one embodiment, at least one component shown or described with respect to FIG. 51 is used to cause one or more neural networks to cause one or more non-noise pixels to be identified and blended in parallel. In at least one embodiment, at least one component shown or described with respect to FIG. 51 is used to use one or more neural networks to adjust brightness of one or more pixels of one or more images prior to denoising the one or more images. In at least one embodiment, at least one component shown or described with respect to FIG. 51 is used to perform at least one aspect described with respect to FIGS. 1-33, and/or other systems, methods, or operations described herein.

Figure 52:
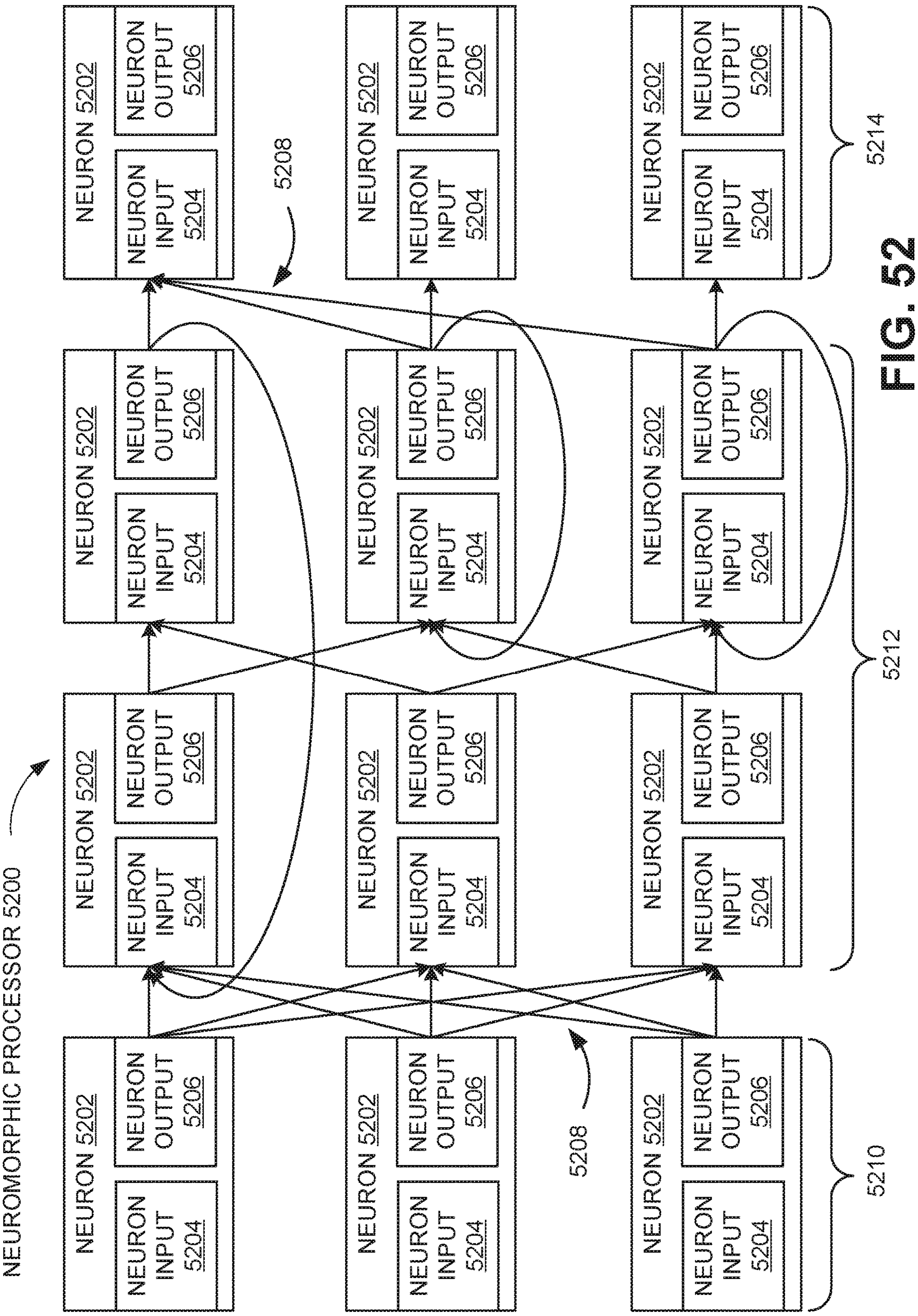
FIG. 52 is a block diagram illustrating an example neuromorphic processor, in accordance with at least one embodiment.

FIG. 52 is a block diagram of a neuromorphic processor 5200, in accordance with at least one embodiment. In at least one embodiment, neuromorphic processor 5200 may receive one or more inputs from sources external to neuromorphic processor 5200. In at least one embodiment, these inputs may be transmitted to one or more neurons 5202 within neuromorphic processor 5200. In at least one embodiment, neurons 5202 and components thereof may be implemented using circuitry or logic, including one or more arithmetic logic units (ALUs). In at least one embodiment, neuromorphic processor 5200 may include, without limitation, thousands or millions of instances of neurons 5202, but any suitable number of neurons 5202 may be used. In at least one embodiment, each instance of neuron 5202 may include a neuron input 5204 and a neuron output 5206. In at least one embodiment, neurons 5202 may generate outputs that may be transmitted to inputs of other instances of neurons 5202. For example, in at least one embodiment, neuron inputs 5204 and neuron outputs 5206 may be interconnected via synapses 5208.

In at least one embodiment, neurons 5202 and synapses 5208 may be interconnected such that neuromorphic processor 5200 operates to process or analyze information received by neuromorphic processor 5200. In at least one embodiment, neurons 5202 may transmit an output pulse (or "fire" or "spike") when inputs received through neuron input 5204 exceed a threshold. In at least one embodiment, neurons 5202 may sum or integrate signals received at neuron inputs 5204. For example, in at least one embodiment, neurons 5202 may be implemented as leaky integrate-and-fire neurons, wherein if a sum (referred to as a "membrane potential") exceeds a threshold value, neuron 5202 may generate an output (or "fire") using a transfer function such as a sigmoid or threshold function. In at least one embodiment, a leaky integrate-and-fire neuron may sum signals received at neuron inputs 5204 into a membrane potential and may also apply a decay factor (or leak) to reduce a membrane potential. In at least one embodiment, a leaky integrate-and-fire neuron may fire if multiple input signals are received at neuron inputs 5204 rapidly enough to exceed a threshold value (i.e., before a membrane potential decays too low to fire). In at least one embodiment, neurons 5202 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 5202 may include, without limitation, comparator circuits or logic that generate an output spike at neuron output 5206 when result of applying a transfer function to neuron input 5204 exceeds a threshold. In at least one embodiment, once neuron 5202 fires, it may disregard previously received input information by, for example, resetting a membrane potential to 0 or another suitable default value. In at least one embodiment, once membrane potential is reset to 0, neuron 5202 may resume normal operation after a suitable period of time (or refractory period).

In at least one embodiment, neurons 5202 may be interconnected through synapses 5208. In at least one embodiment, synapses 5208 may operate to transmit signals from an output of a first neuron 5202 to an input of a second neuron 5202. In at least one embodiment, neurons 5202 may transmit information over more than one instance of synapse 5208. In at least one embodiment, one or more instances of neuron output 5206 may be connected, via an instance of synapse 5208, to an instance of neuron input 5204 in same neuron 5202. In at least one embodiment, an instance of neuron 5202 generating an output to be transmitted over an instance of synapse 5208 may be referred to as a "pre-synaptic neuron" with respect to that instance of synapse 5208. In at least one embodiment, an instance of neuron 5202 receiving an input transmitted over an instance of synapse 5208 may be referred to as a "post-synaptic neuron" with respect to that instance of synapse 5208. Because an instance of neuron 5202 may receive inputs from one or more instances of synapse 5208, and may also transmit outputs over one or more instances of synapse 5208, a single instance of neuron 5202 may therefore be both a "pre-synaptic neuron" and "post-synaptic neuron," with respect to various instances of synapses 5208, in at least one embodiment.

In at least one embodiment, neurons 5202 may be organized into one or more layers. In at least one embodiment, each instance of neuron 5202 may have one neuron output 5206 that may fan out through one or more synapses 5208 to one or more neuron inputs 5204. In at least one embodiment, neuron outputs 5206 of neurons 5202 in a first layer 5210 may be connected to neuron inputs 5204 of neurons 5202 in a second layer 5212. In at least one embodiment, layer 5210 may be referred to as a "feed-forward layer." In at least one embodiment, each instance of neuron 5202 in an instance of first layer 5210 may fan out to each instance of neuron 5202 in second layer 5212. In at least one embodiment, first layer 5210 may be referred to as a "fully connected feed-forward layer." In at least one embodiment, each instance of neuron 5202 in an instance of second layer 5212 may fan out to fewer than all instances of neuron 5202 in a third layer 5214. In at least one embodiment, second layer 5212 may be referred to as a "sparsely connected feed-forward layer." In at least one embodiment, neurons 5202 in second layer 5212 may fan out to neurons 5202 in multiple other layers, including to neurons 5202 also in second layer 5212. In at least one embodiment, second layer 5212 may be referred to as a "recurrent layer." In at least one embodiment, neuromorphic processor 5200 may include, without limitation, any suitable combination of recurrent layers and feed-forward layers, including, without limitation, both sparsely connected feed-forward layers and fully connected feed-forward layers.

In at least one embodiment, neuromorphic processor 5200 may include, without limitation, a reconfigurable interconnect architecture or dedicated hard-wired interconnects to connect synapse 5208 to neurons 5202. In at least one embodiment, neuromorphic processor 5200 may include, without limitation, circuitry or logic that allows synapses to be allocated to different neurons 5202 as needed based on neural network topology and neuron fan-in/out. For example, in at least one embodiment, synapses 5208 may be connected to neurons 5202 using an interconnect fabric, such as network-on-chip, or with dedicated connections. In at least one embodiment, synapse interconnections and components thereof may be implemented using circuitry or logic.

In at least one embodiment, at least one component shown or described with respect to FIG. 52 is used to perform techniques and/or functions described in connection with FIGS. 1-33. In at least one embodiment, at least one component shown or described with respect to FIG. 52 is used to cause one or more neural networks to cause one or more non-noise pixels to be identified and blended in parallel. In at least one embodiment, at least one component shown or described with respect to FIG. 52 is used to use one or more neural networks to adjust brightness of one or more pixels of one or more images prior to denoising the one or more images. In at least one embodiment, at least one component shown or described with respect to FIG. 52 is used to perform at least one aspect described with respect to FIGS. 1-33, and/or other systems, methods, or operations described herein.

Figure 53:
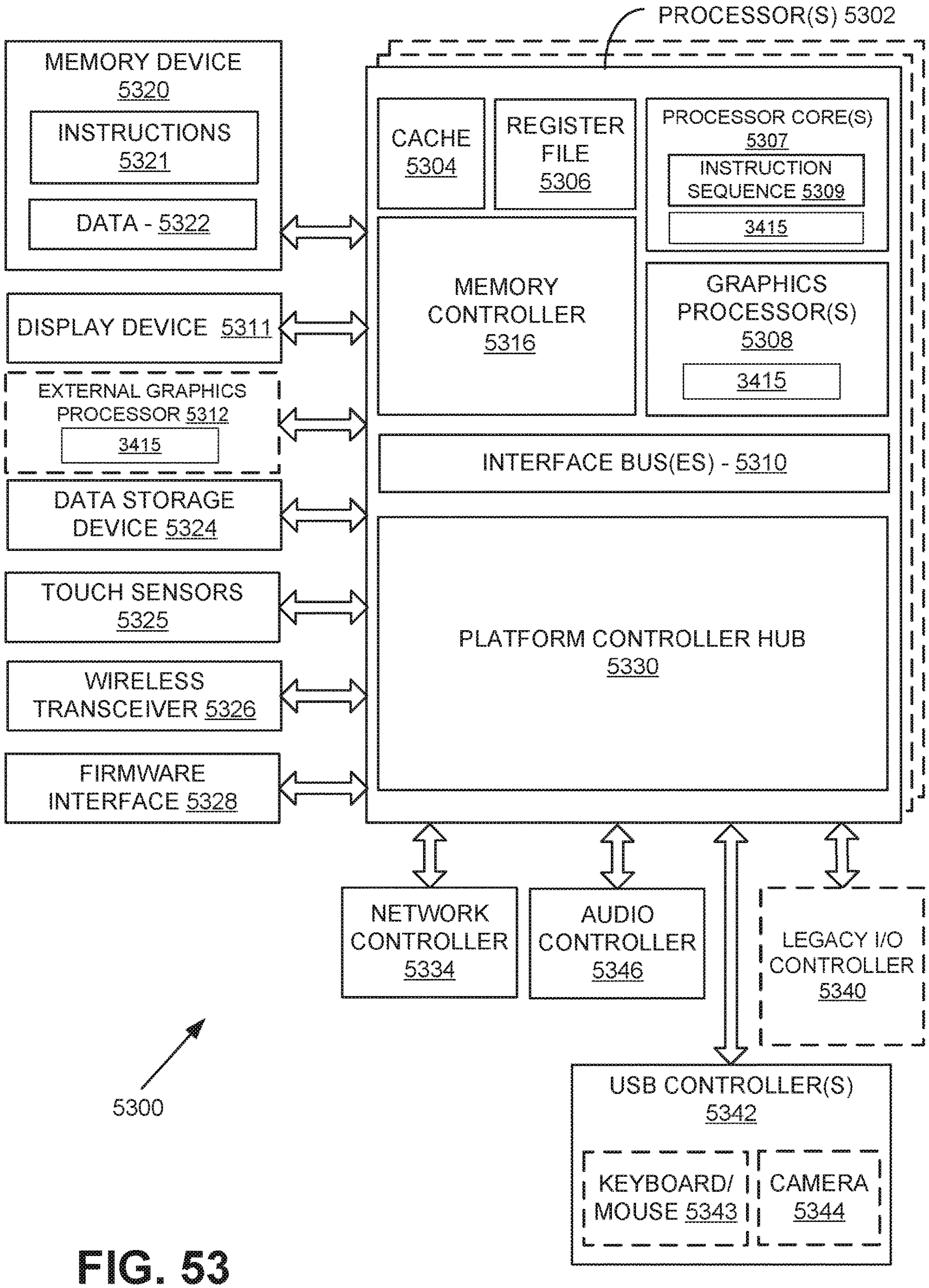
FIG. 53 illustrates a computer system, in accordance with at least one embodiment.

FIG. 53 illustrates a computer system 5300, in accordance with at least one embodiment. is a block diagram of a processing system, in accordance with at least one embodiment. In at least one embodiment, computer system 5300 includes one or more processors 5302 and one or more graphics processors 5308, and may be a single processor desktop system, a multiprocessor workstation system, or a server system having a large number of processors 5302 or processor cores 5307. In at least one embodiment, computer system 5300 is a processing platform incorporated within a system-on-a-chip (SoC) integrated circuit for use in mobile, handheld, or embedded devices.

In at least one embodiment, computer system 5300 can include, or be incorporated within a server-based gaming platform, a game console, including a game and media console, a mobile gaming console, a handheld game console, or an online game console. In at least one embodiment, computer system 5300 is a mobile phone, a smart phone, a tablet computing device or a mobile Internet device. In at least one embodiment, computer system 5300 can also include, couple with, or be integrated within a wearable device, such as a smart watch wearable device, a smart eyewear device, an augmented reality device, or a virtual reality device. In at least one embodiment, computer system 5300 is a television or set top box device having one or more processors 5302 and a graphical interface generated by one or more graphics processors 5308.

In at least one embodiment, one or more processors 5302 each include one or more processor cores 5307 to process instructions which, when executed, perform operations for system and user software. In at least one embodiment, each of one or more processor cores 5307 is configured to process a specific instruction sequence 5309. In at least one embodiment, instruction sequence 5309 may facilitate Complex Instruction Set Computing (CISC), Reduced Instruction Set Computing (RISC), or computing via a Very Long Instruction Word (VLIW). In at least one embodiment, processor cores 5307 may each process a different instruction sequence 5309, which may include instructions to facilitate emulation of other instruction sequences. In at least one embodiment, processor core 5307 may also include other processing devices, such a Digital Signal Processor (DSP).

In at least one embodiment, processor 5302 includes a cache memory 5304. In at least one embodiment, processor 5302 can have a single internal cache or multiple levels of internal cache. In at least one embodiment, cache memory is shared among various components of processor 5302. In at least one embodiment, processor 5302 also uses an external cache (e.g., a Level-3 (L3) cache or Last Level Cache (LLC)) (not shown), which may be shared among processor cores 5307 using known cache coherency techniques. In at least one embodiment, a register file 5306 is additionally included in processor 5302, which may include different types of registers for storing different types of data (e.g., integer registers, floating point registers, status registers, and an instruction pointer register). In at least one embodiment, register file 5306 may include general-purpose registers or other registers.

In at least one embodiment, one or more processor(s) 5302 are coupled with one or more interface bus(es) 5310 to transmit communication signals such as address, data, or control signals between processor 5302 and other components in system 5300. In at least one embodiment, interface bus 5310 can be a processor bus, such as a version of a Direct Media Interface (DMI) bus. In at least one embodiment, interface bus 5310 is not limited to a DMI bus, and may include one or more Peripheral Component Interconnect buses (e.g., PCI, PCI Express), memory busses, or other types of interface busses. In at least one embodiment processor(s) 5302 include an integrated memory controller 5316 and a platform controller hub 5330. In at least one embodiment, memory controller 5316 facilitates communication between a memory device and other components of system 5300, while platform controller hub (PCH) 5330 provides connections to I/O devices via a local I/O bus.

In at least one embodiment, a memory device 5320 can be a dynamic random access memory (DRAM) device, a static random access memory (SRAM) device, flash memory device, phase-change memory device, or some other memory device having suitable performance to serve as process memory. In at least one embodiment, memory device 5320 can operate as system memory for system 5300, to store data 5322 and instructions 5321 for use when one or more processors 5302 executes an application or process. In at least one embodiment, memory controller 5316 also couples with an optional external graphics processor 5312, which may communicate with one or more graphics processors 5308 in processors 5302 to perform graphics and media operations. In at least one embodiment, a display device 5311 can connect to processor(s) 5302. In at least one embodiment, display device 5311 can include one or more of an internal display device, as in a mobile electronic device or a laptop device, or an external display device attached via a display interface (e.g., DisplayPort, etc.). In at least one embodiment, display device 5311 can include a head mounted display (HMD) such as a stereoscopic display device for use in virtual reality (VR) applications or augmented reality (AR) applications.

In at least one embodiment, platform controller hub 5330 enables peripherals to connect to memory device 5320 and processor 5302 via a high-speed I/O bus. In at least one embodiment, I/O peripherals include, but are not limited to, an audio controller 5346, a network controller 5334, a firmware interface 5328, a wireless transceiver 5326, touch sensors 5325, a data storage device 5324 (e.g., hard disk drive, flash memory, etc.). In at least one embodiment, data storage device 5324 can connect via a storage interface (e.g., SATA) or via a peripheral bus, such as a Peripheral Component Interconnect bus (e.g., PCI, PCI Express). In at least one embodiment, touch sensors 5325 can include touch screen sensors, pressure sensors, or fingerprint sensors. In at least one embodiment, wireless transceiver 5326 can be a Wi-Fi transceiver, a Bluetooth transceiver, or a mobile network transceiver such as a 3G, 4G, or Long Term Evolution (LTE) transceiver. In at least one embodiment, firmware interface 5328 enables communication with system firmware, and can be, for example, a unified extensible firmware interface (UEFI). In at least one embodiment, network controller 5334 can enable a network connection to a wired network. In at least one embodiment, a high-performance network controller (not shown) couples with interface bus 5310. In at least one embodiment, audio controller 5346 is a multi-channel high definition audio controller. In at least one embodiment, system 5300 includes an optional legacy I/O controller 5340 for coupling legacy (e.g., Personal System 2 (PS/2)) devices to system 5300. In at least one embodiment, platform controller hub 5330 can also connect to one or more Universal Serial Bus (USB) controllers 5342 connect input devices, such as keyboard and mouse 5343 combinations, a camera 5344, or other USB input devices.

In at least one embodiment, an instance of memory controller 5316 and platform controller hub 5330 may be integrated into a discreet external graphics processor, such as external graphics processor 5312. In at least one embodiment, platform controller hub 5330 and/or memory controller 5316 may be external to one or more processor(s) 5302. For example, in at least one embodiment, system 5300 can include an external memory controller 5316 and platform controller hub 5330, which may be configured as a memory controller hub and peripheral controller hub within a system chipset that is in communication with processor(s) 5302.

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment portions or all of inference and/or training logic 3415 may be incorporated into graphics processor(s) 5308. For example, in at least one embodiment, training and/or inferencing techniques described herein may use one or more of ALUs embodied in a 3D pipeline. Moreover, in at least one embodiment, inferencing and/or training operations described herein may be done using logic other than logic illustrated in FIG. 34A or 34B. In at least one embodiment, weight parameters may be stored in on-chip or off-chip memory and/or registers (shown or not shown) that configure ALUs of graphics processor(s) 5308 to perform one or more machine learning algorithms, neural network architectures, use cases, or training techniques described herein.

In at least one embodiment, at least one component shown or described with respect to FIG. 53 is used to perform techniques and/or functions described in connection with FIGS. 1-33. In at least one embodiment, at least one component shown or described with respect to FIG. 53 is used to cause one or more neural networks to cause one or more non-noise pixels to be identified and blended in parallel. In at least one embodiment, at least one component shown or described with respect to FIG. 53 is used to use one or more neural networks to adjust brightness of one or more pixels of one or more images prior to denoising the one or more images. In at least one embodiment, at least one component shown or described with respect to FIG. 53 is used to perform at least one aspect described with respect to FIGS. 1-33, and/or other systems, methods, or operations described herein.

Figure 54:
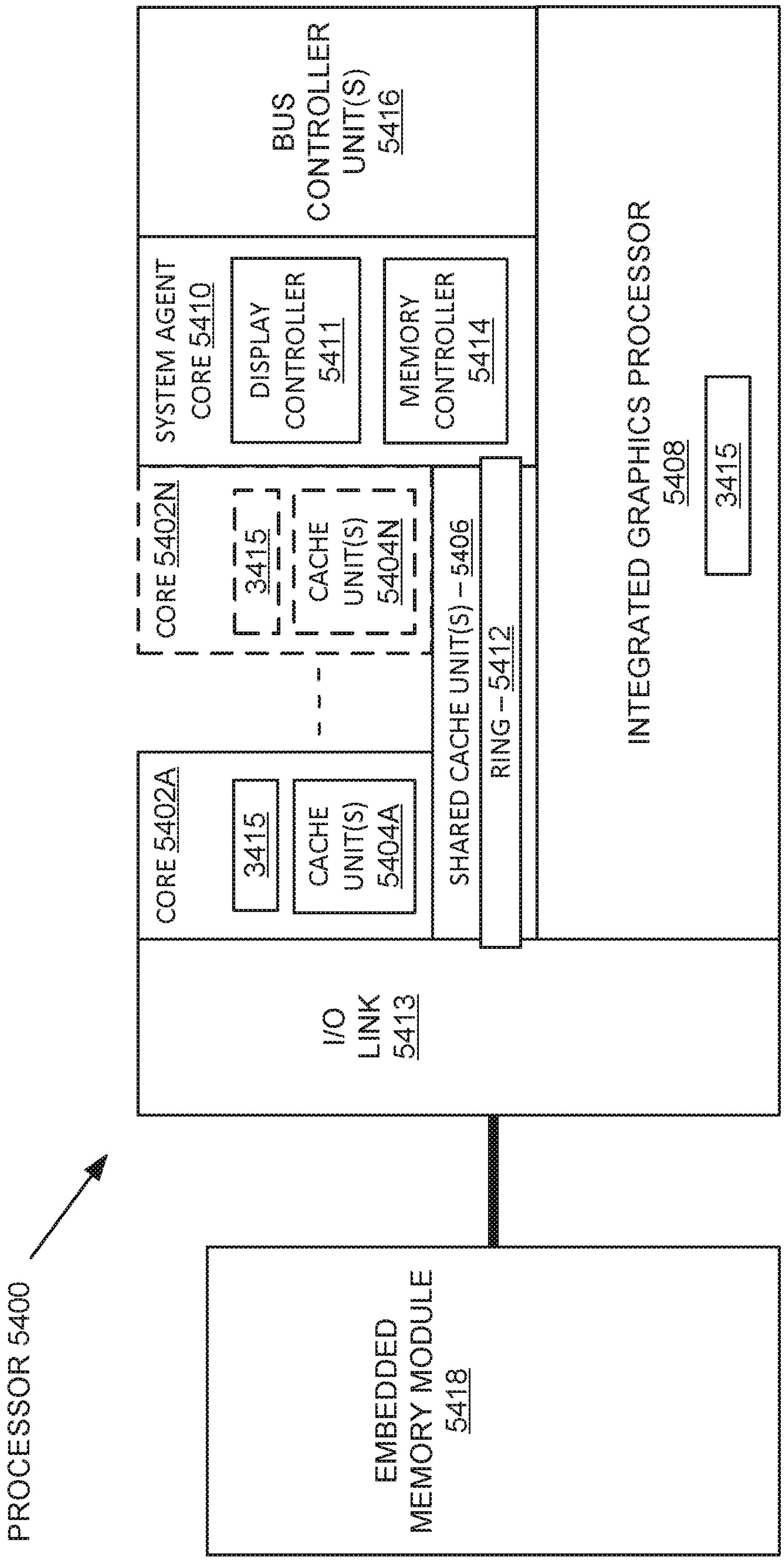
FIG. 54 illustrates a graphics processor, in accordance with at least one embodiment.

FIG. 54 is a block diagram of a graphics processor 5400 having one or more processor cores 5402A-5402N, an integrated memory controller 5414, and an integrated graphics processor 5408, in accordance with at least one embodiment. In at least one embodiment, graphics processor 5400 can include additional cores up to and including additional core 5402N represented by dashed lined boxes. In at least one embodiment, each of processor cores 5402A-5402N includes one or more internal cache units 5404A-5404N. In at least one embodiment, each processor core also has access to one or more shared cached units 5406.

In at least one embodiment, internal cache units 5404A-5404N and shared cache units 5406 represent a cache memory hierarchy within processor 5400. In at least one embodiment, cache memory units 5404A-5404N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 5406 and 5404A-5404N.

In at least one embodiment, graphics processor 5400 may also include a set of one or more bus controller units 5416 and a system agent core 5410. In at least one embodiment, bus controller units 5416 manage a set of peripheral buses, such as one or more PCI or PCI express busses. In at least one embodiment, system agent core 5410 provides management functionality for various processor components. In at least one embodiment, system agent core 5410 includes one or more integrated memory controllers 5414 to manage access to various external memory devices (not shown).

In at least one embodiment, one or more of processor cores 5402A-5402N include support for simultaneous multi-threading. In at least one embodiment, system agent core 5410 includes components for coordinating and operating cores 5402A-5402N during multi-threaded processing. In at least one embodiment, system agent core 5410 may additionally include a power control unit (PCU), which includes logic and components to regulate one or more power states of processor cores 5402A-5402N and graphics processor 5408.

In at least one embodiment, graphics processor 5400 additionally includes graphics processor 5408 to execute graphics processing operations. In at least one embodiment, graphics processor 5408 couples with shared cache units 5406, and system agent core 5410, including one or more integrated memory controllers 5414. In at least one embodiment, system agent core 5410 also includes a display controller 5411 to drive graphics processor output to one or more coupled displays. In at least one embodiment, display controller 5411 may also be a separate module coupled with graphics processor 5408 via at least one interconnect, or may be integrated within graphics processor 5408.

In at least one embodiment, a ring-based interconnect unit 5412 is used to couple internal components of processor 5400. In at least one embodiment, an alternative interconnect unit may be used, such as a point-to-point interconnect, a switched interconnect, or other techniques. In at least one embodiment, graphics processor 5408 couples with ring interconnect 5412 via an I/O link 5413.

In at least one embodiment, I/O link 5413 represents at least one of multiple varieties of I/O interconnects, including an on package I/O interconnect which facilitates communication between various processor components and a high-performance embedded memory module 5418, such as an eDRAM module. In at least one embodiment, each of processor cores 5402A-5402N and graphics processor 5408 use embedded memory module 5418 as a shared Last Level Cache.

In at least one embodiment, processor cores 5402A-5402N are homogeneous cores executing a common instruction set architecture. In at least one embodiment, processor cores 5402A-5402N are heterogeneous in terms of instruction set architecture (ISA), where one or more of processor cores 5402A-5402N execute a common instruction set, while one or more other cores of processor cores 5402A-5402N executes a subset of a common instruction set or a different instruction set. In at least one embodiment, processor cores 5402A-5402N are heterogeneous in terms of microarchitecture, where one or more cores having a relatively higher power consumption couple with one or more power cores having a lower power consumption. In at least one embodiment, processor 5400 can be implemented on one or more chips or as an SoC integrated circuit.

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment portions or all of inference and/or training logic 3415 may be incorporated into processor 5400. For example, in at least one embodiment, training and/or inferencing techniques described herein may use one or more of ALUs embodied in a 3D pipeline, graphics core(s) 5402, shared function logic, or other logic in FIG. 54. Moreover, in at least one embodiment, inferencing and/or training operations described herein may be done using logic other than logic illustrated in FIG. 34A or 34B. In at least one embodiment, weight parameters may be stored in on-chip or off-chip memory and/or registers (shown or not shown) that configure ALUs of processor 5400 to perform one or more machine learning algorithms, neural network architectures, use cases, or training techniques described herein.

In at least one embodiment, at least one component shown or described with respect to FIG. 54 is used to perform techniques and/or functions described in connection with FIGS. 1-33. In at least one embodiment, at least one component shown or described with respect to FIG. 54 is used to cause one or more neural networks to cause one or more non-noise pixels to be identified and blended in parallel. In at least one embodiment, at least one component shown or described with respect to FIG. 54 is used to use one or more neural networks to adjust brightness of one or more pixels of one or more images prior to denoising the one or more images. In at least one embodiment, at least one component shown or described with respect to FIG. 54 is used to perform at least one aspect described with respect to FIGS. 1-33, and/or other systems, methods, or operations described herein.

Figure 55:
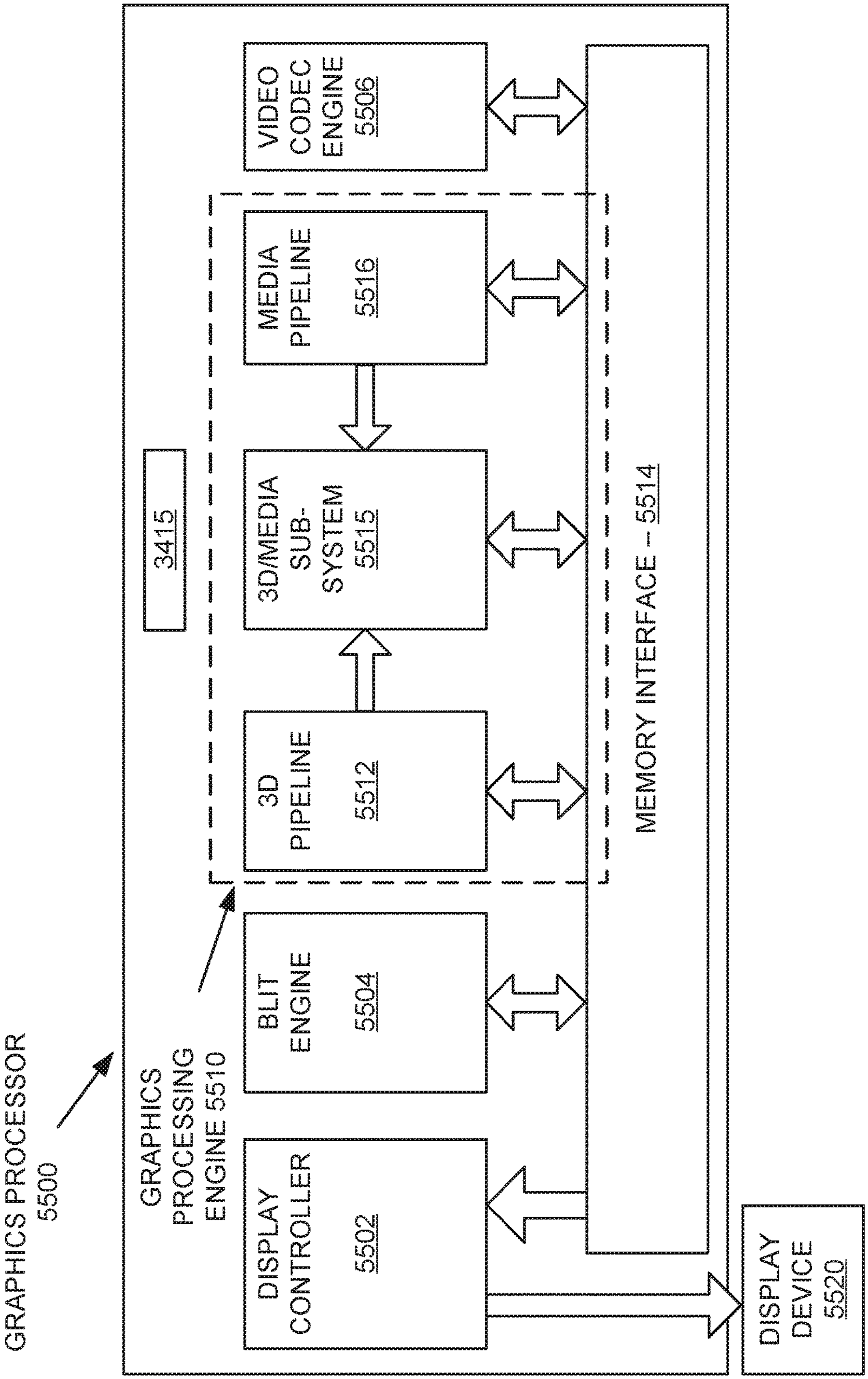
FIG. 55 illustrates a graphics processor, in accordance with at least one embodiment.

FIG. 55 is a block diagram of a graphics processor 5500, which may be a discrete graphics processing unit, or may be a graphics processor integrated with a plurality of processing cores. In at least one embodiment, graphics processor 5500 communicates via a memory mapped I/O interface to registers on graphics processor 5500 and with commands placed into memory. In at least one embodiment, graphics processor 5500 includes a memory interface 5514 to access memory. In at least one embodiment, memory interface 5514 is an interface to local memory, one or more internal caches, one or more shared external caches, and/or to system memory.

In at least one embodiment, graphics processor 5500 also includes a display controller 5502 to drive display output data to a display device 5520. In at least one embodiment, display controller 5502 includes hardware for one or more overlay planes for display device 5520 and composition of multiple layers of video or user interface elements. In at least one embodiment, display device 5520 can be an internal or external display device. In at least one embodiment, display device 5520 is a head mounted display device, such as a virtual reality (VR) display device or an augmented reality (AR) display device. In at least one embodiment, graphics processor 5500 includes a video codec engine 5506 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In at least one embodiment, graphics processor 5500 includes a block image transfer (BLIT) engine 5504 to perform two-dimensional (2D) rasterizer operations including, for example, bit-boundary block transfers. However, in at least one embodiment, 2D graphics operations are performed using one or more components of a graphics processing engine (GPE) 5510. In at least one embodiment, GPE 5510 is a compute engine for performing graphics operations, including three-dimensional (3D) graphics operations and media operations.

In at least one embodiment, GPE 5510 includes a 3D pipeline 5512 for performing 3D operations, such as rendering three-dimensional images and scenes using processing functions that act upon 3D primitive shapes (e.g., rectangle, triangle, etc.). In at least one embodiment, 3D pipeline 5512 includes programmable and fixed function elements that perform various tasks and/or spawn execution threads to a 3D/Media sub-system 5515. While 3D pipeline 5512 can be used to perform media operations, in at least one embodiment, GPE 5510 also includes a media pipeline 5516 that is used to perform media operations, such as video post-processing and image enhancement.

In at least one embodiment, media pipeline 5516 includes fixed function or programmable logic units to perform one or more specialized media operations, such as video decode acceleration, video de-interlacing, and video encode acceleration in place of, or on behalf of, video codec engine 5506. In at least one embodiment, media pipeline 5516 additionally includes a thread spawning unit to spawn threads for execution on 3D/Media sub-system 5515. In at least one embodiment, spawned threads perform computations for media operations on one or more graphics execution units included in 3D/Media sub-system 5515.

In at least one embodiment, 3D/Media subsystem 5515 includes logic for executing threads spawned by 3D pipeline 5512 and media pipeline 5516. In at least one embodiment, 3D pipeline 5512 and media pipeline 5516 send thread execution requests to 3D/Media subsystem 5515, which includes thread dispatch logic for arbitrating and dispatching various requests to available thread execution resources. In at least one embodiment, execution resources include an array of graphics execution units to process 3D and media threads. In at least one embodiment, 3D/Media subsystem 5515 includes one or more internal caches for thread instructions and data. In at least one embodiment, subsystem 5515 also includes shared memory, including registers and addressable memory, to share data between threads and to store output data.

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment portions or all of inference and/or training logic 3415 may be incorporated into graphics processor 5500. For example, in at least one embodiment, training and/or inferencing techniques described herein may use one or more of ALUs embodied in 3D pipeline 5512. Moreover, in at least one embodiment, inferencing and/or training operations described herein may be done using logic other than logic illustrated in FIG. 34A or 34B. In at least one embodiment, weight parameters may be stored in on-chip or off-chip memory and/or registers (shown or not shown) that configure ALUs of graphics processor 5500 to perform one or more machine learning algorithms, neural network architectures, use cases, or training techniques described herein.

In at least one embodiment, at least one component shown or described with respect to FIG. 55 is used to perform techniques and/or functions described in connection with FIGS. 1-33. In at least one embodiment, at least one component shown or described with respect to FIG. 55 is used to cause one or more neural networks to cause one or more non-noise pixels to be identified and blended in parallel. In at least one embodiment, at least one component shown or described with respect to FIG. 55 is used to use one or more neural networks to adjust brightness of one or more pixels of one or more images prior to denoising the one or more images. In at least one embodiment, at least one component shown or described with respect to FIG. 55 is used to perform at least one aspect described with respect to FIGS. 1-33, and/or other systems, methods, or operations described herein.

Figure 56:
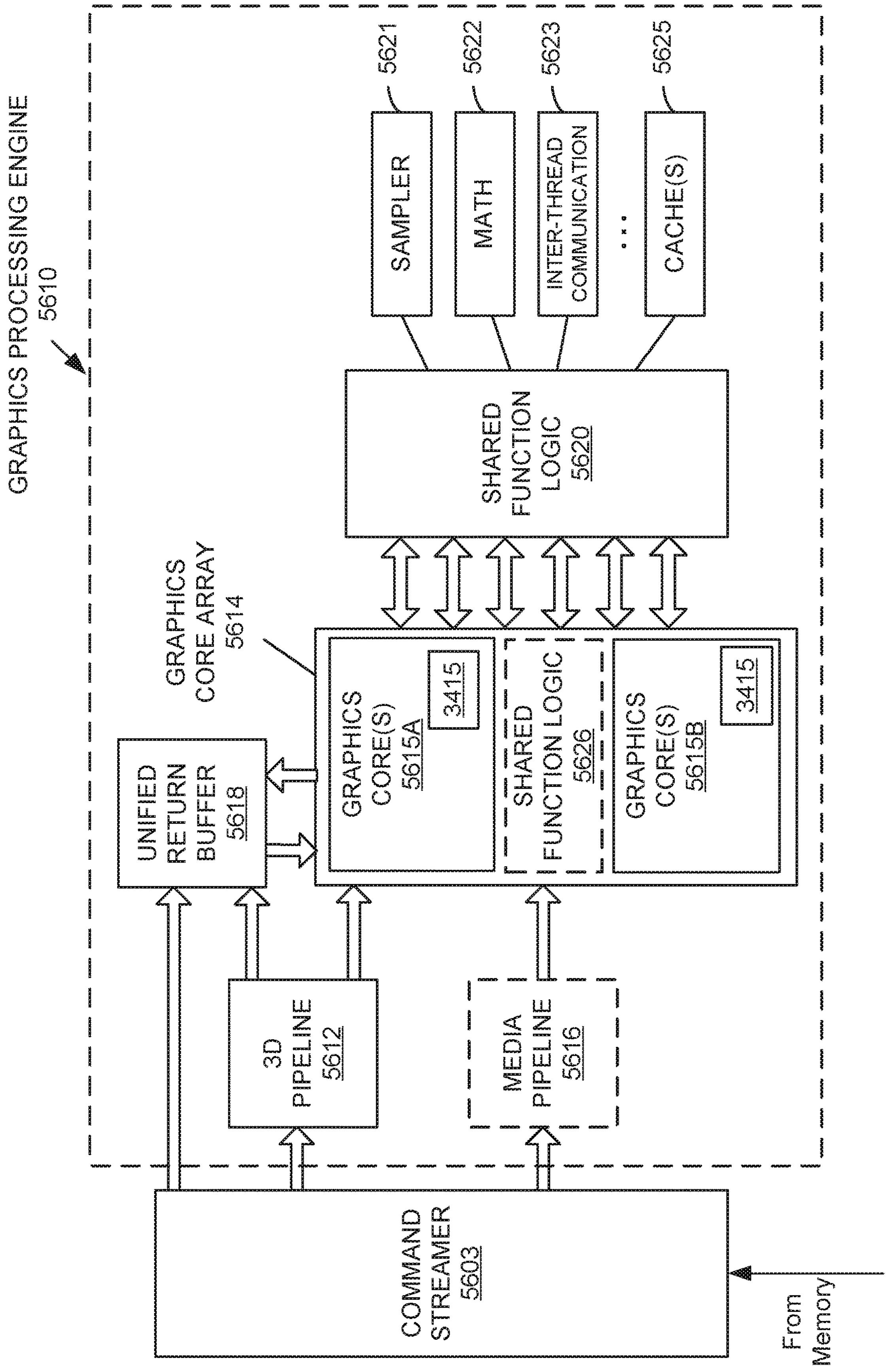
FIG. 56 is a block diagram of a graphics processing engine of a graphics processor, in accordance with at least one embodiment.

FIG. 56 is a block diagram of a graphics processing engine 5610 of a graphics processor, in accordance with at least one embodiment. In at least one embodiment, graphics processing engine (GPE) 5610 is a version of GPE 5510 shown in FIG. 55. In at least one embodiment, a media pipeline 5616 is optional and may not be explicitly included within GPE 5610. In at least one embodiment, a separate media and/or image processor is coupled to GPE 5610.

In at least one embodiment, GPE 5610 is coupled to or includes a command streamer 5603, which provides a command stream to a 3D pipeline 5612 and/or media pipeline 5616. In at least one embodiment, command streamer 5603 is coupled to memory, which can be system memory, or one or more of internal cache memory and shared cache memory. In at least one embodiment, command streamer 5603 receives commands from memory and sends commands to 3D pipeline 5612 and/or media pipeline 5616. In at least one embodiment, commands are instructions, primitives, or micro-operations fetched from a ring buffer, which stores commands for 3D pipeline 5612 and media pipeline 5616. In at least one embodiment, a ring buffer can additionally include batch command buffers storing batches of multiple commands. In at least one embodiment, commands for 3D pipeline 5612 can also include references to data stored in memory, such as, but not limited to, vertex and geometry data for 3D pipeline 5612 and/or image data and memory objects for media pipeline 5616. In at least one embodiment, 3D pipeline 5612 and media pipeline 5616 process commands and data by performing operations or by dispatching one or more execution threads to a graphics core array 5614. In at least one embodiment, graphics core array 5614 includes one or more blocks of graphics cores (e.g., graphics core(s) 5615A, graphics core(s) 5615B), each block including one or more graphics cores. In at least one embodiment, each graphics core includes a set of graphics execution resources that includes general-purpose and graphics specific execution logic to perform graphics and compute operations, as well as fixed function texture processing and/or machine learning and artificial intelligence acceleration logic, including inference and/or training logic 3415 in FIG. 34A and FIG. 34B.

In at least one embodiment, 3D pipeline 5612 includes fixed function and programmable logic to process one or more shader programs, such as vertex shaders, geometry shaders, pixel shaders, fragment shaders, compute shaders, or other shader programs, by processing instructions and dispatching execution threads to graphics core array 5614. In at least one embodiment, graphics core array 5614 provides a unified block of execution resources for use in processing shader programs. In at least one embodiment, a multi-purpose execution logic (e.g., execution units) within graphics core(s) 5615A-5615B of graphic core array 5614 includes support for various 3D API shader languages and can execute multiple simultaneous execution threads associated with multiple shaders.

In at least one embodiment, graphics core array 5614 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on graphics core array 5614 can output data to memory in a unified return buffer (URB) 5618. In at least one embodiment, URB 5618 can store data for multiple threads. In at least one embodiment, URB 5618 may be used to send data between different threads executing on graphics core array 5614. In at least one embodiment, URB 5618 may additionally be used for synchronization between threads on graphics core array 5614 and fixed function logic within shared function logic 5620.

In at least one embodiment, graphics core array 5614 is scalable, such that graphics core array 5614 includes a variable number of graphics cores, each having a variable number of execution units based on a target power and performance level of GPE 5610. In at least one embodiment, execution resources are dynamically scalable, such that execution resources may be enabled or disabled as needed.

In at least one embodiment, graphics core array 5614 is coupled to shared function logic 5620 that includes multiple resources that are shared between graphics cores in graphics core array 5614. In at least one embodiment, shared functions performed by shared function logic 5620 are embodied in hardware logic units that provide specialized supplemental functionality to graphics core array 5614. In at least one embodiment, shared function logic 5620 includes but is not limited to a sampler unit 5621, a math unit 5622, and inter-thread communication (ITC) logic 5623. In at least one embodiment, one or more cache(s) 5625 are included in, or coupled to, shared function logic 5620.

In at least one embodiment, a shared function is used if demand for a specialized function is insufficient for inclusion within graphics core array 5614. In at least one embodiment, a single instantiation of a specialized function is used in shared function logic 5620 and shared among other execution resources within graphics core array 5614. In at least one embodiment, specific shared functions within shared function logic 5620 that are used extensively by graphics core array 5614 may be included within shared function logic 5626 within graphics core array 5614. In at least one embodiment, shared function logic 5626 within graphics core array 5614 can include some or all logic within shared function logic 5620. In at least one embodiment, all logic elements within shared function logic 5620 may be duplicated within shared function logic 5626 of graphics core array 5614. In at least one embodiment, shared function logic 5620 is excluded in favor of shared function logic 5626 within graphics core array 5614.

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment portions or all of inference and/or training logic 3415 may be incorporated into graphics processor 5610. For example, in at least one embodiment, training and/or inferencing techniques described herein may use one or more of ALUs embodied in 3D pipeline 5612, graphics core(s) 5615, shared function logic 5626, shared function logic 5620, or other logic in FIG. 56. Moreover, in at least one embodiment, inferencing and/or training operations described herein may be done using logic other than logic illustrated in FIG. 34A or 34B. In at least one embodiment, weight parameters may be stored in on-chip or off-chip memory and/or registers (shown or not shown) that configure ALUs of graphics processor 5610 to perform one or more machine learning algorithms, neural network architectures, use cases, or training techniques described herein.

In at least one embodiment, at least one component shown or described with respect to FIG. 56 is used to perform techniques and/or functions described in connection with FIGS. 1-33. In at least one embodiment, at least one component shown or described with respect to FIG. 56 is used to cause one or more neural networks to cause one or more non-noise pixels to be identified and blended in parallel. In at least one embodiment, at least one component shown or described with respect to FIG. 56 is used to use one or more neural networks to adjust brightness of one or more pixels of one or more images prior to denoising the one or more images. In at least one embodiment, at least one component shown or described with respect to FIG. 56 is used to perform at least one aspect described with respect to FIGS. 1-33, and/or other systems, methods, or operations described herein.

Figure 57:
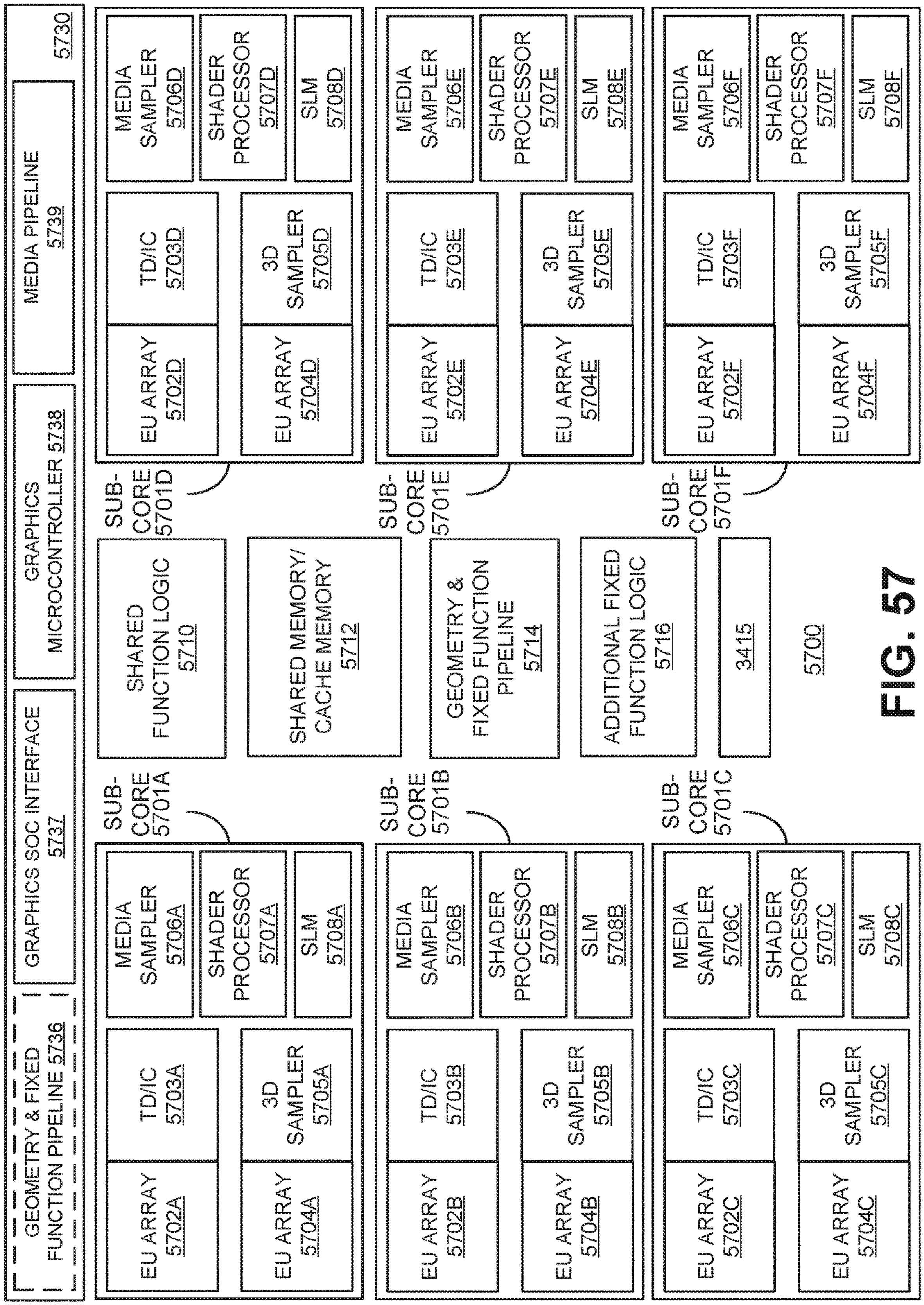
FIG. 57 is a block diagram of at least portions of a graphics processor core, in accordance with at least one embodiment.
Figure 58:
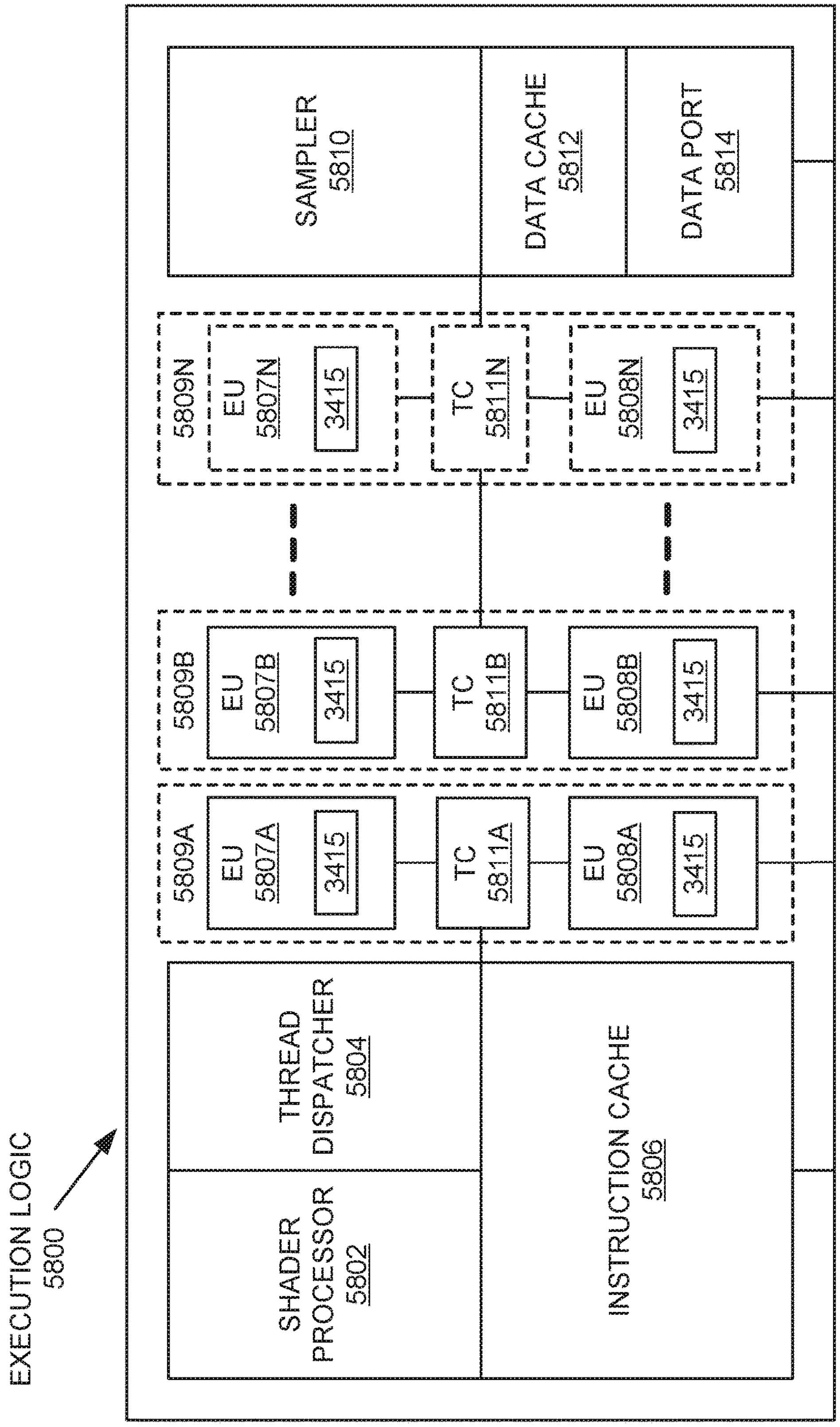
FIGS. 58A and 58B illustrate thread execution logic including an array of processing elements of a graphics processor core, in accordance with at least one embodiment.
Figure 58:
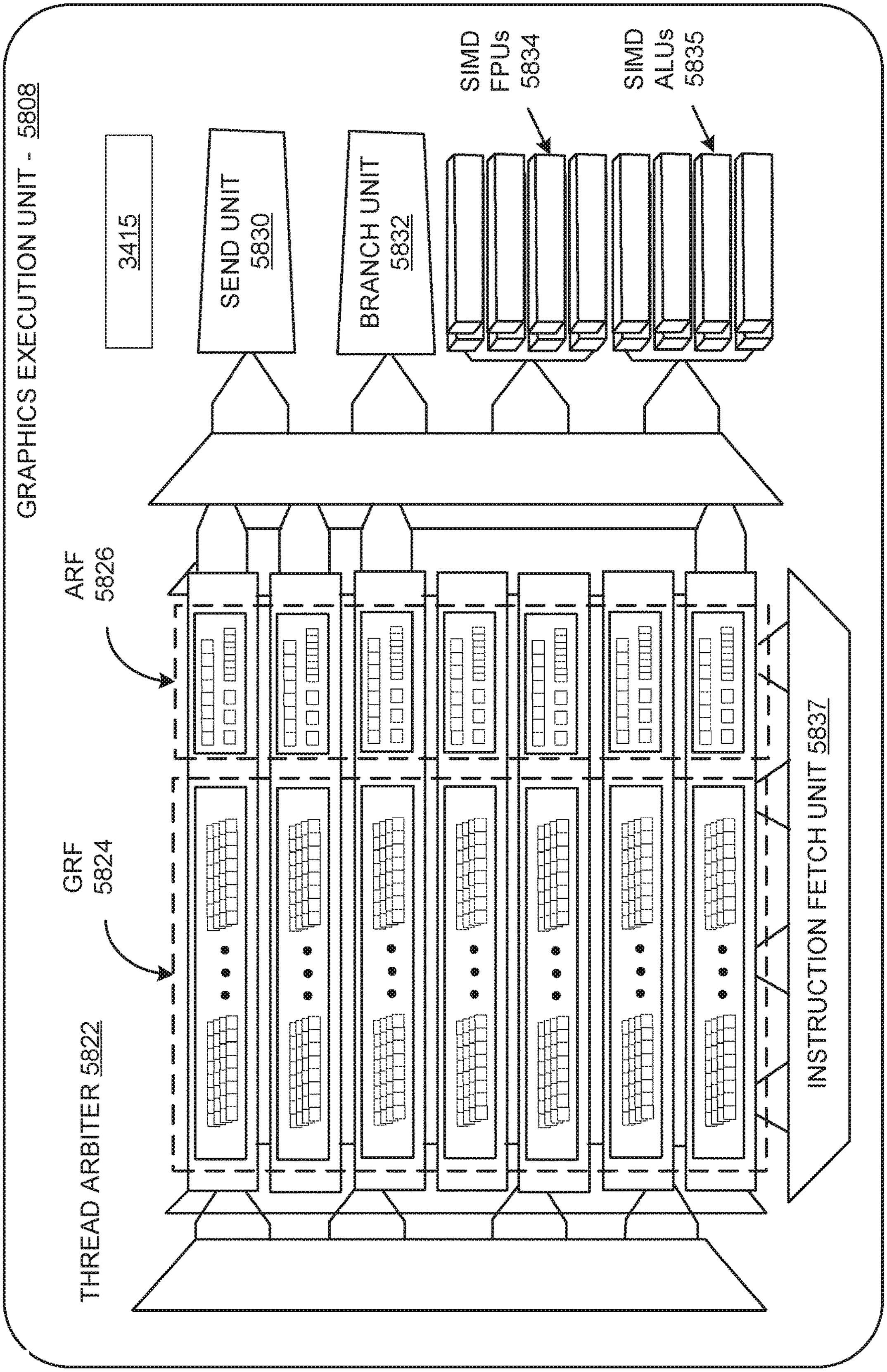

FIG. 57 is a block diagram of hardware logic of a graphics processor core 5700, in accordance with at least one embodiment. In at least one embodiment, graphics processor core 5700 is included within a graphics core array. In at least one embodiment, graphics processor core 5700, sometimes referred to as a core slice, can be one or multiple graphics cores within a modular graphics processor. In at least one embodiment, graphics processor core 5700 is exemplary of one graphics core slice, and a graphics processor as described herein may include multiple graphics core slices based on target power and performance envelopes. In at least one embodiment, each graphics core 5700 can include a fixed function block 5730 coupled with multiple sub-cores 5701A-5701F, also referred to as sub-slices, that include modular blocks of general-purpose and fixed function logic.

In at least one embodiment, fixed function block 5730 includes a geometry and fixed function pipeline 5736 that can be shared by all sub-cores in graphics processor 5700, for example, in lower performance and/or lower power graphics processor implementations. In at least one embodiment, geometry and fixed function pipeline 5736 includes a 3D fixed function pipeline, a video front-end unit, a thread spawner and thread dispatcher, and a unified return buffer manager, which manages unified return buffers.

In at least one embodiment, fixed function block 5730 also includes a graphics SoC interface 5737, a graphics microcontroller 5738, and a media pipeline 5739. In at least one embodiment, graphics SoC interface 5737 provides an interface between graphics core 5700 and other processor cores within a system on a chip integrated circuit. In at least one embodiment, graphics microcontroller 5738 is a programmable sub-processor that is configurable to manage various functions of graphics processor 5700, including thread dispatch, scheduling, and preemption. In at least one embodiment, media pipeline 5739 includes logic to facilitate decoding, encoding, pre-processing, and/or post-processing of multimedia data, including image and video data. In at least one embodiment, media pipeline 5739 implements media operations via requests to compute or sampling logic within sub-cores 5701A-5701F.

In at least one embodiment, SoC interface 5737 enables graphics core 5700 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 5737 can also enable communication with fixed function devices within an SoC, such as camera imaging pipelines, and enables use of and/or implements global memory atomics that may be shared between graphics core 5700 and CPUs within an SoC. In at least one embodiment, graphics SoC interface 5737 can also implement power management controls for graphics processor core 5700 and enable an interface between a clock domain of graphics processor core 5700 and other clock domains within an SoC. In at least one embodiment, SoC interface 5737 enables receipt of command buffers from a command streamer and global thread dispatcher that are configured to provide commands and instructions to each of one or more graphics cores within a graphics processor. In at least one embodiment, commands and instructions can be dispatched to media pipeline 5739, when media operations are to be performed, or a geometry and fixed function pipeline (e.g., geometry and fixed function pipeline 5736, and/or a geometry and fixed function pipeline 5714) when graphics processing operations are to be performed.

In at least one embodiment, graphics microcontroller 5738 can be configured to perform various scheduling and management tasks for graphics core 5700. In at least one embodiment, graphics microcontroller 5738 can perform graphics and/or compute workload scheduling on various graphics parallel engines within execution unit (EU) arrays 5702A-5702F, 5704A-5704F within sub-cores 5701A-5701F. In at least one embodiment, host software executing on a CPU core of an SoC including graphics core 5700 can submit workloads to one of multiple graphic processor paths, which invokes a scheduling operation on an appropriate graphics engine. In at least one embodiment, scheduling operations include determining which workload to run next, submitting a workload to a command streamer, preempting existing workloads running on an engine, monitoring progress of a workload, and notifying host software when a workload is complete. In at least one embodiment, graphics microcontroller 5738 can also facilitate low-power or idle states for graphics core 5700, providing graphics core 5700 with an ability to save and restore registers within graphics core 5700 across low-power state transitions independently from an operating system and/or graphics driver software on a system.

In at least one embodiment, graphics core 5700 may have greater than or fewer than illustrated sub-cores 5701A-5701F, up to N modular sub-cores. For each set of N sub-cores, in at least one embodiment, graphics core 5700 can also include shared function logic 5710, shared and/or cache memory 5712, geometry/fixed function pipeline 5714, as well as additional fixed function logic 5716 to accelerate various graphics and compute processing operations. In at least one embodiment, shared function logic 5710 can include logic units (e.g., sampler, math, and/or inter-thread communication logic) that can be shared by each N sub-cores within graphics core 5700. In at least one embodiment, shared and/or cache memory 5712 can be a last-level cache for N sub-cores 5701A-5701F within graphics core 5700 and can also serve as shared memory that is accessible by multiple sub-cores. In at least one embodiment, geometry/fixed function pipeline 5714 can be included instead of geometry/fixed function pipeline 5736 within fixed function block 5730 and can include similar logic units.

In at least one embodiment, graphics core 5700 includes additional fixed function logic 5716 that can include various fixed function acceleration logic for use by graphics core 5700. In at least one embodiment, additional fixed function logic 5716 includes an additional geometry pipeline for use in position-only shading. In position-only shading, at least two geometry pipelines exist, whereas in a full geometry pipeline within geometry and fixed function pipelines 5714, 5736, and a cull pipeline, which is an additional geometry pipeline that may be included within additional fixed function logic 5716. In at least one embodiment, a cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 5716 can execute position shaders in parallel with a main application and generally generates critical results faster than a full pipeline, as a cull pipeline fetches and shades position attributes of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 5716 can also include machine-learning acceleration logic, such as fixed function matrix multiplication logic, for implementations including optimizations for machine learning training or inferencing.

In at least one embodiment, within each graphics sub-core 5701A-5701F includes a set of execution resources that may be used to perform graphics, media, and compute operations in response to requests by graphics pipeline, media pipeline, or shader programs. In at least one embodiment, graphics sub-cores 5701A-5701F include multiple EU arrays 5702A-5702F, 5704A-5704F, thread dispatch and inter-thread communication (TD/IC) logic 5703A-5703F, a 3D (e.g., texture) sampler 5705A-5705F, a media sampler 5706A-5706F, a shader processor 5707A-5707F, and shared local memory (SLM) 5708A-5708F. In at least one embodiment, EU arrays 5702A-5702F, 5704A-5704F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 5703A-5703F performs local thread dispatch and thread control operations for execution units within a sub-core and facilitates communication between threads executing on execution units of a sub-core. In at least one embodiment, 3D samplers 5705A-5705F can read texture or other 3D graphics related data into memory. In at least one embodiment, 3D samplers can read texture data differently based on a configured sample state and texture format associated with a given texture. In at least one embodiment, media samplers 5706A-5706F can perform similar read operations based on a type and format associated with media data. In at least one embodiment, each graphics sub-core 5701A-5701F can alternately include a unified 3D and media sampler. In at least one embodiment, threads executing on execution units within each of sub-cores 5701A-5701F can make use of shared local memory 5708A-5708F within each sub-core, to enable threads executing within a thread group to execute using a common pool of on-chip memory.

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment, portions or all of inference and/or training logic 3415 may be incorporated into graphics processor 5700. For example, in at least one embodiment, training and/or inferencing techniques described herein may use one or more of ALUs embodied in a 3D pipeline, graphics microcontroller 5738, geometry and fixed function pipeline 5714 and 5736, or other logic in FIG. 57. Moreover, in at least one embodiment, inferencing and/or training operations described herein may be done using logic other than logic illustrated in FIG. 34A or 34B. In at least one embodiment, weight parameters may be stored in on-chip or off-chip memory and/or registers (shown or not shown) that configure ALUs of graphics processor 5700 to perform one or more machine learning algorithms, neural network architectures, use cases, or training techniques described herein.

In at least one embodiment, at least one component shown or described with respect to FIG. 57 is used to perform techniques and/or functions described in connection with FIGS. 1-33. In at least one embodiment, at least one component shown or described with respect to FIG. 57 is used to cause one or more neural networks to cause one or more non-noise pixels to be identified and blended in parallel. In at least one embodiment, at least one component shown or described with respect to FIG. 57 is used to use one or more neural networks to adjust brightness of one or more pixels of one or more images prior to denoising the one or more images. In at least one embodiment, at least one component shown or described with respect to FIG. 57 is used to perform at least one aspect described with respect to FIGS. 1-33, and/or other systems, methods, or operations described herein.

FIGS. 58A and 58B illustrate thread execution logic 5800 including an array of processing elements of a graphics processor core, in accordance with at least one embodiment. FIG. 58A illustrates at least one embodiment, in which thread execution logic 5800 is used. FIG. 58B illustrates exemplary internal details of a graphics execution unit 5808, according to at least one embodiment.

As illustrated in FIG. 58A, in at least one embodiment, thread execution logic 5800 includes a shader processor 5802, a thread dispatcher 5804, an instruction cache 5806, a scalable execution unit array including a plurality of execution units 5807A-5807N and 5808A-5808N, a sampler 5810, a data cache 5812, and a data port 5814. In at least one embodiment, a scalable execution unit array can dynamically scale by enabling or disabling one or more execution units (e.g., any of execution unit 5808A-N or 5807A-N) based on computational requirements of a workload, for example. In at least one embodiment, scalable execution units are interconnected via an interconnect fabric that links to each execution unit. In at least one embodiment, thread execution logic 5800 includes one or more connections to memory, such as system memory or cache memory, through one or more of instruction cache 5806, data port 5814, sampler 5810, and execution units 5807 or 5808. In at least one embodiment, each execution unit (e.g., 5807A) is a stand-alone programmable general-purpose computational unit that is capable of executing multiple simultaneous hardware threads while processing multiple data elements in parallel for each thread. In at least one embodiment, array of execution units 5807 and/or 5808 is scalable to include any number individual execution units.

In at least one embodiment, execution units 5807 and/or 5808 are primarily used to execute shader programs. In at least one embodiment, shader processor 5802 can process various shader programs and dispatch execution threads associated with shader programs via a thread dispatcher 5804. In at least one embodiment, thread dispatcher 5804 includes logic to arbitrate thread initiation requests from graphics and media pipelines and instantiate requested threads on one or more execution units in execution units 5807 and/or 5808. For example, in at least one embodiment, a geometry pipeline can dispatch vertex, tessellation, or geometry shaders to thread execution logic for processing. In at least one embodiment, thread dispatcher 5804 can also process runtime thread spawning requests from executing shader programs.

In at least one embodiment, execution units 5807 and/or 5808 support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, and/or vertex shaders), pixel processing (e.g., pixel shaders, fragment shaders) and general-purpose processing (e.g., compute and media shaders). In at least one embodiment, each of execution units 5807 and/or 5808, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 5807 and/or 5808 causes a waiting thread to sleep until requested data has been returned. In at least one embodiment, while an awaiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 5807 and/or 5808 operates on arrays of data elements. In at least one embodiment, a number of data elements is an "execution size," or number of channels for an instruction. In at least one embodiment, an execution channel is a logical unit of execution for data element access, masking, and flow control within instructions. In at least one embodiment, a number of channels may be independent of a number of physical arithmetic logic units (ALUs) or floating point units (FPUs) for a particular graphics processor. In at least one embodiment, execution units 5807 and/or 5808 support integer and floating-point data types.

In at least one embodiment, an execution unit instruction set includes SIMD instructions. In at least one embodiment, various data elements can be stored as a packed data type in a register and execution unit will process various elements based on data size of elements. For example, in at least one embodiment, when operating on a 256-bit wide vector, 256 bits of a vector are stored in a register and an execution unit operates on a vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 5809A-5809N having thread control logic (5811A-5811N) that is common to fused EUs such as execution unit 5807A fused with execution unit 5808A into fused execution unit 5809A. In at least one embodiment, multiple EUs can be fused into an EU group. In at least one embodiment, each EU in a fused EU group can be configured to execute a separate SIMD hardware thread, with a number of EUs in a fused EU group possibly varying according to various embodiments. In at least one embodiment, various SIMD widths can be performed per-EU, including but not limited to SIMD8, SIMD16, and SIMD32. In at least one embodiment, each fused graphics execution unit 5809A-5809N includes at least two execution units. For example, in at least one embodiment, fused execution unit 5809A includes a first EU 5807A, second EU 5808A, and thread control logic 5811A that is common to first EU 5807A and second EU 5808A. In at least one embodiment, thread control logic 5811A controls threads executed on fused graphics execution unit 5809A, allowing each EU within fused execution units 5809A-5809N to execute using a common instruction pointer register.

In at least one embodiment, one or more internal instruction caches (e.g., 5806) are included in thread execution logic 5800 to cache thread instructions for execution units. In at least one embodiment, one or more data caches (e.g., 5812) are included to cache thread data during thread execution. In at least one embodiment, sampler 5810 is included to provide texture sampling for 3D operations and media sampling for media operations. In at least one embodiment, sampler 5810 includes specialized texture or media sampling functionality to process texture or media data during sampling process before providing sampled data to an execution unit.

During execution, in at least one embodiment, graphics and media pipelines send thread initiation requests to thread execution logic 5800 via thread spawning and dispatch logic. In at least one embodiment, once a group of geometric objects has been processed and rasterized into pixel data, pixel processor logic (e.g., pixel shader logic, fragment shader logic, etc.) within shader processor 5802 is invoked to further compute output information and cause results to be written to output surfaces (e.g., color buffers, depth buffers, stencil buffers, etc.). In at least one embodiment, a pixel shader or a fragment shader calculates values of various vertex attributes that are to be interpolated across a rasterized object. In at least one embodiment, pixel processor logic within shader processor 5802 then executes an application programming interface (API)-supplied pixel or fragment shader program. In at least one embodiment, to execute a shader program, shader processor 5802 dispatches threads to an execution unit (e.g., 5808A) via thread dispatcher 5804. In at least one embodiment, shader processor 5802 uses texture sampling logic in sampler 5810 to access texture data in texture maps stored in memory. In at least one embodiment, arithmetic operations on texture data and input geometry data compute pixel color data for each geometric fragment, or discards one or more pixels from further processing.

In at least one embodiment, data port 5814 provides a memory access mechanism for thread execution logic 5800 to output processed data to memory for further processing on a graphics processor output pipeline. In at least one embodiment, data port 5814 includes or couples to one or more cache memories (e.g., data cache 5812) to cache data for memory access via a data port.

As illustrated in FIG. 58B, in at least one embodiment, a graphics execution unit 5808 can include an instruction fetch unit 5837, a general register file array (GRF) 5824, an architectural register file array (ARF) 5826, a thread arbiter 5822, a send unit 5830, a branch unit 5832, a set of SIMD floating point units (FPUs) 5834, and a set of dedicated integer SIMD ALUs 5835. In at least one embodiment, GRF 5824 and ARF 5826 includes a set of general register files and architecture register files associated with each simultaneous hardware thread that may be active in graphics execution unit 5808. In at least one embodiment, per thread architectural state is maintained in ARF 5826, while data used during thread execution is stored in GRF 5824. In at least one embodiment, execution state of each thread, including instruction pointers for each thread, can be held in thread-specific registers in ARF 5826.

In at least one embodiment, graphics execution unit 5808 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 5808 can co-issue multiple instructions, which may each be different instructions. In at least one embodiment, thread arbiter 5822 of graphics execution unit thread 5808 can dispatch instructions to one of send unit 5830, branch unit 5832, or SIMD FPU(s) 5834 for execution. In at least one embodiment, each execution thread can access 128 general-purpose registers within GRF 5824, where each register can store 32 bytes, accessible as a SIMD 8-element vector of 32-bit data elements. In at least one embodiment, each execution unit thread has access to 4 kilobytes within GRF 5824, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 4 kilobytes, GRF 5824 can store a total of 28 kilobytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing to send unit 5830. In at least one embodiment, branch instructions are dispatched to branch unit 5832 to facilitate SIMD divergence and eventual convergence.

In at least one embodiment, graphics execution unit 5808 includes one or more SIMD floating point units (FPU(s)) 5834 to perform floating-point operations. In at least one embodiment, FPU(s) 5834 also support integer computation. In at least one embodiment, FPU(s) 5834 can SIMD execute up to M number of 32-bit floating-point (or integer) operations, or SIMD execute up to 2M 16-bit integer or 16-bit floating-point operations. In at least one embodiment, at least one FPU provides extended math capability to support high-throughput transcendental math functions and double precision 64-bit floating-point. In at least one embodiment, a set of 8-bit integer SIMD ALUs 5835 are also present, and may be specifically optimized to perform operations associated with machine learning computations.

In at least one embodiment, arrays of multiple instances of graphics execution unit 5808 can be instantiated in a graphics sub-core grouping (e.g., a sub-slice). In at least one embodiment, execution unit 5808 can execute instructions across a plurality of execution channels. In at least one embodiment, each thread executed on graphics execution unit 5808 is executed on a different channel.

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment, portions or all of inference and/or training logic 3415 may be incorporated into thread execution logic 5800. Moreover, in at least one embodiment, inferencing and/or training operations described herein may be done using logic other than logic illustrated in FIG. 34A or 34B. In at least one embodiment, weight parameters may be stored in on-chip or off-chip memory and/or registers (shown or not shown) that configure ALUs thread of execution logic 5800 to perform one or more machine learning algorithms, neural network architectures, use cases, or training techniques described herein.

In at least one embodiment, at least one component shown or described with respect to FIGS. 58A and 58B is used to perform techniques and/or functions described in connection with FIGS. 1-33. In at least one embodiment, at least one component shown or described with respect to FIGS. 58A and 58B is used to cause one or more neural networks to cause one or more non-noise pixels to be identified and blended in parallel. In at least one embodiment, at least one component shown or described with respect to FIGS. 58A and 58B is used to use one or more neural networks to adjust brightness of one or more pixels of one or more images prior to denoising the one or more images. In at least one embodiment, at least one component shown or described with respect to FIGS. 58A and 58B is used to perform at least one aspect described with respect to FIGS. 1-33, and/or other systems, methods, or operations described herein.

Figure 59:
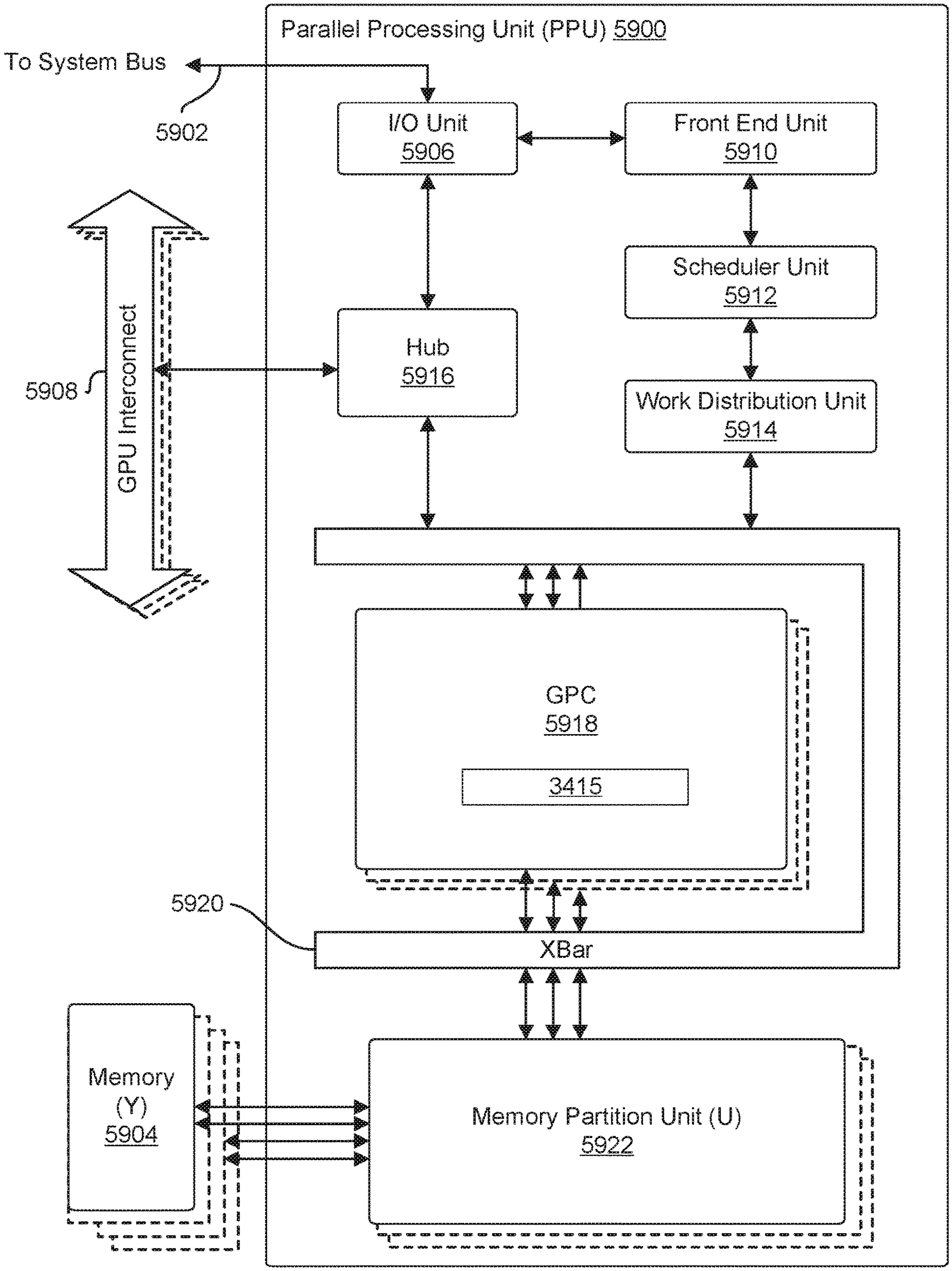
FIG. 59 illustrates a parallel processing unit ("PPU"), in accordance with at least one embodiment.

FIG. 59 illustrates a parallel processing unit ("PPU") 5900, in accordance with at least one embodiment. In at least one embodiment, PPU 5900 is configured with machine-readable code that, if executed by PPU 5900, causes PPU 5900 to perform some or all of processes and techniques described throughout this disclosure. In at least one embodiment, PPU 5900 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 5900. In at least one embodiment, PPU 5900 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 5900 is utilized to perform computations such as linear algebra operations and machine-learning operations. FIG. 59 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 5900 are configured to accelerate High Performance Computing ("HPC"), data center, and machine learning applications. In at least one embodiment, PPU 5900 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 5900 includes, without limitation, an Input/Output ("I/O") unit 5906, a front-end unit 5910, a scheduler unit 5912, a work distribution unit 5914, a hub 5916, a crossbar ("XBar") 5920, one or more general processing clusters ("GPCs") 5918, and one or more partition units ("memory partition units") 5922. In at least one embodiment, PPU 5900 is connected to a host processor or other PPUs 5900 via one or more high-speed GPU interconnects ("GPU interconnects") 5908. In at least one embodiment, PPU 5900 is connected to a host processor or other peripheral devices via a system bus 5902. In at least one embodiment, PPU 5900 is connected to a local memory comprising one or more memory devices ("memory") 5904. In at least one embodiment, memory devices 5904 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 5908 may refer to a wire-based multi-lane communications link that is used by systems to scale and include one or more PPUs 5900 combined with one or more central processing units ("CPUs"), supports cache coherence between PPUs 5900 and CPUs, and CPU mastering. In at least one embodiment, data and/or commands are transmitted by high-speed GPU interconnect 5908 through hub 5916 to/from other units of PPU 5900 such as one or more copy engines, video encoders, video decoders, power management units, and other components which may not be explicitly illustrated in FIG. 59.

In at least one embodiment, I/O unit 5906 is configured to transmit and receive communications (e.g., commands, data) from a host processor (not illustrated in FIG. 59) over system bus 5902. In at least one embodiment, I/O unit 5906 communicates with host processor directly via system bus 5902 or through one or more intermediate devices such as a memory bridge. In at least one embodiment, I/O unit 5906 may communicate with one or more other processors, such as one or more of PPUs 5900 via system bus 5902. In at least one embodiment, I/O unit 5906 implements a Peripheral Component Interconnect Express ("PCIe") interface for communications over a PCIe bus. In at least one embodiment, I/O unit 5906 implements interfaces for communicating with external devices.

In at least one embodiment, I/O unit 5906 decodes packets received via system bus 5902. In at least one embodiment, at least some packets represent commands configured to cause PPU 5900 to perform various operations. In at least one embodiment, I/O unit 5906 transmits decoded commands to various other units of PPU 5900 as specified by commands. In at least one embodiment, commands are transmitted to front-end unit 5910 and/or transmitted to hub 5916 or other units of PPU 5900 such as one or more copy engines, a video encoder, a video decoder, a power management unit, etc. (not explicitly illustrated in FIG. 59). In at least one embodiment, I/O unit 5906 is configured to route communications between and among various logical units of PPU 5900.

In at least one embodiment, a program executed by host processor encodes a command stream in a buffer that provides workloads to PPU 5900 for processing. In at least one embodiment, a workload comprises instructions and data to be processed by those instructions. In at least one embodiment, a buffer is a region in a memory that is accessible (e.g., read/write) by both a host processor and PPU 5900—a host interface unit may be configured to access that buffer in a system memory connected to system bus 5902 via memory requests transmitted over system bus 5902 by I/O unit 5906. In at least one embodiment, a host processor writes a command stream to a buffer and then transmits a pointer to a start of a command stream to PPU 5900 such that front-end unit 5910 receives pointers to one or more command streams and manages one or more command streams, reading commands from command streams and forwarding commands to various units of PPU 5900.

In at least one embodiment, front-end unit 5910 is coupled to scheduler unit 5912 that configures various GPCs 5918 to process tasks defined by one or more command streams. In at least one embodiment, scheduler unit 5912 is configured to track state information related to various tasks managed by scheduler unit 5912 where state information may indicate which of GPCs 5918 a task is assigned to, whether task is active or inactive, a priority level associated with task, and so forth. In at least one embodiment, scheduler unit 5912 manages execution of a plurality of tasks on one or more of GPCs 5918.

In at least one embodiment, scheduler unit 5912 is coupled to work distribution unit 5914 that is configured to dispatch tasks for execution on GPCs 5918. In at least one embodiment, work distribution unit 5914 tracks a number of scheduled tasks received from scheduler unit 5912 and work distribution unit 5914 manages a pending task pool and an active task pool for each of GPCs 5918. In at least one embodiment, pending task pool comprises a number of slots (e.g., 32 slots) that contain tasks assigned to be processed by a particular GPC 5918; an active task pool may comprise a number of slots (e.g., 4 slots) for tasks that are actively being processed by GPCs 5918 such that as one of GPCs 5918 completes execution of a task, that task is evicted from that active task pool for GPC 5918 and another task from a pending task pool is selected and scheduled for execution on GPC 5918. In at least one embodiment, if an active task is idle on GPC 5918, such as while waiting for a data dependency to be resolved, then that active task is evicted from GPC 5918 and returned to that pending task pool while another task in that pending task pool is selected and scheduled for execution on GPC 5918.

In at least one embodiment, work distribution unit 5914 communicates with one or more GPCs 5918 via XBar 5920. In at least one embodiment, XBar 5920 is an interconnect network that couples many of units of PPU 5900 to other units of PPU 5900 and can be configured to couple work distribution unit 5914 to a particular GPC 5918. In at least one embodiment, one or more other units of PPU 5900 may also be connected to XBar 5920 via hub 5916.

In at least one embodiment, tasks are managed by scheduler unit 5912 and dispatched to one of GPCs 5918 by work distribution unit 5914. In at least one embodiment, GPC 5918 is configured to process task and generate results. In at least one embodiment, results may be consumed by other tasks within GPC 5918, routed to a different GPC 5918 via XBar 5920, or stored in memory 5904. In at least one embodiment, results can be written to memory 5904 via partition units 5922, which implement a memory interface for reading and writing data to/from memory 5904. In at least one embodiment, results can be transmitted to another PPU 5900 or CPU via high-speed GPU interconnect 5908. In at least one embodiment, PPU 5900 includes, without limitation, a number U of partition units 5922 that is equal to a number of separate and distinct memory devices 5904 coupled to PPU 5900, as described in more detail herein in conjunction with FIG. 61.

In at least one embodiment, a host processor executes a driver kernel that implements an application programming interface ("API") that enables one or more applications executing on a host processor to schedule operations for execution on PPU 5900. In at least one embodiment, multiple compute applications are simultaneously executed by PPU 5900 and PPU 5900 provides isolation, quality of service ("QoS"), and independent address spaces for multiple compute applications. In at least one embodiment, an application generates instructions (e.g., in form of API calls) that cause a driver kernel to generate one or more tasks for execution by PPU 5900 and that driver kernel outputs tasks to one or more streams being processed by PPU 5900. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail in conjunction with FIG. 61.

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment, deep learning application processor is used to train a machine learning model, such as a neural network, to predict or infer information provided to PPU 5900. In at least one embodiment, PPU 5900 is used to infer or predict information based on a trained machine learning model (e.g., neural network) that has been trained by another processor or system or by PPU 5900. In at least one embodiment, PPU 5900 may be used to perform one or more neural network use cases described herein.

In at least one embodiment, at least one component shown or described with respect to FIG. 59 is used to perform techniques and/or functions described in connection with FIGS. 1-33. In at least one embodiment, at least one component shown or described with respect to FIG. 59 is used to cause one or more neural networks to cause one or more non-noise pixels to be identified and blended in parallel. In at least one embodiment, at least one component shown or described with respect to FIG. 59 is used to use one or more neural networks to adjust brightness of one or more pixels of one or more images prior to denoising the one or more images. In at least one embodiment, at least one component shown or described with respect to FIG. 59 is used to perform at least one aspect described with respect to FIGS. 1-33, and/or other systems, methods, or operations described herein.

Figure 60:
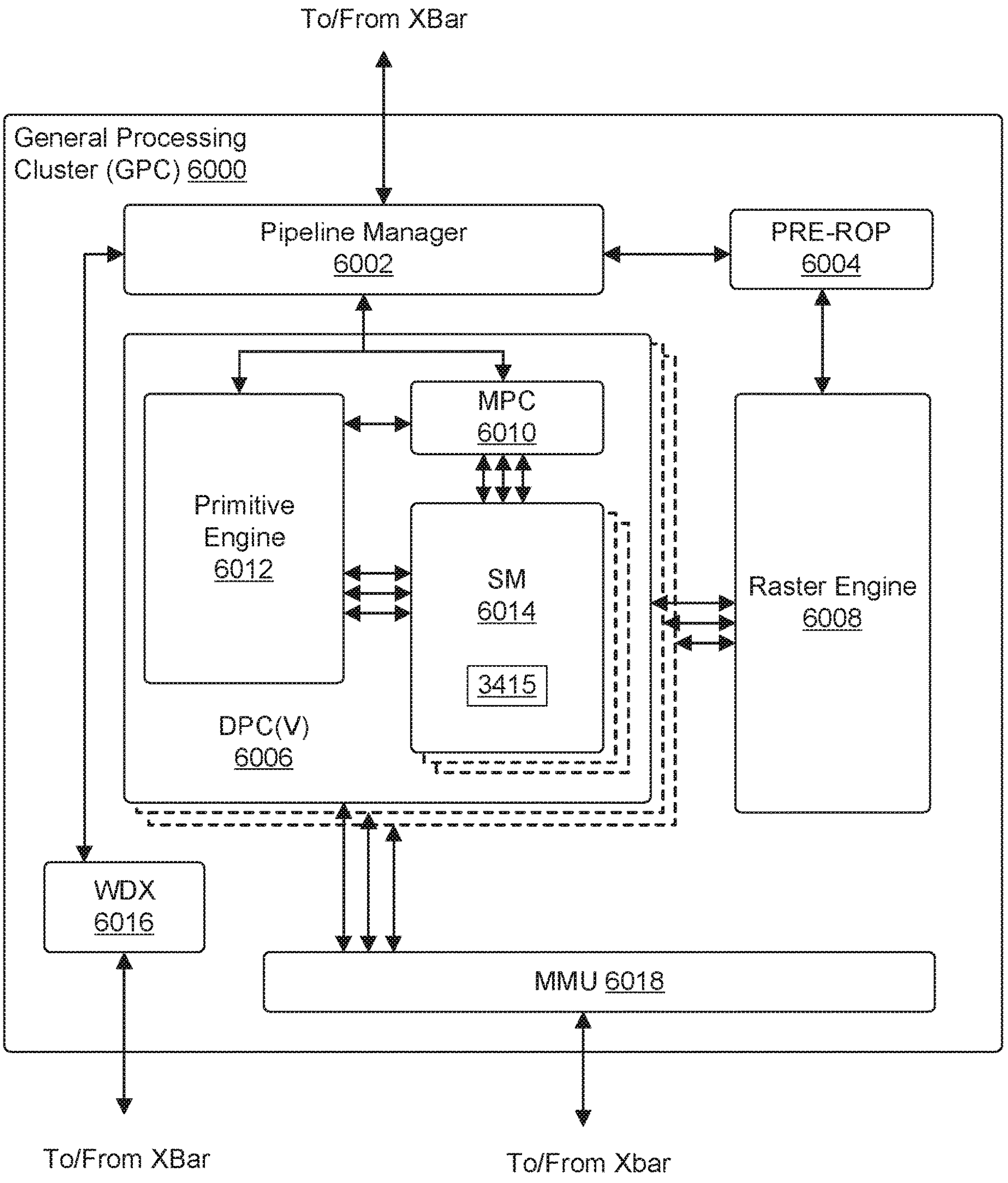
FIG. 60 illustrates a general processing cluster ("GPC"), in accordance with at least one embodiment.

FIG. 60 illustrates a general processing cluster ("GPC") 6000, in accordance with least one embodiment. In at least one embodiment, GPC 6000 is GPC 5918 of FIG. 59. In at least one embodiment, each GPC 6000 includes, without limitation, a number of hardware units for processing tasks and each GPC 6000 includes, without limitation, a pipeline manager 6002, a pre-raster operations unit ("preROP") 6004, a raster engine 6008, a work distribution crossbar ("WDX") 6016, a memory management unit ("MMU") 6018, one or more Data Processing Clusters ("DPCs") 6006, and any suitable combination of parts.

In at least one embodiment, operation of GPC 6000 is controlled by pipeline manager 6002. In at least one embodiment, pipeline manager 6002 manages configuration of one or more DPCs 6006 for processing tasks allocated to GPC 6000. In at least one embodiment, pipeline manager 6002 configures at least one of one or more DPCs 6006 to implement at least a portion of a graphics rendering pipeline. In at least one embodiment, DPC 6006 is configured to execute a vertex shader program on a programmable streaming multi-processor ("SM") 6014. In at least one embodiment, pipeline manager 6002 is configured to route packets received from a work distribution unit to appropriate logical units within GPC 6000, in at least one embodiment, and some packets may be routed to fixed function hardware units in preROP 6004 and/or raster engine 6008 while other packets may be routed to DPCs 6006 for processing by a primitive engine 6012 or SM 6014. In at least one embodiment, pipeline manager 6002 configures at least one of DPCs 6006 to implement a neural network model and/or a computing pipeline.

In at least one embodiment, preROP unit 6004 is configured, in at least one embodiment, to route data generated by raster engine 6008 and DPCs 6006 to a Raster Operations ("ROP") unit in partition unit 5922, described in more detail above in conjunction with FIG. 59. In at least one embodiment, preROP unit 6004 is configured to perform optimizations for color blending, organize pixel data, perform address translations, and more. In at least one embodiment, raster engine 6008 includes, without limitation, a number of fixed function hardware units configured to perform various raster operations, in at least one embodiment, and raster engine 6008 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to a coarse raster engine to generate coverage information (e.g., an x, y coverage mask for a tile) for primitive; output of a coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, an output of raster engine 6008 comprises fragments to be processed by any suitable entity, such as by a fragment shader implemented within DPC 6006.

In at least one embodiment, each DPC 6006 included in GPC 6000 comprises, without limitation, an M-Pipe Controller ("MPC") 6010; primitive engine 6012; one or more SMs 6014; and any suitable combination thereof. In at least one embodiment, MPC 6010 controls operation of DPC 6006, routing packets received from pipeline manager 6002 to appropriate units in DPC 6006. In at least one embodiment, packets associated with a vertex are routed to primitive engine 6012, which is configured to fetch vertex attributes associated with a vertex from memory; in contrast, packets associated with a shader program may be transmitted to SM 6014.

In at least one embodiment, SM 6014 comprises, without limitation, a programmable streaming processor that is configured to process tasks represented by a number of threads. In at least one embodiment, SM 6014 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute a common set of instructions. In at least one embodiment, SM 6014 implements a Single-Instruction, Multiple Thread ("SIMT") architecture wherein each thread in a group of threads is configured to process a different set of data based on that common set of instructions, but where individual threads in a group of threads are allowed to diverge during execution. In at least one embodiment, a program counter, call stack, and execution state is maintained for each warp, enabling concurrency between warps and serial execution within warps when threads within a warp diverge. In another embodiment, a program counter, call stack, and execution state is maintained for each individual thread, enabling equal concurrency between all threads, within and between warps. In at least one embodiment, execution state is maintained for each individual thread and threads executing common instructions may be converged and executed in parallel for better efficiency. At least one embodiment of SM 6014 is described in more detail herein.

In at least one embodiment, MMU 6018 provides an interface between GPC 6000 and a memory partition unit (e.g., partition unit 5922 of FIG. 59) and MMU 6018 provides translation of virtual addresses into physical addresses, memory protection, and arbitration of memory requests. In at least one embodiment, MMU 6018 provides one or more translation lookaside buffers ("TLBs") for performing translation of virtual addresses into physical addresses in memory.

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment, deep learning application processor is used to train a machine learning model, such as a neural network, to predict or infer information provided to GPC 6000. In at least one embodiment, GPC 6000 is used to infer or predict information based on a trained machine learning model (e.g., neural network) that has been trained by another processor or system or by GPC 6000. In at least one embodiment, GPC 6000 may be used to perform one or more neural network use cases described herein.

In at least one embodiment, at least one component shown or described with respect to FIG. 60 is used to perform techniques and/or functions described in connection with FIGS. 1-33. In at least one embodiment, at least one component shown or described with respect to FIG. 60 is used to cause one or more neural networks to cause one or more non-noise pixels to be identified and blended in parallel. In at least one embodiment, at least one component shown or described with respect to FIG. 60 is used to use one or more neural networks to adjust brightness of one or more pixels of one or more images prior to denoising the one or more images. In at least one embodiment, at least one component shown or described with respect to FIG. 60 is used to perform at least one aspect described with respect to FIGS. 1-33, and/or other systems, methods, or operations described herein.

Figure 61:
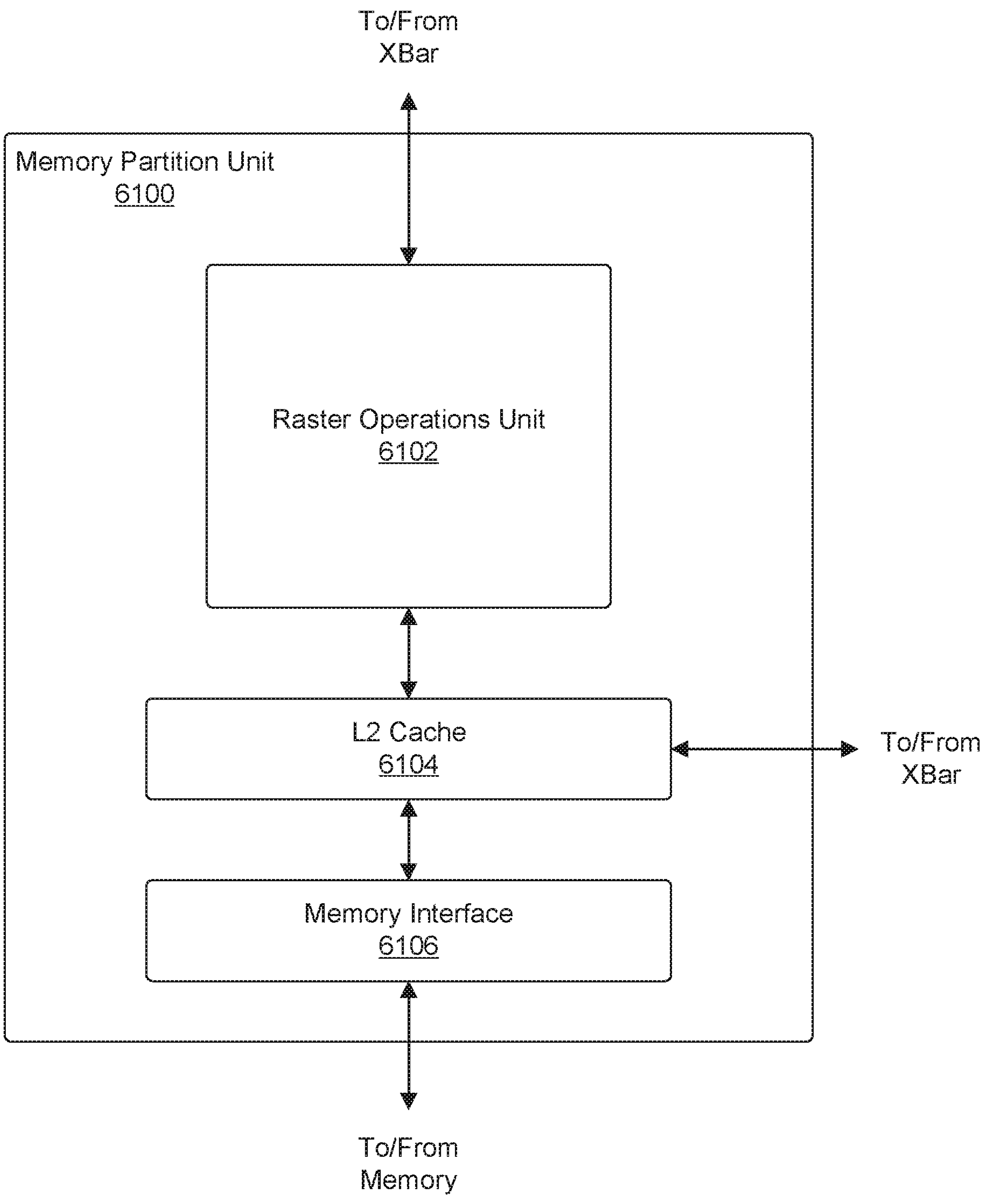
FIG. 61 illustrates a memory partition unit of a parallel processing unit ("PPU"), in accordance with at least one embodiment.

FIG. 61 illustrates a memory partition unit 6100 of a parallel processing unit ("PPU"), in accordance with at least one embodiment. In at least one embodiment, memory partition unit 6100 includes, without limitation, a Raster Operations ("ROP") unit 6102, a level two ("L2") cache 6104, a memory interface 6106, and any suitable combination thereof. In at least one embodiment, memory interface 6106 is coupled to memory. In at least one embodiment, memory interface 6106 may implement 32, 64, 128, 1024-bit data buses, or like, for high-speed data transfer. In at least one embodiment, PPU incorporates U memory interfaces 6106 where U is a positive integer, with one memory interface 6106 per pair of partition units 6100, where each pair of partition units 6100 is connected to a corresponding memory device. For example, in at least one embodiment, PPU may be connected to up to Y memory devices, such as high bandwidth memory stacks or graphics double-data-rate, version 5, synchronous dynamic random access memory ("GDDR5 SDRAM").

In at least one embodiment, memory interface 6106 implements a high bandwidth memory second generation ("HBM2") memory interface and Y equals half of U. In at least one embodiment, HBM2 memory stacks are located on a physical package with a PPU, providing substantial power and area savings compared with conventional GDDR5 SDRAM systems. In at least one embodiment, each HBM2 stack includes, without limitation, four memory dies with Y=4, with each HBM2 stack including two 128-bit channels per die for a total of 8 channels and a data bus width of 1024 bits. In at least one embodiment, that memory supports Single-Error Correcting Double-Error Detecting ("SECDED") Error Correction Code ("ECC") to protect data. In at least one embodiment, ECC can provide higher reliability for compute applications that are sensitive to data corruption.

In at least one embodiment, PPU implements a multi-level memory hierarchy. In at least one embodiment, memory partition unit 6100 supports a unified memory to provide a single unified virtual address space for central processing unit ("CPU") and PPU memory, enabling data sharing between virtual memory systems. In at least one embodiment frequency of accesses by a PPU to a memory located on other processors is traced to ensure that memory pages are moved to physical memory of PPU that is accessing pages more frequently. In at least one embodiment, high-speed GPU interconnect 5908 supports address translation services allowing PPU to directly access a CPU's page tables and providing full access to CPU memory by a PPU.

In at least one embodiment, copy engines transfer data between multiple PPUs or between PPUs and CPUs. In at least one embodiment, copy engines can generate page faults for addresses that are not mapped into page tables and memory partition unit 6100 then services page faults, mapping addresses into page table, after which copy engine performs a transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and a copy process is transparent.

Data from memory 5904 of FIG. 59 or other system memory is fetched by memory partition unit 6100 and stored in L2 cache 6104, which is located on-chip and is shared between various GPCs, in accordance with at least one embodiment. Each memory partition unit 6100, in at least one embodiment, includes, without limitation, at least a portion of L2 cache associated with a corresponding memory device. In at least one embodiment, lower level caches are implemented in various units within GPCs. In at least one embodiment, each of SMs 6014 in FIG. 60 may implement a Level 1 ("L1") cache wherein that L1 cache is private memory that is dedicated to a particular SM 6014 and data from L2 cache 6104 is fetched and stored in each L1 cache for processing in functional units of SMs 6014. In at least one embodiment, L2 cache 6104 is coupled to memory interface 6106 and XBar 5920 shown in FIG. 59.

ROP unit 6102 performs graphics raster operations related to pixel color, such as color compression, pixel blending, and more, in at least one embodiment. ROP unit 6102, in at least one embodiment, implements depth testing in conjunction with raster engine 6008, receiving a depth for a sample location associated with a pixel fragment from a culling engine of raster engine 6008. In at least one embodiment, depth is tested against a corresponding depth in a depth buffer for a sample location associated with a fragment. In at least one embodiment, if that fragment passes that depth test for that sample location, then ROP unit 6102 updates depth buffer and transmits a result of that depth test to raster engine 6008. It will be appreciated that a number of partition units 6100 may be different than a number of GPCs and, therefore, each ROP unit 6102 can, in at least one embodiment, be coupled to each GPC. In at least one embodiment, ROP unit 6102 tracks packets received from different GPCs and determines whether a result generated by ROP unit 6102 is to be routed to through XBar 5920.

In at least one embodiment, at least one component shown or described with respect to FIG. 61 is used to perform techniques and/or functions described in connection with FIGS. 1-33. In at least one embodiment, at least one component shown or described with respect to FIG. 61 is used to cause one or more neural networks to cause one or more non-noise pixels to be identified and blended in parallel. In at least one embodiment, at least one component shown or described with respect to FIG. 61 is used to use one or more neural networks to adjust brightness of one or more pixels of one or more images prior to denoising the one or more images. In at least one embodiment, at least one component shown or described with respect to FIG. 61 is used to perform at least one aspect described with respect to FIGS. 1-33, and/or other systems, methods, or operations described herein.

Figure 62:
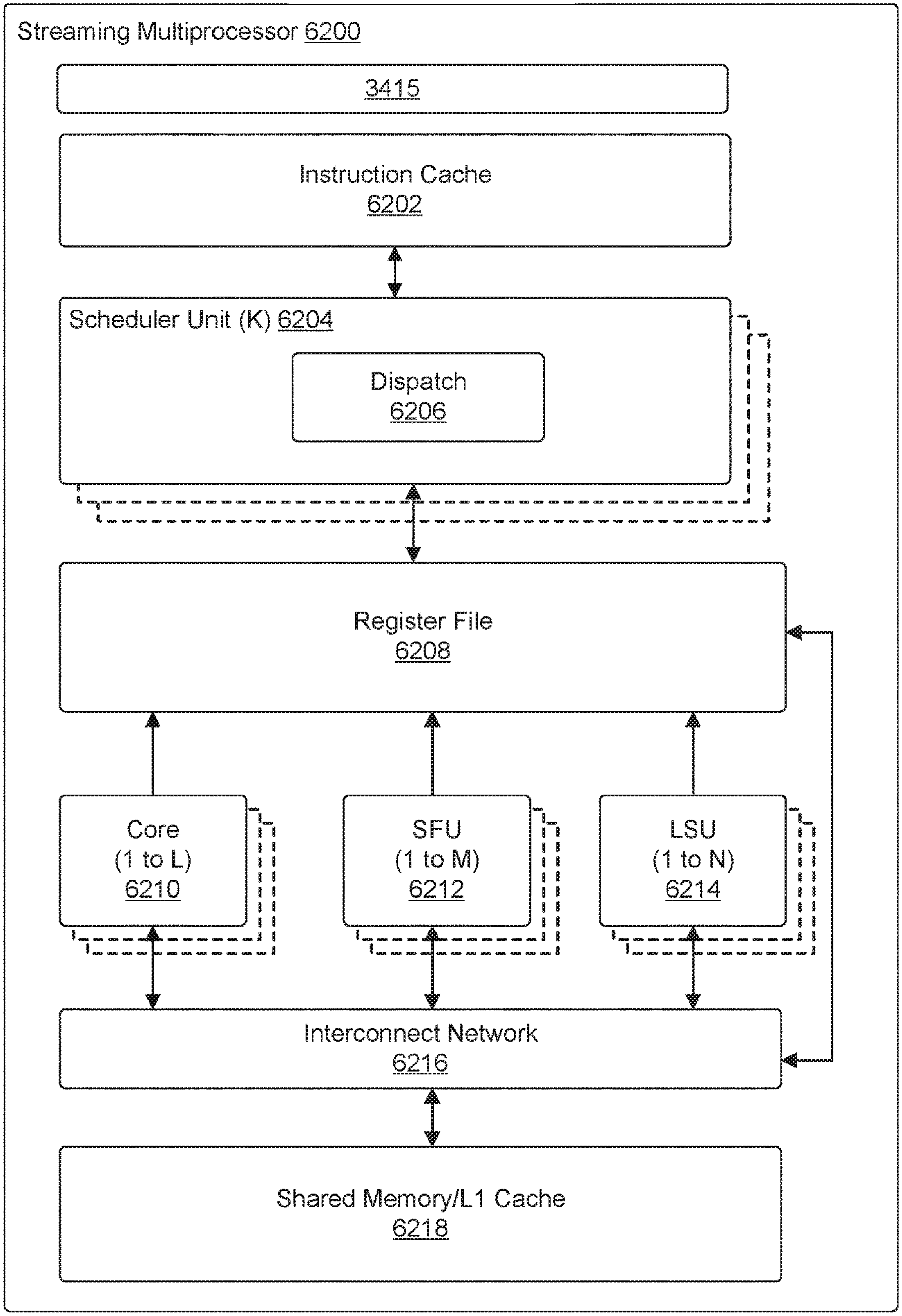
FIG. 62 illustrates a streaming multi-processor, in accordance with at least one embodiment.

FIG. 62 illustrates a streaming multi-processor ("SM") 6200, according to at least one embodiment. In at least one embodiment, SM 6200 is SM of FIG. 60. In at least one embodiment, SM 6200 includes, without limitation, an instruction cache 6202, one or more scheduler units 6204, a register file 6208, one or more processing cores ("cores") 6210, one or more special function units ("SFUs") 6212, one or more load/store units ("LSUs") 6214, an interconnect network 6216, a shared memory/level one ("L1") cache 6218, and/or any suitable combination thereof.

In at least one embodiment, a work distribution unit dispatches tasks for execution on general processing clusters ("GPCs") of parallel processing units ("PPUs") and each task is allocated to a particular Data Processing Cluster ("DPC") within a GPC and, if a task is associated with a shader program, that task is allocated to one of SMs 6200. In at least one embodiment, scheduler unit 6204 receives tasks from a work distribution unit and manages instruction scheduling for one or more thread blocks assigned to SM 6200. In at least one embodiment, scheduler unit 6204 schedules thread blocks for execution as warps of parallel threads, wherein each thread block is allocated at least one warp. In at least one embodiment, each warp executes threads. In at least one embodiment, scheduler unit 6204 manages a plurality of different thread blocks, allocating warps to different thread blocks and then dispatching instructions from plurality of different cooperative groups to various functional units (e.g., processing cores 6210, SFUs 6212, and LSUs 6214) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads ( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. In at least one embodiment, that programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 6206 is configured to transmit instructions to one or more functional units and scheduler unit 6204 and includes, without limitation, two dispatch units 6206 that enable two different instructions from a common warp to be dispatched during each clock cycle. In at least one embodiment, each scheduler unit 6204 includes a single dispatch unit 6206 or additional dispatch units 6206.

In at least one embodiment, each SM 6200, in at least one embodiment, includes, without limitation, register file 6208 that provides a set of registers for functional units of SM 6200. In at least one embodiment, register file 6208 is divided between each functional unit such that each functional unit is allocated a dedicated portion of register file 6208. In at least one embodiment, register file 6208 is divided between different warps being executed by SM 6200 and register file 6208 provides temporary storage for operands connected to data paths of functional units. In at least one embodiment, each SM 6200 comprises, without limitation, a plurality of L processing cores 6210, where L is a positive integer. In at least one embodiment, SM 6200 includes, without limitation, a large number (e.g., 128 or more) of distinct processing cores 6210. In at least one embodiment, each processing core 6210 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 6210 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 6210. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation, $D=A\times B+C$, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA 9 C++ API, exposes specialized matrix load, matrix multiply and accumulate, and matrix store operations to efficiently use tensor cores from a CUDA-C++ program. In at least one embodiment, at a CUDA level, a warp-level interface assumes 16×16 size matrices spanning all 32 threads of warp.

In at least one embodiment, each SM 6200 comprises, without limitation, M SFUs 6212 that perform special functions (e.g., attribute evaluation, reciprocal square root, and like). In at least one embodiment, SFUs 6212 include, without limitation, a tree traversal unit configured to traverse a hierarchical tree data structure. In at least one embodiment, SFUs 6212 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 6200. In at least one embodiment, texture maps are stored in shared memory/L1 cache 6218. In at least one embodiment, texture units implement texture operations such as filtering operations using mip-maps (e.g., texture maps of varying levels of detail), in accordance with at least one embodiment. In at least one embodiment, each SM 6200 includes, without limitation, two texture units.

Each SM 6200 comprises, without limitation, N LSUs 6214 that implement load and store operations between shared memory/L1 cache 6218 and register file 6208, in at least one embodiment. Interconnect network 6216 connects each functional unit to register file 6208 and LSU 6214 to register file 6208 and shared memory/L1 cache 6218 in at least one embodiment. In at least one embodiment, interconnect network 6216 is a crossbar that can be configured to connect any functional units to any registers in register file 6208 and connect LSUs 6214 to register file 6208 and memory locations in shared memory/L1 cache 6218.

In at least one embodiment, shared memory/L1 cache 6218 is an array of on-chip memory that allows for data storage and communication between SM 6200 and primitive engine and between threads in SM 6200, in at least one embodiment. In at least one embodiment, shared memory/L1 cache 6218 comprises, without limitation, 128 KB of storage capacity and is in a path from SM 6200 to a partition unit. In at least one embodiment, shared memory/L1 cache 6218, in at least one embodiment, is used to cache reads and writes. In at least one embodiment, one or more of shared memory/L1 cache 6218, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of a capacity, and texture and load/store operations can use remaining capacity. Integration within shared memory/L1 cache 6218 enables shared memory/L1 cache 6218 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In a general purpose parallel computation configuration, a work distribution unit assigns and distributes blocks of threads directly to DPCs, in at least one embodiment. In at least one embodiment, threads in a block execute a common program, using a unique thread ID in calculation to ensure each thread generates unique results, using SM 6200 to execute program and perform calculations, shared memory/L1 cache 6218 to communicate between threads, and LSU 6214 to read and write global memory through shared memory/L1 cache 6218 and memory partition unit. In at least one embodiment, when configured for general purpose parallel computation, SM 6200 writes commands that scheduler unit 6204 can use to launch new work on DPCs.

In at least one embodiment, a PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, a PPU is embodied on a single semiconductor substrate. In at least one embodiment, a PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, a PPU may be included on a graphics card that includes one or more memory devices. In at least one embodiment, that graphics card may be configured to interface with a PCIe slot on a motherboard of a desktop computer. In at least one embodiment, that PPU may be an integrated graphics processing unit ("iGPU") included in chipset of a motherboard.

Inference and/or training logic 3415 are used to perform inferencing and/or training operations associated with one or more embodiments. Details regarding inference and/or training logic 3415 are provided herein in conjunction with FIGS. 34A and/or 34B. In at least one embodiment, deep learning application processor is used to train a machine learning model, such as a neural network, to predict or infer information provided to SM 6200. In at least one embodiment, SM 6200 is used to infer or predict information based on a trained machine learning model (e.g., neural network) that has been trained by another processor or system or by SM 6200. In at least one embodiment, SM 6200 may be used to perform one or more neural network use cases described herein.

In at least one embodiment, at least one component shown or described with respect to FIG. 62 is used to perform techniques and/or functions described in connection with FIGS. 1-33. In at least one embodiment, at least one component shown or described with respect to FIG. 62 is used to cause one or more neural networks to cause one or more non-noise pixels to be identified and blended in parallel. In at least one embodiment, at least one component shown or described with respect to FIG. 62 is used to use one or more neural networks to adjust brightness of one or more pixels of one or more images prior to denoising the one or more images. In at least one embodiment, at least one component shown or described with respect to FIG. 62 is used to perform at least one aspect described with respect to FIGS. 1-33, and/or other systems, methods, or operations described herein.

Embodiments are disclosed related a virtualized computing platform for advanced computing, such as image inferencing and image processing in medical applications. Without limitation, embodiments may include radiography, magnetic resonance imaging (MRI), nuclear medicine, ultrasound, sonography, elastography, photoacoustic imaging, tomography, echocardiography, functional near-infrared spectroscopy, and magnetic particle imaging, or a combination thereof. In at least one embodiment, a virtualized computing platform and associated processes described herein may additionally or alternatively be used, without limitation, in forensic science analysis, sub-surface detection and imaging (e.g., oil exploration, archaeology, paleontology, etc.), topography, oceanography, geology, osteology, meteorology, intelligent area or object tracking and monitoring, sensor data processing (e.g., RADAR, SONAR, LIDAR, etc.), and/or genomics and gene sequencing.

Figure 63:
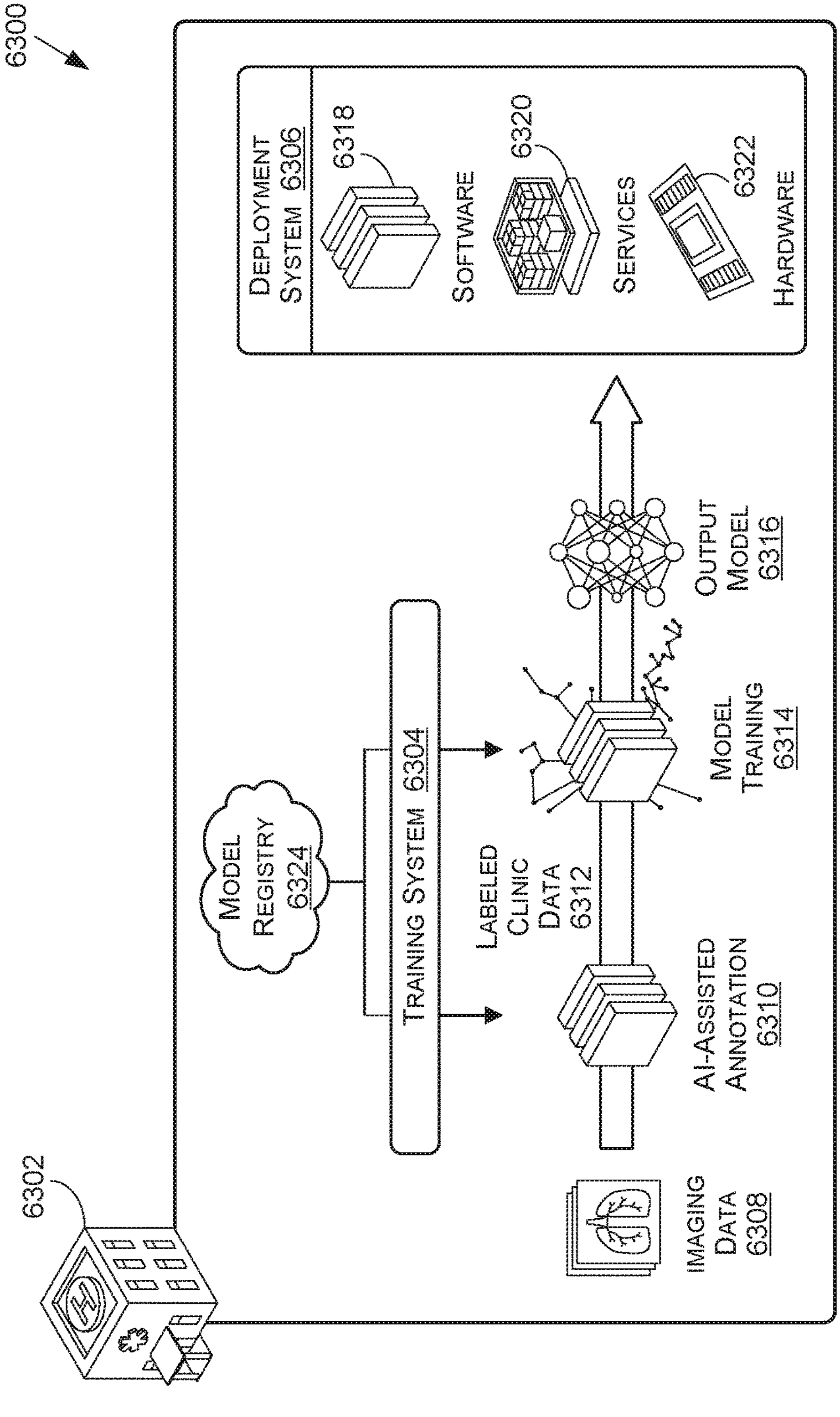
FIG. 63 is an example data flow diagram for an advanced computing pipeline, in accordance with at least one embodiment.

With reference to FIG. 63, FIG. 63 is an example data flow diagram for a process 6300 of generating and deploying an image processing and inferencing pipeline, in accordance with at least one embodiment. In at least one embodiment, process 6300 may be deployed for use with imaging devices, processing devices, genomics devices, gene sequencing devices, radiology devices, and/or other device types at one or more facilities 6302, such as medical facilities, hospitals, healthcare institutes, clinics, research or diagnostic labs, etc. In at least one embodiment, process 6300 may be deployed to perform genomics analysis and inferencing on sequencing data. Examples of genomic analyses that may be performed using systems and processes described herein include, without limitation, variant calling, mutation detection, and gene expression quantification.

In at least one embodiment, process 6300 may be executed within a training system 6304 and/or a deployment system 6306. In at least one embodiment, training system 6304 may be used to perform training, deployment, and implementation of machine learning models (e.g., neural networks, object detection algorithms, computer vision algorithms, etc.) for use in deployment system 6306. In at least one embodiment, deployment system 6306 may be configured to offload processing and compute resources among a distributed computing environment to reduce infrastructure requirements at facility 6302. In at least one embodiment, deployment system 6306 may provide a streamlined platform for selecting, customizing, and implementing virtual instruments for use with imaging devices (e.g., MRI, CT Scan, X-Ray, Ultrasound, etc.) or sequencing devices at facility 6302. In at least one embodiment, virtual instruments may include software-defined applications for performing one or more processing operations with respect to imaging data generated by imaging devices, sequencing devices, radiology devices, and/or other device types. In at least one embodiment, one or more applications in a pipeline may use or call upon services (e.g., inference, visualization, compute, AI, etc.) of deployment system 6306 during execution of applications.

In at least one embodiment, some of applications used in advanced processing and inferencing pipelines may use machine learning models or other AI to perform one or more processing steps. In at least one embodiment, machine learning models may be trained at facility 6302 using data 6308 (such as imaging data) generated at facility 6302 (and stored on one or more picture archiving and communication system (PACS) servers at facility 6302), may be trained using imaging or sequencing data 6308 from another facility or facilities (e.g., a different hospital, lab, clinic, etc.), or a combination thereof. In at least one embodiment, training system 6304 may be used to provide applications, services, and/or other resources for generating working, deployable machine learning models for deployment system 6306.

In at least one embodiment, a model registry 6324 may be backed by object storage that may support versioning and object metadata. In at least one embodiment, object storage may be accessible through, for example, a cloud storage (e.g., a cloud 6426 of FIG. 64) compatible application programming interface (API) from within a cloud platform. In at least one embodiment, machine learning models within model registry 6324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 6404 (FIG. 64) may include a scenario where facility 6302 is training their own machine learning model, or has an existing machine learning model that needs to be optimized or updated. In at least one embodiment, imaging data 6308 generated by imaging device(s), sequencing devices, and/or other device types may be received. In at least one embodiment, once imaging data 6308 is received, AI-assisted annotation 6310 may be used to aid in generating annotations corresponding to imaging data 6308 to be used as ground truth data for a machine learning model. In at least one embodiment, AI-assisted annotation 6310 may include one or more machine learning models (e.g., convolutional neural networks (CNNs)) that may be trained to generate annotations corresponding to certain types of imaging data 6308 (e.g., from certain devices) and/or certain types of anomalies in imaging data 6308. In at least one embodiment, AI-assisted annotations 6310 may then be used directly, or may be adjusted or fine-tuned using an annotation tool (e.g., by a researcher, a clinician, a doctor, a scientist, etc.), to generate ground truth data. In at least one embodiment, in some examples, labeled clinic data 6312 (e.g., annotations provided by a clinician, doctor, scientist, technician, etc.) may be used as ground truth data for training a machine learning model. In at least one embodiment, AI-assisted annotations 6310, labeled clinic data 6312, or a combination thereof may be used as ground truth data for training a machine learning model. In at least one embodiment, a trained machine learning model may be referred to as an output model 6316, and may be used by deployment system 6306, as described herein.

In at least one embodiment, training pipeline 6404 (FIG. 64) may include a scenario where facility 6302 needs a machine learning model for use in performing one or more processing tasks for one or more applications in deployment system 6306, but facility 6302 may not currently have such a machine learning model (or may not have a model that is optimized, efficient, or effective for such purposes). In at least one embodiment, an existing machine learning model may be selected from model registry 6324. In at least one embodiment, model registry 6324 may include machine learning models trained to perform a variety of different inference tasks on imaging data. In at least one embodiment, machine learning models in model registry 6324 may have been trained on imaging data from different facilities than facility 6302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 6324. In at least one embodiment, a machine learning model may then be retrained, or updated, at any number of other facilities, and a retrained or updated model may be made available in model registry 6324. In at least one embodiment, a machine learning model may then be selected from model registry 6324—and referred to as output model 6316—and may be used in deployment system 6306 to perform one or more processing tasks for one or more applications of a deployment system.

In at least one embodiment, training pipeline 6404 (FIG. 64) may be used in a scenario that includes facility 6302 requiring a machine learning model for use in performing one or more processing tasks for one or more applications in deployment system 6306, but facility 6302 may not currently have such a machine learning model (or may not have a model that is optimized, efficient, or effective for such purposes). In at least one embodiment, a machine learning model selected from model registry 6324 might not be fine-tuned or optimized for imaging data 6308 generated at facility 6302 because of differences in populations, genetic variations, robustness of training data used to train a machine learning model, diversity in anomalies of training data, and/or other issues with training data. In at least one embodiment, AI-assisted annotation 6310 may be used to aid in generating annotations corresponding to imaging data 6308 to be used as ground truth data for retraining or updating a machine learning model. In at least one embodiment, labeled clinic data 6312 (e.g., annotations provided by a clinician, doctor, scientist, etc.) may be used as ground truth data for training a machine learning model. In at least one embodiment, retraining or updating a machine learning model may be referred to as model training 6314. In at least one embodiment, model training 6314—e.g., AI-assisted annotations 6310, labeled clinic data 6312, or a combination thereof—may be used as ground truth data for retraining or updating a machine learning model.

In at least one embodiment, deployment system 6306 may include software 6318, services 6320, hardware 6322, and/or other components, features, and functionality. In at least one embodiment, deployment system 6306 may include a software "stack," such that software 6318 may be built on top of services 6320 and may use services 6320 to perform some or all of processing tasks, and services 6320 and software 6318 may be built on top of hardware 6322 and use hardware 6322 to execute processing, storage, and/or other compute tasks of deployment system 6306.

In at least one embodiment, software 6318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of imaging device (e.g., CT, MRI, X-Ray, ultrasound, sonography, echocardiography, etc.), sequencing device, radiology device, genomics device, etc., there may be any number of containers that may perform a data processing task with respect to imaging data 6308 (or other data types, such as those described herein) generated by a device. In at least one embodiment, an advanced processing and inferencing pipeline may be defined based on selections of different containers that are desired or required for processing imaging data 6308, in addition to containers that receive and configure imaging data for use by each container and/or for use by facility 6302 after processing through a pipeline (e.g., to convert outputs back to a usable data type, such as digital imaging and communications in medicine (DICOM) data, radiology information system (RIS) data, clinical information system (CIS) data, remote procedure call (RPC) data, data substantially compliant with a representation state transfer (REST) interface, data substantially compliant with a file-based interface, and/or raw data, for storage and display at facility 6302). In at least one embodiment, a combination of containers within software 6318 (e.g., that make up a pipeline) may be referred to as a virtual instrument (as described in more detail herein), and a virtual instrument may leverage services 6320 and hardware 6322 to execute some or all processing tasks of applications instantiated in containers.

In at least one embodiment, a data processing pipeline may receive input data (e.g., imaging data 6308) in a DICOM, RIS, CIS, REST compliant, RPC, raw, and/or other format in response to an inference request (e.g., a request from a user of deployment system 6306, such as a clinician, a doctor, a radiologist, etc.). In at least one embodiment, input data may be representative of one or more images, video, and/or other data representations generated by one or more imaging devices, sequencing devices, radiology devices, genomics devices, and/or other device types. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 6316 of training system 6304.

In at least one embodiment, tasks of data processing pipeline may be encapsulated in a container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 6324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 6320 as a system (e.g., system 6400 of FIG. 64). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming DICOM data. In at least one embodiment, once validated by system 6400 (e.g., for accuracy, safety, patient privacy, etc.), an application may be available in a container registry for selection and/or implementation by a user (e.g., a hospital, clinic, lab, healthcare provider, etc.) to perform one or more processing tasks with respect to data at a facility (e.g., a second facility) of a user.

Figure 64:
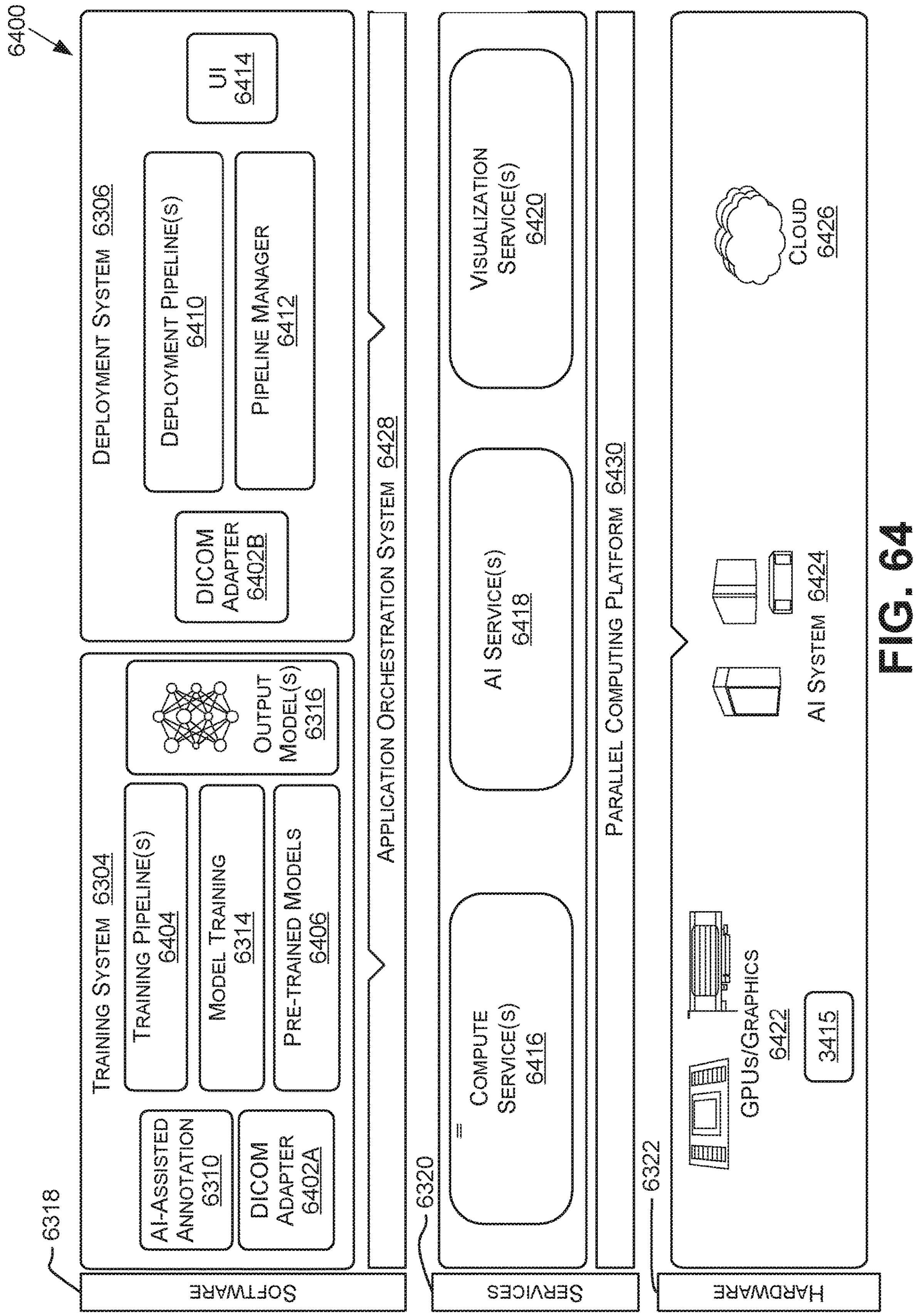
FIG. 64 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 6400 of FIG. 64). In at least one embodiment, completed and validated applications or containers may be stored in a container registry and associated machine learning models may be stored in model registry 6324. In at least one embodiment, a requesting entity (e.g., a user at a medical facility)—who provides an inference or image processing request—may browse a container registry and/or model registry 6324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 6306 (e.g., a cloud) to perform processing of data processing pipeline. In at least one embodiment, processing by deployment system 6306 may include referencing selected elements (e.g., applications, containers, models, etc.) from a container registry and/or model registry 6324. In at least one embodiment, once results are generated by a pipeline, results may be returned to a user for reference (e.g., for viewing in a viewing application suite executing on a local, on-premises workstation or terminal). In at least one embodiment, a radiologist may receive results from an data processing pipeline including any number of application and/or containers, where results may include anomaly detection in X-rays, CT scans, MRIs, etc.

In at least one embodiment, to aid in processing or execution of applications or containers in pipelines, services 6320 may be leveraged. In at least one embodiment, services 6320 may include compute services, artificial intelligence (AI) services, visualization services, and/or other service types. In at least one embodiment, services 6320 may provide functionality that is common to one or more applications in software 6318, so functionality may be abstracted to a service that may be called upon or leveraged by applications. In at least one embodiment, functionality provided by services 6320 may run dynamically and more efficiently, while also scaling well by allowing applications to process data in parallel (e.g., using a parallel computing platform 6430 (FIG. 64)). In at least one embodiment, rather than each application that shares a same functionality offered by a service 6320 being required to have a respective instance of service 6320, service 6320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 6320 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 6318 implementing advanced processing and inferencing pipeline that includes segmentation application and anomaly detection application may be streamlined because each application may call upon a same inference service to perform one or more inferencing tasks.

In at least one embodiment, hardware 6322 may include GPUs, CPUs, graphics cards, an AI/deep learning system (e.g., an AI supercomputer, such as NVIDIA's DGX supercomputer system), a cloud platform, or a combination thereof. In at least one embodiment, different types of hardware 6322 may be used to provide efficient, purpose-built support for software 6318 and services 6320 in deployment system 6306. In at least one embodiment, use of GPU processing may be implemented for processing locally (e.g., at facility 6302), within an AI/deep learning system, in a cloud system, and/or in other processing components of deployment system 6306 to improve efficiency, accuracy, and efficacy of image processing, image reconstruction, segmentation, MRI exams, stroke or heart attack detection (e.g., in real-time), image quality in rendering, etc. In at least one embodiment, a facility may include imaging devices, genomics devices, sequencing devices, and/or other device types on-premises that may leverage GPUs to generate imaging data representative of a subject's anatomy.

In at least one embodiment, software 6318 and/or services 6320 may be optimized for GPU processing with respect to deep learning, machine learning, and/or high-performance computing, as non-limiting examples. In at least one embodiment, at least some of computing environment of deployment system 6306 and/or training system 6304 may be executed in a datacenter one or more supercomputers or high performance computing systems, with GPU optimized software (e.g., hardware and software combination of NVIDIA's DGX system). In at least one embodiment, datacenters may be compliant with provisions of HIPAA, such that receipt, processing, and transmission of imaging data and/or other patient data is securely handled with respect to privacy of patient data. In at least one embodiment, hardware 6322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX systems) as a hardware abstraction and scaling platform. In at least one embodiment, cloud platform may integrate an application container clustering system or orchestration system (e.g., KUBERNETES) on multiple GPUs to enable seamless scaling and load balancing.

In at least one embodiment, at least one component shown or described with respect to FIG. 63 is used to perform techniques and/or functions described in connection with FIGS. 1-33. In at least one embodiment, at least one component shown or described with respect to FIG. 63 is used to cause one or more neural networks to cause one or more non-noise pixels to be identified and blended in parallel. In at least one embodiment, at least one component shown or described with respect to FIG. 63 is used to use one or more neural networks to adjust brightness of one or more pixels of one or more images prior to denoising the one or more images. In at least one embodiment, at least one component shown or described with respect to FIG. 63 is used to perform at least one aspect described with respect to FIGS. 1-33, and/or other systems, methods, or operations described herein.

FIG. 64 is a system diagram for an example system 6400 for generating and deploying an imaging deployment pipeline, in accordance with at least one embodiment. In at least one embodiment, system 6400 may be used to implement process 6300 of FIG. 63 and/or other processes including advanced processing and inferencing pipelines. In at least one embodiment, system 6400 may include training system 6304 and deployment system 6306. In at least one embodiment, training system 6304 and deployment system 6306 may be implemented using software 6318, services 6320, and/or hardware 6322, as described herein.

In at least one embodiment, system 6400 (e.g., training system 6304 and/or deployment system 6306) may implemented in a cloud computing environment (e.g., using cloud 6426). In at least one embodiment, system 6400 may be implemented locally with respect to a healthcare services facility, or as a combination of both cloud and local computing resources. In at least one embodiment, in embodiments where cloud computing is implemented, patient data may be separated from, or unprocessed by, by one or more components of system 6400 that would render processing non-compliant with HIPAA and/or other data handling and privacy regulations or laws. In at least one embodiment, access to APIs in cloud 6426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 6400, may be restricted to a set of public IPs that have been vetted or authorized for interaction.

In at least one embodiment, various components of system 6400 may communicate between and among one another using any of a variety of different network types, including but not limited to local area networks (LANs)

and/or wide area networks (WANs) via wired and/or wireless communication protocols. In at least one embodiment, communication between facilities and components of system 6400 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 6304 may execute training pipelines 6404, similar to those described herein with respect to FIG. 63. In at least one embodiment, where one or more machine learning models are to be used in deployment pipelines 6410 by deployment system 6306, training pipelines 6404 may be used to train or retrain one or more (e.g., pre-trained) models, and/or implement one or more of pre-trained models 6406 (e.g., without a need for retraining or updating). In at least one embodiment, as a result of training pipelines 6404, output model(s) 6316 may be generated. In at least one embodiment, training pipelines 6404 may include any number of processing steps, such as but not limited to imaging data (or other input data) conversion or adaption (e.g., using DICOM adapter 6402A to convert DICOM images to another format suitable for processing by respective machine learning models, such as Neuroimaging Informatics Technology Initiative (NIfTI) format), AI-assisted annotation 6310, labeling or annotating of imaging data 6308 to generate labeled clinic data 6312, model selection from a model registry, model training 6314, training, retraining, or updating models, and/or other processing steps. In at least one embodiment, for different machine learning models used by deployment system 6306, different training pipelines 6404 may be used. In at least one embodiment, training pipeline 6404 similar to a first example described with respect to FIG. 63 may be used for a first machine learning model, training pipeline 6404 similar to a second example described with respect to FIG. 63 may be used for a second machine learning model, and training pipeline 6404 similar to a third example described with respect to FIG. 63 may be used for a third machine learning model. In at least one embodiment, any combination of tasks within training system 6304 may be used depending on what is required for each respective machine learning model. In at least one embodiment, one or more of machine learning models may already be trained and ready for deployment so machine learning models may not undergo any processing by training system 6304, and may be implemented by deployment system 6306.

In at least one embodiment, output model(s) 6316 and/or pre-trained model(s) 6406 may include any types of machine learning models depending on implementation or embodiment. In at least one embodiment, and without limitation, machine learning models used by system 6400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 67A:
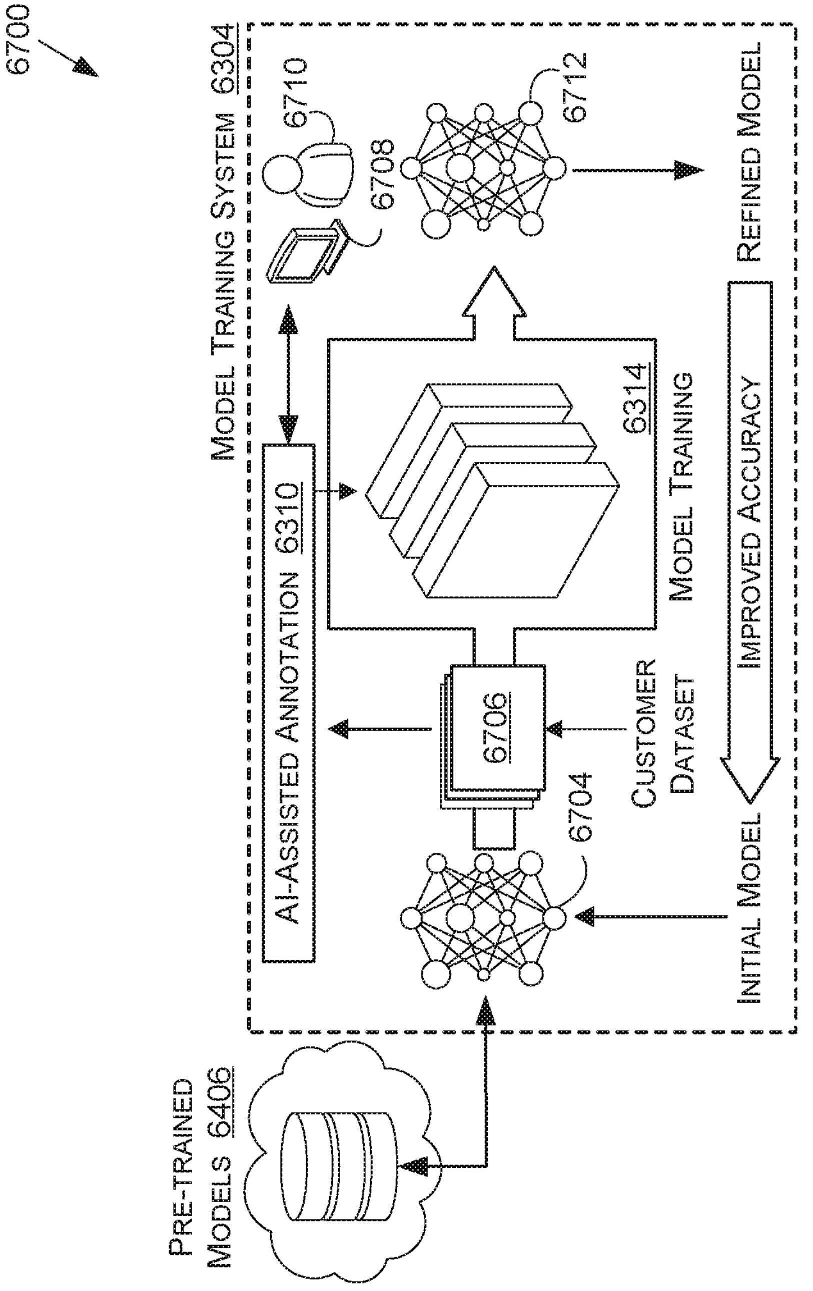
FIG. 67A illustrates a data flow diagram for a process to train a machine learning model, in accordance with at least one embodiment.
Figure 67B:
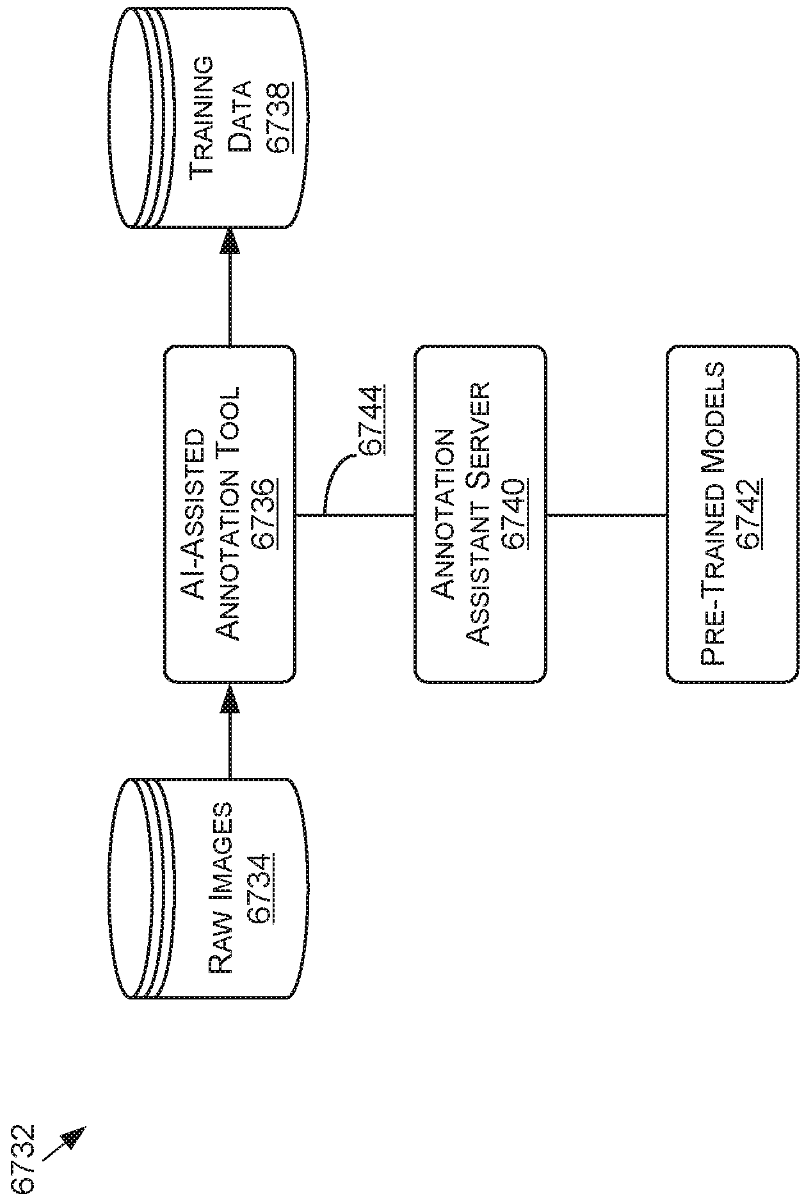
FIG. 67B is an example illustration of a client-server architecture to enhance annotation tools with pre-trained annotation models, in accordance with at least one embodiment.

In at least one embodiment, training pipelines 6404 may include AI-assisted annotation, as described in more detail herein with respect to at least FIG. 67B. In at least one embodiment, labeled clinic data 6312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 6308 (or other data type used by machine learning models), there may be corresponding ground truth data generated by training system 6304. In at least one embodiment, AI-assisted annotation may be performed as part of deployment pipelines 6410; either in addition to, or in lieu of AI-assisted annotation included in training pipelines 6404. In at least one embodiment, system 6400 may include a multi-layer platform that may include a software layer (e.g., software 6318) of diagnostic applications (or other application types) that may perform one or more medical imaging and diagnostic functions. In at least one embodiment, system 6400 may be communicatively coupled to (e.g., via encrypted links) PACS server networks of one or more facilities. In at least one embodiment, system 6400 may be configured to access and referenced data (e.g., DICOM data, RIS data, raw data, CIS data, REST compliant data, RPC data, raw data, etc.) from PACS servers (e.g., via a DICOM adapter 6402, or another data type adapter such as RIS, CIS, REST compliant, RPC, raw, etc.) to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 6302). In at least one embodiment, applications may then call or execute one or more services 6320 for performing compute, AI, or visualization tasks associated with respective applications, and software 6318 and/or services 6320 may leverage hardware 6322 to perform processing tasks in an effective and efficient manner.

In at least one embodiment, deployment system 6306 may execute deployment pipelines 6410. In at least one embodiment, deployment pipelines 6410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 6410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 6410 depending on information desired from data generated by a device. In at least one embodiment, where detections of anomalies are desired from an MRI machine, there may be a first deployment pipeline 6410, and where image enhancement is desired from output of an MRI machine, there may be a second deployment pipeline 6410.

In at least one embodiment, applications available for deployment pipelines 6410 may include any application that may be used for performing processing tasks on imaging data or other data from devices. In at least one embodiment, different applications may be responsible for image enhancement, segmentation, reconstruction, anomaly detection, object detection, feature detection, treatment planning, dosimetry, beam planning (or other radiation treatment procedures), and/or other analysis, image processing, or inferencing tasks. In at least one embodiment, deployment system 6306 may define constructs for each of applications, such that users of deployment system 6306 (e.g., medical facilities, labs, clinics, etc.) may understand constructs and adapt applications for implementation within their respective facility. In at least one embodiment, an application for image reconstruction may be selected for inclusion in deployment pipeline 6410, but data type generated by an imaging device may be different from a data type used within an application. In at least one embodiment, DICOM adapter 6402B (and/or a DICOM reader) or another data type adapter or reader (e.g., RIS, CIS, REST compliant, RPC, raw, etc.) may be used within deployment pipeline 6410 to convert data to a form useable by an application within deployment system 6306. In at least one embodiment, access to DICOM, RIS, CIS, REST compliant, RPC, raw, and/or other data type libraries may be accumulated and pre-processed, including decoding, extracting, and/or performing any convolutions, color corrections, sharpness, gamma, and/or other augmentations to data. In at least one embodiment, DICOM, RIS, CIS, REST compliant, RPC, and/or raw data may be unordered and a pre-pass may be executed to organize or sort collected data. In at least one embodiment, because various applications may share common image operations, in some embodiments, a data augmentation library (e.g., as one of services 6320) may be used to accelerate these operations. In at least one embodiment, to avoid bottlenecks of conventional processing approaches that rely on CPU processing, parallel computing platform 6430 may be used for GPU acceleration of these processing tasks.

In at least one embodiment, an image reconstruction application may include a processing task that includes use of a machine learning model. In at least one embodiment, a user may desire to use their own machine learning model, or to select a machine learning model from model registry 6324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 6400—such as services 6320 and hardware 6322—deployment pipelines 6410 may be even more user friendly, provide for easier integration, and produce more accurate, efficient, and timely results.

In at least one embodiment, deployment system 6306 may include a user interface 6414 (e.g., a graphical user interface, a web interface, etc.) that may be used to select applications for inclusion in deployment pipeline(s) 6410, arrange applications, modify or change applications or parameters or constructs thereof, use and interact with deployment pipeline(s) 6410 during set-up and/or deployment, and/or to otherwise interact with deployment system 6306. In at least one embodiment, although not illustrated with respect to training system 6304, user interface 6414 (or a different user interface) may be used for selecting models for use in deployment system 6306, for selecting models for training, or retraining, in training system 6304, and/or for otherwise interacting with training system 6304.

Figure 65:
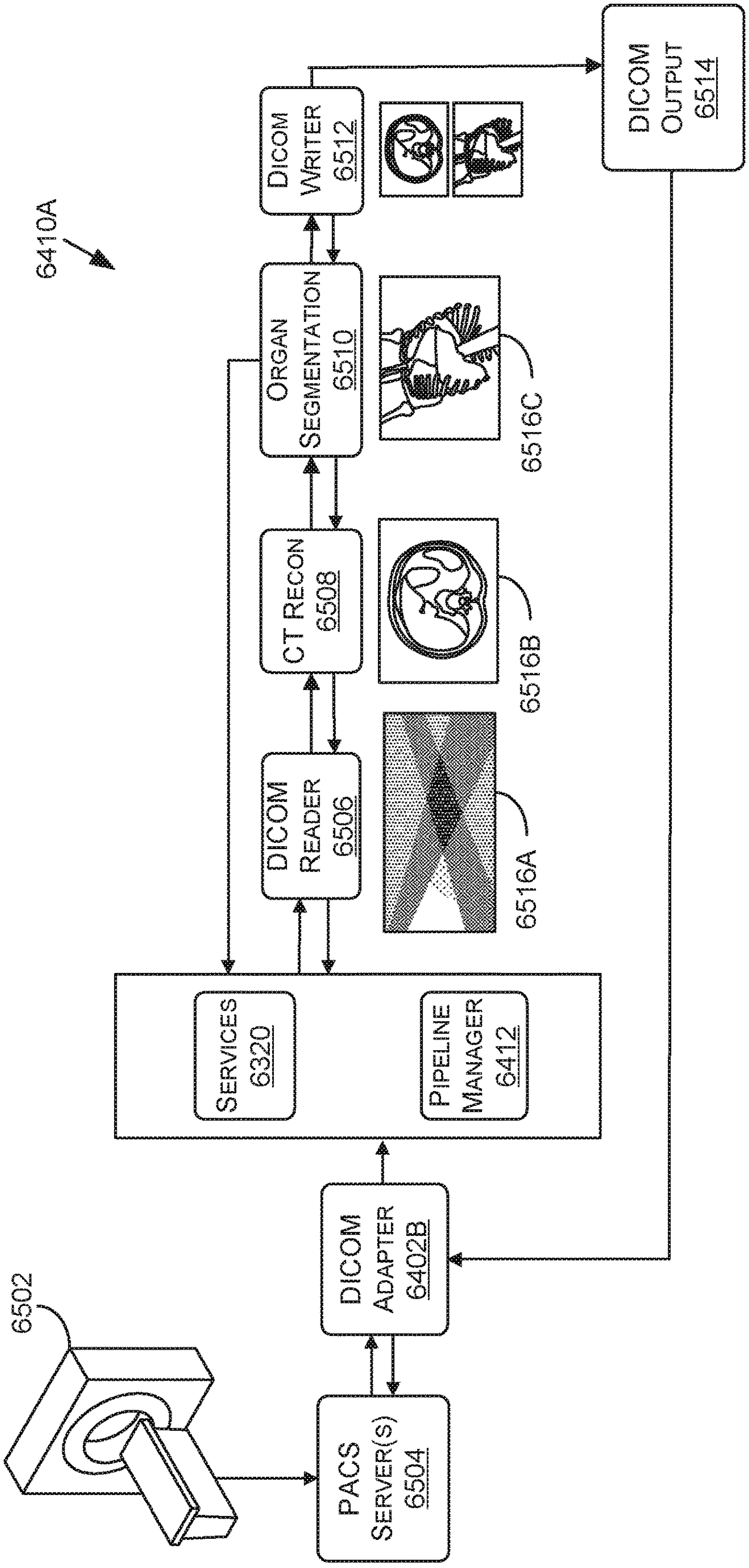
FIG. 65 includes an example illustration of an advanced computing pipeline 6410A for processing imaging data, in accordance with at least one embodiment.

In at least one embodiment, pipeline manager 6412 may be used, in addition to an application orchestration system 6428, to manage interaction between applications or containers of deployment pipeline(s) 6410 and services 6320 and/or hardware 6322. In at least one embodiment, pipeline manager 6412 may be configured to facilitate interactions from application to application, from application to service 6320, and/or from application or service to hardware 6322. In at least one embodiment, although illustrated as included in software 6318, this is not intended to be limiting, and in some examples (e.g., as illustrated in FIG. 65) pipeline manager 6412 may be included in services 6320. In at least one embodiment, application orchestration system 6428 (e.g., Kubernetes, DOCKER, etc.) may include a container orchestration system that may group applications into containers as logical units for coordination, management, scaling, and deployment. In at least one embodiment, by associating applications from deployment pipeline(s) 6410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 6412 and application orchestration system 6428. In at least one embodiment, so long as an expected input and/or output of each container or application is known by a system (e.g., based on constructs of applications or containers), application orchestration system 6428 and/or pipeline manager 6412 may facilitate communication among and between, and sharing of resources among and between, each of applications or containers. In at least one embodiment, because one or more of applications or containers in deployment pipeline(s) 6410 may share same services and resources, application orchestration system 6428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 6428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 6320 leveraged by and shared by applications or containers in deployment system 6306 may include compute services 6416, AI services 6418, visualization services 6420, and/or other service types. In at least one embodiment, applications may call (e.g., execute) one or more of services 6320 to perform processing operations for an application. In at least one embodiment, compute services 6416 may be leveraged by applications to perform super-computing or other high-performance computing (HPC) tasks. In at least one embodiment, compute service(s) 6416 may be leveraged to perform parallel processing (e.g., using a parallel computing platform 6430) for processing data through one or more of applications and/or one or more tasks of a single application, substantially simultaneously. In at least one embodiment, parallel computing platform 6430 (e.g., NVIDIA's CUDA) may enable general purpose computing on GPUs (GPGPU) (e.g., GPUs 6422). In at least one embodiment, a software layer of parallel computing platform 6430 may provide access to virtual instruction sets and parallel computational elements of GPUs, for execution of compute kernels. In at least one embodiment, parallel computing platform 6430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 6430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 6418 may be leveraged to perform inferencing services for executing machine learning model(s) associated with applications (e.g., tasked with performing one or more processing tasks of an application). In at least one embodiment, AI services 6418 may leverage AI system 6424 to execute machine learning model(s) (e.g., neural networks, such as CNNs) for segmentation, reconstruction, object detection, feature detection, classification, and/or other inferencing tasks. In at least one embodiment, applications of deployment pipeline(s) 6410 may use one or more of output models 6316 from training system 6304 and/or other models of applications to perform inference on imaging data (e.g., DICOM data, RIS data, CIS data, REST compliant data, RPC data, raw data, etc.). In at least one embodiment, two or more examples of inferencing using application orchestration system 6428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 6428 may distribute resources (e.g., services 6320 and/or hardware 6322) based on priority paths for different inferencing tasks of AI services 6418.

In at least one embodiment, shared storage may be mounted to AI services 6418 within system 6400. In at least one embodiment, shared storage may operate as a cache (or other storage device type) and may be used to process inference requests from applications. In at least one embodiment, when an inference request is submitted, a request may be received by a set of API instances of deployment system 6306, and one or more instances may be selected (e.g., for best fit, for load balancing, etc.) to process a request. In at least one embodiment, to process a request, a request may be entered into a database, a machine learning model may be located from model registry 6324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 6412) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT less than one minute) priority while others may have lower priority (e.g., TAT less than 10 minutes). In at least one embodiment, model execution times may be measured from requesting institution or entity and may include partner network traversal time, as well as execution on an inference service.

In at least one embodiment, transfer of requests between services 6320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 6426, and an inference service may perform inferencing on a GPU.

In at least one embodiment, visualization services 6420 may be leveraged to generate visualizations for viewing outputs of applications and/or deployment pipeline(s) 6410. In at least one embodiment, GPUs 6422 may be leveraged by visualization services 6420 to generate visualizations. In at least one embodiment, rendering effects, such as ray-tracing, may be implemented by visualization services 6420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 6420 may include an internal visualizer, cinematics, and/or other rendering or image processing capabilities or functionality (e.g., ray tracing, rasterization, internal optics, etc.).

In at least one embodiment, hardware 6322 may include GPUs 6422, AI system 6424, cloud 6426, and/or any other hardware used for executing training system 6304 and/or deployment system 6306. In at least one embodiment, GPUs 6422 (e.g., NVIDIA's TESLA and/or QUADRO GPUs) may include any number of GPUs that may be used for executing processing tasks of compute services 6416, AI services 6418, visualization services 6420, other services, and/or any of features or functionality of software 6318. For example, with respect to AI services 6418, GPUs 6422 may be used to perform pre-processing on imaging data (or other data types used by machine learning models), post-processing on outputs of machine learning models, and/or to perform inferencing (e.g., to execute machine learning models). In at least one embodiment, cloud 6426, AI system 6424, and/or other components of system 6400 may use GPUs 6422. In at least one embodiment, cloud 6426 may include a GPU-optimized platform for deep learning tasks. In at least one embodiment, AI system 6424 may use GPUs, and cloud 6426—or at least a portion tasked with deep learning or inferencing—may be executed using one or more AI systems 6424. As such, although hardware 6322 is illustrated as discrete components, this is not intended to be limiting, and any components of hardware 6322 may be combined with, or leveraged by, any other components of hardware 6322.

In at least one embodiment, AI system 6424 may include a purpose-built computing system (e.g., a super-computer or an HPC) configured for inferencing, deep learning, machine learning, and/or other artificial intelligence tasks. In at least one embodiment, AI system 6424 (e.g., NVIDIA's DGX) may include GPU-optimized software (e.g., a software stack) that may be executed using a plurality of GPUs 6422, in addition to CPUs, RAM, storage, and/or other components, features, or functionality. In at least one embodiment, one or more AI systems 6424 may be implemented in cloud 6426 (e.g., in a data center) for performing some or all of AI-based processing tasks of system 6400.

In at least one embodiment, cloud 6426 may include a GPU-accelerated infrastructure (e.g., NVIDIA's NGC) that may provide a GPU-optimized platform for executing processing tasks of system 6400. In at least one embodiment, cloud 6426 may include an AI system(s) 6424 for performing one or more of AI-based tasks of system 6400 (e.g., as a hardware abstraction and scaling platform). In at least one embodiment, cloud 6426 may integrate with application orchestration system 6428 leveraging multiple GPUs to enable seamless scaling and load balancing between and among applications and services 6320. In at least one embodiment, cloud 6426 may tasked with executing at least some of services 6320 of system 6400, including compute services 6416, AI services 6418, and/or visualization services 6420, as described herein. In at least one embodiment, cloud 6426 may perform small and large batch inference (e.g., executing NVIDIA's TENSOR RT), provide an accelerated parallel computing API and platform 6430 (e.g., NVIDIA's CUDA), execute application orchestration system 6428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 6400.

In at least one embodiment, in an effort to preserve patient confidentiality (e.g., where patient data or records are to be used off-premises), cloud 6426 may include a registry—such as a deep learning container registry. In at least one embodiment, a registry may store containers for instantiations of applications that may perform pre-processing, post-processing, or other processing tasks on patient data. In at least one embodiment, cloud 6426 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

In at least one embodiment, at least one component shown or described with respect to FIG. 64 is used to perform techniques and/or functions described in connection with FIGS. 1-33. In at least one embodiment, at least one component shown or described with respect to FIG. 64 is used to cause one or more neural networks to cause one or more non-noise pixels to be identified and blended in parallel. In at least one embodiment, at least one component shown or described with respect to FIG. 64 is used to use one or more neural networks to adjust brightness of one or more pixels of one or more images prior to denoising the one or more images. In at least one embodiment, at least one component shown or described with respect to FIG. 64 is used to perform at least one aspect described with respect to FIGS. 1-33, and/or other systems, methods, or operations described herein.

FIG. 65 includes an example illustration of a deployment pipeline 6410A for processing imaging data, in accordance with at least one embodiment. In at least one embodiment, system 6400—and specifically deployment system 6306—may be used to customize, update, and/or integrate deployment pipeline(s) 6410A into one or more production environments. In at least one embodiment, deployment pipeline 6410A of FIG. 65 includes a non-limiting example of a deployment pipeline 6410A that may be custom defined by a particular user (or team of users) at a facility (e.g., at a hospital, clinic, lab, research environment, etc.). In at least one embodiment, to define deployment pipelines 6410A for a CT scanner 6502, a user may select—from a container registry, for example—one or more applications that perform specific functions or tasks with respect to imaging data generated by CT scanner 6502. In at least one embodiment, applications may be applied to deployment pipeline 6410A as containers that may leverage services 6320 and/or hardware 6322 of system 6400. In addition, deployment pipeline 6410A may include additional processing tasks or applications that may be implemented to prepare data for use by applications (e.g., DICOM adapter 6402B and DICOM reader 6506 may be used in deployment pipeline 6410A to prepare data for use by CT reconstruction 6508, organ segmentation 6510, etc.). In at least one embodiment, deployment pipeline 6410A may be customized or selected for consistent deployment, one time use, or for another frequency or interval. In at least one embodiment, a user may desire to have CT reconstruction 6508 and organ segmentation 6510 for several subjects over a specific interval, and thus may deploy pipeline 6410A for that period of time. In at least one embodiment, a user may select, for each request from system 6400, applications that a user wants to perform processing on that data for that request. In at least one embodiment, deployment pipeline 6410A may be adjusted at any interval and, because of adaptability and scalability of a container structure within system 6400, this may be a seamless process.

In at least one embodiment, deployment pipeline 6410A of FIG. 65 may include CT scanner 6502 generating imaging data of a patient or subject. In at least one embodiment, imaging data from CT scanner 6502 may be stored on a PACS server(s) 6504 associated with a facility housing CT scanner 6502. In at least one embodiment, PACS server(s) 6504 may include software and/or hardware components that may directly interface with imaging modalities (e.g., CT scanner 6502) at a facility. In at least one embodiment, DICOM adapter 6402B may enable sending and receipt of DICOM objects using DICOM protocols. In at least one embodiment, DICOM adapter 6402B may aid in preparation or configuration of DICOM data from PACS server(s) 6504 for use by deployment pipeline 6410A. In at least one embodiment, once DICOM data is processed through DICOM adapter 6402B, pipeline manager 6412 may route data through to deployment pipeline 6410A. In at least one embodiment, DICOM reader 6506 may extract image files and any associated metadata from DICOM data (e.g., raw sinogram data, as illustrated in visualization 6516A). In at least one embodiment, working files that are extracted may be stored in a cache for faster processing by other applications in deployment pipeline 6410A. In at least one embodiment, once DICOM reader 6506 has finished extracting and/or storing data, a signal of completion may be communicated to pipeline manager 6412. In at least one embodiment, pipeline manager 6412 may then initiate or call upon one or more other applications or containers in deployment pipeline 6410A.

In at least one embodiment, CT reconstruction 6508 application and/or container may be executed once data (e.g., raw sinogram data) is available for processing by CT reconstruction 6508 application. In at least one embodiment, CT reconstruction 6508 may read raw sinogram data from a cache, reconstruct an image file out of raw sinogram data (e.g., as illustrated in visualization 6516B), and store resulting image file in a cache. In at least one embodiment, at completion of reconstruction, pipeline manager 6412 may be signaled that reconstruction task is complete. In at least one embodiment, once reconstruction is complete, and a reconstructed image file may be stored in a cache (or other storage device), organ segmentation 6510 application and/or container may be triggered by pipeline manager 6412. In at least one embodiment, organ segmentation 6510 application and/or container may read an image file from a cache, normalize or convert an image file to format suitable for inference (e.g., convert an image file to an input resolution of a machine learning model), and run inference against a normalized image. In at least one embodiment, to run inference on a normalized image, organ segmentation 6510 application and/or container may rely on services 6320, and pipeline manager 6412 and/or application orchestration system 6428 may facilitate use of services 6320 by organ segmentation 6510 application and/or container. In at least one embodiment, for example, organ segmentation 6510 application and/or container may leverage AI services 6418 to perform inference on a normalized image, and AI services 6418 may leverage hardware 6322 (e.g., AI system 6424) to execute AI services 6418. In at least one embodiment, a result of an inference may be a mask file (e.g., as illustrated in visualization 6516C) that may be stored in a cache (or other storage device).

In at least one embodiment, once applications that process DICOM data and/or data extracted from DICOM data have completed processing, a signal may be generated for pipeline manager 6412. In at least one embodiment, pipeline manager 6412 may then execute DICOM writer 6512 to read results from a cache (or other storage device), package results into a DICOM format (e.g., as DICOM output 6514) for use by users at a facility who generated a request. In at least one embodiment, DICOM output 6514 may then be transmitted to DICOM adapter 6402B to prepare DICOM output 6514 for storage on PACS server(s) 6504 (e.g., for viewing by a DICOM viewer at a facility). In at least one embodiment, in response to a request for reconstruction and segmentation, visualizations 6516B and 6516C may be generated and available to a user for diagnoses, research, and/or for other purposes.

Although illustrated as consecutive application in deployment pipeline 6410A, CT reconstruction 6508 and organ segmentation 6510 applications may be processed in parallel in at least one embodiment. In at least one embodiment, where applications do not have dependencies on one another, and data is available for each application (e.g., after DICOM reader 6506 extracts data), applications may be executed at a same time, substantially at a same time, or with some overlap. In at least one embodiment, where two or more applications require similar services 6320, a scheduler of system 6400 may be used to load balance and distribute compute or processing resources between and among various applications. In at least one embodiment, in some embodiments, parallel computing platform 6430 may be used to perform parallel processing for applications to decrease run-time of deployment pipeline 6410A to provide real-time results.

Figure 66A:
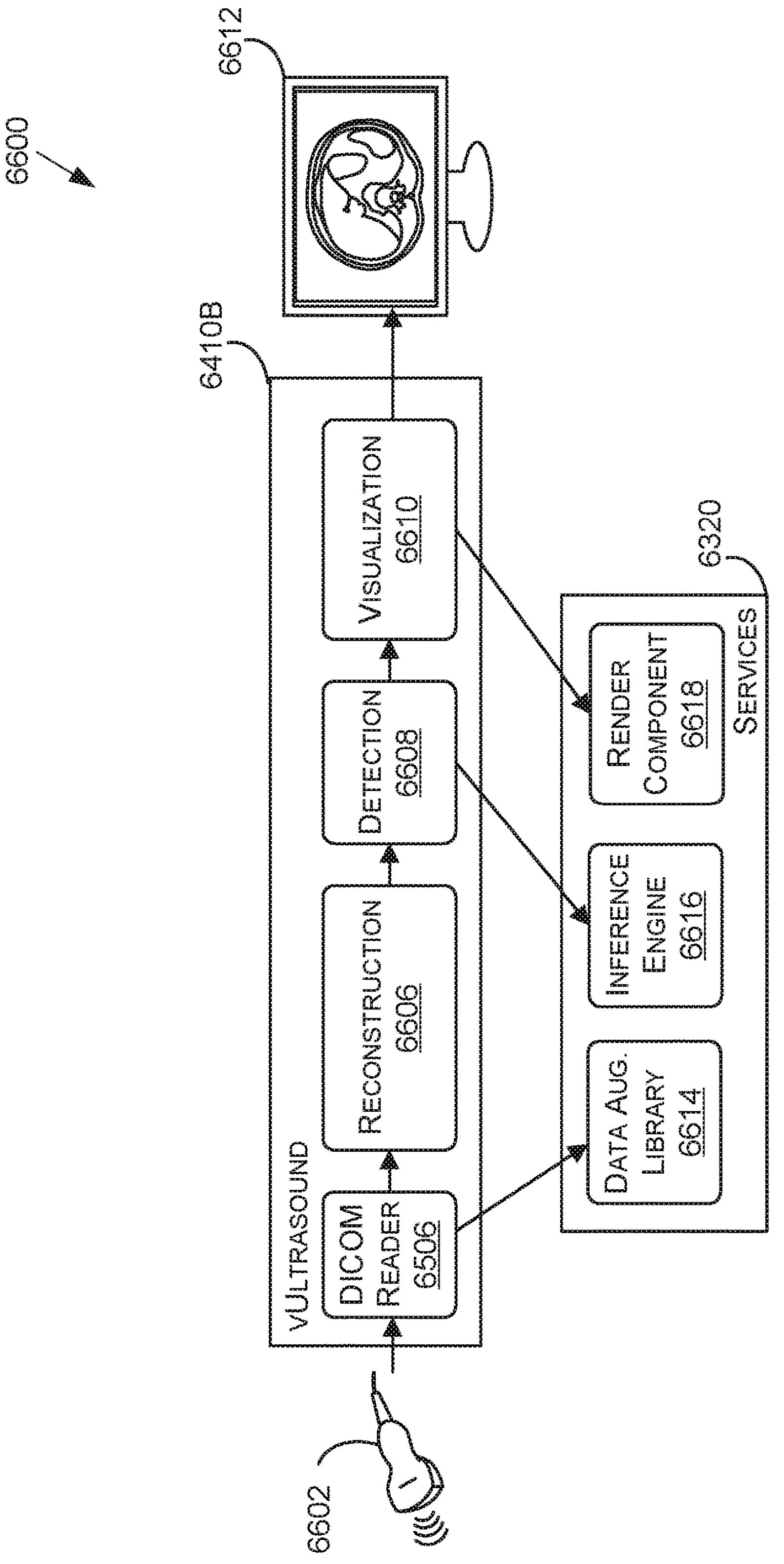
FIG. 66A includes an example data flow diagram of a virtual instrument supporting an ultrasound device, in accordance with at least one embodiment.
Figure 66B:
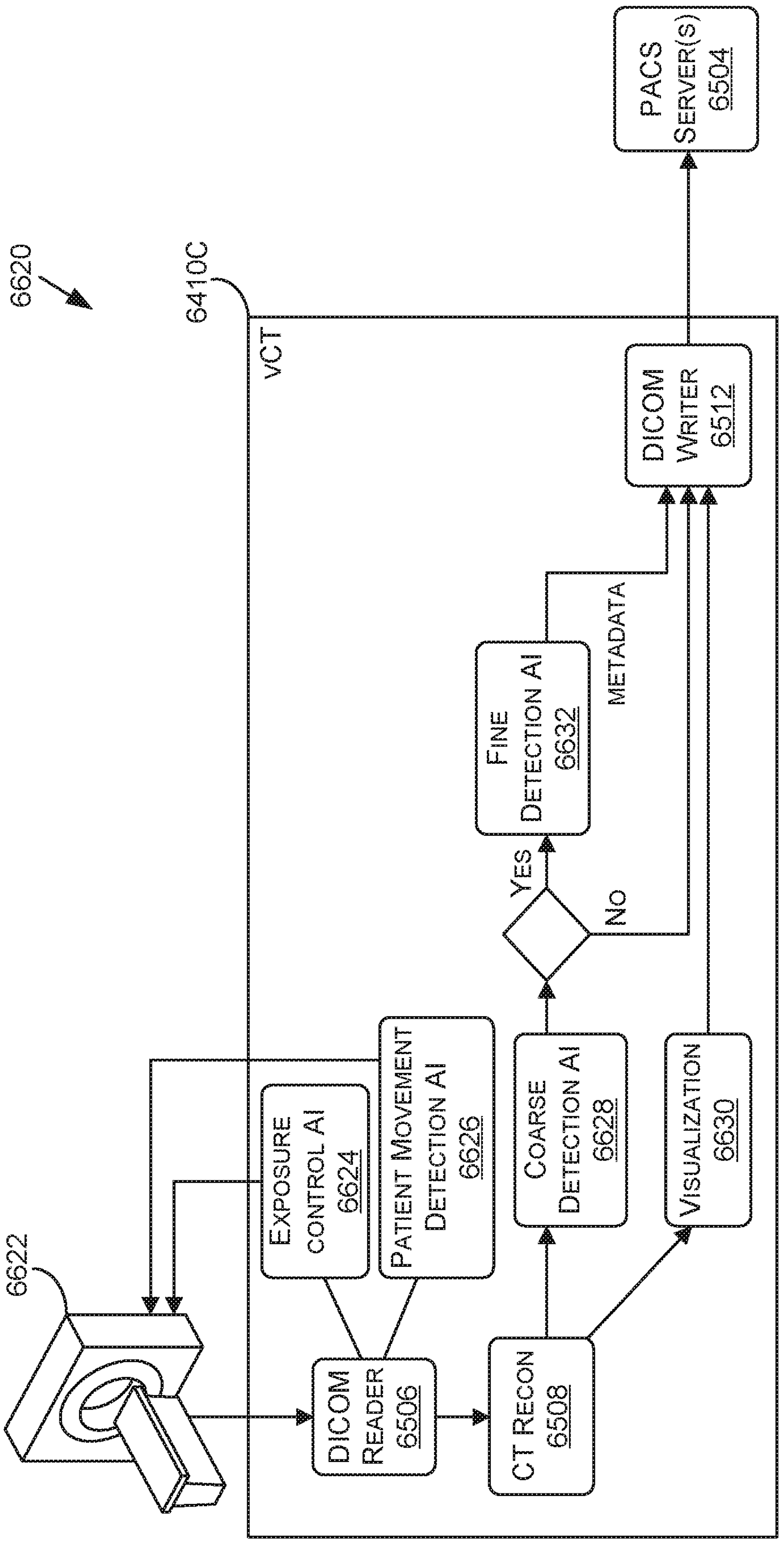
FIG. 66B includes an example data flow diagram of a virtual instrument supporting an CT scanner, in accordance with at least one embodiment.

In at least one embodiment, and with reference to FIGS. 66A and 66B, deployment system 6306 may be implemented as one or more virtual instruments to perform different functionalities—such as image processing, segmentation, enhancement, AI, visualization, and inferencing—with imaging devices (e.g., CT scanners, X-ray machines, MRI machines, etc.), sequencing devices, genomics devices, and/or other device types. In at least one embodiment, system 6400 may allow for creation and provision of virtual instruments that may include a software-defined deployment pipeline 6410 that may receive raw/unprocessed input data generated by a device(s) and output processed/reconstructed data. In at least one embodiment, deployment pipelines 6410 (e.g., 6410A and 6410B) that represent virtual instruments may implement intelligence into a pipeline, such as by leveraging machine learning models, to provide containerized inference support to a system. In at least one embodiment, virtual instruments may execute any number of containers each including instantiations of applications. In at least one embodiment, such as where real-time processing is desired, deployment pipelines 6410 representing virtual instruments may be static (e.g., containers and/or applications may be set), while in other examples, container and/or applications for virtual instruments may be selected (e.g., on a per-request basis) from a pool of applications or resources (e.g., within a container registry).

In at least one embodiment, system 6400 may be instantiated or executed as one or more virtual instruments on-premise at a facility in, for example, a computing system deployed next to or otherwise in communication with a radiology machine, an imaging device, and/or another device type at a facility. In at least one embodiment, however, an on-premise installation may be instantiated or executed within a computing system of a device itself (e.g., a computing system integral to an imaging device), in a local datacenter (e.g., a datacenter on-premise), and/or in a cloud-environment (e.g., in cloud 6426). In at least one embodiment, deployment system 6306, operating as a virtual instrument, may be instantiated by a supercomputer or other HPC system in some examples. In at least one embodiment, on-premise installation may allow for high-bandwidth uses (via, for example, higher throughput local communication interfaces, such as RF over Ethernet) for real-time processing. In at least one embodiment, real-time or near real-time processing may be particularly useful where a virtual instrument supports an ultrasound device or other imaging modality where immediate visualizations are expected or required for accurate diagnoses and analyses. In at least one embodiment, a cloud-computing architecture may be capable of dynamic bursting to a cloud computing service provider, or other compute cluster, when local demand exceeds on-premise capacity or capability. In at least one embodiment, a cloud architecture, when implemented, may be tuned for training neural networks or other machine learning models, as described herein with respect to training system 6304. In at least one embodiment, with training pipelines in place, machine learning models may be continuously learn and improve as they process additional data from devices they support. In at least one embodiment, virtual instruments may be continually improved using additional data, new data, existing machine learning models, and/or new or updated machine learning models.

In at least one embodiment, a computing system may include some or all of hardware 6322 described herein, and hardware 6322 may be distributed in any of a number of ways including within a device, as part of a computing device coupled to and located proximate a device, in a local datacenter at a facility, and/or in cloud 6426. In at least one embodiment, because deployment system 6306 and associated applications or containers are created in software (e.g., as discrete containerized instantiations of applications), behavior, operation, and configuration of virtual instruments, as well as outputs generated by virtual instruments, may be modified or customized as desired, without having to change or alter raw output of a device that a virtual instrument supports.

In at least one embodiment, at least one component shown or described with respect to FIG. 65 is used to perform techniques and/or functions described in connection with FIGS. 1-33. In at least one embodiment, at least one component shown or described with respect to FIG. 65 is used to cause one or more neural networks to cause one or more non-noise pixels to be identified and blended in parallel. In at least one embodiment, at least one component shown or described with respect to FIG. 65 is used to use one or more neural networks to adjust brightness of one or more pixels of one or more images prior to denoising the one or more images. In at least one embodiment, at least one component shown or described with respect to FIG. 65 is used to perform at least one aspect described with respect to FIGS. 1-33, and/or other systems, methods, or operations described herein.

FIG. 66A includes an example data flow diagram of a virtual instrument supporting an ultrasound device, in accordance with at least one embodiment. In at least one embodiment, deployment pipeline 6410B may leverage one or more of services 6320 of system 6400. In at least one embodiment, deployment pipeline 6410B and services 6320 may leverage hardware 6322 of a system either locally or in cloud 6426. In at least one embodiment, although not illustrated, process 6600 may be facilitated by pipeline manager 6412, application orchestration system 6428, and/or parallel computing platform 6430.

In at least one embodiment, process 6600 may include receipt of imaging data from an ultrasound device 6602. In at least one embodiment, imaging data may be stored on PACS server(s) in a DICOM format (or other format, such as RIS, CIS, REST compliant, RPC, raw, etc.), and may be received by system 6400 for processing through deployment pipeline 6410 selected or customized as a virtual instrument (e.g., a virtual ultrasound) for ultrasound device 6602. In at least one embodiment, imaging data may be received directly from an imaging device (e.g., ultrasound device 6602) and processed by a virtual instrument. In at least one embodiment, a transducer or other signal converter communicatively coupled between an imaging device and a virtual instrument may convert signal data generated by an imaging device to image data that may be processed by a virtual instrument. In at least one embodiment, raw data and/or image data may be applied to DICOM reader 6506 to extract data for use by applications or containers of deployment pipeline 6410B. In at least one embodiment, DICOM reader 6506 may leverage data augmentation library 6614 (e.g., NVIDIA's DALI) as a service 6320 (e.g., as one of compute service(s) 6416) for extracting, resizing, rescaling, and/or otherwise preparing data for use by applications or containers.

In at least one embodiment, once data is prepared, a reconstruction 6606 application and/or container may be executed to reconstruct data from ultrasound device 6602 into an image file. In at least one embodiment, after reconstruction 6606, or at a same time as reconstruction 6606, a detection 6608 application and/or container may be executed for anomaly detection, object detection, feature detection, and/or other detection tasks related to data. In at least one embodiment, an image file generated during reconstruction 6606 may be used during detection 6608 to identify anomalies, objects, features, etc. In at least one embodiment, detection 6608 application may leverage an inference engine 6616 (e.g., as one of AI service(s) 6418) to perform inference on data to generate detections. In at least one embodiment, one or more machine learning models (e.g., from training system 6304) may be executed or called by detection 6608 application.

In at least one embodiment, once reconstruction 6606 and/or detection 6608 is/are complete, data output from these application and/or containers may be used to generate visualizations 6610, such as visualization 6612 (e.g., a grayscale output) displayed on a workstation or display terminal. In at least one embodiment, visualization may allow a technician or other user to visualize results of deployment pipeline 6410B with respect to ultrasound device 6602. In at least one embodiment, visualization 6610 may be executed by leveraging a render component 6618 of system 6400 (e.g., one of visualization service(s) 6420). In at least one embodiment, render component 6618 may execute a 2D, OpenGL, or ray-tracing service to generate visualization 6612.

FIG. 66B includes an example data flow diagram of a virtual instrument supporting a CT scanner, in accordance with at least one embodiment. In at least one embodiment, deployment pipeline 6410C may leverage one or more of services 6320 of system 6400. In at least one embodiment, deployment pipeline 6410C and services 6320 may leverage hardware 6322 of a system either locally or in cloud 6426. In at least one embodiment, although not illustrated, process 6620 may be facilitated by pipeline manager 6412, application orchestration system 6428, and/or parallel computing platform 6430.

In at least one embodiment, process 6620 may include CT scanner 6622 generating raw data that may be received by DICOM reader 6506 (e.g., directly, via a PACS server 6504, after processing, etc.). In at least one embodiment, a Virtual CT (instantiated by deployment pipeline 6410C) may include a first, real-time pipeline for monitoring a patient (e.g., patient movement detection AI 6626) and/or for adjusting or optimizing exposure of CT scanner 6622 (e.g., using exposure control AI 6624). In at least one embodiment, one or more of applications (e.g., 6624 and 6626) may leverage a service 6320, such as AI service(s) 6418. In at least one embodiment, outputs of exposure control AI 6624 application (or container) and/or patient movement detection AI 6626 application (or container) may be used as feedback to CT scanner 6622 and/or a technician for adjusting exposure (or other settings of CT scanner 6622) and/or informing a patient to move less.

In at least one embodiment, deployment pipeline 6410C may include a non-real-time pipeline for analyzing data generated by CT scanner 6622. In at least one embodiment, a second pipeline may include CT reconstruction 6508 application and/or container, a coarse detection AI 6628 application and/or container, a fine detection AI 6632 application and/or container (e.g., where certain results are detected by coarse detection AI 6628), a visualization 6630 application and/or container, and a DICOM writer 6512 (and/or other data type writer, such as RIS, CIS, REST compliant, RPC, raw, etc.) application and/or container. In at least one embodiment, raw data generated by CT scanner 6622 may be passed through pipelines of deployment pipeline 6410C (instantiated as a virtual CT instrument) to generate results. In at least one embodiment, results from DICOM writer 6512 may be transmitted for display and/or may be stored on PACS server(s) 6504 for later retrieval, analysis, or display by a technician, practitioner, or other user.

In at least one embodiment, at least one component shown or described with respect to FIGS. 66A and 66B is used to perform techniques and/or functions described in connection with FIGS. 1-33. In at least one embodiment, at least one component shown or described with respect to FIGS. 66A and 66B is used to cause one or more neural networks to cause one or more non-noise pixels to be identified and blended in parallel. In at least one embodiment, at least one component shown or described with respect to FIGS. 66A and 66B is used to use one or more neural networks to adjust brightness of one or more pixels of one or more images prior to denoising the one or more images. In at least one embodiment, at least one component shown or described with respect to FIGS. 66A and 66B is used to perform at least one aspect described with respect to FIGS. 1-33, and/or other systems, methods, or operations described herein.

FIG. 67A illustrates a data flow diagram for a process 6700 to train, retrain, or update a machine learning model, in accordance with at least one embodiment. In at least one embodiment, process 6700 may be executed using, as a non-limiting example, system 6400 of FIG. 64. In at least one embodiment, process 6700 may leverage services 6320 and/or hardware 6322 of system 6400, as described herein. In at least one embodiment, refined models 6712 generated by process 6700 may be executed by deployment system 6306 for one or more containerized applications in deployment pipelines 6410.

In at least one embodiment, model training 6314 may include retraining or updating an initial model 6704 (e.g., a pre-trained model) using new training data (e.g., new input data, such as customer dataset 6706, and/or new ground truth data associated with input data). In at least one embodiment, to retrain, or update, initial model 6704, output or loss layer(s) of initial model 6704 may be reset, or deleted, and/or replaced with an updated or new output or loss layer(s). In at least one embodiment, initial model 6704 may have previously fine-tuned parameters (e.g., weights and/or biases) that remain from prior training, so training or retraining 6314 may not take as long or require as much processing as training a model from scratch. In at least one embodiment, during model training 6314, by having reset or replaced output or loss layer(s) of initial model 6704, parameters may be updated and re-tuned for a new data set based on loss calculations associated with accuracy of output or loss layer(s) at generating predictions on new, customer dataset 6706 (e.g., image data 6308 of FIG. 63).

In at least one embodiment, pre-trained models 6406 may be stored in a data store, or registry (e.g., model registry 6324 of FIG. 63). In at least one embodiment, pre-trained models 6406 may have been trained, at least in part, at one or more facilities other than a facility executing process 6700. In at least one embodiment, to protect privacy and rights of patients, subjects, or clients of different facilities, pre-trained models 6406 may have been trained, on-premise, using customer or patient data generated on-premise. In at least one embodiment, pre-trained models 6406 may be trained using cloud 6426 and/or other hardware 6322, but confidential, privacy protected patient data may not be transferred to, used by, or accessible to any components of cloud 6426 (or other off premise hardware). In at least one embodiment, where a pre-trained model 6406 is trained at using patient data from more than one facility, pre-trained model 6406 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 6406 on-premise and/or off premise, such as in a datacenter or other cloud computing infrastructure.

In at least one embodiment, when selecting applications for use in deployment pipelines 6410, a user may also select machine learning models to be used for specific applications. In at least one embodiment, a user may not have a model for use, so a user may select a pre-trained model 6406 to use with an application. In at least one embodiment, pre-trained model 6406 may not be optimized for generating accurate results on customer dataset 6706 of a facility of a user (e.g., based on patient diversity, demographics, types of medical imaging devices used, etc.). In at least one embodiment, prior to deploying pre-trained model 6406 into deployment pipeline 6410 for use with an application(s), pre-trained model 6406 may be updated, retrained, and/or fine-tuned for use at a respective facility.

In at least one embodiment, a user may select pre-trained model 6406 that is to be updated, retrained, and/or fine-tuned, and pre-trained model 6406 may be referred to as initial model 6704 for training system 6304 within process 6700. In at least one embodiment, customer dataset 6706 (e.g., imaging data, genomics data, sequencing data, or other data types generated by devices at a facility) may be used to perform model training 6314 (which may include, without limitation, transfer learning) on initial model 6704 to generate refined model 6712. In at least one embodiment, ground truth data corresponding to customer dataset 6706 may be generated by training system 6304. In at least one embodiment, ground truth data may be generated, at least in part, by clinicians, scientists, doctors, practitioners, at a facility (e.g., as labeled clinic data 6312 of FIG. 63).

In at least one embodiment, AI-assisted annotation 6310 may be used in some examples to generate ground truth data. In at least one embodiment, AI-assisted annotation 6310 (e.g., implemented using an AI-assisted annotation SDK) may leverage machine learning models (e.g., neural networks) to generate suggested or predicted ground truth data for a customer dataset. In at least one embodiment, user 6710 may use annotation tools within a user interface (a graphical user interface (GUI)) on computing device 6708.

In at least one embodiment, user 6710 may interact with a GUI via computing device 6708 to edit or fine-tune annotations or auto-annotations. In at least one embodiment, a polygon editing feature may be used to move vertices of a polygon to more accurate or fine-tuned locations.

In at least one embodiment, once customer dataset 6706 has associated ground truth data, ground truth data (e.g., from AI-assisted annotation, manual labeling, etc.) may be used by during model training 6314 to generate refined model 6712. In at least one embodiment, customer dataset 6706 may be applied to initial model 6704 any number of times, and ground truth data may be used to update parameters of initial model 6704 until an acceptable level of accuracy is attained for refined model 6712. In at least one embodiment, once refined model 6712 is generated, refined model 6712 may be deployed within one or more deployment pipelines 6410 at a facility for performing one or more processing tasks with respect to medical imaging data.

In at least one embodiment, refined model 6712 may be uploaded to pre-trained models 6406 in model registry 6324 to be selected by another facility. In at least one embodiment, his process may be completed at any number of facilities such that refined model 6712 may be further refined on new datasets any number of times to generate a more universal model.

FIG. 67B is an example illustration of a client-server architecture 6732 to enhance annotation tools with pre-trained annotation models, in accordance with at least one embodiment. In at least one embodiment, AI-assisted annotation tools 6736 may be instantiated based on a client-server architecture 6732. In at least one embodiment, annotation tools 6736 in imaging applications may aid radiologists, for example, identify organs and abnormalities. In at least one embodiment, imaging applications may include software tools that help user 6710 to identify, as a non-limiting example, a few extreme points on a particular organ of interest in raw images 6734 (e.g., in a 3D MRI or CT scan) and receive auto-annotated results for all 2D slices of a particular organ. In at least one embodiment, results may be stored in a data store as training data 6738 and used as (for example and without limitation) ground truth data for training. In at least one embodiment, when computing device 6708 sends extreme points for AI-assisted annotation 6310, a deep learning model, for example, may receive this data as input and return inference results of a segmented organ or abnormality. In at least one embodiment, pre-instantiated annotation tools, such as AI-Assisted Annotation Tool 6736B in FIG. 67B, may be enhanced by making API calls (e.g., API Call 6744) to a server, such as an Annotation Assistant Server 6740 that may include a set of pre-trained models 6742 stored in an annotation model registry, for example. In at least one embodiment, an annotation model registry may store pre-trained models 6742 (e.g., machine learning models, such as deep learning models) that are pre-trained to perform AI-assisted annotation on a particular organ or abnormality. In at least one embodiment, these models may be further updated by using training pipelines 6404. In at least one embodiment, pre-installed annotation tools may be improved over time as new labeled clinic data 6312 is added.

Inference and/or training logic 3415 are used to perform inferencing and/or training operations associated with one or more embodiments. Details regarding inference and/or training logic 3415 are provided herein in conjunction with FIGS. 34A and/or 34B.

In at least one embodiment, at least one component shown or described with respect to FIGS. 67A and 67B is used to perform techniques and/or functions described in connection with FIGS. 1-33. In at least one embodiment, at least one component shown or described with respect to FIGS. 67A and 67B is used to cause one or more neural networks to cause one or more non-noise pixels to be identified and blended in parallel. In at least one embodiment, at least one component shown or described with respect to FIGS. 67A and 67B is used to use one or more neural networks to adjust brightness of one or more pixels of one or more images prior to denoising the one or more images. In at least one embodiment, at least one component shown or described with respect to FIGS. 67A and 67B is used to perform at least one aspect described with respect to FIGS. 1-33, and/or other systems, methods, or operations described herein.

Figure 68:
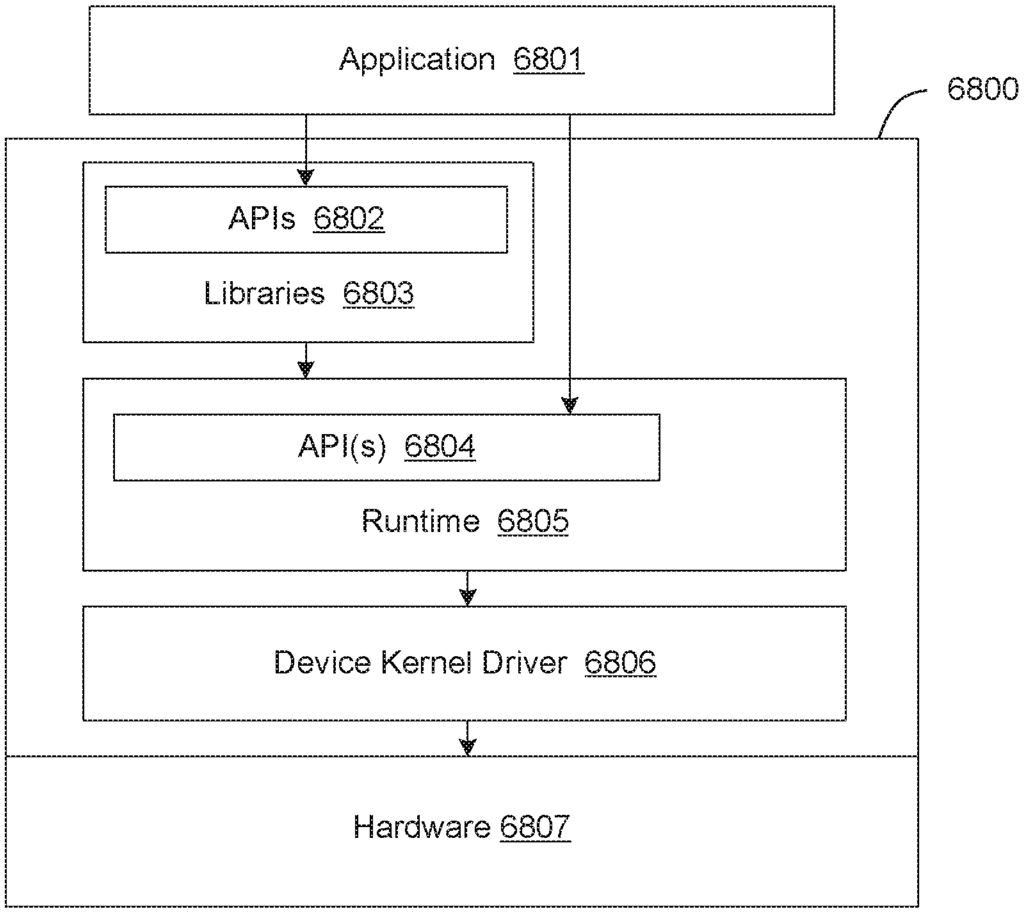
FIG. 68 illustrates a software stack of a programming platform, in accordance with at least one embodiment.

FIG. 68 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 6800 of a programming platform provides an execution environment for an application 6801. In at least one embodiment, application 6801 may include any computer software capable of being launched on software stack 6800. In at least one embodiment, application 6801 may include, but is not limited to, an artificial intelligence ("AI")/machine learning ("ML") application, a high performance computing ("HPC") application, a virtual desktop infrastructure ("VDI"), or a data center workload.

In at least one embodiment, application 6801 and software stack 6800 run on hardware 6807. Hardware 6807 may include one or more GPUs, CPUs, FPGAs, AI engines, and/or other types of compute devices that support a programming platform, in at least one embodiment. In at least one embodiment, such as with CUDA, software stack 6800 may be vendor specific and compatible with only devices from particular vendor(s). In at least one embodiment, such as in with OpenCL, software stack 6800 may be used with devices from different vendors. In at least one embodiment, hardware 6807 includes a host connected to one more devices that can be accessed to perform computational tasks via application programming interface ("API") calls. A device within hardware 6807 may include, but is not limited to, a GPU, FPGA, AI engine, or other compute device (but may also include a CPU) and its memory, as opposed to a host within hardware 6807 that may include, but is not limited to, a CPU (but may also include a compute device) and its memory, in at least one embodiment.

In at least one embodiment, software stack 6800 of a programming platform includes, without limitation, a number of libraries 6803, a runtime 6805, and a device kernel driver 6806. Each of libraries 6803 may include data and programming code that can be used by computer programs and leveraged during software development, in at least one embodiment. In at least one embodiment, libraries 6803 may include, but are not limited to, pre-written code and subroutines, classes, values, type specifications, configuration data, documentation, help data, and/or message templates. In at least one embodiment, libraries 6803 include functions that are optimized for execution on one or more types of devices. In at least one embodiment, libraries 6803 may include, but are not limited to, functions for performing mathematical, deep learning, and/or other types of operations on devices. In at least one embodiment, libraries 6903 are associated with corresponding APIs 6902, which may include one or more APIs, that expose functions implemented in libraries 6903.

In at least one embodiment, application 6801 is written as source code that is compiled into executable code, as discussed in greater detail below in conjunction with FIG. 73. Executable code of application 6801 may run, at least in part, on an execution environment provided by software stack 6800, in at least one embodiment. In at least one embodiment, during execution of application 6801, code may be reached that needs to run on a device, as opposed to a host. In such a case, runtime 6805 may be called to load and launch requisite code on a device, in at least one embodiment. In at least one embodiment, runtime 6805 may include any technically feasible runtime system that is able to support execution of application S01.

In at least one embodiment, runtime 6805 is implemented as one or more runtime libraries associated with corresponding APIs, which are shown as API(s) 6804. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 6804 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 6806 is configured to facilitate communication with an underlying device. In at least one embodiment, device kernel driver 6806 may provide low-level functionalities upon which APIs, such as API(s) 6804, and/or other software relies. In at least one embodiment, device kernel driver 6806 may be configured to compile intermediate representation ("IR") code into binary code at runtime. For CUDA, device kernel driver 6806 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 6806 to compile IR code at runtime.

In at least one embodiment, at least one component shown or described with respect to FIG. 68 is used to perform techniques and/or functions described in connection with FIGS. 1-33. In at least one embodiment, at least one component shown or described with respect to FIG. 68 is used to cause one or more neural networks to cause one or more non-noise pixels to be identified and blended in parallel. In at least one embodiment, at least one component shown or described with respect to FIG. 68 is used to use one or more neural networks to adjust brightness of one or more pixels of one or more images prior to denoising the one or more images. In at least one embodiment, at least one component shown or described with respect to FIG. 68 is used to perform at least one aspect described with respect to FIGS. 1-33, and/or other systems, methods, or operations described herein.

Figure 69:
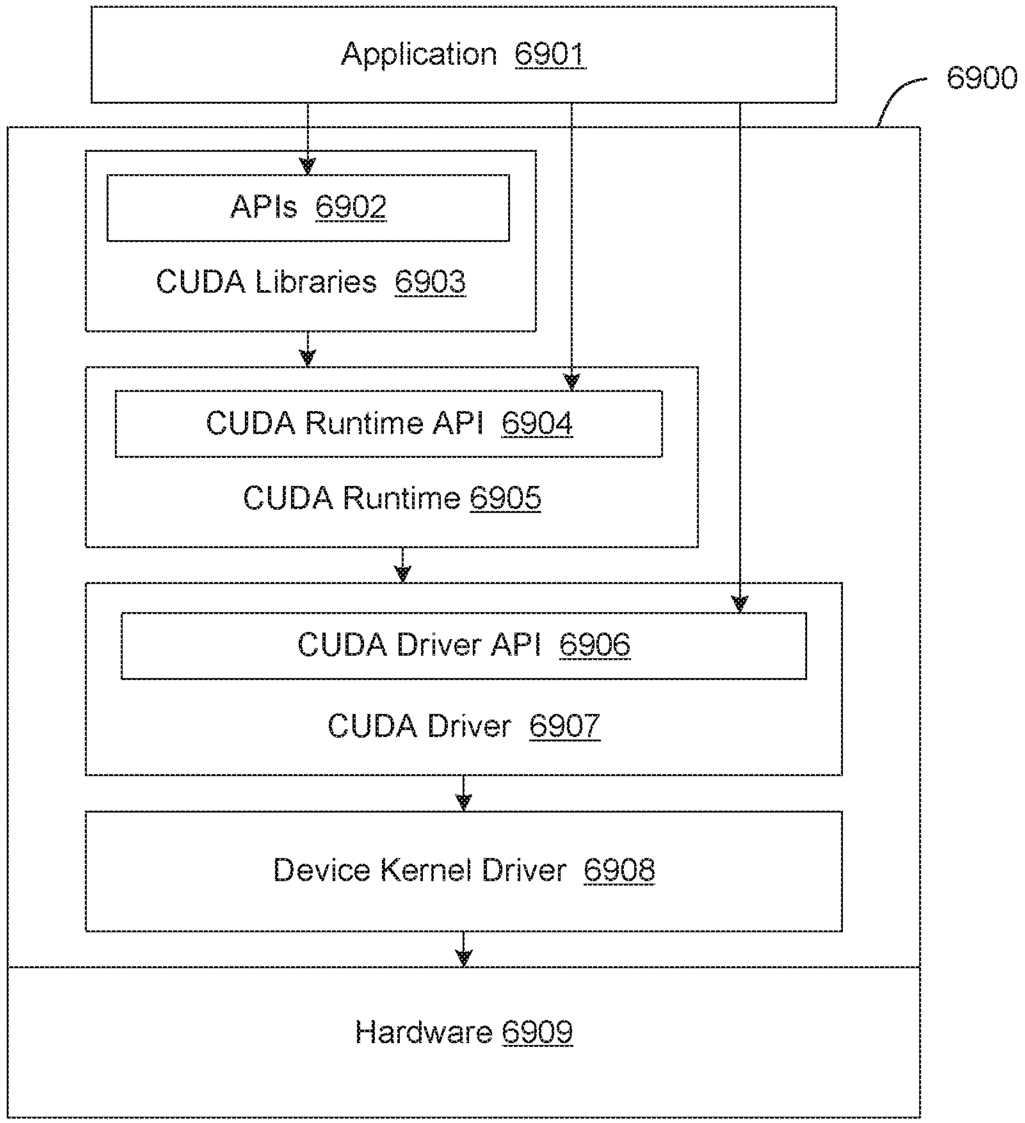
FIG. 69 illustrates a CUDA implementation of a software stack of FIG. 68, in accordance with at least one embodiment.

FIG. 69 illustrates a CUDA implementation of software stack 6800 of FIG. 68, in accordance with at least one embodiment. In at least one embodiment, a CUDA software stack 6900, on which an application 6901 may be launched, includes CUDA libraries 6903, a CUDA runtime 6905, a CUDA driver 6907, and a device kernel driver 6908. In at least one embodiment, CUDA software stack 6900 executes on hardware 6909, which may include a GPU that supports CUDA and is developed by NVIDIA Corporation of Santa Clara, CA.

In at least one embodiment, application 6901, CUDA runtime 6905, and device kernel driver 6908 may perform similar functionalities as application 6801, runtime 6805, and device kernel driver 6806, respectively, which are described above in conjunction with FIG. 68. In at least one embodiment, CUDA driver 6907 includes a library (libcuda.so) that implements a CUDA driver API 6906. Similar to a CUDA runtime API 6904 implemented by a CUDA runtime library (cudart), CUDA driver API 6906 may, without limitation, expose functions for memory management, execution control, device management, error handling, synchronization, and/or graphics interoperability, among other things, in at least one embodiment. In at least one embodiment, CUDA driver API 6906 differs from CUDA runtime API 6904 in that CUDA runtime API 6904 simplifies device code management by providing implicit initialization, context (analogous to a process) management, and module (analogous to dynamically loaded libraries) management. In contrast to high-level CUDA runtime API 6904, CUDA driver API 6906 is a low-level API providing more fine-grained control of a device, particularly with respect to contexts and module loading, in at least one embodiment. In at least one embodiment, CUDA driver API 6906 may expose functions for context management that are not exposed by CUDA runtime API 6904. In at least one embodiment, CUDA driver API 6906 is also language-independent and supports, e.g., OpenCL in addition to CUDA runtime API 6904. Further, in at least one embodiment, development libraries, including CUDA runtime 6905, may be considered as separate from driver components, including user-mode CUDA driver 6907 and kernel-mode device driver 6908 (also sometimes referred to as a "display" driver).

In at least one embodiment, CUDA libraries 6903 may include, but are not limited to, mathematical libraries, deep learning libraries, parallel algorithm libraries, and/or signal/image/video processing libraries, which parallel computing applications such as application 6901 may utilize. In at least one embodiment, CUDA libraries 6903 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 6903 may include deep learning libraries such as a cuDNN library of primitives for deep neural networks and a TensorRT platform for high-performance deep learning inference, among others.

In at least one embodiment, at least one component shown or described with respect to FIG. 69 is used to perform techniques and/or functions described in connection with FIGS. 1-33. In at least one embodiment, at least one component shown or described with respect to FIG. 69 is used to cause one or more neural networks to cause one or more non-noise pixels to be identified and blended in parallel. In at least one embodiment, at least one component shown or described with respect to FIG. 69 is used to use one or more neural networks to adjust brightness of one or more pixels of one or more images prior to denoising the one or more images. In at least one embodiment, at least one component shown or described with respect to FIG. 69 is used to perform at least one aspect described with respect to FIGS. 1-33, and/or other systems, methods, or operations described herein.

Figure 70:
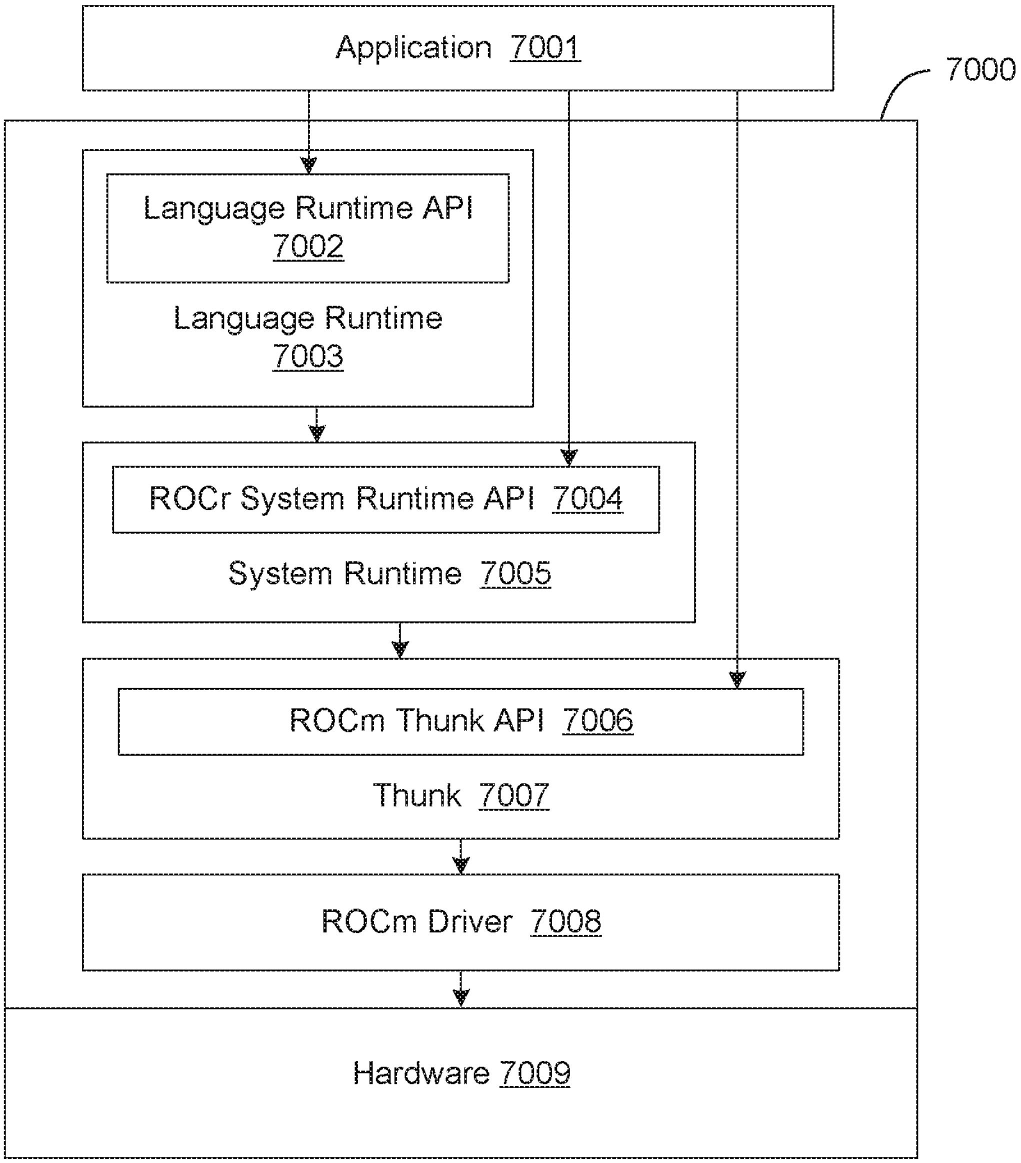
FIG. 70 illustrates a ROCm implementation of a software stack of FIG. 68, in accordance with at least one embodiment.

FIG. 70 illustrates a ROCm implementation of software stack 6800 of FIG. 68, in accordance with at least one embodiment. In at least one embodiment, a ROCm software stack 7000, on which an application 7001 may be launched, includes a language runtime 7003, a system runtime 7005, a thunk 7007, a ROCm kernel driver 7008, and a device kernel driver 7009. In at least one embodiment, ROCm software stack 7000 executes on hardware 7010, which may include a GPU that supports ROCm and is developed by AMD Corporation of Santa Clara, CA.

In at least one embodiment, application 7001 may perform similar functionalities as application 6801 discussed above in conjunction with FIG. 68. In addition, language runtime 7003 and system runtime 7005 may perform similar functionalities as runtime 6805 discussed above in conjunction with FIG. 68, in at least one embodiment. In at least one embodiment, language runtime 7003 and system runtime 7005 differ in that system runtime 7005 is a language-independent runtime that implements a ROCr system runtime API 7004 and makes use of a Heterogeneous System Architecture ("HAS") Runtime API. HAS runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 7005, language runtime 7003 is an implementation of a language-specific runtime API 7002 layered on top of ROCr system runtime API 7004, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 6904 discussed above in conjunction with FIG. 69, such as functions for memory management, execution control, device management, error handling, and synchronization, among other things.

In at least one embodiment, thunk (ROCt) 7007 is an interface that can be used to interact with underlying ROCm driver 7008. In at least one embodiment, ROCm driver 7008 is a ROCK driver, which is a combination of an AMDGPU driver and a HAS kernel driver (amdkfd). In at least one embodiment, AMDGPU driver is a device kernel driver for GPUs developed by AMD that performs similar functionalities as device kernel driver 6806 discussed above in conjunction with FIG. 68. In at least one embodiment, HAS kernel driver is a driver permitting different types of processors to share system resources more effectively via hardware features.

In at least one embodiment, various libraries (not shown) may be included in ROCm software stack 7000 above language runtime 7003 and provide functionality similarity to CUDA libraries 6903, discussed above in conjunction with FIG. 69. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

In at least one embodiment, at least one component shown or described with respect to FIG. 70 is used to perform techniques and/or functions described in connection with FIGS. 1-33. In at least one embodiment, at least one component shown or described with respect to FIG. 70 is used to cause one or more neural networks to cause one or more non-noise pixels to be identified and blended in parallel. In at least one embodiment, at least one component shown or described with respect to FIG. 70 is used to use one or more neural networks to adjust brightness of one or more pixels of one or more images prior to denoising the one or more images. In at least one embodiment, at least one component shown or described with respect to FIG. 70 is used to perform at least one aspect described with respect to FIGS. 1-33, and/or other systems, methods, or operations described herein.

Figure 71:
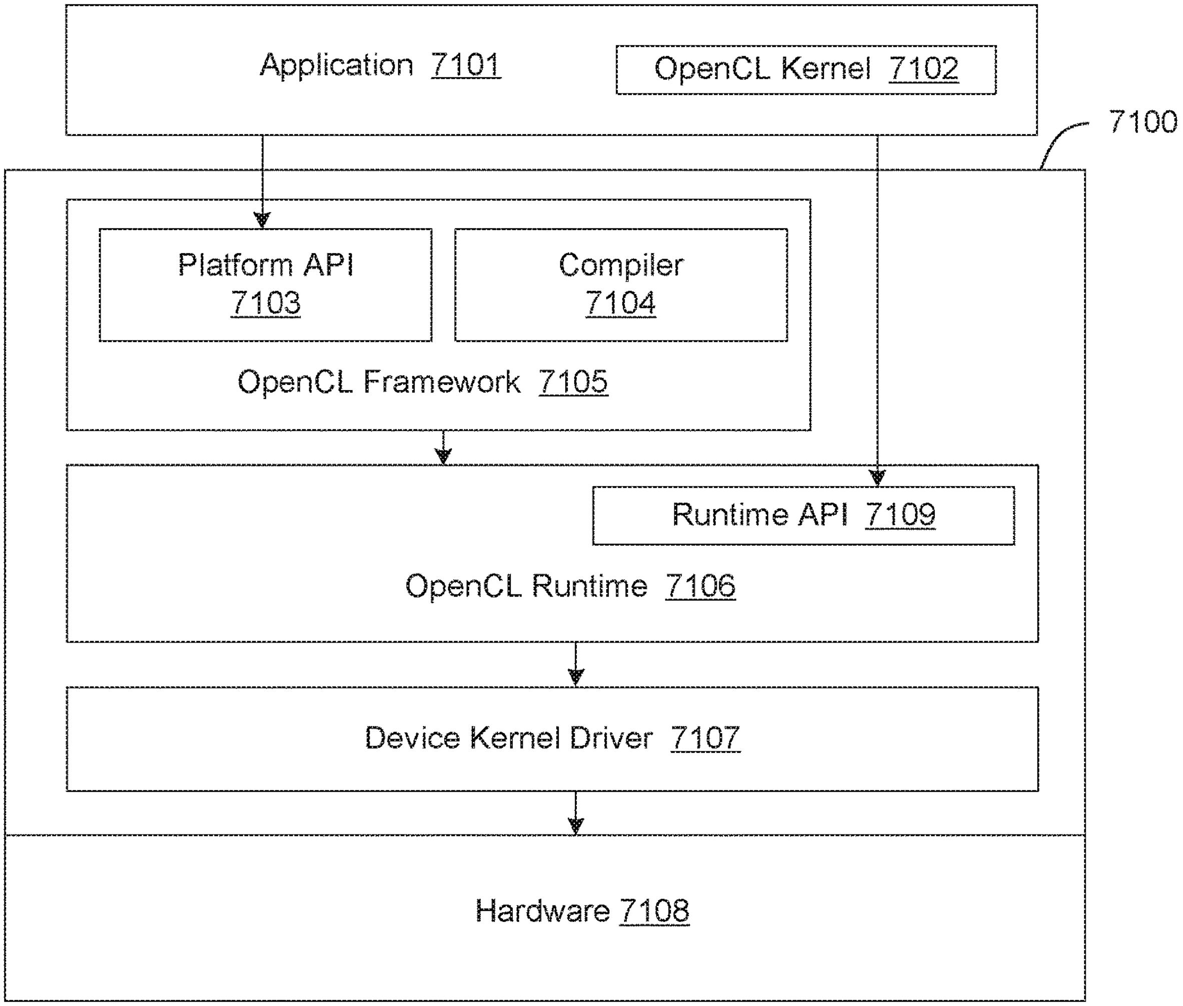
FIG. 71 illustrates an OpenCL implementation of a software stack of FIG. 68, in accordance with at least one embodiment.

FIG. 71 illustrates an OpenCL implementation of software stack 6800 of FIG. 68, in accordance with at least one embodiment. In at least one embodiment, an OpenCL software stack 7100, on which an application 7101 may be launched, includes an OpenCL framework 7105, an OpenCL runtime 7106, and a driver 7107. In at least one embodiment, OpenCL software stack 7100 executes on hardware 6909 that is not vendor-specific. As OpenCL is supported by devices developed by different vendors, specific OpenCL drivers may be required to interoperate with hardware from such vendors, in at least one embodiment.

In at least one embodiment, application 7101, OpenCL runtime 7106, device kernel driver 7107, and hardware 7108 may perform similar functionalities as application 6801, runtime 6805, device kernel driver 6806, and hardware 6807, respectively, that are discussed above in conjunction with FIG. 68. In at least one embodiment, application 7101 further includes an OpenCL kernel 7102 with code that is to be executed on a device.

In at least one embodiment, OpenCL defines a "platform" that allows a host to control devices connected to a host. In at least one embodiment, an OpenCL framework provides a platform layer API and a runtime API, shown as platform API 7103 and runtime API 7109. In at least one embodiment, runtime API 7109 uses contexts to manage execution of kernels on devices. In at least one embodiment, each identified device may be associated with a respective context, which runtime API 7109 may use to manage command queues, program objects, and kernel objects, share memory objects, among other things, for that device. In at least one embodiment, platform API 7103 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 7104 is also included in OpenCL frame-work 7105. Source code may be compiled offline prior to executing an application or online during execution of an application, in at least one embodiment. In contrast to CUDA and ROCm, OpenCL applications in at least one embodiment may be compiled online by compiler 7104, which is included to be representative of any number of compilers that may be used to compile source code and/or IR code, such as Standard Portable Intermediate Representation ("SPIR-V") code, into binary code. Alternatively, in at least one embodiment, OpenCL applications may be compiled offline, prior to execution of such applications.

In at least one embodiment, at least one component shown or described with respect to FIG. 71 is used to perform techniques and/or functions described in connection with FIGS. 1-33. In at least one embodiment, at least one component shown or described with respect to FIG. 71 is used to cause one or more neural networks to cause one or more non-noise pixels to be identified and blended in parallel. In at least one embodiment, at least one component shown or described with respect to FIG. 71 is used to use one or more neural networks to adjust brightness of one or more pixels of one or more images prior to denoising the one or more images. In at least one embodiment, at least one component shown or described with respect to FIG. 71 is used to perform at least one aspect described with respect to FIGS. 1-33, and/or other systems, methods, or operations described herein.

Figure 72:
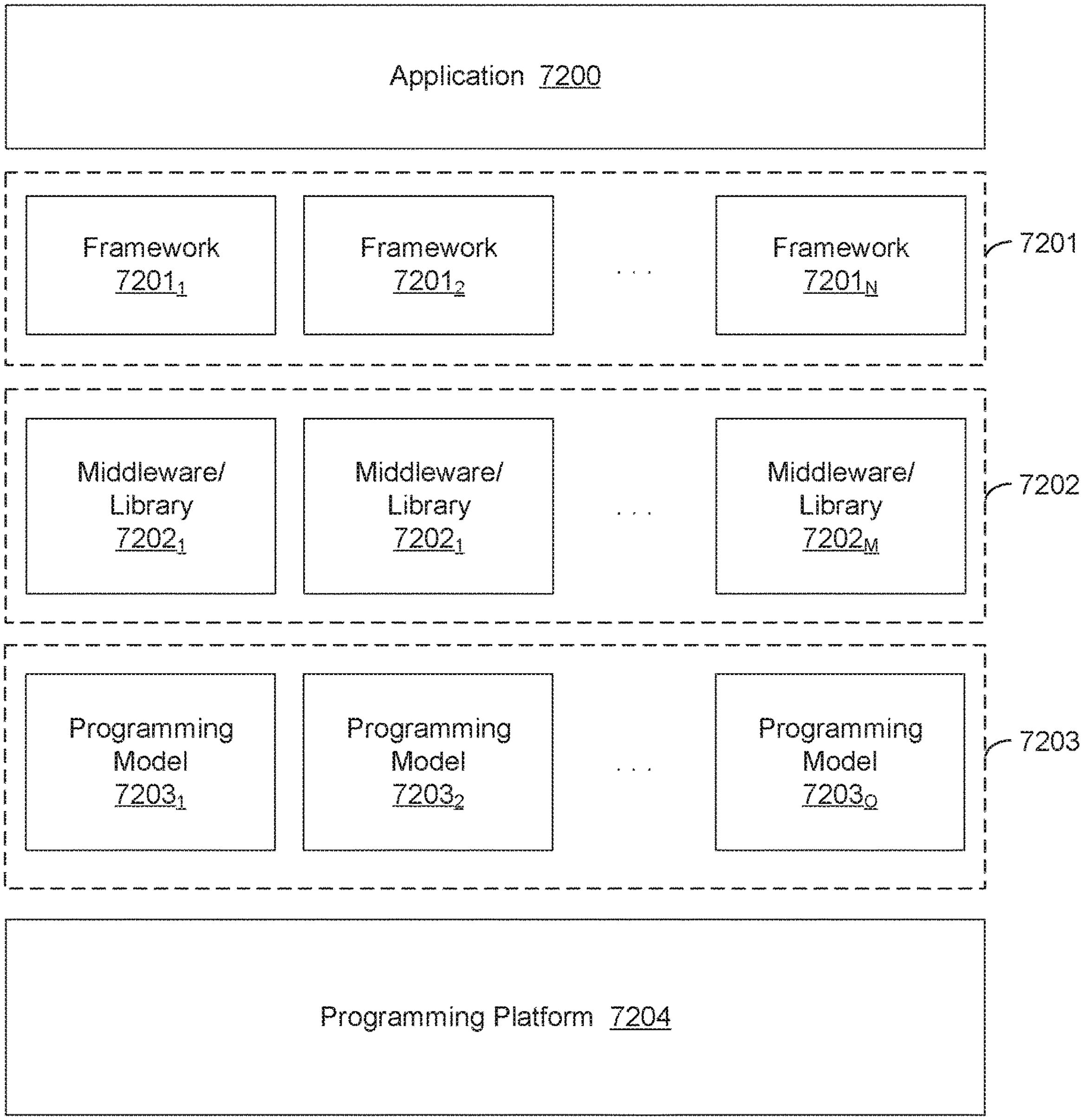
FIG. 72 illustrates software that is supported by a programming platform, in accordance with at least one embodiment.

FIG. 72 illustrates software that is supported by a programming platform, in accordance with at least one embodiment. In at least one embodiment, a programming platform 7204 is configured to support various programming models 7203, middlewares and/or libraries 7202, and frameworks 7201 that an application 7200 may rely upon. In at least one embodiment, application 7200 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, programming platform 7204 may be one of a CUDA, ROCm, or OpenCL platform described above in conjunction with FIG. 69, FIG. 70, and FIG. 71, respectively. In at least one embodiment, programming platform 7204 supports multiple programming models 7203, which are abstractions of an underlying computing system permitting expressions of algorithms and data structures. Programming models 7203 may expose features of underlying hardware in order to improve performance, in at least one embodiment. In at least one embodiment, programming models 7203 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 7202 provide implementations of abstractions of programming models 7204. In at least one embodiment, such libraries include data and programming code that may be used by computer programs and leveraged during software development. In at least one embodiment, such middlewares include software that provides services to applications beyond those available from programming platform 7204. In at least one embodiment, libraries and/or middlewares 7202 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 7202 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 7201 depend on libraries and/or middlewares 7202. In at least one embodiment, each of application frameworks 7201 is a software framework used to implement a standard structure of application software. An AI/ML application may be implemented using a framework such as Caffe, Caffe2, TensorFlow, Keras, PyTorch, or MxNet deep learning frameworks, in at least one embodiment.

In at least one embodiment, at least one component shown or described with respect to FIG. 72 is used to perform techniques and/or functions described in connection with FIGS. 1-33. In at least one embodiment, at least one component shown or described with respect to FIG. 72 is used to cause one or more neural networks to cause one or more non-noise pixels to be identified and blended in parallel. In at least one embodiment, at least one component shown or described with respect to FIG. 72 is used to use one or more neural networks to adjust brightness of one or more pixels of one or more images prior to denoising the one or more images. In at least one embodiment, at least one component shown or described with respect to FIG. 72 is used to perform at least one aspect described with respect to FIGS. 1-33, and/or other systems, methods, or operations described herein.

Figure 73:
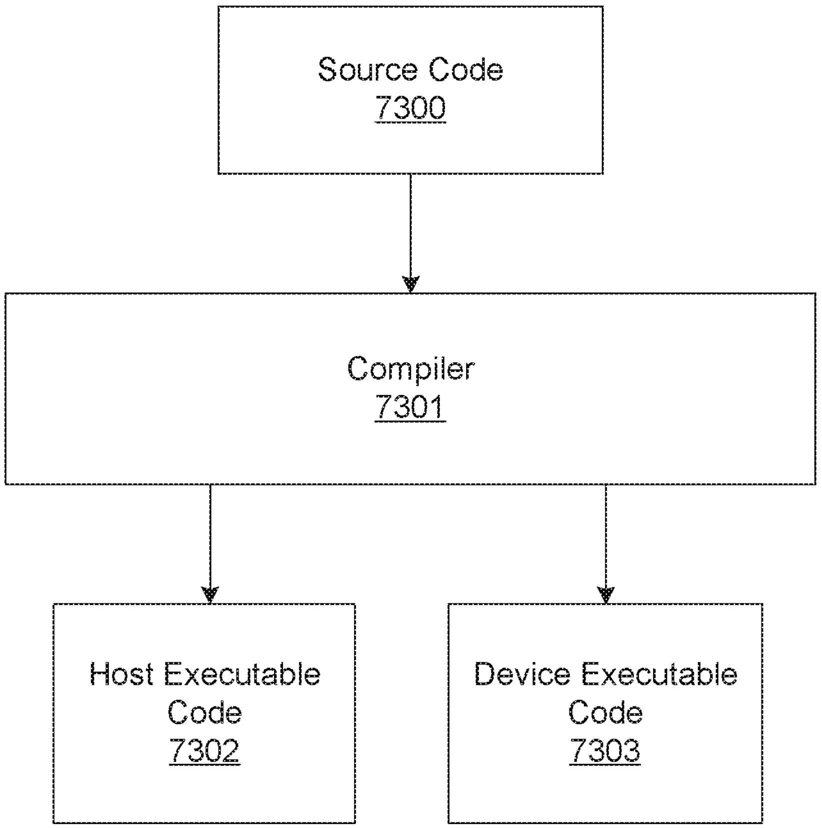
FIG. 73 illustrates compiling code to execute on programming platforms of FIGS. 68-71, in accordance with at least one embodiment.

FIG. 73 illustrates compiling code to execute on one of programming platforms of FIGS. 68-71, in accordance with at least one embodiment. In at least one embodiment, a compiler 7301 receives source code 7300 that includes both host code as well as device code. In at least one embodiment, complier 7301 is configured to convert source code 7300 into host executable code 7302 for execution on a host and device executable code 7303 for execution on a device. In at least one embodiment, source code 7300 may either be compiled offline prior to execution of an application, or online during execution of an application.

In at least one embodiment, source code 7300 may include code in any programming language supported by compiler 7301, such as C++, C, Fortran, etc. In at least one embodiment, source code 7300 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 7300 may include multiple source code files, rather than a single-source file, into which host code and device code are separated.

In at least one embodiment, compiler 7301 is configured to compile source code 7300 into host executable code 7302 for execution on a host and device executable code 7303 for execution on a device. In at least one embodiment, compiler 7301 performs operations including parsing source code 7300 into an abstract system tree (AST), performing optimizations, and generating executable code. In at least one embodiment in which source code 7300 includes a single-source file, compiler 7301 may separate device code from host code in such a single-source file, compile device code and host code into device executable code 7303 and host executable code 7302, respectively, and link device executable code 7303 and host executable code 7302 together in a single file.

In at least one embodiment, host executable code 7302 and device executable code 7303 may be in any suitable format, such as binary code and/or IR code. In a case of CUDA, host executable code 7302 may include native object code and device executable code 7303 may include code in PTX intermediate representation, in at least one embodiment. In a case of ROCm, both host executable code 7302 and device executable code 7303 may include target binary code, in at least one embodiment.

In at least one embodiment, at least one component shown or described with respect to FIG. 73 is used to perform techniques and/or functions described in connection with FIGS. 1-33. In at least one embodiment, at least one component shown or described with respect to FIG. 73 is used to cause one or more neural networks to cause one or more non-noise pixels to be identified and blended in parallel. In at least one embodiment, at least one component shown or described with respect to FIG. 73 is used to use one or more neural networks to adjust brightness of one or more pixels of one or more images prior to denoising the one or more images. In at least one embodiment, at least one component shown or described with respect to FIG. 73 is used to perform at least one aspect described with respect to FIGS. 1-33, and/or other systems, methods, or operations described herein.

Figure 74:
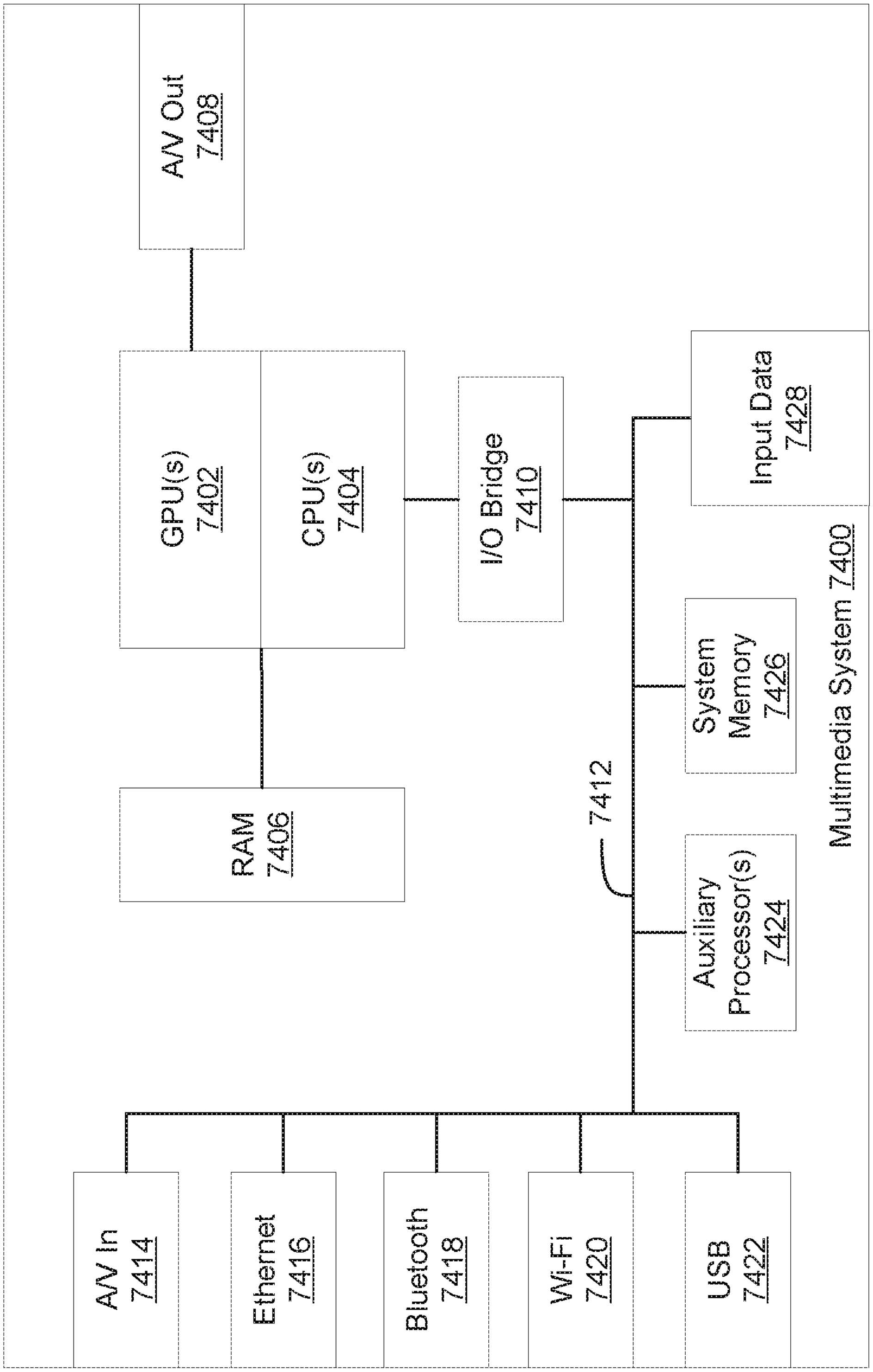
FIG. 74 illustrates a multimedia system, in accordance with at least one embodiment.

FIG. 74 illustrates a multimedia system, according to at least one embodiment. In at least one embodiment, a multimedia system is referred to as a gaming system, multimedia console, gaming console, and/or variations thereof. In at least one embodiment, FIG. 74 illustrates an overall system architecture of a computer game processing apparatus.

In at least one embodiment, multimedia system 7400 comprises graphics processing units (GPUs) 7402. In at least one embodiment, GPU(s) 7402, optionally in conjunction with CPU(s) 7404, generates video images and audio for output via audio/video (A/V) output 7408. In at least one embodiment, audio is generated in conjunction with or instead by an audio processor. In at least one embodiment, GPU(s) 7402 utilize a video encoder/video codec (e.g., coder/decoder) to form a video processing pipeline for graphics processing. In at least one embodiment, data is provided from GPU(s) 7402 to a video encoder/video codec and output to A/V output 7408 for transmission to a display. In at least one embodiment, GPU(s) 7402 is connected to one or more memory controllers to facilitate access to various types of memory, such as random access memory (RAM) 7406.

In at least one embodiment, GPU(s) 7402 is part of a processing unit comprising central processing units (CPUs) 7404. In at least one embodiment, GPU(s) 7402 and CPU(s) 7404 are part of an accelerated processing unit (APU). In at least one embodiment, CPU(s) 7404 comprise at least a level 1 cache, level 2 cache, and memory. In at least one embodiment, a level 1 cache and a level 2 cache temporarily store data and reduce a number of memory access cycles. In at least one embodiment, CPU(s) 7404 comprise at least one or more cores and one or more level caches. In at least one embodiment, memory of CPU(s) 7404 store executable code that is loaded during a boot process, such as when multimedia system 7400 is powered on.

In at least one embodiment, GPU(s) 7402 and CPU(s) 7404 communicate with bus 7412, optionally via input/output (I/O) bridge 7410, which may be a discreet component or part of GPU(s) 7402 and CPU(s) 7404. In at least one embodiment, data storage components such as system memory 7426, and input data 7428 are connected to bus 7412. In at least one embodiment, RAM 7406 also communicates with bus 7412. In at least one embodiment, auxiliary processor(s) 7424 are connected to bus 7412. In at least one embodiment, auxiliary processor(s) 7424 are provided to run or support one or more software, software applications, operating systems, and/or variations thereof executed in connection with multimedia system 7400.

In at least one embodiment, system memory 7426 stores application data that is loaded during a boot process. In at least one embodiment, input data 7428 comprises a DVD/CD drive, Blu-ray drive, hard drive, or other removable media drive. In at least one embodiment, input data 7428 is external or internal to multimedia system 7400. In at least one embodiment, application data is accessed via input data 7428 for execution, playback, and/or variations thereof. In at least one embodiment, input data 7428 is connected to I/O bridge 7410 via bus 7412.

In at least one embodiment, one or more components of multimedia system 7400 are connected via one or more buses, including serial and parallel buses, a memory bus, a peripheral bus, and a processor or local bus using various bus architectures, such as Peripheral Components Interconnects (PCI) bus, PCI-Express bus, and/or variations thereof. In at least one embodiment, multimedia system 7400 communicates with peripheral devices as appropriate via an audio/visual (A/V) input port 7414, Ethernet port 7416, Bluetooth wireless link 7418, Wi-Fi wireless link 7420, or one or more universal serial bus (USB) ports 7422. In at least one embodiment, audio and video are output via A/V output 7408, such as an HDMI port.

In at least one embodiment, video and optionally audio of multimedia system 7400 are output to one or more display devices through A/V output 7408. In at least one embodiment, display devices include devices such as a television, electronic display, computer monitor, and/or variations thereof. In at least one embodiment, video is presented in various forms, such as stereoscopic. In at least one embodiment, audio is presented through one or more audio devices in one of a number of formats such as stereo, 5.1 surround sound or 7.1 surround sound. In at least one embodiment, video and audio is presented to a head mounted display unit, such as a virtual reality device, worn by a user.

In at least one embodiment, upon boot of multimedia system 7400, application data is loaded from system memory 7426 into one or more memory and/or caches of CPU(s) 7404 and executed on CPU(s) 7404. In at least one embodiment, an application presents a graphical user interface that provides a user experience when navigating to different services available on multimedia system 7400. In at least one embodiment, applications, media, and/or variations thereof of input data 7428 are launched or played from input data 7428 to provide additional functionalities, applications, media, and/or variations thereof to multimedia system 7400. In at least one embodiment, multimedia system 7400 is configured to execute an executable program associated with a computer game in accordance with application data from system memory 7426 and input data 7428.

In at least one embodiment, at least one component shown or described with respect to FIG. 74 is used to perform techniques and/or functions described in connection with FIGS. 1-33. In at least one embodiment, at least one component shown or described with respect to FIG. 74 is used to cause one or more neural networks to cause one or more non-noise pixels to be identified and blended in parallel. In at least one embodiment, at least one component shown or described with respect to FIG. 74 is used to use one or more neural networks to adjust brightness of one or more pixels of one or more images prior to denoising the one or more images. In at least one embodiment, at least one component shown or described with respect to FIG. 74 is used to perform at least one aspect described with respect to FIGS. 1-33, and/or other systems, methods, or operations described herein.

Figure 75:
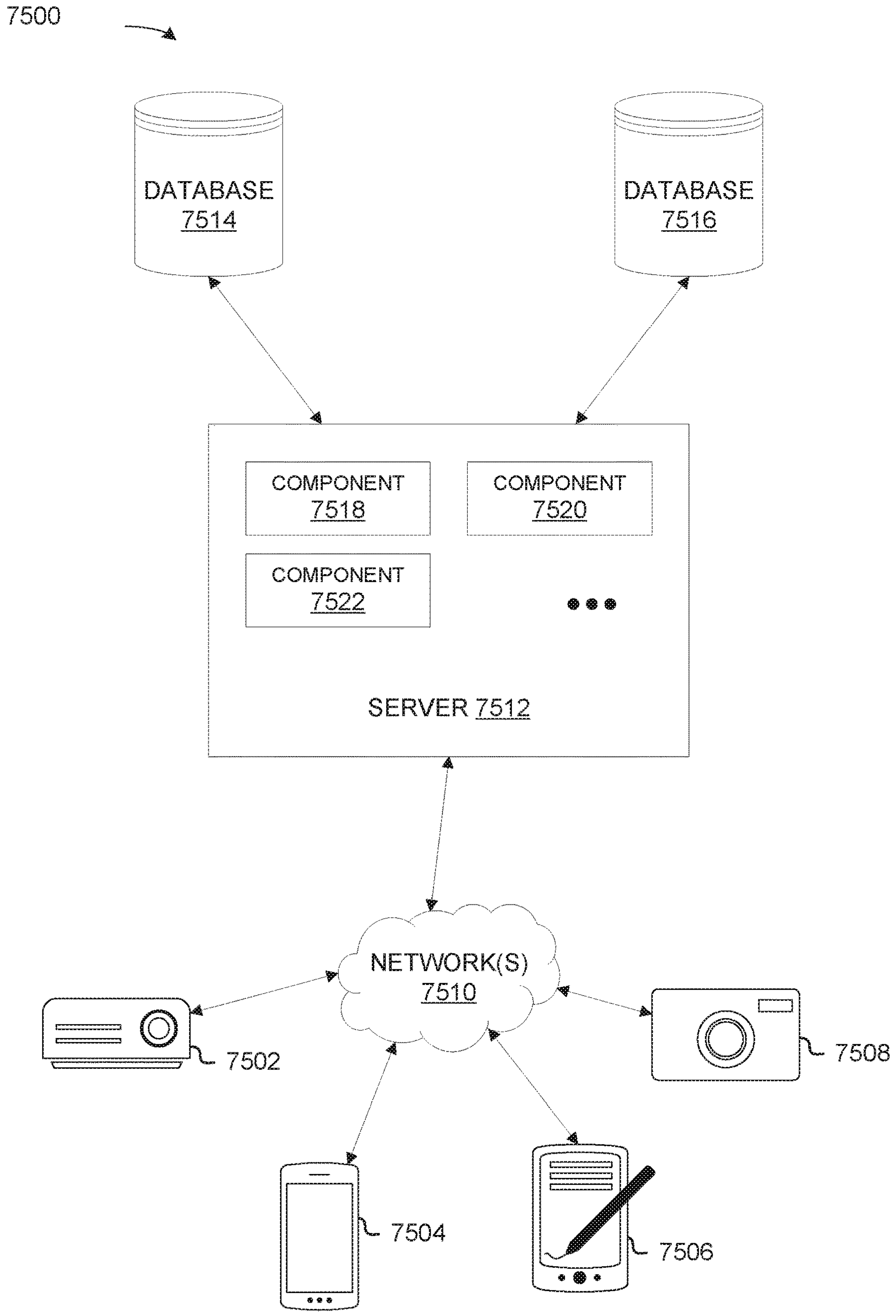
FIG. 75 illustrates a distributed system, in accordance with at least one embodiment.

FIG. 75 illustrates a distributed system 7500, in accordance with at least one embodiment. In at least one embodiment, distributed system 7500 includes one or more client computing devices 7502, 7504, 7506, and 7508, which are configured to execute and operate a client application such as a web browser, proprietary client, and/or variations thereof over one or more network(s) 7510. In at least one embodiment, server 7512 may be communicatively coupled with remote client computing devices 7502, 7504, 7506, and 7508 via network 7510.

In at least one embodiment, server 7512 may be adapted to run one or more services or software applications such as services and applications that may manage session activity of single sign-on (SSO) access across multiple data centers. In at least one embodiment, server 7512 may also provide other services or software applications can include non-virtual and virtual environments. In at least one embodiment, these services may be offered as web-based or cloud services or under a Software as a Service (SaaS) model to users of client computing devices 7502, 7504, 7506, and/or 7508. In at least one embodiment, users operating client computing devices 7502, 7504, 7506, and/or 7508 may in turn utilize one or more client applications to interact with server 7512 to utilize services provided by these components.

In at least one embodiment, software components 7518, 7520 and 7522 of system 7500 are implemented on server 7512. In at least one embodiment, one or more components of system 7500 and/or services provided by these components may also be implemented by one or more of client computing devices 7502, 7504, 7506, and/or 7508. In at least one embodiment, users operating client computing devices may then utilize one or more client applications to use services provided by these components. In at least one embodiment, these components may be implemented in hardware, firmware, software, or combinations thereof. It should be appreciated that various different system configurations are possible, which may be different from distributed system 7500. The embodiment shown in FIG. 75 is thus one example of a distributed system for implementing an embodiment system and is not intended to be limiting.

In at least one embodiment, client computing devices 7502, 7504, 7506, and/or 7508 may include various types of computing systems. In at least one embodiment, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and/or variations thereof. In at least one embodiment, devices may support various applications such as various Internet-related apps, e-mail, short message service (SMS) applications, and may use various other communication protocols. In at least one embodiment, client computing devices may also include general purpose personal computers including, by way of example, personal computers and/or laptop computers running various versions of Microsoft Windows®, Apple Macintosh®, and/or Linux operating systems. In at least one embodiment, client computing devices can be workstation computers running any of a variety of commercially-available UNIX® or UNIX-like operating systems, including without limitation a variety of GNU/Linux operating systems, such as Google Chrome OS. In at least one embodiment, client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 7510. Although distributed system 7500 in FIG. 75 is shown with four client computing devices, any number of client computing devices may be supported. Other devices, such as devices with sensors, etc., may interact with server 7512.

In at least one embodiment, network(s) 7510 in distributed system 7500 may be any type of network that can support data communications using any of a variety of available protocols, including without limitation TCP/IP (transmission control protocol/Internet protocol), SNA (systems network architecture), IPX (Internet packet exchange), AppleTalk, and/or variations thereof. In at least one embodiment, network(s) 7510 can be a local area network (LAN), networks based on Ethernet, Token-Ring, a wide-area network, Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

In at least one embodiment, server 7512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In at least one embodiment, server 7512 can include one or more virtual machines running virtual operating systems, or other computing architectures involving virtualization. In at least one embodiment, one or more flexible pools of logical storage devices can be virtualized to maintain virtual storage devices for a server. In at least one embodiment, virtual networks can be controlled by server 7512 using software defined networking. In at least one embodiment, server 7512 may be adapted to run one or more services or software applications. In at least one embodiment, server 7512 comprises one or more hardware and/or software components that implement a neural network such as those described in connection with FIG. 76-FIG. 80. In at least one embodiment, server 7512 comprises one or more neural networks, which are referred to as deep learning super sampling networks, which generate high quality versions of input frames (e.g., rendered frames of a computer graphics program, such as a video game program).

In at least one embodiment, server 7512 may run any operating system, as well as any commercially available server operating system. In at least one embodiment, server 7512 may also run any of a variety of additional server applications and/or mid-tier applications, including HTTP (hypertext transport protocol) servers, FTP (file transfer protocol) servers, CGI (common gateway interface) servers, JAVA® servers, database servers, and/or variations thereof. In at least one embodiment, exemplary database servers include without limitation those commercially available from Oracle, Microsoft, Sybase, IBM (International Business Machines), and/or variations thereof.

In at least one embodiment, server 7512 may include one or more applications to analyze and consolidate data feeds and/or event updates received from users of client computing devices 7502, 7504, 7506, and 7508. In at least one embodiment, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and/or variations thereof. In at least one embodiment, server 7512 may also include one or more applications to display data feeds and/or real-time events via one or more display devices of client computing devices 7502, 7504, 7506, and 7508.

In at least one embodiment, distributed system 7500 may also include one or more databases 7514 and 7516. In at least one embodiment, databases may provide a mechanism for storing information such as user interactions information, usage patterns information, adaptation rules information, and other information. In at least one embodiment, databases 7514 and 7516 may reside in a variety of locations. In at least one embodiment, one or more of databases 7514 and 7516 may reside on a non-transitory storage medium local to (and/or resident in) server 7512. In at least one embodiment, databases 7514 and 7516 may be remote from server 7512 and in communication with server 7512 via a network-based or dedicated connection. In at least one embodiment, databases 7514 and 7516 may reside in a storage-area network (SAN). In at least one embodiment, any necessary files for performing functions attributed to server 7512 may be stored locally on server 7512 and/or remotely, as appropriate. In at least one embodiment, databases 7514 and 7516 may include relational databases, such as databases that are adapted to store, update, and retrieve data in response to SQL-formatted commands.

In at least one embodiment, at least one component shown or described with respect to FIG. 75 is used to perform techniques and/or functions described in connection with FIGS. 1-33. In at least one embodiment, at least one component shown or described with respect to FIG. 75 is used to cause one or more neural networks to cause one or more non-noise pixels to be identified and blended in parallel. In at least one embodiment, at least one component shown or described with respect to FIG. 75 is used to use one or more neural networks to adjust brightness of one or more pixels of one or more images prior to denoising the one or more images. In at least one embodiment, at least one component shown or described with respect to FIG. 75 is used to perform at least one aspect described with respect to FIGS. 1-33, and/or other systems, methods, or operations described herein.

Figure 76:
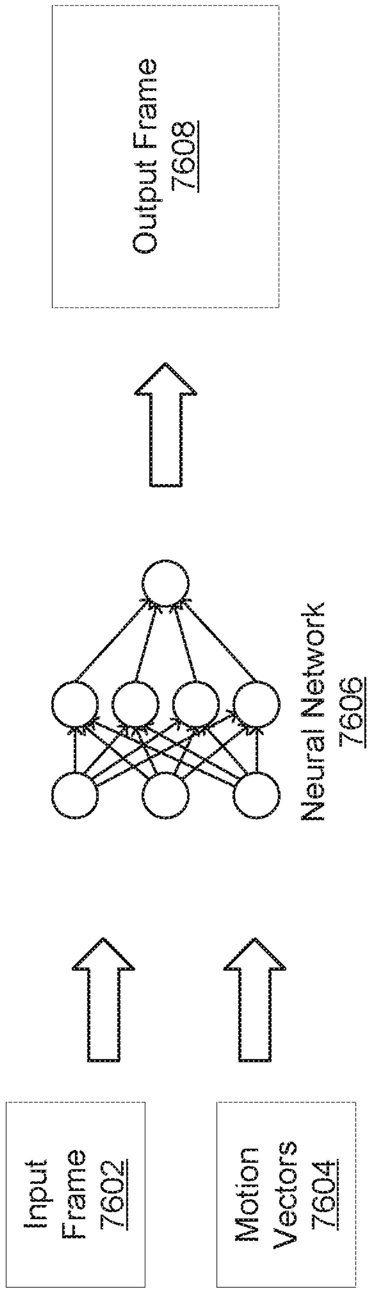
FIG. 76 illustrates a super sampling neural network, in accordance with at least one embodiment.

FIG. 76 illustrates a super sampling neural network, in accordance with at least one embodiment. In at least one embodiment, a neural network 7606 is referred to as a super sampling neural network, deep learning super sampling (DLSS) network, super sampling network, and/or variations thereof. In at least one embodiment, an input frame 7602 and motion vectors 7604 are processed by a neural network 7606 to generate an output frame 7608. In at least one embodiment, neural networks such as those described in connection with FIGS. 76-80 are DLSS networks.

In at least one embodiment, an input frame 7602 is an image. In at least one embodiment, an input frame 7602 is a computer generated image that is generated by one or more computer graphics programs or software. In at least one embodiment, an input frame 7602 is an image that is captured from one or more image capturing devices, such as a camera. In at least one embodiment, an input frame 7602 is a frame of a set of frames of a video. In at least one embodiment, an input frame 7602 is a frame of a video that is captured from one or more video capturing devices, such as a video camera. In at least one embodiment, an input frame 7602 is a frame of a computer generated video that is generated by one or more computer graphics programs or software.

In at least one embodiment, an input frame 7602 is a render of a two-dimensional (2D) model. In at least one embodiment, an input frame 7602 is a render of a three-dimensional (3D) model. In at least one embodiment, an input frame 7602 is generated by a rendering computer program, which is a computer program comprising executable instructions that, when executed, generate images based at least in part on a scene. In at least one embodiment, a scene refers to a 2D or 3D model. In at least one embodiment, a scene is defined by various characteristics, such as geometry, viewpoint, texture, lighting, shading, and/or variations thereof. In at least one embodiment, a computer program obtains a scene and generates an image of a scene through use of one or more rendering algorithms. In at least one embodiment, an input frame 7602 is an image generated through use of one or more light transport modelling techniques. In at least one embodiment, an input frame 7602 is generated through one or more rasterization techniques. In at least one embodiment, an input frame 7602 is generated through one or more ray casting techniques. In at least one embodiment, an input frame 7602 is generated through one or more ray tracing techniques.

In at least one embodiment, an input frame 7602 is a frame generated by a video game program. In at least one embodiment, a video game program is executed by one or more computing devices that comprise graphics hardware that generate real-time computer graphics. In at least one embodiment, an input frame 7602 is a frame that is generated in real-time. In at least one embodiment, an input frame 7602 is a frame that is pre-rendered. In at least one embodiment, an input frame 7602 is a frame of a video game that is displayed on one or more computer graphics display hardware, such as a video display device, mobile device, virtual reality headset, and/or variations thereof. In at least one embodiment, a video game program is executing and generates a 3D scene, in which an input frame 7602 is a render of a 3D scene. In at least one embodiment, an input frame 7602 is a frame that is rendered by a rendering device with various hardware and software constraints, such as graphics hardware limitations, memory limitations, and/or variations thereof.

In at least one embodiment, a neural network 7606 is a neural network that obtains an input frame and generates an output frame. In at least one embodiment, a neural network 7606 is a convolutional autoencoder network. In at least one embodiment, a neural network 7606 is a neural network that generates a higher quality version of an input frame. In at least one embodiment, qualities of a frame include resolution and aliasing, in which a high quality frame has a high resolution and minimal aliasing. In at least one embodiment, a neural network 7606 obtains an input frame, and generates an output frame with a higher resolution and lower aliasing than an input frame. In at least one embodiment, a neural network 7606 processes frames in near real-time. In at least one embodiment, near real-time processing refers to processing in which inputs are processed within a time interval from which inputs are generated. In at least one embodiment, a neural network 7606 processes input frames in near real-time such that input frames are processed within a time interval from which they are generated and/or rendered. In at least one embodiment, a neural network 7606 processes an input frame into an output frame within a time interval such that output frames are available from input frames with minimal latency. In at least one embodiment, minimal latency refers to latency that is at or below a defined latency time interval threshold. In at least one embodiment, output frames that are available from input frames with minimal latency are available within a defined time interval, which can be any suitable value, such as seconds, fractions of a second, and/or variations thereof. In at least one embodiment, a neural network 7606 obtains a frame of a video game and generates a high resolution, minimally aliased output frame. In at least one embodiment, a neural network 7606 is trained using various neural network training techniques such as those described in connection with FIG. 77. In at least one embodiment, output frames are generated at a rate which can be perceived as continuous motion for a human being, which may refer to frame rates over a certain threshold. In at least one embodiment, output frames are generated at a target rate at or over 20 frames per second (fps) including or not limited to 23.976 fps, 24 fps, 25 fps, 29.97 fps, 30 fps, 48 fps, 50 fps, 59.94 fps, 60 fps, 90 fps, 120 fps, 240 fps, and any other suitable target frame rate. In at least one embodiment, a computer system may lack computing resources to continuously render high quality frames at a target frame rate (e.g., 4k resolution at 60 fps) and instead render lower-resolution frames which are super-sampled using neural network 7606 to achieve said target frame (e.g., render 1080p resolution at 60 fps and super-sample to 4k resolution).

In at least one embodiment, a neural network 7606 obtains an input frame 7602. In at least one embodiment, a neural network 7606 obtains an input frame 7602 from a video game program executing on one or more computing devices, such as a video game console, computer, mobile device, and/or variations thereof. In at least one embodiment, a computer program, such as a video game program, computer graphics program, rendering program, and/or variations thereof, provides an input frame 7602 to a neural network 7606 through one or more interfaces, such as transmitted through one or more computer networks, transferred through one or more data transfer interfaces, and/or variations thereof. In at least one embodiment, a neural network 7606 obtains an input frame 7602, which is an image generated by a video game program. In at least one embodiment, a neural network 7606 obtains an input frame 7602 and associated motion vectors 7604, which indicate direction objects in a scene (e.g., a scene depicted in an input frame 7602) are moving. In at least one embodiment, a motion vector is a vector that represents an entity in a frame based on a position of an entity in a previous frame. In at least one embodiment, a motion vector indicates a motion or direction of movement of an entity of a frame of a scene. In at least one embodiment, motion vectors 7604 comprise a collection of one or more motion vectors that indicate motions or directions of movement of entities and/or objects of an input frame 7602. In at least one embodiment, a program such as a video game program generates both input frame 7602 and motion vectors 7604.

In at least one embodiment, a neural network 7606 obtains an input frame 7602 and motion vectors 7604, and generates an output frame 7608. In at least one embodiment, a neural network 7606 generates an output frame 7608 from an input frame 7602 and/or associated motion vectors 7604. In at least one embodiment, a neural network 7606 is trained using a high quality version of an input frame 7602, in which trained neural network 7606 generates an output frame 7608 to match a high quality version of input frame 7602. In at least one embodiment, an output frame 7608 is an upscaled/higher resolution version of an input frame 7602. In at least one embodiment, an output frame 7608 is a higher resolution version of an input frame 7602. In at least one embodiment, an output frame 7608 has a lower degree of aliasing than an input frame 7602. In at least one embodiment, an output frame 7608 is a higher quality representation of an input frame 7602. In at least one embodiment, a neural network 7606 obtains an input frame 7602, which is a real-time render of a scene of a video game, and associated motion vectors 7604, and generates an output frame 7608, which is a high quality version of an input frame 7602.

In at least one embodiment, at least one component shown or described with respect to FIG. 76 is used to perform techniques and/or functions described in connection with FIGS. 1-33. In at least one embodiment, at least one component shown or described with respect to FIG. 76 is used to cause one or more neural networks to cause one or more non-noise pixels to be identified and blended in parallel. In at least one embodiment, at least one component shown or described with respect to FIG. 76 is used to use one or more neural networks to adjust brightness of one or more pixels of one or more images prior to denoising the one or more images. In at least one embodiment, at least one component shown or described with respect to FIG. 76 is used to perform at least one aspect described with respect to FIGS. 1-33, and/or other systems, methods, or operations described herein.

Figure 77:
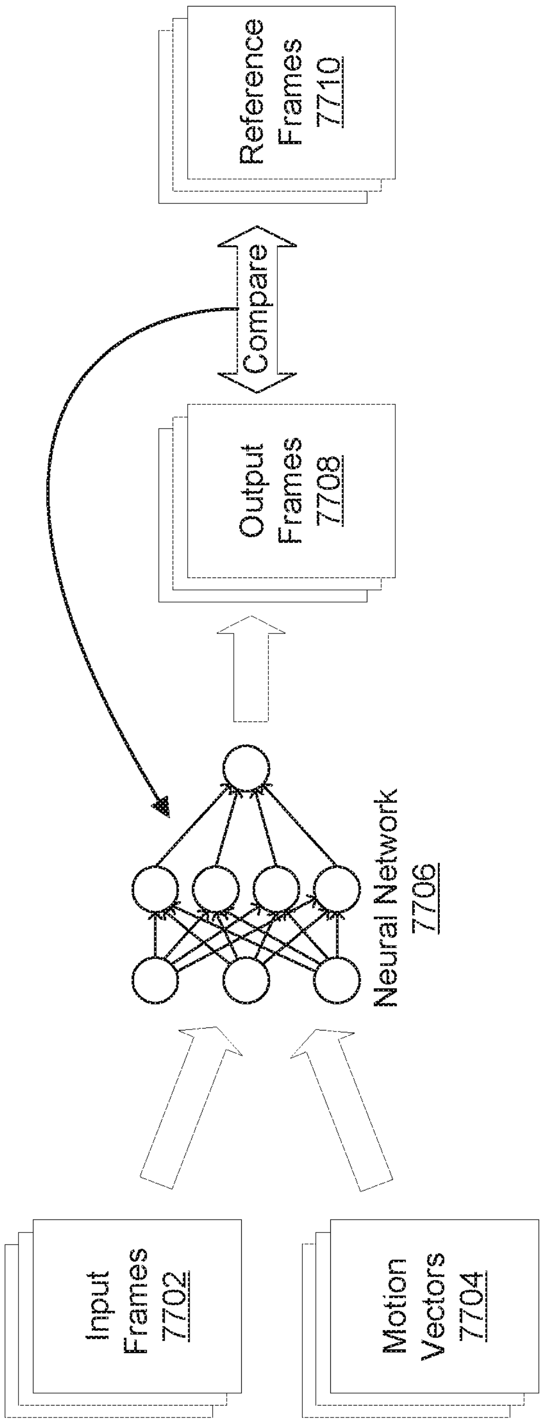
FIG. 77 illustrates an architecture of a super sampling neural network, in accordance with at least one embodiment.

FIG. 77 illustrates an architecture of a super sampling neural network, in accordance with at least one embodiment. In at least one embodiment, a neural network 7706 is referred to as a super sampling neural network, DLSS network, super sampling network, and/or variations thereof. In at least one embodiment, a neural network 7706 is trained to generate output frames 7708 from input frames 7702 and motion vectors 7704. In at least one embodiment, as part of training a neural network 7706, output frames 7708 generated by a neural network 7706 are compared with reference frames 7710 to update neural network 7706.

In at least one embodiment, input frames 7702 are input frames in accordance with those described in connection with FIG. 76. In at least one embodiment, input frames 7702 comprise one or more images, referred to as frames. In at least one embodiment, input frames 7702 comprise one or more images captured from one or more image and/or video capturing devices. In at least one embodiment, input frames 7702 comprise one or more renders of a scene. In at least one embodiment, input frames 7702 comprise frames generated by a video game program. In at least one embodiment, a video game program is executed by one or more computing devices that comprise graphics hardware that generate real-time computer graphics. In at least one embodiment, input frames 7702 are frames that are pre-rendered. In at least one embodiment, a video game program is executing and generates a 3D scene, in which input frames 7702 comprise renders of a 3D scene. In at least one embodiment, input frames 7702 are frames that are rendered by a rendering device with various hardware and software constraints, such as graphics hardware limitations, memory limitations, and/or variations thereof. In at least one embodiment, input frames 7702 are frames that are rendered with minimal post processing techniques, such as anti-aliasing (e.g., input frames 7702 comprise frames that are rendered with a little to no degree of anti-aliasing).

In at least one embodiment, post processing techniques for rendered frames include techniques and effects such as, but not limited to: ambient occlusion (e.g., horizon based ambient occlusion (HBAO), screen space ambient occlusion (SSAO)), anti-aliasing (e.g., fast approximate anti-aliasing (FXAA), super-sample anti-aliasing (SSAA), multi-sampling anti-aliasing (MSAA), temporal anti-aliasing (TXAA)), bloom, blur (e.g., depth of field, motion blur), cel shading, chromatic aberration, color correction, gamma correction, high dynamic range rendering, particle effects, shading, shadow mapping, sharpening, un-sharpening, upscaling, texture filtering (e.g., point, linear, bilinear, trilinear, anisotropic), and/or variations thereof. In at least one embodiment, input frames 7702 are frames that are rendered with little to no post processing techniques and/or effects.

In at least one embodiment, motion vectors 7704 are a set of one or more vectors that indicate directions of movement of objects of frames of input frames 7702. In at least one embodiment, a motion vector is a vector that represents an entity in a frame based on a position of an entity in a previous frame. In at least one embodiment, a motion vector indicates a motion or direction of movement of an entity of a frame of a scene. In at least one embodiment, motion vectors 7704 are generated by a program that rendered input frames 7702 and correspond to input frames 7702, in which a first set of motion vectors of motion vectors 7704 corresponds to a first frame of input frames 7702 and indicates motion of objects and/or entities depicted in a first frame of input frames 7702. In at least one embodiment, a first set of motion vectors of motion vectors 7704 corresponds to a first frame of input frames 7702 and indicates motion of objects of a first frame of input frames 7702 (e.g., directions and/or locations of where objects of a first frame of input frames 7702 will potentially be or move to in a subsequent frame of input frames 7702). In at least one embodiment, motion vectors 7704 comprise motion vectors generated by a video game program. In at least one embodiment, a video game program is executing and generates a 3D scene, in which motion vectors 7704 comprise vectors indicating movement of objects and/or entities of a 3D scene.

In at least one embodiment, reference frames 7710 comprise one or more images, referred to as frames. In at least one embodiment, reference frames 7710 correspond to input frames 7702 (e.g., each frame of reference frames 7710 corresponds to a frame of input frames 7702). In at least one embodiment, reference frames 7710 comprise one or more renders of a scene. In at least one embodiment, reference frames 7710 comprise frames generated by a video game program. In at least one embodiment, reference frames 7710 are frames that are rendered with various post processing techniques and/or effects. In at least one embodiment, reference frames 7710 are higher quality versions of input frames 7702. In at least one embodiment, a first frame of input frames 7702 is rendered from a scene using minimal post processing techniques and/or effects, and a first frame of reference frames 7710 is rendered from a same scene using post processing techniques and/or effects. In at least one embodiment, reference frames 7710 are frames rendered using 64x super sampling (64xSS).

In at least one embodiment, reference frames 7710 are frames rendered by one or more super computing devices, such as those described in connection with FIG. 37. In at least one embodiment, input frames 7702 and reference frames 7710 are frames rendered from a same computer graphics application or program (e.g., a same video game program). In at least one embodiment, reference frames 7710 and motion vectors are generated by one or more rendering devices, in which input frames 7702 and motion vectors 7704 are obtained from generated reference frames 7710 and motion vectors through one or more processes, such as downscaling generated reference frames 7710 and/or motion vectors to obtain input frames 7702 and motion vectors 7704, removing one or more post processing techniques and/or effects from generated reference frames 7710 and/or motion vectors to obtain input frames 7702 and motion vectors 7704, and variations thereof. In at least one embodiment, one or more rendering devices generate input frames 7702, motion vectors 7704, and/or reference frames 7710 from a particular computer graphics application or program (e.g., a video game program).

In at least one embodiment, a neural network 7706 is trained to process input frames 7702 and motion vectors 7704, and generate output frames 7708 that closely approximate or match corresponding reference frames 7710. In at least one embodiment, one or more rendering devices, through one or more computer graphics applications or programs, generate and store input frames 7702, motion vectors 7704, and reference frames 7710, in which one or more systems retrieve stored input frames 7702, motion vectors 7704, and reference frames 7710 to train a neural network 7706. In at least one embodiment, a neural network 7706 is a convolutional autoencoder network. In at least one embodiment, a neural network 7706 is trained using frames and/or motion vectors from a particular computer graphics application or program (e.g., a video game program) and is usable to generate frames for a particular computer graphics application or program. In at least one embodiment, a neural network 7706 is trained to generate high quality versions of input frames 7702 (e.g., upscaled/higher resolution frames, anti-aliased frames) as output frames 7708. In at least one embodiment, a neural network 7706 is trained to upscale and anti-alias frames of input frames 7702 as output frames 7708. In at least one embodiment, a neural network 7706 utilizes motion vectors 7704 to generate output frames 7708. In at least one embodiment, a neural network 7706 generates a first output frame of output frames 7708 from input frames 7702 and motion vectors 7704, generates a second output frame of output frames 7708 from a first output frame of output frames 7708, input frames 7702, and motion vectors 7704, and so on for subsequent output frames of output frames 7708. In at least one embodiment, a neural network 7706 applies sets of motion vectors from motion vectors 7704 to frames of output frames 7708 to generate subsequent frames of output frames 7708. In at least one embodiment, a neural network 7706 utilizes motion vectors 7704 as part of one or more temporal feedback processes that apply motion vectors to output frames to generate subsequent output frames.

In at least one embodiment, output frames 7708 are higher quality versions of input frames 7702, which can refer to various qualities, such as higher resolution, higher degrees of various post processing techniques and/or effects, and/or variations thereof. In at least one embodiment, a video game program is executing in connection with one or more computer graphics hardware, in which a frame is rendered and input to a neural network 7706, in which neural network 7706 generates a corresponding higher quality frame (e.g., an upscaled and/or anti-aliased frame). In at least one embodiment, a neural network 7706 is trained to output frames (e.g., output frames 7708) with various post processing techniques and/or effects from frames (e.g., input frames 7702) with minimal post processing techniques and/or effects. In at least one embodiment, a neural network 7706 obtains a frame and corresponding motion vectors, such as a frame and motion vectors of input frames 7702 and motion vectors 7704, respectively, and generates a corresponding high quality output frame, such as a frame of output frames 7708 (e.g., a frame with various post processing techniques and/or effects, such as an upscaled frame, an anti-aliased frame, an upscaled and anti-aliased frame, and/or variations thereof). In at least one embodiment, a neural network 7706 obtains an input frame (e.g., a frame of input frames 7702), a previous output frame (e.g., a previously generated output frame of output frames 7708), and motion vectors (e.g., motion vectors of motion vectors 7704), and generates an output frame (e.g., a subsequent output frame of output frames 7708).

In at least one embodiment, a neural network 7706 is trained and/or updated by comparing generated output frames 7708 with reference frames 7710. In at least one embodiment, a neural network 7706 is trained and used in connection with FIG. 76. In at least one embodiment, a neural network 7706 is trained or otherwise updated by one or more systems using a training framework such as a PyTorch, TensorFlow, Boost, Caffe, Microsoft Cognitive Toolkit/CNTK, MXNet, Chainer, Keras, Deeplearning4j, or any suitable training framework. In at least one embodiment, a neural network 7706 is trained by comparing output frames 7708 with reference frames 7710, determining differences between output frames 7708 and reference frames 7710, and utilizing determined differences to update weights and other components of neural network 7706 such that differences between output frames 7708 and reference frames 7710 are minimized.

In at least one embodiment, training is performed at least in a supervised, partially supervised, and/or unsupervised manner. In at least one embodiment, a neural network 7706 is trained to match input frames 7702 to reference frames 7710. In at least one embodiment, a neural network 7706 is trained by one or more systems that cause neural network 7706 to produce an output frame of output frames 7708 from a frame of input frames 7702, and measure a difference between an output frame of output frames 7708 and a corresponding frame of reference frames 7710. In at least one embodiment, a neural network 7706 is trained by one or more systems that cause neural network 7706 to obtain a frame of input frames 7702 and perform one or more neural network image processing/generation/rendering operations (e.g., generate new pixels, modify existing pixels) to generate an output frame of output frames 7708, compare an output frame of output frames 7708 with a corresponding frame of reference frames 7710, and adjust weights of neural network 7706 based at least in part on a comparison of an output frame of output frames 7708 with a corresponding frame of reference frames 7710. In at least one embodiment, a frame of output frames 7708 is compared with a frame of reference frames 7710 by comparing pixels of both frames with each other. In at least one embodiment, frames are compared by comparing pixel characteristics of frames (e.g., pixel intensity, pixel brightness, pixel color, pixel contrast) and measuring differences in pixel characteristics (e.g., differences in pixel intensity, pixel brightness, pixel color, pixel contrast between pixels of frames). In at least one embodiment, a neural network 7706 is trained using one or more back propagation processes in connection with one or more loss functions. In at least one embodiment, a neural network 7706 is trained using various techniques described herein such as those described in connection with FIG. 35.

In at least one embodiment, at least one component shown or described with respect to FIG. 77 is used to perform techniques and/or functions described in connection with FIGS. 1-33. In at least one embodiment, at least one component shown or described with respect to FIG. 77 is used to cause one or more neural networks to cause one or more non-noise pixels to be identified and blended in parallel. In at least one embodiment, at least one component shown or described with respect to FIG. 77 is used to use one or more neural networks to adjust brightness of one or more pixels of one or more images prior to denoising the one or more images. In at least one embodiment, at least one component shown or described with respect to FIG. 77 is used to perform at least one aspect described with respect to FIGS. 1-33, and/or other systems, methods, or operations described herein.

Figure 78:
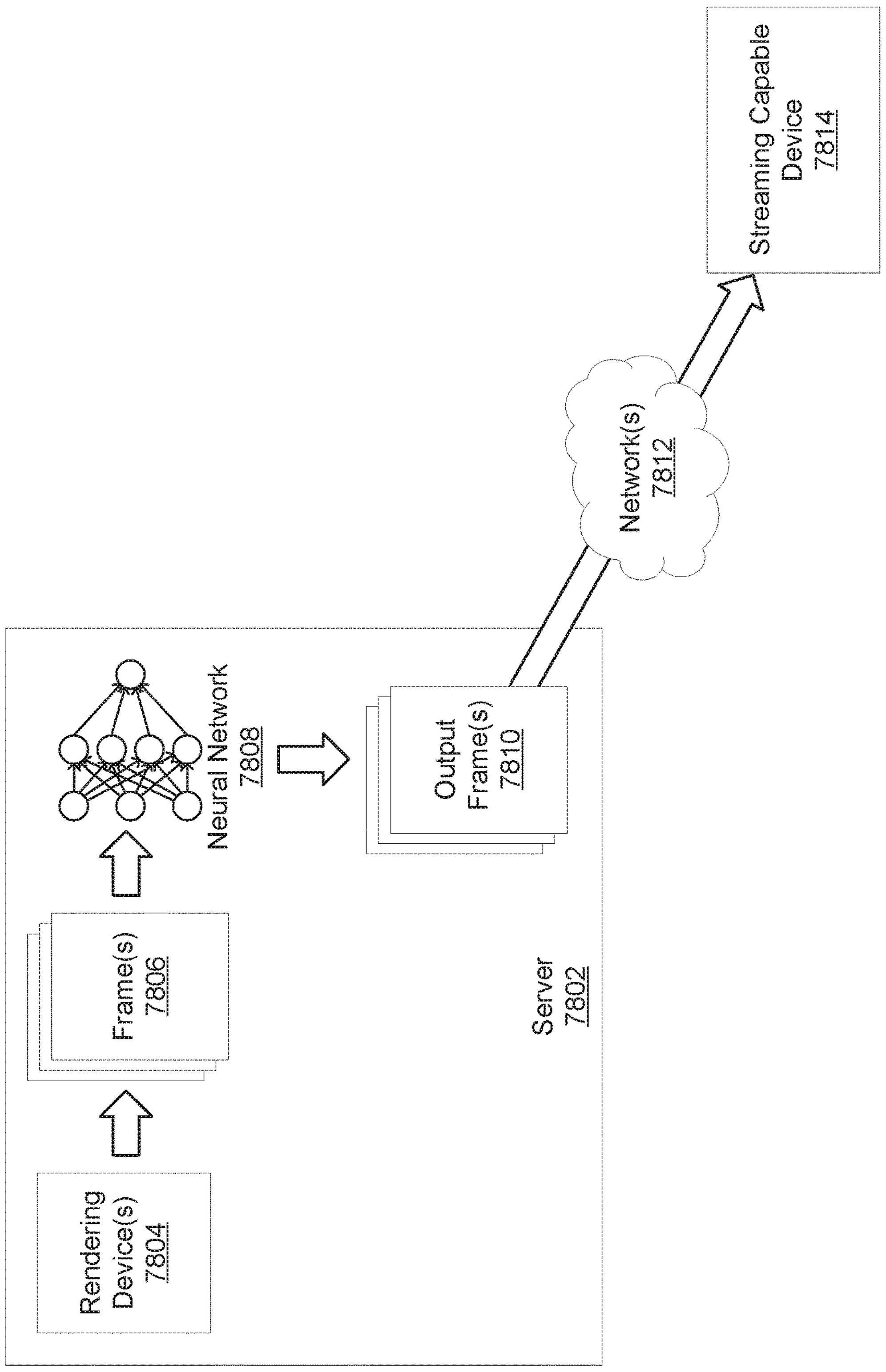
FIG. 78 illustrates an example of streaming using a super sampling neural network, in accordance with at least one embodiment.

FIG. 78 illustrates an example of streaming using a super sampling neural network, in accordance with at least one embodiment. In at least one embodiment, a neural network 7808 processes frame(s) 7806 generated by rendering device(s) 7804 to generate output frame(s) 7810, which are streamed via network(s) 7812 to a streaming capable device 7814. In at least one embodiment, a neural network 7808 is referred to as a DLSS network, super sampling neural network, super sampling network, and/or variations thereof. In at least one embodiment, a neural network 7808 is trained using techniques such as those described in connection with FIG. 77.

In at least one embodiment, a server 7802 is a collection of one or more computer hardware and/or software components. In at least one embodiment, a server 7802 provides various functionalities to other programs or devices, referred to as clients. In at least one embodiment, a server 7802 provides streaming services. In at least one embodiment, streaming services refer to services that provide streaming media to a user. In at least one embodiment, streaming media refers to multimedia (e.g., video, audio) that is constantly received by and presented to a user while being delivered by a provider. In at least one embodiment, a server 7802 provides video game streaming services. In at least one embodiment, a server 7802 provides services in which frames of a video game are constantly received by and presented to a user while being delivered/generated by a server 7802. In at least one embodiment, a server 7802 comprises rendering device(s) 7804. In at least one embodiment, a server 7802 comprises one or more hardware and/or software components that implement a neural network 7808. In at least one embodiment, a server 7802 comprises one or more data storage components (e.g., hard drives) that provide storage and processing of frame(s) 7806 and output frame(s) 7810.

In at least one embodiment, rendering device(s) 7804 comprise one or more computer graphics rendering hardware and/or software components. In at least one embodiment, rendering device(s) 7804 comprise one or more graphics processing units. In at least one embodiment, rendering device(s) 7804 comprise one or more computing devices that generate and/or render graphics. In at least one embodiment, rendering device(s) 7804 comprise one or more computing devices that generate renders from a video game. In at least one embodiment, rendering device(s) 7804 render frames of a video game or other computer graphics program. In at least one embodiment, rendering device(s) 7804, using input data from a computer graphics program (e.g., a video game program), renders frame(s) 7806.

In at least one embodiment, frame(s) 7806 are frames rendered by rendering device(s) 7804. In at least one embodiment, frame(s) 7806 are associated with motion vectors that indicate directions of movement of objects of frame(s) 7806. In at least one embodiment, frame(s) 7806 and associated motion vectors are generated by rendering device(s) 7804. In at least one embodiment, frame(s) 7806 comprise frames generated by a particular video game program. In at least one embodiment, a video game program is executed by one or more computing devices that comprise graphics hardware (e.g., rendering device(s) 7804) that generate real-time computer graphics. In at least one embodiment, a video game program is executing and generates a 3D scene, in which frame(s) 7806 comprise renders of a 3D scene. In at least one embodiment, frame(s) 7806 are frames that are rendered by a rendering device with various hardware and software constraints, such as graphics hardware limitations, memory limitations, and/or variations thereof. In at least one embodiment, frame(s) 7806 are frames that are rendered with minimal post processing techniques, such as anti-aliasing (e.g., frame(s) 7806 comprise frames that are rendered with a little to no degree of anti-aliasing).

In at least one embodiment, a neural network 7808 comprises one or more neural networks that generate high quality frames from input frames. In at least one embodiment, a neural network 7808 is trained using frames from a particular computer graphics application or program (e.g., a video game program) and is usable to generate frames for a particular computer graphics application or program. In at least one embodiment, a neural network 7808 is trained to generate high quality versions of frame(s) 7806 (e.g., upscaled/higher resolution frames, anti-aliased frames). In at least one embodiment, a neural network 7808 is trained to upscale and anti-alias frames of frame(s) 7806. In at least one embodiment, a video game program is executing in connection with one or more computer graphics hardware, in which a frame is rendered and input to a neural network 7808 (e.g., frame(s) 7806 are rendered by rendering device(s) 7804 and input to neural network 7808), in which neural network 7808 generates a corresponding higher quality frame (e.g., an upscaled and/or anti-aliased frame). In at least one embodiment, a neural network 7808 is trained to output frames with various post processing techniques and/or effects from frames with minimal post processing techniques and/or effects. In at least one embodiment, a neural network 7808 obtains a frame and corresponding motion vectors, and generates a corresponding high quality output frame (e.g., a frame with various post processing techniques and/or effects, such as an upscaled frame, an anti-aliased frame, an upscaled and anti-aliased frame, and/or variations thereof). In at least one embodiment, a neural network 7808 obtains frame(s) 7806 and motion vectors and generates output frame(s) 7810. In at least one embodiment, a neural network 7808 utilizes one or more temporal feedback processes that process output frames of output frame(s) 7810 in connection with frame(s) 7806 and associated motion vectors to generate subsequent frames of output frame(s) 7810.

In at least one embodiment, output frame(s) 7810 correspond to frame(s) 7806 (e.g., each frame of output frame(s) 7810 corresponds to a frame of frame(s) 7806). In at least one embodiment, output frame(s) 7810 are frames that are generated with various post processing techniques and/or effects. In at least one embodiment, output frame(s) 7810 are higher quality versions of frame(s) 7806. In at least one embodiment, output frame(s) 7810 comprise upscaled (e.g., higher resolution) and/or anti-aliased versions of frame(s) 7806.

In at least one embodiment, network(s) 7812 comprise any suitable computer communication network, such as Internet. In at least one embodiment, network(s) 7812 are cryptographically protected, encrypted, or otherwise secured. In at least one embodiment, network(s) 7812 comprise one or more computer network communication channels in which data is transmitted and received. In at least one embodiment, network(s) 7812 provide methods of communication between a server 7802 and a streaming capable device 7814. In at least one embodiment, output frame(s) 7810 are transmitted from a server 7802 via network(s) 7812 to a streaming capable device 7814.

In at least one embodiment, a streaming capable device 7814 is a computing device that is capable of receiving multimedia through one or more networks. In at least one embodiment, a streaming capable device 7814 is a device with limited graphics rendering capabilities that is unable to render frames such as output frame(s) 7810, but is able to access a server 7802 via network(s) 7812 to obtain output frame(s) 7810. In at least one embodiment, a streaming capable device 7814 is a streaming capable computing device such that streaming capable device 7814 comprises various hardware and/or software components that constantly receive and/or obtain multimedia from one or more networks. In at least one embodiment, a streaming capable device 7814 is a computing device such as a mobile phone, laptop, computer, gaming console, tablet, and/or variations thereof. In at least one embodiment, a streaming capable device 7814 comprises one or more computer networking components, such as various receivers, transmitters, and/or transceivers, which obtain and process multimedia transmitted through one or more networks. In at least one embodiment, a streaming capable device 7814 is operable by one or more users. In at least one embodiment, a streaming capable device 7814 receives output frame(s) 7810 through network(s) 7812. In at least one embodiment, a streaming capable device 7814 receives output frame(s) 7810 in connection with one or more programs executing on streaming capable device 7814 that display and/or process output frame(s) 7810.

In at least one embodiment, a streaming capable device 7814 comprises one or more software programs and/or applications that processes obtained output frame(s) 7810 and provides output frame(s) 7810 to be viewed (e.g., via an electronic visual display of streaming capable device 7814) and/or interacted with (e.g., via various user input hardware of streaming capable device 7814) by one or more users. In at least one embodiment, a streaming capable device 7814 comprises one or more electronic visual display hardware, such as a liquid crystal display (LCD), light-emitting diode (LED) display, and/or variations thereof, and one or more user input hardware, such as computer mouse, keyboard, gaming controller, and/or variations thereof, in which users utilize to interact with one or more software programs and/or applications executing on streaming capable device 7814. In at least one embodiment, a streaming capable device 7814 provides indications of user input to a server 7802 via network(s) 7812, in which frame(s) 7806 are generated by rendering device(s) 7804 based at least in part on user input.

In at least one embodiment, a video game program is executing on a server 7802, where frame(s) 7806 are frames of a video game program, in which frame(s) 7806 are rendered by rendering device(s) 7804, and processed and transmitted as output frame(s) 7810 to a streaming capable device 7814, in which a user interacts with streaming capable device 7814 in connection with output frame(s) 7810 (e.g., output frame(s) 7810 are frames of a video game program requiring interaction, in which a user inputs interaction to streaming capable device 7814), in which user interactions are transmitted to server 7802 to a video game program to determine how subsequent frames of a video game program are to be rendered by rendering device(s) 7804. In at least one embodiment, frame(s) 7806 are rendered based at least in part on input from a user in connection with a streaming capable device 7814, and processed by a neural network 7808 to generate output frame(s) 7810, in which output frame(s) 7810 are transmitted to streaming capable device 7814, in which further user input is received by streaming capable device 7814 and transmitted to server 7802 to generate subsequent frames, which are then processed by neural network 7808 and transmitted to streaming capable device 7814, and so on for subsequent frames and subsequent user input.

In at least one embodiment, at least one component shown or described with respect to FIG. 78 is used to perform techniques and/or functions described in connection with FIGS. 1-33. In at least one embodiment, at least one component shown or described with respect to FIG. 78 is used to cause one or more neural networks to cause one or more non-noise pixels to be identified and blended in parallel. In at least one embodiment, at least one component shown or described with respect to FIG. 78 is used to use one or more neural networks to adjust brightness of one or more pixels of one or more images prior to denoising the one or more images. In at least one embodiment, at least one component shown or described with respect to FIG. 78 is used to perform at least one aspect described with respect to FIGS. 1-33, and/or other systems, methods, or operations described herein.

Figure 79:
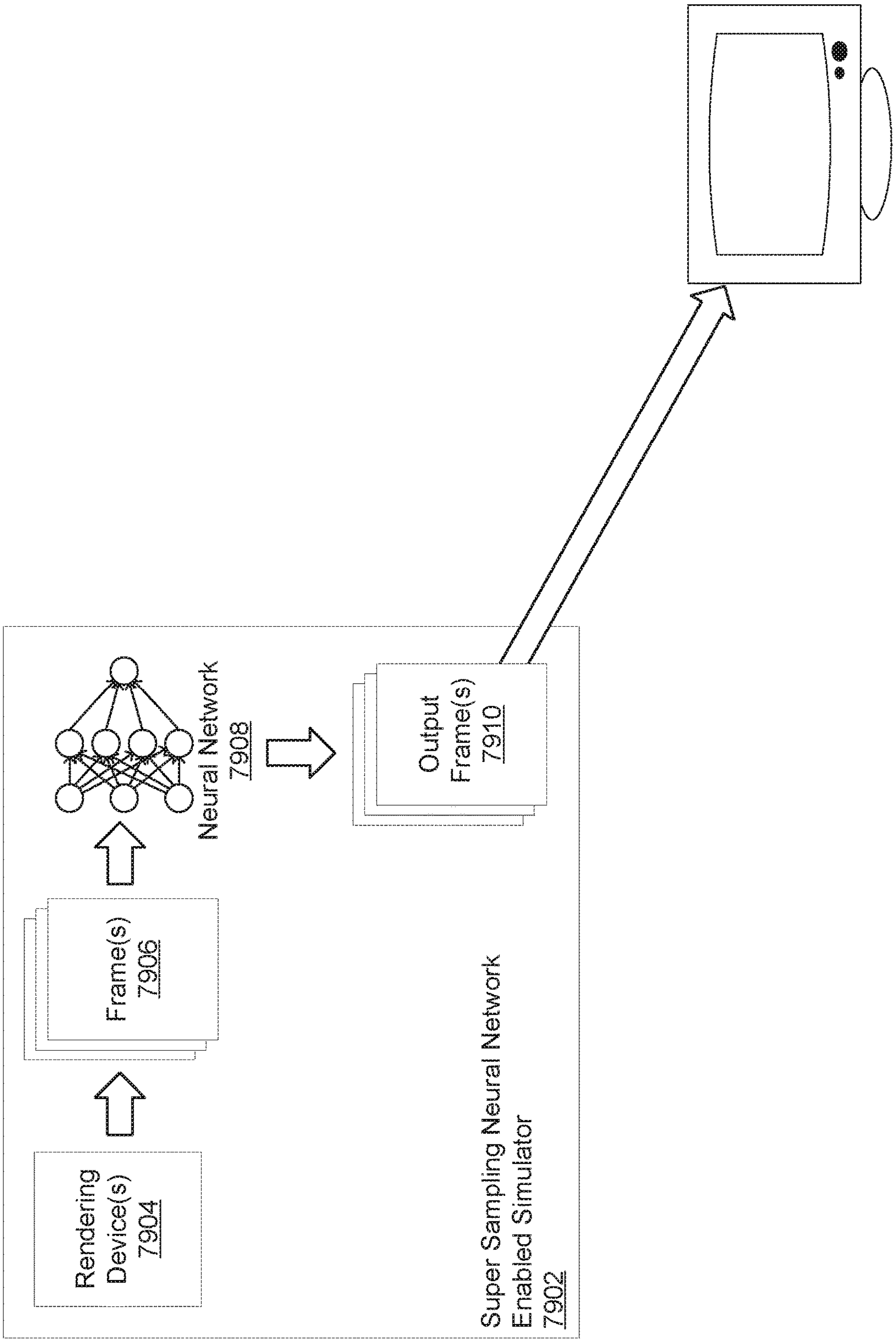
FIG. 79 illustrates an example of simulation using a super sampling neural network, in accordance with at least one embodiment.

FIG. 79 illustrates an example of simulation using a super sampling neural network, in accordance with at least one embodiment. In at least one embodiment, a neural network 7908 processes frame(s) 7906 generated by rendering device(s) 7904 to generate output frame(s) 7910, which are output to simulator display(s) 7912. In at least one embodiment, a neural network 7908 is referred to as a DLSS network, super sampling neural network, super sampling network, and/or variations thereof. In at least one embodiment, a neural network 7908 is trained using techniques such as those described in connection with FIG. 77.

In at least one embodiment, a super sampling neural network enabled simulator 7902 is a collection of one or more computer hardware and/or software components. In at least one embodiment, a super sampling neural network enabled simulator 7902 comprises rendering device(s) 7904. In at least one embodiment, a super sampling neural network enabled simulator 7902 comprises one or more hardware and/or software components that implement a neural network 7908. In at least one embodiment, a super sampling neural network enabled simulator 7902 comprises one or more data storage components (e.g., hard drives) that provide storage and processing of frame(s) 7906 and output frame(s) 7910.

In at least one embodiment, a super sampling neural network enabled simulator 7902 is a simulator device, such as a flight simulator, driving simulator, and/or variations thereof, that executes various simulator programs, such as flight simulator programs, driving simulator programs, and/or variations thereof. In at least one embodiment, a flight simulator is a device that artificially re-creates aircraft flight and an environment in which it flies. In at least one embodiment, a flight simulator, through execution of a flight simulator program, simulates various aspects of flight, such as physics of how aircraft fly, how aircraft react to applications of various flight controls, effects of other aircraft systems, and effects of factors such as turbulence, air density, wind shear, cloud, precipitation, weather, and/or variations thereof, on aircraft. In at least one embodiment, a flight simulator (e.g., a super sampling neural network enabled simulator 7902) comprises one or more hardware components that simulate an aircraft, such as hardware of a cockpit of an aircraft, that allow user interaction with a flight simulator (e.g., hardware components comprise various user input devices, such as a steering wheel, controller, joystick, buttons, switches, levers, and/or variations thereof). In at least one embodiment, a flight simulator comprises one or more displays (e.g., simulator display(s) 7912) that users interact with in connection with hardware of a flight simulator to simulate various aspects of flight. In at least one embodiment, a driving simulator is a device that artificially recreates motor vehicle movement and an environment in which it moves. In at least one embodiment, a driving simulator, through execution of a driving simulator program, simulates various aspects of operation of a motor vehicle, such as physics of a motor vehicle, how a motor vehicle reacts to applications of various motor vehicle controls, effects of other motor vehicle systems, and effects of factors such as environmental changes, wind, weather, and/or variations thereof, on motor vehicles. In at least one embodiment, a driving simulator (e.g., a super sampling neural network enabled simulator 7902) comprises one or more hardware components that simulate a motor vehicle, such as hardware of a driver seat of a motor vehicle, that allow user interaction with a driving simulator (e.g., hardware components comprise various user input devices, such as a steering wheel, pedals, controller, joystick, buttons, switches, levers, and/or variations thereof). In at least one embodiment, a driving simulator comprises one or more displays (e.g., simulator display(s) 7912) that users interact with in connection with hardware of a driving simulator to simulate various aspects of driving or other motor vehicle operation. In at least one embodiment, simulator display(s) 7912 are displays of a super sampling neural network enabled simulator 7902.

In at least one embodiment, rendering device(s) 7904 comprise one or more computer graphics rendering hardware and/or software components. In at least one embodiment, rendering device(s) 7904 comprise one or more graphics processing units. In at least one embodiment, rendering device(s) 7904 comprise one or more computing devices that generate and/or render graphics. In at least one embodiment, rendering device(s) 7904 comprise one or more computing devices that generate renders from a computer graphics program, such as a video game, simulation program, simulation video game, and/or variations thereof. In at least one embodiment, rendering device(s) 7904, using input data from a computer graphics program (e.g., a simulation program), renders frame(s) 7906.

In at least one embodiment, frame(s) 7906 are frames rendered by rendering device(s) 7904. In at least one embodiment, frame(s) 7906 are associated with motion vectors that indicate directions of movement of objects of frame(s) 7906. In at least one embodiment, frame(s) 7906 and associated motion vectors are generated by rendering device(s) 7904. In at least one embodiment, frame(s) 7906 comprise frames generated by a particular simulation program, such as a flight simulator program, driving simulator program, and/or variations thereof. In at least one embodiment, a simulation program is executed by one or more computing devices that comprise graphics hardware (e.g., rendering device(s) 7904) that generate real-time computer graphics. In at least one embodiment, a simulation program is executing and generates a 3D scene, in which frame(s) 7906 comprise renders of a 3D scene. In at least one embodiment, frame(s) 7906 are frames that are rendered with minimal post processing techniques, such as anti-aliasing (e.g., frame(s) 7906 comprise frames that are rendered with a little to no degree of anti-aliasing).

In at least one embodiment, a neural network 7908 comprises one or more neural networks that generate high quality frames from input frames. In at least one embodiment, a neural network 7908 is trained using frames from a particular computer graphics application or program (e.g., a simulation program) and is usable to generate frames for a particular computer graphics application or program. In at least one embodiment, a neural network 7908 is trained to generate high quality versions of frame(s) 7906 (e.g., upscaled/higher resolution frames, anti-aliased frames). In at least one embodiment, a simulation program is executing in connection with one or more computer graphics hardware, in which a frame is rendered and input to a neural network 7908 (e.g., frame(s) 7906 are rendered by rendering device(s) 7904 and input to neural network 7908), in which neural network 7908 generates a corresponding higher quality frame (e.g., an upscaled and/or anti-aliased frame). In at least one embodiment, a neural network 7908 is trained to output frames with various post processing techniques and/or effects from frames with minimal post processing techniques and/or effects. In at least one embodiment, a neural network 7908 obtains a frame and corresponding motion vectors, and generates a corresponding high quality output frame (e.g., a frame with various post processing techniques and/or effects, such as an upscaled/higher resolution frame, an anti-aliased frame, an upscaled and anti-aliased frame, and/or variations thereof). In at least one embodiment, a neural network 7908 obtains frame(s) 7906 and/or motion vectors and generates output frame(s) 7910. In at least one embodiment, a neural network 7908 utilizes one or more temporal feedback processes that process output frames of output frame(s) 7910 in connection with frame(s) 7906 and associated motion vectors to generate subsequent frames of output frame(s) 7910.

In at least one embodiment, output frame(s) 7910 correspond to frame(s) 7906 (e.g., each frame of output frame(s) 7910 corresponds to a frame of frame(s) 7906). In at least one embodiment, output frame(s) 7910 are frames that are generated with various post processing techniques and/or effects. In at least one embodiment, output frame(s) 7910 are higher quality versions of frame(s) 7906. In at least one embodiment, output frame(s) 7910 comprise upscaled and/or anti-aliased versions of frame(s) 7906. In at least one embodiment, output frame(s) 7910 are displayed on simulator display(s) 7912 as part of operation of one or more simulators (e.g., super sampling neural network enabled simulator 7902), such as a flight simulator that executes a flight simulator program, a driving simulator that executes a driving simulator program, and/or variations thereof. In at least one embodiment, a user is operating a super sampling neural network enabled simulator 7902 and performs one or more actions, through one or more user input devices, based at least in part on output frame(s) 7910 displayed on simulator display(s) 7912.

In at least one embodiment, at least one component shown or described with respect to FIG. 79 is used to perform techniques and/or functions described in connection with FIGS. 1-33. In at least one embodiment, at least one component shown or described with respect to FIG. 79 is used to cause one or more neural networks to cause one or more non-noise pixels to be identified and blended in parallel. In at least one embodiment, at least one component shown or described with respect to FIG. 79 is used to use one or more neural networks to adjust brightness of one or more pixels of one or more images prior to denoising the one or more images. In at least one embodiment, at least one component shown or described with respect to FIG. 79 is used to perform at least one aspect described with respect to FIGS. 1-33, and/or other systems, methods, or operations described herein.

Figure 80:
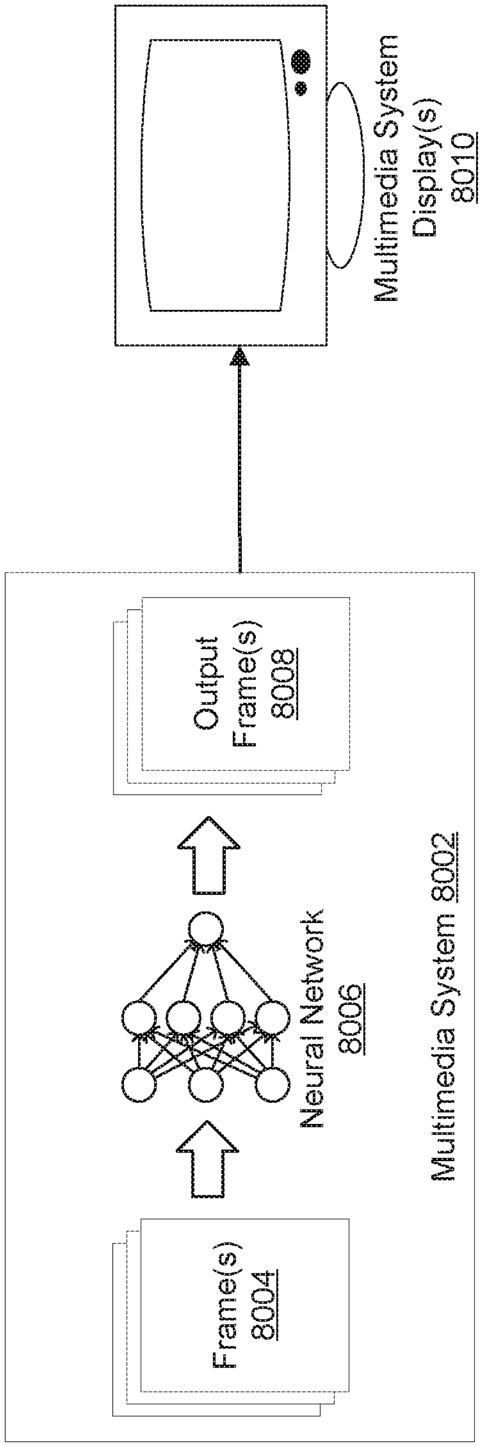
FIG. 80 illustrates an example of a device using a super sampling neural network, in accordance with at least one embodiment.

FIG. 80 illustrates an example of a device using a super sampling neural network, in accordance with at least one embodiment. In at least one embodiment, a neural network 8006 processes frame(s) 8004 generated by a multimedia system 8002 to generate output frame(s) 8008, which are output to multimedia system display(s) 8010. In at least one embodiment, a neural network 8006 is referred to as a DLSS network, super sampling neural network, super sampling network, and/or variations thereof. In at least one embodiment, a neural network 8006 is trained using techniques such as those described in connection with FIG. 77.

In at least one embodiment, a multimedia system 8002 is a collection of one or more computer hardware and/or software components. In at least one embodiment, a multimedia system 8002 comprises one or more rendering devices. In at least one embodiment, a multimedia system 8002 comprises one or more hardware and/or software components that implement a neural network 8006. In at least one embodiment, a multimedia system 8002 comprises one or more data storage components (e.g., hard drives) that provide storage and processing of frame(s) 8004 and output frame(s) 8008. In at least one embodiment, a multimedia system 8002 is a gaming console, such as those described in accordance with FIG. 74. In at least one embodiment, a multimedia system 8002 is any suitable computing device that processes multimedia, such as a computer, tablet, gaming device, gaming console, mobile device, and/or variations thereof. In at least one embodiment, multimedia system display(s) 8010 are one or more electronic visual display hardware that display data (e.g., multimedia, video games) from a multimedia system 8002. In at least one embodiment, multimedia system display(s) 8010 are displays of a multimedia system 8002.

In at least one embodiment, a multimedia system 8002 comprises one or more computer graphics rendering hardware and/or software components. In at least one embodiment, a multimedia system 8002 comprises one or more graphics processing units. In at least one embodiment, a multimedia system 8002 comprises one or more computing devices that generate and/or render graphics. In at least one embodiment, a multimedia system 8002 comprises one or more processors that execute various programs, such as video game programs, software applications, software programs, and/or variations thereof. In at least one embodiment, a multimedia system 8002 comprises one or more computing devices that generate renders from a computer graphics program, such as a video game. In at least one embodiment, a multimedia system 8002, using input data from a computer graphics program executing on multimedia system 8002 (e.g., a video game program), renders frame(s) 8004. In at least one embodiment, a multimedia system 8002 comprises one or more hardware components that allow user interaction with a multimedia system 8002 (e.g., hardware components comprise various user input devices, such as controllers, joysticks, buttons, switches, levers, and/or variations thereof). In at least one embodiment, a multimedia system 8002 is connected to one or more user input devices that allow users to interact with various programs executing on a multimedia system 8002 (e.g., video game programs).

In at least one embodiment, frame(s) 8004 are frames rendered by a multimedia system 8002. In at least one embodiment, frame(s) 8004 are associated with motion vectors that indicate directions of movement of objects of frame(s) 8004. In at least one embodiment, frame(s) 8004 and associated motion vectors are generated by a multimedia system 8002. In at least one embodiment, frame(s) 8004 comprise frames generated by a particular video game program. In at least one embodiment, a video game program is executed by one or more computing devices that comprise graphics hardware (e.g., a multimedia system 8002) that generate real-time computer graphics. In at least one embodiment, a video game program is executing and generates a 3D scene, in which frame(s) 8004 comprise renders of a 3D scene. In at least one embodiment, frame(s) 8004 are frames that are rendered with minimal post processing techniques, such as anti-aliasing (e.g., frame(s) 8004 comprise frames that are rendered with a little to no degree of anti-aliasing).

In at least one embodiment, a neural network 8006 comprises one or more neural networks that generate high quality frames from input frames. In at least one embodiment, a neural network 8006 is trained using frames from a particular computer graphics application or program (e.g., a video game program) and is usable to generate frames for a particular computer graphics application or program. In at least one embodiment, a neural network 8006 is trained to generate high quality versions of frame(s) 8004 (e.g., upscaled/higher resolution frames, anti-aliased frames). In at least one embodiment, a video game program is executing in connection with one or more computer graphics hardware, in which a frame is rendered and input to a neural network 8006 (e.g., frame(s) 8004 are rendered by a multimedia system 8002 and input to neural network 8006), in which neural network 8006 generates a corresponding higher quality frame (e.g., an upscaled/higher resolution and/or anti-aliased frame). In at least one embodiment, a neural network 8006 is trained to output frames with various post processing techniques and/or effects from frames with minimal post processing techniques and/or effects. In at least one embodiment, a neural network 8006 obtains a frame and corresponding motion vectors, and generates a corresponding high quality output frame (e.g., a frame with various post processing techniques and/or effects, such as an upscaled/higher resolution frame, an anti-aliased frame, an upscaled and anti-aliased frame, and/or variations thereof). In at least one embodiment, a neural network 8006 obtains frame(s) 8004 and/or motion vectors and generates output frame(s) 8008. In at least one embodiment, a neural network 8006 utilizes one or more temporal feedback processes that process output frames of output frame(s) 8008 in connection with frame(s) 8004 and associated motion vectors to generate subsequent frames of output frame(s) 8008.

In at least one embodiment, output frame(s) 8008 correspond to frame(s) 8004 (e.g., each frame of output frame(s) 8008 corresponds to a frame of frame(s) 8004). In at least one embodiment, output frame(s) 8008 are frames that are generated with various post processing techniques and/or effects. In at least one embodiment, output frame(s) 8008 are higher quality versions of frame(s) 8004. In at least one embodiment, output frame(s) 8008 comprise upscaled and/or anti-aliased versions of frame(s) 8004. In at least one embodiment, a neural network 8006 constantly generates output frames of output frame(s) 8008 as frames of frame(s) 8004 are rendered by a multimedia system 8002. In at least one embodiment, output frame(s) 8008 are displayed on multimedia display(s) 8010 as part of operation of one or more video game programs. In at least one embodiment, a user is operating a multimedia system 8002 and performs one or more actions, through one or more user input devices, based at least in part on output frame(s) 8008 displayed on multimedia display(s) 8010.

In at least one embodiment, at least one component shown or described with respect to FIG. 80 is used to perform techniques and/or functions described in connection with FIGS. 1-33. In at least one embodiment, at least one component shown or described with respect to FIG. 80 is used to cause one or more neural networks to cause one or more non-noise pixels to be identified and blended in parallel. In at least one embodiment, at least one component shown or described with respect to FIG. 80 is used to use one or more neural networks to adjust brightness of one or more pixels of one or more images prior to denoising the one or more images. In at least one embodiment, at least one component shown or described with respect to FIG. 80 is used to perform at least one aspect described with respect to FIGS. 1-33, and/or other systems, methods, or operations described herein.

At least one embodiment of the disclosure can be described in view of the following clauses:

1. A processor, comprising:
one or more circuits to cause one or more neural networks to cause one or more non-noise pixels to be identified and blended in parallel.

2. The processor of clause 1, wherein the one or more non-noise pixels are pixels of an image comprising one or more noisy pixels.

3. The processor of clause 1 or 2, wherein the one or more non-noise pixels are to be identified and blended using one or more filters of a hierarchical kernel prediction network (HKPN).

4. The processor of any of clauses 1-3, wherein the one or more non-noise pixels are pixels of a previous video frame of two or more video frames.

5. The processor of any of clauses 1-4, wherein the one or more non-noise pixels are to be blended with one or more pixels of a current video frame of two or more video frames.

6. The processor of any of clauses 1-5, wherein one or more non-noise pixels are to be identified and blended based, at least in part, on one or more motion vectors.

7. The processor of any of clauses 1-6, wherein the one or more neural networks are to perform one or more image processing operations concurrently with causing the one or more non-noise pixels to be identified and blended.

8. A computer-implemented method comprising:
causing one or more neural networks to cause one or more non-noise pixels to be identified and blended in parallel.

9. The computer-implemented method of clause 8, wherein the one or more non-noise pixels are pixels of an image comprising one or more noisy pixels.

10. The computer-implemented method of clause 8 or 9, wherein the one or more non-noise pixels are identified and blended using one or more filters of a hierarchical kernel prediction network (HKPN).

11. The computer-implemented method of any of clauses 8-10, wherein the one or more non-noise pixels are pixels of a previous video frame of two or more video frames.

12. The computer-implemented method of any of clauses 8-11, wherein the one or more non-noise pixels are blended with one or more pixels of a current video frame of two or more video frames.

13. The computer-implemented method of any of clauses 8-12, wherein one or more non-noise pixels are identified and blended based, at least in part, on one or more motion vectors.

14. The computer-implemented method of any of clauses 8-13, wherein causing one or more neural networks to cause one or more non-noise pixels to be identified and blended comprises performing a first one or more image processing operations before causing the one or more non-noise pixels to be identified and blended and performing a second one or more image processing operations after causing the one or more non-noise pixels to be identified and blended.

15. A computer system comprising:
one or more processors and memory storing executable instructions that, if performed by the one or more processors, cause one or more neural networks to cause one or more non-noise pixels to be identified and blended in parallel.

16. The computer system of clause 15, wherein the one or more non-noise pixels are pixels of an image comprising one or more noisy pixels.

17. The computer system of clause 15 or 16, wherein the one or more non-noise pixels are to be identified and blended using one or more filters of a hierarchical kernel prediction network (HKPN).

18. The computer system of any of clauses 15-17, wherein the one or more non-noise pixels are pixels of a previous video frame of two or more video frames.

19. The computer system of any of clauses 15-18, wherein the one or more non-noise pixels are to be blended with one or more pixels of a current video frame of two or more video frames.

20. The computer system of any of clauses 15-19, wherein one or more non-noise pixels are to be identified and blended based, at least in part, on one or more motion vectors.

21. A non-transitory machine-readable medium having stored thereon a set of instructions, which if performed by one or more processors, cause the one or more processors to cause one or more neural networks to cause one or more non-noise pixels to be identified and blended in parallel.

22. The non-transitory machine-readable medium of clause 21, wherein the one or more non-noise pixels are pixels of an image comprising one or more noisy pixels.

23. The non-transitory machine-readable medium of clause 21 or 22, wherein the one or more non-noise pixels are to be identified and blended using one or more filters of a hierarchical kernel prediction network (HKPN).

24. The non-transitory machine-readable medium of any of clauses 21-23, wherein the one or more non-noise pixels are pixels of a previous video frame of two or more video frames.

25. The non-transitory machine-readable medium of any of clauses 21-24, wherein the one or more non-noise pixels are to be blended with one or more pixels of a current video frame of two or more video frames.

26. The non-transitory machine-readable medium of any of clauses 21-25, wherein one or more non-noise pixels are to be identified and blended based, at least in part, on one or more motion vectors.

27. The non-transitory machine-readable medium of any of clauses 21-26, wherein the one or more neural networks are to perform one or more image processing operations concurrently with causing the one or more non-noise pixels to be identified and blended.

28. A processor, comprising:
one or more circuits to use one or more neural networks to adjust brightness of one or more pixels of one or more images prior to denoising the one or more images.

29. The processor of clause 28, wherein the brightness of the one or more pixels is to be adjusted by dividing the one or more pixels by one or more albedo values.

30. The processor of clause 28 or 29, wherein the brightness of the one or more pixels is to be adjusted by subtracting one or more emission values from the one or more pixels.

31. The processor of any of clauses 21-30, wherein the one or more neural networks are to adjust the brightness of the one or more pixels after denoising the one or more images.

32. The processor of any of clauses 21-31, wherein denoising the one or more images is based, at least in part, on using one or more filters of a hierarchical kernel prediction network (HKPN).

33. The processor of any of clauses 21-32, wherein denoising the one or more images is based, at least in part, on blending a previous video frame and a current video frame of two or more video frames using one or more blending weights.

34. The processor of any of clauses 21-33, wherein denoising the one or more images is based, at least in part, on one or more motions of one or more objects of the one or more images.

35. A computer-implemented method comprising:

using one or more neural networks to adjust brightness of one or more pixels of one or more images prior to denoising the one or more images.

36. The computer-implemented method of clause 35, wherein adjusting the brightness of the one or more pixels comprises dividing the one or more pixels by one or more albedo values.

37. The computer-implemented method of clause 35 or 36, wherein adjusting the brightness of the one or more pixels comprises subtracting one or more emission values from the one or more pixels.

38. The computer-implemented method of any of clauses 35-37, further comprising adjusting the brightness of the one or more pixels after denoising the one or more images.

39. The computer-implemented method of any of clauses 35-38, wherein denoising the one or more images comprises using one or more filters of a hierarchical kernel prediction network (HKPN).

40. The computer-implemented method of any of clauses 35-39, wherein denoising the one or more images comprises blending a previous video frame and a current video frame of two or more video frames using one or more blending weights.

41. The computer-implemented method of any of clauses 35-40, wherein denoising the one or more images is based, at least in part, on one or more motions of one or more objects of the one or more images.

42. A computer system comprising:

one or more processors and memory storing executable instructions that, if performed by the one or more processors, use one or more neural networks to adjust brightness of one or more pixels of one or more images prior to denoising the one or more images.

43. The computer system of clause 42, wherein the brightness of the one or more pixels is adjusted by dividing the one or more pixels by one or more albedo values.

44. The computer system of clause 42 or 43, wherein the brightness of the one or more pixels is adjusted by subtracting one or more emission values from the one or more pixels.

45. The computer system of any of clauses 42-44, wherein the one or more neural networks are to adjust the brightness of the one or more pixels after denoising the one or more images by performing one or more instructions to reverse the one or more instructions to adjust brightness of the one or more pixels of the one or more images prior to denoising.

46. The computer system of any of clauses 42-45, wherein denoising the one or more images is based, at least in part, on using one or more filters of a hierarchical kernel prediction network (HKPN).

47. The computer system of any of clauses 42-46, wherein denoising the one or more images is based, at least in part, on blending a previous video frame and a current video frame of two or more video frames based, at least in part, on one or more motions of one or more objects of the one or more images.

48. A non-transitory machine-readable medium having stored thereon a set of instructions, which if performed by one or more processors, cause the one or more processors to use one or more neural networks to adjust brightness of one or more pixels of one or more images prior to denoising the one or more images.

49. The non-transitory machine-readable medium of clause 48, wherein the brightness of the one or more pixels is to be adjusted by dividing the one or more pixels by one or more albedo values.

50. The non-transitory machine-readable medium of clause 48 or 49, wherein the brightness of the one or more pixels is to be adjusted by subtracting one or more emission values from the one or more pixels.

51. The non-transitory machine-readable medium of any of clauses 48-50, wherein the one or more neural networks are to adjust the brightness of the one or more pixels after denoising the one or more images.

52. The non-transitory machine-readable medium of any of clauses 48-51, wherein denoising the one or more images is based, at least in part, on using one or more filters of a hierarchical kernel prediction network (HKPN).

53. The non-transitory machine-readable medium of any of clauses 48-52, wherein denoising the one or more images is based, at least in part, on blending a previous video frame and a current video frame of two or more video frames using one or more blending weights.

54. The non-transitory machine-readable medium of any of clauses 48-53, wherein denoising the one or more images is based, at least in part, on one or more motions of one or more objects of the one or more images.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, referring back to FIG. 40, computer programs in form of machine-readable executable code or computer control logic algorithms are stored in main memory 4004 and/or secondary storage. Computer programs, if executed by one or more processors, enable system 4000 to perform various functions in accordance with at least one embodiment. In at least one embodiment, memory 4004, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 4002, parallel processing system 4012, an integrated circuit capable of at least a portion of capabilities of both CPU 4002, parallel processing system 4012, a chipset (e.g., a group of integrated circuits designed to work and sold as a unit for performing related functions, etc.), and/or any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 4000 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 4012 includes, without limitation, a plurality of parallel processing units ("PPUs") 4014 and associated memories 4016. In at least one embodiment, PPUs 4014 are connected to a host processor or other peripheral devices via an interconnect 4018 and a switch 4020 or multiplexer. In at least one embodiment, parallel processing system 4012 distributes computational tasks across PPUs 4014 which can be parallelizable—for example, as part of distribution of computational tasks across multiple graphics processing unit ("GPU") thread blocks. In at least one embodiment, memory is shared and accessible (e.g., for read and/or write access) across some or all of PPUs 4014, although such shared memory may incur performance penalties relative to use of local memory and registers resident to a PPU 4014. In at least one embodiment, operation of PPUs 4014 is synchronized through use of a command such as _syncthreads( ) wherein all threads in a block (e.g., executed across multiple PPUs 4014) to reach a certain point of execution of code before proceeding.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. One or more processors, comprising:

circuitry to:

identify, using one or more neural networks, one or more pixels of one or more images to darken;

remove, using the one or more neural networks, an emission value of the identified one or more pixels of the one or more images to darken the identified one or more pixels prior to denoising the one or more images; and adjust a brightness of the one or more darkened pixels in the denoised one or more images.

2. The one or more processors of claim 1, wherein the brightness of the one or more darkened pixels in the denoised one or more images is adjusted by multiplying the one or more darkened pixels by one or more albedo values.

3. The one or more processors of claim 1, wherein the identified one or more pixels is a subset of pixels of the one or more images, the subset being fewer than all of the pixels of the one or more images.

4. The one or more processors of claim 1, wherein denoising the one or more images is based, at least in part, on using a spatio-temporal ray tracing denoising library.

5. The one or more processors of claim 1, wherein denoising the one or more images is based, at least in part, on using one or more filters of a hierarchical kernel prediction network (HKPN).

6. The one or more processors of claim 1, wherein denoising the one or more images is based, at least in part, on blending a previous video frame and a current video frame of two or more video frames using one or more blending weights.

7. The one or more processors of claim 1, wherein denoising the one or more images is based, at least in part, on one or more motions of one or more objects of the one or more images.

8. A computer-implemented method comprising:

identifying, using one or more neural networks, one or more pixels of one or more images to darken;

removing, using the one or more neural networks, an emission value of the identified one or more pixels of the one or more images to darken the identified one or more pixels prior to denoising the one or more images; and adjusting a brightness of the one or more darkened pixels in the denoised one or more images.

9. The computer-implemented method of claim 8, wherein adjusting the brightness of the one or more darkened pixels in the denoised one or more images comprises multiplying the one or more darkened pixels by one or more albedo values.

10. The computer-implemented method of claim 8, wherein the identified one or more pixels is a subset of pixels of the one or more images, the subset being fewer than all of the pixels of the one or more images.

11. The computer-implemented method of claim 8, wherein darkening the identified one or more pixels comprises dividing the one or more identified pixels by one or more albedo values.

12. The computer-implemented method of claim 8, wherein denoising the one or more images comprises using one or more filters of a hierarchical kernel prediction network (HKPN).

13. The computer-implemented method of claim 8, wherein denoising the one or more images comprises blending a previous video frame and a current video frame of two or more video frames using one or more blending weights.

14. The computer-implemented method of claim 8, wherein denoising the one or more images is based, at least in part, on one or more motions of one or more objects of the one or more images.

15. A computer system comprising:

one or more processors and memory storing executable instructions that, if performed by the one or more processors:

identify, using one or more neural networks, one or more pixels of one or more images to darken;

remove, using the one or more neural networks, an emission value of the identified one or more pixels of the one or more images to darken the identified one or more pixels prior to denoising the one or more images; and adjust a brightness of the one or more darkened pixels in the denoised one or more images.

16. The computer system of claim 15, wherein the brightness of the one or more darkened pixels in the denoised one or more images is adjusted by multiplying the one or more darkened pixels by one or more albedo values.

17. The computer system of claim 15, wherein denoising the one or more images is based, at least in part, on using a spatio-temporal ray tracing denoising library.

18. The computer system of claim 15, wherein the one or more neural networks are to adjust the brightness of the one or more darkened pixels in the denoised one or more images by performing one or more instructions to reverse one or more instructions to darken the identified one or more pixels of the one or more images prior to denoising.

19. The computer system of claim 15, wherein denoising the one or more images is based, at least in part, on using one or more filters of a hierarchical kernel prediction network (HKPN).

20. The computer system of claim 15, wherein denoising the one or more images is based, at least in part, on blending a previous video frame and a current video frame of two or more video frames based, at least in part, on one or more motions of one or more objects of the one or more images.

* * * * *